US006670297B1

(12) United States Patent
Brookhart et al.

(10) Patent No.: US 6,670,297 B1
(45) Date of Patent: *Dec. 30, 2003

(54) LATE TRANSITION METAL DIIMINE CATALYST

(75) Inventors: Maurice S. Brookhart, Chapel Hill, NC (US); Lynda Kaye Johnson, Wilmington, DE (US); Christopher Moore Killian, Chapel Hill, NC (US)

(73) Assignees: E. I. du Pont de Nemours and Company, Wilmington, DE (US); University of North Carolina, Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,297

(22) Filed: Nov. 6, 2000

Related U.S. Application Data

(63) Continuation of application No. 08/891,224, filed on Jul. 10, 1997, now Pat. No. 6,218,493, which is a division of application No. 08/590,650, filed on Jan. 24, 1996, now Pat. No. 5,880,241, which is a continuation-in-part of application No. 08/473,590, filed on Jun. 7, 1995, now abandoned, which is a continuation-in-part of application No. 08/415,283, filed on Apr. 3, 1995, now abandoned, which is a continuation-in-part of application No. 08/378,044, filed on Jan. 24, 1995, now abandoned.

(60) Provisional application No. 60/002,654, filed on Aug. 22, 1995, and provisional application No. 60/007,375, filed on Nov. 15, 1995.

(51) Int. Cl.[7] .................. B01J 31/00; B01J 37/00; C08F 4/02; C08F 4/60

(52) U.S. Cl. ............... 502/103; 502/117; 502/155; 502/162; 502/167

(58) Field of Search .................... 502/102, 103, 502/117, 155, 162, 167

(56) References Cited

U.S. PATENT DOCUMENTS

| | | | | |
|---|---|---|---|---|
| 3,265,622 A | 8/1966 | Anderson | ............ | 252/59 |
| 3,503,945 A | 3/1970 | Kim | ............ | 260/89.3 |
| 3,505,301 A | 4/1970 | Natta et al. | ............ | 260/80.78 |
| 3,668,146 A | * 6/1972 | Ruhle | ............ | 252/429 |
| 4,001,195 A | 1/1977 | Wyatt | ............ | 526/348 |
| 4,123,602 A | 10/1978 | Ukihashi et al. | ............ | 526/206 |
| 4,150,208 A | 4/1979 | Hwang | ............ | 526/96 |
| 4,359,561 A | 11/1982 | Fraser et al. | ............ | 526/88 |
| 4,424,330 A | 1/1984 | Raviola | ............ | 526/348 |
| 4,506,061 A | 3/1985 | Makino et al. | ............ | 526/142 |
| 4,761,328 A | 8/1988 | Shin | ............ | 428/220 |
| 4,857,611 A | 8/1989 | Durand et al. | ............ | 526/88 |
| 5,134,209 A | 7/1992 | Job et al. | ............ | 526/141 |
| 5,204,429 A | 4/1993 | Kaminsky et al. | ............ | 526/308 |
| 5,208,309 A | 5/1993 | McDaniel et al. | ............ | 526/348 |
| 5,218,071 A | 6/1993 | Tsutsui et al. | ............ | 526/348 |
| 5,272,236 A | 12/1993 | Lai et al. | ............ | 526/348.5 |
| 5,318,849 A | 6/1994 | Mehalla et al. | ............ | 428/407 |
| 5,475,075 A | 12/1995 | Brant et al. | ............ | 526/348.3 |
| 5,565,521 A | 10/1996 | Effler, Jr. et al. | ............ | 525/146 |
| 5,866,663 A | 2/1999 | Brookhart et al. | ............ | 526/170 |
| 5,880,241 A | 3/1999 | Brookhart et al. | ............ | 526/348 |
| 5,880,323 A | 3/1999 | Brookhart et al. | ............ | 585/527 |
| 5,886,224 A | 3/1999 | Brookhart et al. | ............ | 564/272 |
| 5,891,963 A | 4/1999 | Brookhart et al. | ............ | 525/326.1 |
| 5,916,989 A | 6/1999 | Brookhart et al. | ............ | 526/348 |
| 6,034,259 A | 3/2000 | Brookhart et al. | ............ | 556/137 |
| 6,107,422 A | 8/2000 | Wang et al. | ............ | 526/243 |
| 6,140,439 A | 10/2000 | Brookhart et al. | ............ | 526/308 |

FOREIGN PATENT DOCUMENTS

| | | |
|---|---|---|
| DE | 113 763 | 8/1974 |
| DE | 3906434 A1 | 9/1990 |
| EP | 0 378 248 | 2/1986 |
| EP | 0 193 202 A2 | 9/1986 |
| EP | 0 304 671 A1 | 3/1989 |
| EP | 0 356 692 A2 | 7/1989 |
| EP | 0 361 363 A2 | 9/1989 |
| EP | 0 381 495 | 2/1990 |
| EP | 0 446 013 A2 | 3/1991 |
| EP | 0 454 231 A2 | 4/1991 |
| EP | 0 475 307 A1 | 9/1991 |
| EP | 0 504 418 A1 | 9/1992 |
| FR | 2 355 854 | 6/1977 |
| GB | 1034197 | 6/1966 |
| GB | 2 058 094 A | 9/1980 |
| JP | 63-228804 | * 3/1990 |
| JP | 06168625 A | 6/1994 |
| WO | WO 92/12162 | 12/1991 |
| WO | WO 93/13140 | 12/1992 |
| WO | WO 94/12699 | 11/1993 |
| WO | WO 97/17380 | 5/1997 |

OTHER PUBLICATIONS

P. Figgis et al., J. Am. Chem. Soc., vol. 82, pp. 820–824, Feb. 1960.*

U. Klabunde et al., J. Mol. Catal., vol. 41, pp. 123–134, 1987.*

D. E. Axelson, et al., A Quantitative Analysis of Low–Density (Branched) Polyethylenes by Carbon–13 Fourier Transform Nuclear Magnetic Resonance at 67.9 MHz, *Macromolecules*, 12, 41–52, 1979.

T. Usami, et al., Fine–Branching Structure in High–Pressure, Low–Density Polyethylenes by 50.10–MHz $^{13}$C NMR Analysis, *Macromolecules*, 17, 1757–1761, 1984.

J. P. Blitz, et al., The Characterization of Short Chain Branching in Polyethylene Using Fourier Transform Infrared Spectroscopy, *Journal of Applied Polymer Science*, 51, 1, 13–20, 1994.

(List continued on next page.)

*Primary Examiner*—Mark L. Bell
*Assistant Examiner*—J. Pasterczyk

(57) ABSTRACT

Catalysts for the polymerization of olefins are provided. The catalysts contain transition metals including nickel and palladium and a diimine ligand in a square planar configuration with two other ligands, and are useful in the polymerization of, for example, olefins, cycloolefins, olefinic esters, and olefinic carboxylic acids. The cocatalyst forms a useable coordinating anion. Polymerization processes using the catalysts can produce homopolymers and copolymers, and the polymers produced may be crosslinked and/or exhibit branching.

9 Claims, No Drawings

OTHER PUBLICATIONS

E. Nordmeier, et al., The Molecular Structure of Low–Density Polyethylene. 1. Long–Chain Branching and Solution Properties, *Macromolecules*, 23, 4, 1072–1076, 1990.

F. A. Bovey, et al., C–13 NMR Observations of Chain Branching in Vinyl Polymers, *Polym. Preprs Am Chem Soc Div Polym Chem*, 20, 2, 160–163, 1979.

W. Keim, et al., Novel Nickel– and Palladium–Complexes with Aminobis(imino)phosphorane Ligands for the Polymerization of Ethylene, *Angew. Chem. Int. Ed. Engl.*, 20, 116–117, 1981.

V. M. Mohring, et al., Novel Polymerization of α–Olefins with the Catalyst System Nickel/Aminobis(imino)phosphorane, *Angew. Chem. Int. Ed. Engl.*, 24, 1001–1003, 1985.

Nishioka, et al., Assignment of Chain Branching . . . , *Bunseki Kagaku*, 29, 11, 774–780, 1980. English abstract only.

A. D. Ketley, et al., The 1,3–Polymerization of Propylene by Palladium Cyanide, *Polymer Letters*, 6, 341–343, 1968.

R. van Asselt, et al., Palladium Complexes Containing Rigid Bidentate Nitrogen Ligands as Catalysts for Carbon–Carbon Bond Formation, *Tetrahedron*, 50, 2, 323–334, 1994.

R. van Asselt, et al., Isolation of Alkyl– and Acyl–palladium Complexes containing Rigid Bidentate Nitrogen Ligands by Stepwise Successive Insertion of CO and Alkenes, *J. Chem. Soc. Chem. Commun.*, 15, 1203–1205, 1993.

R. van Asselt, et al., Insertion of Carbon Monoxide and Alkenes in Palladium–Carbon Bonds of Complexes Containing Rigid Bidentate Nitrogen Ligands: The First Example of Isolated Complexes in Stepwise Successive Insertion Reactions of the Way to Polyketones, *J. Am. Chem. Soc.*, 116, 3, 977–985, 1994.

R. van Asselt, et al., Synthesis and characterization of rigid bidentate nitrogen ligands and some examples of coordination to divalent palladium. X–ray crystal structures of bis(p–tolylimino)acenaphthene and methylchloro[bis(o, o'diisopropylphenyl–imino)acenaphthene]palladium(II), *Recl. Trav. Chim. Pays–Bas*, 113, 2, 88–98, 1994.

R. van Asselt, Stabilization of High Oxidation States by Rigid Bidentate Nitrogen Ligands; Synthesis and Characterization of Diorgano– and Triorganopalladium(IV) and Cationic Triorganoplatinum(IV) Complexes, *Organometallics*, 13, 2, 706–720, 1994.

M. Svoboda, et al., Diazadien–Nickel–Alkyle, *J. Organometal Chem*, 191, 1, 321–328, 1980.

N. Alberola, et al., Mechanical γ and β Relaxations in Polyethylene–I. Glass Transitions of Polyethylene, *Eur. Polym. J.*, 28, 8, 935–948, 1992.

E. W. Fischer, et al., Effect of Filtration Conditions on the Apparent Density of the Intercrystalline Layers of Polyethylene Single Crystal Mats, *Polymer Letters*, 7, 307–311, 1969.

David R. Burfield, et al., Differential Scanning Calerimetry Characteristics of Polypropylene. Dependence of Tg on Polymer Tacticity and Molecular Weight, *Macromolecules*, 16, 702–704, 1983.

Piet W. N. M. van Leeuwen, et al., Migration versus Insertion in Square–Planar Platinum and Palladium Complexes, *J. Am. Chem. Soc.*, 116, 12117–12118, 1994.

Heindirk tom Dieck, et al., Rigid Phenyl–Group Conformation in Complexes, *Angew, Chem. Intl. Ed. Engl*, 19, 396–397, 1980.

Heindirk tom Dieck, et al., Synthesis of Chiral Diazadienes R*—N = CR' —CR' = N—R*, *Chem. Ber.*, 117, 694–701, 1984.

K. Zemke, et al., Conformational Exchange near the Glass Transition: Two Dimensional $^{13}$C NMR Study of Atactic Polypropylene, *Macromolecules*, 24, 6874–6876, 1991.

J. C. Randall, et al., $^{13}$C NMR microstructure determinations of low–density polyethylene homopolymers and copolymers, *Recl. Trav. Chim. Pays–Bas*, 110, 543–552, 1991. pg,4

Jan Tecl, Studium vetveni polyethylenu nuklearni magnetickou resonancni spektroskopii, *Chemicky prumyal, roc.*, 37/62, 196–200, 1987.

G. Natta, et al., Crystalline Alternating Ethylene–Cyclopentene Copolymers and Other Ethylene–Cycloolefin Copolymers, *Makromol. Chem.*, 54, 95–101, 1962.

J. Boor, et al., Polymerization of Cyclopentene, 3–Methylcyclopentene, and 3–Methylcyclohexene, *Die Makromolekulare Chemie*, 90, 26–37, 1966.

B. C. Anderson, et al., Polymerization of Internal Olefins, *Macromolecules*, 2, No. 6, 686–687, 1969.

Walter Kaminsky, et al., Copolymerization of cycloalkenes with ethylene in presence of chiral zirconocene catalysts, *Makromol. Chem.*, 190, 515–526, 1989.

W. Kaminsky, et al., in T. Keii, et al. Eds., Polymerization of Cyclic Olefins with Homogeneous Catalysts, *Catalytic Olefin Polymerization*, 929, 425–438, 1990.

W. Mark Kelly, et al., Polymerization of Cyclopenetene Using Metallocene Catalysts: Polymer Tacticity and Properties, *Macromolecule*, 27, 4477–4485, 1994.

Alexej Jerschow, et al., Nuclear Magnetic Resonance Evidence for a New Microstructure in Ethene–Cyclopentene Copolymers, *Macromolecules*, 28, 7095–7099, 1995.

Heindirk tom Dieck, et al., Diazadiene complexes of Group 4 metals I. Synthesis of mono–, bis– and tris(diazadiene) titanium complexes and the structure of diazadienedichlorotitanium, *Inorganica Chimica Acta.*, 177, 191–197, 1990.

Heindirk tom Dieck, et al., Metallierung einer nichtaktivierten Alkyl–Gruppe im Nickelkomplex 1, *Chem. Ber.*, 109, 1657–1664, 1976.

Lynda K. Johnson, et al., New Pd(II)– and Ni(II)–Based Catalysts for Polymerization of Ethylene and α–Olefins, *J. Am. Chem. Soc.*, 117, 6414–6415, 1995.

Lynda K. Johnson, et al., Copolymerization of Ethylene and Propylene with Functionalized Vinyl Monomers by Palladium(II) Catalysts, *J. Am. Chem. Soc.*, 118, 267–268, 1996.

PCT/US 96/01282 International Search Report dated Oct. 21, 1996.

Saito, et al., Diethyldipyridylnickel. Preparation, Characterization, and Reactions, *J. Am. Chem. Soc.*, 88:22, 5198–5201, 1966.

Bartolini, et al., Enantioselective isotactic alternating copolymerization of styrene and 4–methylstyrene with carbon monoxide catalyzed by a cationic bioxazoline Pd(II) complex, *Macromol.Rapid Commun.*, 16, 9–14, 1995.

Jiang, et al., Stereo– and Enantioselective Alternating Copolymerization of α–Olefins with Carbon Monoxide. Synthesis of Chiral Polymers, *Macromolecules*, 27,2694–2700, 1994.

Brookhart, et al., Polymers with Main–Chain Chirality. Synthesis of Highly Isotactic, Optically Active Poly(4–tert–butylstyrene–alt–CO) Using Pd(II) Catalysts Based on $C_2$–Symmetic Bisoxazoline Ligands, *J. Am. Chem. Soc.*, 116, 3641–3642, 1994.

Diercks, et al., Katalytische Cyclotetramerisierung von Propiolsäureestern, *Chem. Bov.*, 118, 428–435, 1985.

Dierck, et al., Diazadienes as Control Ligands in Catalysis Part 12.* The Nickel–Catalyzed Cyclotetramerization of Propargylic Alcohol to Substituted Cyclooctatetraenes and the Structure of 1,3,5,7–Tetrakis(Hydroxymethyl)Cyclooctatetraene, *Journal of Molecular Catalysis*, 35, 317–328, 1986.

"Montecatini" Societa Generale Per L'Industria Mineria E Chimica: "Catalytic Manufacture of Olefin Copolymers with Three or More Monomer Components", *Chemical Abstracts*, 77, No. 8, 1972, Abstract No. 49803t.

Scott Collins & W. Mark Kelly, The Microstructure of Poly(cyclopentene) Produced by Polymerization of Cyclopentene with Homogeneous Ziegler–Natta Catalysts, *Macromolecules*, 25, 233–237, 1992.

Wissing, e et al., Influence of bulky substituents on the regioselective group–transfer reactions of diorganozinc compounds with N,N'–bis(2,6–di–isopropenyl)–1,4–diaza–1,3–butadiene, *Chemical Abstracts*, 121, No. 11, 1055, 1994, Abstract No. 134322g.

Christina Munz, Constantin Stephan and Heindirk tom Dieck, Diazadiene–stabilized palladacyclopent–2–enes and the catalytic addition of various allylic systems to dimethyl acetylenedicarboxylate, *Journal of Organometallic Chemistry*, 407, 413–420, 1991.

Werner Bonrath, Klaus R. Pörschke, Richard Mynott and Carl Krüger, Synthesis and Structure of $Ni(2,6-^iPr_2C_6H_3N=CH-CH=NC_6H_3-2,6-^iPr_2)_2$, *Zeitschrift Für Naturforschung*, 456, 1647–1650, 1990.

Emulsion Polymerization of Fibers, Manufacture, *Encyclopedia of Polymer Science and Engineering*, vol. 6, pp. 385–387, Copyright 1986.

Editors: Barbara Elvers, Stephen Hawkins, Gail Schulz, Plastics, Properties and Testing to Polyvinyl Compounds, *Ullmann's Encyclopedia of Industrial Chemistry*, vol. A 21, pp. 488–493, 1992.

Polymer Technology Dictionary, Tony Whelan MSc, Consultant, Chapman & Hall, 1994, pp1, 282, 312.

* cited by examiner

LATE TRANSITION METAL DIIMINE CATALYST

This application is a continuation of application Ser. No. 08/891,224, filed Jul. 10, 1997, now U.S. Pat. No. 6,218,493 which is a division of application Ser. No. 08/590,650, filed Jan. 24, 1996, now U.S. Pat. No. 5,880,241, which is a continuation-in-part of application Ser. No. 08/473,590, filed Jun. 7, 1995, now abandoned, which is a continuation-in-part of application Ser. No. 08/415,283, filed Apr. 3, 1995, now abandoned, which is a continuation-in-part of application Ser. No. 08/378,044, filed Jan. 24, 1995, now abandoned, and which claims priority under 35 U.S.C. §119(e) from provisional application Serial Nos. 60/002,654, filed Aug. 22, 1995, and 60/007,375, filed Nov. 15, 1995.

FIELD OF THE INVENTION

The invention concerns novel homo- and copolymers of ethylene and/or one or more acyclic olefins, and/or selected cyclic olefins, and optionally selected ester, carboxylic acid, or other functional group containing olefins as comonomers; selected transition metal containing polymerization catalysts; and processes for making such polymers, intermediates for such catalysts, and new processes for making such catalysts. Also disclosed herein is a process for the production of linear alpha-olefins by contacting ethylene with a nickel compound of the formula [DAB]NiX$_2$ wherein DAB is a selected α-diimine and X is chlorine, bromine, iodine or alkyl, and a selected Lewis or Bronsted acid, or by contacting ethylene with other selected α-diimine nickel complexes.

BACKGROUND OF THE INVENTION

Homo- and copolymers of ethylene (E) and/or one or more acyclic olefins, and/or cyclic olefins, and/or substituted olefins, and optionally selected olefinic esters or carboxylic acids, and other types of monomers, are useful materials, being used as plastics for packaging materials, molded items, films, etc., and as elastomers for molded goods, belts of various types, in tires, adhesives, and for other uses. It is well known in the art that the structure of these various polymers, and hence their properties and uses, are highly dependent on the catalyst and specific conditions used during their synthesis. In addition to these factors, processes in which these types of polymers can be made at reduced cost are also important. Therefore, improved processes for making such (new) polymers are of interest. Also disclosed herein are uses for the novel polymers.

α-Olefins are commercial materials being particularly useful as monomers and as chemical intermediates. For a review of α-olefins, including their uses and preparation, see B. Elvers, et al., Ed., Ullmann's Encyclopedia of Industrial Chemistry, 5th Ed., Vol. A13, VCH Verlagsgesellschaft mbH, Weinheim, 1989, p. 238–251. They are useful as chemical intermediates and they are often made by the oligomerization of ethylene using various types of catalysts. Therefore catalysts which are capable or forming α-olefins from ethylene are constantly sought.

SUMMARY OF THE INVENTION

This invention concerns a polyolefin, which contains about 80 to about 150 branches per 1000 methylene groups, and which contains for every 100 branches that are methyl, about 30 to about 90 ethyl branches, about 4 to about 20 propyl branches, about 15 to about 50 butyl branches, about 3 to about 15 amyl branches, and about 30 to about 140 hexyl or longer branches.

This invention also concerns a polyolefin which contains about 20 to about 150 branches per 1000 methylene groups, and which contains for every 100 branches that are methyl, about 4 to about 20 ethyl branches, about 1 to about 12 propyl branches, about 1 to about 12 butyl branches, about 1 to about 10 amyl branches, and 0 to about 20 hexyl or longer branches.

Disclosed herein is a polymer, consisting essentially of repeat units derived from the monomers, ethylene and a compound of the formula $CH_2=CH(CH_2)_mCO_2R^1$, wherein $R^1$ is hydrogen, hydrocarbyl or substituted hydrocarbyl, and m is 0 or an integer from 1 to 16, and which contains about 0.01 to about 40 mole 5 percent of repeat units derived from said compound, and provided that said repeat units derived from said compound are in branches of the formula —CH$(CH_2)_nCO_2R^1$, in about 30 to about 70 mole percent of said branches n is 5 or more, in about 0 to about 20 mole percent n is 4, in about 3 to 60 mole percent n is 1, 2 and 3, and in about 1 to about 60 mole percent n is 0.

This invention concerns a polymer of one or more alpha-olefins of the formula $CH_2=CH(CH_2)_aH$ wherein a is an integer of 2 or more, which contains the structure (XXV)

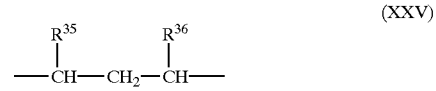

(XXV)

wherein $R^{35}$ is an alkyl group and $R^{36}$ is an alkyl group containing two or more carbon atoms, and provided that $R^{35}$ is methyl in about 2 mole percent or more of the total amount of (XXV) in said polymer.

This invention also includes a polymer of one or more alpha-olefins of the formula $CH_2=CH(CH_2)_aH$ wherein a is an integer of 2 or more, wherein said polymer contains methyl branches and said methyl branches comprise about 25 to about 75 mole percent of the total branches.

This invention also concerns a polyethylene containing the structure (XXVII) in an amount greater than can be accounted for by end groups, and preferably at least 0.5 or more of such branches per 1000 methylene groups than can be accounted for by end groups.

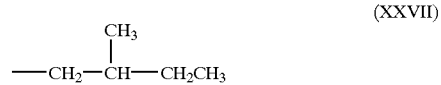

(XXVII)

This invention also concerns a polypropylene containing one or both of the structures (XXVIII) and (XXIX) and in the case of (XXIX) in amounts greater than can be accounted for by end groups. Preferably at least 0.5 more of (XXIX) branches per 1000 methylene groups than can be accounted for by end groups, and/or at least 0.5 more of (XXVIII) per 1000 methylene groups are present in the polypropylene.

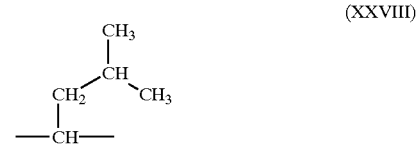

(XXVIII)

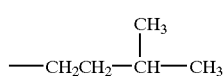
(XXIX)

Also described herein is an ethylene homopolymer with a density of 0.86 g/ml or less.

Described herein is a process for the polymerization of olefins, comprising, contacting a transition metal complex of a bidentate ligand selected from the group consisting of

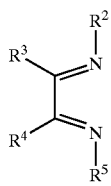
(VIII)

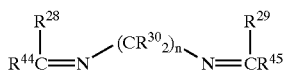
(XXX)

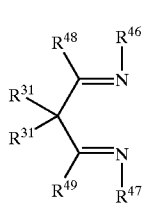
(XXIII)

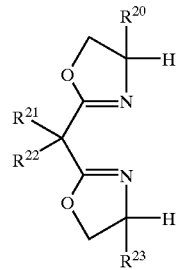
(XXXII)

with an olefin wherein:
said olefin is selected from the group consisting of ethylene, an olefin of the formula $R^{17}CH=CH_2$ or $R^{17}CH=CHR^{17}$, cyclobutene, cyclopentene, norbornene, or substituted norbornene;
said transition metal is selected from the group consisting of Ti, Zr, Sc, V, Cr, a rare earth metal, Fe, Co, Ni or Pd;
$R^2$ and $R^5$ are each independently hydrocarbyl or substituted hydrocarbyl, provided that the carbon atom bound to the imino nitrogen atom has at least two carbon atoms bound to it;
$R^3$ and $R^4$ are each independently hydrogen, hydrocarbyl, substituted hydrocarbyl, or $R^3$ and $R^4$ taken together are hydrocarbylene substituted hydrocarbylene to form a carbocyclic ring;
$R^{44}$ is hydrocarbyl or substituted hydrocarbyl, and $R^{28}$ is hydrogen, hydrocarbyl or substituted hydrocarbyl or $R^{44}$ and $R^{28}$ taken together form a ring;
$R^{45}$ is hydrocarbyl or substituted hydrocarbyl, and $R^{29}$ is hydrogen, substituted hydrocarbyl or hydrocarbyl, or $R^{45}$ and $R^{29}$ taken together form a ring;
each $R^{30}$ is independently hydrogen, substituted hydrocarbyl or hydrocarbyl, or two of $R^{30}$ taken together form a ring;

$R^{20}$ and $R^{23}$ are independently hydrocarbyl or substituted hydrocarbyl;
$R^{21}$ and $R^{22}$ are each in independently hydrogen, hydrocarbyl or substituted hydrocarbyl;
each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;
n is 2 or 3;
$R^1$ is hydrogen, hydrocarbyl or substituted hydrocarbyl;
and provided that:
said transition metal also has bonded to it a ligand that may be displace by said olefin or add to said olefin;
when M is Pd, said bidentate ligand is (VIII), (XXXII) or (XXIII);
when M is Pd a diene is not present; and
when norbornene or substituted norbornene is used no other olefin is present.

Described herein is a process for the copolymerization of an olefin and a fluorinated olefin, comprising, contacting a transition metal complex of a bidentate ligand selected from the group consisting of

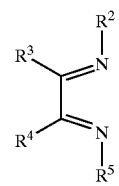
(VIII)

with an olefin, and a fluorinated olefin wherein:
said olefin is selected from the group consisting of ethylene and an olefin of the formula $R^{17}CH=CH_2$ or $R^{17}CH=CHR^{17}$;
said transition metal is selected from the group consisting of Ni and Pd;
said fluorinated olefin is of the formula $H_2C=CH(CH_2)_a R_f R^{42}$;
a is an integer of 2 to 20; $R_f$ is perfluoroalkylene optionally containing one or more ether groups;
$R^{42}$ is fluorine or a functional group;
$R^2$ and $R^5$ are each independently hydrocarbyl or substituted hydrocarbyl, provided that the carbon atom bound to the imino nitrogen atom has at least two carbon atoms bound to it;
$R^3$ and $R^4$ are each independently hydrogen, hydrocarbyl, substituted hydrocarbyl, or $R^3$ and $R^4$ taken together are hydrocarbylene substituted hydrocarbylene to form a carbocyclic ring;
each $R^{17}$ is independently saturated hydrocarbyl;
and provided that said transition metal also has bonded to it a ligand that may be displaced by said olefin or add to said olefin.

This invention also concerns a copolymer of an olefin of the formula $R^{17}CH=CHR^{17}$ and a fluorinated olefin of the formula $H_2C=CH(CH_2)_a R_f R^{42}$, wherein:
each $R^{17}$ is independently hydrogen or saturated hydrocarbyl;
a is an integer of 2 to 20; $R_f$ is perfluoroalkylene optionally containing one or more ether groups; and
$R^{42}$ is fluorine or a functional group;

provided that when both of $R^{17}$ are hydrogen and $R^{42}$ is fluorine, $R_f$ is —$(CF_2)_b$— wherein b is 2 to 20 or perfluoroalkylene containing at least one ether group.

Described herein is a process for the polymerization of olefins, comprising, contacting, at a temperature of about −100° C. to about +200° C.:

a first compound W', which is a neutral Lewis acid capable of abstracting either $Q^-$ or $S'^-$ to form $WQ^-$ or $W'S'$, provided that the anion formed is a weakly coordinating anion; or a cationic Lewis or Bronsted acid whose counterion is a weakly coordinating anion;

a second compound of the formula

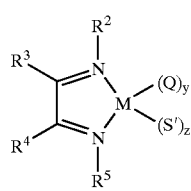

(XI)

and one or more monomers selected from the group consisting of ethylene, an olefin of the formula $R^{17}CH=CH_2$ or $R^{17}CH=CHR^{17}$, cyclobutene, cyclopentene, substituted norbornene, or norbornene;

wherein:
M is Ti, Zr, Sc, V, Cr, a rare earth metal, Fe, Co, Ni or Pd the m oxidation state;

y+z=m $R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl, or $R^3$ and $R^4$ taken together are hydrocarbylene or substituted hydrocarbylene to form a ring;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

Q is alkyl, hydride, chloride, iodide, or bromide;

S' is alkyl, hydride, chloride, iodide, or bromide; and provided that:

when norbornene or substituted norbornene is present, no other monomer is present;

when M is Pd a diene is not present; and except when M is Pd, when both Q and S' are each independently chloride, bromide or iodide W' is capable of transferring a hydride or alkyl group to M.

This invention includes a process for the production of polyolefins, comprising contacting, at a temperature of about −100° C. to about +200° C., one or more monomers selected from the group consisting of ethylene, an olefin of the formula $R^{17}CH=CH_2$ or $R^{17}CH=CHR^{17}$, cyclobutene, cyclopentene, substituted norbornene, and norbornene; with a compound of the formula

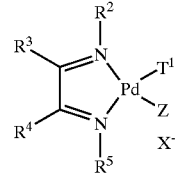

(II)

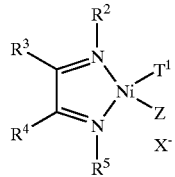

(III)

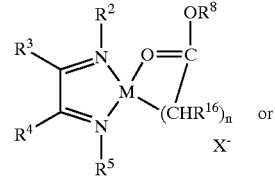

(IV)

or

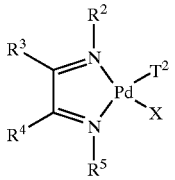

(VII)

wherein:
$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl, or $R^3$ and $R^4$ taken together are hydrocarbylene or substituted hydrocarbylene to form a ring;

T is hydrogen, hydrocarbyl not containing olefinic or acetylenic bonds, $R^{15}C(=O)$— or $R^{15}OC(=O)$—;

n is 2 or 3;

Z is a neutral Lewis base wherein the donating atom is nitrogen, sulfur or oxygen, provided that if the donating atom is nitrogen then the pKa of the conjugate acid of that compound is less than about 6;

X is a weakly coordinating anion;

$R^{15}$ is hydrocarbyl not containing olefinic or acetylenic bonds;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

M is Ni(II) or Pd(II);

each $R^{16}$ is independently hydrogen or alkyl containing 1 to 10 carbon atoms;

n is 1, 2, or 3;

$R^8$ is hydrocarbyl; and $T^2$ is hydrogen, hydrocarbyl not containing olefinic or acetylenic bonds, hydrocarbyl substituted with keto or ester groups but not containing olefinic or acetylenic bonds, $R^{15}C(=O)$— or $R^{15}OC(=O)$—;

and provided that:
when M is Pd a diene is not present; and
when norbornene or substituted norbornene is used no other monomer is present.

This invention includes a process for the production of polyolefins, comprising contacting, at a temperature of about −100° C. to about +200° C., one or more monomers selected from the group consisting of ethylene, an olefin of the formula $R^{17}CH{=}CH_2$ or $RCH{=}CHR^{17}$, cyclobutene, cyclopentene, substituted norbornene, and norbornene; with a compound of the formula

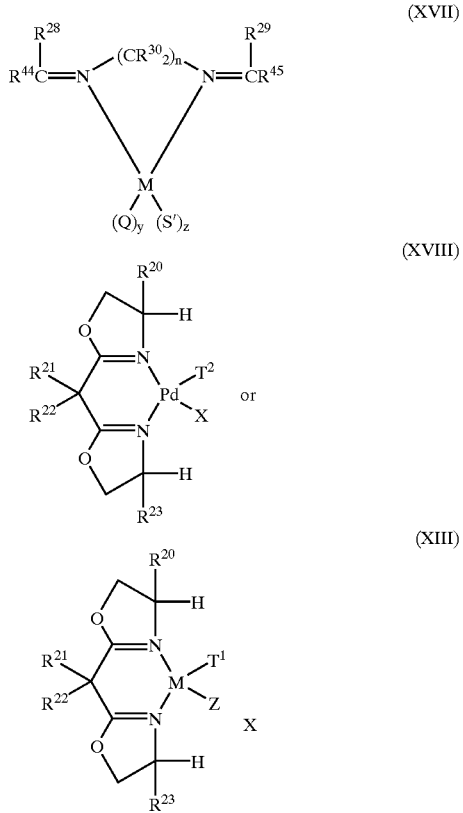

(XVII)

(XIII)

wherein:
$R^{44}$ is hydrocarbyl or substituted hydrocarbyl, and $R^{28}$ is hydrogen, hydrocarbyl or substituted hydrocarbyl or $R^{44}$ and $R^{28}$ taken together form a ring;
$R^{45}$ is hydrocarbyl or substituted hydrocarbyl, and $R^{29}$ is hydrogen, substituted hydrocarbyl or hydrocarbyl, or $R^{45}$ and $R^{29}$ taken together form a ring;
each $R^{30}$ is independently hydrogen, substituted hydrocarbyl or hydrocarbyl, or two of $R^{30}$ taken together form a ring;
each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;
$R^{20}$ and $R^{23}$ are independently hydrocarbyl or substituted hydrocarbyl;
$R^{21}$ and $R^{22}$ are each in independently hydrogen, hydrocarbyl or substituted hydrocarbyl;
$T^1$ is hydrogen, hydrocarbyl not containing olefinic or acetylenic bonds, $R^{15}C({=}O){-}$ or $R^{15}OC({=}O){-}$;
Z is a neutral Lewis base wherein the donating atom is nitrogen, sulfur or oxygen, provided that if the donating atom is nitrogen then the pKa of the conjugate acid of that compound is less than about 6; and
X is a weakly coordinating anion; and
provided that:
when M is Pd or (XVIII) is used a diene is not present; and
in (XVII) M is not Pd.

This invention includes a process for the production-of polyolefins, comprising contacting, at a temperature of about −100° C. to about +200° C., one or more monomers selected from the group consisting of ethylene, an olefin of the formula $R^{17}CH{=}CH_2$ or $R^{17}CH{=}CHR^{17}$, 4-vinylcyclohexene, cyclobutene, cyclopentene, substituted norbornene, and norbornene; with a compound of the formula

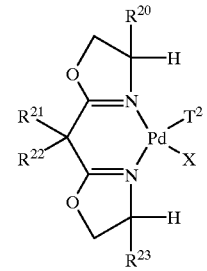

(XVIII)

wherein:
$R^{20}$ and $R^{23}$ are independently hydrocarbyl or substituted hydrocarbyl;
$R^{21}$ and $R^{22}$ are each in independently hydrogen, hydrocarbyl or substituted hydrocarbyl;
$T^1$ is hydrogen, hydrocarbyl not containing olefinic or acetylenic bonds, $R^{15}C({=}O){-}$ or $R^{15}OC({=}O){-}$;
Z is a neutral Lewis base wherein the donating atom is nitrogen, sulfur or oxygen, provided that if the donating atom is nitrogen then the pKa of the conjugate acid of that compound is less than about 6;
X is a weakly coordinating anion;
$R^{15}$ is hydrocarbyl not containing olefinic or acetylenic bonds;
each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;
M is Ni(II) or Pd(II);
$T^2$ is hydrogen, hydrocarbyl not containing olefinic or acetylenic bonds, hydrocarbyl substituted with keto or ester groups but not containing olefinic or acetylenic bonds, $R^{15}C({=}O){-}$ or $R^{15}OC({=}O){-}$;
and provided that:
when M is Pd a diene is not present; and
when norbornene or substituted norbornene is used no other monomer is present.

Described herein is a process for the production for polyolefins, comprising contacting, at a temperature of about −100° C. to about +200° C.,
a first compound W', which is a neutral Lewis acid capable of abstracting either Q⁻ or S'⁻ to form WQ⁻ or W'S', provided that the anion formed is a weakly coordinating anion; or a cationic Lewis or Bronsted acid whose counterion is a weakly coordinating anion;

a second compound of the formula

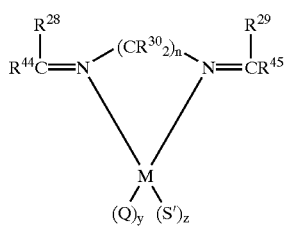

(XVII)

and one or more monomers selected from the group consisting of ethylene, an olefin of the formula $R^{17}CH\!=\!CH_2$ or $R^{17}CH\!=\!CHR^{17}$, cyclobutene, cyclopentene, substituted norbornene, or norbornene; wherein:

M is Ti, Zr, V, Cr, a rare earth metal, Co, Fe, Sc, or Ni, of oxidation state m;

$R^{44}$ is hydrocarbyl or substituted hydrocarbyl, and $R^{28}$ is hydrogen, substituted hydrocarbyl or hydrocarbyl, or $R^{44}$ and $R^{28}$ taken together form a ring;

$R^{45}$ is hydrocarbyl or substituted hydrocarbyl, and $R^{29}$ is hydrogen, substituted hydrocarbyl or hydrocarbyl, or $R^{45}$ and $R^{29}$ taken together form a ring;

each $R^{30}$ is independently hydrogen, substituted hydrocarbyl or hydrocarbyl, or two of $R^{30}$ taken together form a ring;

n is 2 or 3;

y and z are positive integers;

y+z=m;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

Q is alkyl, hydride, chloride, iodide, or bromide;

S' is alkyl, hydride, chloride, iodide, or bromide; and provided that;

when norbornene or substituted norbornene is present, no other monomer is present.

Disclosed herein is a process for the production of polyolefins, comprising, contacting, at a temperature of about −100° C. to about +200° C., one or more monomers selected from the group consisting of ethylene, an olefin of the formula $R^{17}CH\!=\!CH_2$ or $R^{17}CH\!=\!CHR^{17}$, cyclobutene, cyclopentene, substituted norbornene, and norbornene; optionally a source of X; with a compound of the formula

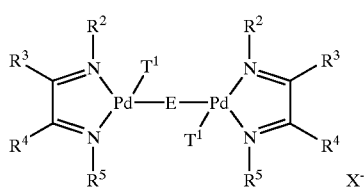

(V)

wherein:

$R^2$ and $R^5$ are each independently hydrocarbyl or substituted hydrocarbyl, provided that the carbon atom bound directly to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene substituted hydrocarbylene to form a ring;

each $R^{17}$ is independently hydrocarbyl or substituted hydrocarbyl provided that $R^{17}$ contains no olefinic bonds;

$T^1$ is hydrogen, hydrocarbyl not containing olefinic or acetylenic bonds, $R^{15}C(\!=\!O)\!-\!$ or $R^{15}OC(\!=\!O)\!-\!$;

$R^{15}$ is hydrocarbyl not containing olefinic or acetylenic bonds;

E is halogen or $-OR^{18}$;

$R^{18}$ is hydrocarbyl not containing olefinic or acetylenic bonds; and

X is a weakly coordinating anion;

provided that, when norbornene or substituted norbornene is present, no other monomer is present.

Described herein is a process for the polymerization of olefins, comprising, contacting, at a temperature of about −100° C. to about +200° C.:

a first compound W', which is a neutral Lewis acid capable of abstracting either Q⁻ or S'⁻ to form WQ⁻ or W'S', provided that the anion formed is a weakly coordinating anion; or a cationic Lewis or Bronsted acid whose counterion is a weakly coordinating anion;

a second compound of the formula

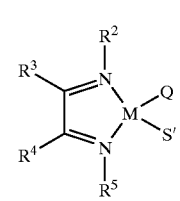

(I)

and one or more monomers selected from the group consisting of ethylene, an olefin of the formula $R^{17}CH\!=\!CH_2$ or $R^{17}CH\!=\!CHR^{17}$, 4-vinylcyclohexene, cyclobutene, cyclopentene, substituted norbornene, or norbornene;

wherein:

M is Ni(II), Co(II), Fe(II), or Pd(II);

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

Q is alkyl, hydride, chloride, iodide, or bromide;

S' is alkyl, hydride, chloride, iodide, or bromide; and provided that;

when norbornene or substituted norbornene is present, no other monomer is present;

when M is Pd a diene is not present; and except when M is Pd, when both Q and S' are each independently chloride, bromide or iodide W' is capable of transferring a hydride or alkyl group to M.

Included herein is a polymerization process, comprising, contacting a compound of the formula $[Pd(R^{13}CN)_4]X_2$ or a combination of $Pd[OC(O)R^{40}]_2$ and HX; a compound of the formula

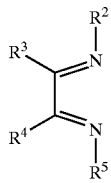
(VIII)

and one or more monomers selected from the group consisting of ethylene, an olefin of the formula $R^{17}CH=CH_2$ or $R^{17}CH=CHR^{17}$, cyclopentene, cyclobutene, substituted norbornene, and norbornene; wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{17}$ is independently hydrocarbyl or substituted hydrocarbyl provided that $R^{17}$ contains no olefinic bonds;

$R^{13}$ is hydrocarbyl;

$R^{40}$ is hydrocarbyl or substituted hydrocarbyl and

X is a weakly coordinating anion;

provided that, when norbornene or substituted norbornene is present, no other monomer is present.

Also described herein is a polymerization process, comprising;

contacting Ni[0], Pd[0] or Ni[I] compound containing a ligand which may be displaced by a ligand of the formula (VIII), (XXX), (XXXII) or (XXIII);

a second compound of the formula

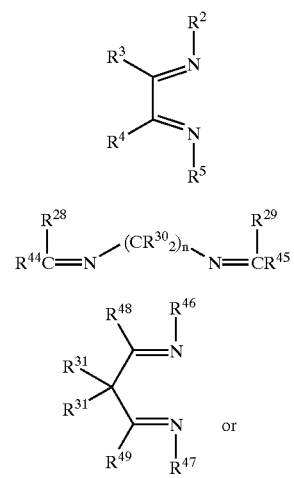

-continued

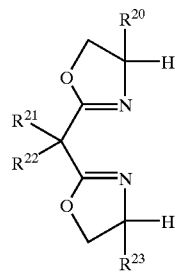
(XXXII)

an oxidizing agent;

a source of a relatively weakly coordinating anion;

and one or more monomers selected from the group consisting of ethylene, an olefin of the formula $R^{17}CH=CH_2$ or $R^{17}CH=CHR^{17}$, cyclopentene, cyclobutene, substituted norbornene, and norbornene; wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

$R^{13}$ is hydrocarbyl;

$R^{44}$ is hydrocarbyl or substituted hydrocarbyl, and $R^{28}$ is hydrogen, hydrocarbyl or substituted hydrocarbyl or $R^{44}$ and $R^{28}$ taken together form a ring;

$R^{45}$ is hydrocarbyl or substituted hydrocarbyl, and $R^{29}$ is hydrogen, substituted hydrocarbyl or hydrocarbyl, or $R^{45}$ and $R^{29}$ taken together form a ring;

each $R^{30}$ is independently hydrogen, substituted hydrocarbyl or hydrocarbyl, or two of $R^{30}$ taken together form a ring;

$R^{46}$ and $R^{47}$ are each independently hydrocarbyl or substituted hydrocarbyl, provided that the carbon atom bound to the imino nitrogen atom has at least two carbon atoms bound to it;

$R^{48}$ and $R^{49}$ are each independently hydrogen, hydrocarbyl, or substituted hydrocarbyl;

$R^{20}$ and $R^{23}$ are independently hydrocarbyl or substituted hydrocarbyl;

n is 2 or 3;

$R^{21}$ and $R^{22}$ are each in independently hydrogen, hydrocarbyl or substituted hydrocarbyl; and X is a weakly coordinating anion;

provided that;

when norbornene or substituted norbornene is present, no other monomer is present;

when said Pd[0] compound is used, a diene is not present; and when said second compound is (XXX) only an Ni[0] or Ni[I] compound is used.

Described herein is a polymerization process, comprising, contacting an Ni[0] complex containing a ligand or ligands which may be displaced by (VIII), oxygen, an alkyl aluminum compound, and a compound of the formula

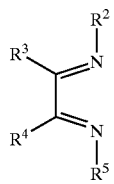
(VIII)

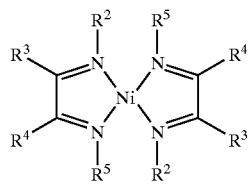
(XXXXV)

and one or more monomers selected from the group consisting of ethylene, an olefin of the formula $R^{17}CH=CH_2$ or $R^{17}CH=CHR^{17}$, cyclopentene, cyclobutene, substituted norbornene, and norbornene; wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring; and each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

provided that, when norbornene or substituted norbornene is present, no other monomer is present.

A polymerization process, comprising, contacting oxygen and an alkyl aluminum compound, or a compound of the formula HX, and a compound of the formula

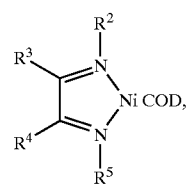
(XXXIII)

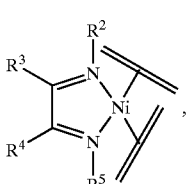
(XXXXII)

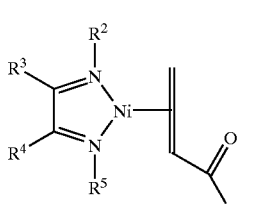
(XXXXIII)

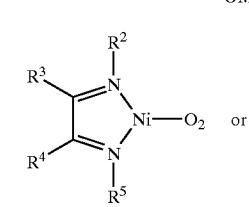
(XXXXIV)

and one or more monomers selected from the group consisting of ethylene, an olefin of the formula $R^{17}CH=CH_2$ or $R^{17}CH=CHR^{17}$, cyclopentene, cyclobutene, substituted norbornene, and norbornene; wherein:

$R^2$ and $R^5$ are each independently hydrocarbyl or substituted hydrocarbyl, provided that the carbon atom bound to the imino nitrogen atom has at,least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring; and each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

X is a weakly coordinating anion; and provided that, when norbornene or substituted norbornene is present, no other monomer is present.

Described herein is a polymerization process, comprising, contacting an Ni[0] complex containing a ligand or ligands which may be displaced by (VIII), HX or a Bronsted acidic solid, and a compound of the formula

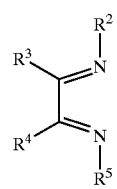
(VIII)

and one or more monomers selected from the group consisting of ethylene, an olefin of the formula $R^{17}CH=CH_2$ or $R^{17}CH=CHR^{17}$, cyclopentene, cyclobutene, substituted norbornene, and norbornene; wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms; and X is a weakly coordinating anion;

provided that, when norbornene or substituted norbornene is present, no other monomer is present Described herein is a process for the polymerization of olefins, comprising, contacting, at a temperature of about −100° C. to about +200° C.:

a first compound W', which is a neutral Lewis acid capable of abstracting either $Q^{31}$ or $S'^-$ to form $WQ^-$ or W'S', provided that the anion formed is a weakly coordinating anion; or a cationic Lewis or Bronsted acid whose counterion is a weakly coordinating anion;

a second compound of the formula

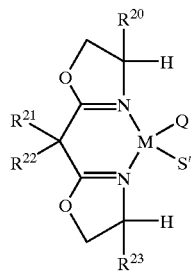

(XIX)

and one or more monomers selected from the group consisting of ethylene, an olefin of the formula $R^{17}CH=CH_2$ or $R^{17}CH=CHR^{17}$, cyclobutene, cyclopentene, substituted norbornene, or norbornene;

wherein:
M is Ni(II) or Pd(II);
$R^{20}$ and $R^{23}$ are independently hydrocarbyl or substituted hydrocarbyl;
$R^{21}$ and $R^{22}$ are each in independently hydrogen, hydrocarbyl or substituted hydrocarbyl;
each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;
Q is alkyl, hydride, chloride, iodide, or bromide;
S' is alkyl, hydride, chloride, iodide, or bromide; and
provided that;
  when norbornene or substituted norbornene is present, no other monomer is present;
  when M is Pd a diene is not present; and
  except when M is Pd, when both Q and S' are each independently chloride, bromide or iodide W' is capable of transferring a hydride or alkyl group to M.

This invention also concerns a process for the polymerization of olefins, comprising, contacting, at a temperature of about $-100°$ C. to about $+200°$ C., a compound of the formula

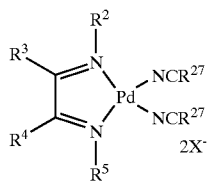

(XIV)

and one or more monomers selected from the group consisting of ethylene, an olefin of the formula $R^{17}CH=CH_2$ or $R^{17}CH=CHR^{17}$, cyclopentene, cyclobutene, substituted norbornene, and norbornene; wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{17}$ is independently hydrocarbyl or substituted hydrocarbyl provided that $R^{17}$ contains no olefinic bonds; and each $R^{27}$ is independently hydrocarbyl;

each X is a weakly coordinating anion;

provided that, when norbornene or substituted norbornene is present, no other monomer is present.

This invention also concerns a process for the polymerization of olefins, comprising, contacting, at a temperature of about $-100°$ C. to about $+200°$ C.:

a first compound W', which is a neutral Lewis acid capable of abstracting either $Q^-$ or S' to form $WQ^-$ or $WS^-$, provided that the anion formed is a weakly coordinating anion; or a cationic Lewis or Bronsted acid whose counterion is a weakly coordinating anion;

a second compound of the formula.

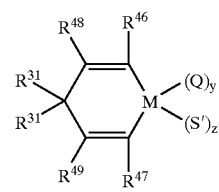

(XV)

and one or more monomers selected from the group consisting of ethylene, an olefin of the formula $R^{17}CH=CH_2$ or $R^{17}CH=CHR^{17}$, cyclopentene, cyclobutene, substituted norbornene, and norbornene; wherein:

$R^{46}$ and $R^{47}$ are each independently hydrocarbyl or substituted hydrocarbyl, provided that the carbon atom bound to the imino nitrogen atom has at least two carbon atoms bound to it;

$R^{48}$ and $R^{49}$ are each independently hydrogen, hydrocarbyl, or substituted hydrocarbyl;

each $R^{31}$ is independently hydrocarbyl, substituted hydrocarbyl or hydrogen;

M is Ti, Zr, Co, V, Cr, a rare earth metal, Fe, Sc, Ni, or Pd of oxidation state m;

y and z are positive integers;

y+z=m;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

Q is alkyl, hydride, chloride, iodide, or bromide;

S' is alkyl, hydride, chloride, iodide, or bromide; and provided that;
  when norbornene or substituted norbornene is present, no other monomer is present;
  when M is Pd a diene is not present; and
  except when M is Pd, when both Q and S' are each independently chloride, bromide or iodide W' is capable of transferring a hydride or alkyl group to M.

Disclosed herein is a compound of the formula

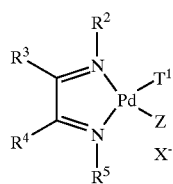

(II)

wherein:
- $R^2$ and $R^5$ are each independently hydrocarbyl or substituted hydrocarbyl, provided that the carbon atom bound to the imino nitrogen atom has at least two carbon atoms bound to it;
- $R^3$ and $R^4$ are each independently hydrogen, hydrocarbyl, substituted hydrocarbyl or $R^3$ and $R^4$ taken together are hydrocarbylene or substituted hydrocarbylene to form a ring;
- Ti is hydrogen, hydrocarbyl not containing olefinic or acetylenic bonds, $R^{15}C(=O)-$ or $R^{15}OC(=O)-$;
- Z is a neutral Lewis base wherein the donating atom is nitrogen, sulfur or oxygen, provided that if the donating atom is nitrogen then the pKa of the conjugate acid of that compound is less than about 6;
- X is a weakly coordinating anion; and
- $R^{15}$ is hydrocarbyl not containing olefinic or acetylenic bonds;
- provided that when $R^3$ and $R^4$ taken together are hydrocarbylene to form a carbocyclic ring, Z is not an organic nitrile.

Described herein is a compound of the formula

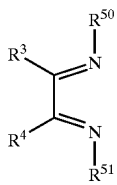

wherein:
- $R^{50}$ is substituted phenyl;
- $R^{51}$ is phenyl or substituted phenyl;
- $R^3$ and $R^4$ are each independently hydrogen, hydrocarbyl, substituted hydrocarbyl or $R^3$ and $R^4$ taken together are hydrocarbylene or substituted hydrocarbylene to form a ring;
- and provided that groups in the 2 and 6 positions of $R^{50}$ have a difference in $E_s$ of about 0.60 or more.

Described herein is a compound of the formula

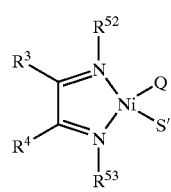

(XXXVI)

wherein:
- $R^{52}$ is substituted phenyl;
- $R^{53}$ is phenyl or substituted phenyl;

- $R^3$ and $R^4$ are each independently hydrogen, hydrocarbyl, substituted hydrocarbyl or $R^3$ and $R^4$ taken together are hydrocarbylene or substituted hydrocarbylene to form a ring;
- Q is alkyl, hydride, chloride, bromide or iodide;
- S' is alkyl, hydride, chloride, bromide or iodide;
- and provided that;
  - groups in the 2 and 6 positions of $R^{52}$ have a difference in $E_s$ of 0.15 or more; and
- when both Q and S' are each independently chloride, bromide or iodide W' is capable of transferring a hydride or alkyl group to Ni.

This invention includes a compound of the formula

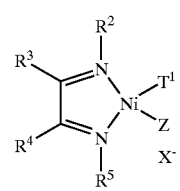

(III)

wherein:
- $R^2$ and $R^5$ are each independently hydrocarbyl or substituted hydrocarbyl, provided that the carbon atom bound to the imino nitrogen atom has at least two carbon atoms bound to it;
- $R^3$ and $R^4$ are each independently hydrogen, hydrocarbyl, or substituted hydrocarbyl or $R^3$ and $R^4$ taken together are hydrocarbylene or substituted hydrocarbylene to form a ring;
- $T^1$ is hydrogen, hydrocarbyl not containing olefinic or acetylenic bonds, $R^{15}C(=O)-$ or $R^{15}OC(=O)-$;
- $R^{15}$ is hydrocarbyl not containing an olefinic or acetylenic bond;
- Z is a neutral Lewis acid wherein the donating atom is nitrogen, sulfur or oxygen, provided that, if the donating atom is nitrogen, then the pKa of the conjugate acid of that compound is less than about 6; and
- X is a weakly coordinating anion.

This invention also concerns a compound of the formula

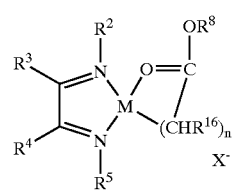

(IV)

wherein:
- $R^2$ and $R^5$ are each independently hydrocarbyl or substituted hydrocarbyl, provided that the carbon atom bound to the imino nitrogen atom has at least two carbon atoms bound to it;
- $R^3$ and $R^4$ are each independently hydrogen, hydrocarbyl, substituted hydrocarbyl or $R^3$ and $R^4$ taken together are hydrocarbylene or substituted hydrocarbylene to form a ring;
- M is Ni(II) or Pd(II);
- each $R^{16}$ is independently hydrogen or alkyl containing 1 to 10 carbon atoms;
- n is 1, 2, or 3;

X is a weakly coordinating anion; and $R^8$ is hydrocarbyl.

Also disclosed herein is a compound of the formula

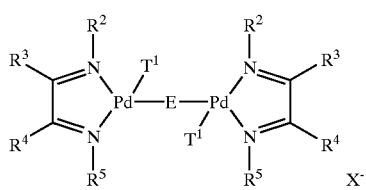
(V)

wherein:

$R^2$ and $R^5$ are each independently hydrocarbyl or substituted hydrocarbyl, provided that the carbon atom bound directly to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

E is halogen or —$OR^{18}$;

$R^{18}$ is hydrocarbyl not containing olefinic or acetylenic bonds;

$T^1$ is hydrogen, hydrocarbyl not containing olefinic or acetylenic bonds, $R^{15}C(=O)$— or $R^{15}OC(=O)$—;

$R^{15}$ is hydrocarbyl not containing olefinic or acetylenic bonds; and

X is a weakly coordinating anion.

Included herein is a compound of the formula [$(\eta^4$-1,5-COD$)PdT^1Z]^+X^-$, wherein:

$T^1$ is hydrocarbyl not containing olefinic or acetylenic bonds;

X is a weakly coordinating anion;

COD is 1,5-cyclooctadiene;

Z is $R^{10}CN$; and $R^{10}$ is hydrocarbyl not containing olefinic or acetylenic bonds.

Also included herein is a compound of the formula

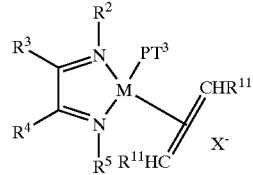
(VI)

wherein:

M is Ni(II) or Pd(II);

$R^2$ and $R^5$ are each independently hydrocarbyl or substituted hydrocarbyl, provided that the carbon atom bound directly to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{11}$ is independently hydrogen, alkyl or —$(CH_2)_m CO_2R^1$;

$T^3$ is hydrogen, hydrocarbyl not containing olefinic or acetylenic bonds, or —$CH_2CH_2CH_2CO_2R^8$;

P is a divalent group containing one or more repeat units derived from the polymerization of one or more of ethylene, an olefin of the formula $R^{17}CH=CH_2$ or $R^{17}CH=CHR^{17}$, cyclobutene, cyclopentene, substituted norbornene, or norbornene and, when M is Pd(II), optionally one or more of: a compound of the formula $CH_2=CH(CH_2)_mCO_2R^1$, CO, or a vinyl ketone;

$R^8$ is hydrocarbyl;

m is 0 or an integer from 1 to 16;

$R^1$ is hydrogen, or hydrocarbyl or substituted hydrocarbyl containing 1 to 10 carbon atoms;

and X is a weakly coordinating anion;

provided that, when M is Ni(II), $R^{11}$ is not —$CO_2R^8$.

Also described herein is a compound of the formula

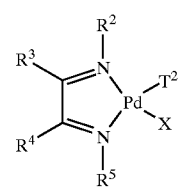
(VII)

wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

$T^2$ is hydrogen, hydrocarbyl not containing olefinic or acetylenic bonds, hydrocarbyl substituted with keto or ester groups but not containing olefinic or acetylenic bonds, $R^{15}C(=O)$— or $R^{15}OC(=O)$—;

$R^{15}$ is hydrocarbyl not containing olefinic or acetylenic bonds; and

X is a weakly coordinating anion.

Included herein is a process for the production of polyolefins, comprising, contacting, at a temperature of about −100° C. to about +200° C., a compound of the formula

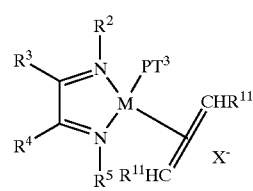
(VI)

and one or more monomers selected from the group consisting of ethylene, an olefin of the formula $R^{17}CH=CH_2$ or $R^{17}CH=CHR^{17}$, cyclobutene, cyclopentene, substituted norbornene, and norbornene, wherein:

M is Ni(II) or Pd(II);

$R^2$ and $R^5$ are each independently hydrocarbyl or substituted hydrocarbyl, provided that the carbon atom bound directly to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{11}$ is independently hydrogen, alkyl or —$(CH_2)_m CO_2R^1$;

$T^3$ is hydrogen, hydrocarbyl hot containing olefinic or acetylenic bonds, or —$CH_2CH_2CH_2CO_2R^8$;

P is a divalent group containing one or more repeat units derived from the polymerization of one or monomers selected from the group consisting of ethylene, an olefin of the formula $R^{17}CH=CH_2$ or $R^{17}CH=CHR^{17}$, cyclopentene, cyclobutene, substituted norbornene, and norbornene, and, when M is Pd(II), optionally one or more of: a compound of the formula $CH_2=CH(CH_2)_m CO_2R^1$, CO or a vinyl ketone;

$R^8$ is hydrocarbyl;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms; $R^1$ is hydrogen, or hydrocarbyl or substituted hydrocarbyl containing 1 to 10 carbon atoms;

m is 0 or an integer of 1 to 16;

and X is a weakly coordinating anion;

provided that:
when M is Pd a diene is not present;
when norbornene or substituted norbornene is present, no other monomer is present; and
further provided that, when M is Ni(II), $R^{11}$ is not —$CO_2R^8$.

Included herein is a process for the production of polyolefins, comprising, contacting, at a temperature of about −100° C. to about +200° C., a compound of the formula

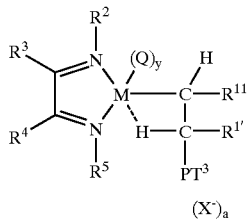

(XVI)

and one or more monomers selected from the group consisting of ethylene, an olefin of the formula $R^{17}CH=CH_2$ or $R^{17}CH=CHR^{17}$, cyclobutene, cyclopentene, substituted norbornene, and norbornene, wherein:
M is Zr, Ti, Sc, V, Cr, a rare earth metal, Fe, Co, Ni or Pd of oxidation state m;

$R^2$ and $R^5$ are each independently hydrocarbyl or substituted hydrocarbyl, provided that the carbon atom bound directly to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{11}$ is independently hydrogen, or alkyl, or both of $R^{11}$ taken together are hydrocarbylene to form a carbocyclic ring;

$T^3$ is hydrogen, hydrocarbyl not containing olefinic or acetylenic bonds, or —$CH_2CH_2CH_2CO_2R^8$;

P is a divalent group containing one or more repeat units derived from the polymerization of one or monomers selected from the group consisting of ethylene, an olefin of the formula $R^{17}CH=CH_2$ or $R^{17}CH=CHR^{17}$, cyclopentene, cyclobutene, substituted norbornene, and norbornene, and, when M is Pd(II), optionally one or more of: a compound of the formula $CH_2=CH(CH_2)_m CO_2R^1$, CO, or a vinyl ketone;

$R^8$ is hydrocarbyl;

a is 1 or 2;

y+a+1=m;

each R17 is independently hydrocarbyl or substituted hydrocarbyl provided that any olefinic bond in said olefin is separated from any other olefinic bond or aromatic ring by a quaternary carbon atom or at least two saturated carbon atoms; $R^1$ is hydrogen, or hydrocarbyl or substituted hydrocarbyl containing 1 to 10 carbon atoms;

m is 0 or an integer of 1 to 16;

and X is a weakly coordinating anion;

provided that:
when norbornene or substituted norbornene is present, no other monomer is present;
when M is Pd a diene is not present; and
further provided that, when M is Ni(II), $R^{11}$ is not —$CO_2R^8$.

Also described herein is a compound of the formula

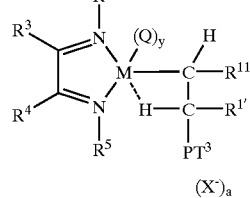

(XVI)

wherein:
M is Zr, Ti, Sc, V, Cr, a rare earth metal, Fe, Co, Ni or Pd of oxidation state m;

$R^2$ and $R^5$ are each independently hydrocarbyl or substituted hydrocarbyl, provided that the carbon atom bound directly to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{11}$ is independently hydrogen, or alkyl, or both of $R^{11}$ taken together are hydrocarbylene to form a carbocyclic ring;

$T^3$ is hydrogen, hydrocarbyl not containing olefinic or acetylenic bonds, or —$CH_2CH_2CH_2CO_2R^8$;

P is a divalent group containing one or more repeat units derived from the polymerization of one or monomers selected from the group consisting of ethylene, an olefin of the formula $R^{17}CH=CH_2$ or $R^{17}CH=CHR^{17}$, cyclopentene, cyclobutene, substituted norbornene, and norbornene, and optionally, when M is Pd(II), one or more of: a compound of the formula $CH_2=CH(CH_2)_m CO_2R^1$, CO, or a vinyl ketone;

Q is a monovalent anion;

$R^8$ is hydrocarbyl;

a is 1 or 2;

y+a+1=m;

each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;

$R^1$ is hydrogen, or hydrocarbyl or substituted hydrocarbyl containing 1 to 10 carbon atoms;

m is 0 or an integer of 1 to 16; and and X is a weakly coordinating anion;

and provided that when M is Pd a diene is not present.

Described herein is a process, comprising, contacting, at a temperature of about −40° C. to about +60° C., a compound of the formula $[(\eta^4\text{-}1,5\text{-COD})PdT^1Z]^+X^-$ and a diimine of the formula

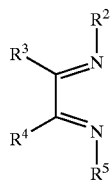

(VIII)

to produce a compound of the formula

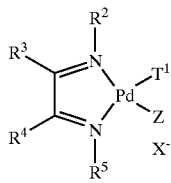

(II)

wherein:

T$^1$ is hydrogen, hydrocarbyl not containing olefinic or acetylenic bonds, $R^{15}C(=O)—$ or $R^{15}OC(=O)—$;

X is a weakly coordinating anion;

COD is 1,5-cyclooctadiene;

Z is $R^{10}CN$;

$R^{10}$ is hydrocarbyl not containing olefinic or acetylenic bonds;

$R^{15}$ is hydrocarbyl not containing olefinic or acetylenic bonds;

$R^2$ and $R^5$ are each independently hydrocarbyl or substituted hydrocarbyl, provided that the carbon atom bound to the imino nitrogen atom has at least two carbon atoms bound to it; and $R^3$ and $R^4$ are each independently hydrogen, hydrocarbyl, substituted hydrocarbyl or $R^3$ and $R^4$ taken together are hydrocarbylene or substituted hydrocarbylene to form a ring.

Described herein is a process, comprising, contacting, at a temperature of about −80° C. to about +20° C., a compound of the formula $(\eta^4\text{-}1,5\text{-COD})PdMe_2$ and a diimine of the formula

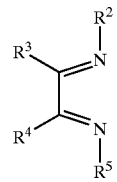

(VIII)

to produce a compound of the formula

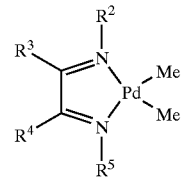

(XXXXI)

wherein:

COD is 1,5-cyclooctadiene;

$R^2$ and $R^5$ are each independently hydrocarbyl or substituted hydrocarbyl, provided that the carbon atom bound to the imino nitrogen atom has at least two carbon atoms bound to it; and $R^3$ and $R^4$ are each independently hydrogen, hydrocarbyl, substituted hydrocarbyl or $R^3$ and $R^4$ taken together are hydrocarbylene or substituted hydrocarbylene to form a ring.

Also disclosed herein is a compound of the formula

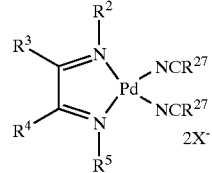

(XIV)

wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{27}$ is hydrocarbyl; and each X is a weakly coordinating anion.

This invention includes a compound of the formula

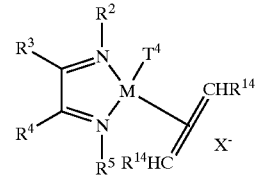

(IX)

wherein:

M is Ni(II) or Pd(II);

$R^2$ and $R^5$ are each independently hydrocarbyl or substituted hydrocarbyl, provided that the carbon atom bound directly to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{14}$ is independently hydrogen, alkyl or —$(CH_2)_m CO_2R^1$;

$R^1$ is hydrogen, or hydrocarbyl or substituted hydrocarbyl containing 1 to 10 carbon atoms;

$T^4$ is alkyl, —$R^{60}C(O)OR^8$, $R^{15}(C=O)$— or $R^{15}OC(=O)$—;

$R^{15}$ is hydrocarbyl not containing olefinic or acetylenic bonds;

$R^{60}$ is alkylene not containing olefinic or acetylenic bonds;

$R^8$ is hydrocarbyl;

and X is a weakly coordinating anion;

and provided that when $R^{14}$ is —$(CH_2)_mCO_2R^1$, or $T^4$ is not alkyl, M is Pd(II).

Described herein is a homopolypropylene with a glass transition temperature of −30° C. or less, and containing at least about 50 branches per 1000 methylene groups.

This invention also concerns a homopolymer of cyclopentene having a degree of polymerization of about 30 or more and an end of melting point of about 100° C. to about 320° C., provided that said homopolymer has less than 5 mole percent of enchained linear olefin containing pentylene units.

In addition, disclosed herein is a homopolymer or copolymer of cyclopentene that has an X-ray powder diffraction pattern that has reflections at approximately 17.3°, 19.3°, 24.2°, and 40.7° 2θ.

Another novel polymer is a homopolymer of cyclopentene wherein at least 90 mole percent of enchained cyclopentylene units are 1,3-cyclopentylene units, and said homopolymer has an average degree of polymerization of 30 more.

Described herein is a homopolymer of cyclopentene wherein at least 90 mole percent of enchained cyclopentylene units are cis-1,3-cyclopentylene, and said homopolymer has an average degree of polymerization of about 10 or more.

Also described is a copolymer of cyclopentene and ethylene wherein at least 75 mole percent of enchained cyclopentylene units are 1,3-cyclopentylene units.

This invention concerns a copolymer of cyclopentene and ethylene wherein there are at least 20 branches per 1000 methylene carbon atoms.

Described herein is a copolymer of cyclopentene and ethylene wherein at least 50 mole percent of the repeat units are derived from cyclopehtene.

Disclosed herein is a copolymer of cyclopentene and an α-olefin.

This invention also concerns a polymerization process, comprising, contacting an olefin of the formula $R^{17}CH=CH_2$ or $R^{17}CH=CHR^{17}$, wherein each $R^{17}$ is independently hydrogen, hydrocarbyl, or substituted hydrocarbyl provided that any olefinic bond in said olefin is separated from any other olefinic bond or aromatic ring by a quaternary carbon atom or at least two saturated carbon atoms with a catalyst, wherein said catalyst:

contains a nickel or palladium atom in a positive oxidation state;

contains a neutral bidentate ligand coordinated to said nickel or palladium atom, and wherein coordination to said nickel or palladium atom is through two nitrogen atoms or a nitrogen atom and a phosphorous atom; and said neutral bidentate ligand, has an Ethylene Exchange Rate of less than 20,000 L-mol$^{-1}$s$^{-1}$ when said catalyst contains a palladium atom, and less than 50,000 L-mol$^{-1}$s$^{-1}$ when said catalyst contains a nickel atom;

and provided that when Pd is present a diene is not present.

Described herein is a process for the polymerization of olefins, comprising, contacting, at a temperature of about −100° C. to about +200° C.:

a first compound which is a salt of an alkali metal cation and a relatively noncoordinating monoanion;

a second compound of the formula

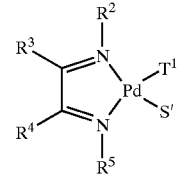

(XX)

and one or more monomers selected from the group consisting of ethylene, an olefin of the formula $R^{17}CH=CH_2$ or $R^{17}CH=CHR^{17}$, cyclobutene, cyclopentene, substituted norbornene, or norbornene;

wherein:

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

each $R^{17}$ is independently hydrocarbyl or substituted hydrocarbyl provided that $R^{17}$ contains no olefinic bond;

$T^1$ is hydrogen, hydrocarbyl not containing olefinic or acetylenic bonds, $R^{15}C(=O)$— or $R^{15}OC(=O)$—;

S' is chloride, iodide, or bromide; and provided that, when norbornene or substituted norbornene is present, no other monomer is present.

Described herein is a polyolefin, comprising, a polymer made by polymerizing one or more monomers of the formula $H_2C=CH(CH_2)_eG$ by contacting said monomers with a transition metal containing coordination polymerization catalyst, wherein:

each G is independently hydrogen or —$CO_2R^1$;

each e is independently 0 or an integer of 1 to 20;

each $R^1$ is independently hydrogen, hydrocarbyl or substituted hydrocarbyl;

and provided that:

said polymer has at least 50 branches per 1000 methylene groups;

in at least 50 mole percent of said monomers G is hydrogen; and except when no branches should be theoretically present, the number of branches per 1000 methylene groups is 90% or less than the number of theoretical branches per 1000 methylene groups, or the number of branches per 1000 methylene groups is 110% or more of theoretical branches per 1000 methylene groups, and when there should be no branches theoretically present, said polyolefin has 50 or more branches per 1000 methylene groups;

and provided that said polyolefin has at least two branches of different lengths containing less than 6 carbon atoms each.

Also described herein is a polyolefin, comprising, a polymer made by polymerizing one or more monomers of the formula $H_2C=CH(CH_2)_eG$ by contacting said monomers with a transition metal containing coordination polymerization catalyst, wherein:

each G is independently hydrogen or $-CO_2R^1$;

each e is independently 0 or an integer of 1 to 20;

$R^1$ is independently hydrogen, hydrocarbyl or substituted hydrocarbyl;

and provided that:

said polymer has at least 50 branches per 1000 methylene groups;

in at least 50 mole percent of said monomers G is hydrogen;

said polymer has at least 50 branches of the formula $-(CH_2)_fG$ per 1000 methylene groups, wherein when G is the same as in a monomer and e1f, and/or for any single monomer of the formula $H_2C=CH(CH_2)_eG$ there are less than 90% of the number of theoretical branches per 1000 methylene groups, or more than 110% of the theoretical branches per 1000 methylene groups of the formula $-(CH_2)_fG$ and f=e, and wherein f is 0 or an integer of 1 or more;

and provided that said polyolefin has at least two branches of different lengths containing less than 6 carbon atoms.

This invention concerns a process for the formation of linear α-olefins, comprising, contacting, at a temperature of about −100° C. to about +200° C.:

ethylene;

a first compound W', which is a neutral Lewis acid capable of abstracting $X^-$ to form $WX^-$, provided that the anion formed is a weakly coordinating anion, or a cationic Lewis or Bronsted acid whose counterion is a weakly coordinating anion; and a second compound of the formula

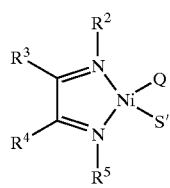

(XXXI)

wherein:

$R^2$ and $R^5$ are each independently hydrocarbyl or substituted hydrocarbyl;

$R^3$ and $R^4$ are each independently hydrogen, hydrocarbyl, substituted hydrocarbyl or $R^3$ and $R^4$ taken together are hydrocarbylene or substituted hydrocarbylene to form a ring; and Q and S' are each independently chlorine, bromine, iodine or alkyl; and wherein an α-olefin containing 4 to 40 carbon atoms is produced.

This invention also concerns a process for the formation of linear α-olefins, comprising, contacting, at a temperature of about −100° C. to about +200° C.:

ethylene and a compound of the formula

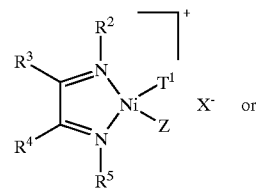

(III)

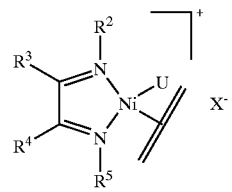

(XXXIV)

wherein:

$R^2$ and $R^5$ are each independently hydrocarbyl or substituted hydrocarbyl;

$R^3$ and $R^4$ are each independently hydrogen, hydrocarbyl, substituted hydrocarbyl or $R^3$ and $R^4$ taken together are hydrocarbylene or substituted hydrocarbylene to form a ring;

$T^1$ is hydrogen or n-alkyl containing up to 38 carbon atoms;

Z is a neutral Lewis base wherein the donating atom is nitrogen, sulfur, or oxygen, provided that if the donating atom is nitrogen then the pKa of the conjugate acid of that compound (measured in water) is less than about 6;

U is n-alkyl containing up to 38 carbon atoms; and

X is a noncoordinating anion;

and wherein an α-olefin containing 4 to 40 carbon atoms is produced.

Another novel process is a process for the formation of linear α-olefins, comprising, contacting, at a temperature of about −100° C. to about +200° C.:

ethylene;

and a Ni[II] of

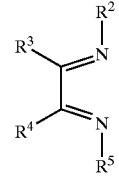

(VIII)

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl, or $R^3$ and $R^4$ taken together are hydrocarbylene substituted hydrocarbylene to form a carbocyclic ring and wherein an α-olefin containing 4 to 40 carbon atoms is produced.

Also described herein is a process for the production of polyolefins, comprising, contacting, at a temperature of about 0° C. to about +200° C., a compound of the formula

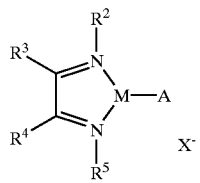

XXXVII and one or more monomers selected from the group consisting of ethylene, an olefin of the formula $R^{17}CH=CH_2$ or $R^{17}CH=CHR^{17}$, cyclobutene, cyclopentene, substituted norbornene, and norbornene, wherein:
M is Ni(II) or Pd(II);
A is a π-allyl or π-benzyl group;
$R^2$ and $R^5$ are each independently hydrocarbyl or substituted hydrocarbyl, provided that the carbon atom bound directly to the imino nitrogen atom has at least two carbon atoms bound to it;
$R^3$ and $R^4$ are each independently hydrogen, hydrocarbyl, substituted hydrocarbyl or $R^3$ and $R^4$ taken together are hydrocarbylene or substituted hydrocarbylene to form a ring;
each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;
and X is a weakly coordinating anion;
and provided that:
when M is Pd a diene is not present; and
when norbornene or substituted norbornene is present, no other monomer is present.

The invention also includes a compound of the formula

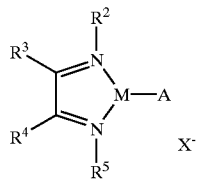

XXXVII wherein:
M is Ni(II) or Pd(II);
A is a π-allyl or π-benzyl group;
$R^2$ and $R^5$ are each independently hydrocarbyl or substituted hydrocarbyl, provided that the carbon atom bound directly to the imino nitrogen atom has at least two carbon atoms bound to it;
$R^3$ and $R^4$ are each independently hydrogen, hydrocarbyl, substituted hydrocarbyl or $R^3$ and $R^4$ taken together are hydrocarbylene or substituted hydrocarbylene to form a ring;
each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms;
and X is a weakly coordinating anion;
and provided that when M is Pd a diene is not present.

This invention also includes a compound of the formula

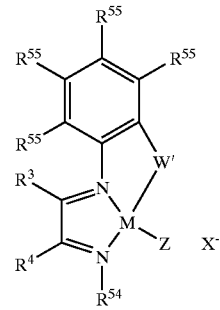

(XXXVIII)

wherein:

$R^3$ and $R^4$ are each independently hydrogen, hydrocarbyl, substituted hydrocarbyl or $R^3$ and $R^4$ taken together are hydrocarbylene or substituted hydrocarbylene to form a ring;

$R^{54}$ is hydrocarbyl or substituted hydrocarbyl, provided that the carbon atom bound directly to the imino nitrogen atom has at least two carbon atoms bound to it;

each $R^{55}$ is independently hydrogen, hydrocarbyl, substituted hydrocarbyl, or a functional group;

W' is alkylene or substituted alkylene containing 2 or more carbon atoms;

Z is a neutral Lewis base wherein the donating atom is nitrogen, sulfur, or oxygen, provided that if the donating atom is nitrogen then the pKa of the conjugate acid of that compound (measured in water) is less than about 6, or an olefin of the formula $R^{17}CH=CHR^{17}$;

each $R^{17}$ is independently hydrogen, saturated hydrocarbyl or substituted saturated hydrocarbyl; and X is a weakly coordinating anion;

and provided that when M is Ni, W' is alkylene and each $R^{17}$ is independently hydrogen or saturated hydrocarbyl.

This invention also includes a process for the production of a compound of the formula

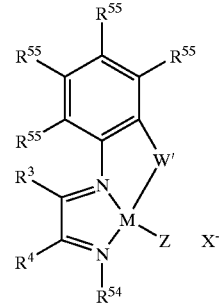

(XXXVIII)

comprising, heating a compound of the formula

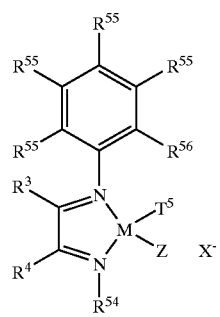

(XXXIX)

at a temperature of about −30° C. to about +100° C. for a sufficient time to produce (XXXVIII), and wherein:

$R^3$ and $R^4$ are each independently hydrogen, hydrocarbyl, substituted hydrocarbyl or $R^3$ and $R^4$ taken together are hydrocarbylene or substituted hydrocarbylene to form a ring;

$R^{54}$ is hydrocarbyl or substituted hydrocarbyl, provided that the carbon atom bound directly to the imino nitrogen atom has at least two carbon atoms bound to it;

each $R^{55}$ is independently hydrogen, hydrocarbyl, substituted hydrocarbyl, or a functional group;

$R^{56}$ is alkyl containing 2 to 30 carbon atoms;

$T^5$ is alkyl;

W' is alkylene containing 2 to 30 carbon atoms;

Z is a neutral Lewis base wherein the donating atom is nitrogen, sulfur, or oxygen, provided that if the donating atom is nitrogen then the pKa of the conjugate acid of that compound (measured in water) is less than about 6; and X is a weakly coordinating anion.

This invention also concerns a process for the polymerization of olefins, comprising, contacting a compound of the formula

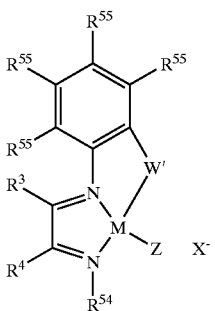

(XXXVIII)

and one or more monomers selected from the group consisting of ethylene, an olefin of the formula $R^{17}CH=CH_2$ or $R^{17}CH=CHR^{17}$, cyclobutene, cyclopentene, substituted norbornene, and norbornene, wherein:
$R^3$ and $R^4$ are each independently hydrogen, hydrocarbyl, substituted hydrocarbyl or $R^3$ and $R^4$ taken together are hydrocarbylene or substituted hydrocarbylene to form a ring;

$R^{54}$ is hydrocarbyl or substituted hydrocarbyl, provided that the carbon atom bound directly to the imino nitrogen atom has at least two carbon atoms bound to it;

each $R^{55}$ is independently hydrogen, hydrocarbyl, substituted hydrocarbyl, or a functional group;

W' is alkylene or substituted alkylene containing 2 or more carbon atoms;

Z is a neutral Lewis base wherein the donating atom is nitrogen, sulfur, or oxygen, provided that if the donating atom is nitrogen then the pKa of the conjugate acid of that compound (measured in water) is less than about 6, or an olefin of the formula $R^{17}CH=CHR^{17}$;

each $R^{17}$ is independently hydrogen, saturated hydrocarbyl or substituted saturated hydrocarbyl; and X is a weakly coordinating anion;

and provided that:

when M is Ni, W' is alkylene and each $R^{17}$ is independently hydrogen or saturated hydrocarbyl; and when norbornene or substituted norbornene is present, no other monomer is present.

This invention also concerns a homopolypropylene containing about 10 to about 700 δ+ methylene groups per 1000 total methylene groups in said homopolypropylene.

Described herein is a homopolypropylene wherein the ratio of δ+:γ methylene groups is about 0.5 to about 7.

Also included herein is a homopolypropylene in which about 30 to about 85 mole percent of the monomer units are enchained in an ω, 1 fashion.

DETAILS OF THE INVENTION

Herein certain terms are used to define certain chemical groups or compounds. These terms are defined below.

A "hydrocarbyl group" is a univalent group containing only carbon and hydrogen. If not otherwise stated, it is preferred that hydrocarbyl groups herein contain 1 to about 30 carbon atoms.

By "not containing olefinic or acetylenic bonds" is meant the grouping does not contain olefinic carbon-carbon double bonds (but aromatic rings are not excluded) and carbon-carbon triple bonds.

By "substituted hydrocarbyl" herein is meant a hydrocarbyl group which contains one or more substituent groups which are inert under the process conditions to which the compound containing these groups is subjected. The substituent groups also do not substantially interfere with the process. If not otherwise stated, it is preferred that substituted hydrocarbyl groups herein contain 1 to about 30 carbon atoms. Included in the meaning of "substituted" are heteroaromatic rings.

By an alkyl aluminum compound is meant a compound in which at least one alkyl group is bound to an aluminum atom. Other groups such as alkoxide, oxygen, and halogen may also be bound to aluminum atoms in the compound.

By "hydrocarbylene" herein is meant a divalent group containing only carbon and hydrogen. Typical hydrocarbylene groups are —$(CH_2)_4$—, —$CH_2CH(CH_2CH_3)CH_2CH_2$— and

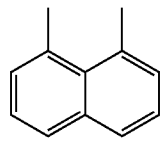

(An)

If not otherwise stated, it is preferred that hydrocarbylene groups herein contain 1 to about 30 carbon atoms.

By "substituted hydrocarbylene" herein is meant a hydrocarbylene group which contains one or more substituent groups which are inert under the process conditions to which the compound containing these groups is subjected. The substituent groups also do not substantially interfere with the process. If not otherwise stated, it is preferred that substituted hydrocarbylene groups herein contain 1 to about 30 carbon atoms. Included within the meaning of "substituted" are heteroaromatic rings.

By substituted norbornene is meant a norbornene which is substituted with one or more groups which does not interfere substantially with the polymerization. It is preferred that substituent groups (if they contain carbon atoms) contain 1 to 30 carbon atoms. Examples of substituted norbornenes are ethylidene norbornene and methylene norbornene.

By "saturated hydrocarbyl" is meant a univalent group containing only carbon and hydrogen which contains no unsaturation, such as olefinic, acetylenic, or aromatic groups. Examples of such groups include alkyl and cycloalkyl. If not otherwise stated, it is preferred that saturated hydrocarbyl groups herein contain 1 to about 30 carbon atoms.

By "neutral Lewis base" is meant a compound, which is not an ion, which can act as a Lewis base. Examples of such compounds include ethers, amines, sulfides, and organic nitrites.

By "cationic Lewis acid" is meant a cation which can act as a Lewis acid. Examples of such cations are sodium and silver cations.

By "α-olefin" is meant a compound of the formula $CH_2=CHR^{19}$, wherein $R^{19}$ is n-alkyl or branched alkyl, preferably n-alkyl.

By "linear α-olefin" is meant a compound of the formula $CH_2=CHR^{19}$, wherein $R^{19}$ is n-alkyl. It is preferred that the linear α-olefin have 4 to 40 carbon atoms.

By a "saturated carbon atom" is meant a carbon atom which is bonded to other atoms by single bonds only. Not included in saturated carbon atoms are carbon atoms which are part of aromatic rings.

By a quaternary carbon atom is meant a saturated carbon atom which is not bound to any hydrogen atoms. A preferred quaternary carbon atom is bound to four other carbon atoms.

By an olefinic bond is meant a carbon-carbon double bond, but does not include bonds in aromatic rings.

By a rare earth metal is meant one of lanthanum, cerium, praeseodymium, neodymium, promethium, samarium, europium, gadolinium, terbium, dysprosium, holmium, erbium, thulium, ytterbium or lutetium.

This invention concerns processes for making polymers, comprising, contacting one or more selected olefins or cycloolefins, and optionally an ester or carboxylic acid of the formula $CH_2=CH(CH_2)_mCO_2R^1$, and other selected monomers, with a transition metal containing catalyst (and possibly other catalyst components). Such catalysts are, for instance, various complexes of a diimine with these metals. By a "polymerization process herein (and the polymers made therein)" is meant a process which produces a polymer with a degree of polymerization (DP) of about 20 or more, preferably about 40 or more [except where otherwise noted, as in P in compound (VI)] By "DP" is meant the average number of repeat (monomer) units in the polymer.

One of these catalysts may generally be written as

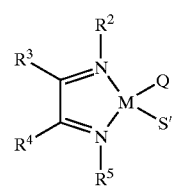

(I)

wherein: M is Ni(II), Co(II), Fe(II) or Pd(II); $R^2$ and $R^5$ are each independently hydrocarbyl: or substituted hydrocarbyl, provided that the carbon atom bound to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; Q is alkyl, hydride, chloride, iodide, or bromide; and S' is alkyl, hydride, chloride, iodide, or bromide. Preferably M is Ni(II) or Pd(II).

In a preferred form of (I), $R^3$ and $R^4$ are each independently hydrogen or hydrocarbyl. If Q and/or S' is alkyl, it is preferred that the alkyl contains 1 to 4 carbon atoms, and more preferably is methyl.

Another useful catalyst is

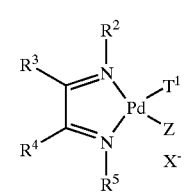

(II)

wherein: $R^2$ and $R^5$ are each independently hydrocarbyl or substituted hydrocarbyl, provided that the carbon atom bound to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; $T^1$ is hydrogen, hydrocarbyl not containing olefinic or acetylenic bonds, $R^{15}C(=O)-$ or $R^{15}OC(=O)-$; Z is a neutral Lewis base wherein the donating atom is nitrogen, sulfur or oxygen, provided that, if the donating atom is nitrogen, then the pKa of the conjugate acid of that compound is less than about 6; X is a weakly coordinating anion; and $R^{15}$ is hydrocarbyl not containing olefinic or acetylenic bonds.

In one preferred form of (II), $R^3$ and $R^4$ are each independently hydrogen or hydrocarbyl. In a more preferred form of (II), $T^1$ is alkyl, and $T^1$ is especially preferably methyl. It is preferred that Z is $R^6_2O$ or $R^7CN$, wherein each $R^6$ is independently hydrocarbyl and $R^7$ is hydrocarbyl. It is preferred that $R^5$ and $R^7$ are alkyl, and it is more preferred that they are methyl or ethyl. It is preferred that $X^-$ is BAF, $SbF_6$, $PF_6$ or $BF_4$.

Another useful catalyst is

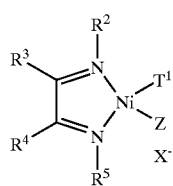

(III)

wherein: $R^2$ and $R^5$ are each independently hydrocarbyl or substituted hydrocarbyl, provided that the carbon atom bound to the imino nitrogen atom has at least two carbon atoms bound to it; $R^3$ and $R^4$ are each independently hydrogen, hydrocarbyl, or substituted hydrocarbylene, or $R^3$ and $R^4$ taken together are hydrocarbylene or substituted hydrocarbylene to form a ring; $T^1$ is hydrogen, hydrocarbyl not containing olefinic or acetylenic bonds, $R^{15}C(=O)$— or $R^{15}OC(=O)$—; Z is a neutral Lewis base wherein the donating atom is nitrogen, sulfur or oxygen, provided that if the donating atom is nitrogen then the pKa of the conjugate acid of that compound is less than about 6; X is a weakly coordinating anion; and $R^{15}$ is hydrocarbyl not containing olefinic or acetylenic bonds.

In one preferred form of (III), $R^3$ and $R^4$ are each independently hydrogen, hydrocarbyl. In a more preferred form of (III) $T^1$ is alkyl, and $T^1$ is especially preferably methyl. It is preferred that Z is $R^6{}_2O$ or $R^7CN$, wherein each $R^6$ is independently hydrocarbyl and $R^7$ is hydrocarbyl. It is preferred that $R^6$ and $R^7$ are alkyl, and it is especially preferred that they are methyl or ethyl. It is preferred that X is $BAF^-$, $SbF_6{}^-$, $PF_6{}^-$ or $BF_4{}^-$.

Relatively weakly coordinating anions are known to the artisan. Such anions are often bulky anions, particularly those that may delocalize their negative charge. Suitable weakly coordinating anions in this Application include $(Ph)_4B^-$ (Ph=phenyl), tetrakis[3,5-bis(trifluoromethyl)phenyl]borate (herein abbreviated BAF), $PF_6{}^-$, $BF_4{}^-$, $SbF_6{}^-$, trifluoromethanesulfonate, p-toluenesulfonate, $(R_fSO_2)_2N^-$, and $(C_6F_5)_4B^-$. Preferred weakly coordinating anions include $BAF^-$, $PF_6{}^-$, $BF_4{}^-$, and $SbF_6{}^-$.

Also useful as a polymerization catalyst is a compound of the formula

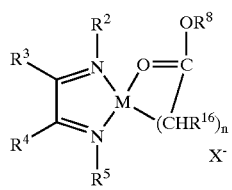

(IV)

wherein: $R^2$ and $R^5$ are each independently hydrocarbyl or substituted hydrocarbyl, provided that the carbon atom bound to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; M is Ni(II) or Pd(II); each R16 is independently hydrogen or alkyl containing 1 to 10 carbon atoms; n is 1, 2, or 3; X is a weakly coordinating anion; and $R^8$ is hydrocarbyl.

It is preferred that n is 3, and all of $R^{16}$ are hydrogen. It is also preferred that $R^8$ is alkyl or substituted alkyl, especially preferred that it is alkyl, and more preferred that $R^8$ is methyl.

Another useful catalyst is

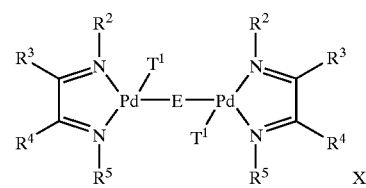

(V)

wherein: $R^2$ and $R^5$ are hydrocarbyl or substituted hydrocarbyl, provided that the carbon atom bound directly to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; $T^1$ is hydrogen, hydrocarbyl not containing olefinic or acetylenic bonds, $R^{15}C(=O)$— or $R^{15}OC(=O)$—; $R^{15}$ is hydrocarbyl not containing olefinic or acetylenic bonds; E is halogen or —$OR^{18}$; $R^{18}$ is hydrocarbyl not containing olefinic or acetylenic bonds; and X is a weakly coordinating anion. It is preferred that $T^1$ is alkyl containing 1 to 4 carbon atoms, and more preferred that it is methyl. In other preferred compounds (V), $R^3$ and $R^4$ are methyl or hydrogen and $R^2$ and $R^5$ are 2,6-diisopropylphenyl and X is BAF. It is also preferred that E is chlorine.

Another useful catalyst is a compound of the formula

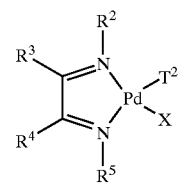

(VII)

wherein: $R^2$ and $R^5$ are each independently hydrocarbyl or substituted hydrocarbyl, provided that the carbon atom bound to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; $T^2$ is hydrogen, hydrocarbyl not containing olefinic or acetylenic bonds, hydrocarbyl substituted with keto or ester groups but not containing olefinic or acetylenic bonds, $R^{15}C(=O)$— or $R^{15}OC(=O)$—; $R^{15}$ is hydrocarbyl not containing olefinic or acetylenic bonds; and X is a weakly coordinating anion. In a more preferred form of (VII), $T^2$ is alkyl containing 1 to 4 carbon atoms and $T^2$ is especially preferably methyl. It is preferred that X is perfluoroalkylsulfonate, especially trifluoromethanesulfonate (triflate). If $X^-$ is an extremely weakly coordinating anion such as BAF, (VII) may not form. Thus it may be said that (VII) forms usually with weakly, but perhaps not extremely weakly, coordinating anions.

In all compounds, intermediates, catalysts, processes, etc. in which they appear it is preferred that $R^2$ and $R^5$ are each independently hydrocarbyl, and in one form it is especially preferred that $R^2$ and $R^5$ are both 2,6-diisopropylphenyl, particularly when $R^3$ and $R^4$ are each independently hydrogen or methyl. It is also preferred that $R^3$ and $R^4$ are each independently hydrogen, hydrocarbyl or taken together hydrocarbylene to form a carbocyclic ring.

Compounds of the formula (I) wherein M is Pd, Q is alkyl and S' is halogen may be made by the reaction of the corresponding 1,5-cyclooctadiene (COD) Pd complex with the appropriate diimine. When M is Ni, (I) can be made by the displacement of a another ligand, such as a dialkylether or a polyether such as 1,2-dimethoxyethane, by an appropriate diimine.

Catalysts of formula (II), wherein $X^-$ is $BAF^-$, may be made by reacting a compound of formula (I) wherein Q is alkyl and S' is halogen, with about one equivalent of an alkali metal salt, particularly the sodium salt, of HBAF, in the presence of a coordinating ligand, particularly a nitrile such as acetonitrile. When $X^-$ is an anion such as $BAF^-$, $SbF_6^-$ or $BF_4^-$ the same starting palladium compound can be reacted with the silver salt AgX.

However, sometimes the reaction of a diimine with a 1,5-COD Pd complex as described above to make compounds of formula (II) may be slow and/or give poor conversions, thereby rendering it difficult to make the starting material for (II) using the method described in the preceding paragraph. For instance when: $R^3=R^4=Ph_2CH-$ and $R^3=R^4=H$; $R^2=R^5=Ph-$ and $R^3=R^4=Ph$; $R^2=R^5=$ 2-t-butylphenyl and $R^3=R^4=CH_3$; $R^2=R^5=\alpha$-naphthyl and $R^3=R^4=CH_3$; and $R^2=R^5=$2-phenylphenyl and $R^2=R^5=CH_3$ difficulty may be encountered in making a compound of formula (II).

In these instances it has been found more convenient to prepare (II) by reacting $[(\eta\text{-}1,5\text{-COD})PdT^1Z]^+X^-$, wherein $T^1$ and X are as defined above and Z is an organic nitrile ligand, preferably in an organic nitrile solvent, with a diimine of the formula

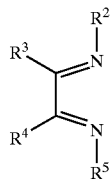

(VIII)

By a "nitrile solvent" is meant a solvent that is at least 20 volume percent nitrile compound. The product of this reaction is (II), in which the Z ligand is the nitrile used in the synthesis. In a preferred synthesis, $T^1$ is methyl and the nitrile used is the same as in the starting palladium compound, and is more preferably acetonitrile. The process is carried out in solution, preferably when the nitrile is substantially all of the solvent, at a temperature of about −40° C. to about +60° C., preferably about 0° C. to about 30° C. It is preferred that the reactants be used in substantially equimolar quantities.

The compound $[(\eta^4\text{-}1,5\text{-COD})PdT^1Z]^+X^-$, wherein $T^1$ is alkyl, Z is an organic nitrile and X is a weakly coordinating anion may be made by the reaction of $[(\eta^4\text{-}1,5\text{-COD})PdT^1A$, wherein A is Cl, Br or I and $T^1$ is alkyl with the silver salt of $X^-$, AgX, or if X is BAF with an alkali metal salt of HBAF, in the presence of an organic nitrile, which of course will become the ligand $T^1$. In a preferred process A is Cl, $T^1$ is alkyl, more preferably methyl, and the organic nitrile is an alkyl nitrile, more preferably acetonitrile. The starting materials are preferably present in approximately equimolar amounts, except for the nitrile which is present preferably in excess. The solvent is preferably a non-coordinating solvent such as a halocarbon. Methylene chloride is useful as such a solvent. The process preferably is carried out at a temperature of about −40° C. to about +50° C. It is preferred to exclude water and other hydroxyl containing compounds from the process, and this may be done by purification of the ingredients and keeping the process mass under an inert gas such as nitrogen.

Compounds of formula (II) [or (III) when the metal is nickel] can also be made by the reaction of

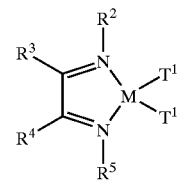

(X)

with a source of the conjugate acid of the anion X, the acid HX or its equivalent (such as a trityl salt) in the presence of a solvent which is a weakly coordinating ligand such as a dialkyl ether or an alkyl nitrile. It is preferred to carry out this reaction at about −80° C. to about 30° C.

Compounds of formula (XXXXI) can be made by a process, comprising, contacting, at a temperature of about −80° C. to about +20° C., a compound of the formula $(\eta^4\text{-}1,5\text{-COD})PdMe_2$ and a diimine of the formula

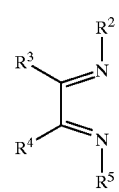

(VIII)

wherein: COD is 1,5-cyclooctadiene; $R^2$ and $R^5$ are each independently hydrocarbyl or substituted hydrocarbyl, provided that the carbon atom bound to the imino nitrogen atom has at least two carbon atoms bound to it; and $R^3$ and $R^4$ are each independently hydrogen, hydrocarbyl, substituted hydrocarbyl or $R^3$ and $R^4$ taken together are hydrocarbylene or substituted hydrocarbylene to form a ring. It is preferred that the temperature is about −50° C. to about +10° C. It is also preferred that the two starting materials be used in approximately equimolar quantities, and/or that the reaction be carried out in solution. It is preferred that $R^2$ and $R^5$ are both 2-t-butylphenyl or 2,5-di-t-butylphenyl and that $R^3$ and $R^4$ taken together are An, or $R^3$ and $R^4$ are both hydrogen or methyl.

Compounds of formula (IV) can be made by several routes. In one method a compound of formula (II) is reacted with an acrylate ester of the formula $CH_2=CHCO_2R^1$ wherein $R^1$ is as defined above. This reaction is carried out in a non-coordinating solvent such as methylene chloride, preferably using a greater than 1 to 50 fold excess of the acrylate ester. In a preferred reaction, Q is methyl, and $R^1$ is alkyl containing 1 to 4 carbon atoms, more preferably methyl. The process is carried out at a temperature of about −100° C. to about +100° C., preferably about 0° C. to about 50° C. It is preferred to exclude water and other hydroxyl containing compounds from the process, and this may be done by purification of the ingredients and keeping the process mass under an inert gas such as nitrogen.

Alternatively, (IV) may be prepared by reacting (I), wherein Q is alkyl and S' is Cl, Br or I with a source of an appropriate weakly coordinating anion such as AgX or an alkali metal salt of BAF and an acrylate ester (formula as immediately above) in a single step. Approximately equimolar quantities of (I) and the weakly coordinating anion source are preferred, but the acrylate ester may be present in greater than 1 to 50 fold excess. In a preferred reaction, Q is methyl, and $R^1$ is alkyl containing 1 to 4 carbon atoms, more preferably methyl. The process is preferably carried out at a temperature of about −100° C. to about +100° C., preferably about 0° C. to about 50° C. It is preferred to exclude water and other hydroxyl containing compounds from the process, and this may be done by purification of the ingredients and keeping the process mass under an inert gas such as nitrogen.

In another variation of the preparation of (IV) from (I) the source of the weakly coordinating anion is a compound which itself does not contain an anion, but which can combine with S' [of (I)] to form such a weakly coordinating anion. Thus in this type of process by "source of weakly coordinating anion" is meant a compound which itself contains the anion which will become X⁻, or a compound which during the process can combine with other process ingredients to form such an anion.

Catalysts of formula (V), wherein $X^-$ is $BAF^-$, may be made by reacting a compound of formula (I) wherein Q is alkyl and S' is halogen, with about one-half of an equivalent of an alkali metal salt, particularly the sodium salt, of HBAF. Alternatively, (V) containing other anions may be prepared by reacting (I), wherein Q is alkyl and S' is Cl, Br or I with one-half equivalent of a source of an appropriate weakly coordinating anion such as AgX.

Some of the nickel and palladium compounds described above are useful in processes for polymerizing various olefins, and optionally also copolymerizing olefinic esters, carboxylic acids, or other functional olefins, with these olefins. When (I) is used as a catalyst, a neutral Lewis acid or a cationic Lewis or Bronsted acid whose counterion is a weakly coordinating anion is also present as part of the catalyst system (sometimes called a "first compound" in the claims). By a "neutral Lewis acid" is meant a compound which is a Lewis acid capable for abstracting $Q^-$ or $S'^-$ from (I) to form a weakly coordination anion. The neutral Lewis acid is originally uncharged (i.e., not ionic). Suitable neutral Lewis acids include $SbF_5$, $Ar_3B$ (wherein Ar is aryl), and $BF_3$. By a cationic Lewis acid is meant a cation with a positive charge such as $Ag^+$, $H^+$, and $Na^+$.

In those instances in which (I) (and similar catalysts which require the presence of a neutral Lewis acid or a cationic Lewis or Bronsted acid), does not contain an alkyl or hydride group already bonded to the metal (i.e., neither Q or S' is alkyl or hydride), the neutral Lewis acid or a cationic Lewis or Bronsted acid also alkylates or adds a hydride to the metal, i.e., causes an alkyl group or hydride to become bonded to the metal atom.

A preferred neutral Lewis acid, which can alkylate the metal, is a selected alkyl aluminum compound, such as $R^9{}_3Al$, $R^9{}_2AlCl$, $R^9AlCl_2$, and "$R^9AlO$" (alkylaluminoxanes), wherein $R^9$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $C_2H_5AlCl_2$, and $[(CH_3)_2CHCH_2]_3Al$.

Metal hydrides such as $NaBH_4$ may be used to bond hydride groups to the metal M.

The first compound and (I) are contacted, usually in the liquid phase, and in the presence of the olefin, and/or 4-vinylcyclohexene, cyclopentene, cyclobutene, substituted norbornene, or norbornene. The liquid phase may include a compound added just as a solvent and/or may include the monomer(s) itself. The molar ratio of first compound:nickel or palladium complex is about 5 to about 1000, preferably about 10 to about 100. The temperature at which the polymerization is carried out is about −100° C. to about +200° C., preferably about −20° C. to about +80° C. The pressure at which the polymerization is carried out is not critical, atmospheric pressure to about 275 MPa, or more, being a suitable range. The pressure may affect the microstructure of the polyolefin produced (see below).

When using (I) as a catalyst, it is preferred that $R^3$ and $R^4$ are hydrogen, methyl, or taken together are

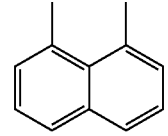

(An)

It is also preferred that both $R^2$ and $R^5$ are 2,6-diisopropylphenyl, 2,6-dimethylphenyl, 2,6-diethylphenyl, 4-methylphenyl, phenyl, 2,4,6-trimethylphenyl, and 2-t-butylphenyl. When M is Ni(II), it is preferred that Q and S' are each independently chloride or bromide, while when M is Pd(II) it is preferred that Q is methyl, chloride, or bromide, and S' is chloride, bromide or methyl. In addition, the specific combinations of groups in the catalysts listed in Table I are especially preferred.

TABLE I

| $R^2$ | $R^3$ | $R^4$ | $R^5$ | Q | S' | M |
|---|---|---|---|---|---|---|
| 2,6-i-PrPh | H | H | 2,6-i-PrPh | Me | Cl | Pd |
| 2,6-i-PrPh | Me | Me | 2,6-i-PrPh | Me | Cl | Pd |
| 2,6-i-PrPh | An | An | 2,6-i-PrPh | Me | Cl | Pd |
| 2,6-MePh | H | H | 2,6-MePh | Me | Cl | Pd |
| 4-MePh | H | H | 4-MePh | Me | Cl | Pd |
| 4-MePh | Me | Me | 4-MePh | Me | Cl | Pd |
| 2,6-i-PrPh | Me | Me | 2,6-i-PrPh | Me | Me | Pd |
| 2,6-i-PrPh | H | H | 2,6-i-PrPh | Me | Me | Pd |
| 2,6-MePh | H | H | 2,6-MePh | Me | Me | Pd |
| 2,6-i-PrPh | H | H | 2,6-i-PrPh | Br | Br | Ni |
| 2,6-i-PrPh | Me | Me | 2,6-i-PrPh | Br | Br | Ni |
| 2,6-MePh | H | H | 2,6-MePh | Br | Br | Ni |
| Ph | Me | Me | Ph | Me | Cl | Pd |
| 2,6-EtPh | Me | Me | 2,6-EtPh | Me | Cl | Pd |
| 2,4,6-MePh | Me | Me | 2,4,6-MePh | Me | Cl | Pd |
| 2,6-MePh | Me | Me | 2,6-MePh | Br | Br | Ni |
| 2,6-i-PrPh | An | An | 2,6-i-PrPh | Br | Br | Ni |
| 2,6-MePh | An | An | 2,6-MePh | Br | Br | Ni |
| 2-t-BuPh | An | An | 2-t-BuPh | Br | Br | Ni |
| 2,5-t-BuPh | An | An | 2,5-t-BuPh | Br | Br | Ni |
| 2-i-Pr-6-MePh | An | An | 2-i-Pr-6-MePh | Br | Br | Ni |
| 2-i-Pr-6-MePh | Me | Me | 2-i-Pr-6-MePh | Br | Br | Ni |
| 2,6-t-BuPh | H | H | 2,6-t-BuPh | Br | Br | Ni |
| 2,6-t-BuPh | Me | Me | 2,6-t-BuPh | Br | Br | Ni |
| 2,6-t-BuPh | An | An | 2,6-t-BuPh | Br | Br | Ni |
| 2-t-BuPh | Me | Me | 2-t-BuPh | Br | Br | Ni |

Note - In Tables I and II, and elsewhere herein, the following convention and abbreviations are used. For $R^2$ and $R^5$, when a substituted phenyl ring is present, the amount of substitution is indicated by the number of numbers indicating positions on the phenyl ring, so that, for example, 2,6-i-PrPh is 2,6-diisopropylphenyl. The following abbreviations are used: i-Pr isopropyl; Me = methyl; Et = ethyl; t-Bu = t-butyl; Ph = phenyl; Np = naphthyl; An = 1,8-naphthylylene (a divalent radical used for both $R^3$ and $R^4$, wherein $R^3$ and $R^4$ taken together form a ring, which is part of an acenaphthylene group); OTf = triflate; and BAF = tetrakis [3,5-bis(trifluoromethyl)phenyl]borate.

Preferred olefins in the polymerization are one or more of ethylene, propylene, 1-butene, 2-butene, 1-hexene 1-octene, 1-pentene, 1-tetradecene, norbornene, and cyclopentene, with ethylene, propylene and cyclopentene being more preferred. Ethylene (alone as a homopolymer) is especially preferred.

The polymerizations with (I) may be run in the presence of various liquids, particularly aprotic organic liquids. The catalyst system, monomer(s), and polymer may be soluble or insoluble in these liquids, but obviously these liquids should not prevent the polymerization from occurring. Suitable liquids include alkanes, cycloalkanes, selected halogenated hydrocarbons, and aromatic hydrocarbons. Specific useful solvents include hexane, toluene and benzene.

Whether such a liquid is used, and which and how much liquid is used, may affect the product obtained. It may affect the yield, microstructure, molecular weight, etc., of the polymer obtained.

Compounds of formulas (XI), (XIII), (XV) and (XIX) may also be used as catalysts for the polymerization of the same monomers as compounds of formula (I). The polymerization conditions are the same for (XI), (XIII), (XV) and (XIX) as for (I), and the same Lewis and Bronsted acids are used as co-catalysts. Preferred groupings $R^2$, $R^3$, $R^4$, and $R^5$ (when present) in (XI) and (XIII) are the same as in (I), both in a polymerization process and as compounds in their own right.

Preferred (XI) compounds have the metals Sc(III), Zr(IV), Ni(II), Ni(I), Pd(II), Fe(II), and Co(II). When M is Zr, Ti, Fe, and Sc it is preferred that all of Q and S' are chlorine or bromine more preferably chlorine. When M is Ni or Co it is preferred that all of Q and S' are chlorine, bromine or iodine, more preferably bromine.

In (XVII) preferred metals are NI(II) and Ti(IV). It is preferred that all of Q and S' are halogen. It is also preferred that all of $R^{28}$, $R^{29}$, and $R^{30}$ are hydrogen, and/or that both $R^{44}$ and $R^{45}$ are 2,4,6-trimethylphenyl or 9-anthracenyl.

In (XV) it is preferred that both of $R^{31}$ are hydrogen.

In (XIII), (XXIII) and (XXXII) (as polymerization catalysts and as novel compounds) it is preferred that all of $R^{20}$, $R^{21}$, $R^{22}$ and $R^{23}$ are methyl. It is also preferred that $T^1$ and $T^2$ are methyl. For (XIII), when M is Ni(I) or (II), it is preferred that both Q and S' are bromine, while when M is Pd it is preferred that Q is methyl and S' is chlorine.

Compounds (II), (IV) or (VII) will each also cause the polymerization of one or more of an olefin, and/or a selected cyclic olefin such as cyclobutene, cyclopentene or norbornene, and, when it is a Pd(II) complex, optionally copolymerize an ester or carboxylic acid of the formula $CH_2=CH(CH_2)_mCO_2R^1$, wherein m is 0 or an integer of 1 to 16 and $R^1$ is hydrogen or hydrocarbyl or substituted hydrocarbyl, by themselves (without cocatalysts). However, (III) often cannot be used when the ester is present. When norbornene or substituted norbornene is present no other monomer should be present.

Other monomers which may be used with compounds (II), (IV) or (VII) (when it is a Pd(II) complex) to form copolymers with olefins and selected cycloolefins are carbon monoxide (CO), and vinyl ketones of the general formula $H_2C=CHC(O)R^{25}$, wherein $R^{25}$ is alkyl containing 1 to 20 carbon atoms, and it is preferred that $R^{25}$ is methyl. In the case of the vinyl ketones, the same compositional limits on the polymers produced apply as for the carboxylic acids and esters described as comonomers in the immediately preceding paragraph.

CO forms alternating copolymers with the various olefins and cycloolefins which may be polymerized with compounds (II), (IV) or (VII). The polymerization to form the alternating copolymers is done with both CO and the olefin simultaneously in the process mixture, and available to the catalyst. It is also possible to form block copolymers containing the alternating CO/(cyclo)olefin copolymers and other blocks containing just that olefin or other olefins or mixtures thereof. This may be done simply by sequentially exposing compounds (II), (IV) or (VII), and their subsequent living polymers, to the appropriate monomer or mixture of monomers to form the desired blocks. Copolymers of CO, a (cyclo)olefin and a saturated carboxylic acid or ester of the formula $CH_2=CH(CH_2)_mCO_2R^1$, wherein m is 0 or an integer of 1 to 16 and $R^1$ is hydrogen or hydrocarbyl or substituted hydrocarbyl, may also be made by simultaneously exposing the polymerization catalyst or living polymer to these 3 types of monomers.

The polymerizations may be carried out with (II), (III), (IV) or (VII), and other catalyst molecules or combinations, initially in the solid state [assuming (II), (III) (IV) or (VII) is a solid] or in solution. The olefin and/or cycloolefin may be in the gas or liquid state (including gas dissolved in a solvent). A liquid, which may or may not be a solvent for any or all of the reactants and/or products may also be present. Suitable liquids include alkanes, cycloalkanes, halogenated alkanes and cycloalkanes, ethers, water, and alcohols, except that when (III) is used, hydrocarbons should preferably be used as solvents. Specific useful solvents include methylene chloride, hexane, $CO_2$, chloroform, perfluoro(n-butyltetrahydrofuran) (herein sometimes called FC-75), toluene, dichlorobenzene, 2-ethylhexanrol, and benzene.

It is particularly noteworthy that one of the liquids which can be used in this polymerization process with (II), (III), (IV) or (VII) is water, see for instance Examples 213–216. Not only can water be present but the polymerization "medium" may be largely water, and various types of surfactants may be employed so that an emulsion polymerization may be done, along with a suspension polymerization when surfactants are not employed.

Preferred olefins and cycloolefins in the polymerization using (II), (III) or (IV) are one or more of ethylene, propylene, 1-butene, 1-hexene, 1-octene, 1-butene, cyclopentene, 1-tetradecene, and norbornene; and ethylene, propylene and cyclopentene are more preferred. Ethylene alone is especially preferred.

Olefinic esters or carboxylic acids of the formula $CH_2=CH(CH_2)_mCO_2R^1$, wherein $R^1$ is hydrogen, hydrocarbyl, or substituted hydrocarbyl, and m is 0 or an integer of 1 to 16. It is preferred if $R^1$ hydrocarbyl or substituted hydrocarbyl and it is more preferred if it is alkyl containing 1 to 10 carbon atoms, or glycidyl. It is also preferred if m is 0 and/or $R^1$ is alkyl containing 1 to 10 carbon atoms. It is preferred to make copolymers containing up to about 60 mole percent, preferably up to about 20 mole percent of repeat units derived from the olefinic ester or carboxylic acid. Total repeat unit units in the polymer herein refer not only to those in the main chain from each monomer unit, but those in branches or side chains as well.

When using (II), (III), (IV) or (VII) as a catalyst it is preferred that $R^3$ and $R^4$ are hydrogen, methyl, or taken together are (An)

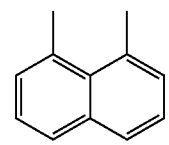

It is also preferred that both $R^2$ and $R^5$ are 2,6-diisopropylphenyl, 2,6-dimethylphenyl, 4-methylphenyl, phenyl, 2,6-diethylphenyl, 2,4,6-trimethylphenyl and 2-t-butylphenyl. When (II) is used, it is preferred that $T^1$ is methyl, $R^5$ is methyl or ethyl and $R^7$ is methyl. When (III) is used it is preferred that $T^1$ is methyl and said Lewis base is $R^6{}_2O$, wherein $R^6$ is methyl or ethyl. Whit is preferred that $R^8$ is methyl, n is 3 and $R^{16}$ is hydrogen. In addition in Table II are listed all particularly preferred combinations as catalysts for (II), (III), (IV) and (VII). en (IV) is used

TABLE II

| Compound Type | R² | R³ | R⁴ | R⁵ | T¹/T²/R⁸ | Z | M | X |
|---|---|---|---|---|---|---|---|---|
| (II) | 2,6-i-PrPh | Me | Me | 2,6-i-PrPh | Me | OEt₂ | Pd | BAF |
| (II) | 2,6-i-PrPh | H | H | 2,6-i-PrPh | Me | OEt₂ | Pd | BAF |
| (III) | 2,6-i-PrPh | Me | Me | 2,6-i-PrPh | Me | OEt₂ | Ni | BAF |
| (III) | 2,6-i-PrPh | H | H | 2,6-i-PrPh | Me | OEt₂ | Ni | BAF |
| (II) | 2,6-MePh | H | H | 2,6-MePh | Me | OEt₂ | Pd | BAF |
| (II) | 2,6-MePh | Me | Me | 2,6-MePh | Me | OEt₂ | Pd | BAF |
| (II) | 2,6-i-PrPh | Me | Me | 2,6-i-PrPh | Me | OEt₂ | Pd | SbF₆ |
| (II) | 2,6-i-PrPh | Me | Me | 2,6-i-PrPh | Me | OEt₂ | Pd | BF₄ |
| (II) | 2,6-i-PrPh | Me | Me | 2,6-i-PrPh | Me | OEt₂ | Pd | PF₆ |
| (II) | 2,6-i-PrPh | H | H | 2,6-i-PrPh | Me | OEt₂ | Pd | SbF₆ |
| (II) | 2,4,6-MePh | Me | Me | 2,4,6-MePh | Me | OEt₂ | Pd | SbF₆ |
| (II) | 2,6-i-PrPh | An | An | 2,6-i-PrPh | Me | OEt₂ | Pd | SbF₆ |
| (II) | 2,6-i-PrPh | Me | Me | 2,6-i-PrPh | Me | NCMe | Pd | SbF₆ |
| (II) | Ph | Me | Me | Ph | Me | NCMe | Pd | SbF₆ |
| (II) | 2,6-EtPh | Me | Me | 2,6-EtPh | Me | NCMe | Pd | BAF |
| (II) | 2,6-EtPh | Me | Me | 2,6-EtPh | Me | NCMe | Pd | SbF₆ |
| (II) | 2-t-BuPh | Me | Me | 2-t-BuPh | Me | NCMe | Pd | SbF₆ |
| (II) | 1-Np | Me | Me | 1-Np | Me | NCMe | Pd | SbF₆ |
| (II) | Ph₂CH | H | H | Ph₂CH | Me | NCMe | Pd | SbF₆ |
| (II) | 2-PhPh | Me | Me | 2-PhPh | Me | NCMe | Pd | SbF₆ |
| (II) | Ph | a | a | Ph | Me | NCMe | Pd | BAF |
| (IV) | 2,6-i-PrPh | Me | Me | 2,6-i-PrPh | Me | b | Pd | SbF₆ |
| (IV) | 2,6-i-PrPh | Me | Me | 2,6-i-PrPh | Me | b | Pd | BAF |
| (IV) | 2,6-i-PrPh | H | H | 2,6-i-PrPh | Me | b | Pd | SbF₆ |
| (IV) | 2,6-i-PrPh | Me | Me | 2,6-i-PrPh | Me | b | Pd | B(C₆F₅)₃Cl |
| (II) | Ph | Me | Me | Ph | Me | NCMe | Pd | SbF₆ |
| (VII) | 2,6-i-PrPh | Me | Me | 2,6-i-PrPh | Me | — | Pd | OTf |
| (II) | Ph | Ph | Ph | Ph | Me | NCMe | Pd | BAF |
| (II) | Ph₂CH | H | H | Ph₂CH | Me | NCMe | Pd | SbF₆ |

ᵃThis group is —CMe₂CH₂CMe₂—
ᵇThis group is —(CH₂)₃CO₂Me

When using (II), (III), (IV) or (VII) the temperature at which the polymerization is carried out is about −100° C. to about +200° C., preferably about 0° C. to about 150° C., more preferably about 25° C. to about 100° C. The pressure at which the polymerization is carried out is not critical, atmospheric pressure to about 275 MPa being a suitable range. The pressure can affect the microstructure of the polyolefin produced (see below).

Catalysts of the formulas (II), (III), (IV) and (VII) may also be supported on a solid catalyst (as opposed to just being added as a solid or in solution), for instance on silica gel (see Example 98). By supported is meant that the catalyst may simply be carried physically on the surface of the solid support, may be adsorbed, or carried by the support by other means.

When using (XXX) as a ligand or in any process or reaction herein it is preferred that n is 2, all of $R^{30}$, $R^{28}$ and $R^{29}$ are hydrogen, and both of $R^{44}$ and $R^{45}$ are 9-anthracenyl.

Another polymerization process comprises contacting a compound of the formula $[Pd(R^{13}CN)_4]X_2$ or a combination of $Pd[OC(O)R^{40}]_2$ and HX, with a compound of the formula

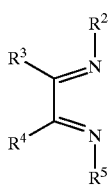

(VIII)

and one or more monomers selected from the group consisting of ethylene, an olefin of the formula $R^{17}CH=CH_2$ or R$^{17}$CH=CHR$^{17}$, cyclopentene, cyclobutene, substituted norbornene and norbornene, wherein: R$^2$ and R$^5$ are each independently hydrocarbyl or substituted hydrocarbyl, provided that the carbon atom bound to the imino nitrogen atom has at least two carbon atoms bound to it; R$^3$ and R$^4$ are each independently hydrogen, hydrocarbyl, substituted hydrocarbyl or R$^3$ and R$^4$ taken together are hydrocarbylene or substituted hydrocarbylene to form a carbocyclic ring; each R$^{17}$ is independently hydrocarbyl or substituted hydrocarbyl provided that R$^{17}$ contains no olefinic bonds; R$^{40}$ is hydrocarbyl or substituted hydrocarbyl; and X is a weakly coordinating anion; provided that when norbornene or substituted norbornene is present no other monomer is present.

It is believed that in this process a catalyst similar to (II) may be initially generated, and this then causes the polymerization. Therefore, all of the conditions, monomers (including olefinic esters and carboxylic acids), etc., which are applicable to the process using (II) as a polymerization catalyst are applicable to this process. All preferred items are also the same, including appropriate groups such as R$^2$, R$^3$, R$^4$, R$^5$, and combinations thereof. This process however should be run so that all of the ingredients can contact each other, preferably in a single phase. Initially at least, it is preferred that this is done in solution. The molar ratio of (VIII) to palladium compound used is not critical, but for most economical use of the compounds, a moderate excess, about 25 to 100% excess, of (VIII) is preferably used.

As mentioned above, it is believed that in the polymerization using (VIII) and [Pd(R$^{13}$CN)$_4$]X$_2$ or a Pd[II] carboxylate a catalyst similar to (II) is formed. Other combinations of starting materials that can combine into catalysts similar to (II), (III), (IV) and (VII) often also cause similar polymerizations, see for instance Examples 238 and 239. Also combinations of α-diimines or other diimino ligands described herein with: a nickel [0] or nickel [I] compound, oxygen, an alkyl aluminum compound and an olefin; a nickel [0] or nickel [I] compound, an acid such as HX and an olefin; or an α-diimine Ni[0] or nickel [I] complex, oxygen, an alkyl aluminum compound and an olefin. Thus active catalysts from α-diimines and other bidentate imino compounds can be formed beforehand or in the same "pot" (in situ) in which the polymerization takes place. In all of the polymerizations in which the catalysts are formed in situ, preferred groups on the α-diimines are the same as for the preformed catalysts.

In general Ni[0], Ni[I] or Ni(II) compounds may be used as precursors to active catalyst species. They must have ligands which can be displaced by the appropriate bidentate nitrogen ligand, or must already contain such a bidentate ligand already bound to the nickel atom. Ligands which may be displaced include 1,5-cyclooctadiene and tris(o-tolyl) phosphite, which may be present in Ni[0] compounds, or dibenzylideneacetone, as in the useful Pd[0] precursor tris (dibenzylideneacetone)dipalladium[0]. These lower valence nickel compounds are believed to be converted into active Ni[II] catalytic species. As such they must also be contacted (react with) with an oxidizing agent and a source of a weakly coordinating anion (X$^-$). Oxidizing agents include oxygen, HX (wherein X is a weakly coordinating anion), and other well known oxidizing agents. Sources of X$^-$ include HX, alkylaluminum compounds, alkali metal and silver salts of X$^-$. As can be seen above, some compounds such as HX may act as both an oxidizing agent and a source of X$^-$. Compounds containing other lower valent metals may be converted into active catalyst species by similar methods.

When contacted with an alkyl aluminum compound or HX useful Ni[0] compounds include

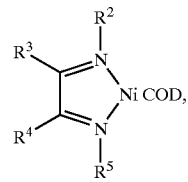
(XXXIII)

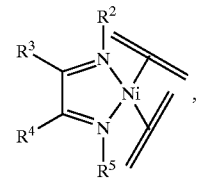
(XXXXII)

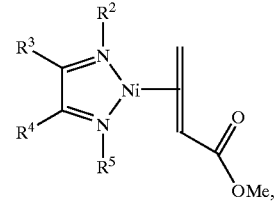
(XXXXIII)

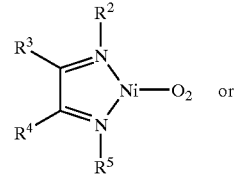
(XXXXIV)

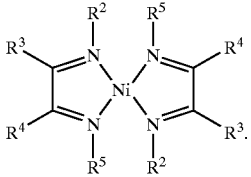
(XXXXV)

Various types of Ni[0] compounds are known in the literature. Below are listed references for the types shown immediately above.

(XXXIII) G. van Koten, et al., Adv. Organometal. Chem., vol. 21, p. 151–239 (1982).

(XXXXII) W. Bonrath, et al., Angew. Chem. Int. Ed. Engl., vol. 29, p. 298–300 (1990).

(XXXXIV) H. tom Dieck, et al., Z. Natruforsch., vol. 366, p. 823–832 (1981); and M. Svoboda, et al., J. Organometal. Chem., vol. 191, p. 321–328 (1980).

(XXXXV) G. van Koten, et al., Adv. Organometal. Chem., vol. 21, p. 151–239 (1982).

In polymerizations using (XIV), the same preferred monomers and groups (such as R$^2$, R$^3$, R$^4$, R$^5$ and X) as are preferred for the polymerization using (II) are used and preferred. Likewise, the conditions used and preferred for polymerizations with (XIV) are similar to those used and preferred for (II), except that higher olefin pressures (when the olefin is a gas) are preferred. Preferred pressures are about 2.0 to about 20 MPa. (XIV) may be prepared by the reaction of one mole of [Pd(R$^{13}$CN)$_4$]X$_2$ with one mole of (VIII) in acetonitrile or nitromethane.

Novel compound (XIV) is used as an olefin polymerization catalyst. In preferred forms of (XIV), the preferred groups R$^2$, R$^3$, R$^4$, R$^5$ and X are the same as are preferred for compound (II).

Another type of compound which is an olefin polymerization catalyst are π-allyl and π-benzyl compounds of the formula

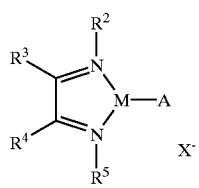

XXXVII wherein M is Ni(II) or Pd(II); $R^2$ and $R^5$ are hydrocarbyl or substituted hydrocarbyl, provided that the carbon atom bound directly to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; X is a weakly coordinating anion; and A is a π-allyl or π-benzyl group. By a π-allyl group is meant a monoanionic with 3 adjacent $sp^2$ carbon atoms bound to a metal-center in an $\eta^3$ fashion. The three $sp^2$ carbon atoms may be substituted with other hydrocarbyl groups or functional groups. Typical π-allyl groups include

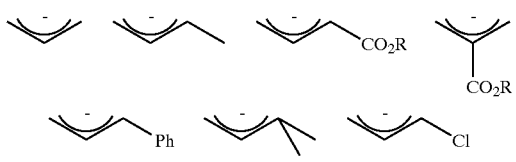

wherein R is hydrocarbyl. By a π-benzyl group is meant π-allyl ligand in which two of the $sp^2$ carbon atoms are part of an aromatic ring. Typical π-benzyl groups include

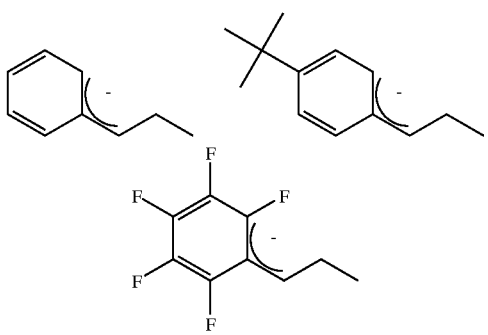

π-Benzyl compounds usually initiate polymerization of the olefins fairly readily even at room temperature, but π-allyl compounds may not necessarily do so. Initiation of π-allyl compounds can be improved by using one or more of the following methods:

Using a higher temperature such as about 80° C.

Decreasing the bulk of the α-diimine ligand, such as $R^2$ and $R^5$ being 2,6-dimethylphenyl instead of 2,6-diisopropylphenyl.

Making the π-allyl ligand more bulky, such as using

rather than the simple π-allyl group itself.

Having a Lewis acid present while using a functional π-allyl or π-benzyl group. Relatively weak Lewis acids such a triphenylborane, tris(pentafluorophenyl)borane, and tris(3,5-trifluoromethylphenyl)borane, are preferred. Suitable functional groups include chloro and ester. "Solid" acids such as montmorillonite may also be used.

When using (XXXVII) as a polymerization catalyst, it is preferred that ethylene and/or a linear α-olefin is the monomer, or cyclopentene, more preferred if the monomer is ethylene and/or propylene, and ethylene is especially preferred. A preferred temperature for the polymerization process using (XXXVII) is about +20° C. to about 100° C. It is also preferred that the partial pressure due to ethylene or propylene monomer is at least about 600 kPa. It is also noted that (XXXVII) is a novel compound, and preferred items for (XXXVII) for the polymerization process are also preferred for the compound itself.

Another catalyst for the polymerization of olefins is a compound of the formula

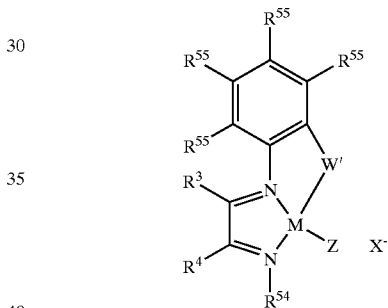

(XXXVIII)

and one or more monomers selected from the group consisting of ethylene, an olefin of the formula $R^{17}CH=CH_2$; or $R^{17}CH=CHR^{17}$, cyclobutene, cyclopentene, substituted norbornene, and norbornene, wherein: $R^3$ and $R^4$ are each independently hydrogen, hydrocarbyl, substituted hydrocarbyl or $R^3$ and $R^4$ taken together are hydrocarbylene or substituted hydrocarbylene to form a ring; $R^{54}$ is hydrocarbyl or substituted hydrocarbyl, provided that the carbon atom bound directly to the imino nitrogen atom has at least two carbon atoms bound to it; each $R^{55}$ is independently hydrogen, hydrocarbyl, substituted hydrocarbyl, or a functional group; W' is alkylene or substituted alkylene containing 2 or more carbon atoms; Z is a neutral Lewis base wherein the donating atom is nitrogen, sulfur, or oxygen, provided that if the donating atom is nitrogen then the pKa of the conjugate acid of that compound (measured in water) is less than about 6, or an olefin of the formula $R^{17}CH=CHR^{17}$; each $R^{17}$ is independently alkyl or substituted alkyl; and X is a weakly coordinating anion. It is preferred that in compound (XXXVIII) that: $R^{54}$ is phenyl or substituted phenyl, and preferred substituents are alkyl groups; each $R^{55}$ is independently hydrogen or alkyl containing 1 to 10 carbon atoms; W' contains 2 carbon atoms between the phenyl ring and metal atom it is bonded to or W' is a divalent polymeric group derived from the polymerization of $R^{17}CH=CHR^{17}$, and it is especially preferred that it is $-CH(CH_3)CH_2-$ or $-C(CH_3)_2CH_2-$; and Z is a dialkyl ether or an olefin of the formula $R^{17}CH=CHR^{17}$; and combinations thereof. W' is an alkylene group in which each of the two free valencies are to different carbon atoms of the alkylene group.

When W' is a divalent group formed by the polymerization of $R^{17}CH=CHR^{17}$, and Z is $R^{17}CH=CHR^{17}$, the compound (XXXVIII) is believed to be a living ended polymer. That end of W' bound to the phenyl ring actually is the original fragment from $R^{56}$ from which the "bridge" W' originally formed, and the remaining part of W' is formed from the olefin(s) $R^{17}CH=CHR^{17}$. In a sense this compound is similar in function to compound (VI).

By substituted phenyl in (XXXVIII) and (XXXIX) is meant the phenyl ring can be substituted with any grouping which does not interfere with the compound's stability or any of the reactions the compound undergoes. Preferred substituents in substituted phenyl are alkyl groups, preferably containing 1 to 10 carbon atoms.

Preferred monomers for this polymerization are ethylene and linear α-olefins, or cyclopentene, particularly propylene, and ethylene and propylene or both are more preferred, and ethylene is especially preferred.

It is noted that (XXXVIII) is a novel compound, and preferred compounds and groupings are the same as in the polymerization process.

Compound (XXXVIII) can be made by heating compound (XXXIX),

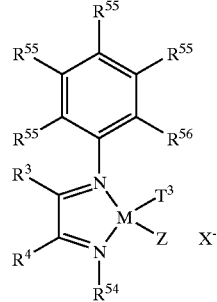

(XXXIX)

wherein: $R^3$ and $R^4$ are each independently hydrogen, hydrocarbyl, substituted hydrocarbyl or $R^3$ and $R^4$ taken together are hydrocarbylene or substituted hydrocarbylene to form a ring; $R^{54}$ is hydrocarbyl or substituted hydrocarbyl, provided that the carbon atom bound directly to the imino nitrogen atom has at least two carbon atoms bound to it; each $R^{55}$ is independently hydrogen, hydrocarbyl, substituted hydrocarbyl, or a functional group; $R^{56}$ is alkyl containing 2 to 30 carbon atoms; $T^3$ is alkyl; Z is a neutral Lewis base wherein the donating atom is nitrogen, sulfur, or oxygen, provided that if the donating atom is nitrogen then the pKa of the conjugate acid of that compound (measured in water) is less than about 6; and X is a weakly coordinating anion. Preferred groups are the same as those in (XXXVIII). In addition it is preferred that $T^5$ contain 1 to 10 carbon atoms, and more preferred that it is methyl. A preferred temperature for the conversion of (XXXIX) to (XXXVIII) is about −30° C. to about 50° C. Typically the reaction takes about 10 min. to about 5 days, the higher the temperature, the faster the reaction. Another factor which affects the reaction rate is the nature of Z. The weaker the Lewis basicity of Z, the faster the desired reaction will be.

When (II), (III), (IV), (V), (VII), (VIII) or a combination of compounds that will generate similar compounds, (subject to the conditions described above) is used in the polymerization of olefins, cyclolefins, and optionally olefinic esters or carboxylic acids, polymer having what is believed to be similar to a "living end" is formed. This molecule is that from which the polymer grows to its eventual molecular weight. This compound may have the structure

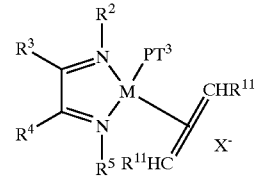

(VI)

wherein: M is Ni(II) or Pd(II); $R^2$ and $R^5$ are hydrocarbyl or substituted hydrocarbyl, provided that the carbon atom bound directly to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; each $R^{11}$ is independently hydrogen, alkyl or $-(CH_2)_mCO_2R^1$; $T^3$ is hydrogen, hydrocarbyl not containing olefinic or acetylenic bonds, $R^{15}(C=O)-$, $R^{15}O(C=O)-$, or $-CH_2CH_2CH_2CO_2R^8$; $R^{15}$ is hydrocarbyl not containing olefinic or acetylenic unsaturation; P is a divalent group containing one or more repeat units derived from the polymerization of one or more of ethylene, an olefin of the formula $R^{17}CH=CH_2$ or $R^{17}CH=CHR^{17}$, cyclobutene, cyclopentene, substituted norbornene, or norbornene and, when M is Pd(II), optionally one or more compounds of the formula $CH_2=CH(CH_2)_mCO_2R^1$; $R^8$ is hydrocarbyl; each $R^{17}$ is independently hydrocarbyl or substituted hydrocarbyl provided that any olefinic bond in said olefin is separated from any other olefinic bond or aromatic ring by a quaternary carbon atom or at least two saturated carbon atoms; m is 0 or an integer from 1 to 16; $R^1$ is hydrogen, or hydrocarbyl or substituted hydrocarbyl containing 1 to 10 carbon atoms; and X is a weakly coordinating anion; and that when M is Ni(II), $R^{11}$ is not $-CO_2R^8$ and when M is Pd a diene is not present. By an "olefinic ester or carboxylic acid" is meant a compound of the formula $CH_2=CH(CH_2)_mCO_2R^1$, wherein m and $R^1$ are as defined immediately above.

This molecule will react with additional monomer (olefin, cyclic olefin, olefinic ester or olefinic carboxylic acid) to cause further polymerization. In other words, the additional monomer will be added to P, extending the length of the polymer chain. Thus P may be of any size, from one "repeat unit" to many repeat units, and when the polymerization is over and P is removed from M, as by hydrolysis, P is essentially the polymer product of the polymerization. Polymerizations with (VI), that is contact of additional monomer with this molecule takes place under the same conditions as described above for the polymerization process using (II), (III), (IV), (V), (VII) or (VIII), or combinations of compounds that will generate similar molecules, and where appropriate preferred conditions and structures are the same.

The group $T^3$ in (VI) was originally the group $T^1$ in (II) or (III), or the group which included $R^8$ in (IV). It in essence will normally be one of the end groups of the eventual polymer product. The olefinic group which is coordinated to M, $R^{11}CH=CHR^{11}$ is normally one of the monomers, olefin, cyclic olefin, or, if Pd(II) is M, an olefinic ester or carboxylic acid. If more than one of these monomers is present in the reaction, it may be any one of them. It is preferred that $T^3$ is alkyl and especially preferred that it is methyl, and it is also preferred that $R^{11}$ is hydrogen or n-alkyl. It is also preferred that M is Pd(II).

Another "form" for the living end is (XVI).

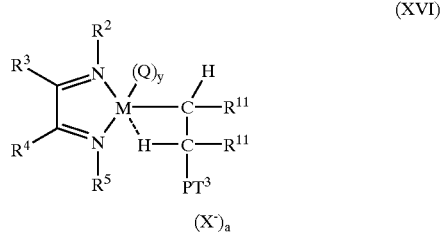

This type of compound is sometimes referred to as a compound in the "agostic state". In fact both (VI) and (XVI) may coexist together in the same polymerization, both types of compound representing living ends. It is believed that (XVI)-type compounds are particularly favored when the end of the growing polymer chain bound to the transition metal is derived from a cyclic olefin such as cyclopentene. Expressed in terms of the structure of (XVI) this is when both of $R^{11}$ are hydrocarbylene to form a carbocyclic ring, and it is preferred that this be a five-membered carbocyclic ring.

For both the polymerization process using (XVI) and the structure of (XVI) itself, the same conditions and groups as are used and preferred for (VI) are also used and preferred for (XVI), with the exception that for $R^{11}$ it is preferred in (XVI) that both of $R^{11}$ are hydrocarbylene to form a carbocyclic ring.

This invention also concerns a compound of the formula

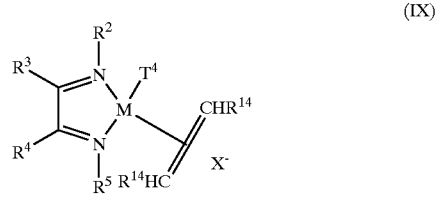

wherein: M is Ni(II) or Pd(II); $R^2$ and $R^5$ are hydrocarbyl or substituted hydrocarbyl, provided that the carbon atom bound directly to the imino nitrogen atom has at least two carbon atoms bound to it; $R^3$ and $R^4$ are each independently hydrogen, hydrocarbyl, substituted hydrocarbyl or $R^3$ and $R^4$ taken together are hydrocarbylene or substituted hydrocarbylene to form a ring; each $R^{14}$ is independently hydrogen, alkyl or [when M is Pd(II)] —(CH$_2$)$_m$CO$_2$R$^1$; $R^1$ is hydrogen, or hydrocarbyl or substituted hydrocarbyl containing 1 to 10 carbon atoms; $T^4$ is alkyl, —R$^{60}$C(O)OR$^8$, R$^{15}$(C=O)— or R$^{15}$OC(=O)—; $R^{15}$ is hydrocarbyl not containing olefinic or acetylenic bonds; $R^{60}$ is alkylene not containing olefinic or acetylenic bonds; $R^8$ is hydrocarbyl; and X is a weakly coordinating anion.

(IX) may be also used to polymerize olefins, cyclic olefins, and optionally olefinic esters and carboxylic acids. The same conditions (except as noted below) apply to the polymerizations using (IX) as they do for (VI). It is preferred that M is Pd(II) and $T^4$ is methyl.

A compound of formula (V) may also be used as a catalyst for the polymerization of olefins, cyclic olefins, and option- ally olefinic esters and/or carboxylic acids. In this process (V) is contacted with one or more of the essential monomers. Optionally a source of a relatively weakly coordinating anion may also be present. Such a source could be an alkali metal salt of BAF or AgX (wherein X is the anion), etc. Preferably about 1 mole of the source of X, such as AgX, will be added per mole of (V). This will usually be done in the liquid phase, preferably in which (V) and the source of the anion are at least partially soluble. The conditions of this polymerization are otherwise the same as described above for (II), (III), (IV) and (VII), including the preferred conditions and ingredients.

In polymerizations using (XX) as the catalyst, a first compound which is a source of a relatively noncoordinating monoanion is present. Such a source can be an alkali metal or silver salt of the monoanion.

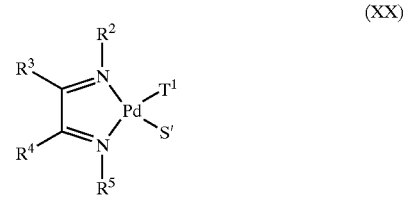

It is preferred that the alkali metal cation is sodium or potassium. It is preferred that the monoanion is SbF$_6^-$, BAF, PF$_6^-$, or BF$_4^-$, and more preferred that it is BAF. It is preferred that $T^1$ is methyl and/or S' is chlorine. All other preferred groups and conditions for these polymerizations are the same as for polymerizations with (II).

In all of the above polymerizations, and the catalysts for making them it is preferred that $R^2$ and $R^5$, if present, are 2,6-diisopropylphenyl and $R^3$ and $R^4$ are hydrogen or methyl. When cyclopentene is polymerized, is preferred that $R^2$ and $R^5$ (if present) are 2,6-dimethylphenyl or 2,4,6-trimethylphenyl and that $R^3$ and $R^4$ taken together are An. $R^2$, $R^3$, $R^4$ and $R^5$ and other groups herein may also be substituted hydrocarbyl. As previously defined, the substituent groups in substituted hydrocarbyl groups (there may be one or more substituent groups) should not substantially interfere with the polymerization or other reactions that the compound is undergoing. Whether a particular group will interfere can first be judged from the artisans general knowledge and the particular polymerization or other reaction that is involved. For instance, in polymerizations where an alkyl aluminum compound is used may not be compatible with the presence of groups containing an active (relatively acidic) hydrogen atom, such as hydroxyl or carboxyl because of the known reaction of alkyl aluminum compounds with such active hydrogen containing groups (but such polymerizations may be possible if enough "extra" alkyl aluminum compound is added to react with these groups). However, in very similar polymerizations where alkyl aluminum compounds are not present, these groups containing active hydrogen may be present. Indeed many of the polymerization processes described herein are remarkably tolerant to the presence of various functional groups. Probably the most important considerations as to the operability of compounds containing any particular functional group are the effect of the group on the coordination of the metal atom (if present), and side reaction of the group with other process ingredients (such as noted above). Therefore of course, the further away from the metal atom the functional group is, the less likely it is to influence, say, a polymerization. If there is doubt as to whether a particular functional group, in a particular position, will affect a reaction, simple minimal experimentation will provide the requisite answer. Functional groups which may be present in $R^2$, $R^3$, $R^4$, $R^5$, and other similar radicals herein include hydroxy, halo (fluoro, chloro, bromo and iodo), ether, ester, dialkylamino, carboxy, oxo (keto and aldehyo), nitro, amide, thioether, and imino. Preferred functional groups are hydroxy, halo, ether and dialkylamino.

Also in all of the polymerizations, the (cyclo)olefin may be substituted hydrocarbyl. Suitable substituents include ether, keto, aldehyde, ester, carboxylic acid.

In all of the above polymerizations, with the exceptions noted below, the following monomer(s), to produce the corresponding homo- or copolymers, are preferred to be used: ethylene; propylene; ethylene and propylene; ethylene and an α-olefin; an α-olefin; ethylene and an alkyl acrylate, especially methyl acrylate; ethylene and acrylic acid; ethylene and carbon monoxide; ethylene, and carbon monoxide and an acrylate ester or acrylic acid, especially methyl acrylate; propylene and alkyl acrylate, especially methyl acrylate; cyclopentene; cyclopentene and ethylene; cyclopentene and propylene. Monomers which contain a carbonyl group, including esters, carboxylic acids, carbon monoxide, vinyl ketones, etc., can be polymerized with Pd(II) containing catalysts herein, with the exception of those that require the presence of a neutral or cationic Lewis acid or cationic Bronsted acid, which is usually called the "first compound" in claims describing such polymerization processes.

Another useful "monomer" for these polymerization processes is a $C_4$ refinery catalytic cracker stream, which will often contain a mixture of n-butane, isobutane, isobutene, 1-butene, 2-butenes and small amounts of butadiene. This type of stream is referred to herein as a "crude butenes stream". This stream may act as both the monomer source and "solvent" for the polymerization. It is preferred that the concentration of 1- and 2-butenes in the stream be as high as possible, since these are the preferred compounds to be polymerized. The butadiene content should be minimized because it may be a polymerization catalyst poison. The isobutene may have been previously removed for other uses. After being used in the polymerization (during which much or most of the 1-butene would have been polymerized), the butenes stream can be returned to the refinery for further processing.

In many of the these polymerizations certain general trends may be noted, although for all of these trends there are exceptions. These trends (and exceptions) can be gleaned from the Examples.

Pressure of the monomers (especially gaseous monomers such as ethylene) has an effect on the polymerizations in many instances. Higher pressure often affects the polymer microstructure by reducing branching, especially in ethylene containing polymers. This effect is more pronounced for Ni catalysts than Pd catalysts. Under certain conditions higher pressures also seem to give higher productivities and higher molecular weight. When an acrylate is present and a Pd catalyst is used, increasing pressure seems to decrease the acrylate content in the resulting copolymer.

Temperature also affects these polymerizations. Higher temperature usually increases branching with Ni catalysts, but often has little such effect using Pd catalysts. With Ni catalysts, higher temperatures appear to often decrease molecular weight. With Pd catalysts, when acrylates are present, increasing temperature usually increases the acrylate content of the polymer, but also often decreases the productivity and molecular weight of the polymer.

Anions surprisingly also often affect molecular weight of the polymer formed. More highly coordinating anions often give lower molecular weight polymers. Although all of the anions useful herein are relatively weakly coordinating, some are more strongly coordinating than others. The coordinating ability of such anions is known and has been discussed in the literature, see for instance W. Beck., et al., Chem. Rev., vol. 88 p. 1405–1421 (1988), and S'. H. Strauss, Chem. Rev., vol. 93, p. 927–942 (1993), both of which are hereby included by reference. The results found herein in which the molecular weight of the polymer produced is related to the coordinating ability of the anion used, is in line with the coordinating abilities of these anions as described in Beck (p. 1411) and Strauss (p. 932, Table II).

In addition to the "traditional" weakly coordinating anions cited in the paragraph immediately above, heterogeneous anions may also be employed. In these cases, the true nature of the counterion is poorly defined or unknown. Included in this group are MAO, MMAO and related aluminoxanes which do not form true solutions. The resulting counterions are thought to bear anionic aluminate moieties related to those cited in the paragraph immediately above. Polymeric anionic materials such as Nafion polyfluorosulfonic acid can function as non-coordinating counterions. In addition, a wide variety of heterogeneous inorganic materials can be made to function as non-coordinating counterions. Examples would include aluminas, silicas, silica/aluminas, cordierites, clays, $MgCl_2$, and many others utilized as traditional supports for Ziegler-Natta olefin polymerization catalysts. These are generally materials which have Lewis or Bronsted acidity. High surface area is usually desired and often these materials will have been activated through some heating process. Heating may remove excess surface water and change the surface acidity from Bronsted to Lewis type. Materials which are not active in the role may often be made active by surface treatment. For instance, a surface-hydrated silica, zinc oxide or carbon can be treated with an organoaluminum compound to provide the required functionality.

The catalysts described herein can be heterogenized through a variety of means. The heterogeneous anions in the paragraph immediately above will all serve to heterogenize the catalysts. Catalysts can also be heterogenized by exposing them to small quantities of a monomer to encapsulate them in a polymeric material through which additional monomers will diffuse. Another method is to spray-dry the catalyst with its suitable non-coordinating counterion onto a polymeric support. Heterogeneous versions of the catalyst are particularly useful for running gas-phase polymerizations. The catalyst is suitably diluted and dispersed on the surface of the catalyst support to control the heat of polymerization. When applied to fluidized-bed polymerizations, the heterogeneous supports provide a convenient means of catalyst introduction.

Anions have been found to have another unexpected effect. They can effect the amount of incorporation of an acrylic monomer such as an ester into an olefin/acrylic copolymer. For instance it has been found that $SbF_6^-$ anion incorporates more fluorinated alkyl acrylate ester into an ethylene copolymer than BAF anion, see for instance Example 302.

Another item may effect the incorporation of polar monomers such as acrylic esters in olefin copolymers. It has been found that catalysts containing less bulky α-diimines incorporate more of the polar monomer into the polymer (one obtains a polymer with a higher percentage of polar monomer) than a catalyst containing a more bulky α-diimine, particularly when ethylene is the olefin comonomer. For instance, in an α-diimine of formula (VIII), if $R^2$ and $R^5$ are 2,6-dimethylphenyl instead of 2,6-diisopropylphenyl, more acrylic monomer will be incorporated into the polymer. However, another common effect of using a less bulky catalyst is to produce a polymer with lower molecular weight. Therefore one may have to make a compromise between polar monomer content in the polymer and polymer molecular weight.

When an olefinic carboxylic acid is polymerized into the polymer, the polymer will of course contain carboxyl groups. Similarly in an ester containing polymer, some or all of the ester groups may be hydrolyzed to carboxyl groups (and vice versa). The carboxyl groups may be partially or completely converted into salts such as metallic salts. Such polymeric salts are termed ionomers. Ionomers are useful in adhesives, as ionomeric elastomers, and as molding resins. Salts may be made with ions of metals such as Na, K, Zn, Mg, Al, etc. The polymeric salts may be made by methods known to the artisan, for instance reaction of the carboxylic acid containing polymers with various compounds of the metals such as bases (hydroxides, carbonates, etc.) or other compounds, such as acetylacetonates. Novel polymers that contain carboxylic acid groups herein, also form novel ionomers when the carboxylic acid groups are partially or fully converted to carboxylate salts.

When copolymers of an olefinic carboxylic acid or olefinic ester and selected olefins are made, they may be crosslinked by various methods known in the art, depending on the specific monomers used to make the polymer. For instance, carboxyl or ester containing polymers may be crosslinked by reaction with diamines to form-bisamides. Certain functional groups which may be present on the polymer may be induced to react to crosslink the polymer. For instance epoxy groups (which may be present as glycidyl esters) may be crosslinked by reaction of the epoxy groups, see for instance Example 135.

It has also been found that certain fluorinated olefins, some of them containing other functional. groups may be polymerized by nickel and palladium catalysts. Note that these fluorinated olefins are included within the definition of $H_2C=CHR^{17}$, wherein $R^{17}$ can be considered to be substituted hydrocarbyl, the substitution being fluorine and possibly other substituents. Olefins which may be polymerized include $H_2C=CH(CH_2)_aR_fR^{42}$ wherein a is an integer of 2 to 20, $R_f$ is perfluoroalkylene optionally containing one or more ether groups, and $R^{42}$ is fluorine or a functional group. Suitable functional groups include hydrogen, chlorine, bromine or iodine, ester, sulfonic acid ($-SO_3H$), and sulfonyl halide. Preferred groups for $R^{42}$ include fluorine, ester, sulfonic acid, and sulfonyl fluoride. A sulfonic acid group containing monomer does not have to be polymerized directly. It is preferably made by hydrolysis of a sulfonyl halide group already present in an already made polymer. It is preferred that the perfluoroalkylene group contain 2 to 20 carbon atoms and preferred perfluoroalkylene groups are $-(CF_2)_b-$ wherein b is 2 to 20, and $-(CF_2)_dOCF_2CF_2-$ wherein d is 2 to 20. A preferred olefinic comonomer is ethylene or a linear α-olefin, and ethylene is especially preferred. Polymerizations may be carried out with many of the catalysts described herein, see Examples 284 to 293.

As described herein, the resulting fluorinated polymers often don't contain the expected amount of branching, and/or the lengths of the branches present are not those expected for a simple vinyl polymerization.

The resulting polymers may be useful for compatibilizing fluorinated and nonfluorinated polymers, for changing the surface characteristics of fluorinated or nonfluorinated polymers (by being mixed with them), as molding resins, etc.

Those polymers containing functional groups may be useful where those functional groups may react or be catalysts. For instance, if a polymer is made with a sulfonyl fluoride group ($R^{42}$ is sulfonyl fluoride) that group may be hydrolyzed to a sulfonic acid, which being highly fluorinated is well known to be a very strong acid. Thus the polymer may be used as an acid catalyst, for example for the polymerization of cyclic ethers such as tetrahydrofuran.

In this use it has been found that this polymer is more effective than a completely fluorinated sulfonic acid containing polymer. For such uses the sulfonic acid content need not be high, say only 1 to 20 mole percent, preferably about 2 to 10 mole percent of the repeat units in the polymer having sulfonic acid groups. The polymer may be crosslinked, in which case it may be soluble in the medium (for instance tetrahydrofuran), or it may be crosslinked so it swollen but not dissolved by the medium, or it may be coated onto a substrate and optionally chemically attached and/or crosslinked, so it may easily be separated from the other process ingredients.

One of the monomers that may be polymerized by the above catalysts is ethylene (E), either by itself to form a homopolymer, or with α-olefins and/or olefinic esters or carboxylic acids. The structure of the polymer may be unique in terms of several measurable properties.

These polymers, and others herein, can have unique structures in terms of the branching in the polymer. Branching may be determined by NMR spectroscopy (see the Examples for details), and this analysis can determine the total number of branches, and to some extent the length of the branches. Herein the amount of branching is expressed as the number of branches per 1000 of the total methylene ($-CH_2-$) groups in the polymer, with one exception. Methylene groups that are in an ester grouping, i.e. $-CO_2\underline{R}$, are not counted as part of the 1000 methylenes. These methylene groups include those in the main chain and in the branches. These polymers, which are E homopolymers, have a branch content of about 80 to about 150 branches per 1000 methylene groups, preferably about 100 to about 130 branches per 1000 methylene groups. These branches do not include polymer end groups. In addition the distribution of the sizes (lengths) of the branches is unique. Of the above total branches, for every 100 that are methyl, about 30 to about 90 are ethyl, about 4 to about 20 are propyl, about 15 to about 50 butyl, about 3 to about 15 are amyl, and about 30 to about 140 are hexyl or longer, and it is preferred that for every 100 that are methyl, about 50 to about 75 are ethyl, about 5 to about 15 are propyl, about 24 to about 40 are butyl, about 5 to 10 are amyl, and about 65 to about 120 are hexyl or larger. These E homopolymers are often amorphous, although in some there may be a small amount of crystallinity.

Another polyolefin, which is an E homopolymer that can be made by these catalysts has about 20 to about 150 branches per 1000 methylene groups, and, per 100 methyl groups, about 4 to about 20 ethyl groups, about 1 to about 12 propyl groups, about 1 to about 12 butyl group, about 1 to about 10 amyl groups, and 0 to about 20 hexyl or larger groups. Preferably this polymer has about 40 to about 100 methyl groups per 1000 methylene groups, and per 100 methyl groups, about 6 to about 15 ethyl groups, about 2 to about 10 propyl groups, about 2 to about 10 butyl groups, about 2 to about 8 amyl groups, and about 2 to about 15 hexyl or larger groups.

Many of the polyolefins herein, including homopolyethylenes, may be crosslinked by various methods known in the art, for instance by the use of peroxide or other radical generating species which can crosslink these polymers. Such crosslinked polymers are novel when the uncrosslinked polymers from which they are derived are novel, because for the most part the structural feature(s) of the uncrosslinked polymers which make them novel will be carried over into the crosslinked forms.

In addition, some of the E homopolymers have an exceptionally low density, less than about 0.86 g/mL, preferably about 0.85 g/mL or less, measured at 25° C. This density is based on solid polymer.

Homopolymers of polypropylene (P) can also have unusual structures. Similar effects have been observed with other α-olefins (e.g. 1-hexene). A "normal" P homopolymer will have one methyl group for each methylene group (or 1000 methyl groups per 1000 methylene groups), since the normal repeat unit is —CH(CH$_3$)CH$_2$—. However, using a catalyst of formula (I) in which M is Ni(II) in combination with an alkyl aluminum compound it is possible to produce a P homopolymer with about 400 to about 6.00 methyl groups per 1000 methylene groups, preferably about 450 to about 550 methyl groups per 1000 methylene groups. Similar effects have been observed with other α-olefins (e.g. 1-hexene).

In the polymerization processes described herein olefinic esters and/or carboxylic acids may also be present, and of course become part of the copolymer formed. These esters may be copolymerized with one or more of E and one or more α-olefins. When copolymerized with E alone polymers with unique structures may be formed.

In many such E/olefinic ester and/or carboxylic acid copolymers the overall branching level and the distribution of branches of various sizes are unusual. In addition, where and how the esters or carboxylic acids occur in the polymer is also unusual. A relatively high proportion of the repeat units derived from the olefinic esters are at the ends of branches. In such copolymers, it is preferred that the repeat units derived from the olefinic esters and carboxylic acids are about 0.1 to 40 mole percent of the total repeat units, more preferably about 1 to about 20 mole percent. In a preferred ester, m is 0 and $R^1$ is hydrocarbyl or substituted hydrocarbyl. It is preferred that $R^1$ is alkyl containing 1 to 20 carbon atoms, more preferred that it contains 1 to 4 carbon atoms, and especially preferred that $R^1$ is methyl.

One such preferred dipolymer has about 60 to 100 methyl groups (excluding methyl groups which are esters) per 1000 methylene groups in the polymer, and contains, per 100 methyl branches, about 45 to about 65 ethyl branches, about 1 to about 3 propyl branches, about 3 to about 10 butyl branches, about 1 to about 3 amyl branches, and about 15 to about 25 hexyl or longer branches. In addition, the ester and carboxylic acid containing repeat units are often distributed mostly at the ends of the branches as follows. If the branches, and the carbon atom to which they are attached to the main chain, are of the formula —CH(CH$_2$)$_n$CO$_2$R$^1$, wherein the CH is part of the main chain, then in some of these polymers about 40 to about 50 mole percent of ester groups are found in branches where n is 5 or more, about 10 to about 20 mole percent when n is 4, about to about 30 mole percent when n is 1, 2 and 3 and about 5 to about 15 mole percent when n is 0. When n is 0, an acrylate ester has polymerized "normally" as part of the main chain, with the repeat unit —CH$_2$—CHCO$_2$R$^1$—.

These branched polymers which contain olefin and olefinic ester monomer units, particularly copolymers of ethylene and methyl acrylate and/or other acrylic esters are particularly useful as viscosity modifiers for lubricating oils, particularly automotive lubricating oils.

Under certain polymerization conditions, some of the polymerization catalysts described herein produce polymers whose structure is unusual, especially considering from what compounds (monomers) the polymers were made, and the fact that polymerization catalysts used herein are so-called transition metal coordination catalysts (more than one compound may be involved in the catalyst system, one of which must include a transition metal). Some of these polymers were; described in a somewhat different way above, and they may be described as "polyolefins" even though they may contain other monomer units which are not olefins (e.g., olefinic esters). In the polymerization of an unsaturated compound of the formula H$_2$C=CH(CH$_2$)$_e$G, wherein e is 0 or an integer of 1 or more, and G is hydrogen or —CO$_2$R$^1$, the usual ("normal") polymeric repeat unit obtained would be —CH$_2$—CH[(CH$_2$)$_e$G]—, wherein the branch has the formula —(CH$_2$)$_e$G. However, with some of the instant catalysts a polymeric unit may be —CH$_2$—CH [(CH$_2$)$_f$G]—, wherein f≠e, and f is 0 or an integer of 1 or more. If f<e, the "extra" methylene groups may be part of the main polymer chain. If f>e (parts of) additional monomer molecules may be incorporated into that branch. In other words, the structure of any polymeric unit may be irregular and different for monomer molecules incorporated into the polymer, and the structure of such a polymeric unit obtained could be rationalized as the result of "migration of the active polymerizing site" up and down the polymer chain, although this may not be the actual mechanism. This is highly unusual, particularly for polymerizations employing transition metal coordination catalysts.

For "normal" polymerizations, wherein the polymeric unit —CH$_2$—CH[(CH$_2$)$_e$G]— is obtained, the theoretical amount of branching, as measured by the number of branches per 1000 methylene (—CH$_2$—) groups can be calculated as follows which defines terms "theoretical branches" or "theoretical branching" herein:

$$\text{Theoretical branches} = \frac{(1000 \cdot \text{Total mole fraction of } \alpha\text{-olefins})}{\{[\sum (2 \cdot \text{mole fraction } e=0)] + [\sum (\text{mole fraction } \alpha\text{-olefin} \cdot e)]\}}$$

In this equation, an α-olefin is any olefinic compound H$_2$C=CH(CH$_2$)$_e$G wherein e≠0. Ethylene or an acrylic compound are the cases wherein e=0. Thus to calculate the number of theoretical branches in a polymer made from 50 mole percent ethylene (e=0), 30 mole percent propylene (e=1) and 20 mole percent methyl 5-heptenoate (e=4) would be as follows:

$$\text{Theoretical branches} = \frac{1000 \cdot 0.5}{\{[(2 \cdot 0.5)] + [(0.30 \cdot 1) + (0.20 \cdot 4)]\}} = 238 \text{ (branches/1000 methylenes)}.$$

The "1000 methylenes" include all of the methylene groups in the polymer, including methylene groups in the branches.

For some of the polymerizations described herein, the actual amount of branching present in the polymer is considerably greater than or less than the above theoretical branching calculations would indicate. For instance, when an ethylene homopolymer is made, there should be no branches, yet there are often many such branches. When an α-olefin is polymerized, the branching level may be much lower or higher than the theoretical branching level. It is preferred that the actual branching level is at 90% or less of the theoretical branching level, more preferably about 80% or less of the theoretical branching level, or 110% or more of the theoretical branching level, more preferably about 120% or more of the theoretical branching level. The polymer should also have at least about 50 branches per 1000 methylene units, preferably about 75 branches per 1000 methylene units, and more preferably about 100 branches per 1000 methylene units. In cases where there are "0" branches theoretically present, as in ethylene homopolymers or copolymers with acrylics, excess branches as a percentage cannot be calculated. In that instance if the polymer has 50 or more, preferably 75 or more branches per 1000 methylene groups, it has excess branches (i.e. in branches in which f>0).

These polymers also have "at least two branches of different lengths containing less than 6 carbon atoms each." By this is meant that branches of at least two different lengths (i.e. number of carbon atoms), and containing less than 6 carbon atoms, are present in the polymer. For instance the polymer may contain ethyl and butyl branches, or methyl and amyl branches.

As will be understood from the above discussion, the lengths of the branches ("f") do not necessarily correspond to the original sizes of the monomers used ("e"). Indeed branch lengths are often present which do not correspond to the sizes of any of the monomers used and/or a branch length may be present "in excess". By "in excess" is meant there are more branches of a particular length present than there were monomers which corresponded to that branch length in the polymer. For instance, in the copolymerization of 75 mole percent ethylene and 25 mole percent 1-butene it would be expected that there would be 125 ethyl branches per 1000 methylene carbon atoms. If there were more ethyl branches than that, they would be in excess compared to the theoretical branching. There may also be a deficit of specific length branches. If there were less than 125 ethyl branches per 1000 methylene groups in this polymer there would be a deficit. Preferred polymers have 90% or less or 110% or more of the theoretical amount of any branch length present in the polymer, and it is especially preferred if these branches are about 80% or less or about 120% or more of the theoretical amount of any branch length. In the case of the 75 mole percent ethylene/25 mole percent 1-butene polymer, the 90% would be about 113 ethyl branches or less, while the 110% would be about 138 ethyl branches or more. Such polymers may also or exclusively contain at least 50 branches per 1000 methylene atoms with lengths which should not theoretically (as described above) be present at all.

These polymers also have "at least two branches of different lengths containing less than 6 carbon atoms each." By this is meant that branches of at least-two different lengths (i.e. number of carbon atoms), and containing less than 6 carbon atoms, are present in the polymer. For instance the polymer may contain ethyl and butyl branches, or methyl and amyl branches.

Some of the polymers produced herein are novel because of unusual structural features. Normally, in polymers of alpha-olefins of the formula $CH_2=CH(CH_2)_aH$ wherein a is an integer of 2 or more made by coordination polymerization, the most abundant, and often the only, branches present in such polymers have the structure —$(CH_2)_aH$. Some of the polymers produced herein are novel because methyl branches comprise about 25% to about 75% of the total branches in the polymer. Such polymers are described in Examples 139, 162, 173 and 243–245. Some of the polymers produced herein are novel because in addition to having a high percentage (25–75%) of methyl branches (of the total branches present), they also contain linear branches of the structure —$(CH_2)_nH$ wherein n is an integer of six or greater. Such polymers are described in Examples 139, 173 and 243–245. Some of the polymers produced herein are novel because in addition to having a high percentage (25–75%) of methyl branches (of the total branches present), they also contain the structure (XXVI), preferably in amounts greater than can be accounted for by end groups, and more preferably greater than 0.5 (XXVI) groups per thousand methyl groups in the polymer greater than can be accounted for by end groups.

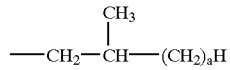

(XXVI)

Normally, homo- and copolymers of one or more alpha-olefins of the formula $CH_2=CH(CH_2)_aH$ wherein a is an integer of 2 or more contain as part of the polymer backbone the structure (XXV)

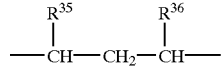

(XXV)

wherein $R^{35}$ and $R^{36}$ are alkyl groups. In most such polymers of alpha-olefins of this formula (especially those produced by coordination-type polymerizations), both of $R^{35}$ and $R^{36}$ are —$(CH_2)_aH$. However, in certain of these polymers described herein, about 2 mole percent or more, preferably about 5 mole percent or more and more preferably about 50 mole percent or more of the total amount of (XXV) in said polymer consists of the structure where one of $R^{35}$ and $R^{36}$ is a methyl group and the other is an alkyl group containing two or more carbon atoms. Furthermore, in certain of these polymers described herein, structure (XXV) may occur in side chains as well as in the polymer backbone. Structure (XXV) can be detected by $^{13}C$ NMR. The signal for the carbon atom of the methylene group between the two methine carbons in (XXV) usually occurs in the $^{13}C$ NMR at 41.9 to 44.0 ppm when one of $R^{35}$ and $R^{36}$ is a methyl group and the other is an alkyl group containing two or more carbon atoms, while when both $R^{35}$ and $R^{36}$ contain 2 or more carbon atoms, the signal for the methylene carbon atom occurs at 39.5 to 41.9 ppm. Integration provides the relative amounts of these structures present in the polymer. If there are interfering signals from other carbon atoms in these regions, they must be subtracted from the total integrals to give correct values for structure (XXV).

Normally, homo- and copolymers of one or more alpha-olefins of the formula $CH_2=CH(CH_2)_aH$ wherein a is an integer of 2 or more (especially those made by coordination polymerization) contain as part of the polymer backbone structure (XXIV) wherein n is 0, 1, or 2. When n is 0, this structure is termed "head to head" polymerization. When n is 1, this structure is termed "head to tail" polymerization. When n is 2, this structure is termed "tail to tail" polymerization. In most such polymers of alpha-olefins of this formula (especially those produced by coordination-type polymerizations), both of $R^{37}$ and $R^{38}$ are —$(CH_2)_aH$. However some of the polymers of alpha-olefins of this formula described herein are novel in that they also contain structure (XXIV) wherein n=a, $R^{37}$ is a methyl group, and $R^{38}$ is an alkyl group with 2 or more carbon atoms.

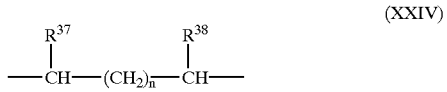
(XXIV)

Normally polyethylene made by coordination polymerization has a linear backbone with either no branching, or small amounts of linear branches. Some of the polyethylenes described herein are unusual in that they contain structure (XXVII) which has a methine carbon that is not part of the main polymer backbone.

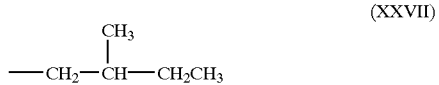
(XXVII)

Normally, polypropylene made by coordination polymerization has methyl branches and few if any branches of other sizes. Some of the polypropylenes described herein are unusual in that they contain one or both of the structures (XXVIII) and (XXIX).

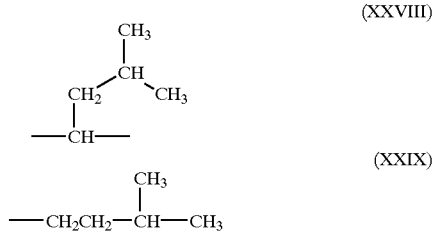
(XXVIII)

(XXIX)

As the artisan understands, in coordination polymerization alpha-olefins of the formula $CH_2=CH(CH_2)_aH$ may insert into the growing polymer chain in a 1,2 or 2,1 manner. Normally these insertion steps lead to 1,2-enchainment or 2,1-enchainment of the monomer. Both of these fundamental steps form a $—(CH_2)_aH$ branch. However, with some catalysts herein, some of the initial product of 1,2 insertion can rearrange by migration of the coordinated metal atom to the end of the last inserted monomer before insertion of additional monomer occurs. This results in omega, 2-enchainment and the formation of a methyl branch.

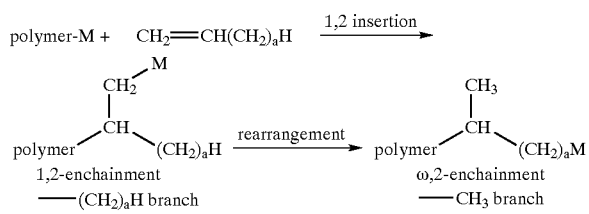

It is also known that with certain other catalysts, some of the initial product of 2,1 insertion can rearrange in a similar manner by migration of the coordinated metal atom to the end of the last inserted monomer. This results in omega, 1-enchainment and no branch is formed.

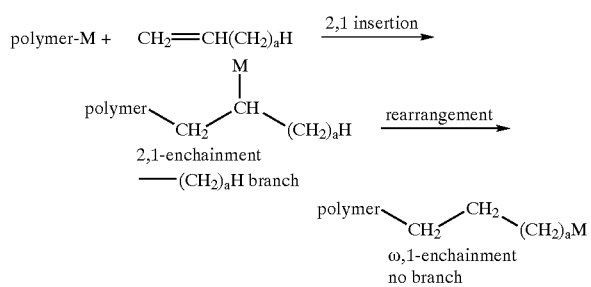

Of the four types of alpha-olefin enchainment, omega, 1-enchainment is unique in that it does not generate a branch. In a polymer made from an alpha-olefin of the formula $CH_2=CH(CH_2)_aH$, the total number of branches per 1000 methylene groups (B) can be expressed as:

$$B=(1000)(1-X_{\omega,1})/[(1-X_{\omega,1})a+X_{\omega,1}(a+2)]$$

where $X_{\omega,1}$ is the fraction of omega, 1-enchainment Solving this expression for $X_{\omega,1}$ gives:

$$X_{\omega,1}=(1000-aB)/(1000+2B)$$

This equation provides a means of calculating the fraction of omega, 1-enchainment in a polymer of a linear alpha-olefin from the total branching B. Total branching can be measured by $^1H$ NMR or $^{13}C$ NMR. Similar equations can be written for branched alpha-olefins. For example, the equation for 4-methyl-1-pentene is:

$$X_{\omega,1}=(2000-2B)/(1000+2B)$$

Most polymers of alpha-olefins made by other coordination polymerization methods have less than 5% omega, 1-enchainment. Some of the alpha-olefin polymers described herein have unusually large amounts (say >5%) of omega, 1-enchainment. In essence this is similar to stating that a polymer made from an α-olefin has much less than the "expected" amount of branching. Although many of the polymerizations described herein give substantial amounts of ω,1- and other unusual forms of enchainment of olefinic monomers, it has surprisingly been found that "unsymmetrical" α-diimine ligands of formula (VIII) give especially high amounts of ω,1-enchainment. In particular when $R^2$ and $R^5$ are phenyl, and one or both of these is substituted in such a way as different sized groups are present in the 2 and 6 position of the phenyl ring(s), ω,1-enchainment is enhanced. For instance, if one or both of $R^2$ and $R^5$ are 2-t-butylphenyl, this enchainment is enhanced. In this context when $R^2$ and/or $R^5$ are "substituted" phenyl the substitution may be not only in the 2 and/or 6 positions, but on any other position in the phenyl ring. For instance, 2,5-di-t-butylphenyl, and 2-t-butyl-4,6-dichlorophenyl would be included in substituted phenyl.

The steric effect of various groupings has been quantified by a parameter called $E_s$, see R. W. Taft, Jr., J. Am. Chem. Soc., vol. 74, p. 3120–3128, and M. S. Newman, Steric Effects in Organic Chemistry, John Wiley & Sons, New York, 1956, p. 598–603. For the purposes herein, the $E_s$ values are those for o-substituted benzoates described in these publications. If the value for $E_s$ for any particular group is not known, it can be determined by methods described in these publications. For the purposes herein, the value of hydrogen is defined to be the same as for methyl. It is preferred that difference in $E_s$, when $R^2$ (and preferably also $R^5$) is phenyl, between the groups substituted in the 2 and 6 positions of the phenyl ring is at least 0.15, more preferably at least about 0.20, and especially preferably about 0.6 or more. These phenyl groups may be unsubstituted or substituted in any other manner in the 3, 4 or 5 positions.

These differences in $E_s$ are preferred in a diimine such as (VIII), and in any of the polymerization processes herein wherein a metal complex containing an α-diimine ligand is used or formed. The synthesis and use of such α-diimines is illustrated in Examples 454–463.

Because of the relatively large amounts of ω,1-enchainment that may be obtained using some of the polymerization catalysts reported herein novel polymers can be made. Among these homopolypropylene (PP). In some of the PP's made herein the structure

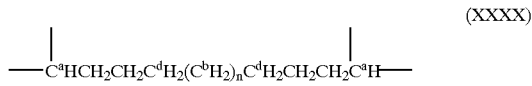
(XXXX)

may be found. In this structure each $C^a$ is a methine carbon atom that is a branch point, while each $C^b$ is a methylene group that is more than 3 carbon atoms removed from any branch point ($C^a$). Herein methylene groups of the type —$C^bH_2$— are termed δ+ (or delta+) methylene groups. Methylene groups of the type —$C^dH_2$—, which are exactly the third carbon atom from a branch point, are termed γ (gamma) methylene groups. The NMR signal for the δ+ methylene groups occurs at about 29.75 ppm, while the NMR signal for the γ methylene groups appears at about 30.15 ppm. Ratios of these types of methylene groups to each other and the total number of methylene groups in the PP is done by the usual NMR integration techniques.

It is preferred that PP's made herein have about 25 to about 300 δ+ methylene groups per 1000 methylene groups (total) in the PP.

It is also preferred that the ratio of δ+:γ methylene groups in the PP be 0.7 to about 2.0.

The above ratios involving δ+ and γ methylene groups in PP are of course due to the fact that high relatively high ω,1 enchainment can be obtained. It is preferred that about 30 to 60 mole percent of the monomer units in PP be enchained in an ω,1 fashion. Using the above equation, the percent ω,1 enchainment for polypropylene can be calculated as:

% ω,1=(100)(1000−B)/(1000+2B)

wherein B is the total branching (number of methyl groups) per 1000 methylene groups in the polymer.

Homo- or copolymers of one or more linear α-olefins containing 3 to 8 carbon atoms may also have δ+ carbon atoms in them, preferably at least about 1 or more δ+ carbon atoms per 1000 methylene groups.

The above polymerization processes can of course be used to make relatively random copolymers (except for certain CO copolymers) of various possible monomers. However, some of them can also be used to make block polymers. A block polymer is conventionally defined as a polymer comprising molecules in which there is a linear arrangement of blocks, a block being a portion of a polymer molecule which the monomeric units have at least one constitutional or configurational feature absent from adjacent portions (definition from H. Mark, et al., Ed., Encyclopedia of Polymer Science and Engineering, Vol. 2, John Wiley & Sons, New York, 1985, p. 324). Herein in a block copolymer, the constitutional difference is a difference in monomer units used to make that block, while in a block homopolymer the same monomer(s) are used but the repeat units making up different blocks are different structure and/or ratios of types of structures.

Since it is believed that many of the polymerization processes herein have characteristics that often resemble those of living polymerizations, making block polymers may be relatively easy. One method is to simply allow monomer(s) that are being polymerized to be depleted to a low level, and then adding different monomer(s) or the same combination of monomers in different ratios. This process may be repeated to obtain polymers with many blocks.

Lower temperatures, say about less than 0° C., preferably about −10° to about −30°, tends to enhance the livingness of the polymerizations. Under these conditions narrow molecular weight distribution polymers may be obtained (see Examples 367–369 and 371), and block copolymers may also be made (Example 370).

As pointed out above, certain polymerization conditions, such as pressure, affect the microstructure of many polymers. The microstructure in turn affects many polymer properties, such as crystallization. Thus, by changing polymerization conditions, such as the pressure, one can change the microstructure of the part of the polymer made under those conditions. This of course leads to a block polymer, a polymer have defined portions having structures different from other defined portions. This may be done with more than one monomer to obtain a block copolymer, or may be done with a single monomer or single mixture of monomers to obtain a block homopolymer. For instance, in the polymerization of ethylene, high pressure sometimes leads to crystalline polymers, while lower pressures give amorphous polymers. Changing the pressure repeatedly could lead to an ethylene homopolymer containing blocks of amorphous polyethylene and blocks of crystalline polyethylene. If the blocks were of the correct size, and there were enough of them, a thermoplastic elastomeric homopolyethylene could be produced. Similar polymers could possibly be made from other monomer(s), such as propylene.

Homopolymers of α-olefins such as propylene, that is polymers which were made from a monomer that consisted essentially of a single monomer such as propylene, which are made herein, sometimes exhibit unusual properties compared to their "normal" homopolymers. For instance, such a homopolypropylene usually would have about 1000 methyl groups per 1000 methylene groups. Polypropylenes made herein typically have about half that many methyl groups, and in addition have some longer chain branches. Other α-olefins often give polymers whose microstructure is analogous to these polypropylenes when the above catalysts are used for the polymerization.

These polypropylenes often exhibit exceptionally low glass transition temperatures (Tg's). "Normal" polypropylene has a Tg of about −17° C., but the polypropylenes herein have a Tg of −30° C. or less, preferably about −35° C. or less, and more preferably about −40° C. or less. These Tg's are measured by Differential Scanning Calorimetry at a heating rate of 10° C./min, and the Tg is taken as the midpoint of the transition. These polypropylenes preferably have at least 50 branches (methyl groups) per 1000 carbon atoms, more preferably at least about 100 branches per 1000 methylene groups.

Previously, when cyclopentene was coordination polymerized to higher molecular weights, the resulting polymer was essentially intractable because of its very high melting point, greatly above 300° C. Using the catalysts here to homopolymerize cyclopentene results in a polymer that is tractable, i.e., may be reformed, as by melt forming. Such polymers have an end of melting point of about 320° C. or less, preferably about 300° C. or less, or a melting point of about 275° C. or less, preferably about 250° C. or less. The melting point is determined by Differential Scanning Calorimetry at a heating rate of 15° C./min, and taking the maximum of the melting endotherm as the melting point. However these polymers tend to have relatively diffuse melting points, so it is preferred to measure the "melting point" by the end of melting point. The method is the same, except the end of melting is taken as the end (high temperature end) of the melting endotherm which is taken as the point at which the DSC signal returns to the original (extrapolated) baseline. Such polymers have an average degree of polymerization (average number of cyclopentene repeat units per polymer chain) of about 10 or more, preferably about 30 or more, and more preferably about 50 or more.

In these polymers, enchainment of the cyclopentene repeat units is usually as cis-1,3-pentylene units, in contrast to many prior art cyclopentenes which were enchained as 1,2-cyclopentylene units. It is preferred that about 90 mole percent or more, more preferably about 95 mole percent or more of the enchained cyclopentene units be enchained as 1,3-cyclopentylene units, which are preferably cis-1,3-cyclopentylene units.

The X-ray powder diffraction pattern of the instant poly(cyclopentenes) is also unique. To produce cyclopentene polymer samples of uniform thickness for X-ray measurements, powder samples were compressed into disks approximately 1 mm thick and 32 mm in diameter. X-ray powder diffraction patterns of the samples were collected over the range 10–50° 2θ. The diffraction data were collected using an automated Philips θ—θ diffractometer (Philips X'pert System) operating in the symmetrical transmission mode (Ni-filtered CuKa radiation, equipped with a diffracted beam collimator (Philips Thin Film Collimator system), Xe filled proportional detector, fixed step mode (0.05°/step), 12.5 sec./step, 1/4° divergence slit). Reflection positions were identified using the peak finding routine in the APD suite of programs provided with the X'pert System. The X-ray powder diffraction pattern had reflections at approximately 17.3°, 19.3°, 24.2°, and 40.7° 2θ, which correspond to d-spacings of approximately 0.512, 0.460, 0.368 and 0.222 nm, respectively. These polymers have a monoclinic unit cell of the approximate dimensions: a=0.561 nm; b=0.607 nm; c=7.37 nm; and g=123.2°.

Copolymers of cyclopentene and various other olefins may also be made. For instance a copolymer of ethylene and cyclopentene may also be made. In such a copolymer it is preferred that at least 50 mole percent, more preferably at least about, 70 mole percent, of the repeat units are derived from cyclopentene. As also noted above, many of the polymerization systems described herein, produce polyethylenes that have considerable branching in them. Likewise the ethylene units which are copolymerized with the cyclopentene herein may also be branched, so it is preferred that there be at least 20 branches per 1000 methylene carbon atoms in such copolymers. In this instance, the "methylene carbon atoms" referred to in the previous sentence do not include methylene groups in the cyclopentene rings. Rather it includes methylene groups only derived from ethylene or other olefin, but not cyclopentene.

Another copolymer that may be prepared is one from cyclopentene and an α-olefin, more preferably a linear α-olefin. It is preferred in such copolymers that repeat units derived from cyclopentene are 50 mole percent or more of the repeat units. As mentioned above, α-olefins may be enchained in a 1,ω fashion, and it is preferred that at least 10 mole percent of the repeat units derived from the α-olefin be enchained in such a fashion. Ethylene may also be copolymerized with the cyclopentene and α-olefin.

Poly(cyclopentene) and copolymers of cyclopentene, especially those that are (semi)crystalline, may be used as molding and extrusion resins. They may contain various materials normally found in resins, such as fillers, reinforcing agents, antioxidants, antiozonants, pigments, tougheners, compatibilizers, dyes, flame retardant, and the like. These polymers may also be drawn or melt spun into fibers. Suitable tougheners and compatibilizers include polycyclopentene resin which has been grafted with maleic anhydride, an grafted EPDM rubber, a grafted EP rubber, a functionalized styrene/butadiene rubber, or other rubber which has been modified to selectively bond to components of the two phases.

In all of the above homo- and copolymers of cyclopentene, where appropriate, any of the preferred state may be combined any other preferred state(s).

The homo- and copolymers of cyclopentene described above may used or made into certain forms as described below:

1. The cyclopentene polymers described above may be part of a polymer blend. That is they may be mixed in any proportion with one or more other polymers which may be thermoplastics and/or elastomers. Suitable polymers for blends are listed below in the listing for blends of other polymers described herein. One preferred type of polymer which may be blended is a toughening agent or compatibilizer, which is often elastomeric and/or contains functional groups which may help compatibilize the mixture, such as epoxy or carboxyl.

2. The polycyclopentenes described herein are useful in a nonwoven fabric comprising fibrillated three-dimensional network fibers prepared by using of a polycyclopentene resin as the principal component. It can be made by flash-spinning a homogeneous solution containing a polycyclopentene. The resultant nonwoven fabric is excellent in heat resistance, dimensional stability and solvent resistance.

3. A shaped part of any of the cyclopentene containing resins. This part may be formed by injection molding, extrusion, and thermoforming. Exemplary uses include molded part for automotive use, medical treatment container, microwave-range container, food package container such as hot packing container, oven container, retort container, etc., and heat-resisting transparent container such as heat-resisting bottle.

4. A sheet or film of any of the cyclopentene containing resins. This sheet or film may be clear and may be used for optical purposes (i.e. breakage resistant glazing). The sheet or film may be oriented or unoriented. Orientation may be carried out by any of the known methods such a uniaxial or biaxial drawing. The sheet or film may be stampable or thermoformable.

5. The polycyclopentene resins are useful in nonwoven fabrics or microfibers which are produced by melt-blowing a material containing as a main component a polycyclopentene. A melt-blowing process for producing a fabric or fiber comprises supplying a polycyclopentene in a molten form from at least one orifice of a nozzle into a gas stream which attenuates the molten polymer into microfibers. The nonwoven fabrics are excellent in heat-resistant and chemical resistant characteristics, and are suitable for use as medical fabrics, industrial filters, battery separators and so forth. The microfibers are particularly useful in the field of high temperature filtration, coalescing and insulation.

6. A laminate in which one or more of the layers comprises a cyclopentene resin. The laminate may also contain adhesives, and other polymers in some or all of the layers, or other materials such as paper, metal foil, etc. Some or all of the layers, may be oriented in the same or different directions. The laminate as a whole may also be oriented. Such materials are useful for containers, or other uses where barrier properties are required.

7. A fiber of a cyclopentene polymer. This fiber may be undrawn or drawn to further orient it. It is useful for apparel and in industrial application where heat resistance and/or chemical resistance are important.

8. A foam or foamed object of a cyclopentene polymer. The foam may be formed in any conventional manner such as by using blowing agents.

9. The cyclopentene resins may be microporous membranes. They may be used in process wherein semipermeable membranes are normally used.

In addition, the cyclopentene resins may be treated or mixed with other materials to improve certain properties, as follows:

1. They may further be irradiated with electron rays. This often improves heat resistance and/or chemical resistance, and is relatively inexpensive. Thus the molding is useful as a material required to have high heat resistance, such as a structural material, a food container material, a food wrapping material or an electric or electronic part material, particularly as an electric or electronic part material, because it is excellent in soldering resistance.

2. Parts with a crystallinity of at least 20% may be obtained by subjecting cyclopentene polymers having an end of melting point between 240 and 300° C. to heat treatment (annealing) at a temperature of 120° C. to just below the melting point of the polymer. Preferred conditions are a temperature of 150 to 280° C. for a period of time of 20 seconds to 90 minutes, preferably to give a cyclopentene polymer which has a heat deformation temperature of from 200 to 260° C. These parts have good physical properties such as heat resistance and chemical resistance, and thus are useful for, for example, general construction materials, electric or electronic devices, and car parts.

3. Cyclopentene resins may be nucleated to promote crystallization during processing. An example would be a polycyclopentene resin composition containing as main components (A) 100 parts by weight of a polycyclopentene and (B) 0.01 to 25 parts by weight of one or more nucleating agents selected from the group consisting of (1) metal salts of organic acids, (2) inorganic compounds, (3) organophosphorus compounds, and/or (4) metal salts of ionic hydrocarbon copolymer. Suitable nucleating agents may be sodium methylenebis(2,4-di-tertbutylphenyl) acid phosphate, sodium bis(4-tert-butylphenyl) phosphate, aluminum p-(tert-butyl) benzoate, talc, mica, or related species. These could be used in a process for producing polycyclopentene resin moldings by molding the above polycyclopentene resin composition at a temperature above their melting point.

4. Flame retardants and flame retardant combinations may be added to a cyclopentene polymer. Suitable flame retardants include a halogen-based or phosphorus-based flame retardant, antimony trioxide, antimony pentoxide, sodium antimonate, metallic antimony, antimony trichloride, antimony pentachloride, antimony trisulfide, antimony pentasulfide, zinc borate, barium metaborate or zirconium oxide. They may be used in conventional amounts.

5. Antioxidants may be used in conventional amounts to improve the stability of the cyclopentene polymers. For instance 0.005 to 30 parts by weight, per 100 parts by weight of the cyclopentene polymer, of an antioxidant selected from the group consisting of a phosphorous containing antioxidant, a phenolic antioxidant or a combination thereof. The phosphorous containing antioxidant may be a monophosphite or diphosphite or mixture thereof and the phenolic antioxidant may be a dialkyl phenol, trialkyl phenol, diphenylmonoalkoxylphenol, a tetraalkyl phenol, or a mixture thereof. A sulfur-containing antioxidant may also be used alone or in combination with other antioxidants.

6. Various fillers or reinforcers, such as particulate or fibrous materials, may be added to improve various physical properties.

7. "Special" physical properties can be obtained by the use of specific types of materials. Electrically conductive materials such as fine metallic wires or graphite may be used to render the polymer electrically conductive. The temperature coefficient of expansion may be regulated by the use of appropriate fillers, and it may be possible to even obtain materials with positive coefficients of expansion. Such materials are particularly useful in electrical and electronic parts.

8. The polymer may be crosslinked by irradiation or chemically as by using peroxides, optionally in the presence of suitable coagents. Suitable peroxides include benzoyl peroxide, lauroyl peroxide, dicumyl peroxide, tert-butyl peroxide, tert-butylperoxybenzoate, tert-butylcumyl peroxide, tert-butylhydroperoxide, 2,5-dimethyl-2,5-di(tert-butylperoxy)hexane, 2,5-dimethyl-2,5-di(tert-butylperoxy)hexyne-3, 1,1-bis(tert-butylperoxyisopropyl)benzene, 1,1-bis(tert-butylperoxy)-3,3,5-trimethylcyclohexane, n-butyl-4,4-bis(tert-butylperoxy)valerate, 2,2-bis(tert-butylperoxy) butane and tert-butylperoxybenzene.

When polymerizing cyclopentene, it has been found that some of the impurities that may be found in cyclopentene poison or otherwise interfere with the polymerizations described herein. Compounds such as 1,3-pentadiene (which can be removed by passage through 5A molecular sieves), cyclopentadiene (which can be removed by distillation from Na), and methylenecyclobutane (which can be removed by distillation from polyphosphoric acid), may interfere with the polymerization, and their level should be kept as low as practically possible.

The above polymers (in general) are useful in many applications. Crystalline high molecular weight polymers are useful as molding resins, and for films for use in packaging. Amorphous resins are useful as elastomers, and may be crosslinked by known methods, such as by using free radicals. When such amorphous resins contain repeat units derived from polar monomers they are oil resistant. Lower molecular weight polymers are useful as oils, such as in polymer processing aids. When they contain polar groups, particularly carboxyl groups, they are useful in adhesives.

In many of the above polymerizations, the transition metal compounds employed as (part of the) catalysts contain(s) (a) metal atom(s) in a positive oxidation state. In addition, these complexes may have a square planar configuration about the metal, and the metal, particularly nickel or palladium, may have a $d^8$ electronic configuration. Thus some of these catalysts may be said to have a metal atom which is cationic and has a $d^8$-square planar configuration.

In addition these catalysts may have a bidentate ligand wherein coordination to the transition metal is through two different nitrogen atoms or through a nitrogen atom and a phosphorus atom, these nitrogen and phosphorus atoms being part of the bidentate ligand. It is believed that some of these compounds herein are effective polymerization catalysts at least partly because the bidentate ligands have sufficient steric bulk on both sides of the coordination plane (of the square planar complex). Some of the Examples herein with the various catalysts of this type illustrate the degree of steric bulk which may be needed for such catalysts. If such a complex contains a bidentate ligand which has the appropriate steric bulk, it is believed that it produces polyethylene with a degree of polymerization of at least about 10 or more.

It is also believed that the polymerization catalysts herein are effective because unpolymerized olefinic monomer can only slowly displace from the complex a coordinated olefin which may be formed by β-hydride elimination from the growing polymer chain which is attached to the transition metal. The displacement can occur by associative exchange. Increasing the steric bulk of the ligand slows the rate of associative exchange and allows polymer chain growth. A quantitative measure of the steric bulk of the bidentate ligand can be obtained by measuring at −85° C. the rate of exchange of free ethylene with complexed ethylene in a complex of formula (XI) as shown in equation 1 using standard $^1$H NMR techniques, which is called herein the Ethylene Exchange Rate (EER). The neutral bidentate ligand is represented by YN where Y is either N or P. The EER is measured in this system. In this measurement system the metal is always Pd, the results being applicable to other metals as noted below. Herein it is preferred for catalysts to contain bidentate ligands for which the second order rate constant for Ethylene Exchange Rate is about 20,000 L-mol$^{-1}$s$^{-1}$ or less when the metal used in the polymerization catalyst is palladium, more preferably about 10,000 L-mol$^{-1}$s$^{-1}$ or less, and more preferably about 5,000 L-mol$^{-1}$s$^{-1}$ or less. When the metal in the polymerization catalyst is nickel, the second order rate constant (for the ligand in EER measurement) is about 50,000 L-mol$^{-1}$s$^{-1}$, more preferably about 25,000 L-mol$^{-1}$s$^{-1}$ or less, and especially preferably about 10,000 L-mol$^{-1}$s$^{-1}$ or less. Herein the EER is measured using the compound (XI) in a procedure (including temperature) described in Examples 21–23.

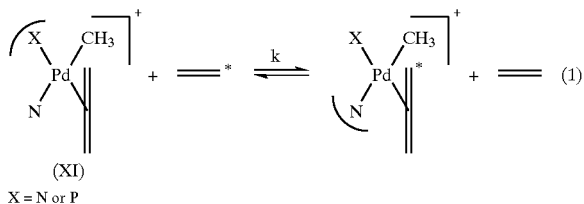

(XI)
X = N or P

In these polymerizations it is preferred if the bidentate ligand is an α-diimine. It is also preferred if the olefin has the formula $R^{17}CH{=}CH_2$, wherein $R^{17}$ is hydrogen or n-alkyl.

In general for the polymers described herein, blends may be prepared with other polymers, and such other polymers may be elastomers, thermoplastics or thermosets. By elastomers are generally meant polymers whose Tg (glass transition temperature) and Tm (melting point), if present, are below ambient temperature, usually considered to be about 20° C. Thermoplastics are those polymers whose Tg and/or Tm are at or above ambient temperature. Blends can be made by any of the common techniques known to the artisan, such as solution blending, or melt blending in a suitable apparatus such as a single or twin-screw extruder. Specific uses for the polymers of this application in the blends or as blends are listed below.

Blends may be made with almost any kind of elastomer, such as EP, EPDM, SBR, natural rubber, polyisoprene, polybutadiene, neoprene, butyl rubber, styrene-butadiene block copolymers, segmented polyester-polyether copolymers, elastomeric polyurethanes, chlorinated or chlorosulfonated polyethylene, (per)fluorinated elastomers such as copolymers of vinylidene fluoride, hexafluoropropylene and optionally tetrafluoroethylene, copolymers of tetrafluoroethylene and perfluoro(methyl vinyl ether), and copolymers of tetrafluoroethylene and propylene.

Suitable thermoplastics which are useful for blending with the polymers described herein include: polyesters such as poly(ethylene terephthalate), poly(butylene terephthalate), and poly(ethylene adipate); polyamides such as nylon-6, nylon-6,6, nylon-12, nylon-12,12, nylon-11, and a copolymer of hexamethylene diamine, adipic acid and terephthalic acid; fluorinated polymers such as copolymers of ethylene and vinylidene fluoride, copolymers of tetrafluoroethylene and hexafluoropropylene, copolymers of tetrafluoroethylene and a perfluoro(alkyl vinyl ether) such as perfluoro(propyl vinyl ether), and poly(vinyl fluoride); other halogenated polymers such a poly(vinyl chloride) and poly(vinylidene chloride) and its copolymers; polyolefins such as polyethylene, polypropylene and polystyrene, and copolymers thereof; (meth)acrylic polymers such a poly(methyl methacrylate) and copolymers thereof; copolymers of olefins such as ethylene with various (meth) acrylic monomers such as alkyl acrylates, (meth)acrylic acid and ionomers thereof, and glycidyl (meth)acrylate); aromatic polyesters such as the copolymer of Bisphenol A and terephthalic and/or isophthalic acid; and liquid crystalline polymers such as aromatic polyesters or aromatic poly(ester-amides).

Suitable thermosets for blending with the polymers described herein include epoxy resins, phenol-formaldehyde resins, melamine resins, and unsaturated polyester resins (sometimes called thermoset polyesters). Blending with thermoset polymers will often be done before the thermoset is crosslinked, using standard techniques.

The polymers described herein may also be blended with uncrosslinked polymers which are not usually considered thermoplastics for various reasons, for instance their viscosity is too high and/or their melting point is so high the polymer decomposes below the melting temperature. Such polymers include poly(tetrafluoroethylene), aramids such as poly(p-phenylene terephthalate) and poly(m-phenylene isophthalate), liquid crystalline polymer such as poly(benzoxazoles), and non-melt processible polyimides which are often aromatic polyimides.

All of the polymers disclosed herein may be mixed with various additives normally added to elastomers and thermoplastics [see EPSE (below), vol. 14, p. 327–410]. For instance reinforcing, non-reinforcing and conductive fillers, such as carbon black, glass fiber, minerals such as clay, mica and talc, glass spheres, barium sulfate, zinc oxide, carbon fiber, and aramid fiber or fibrids, may be used. Antioxidants, antiozonants, pigments, dyes, delusterants, compounds to promote crosslinking may be added. Plasticizers such as various hydrocarbon oils may also be used.

The following listing is of some uses for polyolefins, which are made from linear olefins and do not include polar monomers such as acrylates, which are disclosed herein. In some cases a reference is given which discusses such uses for polymers in general. All of these references are hereby included by reference. For the references, "U" refers to W. Gerhartz, et al., Ed., Ullmann's Encyclopedia of Industrial Chemistry, 5th Ed. VCH Verlagsgesellschaft mBH, Weinheim, for which the volume and page number are given, "ECT3" refers to the H. F. Mark, et al., Ed., Kirk-Othmer Encyclopedia of Chemical Technology, 4th Ed., John Wiley & Sons, New York, "ECT4" refers to the J. I Kroschwitz, et al., Ed., Kirk-Othmer Encyclopedia of Chemical Technology, 4th Ed., John Wiley & Sons, New York, for which the volume and page number are given, "EPST" refers to H. F. Mark, et al., Ed., Encyclopedia of Polymer Science and Technology, 1st Ed., John Wiley & Sons, New York, for which the volume and page number are given, "EPSE" refers to H. F. Mark, et al., Ed., Encyclopedia of Polymer Science and Engineering, 2nd Ed., John Wiley & Sons, New York, for which volume and page numbers are given, and "PM" refers to J. A. Brydson, ed., Plastics Materials, 5 Ed., Butterworth-Heinemann, Oxford, UK, 1989, and the page is given. In these uses, a polyethylene, polypropylene and a copolymer of ethylene and propylene are preferred.

1. Tackifiers for low strength adhesives (U, vol. A1, p. 235–236) are a use for these polymers. Elastomeric and/or relatively low molecular weight polymers are preferred.
2. An oil additive for smoke suppression in single-stroke gasoline engines is another use. Elastomeric polymers are preferred.
3. The polymers are useful as base resins for hot melt adhesives (U, vol. A1, p. 233–234), pressure sensitive adhesives (U, vol. A1, p. 235–236) or solvent applied adhesives. Thermoplastics are preferred for hot melt adhesives. The polymers may also be used in a carpet installation adhesive.
4. Lubricating oil additives as Viscosity Index Improvers for multigrade engine oil (ECT3, Vol 14, p. 495–496) are another use. Branched polymers are preferred. Ethylene copolymer with acrylates or other polar monomers will also function as Viscosity Index Improvers for multigrade engine oil with the additional advantage of providing some dispersancy
5. Polymer for coatings and/or penetrants for the protection of various porous items such as lumber and masonry, particularly out-of-doors. The polymer may be in a suspension or emulsion, or may be dissolved in a solvent.
6. Base polymer for caulking of various kinds is another use. An elastomer is preferred. Lower molecular weight polymers are often used.
7. The polymers may be grafted with various compounds particularly those that result in functional groups such as epoxy, carboxylic anhydride (for instance as with a free radically polymerized reaction with maleic anhydride) or carboxylic acid (EPSE, vol. 12, p. 445). Such functionalized polymers are particularly useful as tougheners for various thermoplastics and thermosets when blended. When the polymers are elastomers, the functional groups which are grafted onto them may be used as curesites to crosslink the polymers. Maleic anhydride-grafted randomly-branched polyolefins are useful as tougheners for a wide range of materials (nylon, PPO, PPO/styrene alloys, PET, PBT, POM, etc.); as tie layers in multilayer constructs such as packaging barrier films; as hot melt, moisture-curable, and coextrudable adhesives; or as polymeric plasticizers. The maleic andhydride-grafted materials may be post reacted with, for example; amines, to form other functional materials. Reaction with aminopropyl trimethoxysilane would allow for moisture-curable materials. Reactions with di- and tri-amines would allow for viscosity modifications.
8. The polymers, particularly elastomers, may be used for modifying asphalt, to improve the physical properties of the asphalt and/or extend the life of asphalt paving.
9. The polymers may be used as base resins for chlorination or chlorosulfonation for making the corresponding chlorinated or chlorosulfonated elastomers. The unchlorinated polymers need not be elastomers themselves.
10. Wire insulation and jacketing may be made from any of the polyolefins (see EPSE, vol. 17, p. 828–842). In the case of elastomers it may be preferable to crosslink the polymer after the insulation or jacketing is formed, for example by free radicals.
11. The polymers, particularly the elastomers, may be used as tougheners for other polyolefins such as polypropylene and polyethylene.
12. The base for synthetic lubricants (motor oils) may be the highly branched polyolefins described herein (ECT3, vol. 14, p. 496–501).
13. The branched polyolefins herein can be used as drip suppressants when added to other polymers.
14. The branched polyolefins herein are especially useful in blown film applications because of their particular Theological properties (EPSE, vol. 7, p. 88–106). It is preferred that these polymers have some crystallinity.
15. The polymer described herein can be used to blend with wax for candles, where they would provide smoke suppression and/or drip control.
16. The polymers, especially the branched polymers, are useful as base resins for carpet backing, especially for automobile carpeting.
17. The polymers, especially those which are relatively flexible, are useful as capliner resins for carbonated and noncarbonated beverages.
18. The polymers, especially those having a relatively low melting point, are useful as thermal transfer imaging resins (for instance for imaging tee-shirts or signs).
19. The polymers may be used for extrusion or coextrusion coatings onto plastics, metals, textiles or paper webs.
20. The polymers may be used as a laminating adhesive for glass.
21. The polymers are useful as for blown or cast films or as sheet (see EPSE, vol. 7 p. 88–106; ECT4, vol. 11, p. 843–856; PM, p. 252 and p. 432ff). The films may be single layer or multilayer, the multilayer films may include other polymers, adhesives, etc. For packaging the films may be stretch-wrap, shrink-wrap or cling wrap. The films are useful form many applications such as packaging foods, geomembranes and pond liners. It is preferred that these polymers have some crystallinity.
22. The polymers may be used to form flexible or rigid foamed objects, such as cores for various sports items such as surf boards and liners for protective headgear. Structural foams may also be made. It is preferred that the polymers have some crystallinity. The polymer of the foams may be crosslinked.

23. In powdered form the polymers may be used to coat objects by using plasma, flame spray or fluidized bed techniques.
24. Extruded films may be formed from these polymers, and these films may be treated, for example drawn. Such extruded films are useful for packaging of various sorts.
25. The polymers, especially those that are elastomeric, may be used in various types of hoses, such as automotive heater hose.
26. The polymers, especially those that are branched, are useful as pour point depressants for fuels and oils.
27. These polymers may be flash spun to nonwoven fabrics, particularly if they are crystalline (see EPSE vol. 10, p. 202–253) They may also be used to form spunbonded polyolefins (EPSE, vol. 6, p. 756–760). These fabrics are suitable as house wrap and geotextiles.
28. The highly branched, low viscosity polyolefins would be good as base resins for master-batching of pigments, fillers, flame-retardants, and related additives for polyolefins.
29. The polymers may be grafted with a compound containing ethylenic unsaturation and a functional group such as a carboxyl group or a derivative of a carboxyl group, such as ester, carboxylic anhydride of carboxylate salt. A minimum grafting level of about 0.01 weight percent of grafting agent based on the weight of the grafted polymer is preferred. The grafted polymers are useful as compatibilizers and/or tougheners. Suitable grafting agents include maleic, acrylic, methacrylic, itaconic, crotonic, alpha-methyl crotonic and cinnamic acids, anhydrides, esters and their metal salts and fumaric acid and their esters, anhydrides (when appropriate) and metal salts.

Copolymers of linear olefins with 4-vinylcyclohexene and other dienes may generally be used for all of the applications for which the linear olefins polymers(listed above) may be used. In addition they may be sulfur cured, so they generally can be used for any use for which EPDM polymers are used, assuming the olefin/4-vinylcyclohexene polymer is elastomeric.

Also described herein are novel copolymers of linear olefins with various polar monomers such as acrylic acid and acrylic esters. Uses for these polymers are given below. Abbreviations for references describing these uses in general with polymers are the same as listed above for polymers made from linear olefins.

1. Tackifiers for low strength:adhesives (U, vol. A1, p. 235–236) are a use for these polymers. Elastomeric and/or relatively low molecular weight polymers are preferred.
2. The polymers are useful as base resins for hot melt adhesives (U, vol. A1, p. 233–234), pressure sensitive adhesives (U, vol. A1, p. 235–236) or solvent applied adhesives. Thermoplastics are preferred for hot melt adhesives. The polymers may also be used in a carpet installation adhesive.
3. Base polymer for caulking of various kinds is another use. An elastomer is preferred. Lower molecular weight polymers are often used.
4. The polymers, particularly elastomers, may be used for modifying asphalt, to improve the physical properties of the asphalt and/or extend the life of asphalt paving, see U.S. Pat. No. 3,980,598.
5. Wire insulation and jacketing may be made from any of the polymers (see EPSE, vol. 17, p. 828–842). In the case of elastomers it may be preferable to crosslink the polymer after the insulation or jacketing is formed, for example by free radicals.
6. The polymers, especially the branched polymers, are useful as base resins for carpet backing, especially for automobile carpeting.
7. The polymers may be used for extrusion or coextrusion coatings onto plastics, metals, textiles or paper webs.
8. The polymers may be used as a laminating adhesive for glass.
9. The polymers are useful as for blown or cast films or as sheet (see EPSE, vol. 7 p. 88–106; ECT4, vol. 11, p. 843–856; PM, p. 252 and p. 432ff). The films may be single layer or multilayer, the multilayer films may include other polymers, adhesives, etc. For packaging the films may be stretch-wrap, shrink-wrap or cling wrap. The films are useful form many applications such as packaging foods, geomembranes and pond liners. It is preferred that these polymers have some crystallinity.
10. The polymers may be used to form flexible or rigid foamed objects, such as cores for various sports items such as surf boards and liners for protective headgear. Structural foams may also be made. It is preferred that the polymers have some crystallinity. The polymer of the foams may be crosslinked.
11. In powdered form the polymers may be used to coat objects by using plasma, flame spray or fluidized bed techniques.
12. Extruded films may be formed from these polymers, and these films may be treated, for example drawn. Such extruded films are useful for packaging of various sorts.
13. The polymers, especially those that are elastomeric, may be used in various types of hoses, such as automotive heater hose.
14. The polymers may be used as reactive diluents in automotive finishes, and for this purpose it is preferred that they have a relatively low molecular weight and/or have some crystallinity.
15. The polymers can be converted to ionomers, which when the possess crystallinity can be used as molding resins. Exemplary uses for these ionomeric molding resins are golf ball covers, perfume caps, sporting goods, film packaging applications, as tougheners in other polymers, and usually extruded) detonator cords.
16. The functional groups on the polymers can be used to initiate the polymerization of other types of monomers or to copolymerize with other types of monomers. If the polymers are elastomeric, they can act as toughening agents.
17. The polymers can act as compatibilizing agents between various other polymers.
18. The polymers can act as tougheners for various other polymers, such as thermoplastics and thermosets, particularly if the olefin/polar monomer polymers are elastomeric.
19. The polymers may act as internal plasticizers for other polymers in blends. A polymer which may be plasticized is poly(vinyl chloride).

20. The polymers can serve as adhesives between other polymers.

21. With the appropriate functional groups, the polymers may serve as curing agents for other polymers with complimentary functional groups (i.e., the functional groups of the two polymers react with each other).

22. The polymers, especially those that are branched, are useful as pour point depressants for fuels and oils.

23. Lubricating oil additives as Viscosity Index Improvers for multigrade engine oil (ECT3, Vol 14, p. 495–496) are another use. Branched polymers are preferred. Ethylene copolymer with acrylates or other polar monomers will also function as Viscosity Index Improvers for multigrade engine oil with the additional advantage of providing some dispersancy.

24. The polymers may be used for roofing membranes.

25. The polymers may be used as additives to various molding resins such as the so-called thermoplastic olefins to improve paint adhesion, as in automotive uses.

Polymers with or without polar monomers present are useful in the following uses. Preferred polymers with or without polar monomers are those listed above in the uses for each "type".

1. A flexible pouch made from a single layer or multilayer film (as described above) which may be used for packaging various liquid products such as milk, or powder such as hot chocolate mix. The pouch may be heat sealed. It may also have a barrier layer, such as a metal foil layer.

2. A wrap packaging film having differential cling is provided by a film laminate, comprising at least two layers; an outer reverse which is a polymer (or a blend thereof) described herein, which contains a tackifier in sufficent amount to impart cling properties; and an outer obverse which has a density of at least about 0.916 g/mL which has little or no cling, provided that a density of the outer reverse layer is at least 0.008 g/mL less than that of the density of the outer obverse layer. It is preferred that the outer obverse layer is linear low density polyethylene, and the polymer of the outer obverse layer have a density of less than 0.90 g/mL. All densities are measured at 25° C.

3. Fine denier fibers and/or multifilaments. These may be melt spun. They may be in the form of a filament bundle, a non-woven web, a woven fabric, a knitted fabric or staple fiber.

4. A composition comprising a mixture of the polymers herein and an antifogging agent. This composition is especially useful in film or sheet form because of its antifogging properties.

5. Elastic, randomly-branched olefin polymers are disclosed which have very good processability, including processing indices (PI's) less than or equal to 70 percent of those of a comparative linear olefin polymer and a critical shear rate at onset of surface melt fracture of at least 50 percent greater than the critical shear rate at the onset of surface melt fracture of a traditional linear olefin-polymer at about the same I2 and Mw/Mn. The novel polymers may have higher low/zero shear viscosity and lower high shear viscosity than comparative linear olefin polymers made by other means. These polymers may be characterized as having: a) a melt flow ratio, I10/I2, ≧5.63, b) a molecular weight distribution, Mw/Mn, defined by the equation: Mw/Mn≦(I10/I2)−4.63, and c) a critical shear rate at onset of surface melt fracture of at least 50 percent greater than the critical shear rate at the onset of surface melt fracture of a linear olefin polymer having about the same I2 and Mw/Mn. Some blends of these polymer are characterized as having: a) a melt flow ratio, I10/I2, ≧5.63, b) a molecular weight distribution, Mw/Mn, defined by the equation: Mw/Mn≦(I10/I2)−4.63, and c) a critical shear rate at onset of surface melt fracture of at least 50 percent greater than the critical shear rate at the onset of surface melt fracture of a linear olefin polymer having about the same I2 and Mw/Mn and (b) at least one other natural or synthetic polymer chosen from the polymer of claims 1, 3, 4, 6, 332, or 343, a conventional high density polyethylene, low. density polyethylene or linear low density polyethylene polymer. The polymers may be further characterized as having a melt flow ratio, I10/I2, ≧5.63, a molecular weight distribution, Mw/Mn, defined by the equation: Mw/Mn≦(Il0/I2)−4.63, and a critical shear stress at onset of gross melt fracture of greater than about 400 kPa (4×10$^6$ dyne/cm$^2$) and their method of manufacture are disclosed. The randomly-branched olefin polymers preferably have a molecular weight distribution from about 1.5 to about 2.5. The polymers described herein often have improved processability over conventional olefin polymers and are useful in producing fabricated articles such as fibers, films, and molded parts. For this paragraph, the value I2 is measured in accordance with ASTM D-1238-190/2.16 and I10 is measured in accordance with ASTM D-1238-190/10; critical shear rate at onset of surface melt fracture and processing index (PI) are defined in U.S. Pat. No. 5,278,272, which is hereby included by reference.

In another process described herein, the product of the process described herein is an α-olefin. It is preferred that in the process a linear α-olefin is produced. It is also preferred that the α-olefin contain 4 to 32, preferably 8 to 20, carbon atoms.

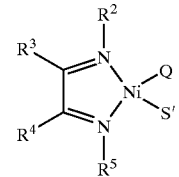

(XXXI)

When (XXXI) is used as a catalyst, a neutral Lewis acid or a cationic Lewis or Bronsted acid whose counterion is a weakly coordinating anion is also present as part of the catalyst system (sometimes called a "first compound" in the claims). By a "neutral Lewis acid" is meant a compound which is a Lewis acid capable for abstracting X$^-$ from (I) to form a weakly coordinating anion. The neutral Lewis acid is originally uncharged (i.e., not ionic). Suitable neutral Lewis acids include SbF$_5$, Ar$_3$B (wherein Ar is aryl), and BF$_3$. By a cationic Lewis acid is meant a cation with a positive charge such as Ag$^+$, H$^+$, and Na$^+$.

A preferred neutral Lewis acid is an alkyl aluminum compound, such as R$^9_3$Al, R$^9_2$AlCl, R$^9$AlCl$_2$, and "R$^9$AlO" (alkylaluminoxane), wherein R$^9$ is alkyl containing 1 to 25 carbon atoms, preferably 1 to 4 carbon atoms. Suitable alkyl aluminum compounds include methylaluminoxane, (C$_2$H$_5$)$_2$AlCl, C$_2$H$_5$AlCl$_2$, and [(CH$_3$)$_2$CHCH$_2$]$_3$Al.

Relatively noncoordinating anions are known in the art, and the coordinating ability of such anions is known and has been discussed in the literature, see for instance W. Beck., et al., Chem. Rev., vol. 88 p. 1405–1421 (1988), and S. H. Strauss, Chem. Rev., vol. 93, p. 927–942 (1993), both of which are hereby included by reference. Among such anions are those formed from the aluminum compounds in the immediately preceding paragraph and $X^-$, including $R^9_3AlX^-$, $R^9_2AlClX^-$, $R^9AlCl_2X^-$, and "$R^9AlOX^-$". Other useful noncoordinating anions include $BAF^-$ {BAF=tetrakis[3,5-bis(trifluoromethyl)phenyl]borate}, $SbF_6^-$, $PF_6^-$, and $BF_4^-$, trifluoromethanesulfonate, p-toluenesulfonate, $(R_fSO_2)_2N^-$, and $(C_6F_5)_4B^-$.

The temperature at which the process is carried out is about $-100°$ C. to about $+200°$ C., preferably about $0°$ C. to about $150°$ C., more preferably about $25°$ C. to about $100°$ C. It is believed that at higher temperatures, lower molecular weight α-olefins are produced, all other factors being equal. The pressure at which the polymerization is carried out is not critical, atmospheric pressure to about 275 MPa being a suitable range. It is also believed that increasing the pressure increases the relative amount of α-olefin (as opposed to internal olefin) produced.

The process to make α-olefins may be run in a solvent (liquid), and that is preferred. The solvent may in fact be the α-olefin produced. Such a process may be started by using a deliberately added solvent which is gradually displaced as the reaction proceeds. By solvent it is not necessarily meant that any or all of the starting materials and/or products are soluble in the (liquid) solvent.

In (I) it is preferred that $R^3$ and $R^4$ are both hydrogen or methyl or $R^3$ and $R^4$ taken together are

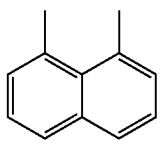

(An)

It is also preferred that each of Q and S' is independently chlorine or bromine, and it is more preferred that both of Q and S' in (XXXI) are chlorine or bromine.

In (XXXI) $R^2$ and $R^5$ are hydrocarbyl or substituted hydrocarbyl. What these groups are greatly determines whether the α-olefins of this process are made, or whether higher polymeric materials, i.e., materials containing over 25 ethylene units, are coproduced or produced almost exclusively. If $R^2$ and $R^5$ are highly sterically hindered about the nickel atom, the tendency is to produce higher polymeric material. For instance, when $R^2$ and $R^5$ are both 2,6-diisopropylphenyl mostly higher polymeric material is produced. However, when $R^2$ and $R^5$ are both phenyl, mostly the α-olefins of this process are produced. Of course this will also be influenced by other reaction conditions such as temperature and pressure, as noted above. Useful groups for $R^2$ and $R^5$ are phenyl and p-methylphenyl.

As is understood by the artisan, in oligomerization reactions of ethylene to produce α-olefins, usually a mixture of such α-olefins is obtained containing a series of such α-olefins differing from one another by two carbon atoms (an ethylene unit). The process for preparing α-olefins described herein produces products with a high percentage of terminal olefinic groups (as opposed to internal olefinic groups). The product mixture also contains a relatively high percentage of molecules which are linear. Finally relatively high catalyst efficiencies can be obtained.

The α-olefins described as being made herein may also be made by contacting ethylene with one of the compounds

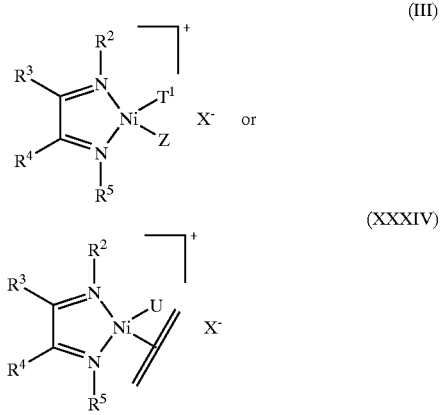

wherein $R^2$, $R^3$, $R^4$, and $R^5$ are as defined (and preferred) as described above (for the preparation of α-olefins), and $T^1$ is hydrogen or n-alkyl containing up to 38 carbon atoms, Z is a neutral Lewis base wherein the donating atom is nitrogen, sulfur, or oxygen, provided that if the donating atom is nitrogen then the pKa of the conjugate acid of that compound (measured in water) is less than about 6, U is n-alkyl containing up to 38 carbon atoms, and X is a noncoordinating anion (see above). The process conditions for making α-olefins using (III) or (XXXIV) are the same as for using (XXXI) to make these compounds except a Lewis or Bronsted acid need not be present. Note that the double line in (XXXIV) represents a coordinated ethylene molecule. (XXXIV) may be made from (II) by reaction of (III) with ethylene. In other words, (XXXIV) may be considered an active intermediate in the formation of α-olefin from (III). Suitable groups for Z include dialkyl ethers such as diethyl ether, and alkyl nitriles such as acetonitrile.

In general, α-olefins can be made by this process using as a catalyst a Ni[II] complex of an α-diimine of formula (VIII), wherein the Ni[II] complex is made by any of the methods which are described above, using Ni[0], Ni[I] or Ni[II] precursors. All of the process conditions, and preferred groups on (VIII), are the same as described above in the process for making α-olefins.

EXAMPLES

In the Examples, the following convention is used for naming α-diimine complexes of metals, and the α-diimine itself. The α-diimine is indicated by the letters "DAB". To the left of the "DAB" are the two groups attached to the nitrogen atoms, herein usually called $R^2$ and $R^5$. To the right of the "DAB" are the groups on the two carbon atoms of the α-diimine group, herein usually termed $R^3$ and $R^4$. To the right of all this appears the metal, ligands attached to the metal (such as Q, S' and T), and finally any anions (X), which when "free" anions are designated by a superscript minus sign (i.e., $X^-$). Of course if there is a "free" anion present, the metal containing moiety is cationic. Abbreviations for these groups are as described in the Specification in the Note after Table 1. Analogous abbreviations are used for α-diimines, etc.

In the Examples, the following abbreviations are used:
ΔHf—heat of fusion
acac—acetylacetonate
Bu—butyl
t-BuA—t-butyl acrylate
DMA—Dynamic Mechanical Analysis DME—1,2-dimethoxyethane
DSC—Differential Scanning Calorimetry
E—ethylene
EOC—end of chain
Et—ethyl
FC-75—perfluoro(n-butyltetrahydrofuran)
FOA—fluorinated octyl acrylate
GPC—gel permeation chromatography
MA—methyl acrylate
MAO—methylaluminoxane
Me—methyl
MeOH—methanol
MMAO—a modified methylaluminoxane in which about 25 mole percent of the methyl groups have been replaced by isobutyl groups
M-MAO—see MMAO
MMAO-3A—see MMAO
Mn—number average molecular weight
MVK—methyl vinyl ketone
Mw—weight average molecular weight
Mz—viscosity average molecular weight
PD or P/D—polydispersity, Mw/Mn
Ph—phenyl
PMAO—see MAO
PMMA—poly(methyl methacrylate)
Pr—propyl
PTFE—polytetrafluoroethylene
RI—refractive index
RT (or rt)—room temperature
TCE—1,1,2,2-tetrachloroethane
Tc—temperature of crystallization
Td—temperature of decomposition
Tg—glass transition temperature
TGA—Thermogravimetric Analysis
THF—tetrahydrofuran
Tm—melting temperature
TO—turnovers, the number of moles of monomer polymerized per g-atom of metal in the catalyst used
UV—ultraviolet Unless otherwise noted, all pressures are gauge pressures.

In the Examples, the following procedure was used to quantitatively determine branching, and the distribution of branch sizes in the polymers (but not necessarily the simple number of branches as measured by total number of methyl groups per 1000 methylene groups). 100 MHz $^{13}$C NMR spectra were obtained on a Varian Unity 400 MHz spectrometer using a 10 mm probe on typically 15–20 wt % solutions of the polymers and 0.05 M Cr(acetylacetonate)$_3$ in 1,2,4-trichlorobenzene (TCB) unlocked at 120–140° C. using a 90 degree pulse of 12.5 to 18.5 µsec, a spectral width of 26 to 35 kHz, a relaxation delay of 5–9 s, an acquisition time of 0.64 sec and gated decoupling. Samples were preheated for at least 15 min before acquiring data. Data acquisition time was typically 12 hr. per sample. The $T^1$ values of the carbons were measured under these conditions to be all less than 0.9 s. The longest $T^1$ measured was for the Bu$^+$, end of chain resonance at 14 ppm, which was 0.84 s. Occasionally about 16 vol. % benzene-d$_6$ was added to the TCB and the sample was run locked. Some samples were run in chloroform-d1, CDCl$_3$-d1, (locked) at 30° C. under similar acquisition parameters. $T^1$'s were also measured in CDCl$_3$ at ambient temperature on a typical sample with 0.05 M Cr(acetylacetonate)$_3$ to be all less than 0.68 s. In rare cases when Cr(acetylacetonate)$_3$ was not used, a 30–40 s recycle delay was used to insure quantitation. The glycidyl acrylate copolymer was run at 100° C. with Cr(acetylacetonate)$_3$. Spectra are referenced to the solvent—either the TCB highfield resonance at 127.8 ppm or the chloroform-d1 triplet at 77 ppm. A DEPT 135 spectrum was done on most samples to distinguish methyls and methines from methylenes. Methyls were distinguished from methines by chemical shift. EOC is end-of-chain. Assignments reference to following naming scheme:

1. xBy: By is a branch of length y carbons; x is the carbon being discussed, the methyl at the end of the branch is numbered 1. Thus the second carbon from the end of a butyl branch is 2B4. Branches of length y or greater are designated as y$^+$.
2. xEBy: EB is an ester ended branch containing y methylenes. x is the carbon being discussed, the first methylene adjacent to the ester carbonyl is labeled 1. Thus the second methylene from the end of a 5 methylene ester terminated branch would be 2EB5. $^{13}$C NMR of model compounds for EBy type branches for y=0 and y=5$^+$ confirm the peak positions and assignments of these branches. In addition, a model compound for an EB1 branch is consistent with 2 dimensional NMR data using the well know 2D NMR techniques of hsqc, hmbc, and hsqc-tocsy; the 2D data confirms the presence of the EB5$^+$, EB0, EB1 and other intermediate length EB branches.
3. The methylenes in the backbone are denoted with Greek letters which determine how far from a branch point methine each methylene is. Thus ββ (beta beta) B denotes the central methylene in the following PCHRCH$_2$CH$_2$CH$_2$CHRP. Methylenes that are three or more carbons from a branch point are designated as γ$^+$ (gamma$^+$).
4. When x in xBy or xEBy is replaced by a M, the methine carbon of that branch is denoted.

Integrals of unique carbons in each branch were measured and were reported as number of branches per 1000 methylenes (including methylenes in the backbone and branches). These integrals are accurate to +/− 5% relative for abundant branches and +/− 10 or 20% relative for branches present at less than 10 per 1000 methylenes.

Such types of analyses are generally known, see for instance "A Quantitative Analysis of Low Density (Branched) Polyethylenes by Carbon-13 Fourier Transform Nuclear Magnetic Resonance at 67.9 MHz", D. E. Axelson, et al., Macromolecules 12 (1979) pp. 41–52; "Fine Branching Structure in High-Pressure, Low Density Polyethylenes by 50.10-MHz 13C NMR Analysis", T. Usami et al., Macromolecules 17 (1984) pp. 1757–1761; and "Quantification of Branching in Polyethylene by 13C NMR Using Paramagnetic Relaxation Agents", J. V. Prasad, et al., Eur. Polym. J. 27 (1991) pp. 251–254 (Note that this latter paper is believed to have some significant typographical errors in it).

It is believed that in many of the polymers described herein which have unusual branching, i.e., they have more or fewer branches than would be expected for "normal" coordination polymerizations, or the distribution of sizes of the branches is different from that expected, that "branches on branches" are also present. By this is meant that a branch from the main chain on the polymer may itself contain one or more branches. It is also noted that the concept of a "main chain" may be a somewhat semantic argument if there are sufficient branches on branches in any particular polymer.

By a polymer hydrocarbyl branch is meant a methyl group to a methine or quaternary carbon atom or a group of consecutive methylenes terminated at one end by a methyl group and connected at the other end to a methine or quaternary carbon atom. The length of the branch is defined as the number of carbons from and including the methyl group to the nearest methine or quaternary carbon atom, but not including the methine or quaternary carbon atom. If the number of consecutive methylene groups is "n" then the branch contains (or the branch length is) n+1. Thus the structure (which represents part of a polymer) —CH$_2$CH$_2$CH[CH$_2$CH$_2$CH$_2$CH$_2$CH(CH$_3$)CH$_2$CH$_3$]CH$_2$CH$_2$CH$_2$CH$_2$— contains 2 branches, a methyl and an ethyl branch.

For ester ended branches a similar definition is used. An ester branch refers to a group of consecutive methylene groups terminated at one end by an ester —COOR group, and connected at the other end to a methine or quaternary carbon atom. The length of the branch is defined as the number of consecutive methylene groups from the ester group to the nearest methine or quaternary carbon atom, but not including the methine or quaternary carbon atom. If the number of methylene groups is "n", then the length of the branch is n. Thus —CH$_2$CH$_2$CH[CH$_2$CH$_2$CH$_2$CH$_2$CH(CH$_3$)CH$_2$COOR)]CH$_2$CH$_2$CH$_2$CH$_2$— contains 2 branches, a methyl and an n=1 ester branch.

The $^{13}$C NMR peaks for copolymers of cyclopentene and ethylene are described based on the labeling scheme and assignments of A. Jerschow et al, Macromolecules 1995, 28, 7095–7099. The triads and pentads are described as 1-cme, 1,3-ccmcc, 1,3-cmc, 2-cme, 2-cmc, 1,3-eme, 3-cme, and 4,5-cmc, where e=ethylene, c=cyclopentene, and m=meta cyclopentene (i.e. 1,3 enchainment). The same labeling is used for cyclopentene/1-pentene copolymer substituting p=pentene for e. The synthesis of diimines is reported in the literature (Tom Dieck, H.; Svoboda, M.; Grieser, T. *Z. Naturforsch* 1981, 36b, 823–832. Kliegman, J. M.; Barnes, R. K. *J. Org. Chem.* 1970, 35, 3140–3143.)

Example 1

[(2,6-i-PrPh)$_2$DABMe$_2$]PdMeCl

Et$_2$O (75 mL) was added to a Schlenk flask containing CODPdMeCl (COD=1,5-cyclooctadiene) (3.53 g, 13.3 mmol) and a slight excess of (2,6-i-PrPh)$_2$DABMe$_2$ (5.43 g, 13.4 mmol, 1.01 equiv). An orange precipitate began to form immediately upon mixing. The reaction mixture was stirred overnight and the Et$_2$O and free COD were then removed via filtration. The product was washed with an additional 25 mL of Et$_2$O and then dried overnight in vacuo. A pale orange powder (7.18 g, 95.8%) was isolated: $^1$H NMR (CD$_2$Cl$_2$, 400 MHz) δ 7.4–7.2 (m, 6, H$_{aryl}$), 3.06 (septet, 2, J=6.81, CHMe$_2$), 3.01 (septet, 2, J=6.89, C'HMe$_2$), 2.04 and 2.03 (N=C(Me)—C'(Me)=N), 1.40 (d, 6, J=6.79, C'HMeMe'), 1.36 (d, 6, J=6.76, CHMeMe'), 1.19 (d, 6, J=6.83, CHMeMe'), 1.18 (d, 6, J=6.87, C'HMeMe'), 0.36 (s, 3, PdMe); $^{13}$C NMR (CD$_2$Cl$_2$, 400 MHz) δ 175.0 and 170.3 (N=C—C'=N), 142.3 and 142.1 (Ar, Ar': C$_{ipso}$), 138.9 and 138.4 (Ar, Ar': C$_o$), 128.0 and 127.1 (Ar, Ar': C$_p$), 124.3 and 123.5 (Ar, Ar': C$_m$), 29.3 (CHMe$_2$), 28.8 (C'HMe$_2$), 23.9, 23.8, 23.5 and 23.3 (CHMeMe', C'HMeMe'), 21.5 and 20.1 (N=C(Me)—C'(Me)=N), 5.0 (J$_{CH}$=135.0, PdMe).

Example 2

[(2,6-i-PrPh)$_2$DABH$_2$]PdMeCl

Following the procedure of Example 1, an orange powder was isolated in 97.1% yield: $^1$H NMR (CD$_2$Cl$_2$, 400 MHz) δ 8.31 and 8.15 (s, 1 each, N=C(H)—C'(H)=N), 7.3–7.1 (m, 6, H$_{aryl}$), 3.22 (septet, 2, J=6.80, CHMe$_2$), 3.21 (septet, 2, J=6.86, C'HMe$_2$), 1.362, 1.356, 1.183 and 1.178 (d, 6 each, J=7.75–6.90; CHMeMe', C'HMeMe'), 0.67 (s, 3, PdMe); $^{13}$C NMR (CD$_2$Cl$_2$, 100 MHz) δ 164.5 (J$_{CH}$=179.0, N=C(H)), 160.6 (J$_{CH}$=178.0, N=C'(H)), 144.8 and 143.8 (Ar, Ar': C$_{ipso}$), 140.0 and 139.2 (Ar, Ar': C$_o$), 128.6 and 127.7 (Ar, Ar': C$_p$), 124.0 and 123.4 (Ar, Ar': C$_m$), 29.1 (CHMe$_2$), 28.6 (C'HMe$_2$), 24.7, 24.1, 23.1 and 22.7 (CHMeMe', C'HMeMe'), 3.0 (J$_{CH}$=134.0, PdMe). Anal. Calcd for (C$_{27}$H$_{39}$ClN$_2$Pd): C, 60.79; H, 7.37; N, 5.25. Found: C, 60.63; H, 7.24; N, 5.25.

Example 3

[(2,6-MePh)$_2$DABMe$_2$]PdMeCl

Following the procedure of Example 1, a yellow powder was isolated in 90.6% yield: $^1$H NMR (CD$_2$Cl$_2$, 400 MHz) δ 7.3–6.9 (m, 6, H$_{aryl}$), 2.22 (s, 6, Ar, Ar': Me), 2.00 and 1.97 (N=C(Me)—C'(Me)=N), 0.25 (s, 3, PdMe).

Example 4

[(2,6-MePh)$_2$DABMe$_2$]PdMeCl

Following the procedure of Example 1, an orange powder was isolated in 99.0% yield: $^1$H NMR (CD$_2$Cl$_2$, 400 MHz, 41° C.) δ 8.29 and 8.14 (N=C(H)—C'(H)=N), 7.2–7.1 (m, 6, H$_{aryl}$), 2.33 and 2.30 (s, 6 each, Ar, Ar': Me), 0.61 (s, 3, PdMe); $^{13}$C NMR (CD$_2$Cl$_2$, 100 MHz, 41° C.) δ 165.1 (J$_{CH}$=179.2, N=C(H)), 161.0 (J$_{CH}$=177.8 (N=C'(H)), 147.3 and 146.6 (Ar, Ar': C$_{ipso}$), 129.5 and 128.8 (Ar, Ar': C$_o$), 128.8 and 128.5 (Ar, Ar': C$_m$), 127.9 and 127.3 (Ar, Ar': C$_p$), 18.7 and 18.2 (Ar, Ar': Me), 2.07 (J$_{CH}$=136.4, PdMe).

Example 5

[4-MePh)$_2$DABMe$_2$]PdMeCl

Following the procedure of Example 1, a yellow powder was isolated in 92.1% yield: $^1$H NMR (CD$_2$Cl$_2$, 400 MHz) δ 7.29 (d, 2, J=8.55, Ar: H$_m$), 7.26 (d, 2, J=7.83, Ar': H$_m$), 6.90 (d, 2, J=8.24, Ar': H$_o$), 6.83 (d, 2, J=8.34, Ar: H$_o$), 2.39 (s, 6, Ar, Ar': Me), 2.15 and 2.05 (s, 3 each, N=C(Me)—C'(Me)=N), 0.44 (s, 3, PdMe); $^{13}$C NMR (CD$_2$Cl$_2$, 100 MHz) δ 176.0 and 169.9 (N=C—C'=N), 144.9 and 143.7 (Ar, Ar': C$_{ipso}$), 137.0 and 136.9 (Ar, Ar': C$_p$), 130.0 and 129.3 (Ar, Ar': C$_m$), 122.0 and 121.5 (Ar, Ar': C$_o$), 21.2 (N=C(Me)), 20.1 (Ar, Ar': Me), 19.8 (N=C'(Me)), 2.21 (J$_{CH}$=135.3, PdMe). Anal. Calcd for (C$_{19}$H$_{23}$ClN$_2$Pd): C, 54.17; H, 5.50; N, 6.65. Found: C, 54.41; H, 5.37; N, 6.69.

Example 6

[(4-MePh)$_2$DABH$_2$]PdMeCl

Following the procedure of Example 1, a burnt orange powder was isolated in 90.5% yield: Anal. Calcd for (C$_{17}$H$_{19}$ClN$_2$Pd): C, 51.93; H, 4.87; N, 7.12. Found: C, 51.36; H, 4.80; N, 6.82.

Example 7

<{[(2,6-i-PrPh)$_2$DABMe$_2$]PdMe}$_2$($\mu$-Cl)>BAF$^-$

Et$_2$O (25 mL) was added to a mixture of [(2,6-i-PrPh)$_2$DABMe$_2$]PdMeCl (0.81 g, 1.45 mmol) and 0.5 equiv of NaBAF (0.64 g, 0.73 mmol) at room temperature. A golden yellow solution and NaCl precipitate formed immediately upon mixing. The reaction-mixture was stirred overnight and then filtered. After the Et$_2$O was removed in vacuo, the product was washed with 25 mL of hexane. The yellow powder was then dissolved in 25 mL of CH$_2$Cl$_2$ and the resulting solution was filtered in order to removed traces of unreacted NaBAF. Removal of CH$_2$Cl$_2$ in vacuo yielded a golden yellow powder (1.25 g, 88.2%): $^1$H NMR (CD$_2$Cl$_2$, 400 MHz) δ 7.73 (s, 8, BAF: H$_o$), 7.57 (s, 4, BAF: H$_p$), 7.33 (t, 2, J=7.57, Ar: H$_p$), 7.27 (d, 4, J=7.69, Ar: H$_o$), 7.18 (t, 2, J=7.64, Ar: H$_p$), 7.10 (d, 4, J=7.44, Ar': H$_o$), 2.88 (septet, 4, J=6.80, CHMe$_2$), 2.75 (septet, 4, J=6.82, C'HMe$_2$), 2.05 and 2.00 (s, 6 each, N=C(Me)—C'(Me)=N), 1.22, 1.13, 1.08 and 1.01 (d, 12 each, J=6.61–6.99, CHMeMe', C'HMeMe'), 0.41 (s, 6, PdMe); $_{13}$ C NMR (CD$_2$Cl$_2$, 100 MHz) δ 177.1 and 171.2 (N=C—C'=N), 162.2 (q, J$_{BC}$=49.8, BAF: C$_{ipso}$) 141.4 and 141.0 (Ar, Ar': C$_{ipso}$) 138.8 and 138.1 (Ar, Ar': C$_o$), 135.2 (BAF: C$_p$), 129.3 (q, J$_{CF}$=31.6, BAF: C$_m$), 128.6 and 127.8 (Ar, Ar': C$_p$), 125.0 (q, J$_{CF}$=272.5, BAF: CF$_3$), 124.5 and 123.8 (Ar, Ar': C$_m$), 117.9 (BAF: C$_p$), 29.3 (CHMe$_2$), 29.0 (C'HMe$_2$), 23.8, 23.7, 23.6 and 23.0 (CHMeMe', C'HMeMe'), 21.5 and 20.0 (N=C(Me)—C' (Me)=N), 9.8 (J$_{CH}$=136.0, PdMe). Anal. Calcd for (C$_{90}$H$_{98}$BClF$_{24}$N$_4$Pd$_2$): C, 55.41; H, 5.06; N, 2.87. Found: C, 55.83; H, 5.09; N, 2.63.

Example 8

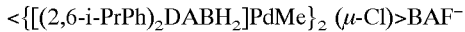

The procedure of Example 7 was followed with one exception, the removal of CH$_2$Cl$_2$ in vacuo yielded a product that was partially an oil. Dissolving the compound in Et$_2$O and then removing the Et$_2$O in vacuo yielded a microcrystalline red solid (85.5%): $^1$H NMR (CD$_2$Cl$_2$, 400 MHz) δ 8.20 and 8.09 (s, 2 each, N=C(H)—C'(H)=N), 7.73 (s, 8, BAF: H$_o$), 7.57 (s, 4, BAF: H$_p$), 7.37 (t, 2, J=7.73, Ar: H$_p$), 7.28 (d, 4, J=7.44, Ar: H$_m$), 7.24 (t, 2, Ar': H$_p$), 7.16 (d, 4, J=7.19, Ar': H$_m$), 3.04 (septet, 4, J=6.80, CHMe$_2$), 2.93 (septet, 4, J=6.80, C'HMe$_2$), 1.26 (d, 12, J=6.79, CHMeMe'), 1.14 (d, 12, J=6.83, CHMeMe'), 1.11 (d, 12, J=6.80, C'HMeMe'), 1.06 (d, 12, J=6.79, C'HMeMe'), 0.74 (s, 6, PdMe); $^{13}$C NMR (CD$_2$Cl$_2$, 100 MHz) δ 166.0 (J$_{CH}$=180.4, N=C(H)), 161.9 (q, J$_{BC}$=49.6, BAF: C$_{ipso}$), 160.8 (J$_{CH}$=179.9, N=C'(H)), 143.5 and 143.0 (Ar, Ar': C$_{ipso}$), 139.8 and 138.9 (Ar, Ar': C$_o$), 135.2 (BAF: C$_o$), 129.3 (q, J$_{CF}$=31.4, BAF: C$_m$), 129.3 and 128.5 (Ar, Ar': C$_p$), 125.0 (q, J$_{CF}$=272.4, BAF: CF$_3$), 124.3 and 123.7 (Ar, Ar': C$_m$), 117.9 (BAF: C$_p$), 29.2 and 28.9 (CHMe$_2$, C'HMe$_2$), 24.5, 24.1, 23.0, and 22.5 (CHMeMe', C'HMeMe'), 10.3 (PdMe). Anal. Calcd for (C$_{86}$H$_{90}$BClF$_{24}$N$_4$Pd$_2$): C, 54.52; H, 4.97; N, 2.96. Found: C, 54.97; H, 4.72; N, 2.71.

Example 9

Alternatively, the products of Examples 7 and 8 have been synthesized by stirring a 1:1 mixture of the appropriate PdMeCl compound and NaBAF in Et$_2$O for ~1 h. Removal of solvent yields the dimer+0.5 equiv of Na$_+$(OEt$_2$)$_2$BAF$^-$. Washing the product mixture with hexane yields ether-free NaBAF, which is insoluble in CH$_2$Cl$_2$. Addition of CH$_2$Cl$_2$ to the product mixture and filtration of the solution yields salt-free dimer: $^1$H NMR spectral data are identical with that reported above.

For a synthesis of CODPdMe$_2$, see: Rudler-Chauvin, M., and Rudler, H. *J. Organomet. Chem.* 1977, 134, 115–119.

Example 10

[(2,6-i-PrPh)$_2$DABMe$_2$]PdMe$_2$

A Schlenk flask containing a mixture of [(2,6-i-PrPh)$_2$DABMe$_2$]PdMeCl (2.00 g, 3.57 mmol) and 0.5 equiv of Me$_2$Mg (97.2 mg, 1.79 mmol) was cooled to −78° C., and the reaction mixture was then suspended in 165 mL of Et$_2$O. The reaction mixture was allowed to warm to room temperature and then stirred for 2 h, and the resulting brown solution was then filtered twice. Cooling the solution to −30° C. yielded brown single crystals (474.9 mg, 24.6%, 2 crops): $^1$H NMR (C$_6$D$_6$, 400 MHz) δ 7.2–7.1 (m, 6, H$_{aryl}$), 3.17 (septet, 4, J=6.92, CHMe$_2$), 1.39 (d, 12, J=6.74, CHMeMe'), 1.20 (N=C(Me)—C(Me)=N), 1.03 (d, 12, J=6.89, CHMeMe'), 0.51 (s, 6, PdMe); $^{13}$C NMR (C$_6$D$_6$, 100 MHz) δ 168.4 (N=C—C=N), 143.4 (Ar: C$_{ipso}$), 138.0 (Ar: C$_o$), 126.5 (Ar: C$_p$), 123.6 (Ar: C$_m$), 28.8 (CHMe$_2$), 23.6 and 23.5 (CHMeMe'), 19.5 (N=C(Me)—C(Me)=N), −4.9 (J$_{CH}$=127.9, PdMe). Anal. Calcd for (C$_{30}$H$_{46}$N$_2$Pd): C, 66.59; H, 8.57; N, 5.18. Found: C, 66.77; H, 8.62; N, 4.91.

Example 11

The synthesis of this compound in a manner analogous to Example 10, using 3.77 mmol of ArN=C(H)—C(H)=NAr and 1.93 mmol of Me$_2$Mg yielded 722.2 mg (37.4%) of a deep brown microcrystalline powder upon recrystallization of the product from a hexane/toluene solvent mixture.

This compound was also synthesized by the following method: A mixture of Pd(acac)$_2$ (2.66 g, 8.72 mmol) and corresponding diimine (3.35 g, 8.90 mmol) was suspended in 100 mL of Et$_2$O, stirred for 0.5 h at room temperature, and then cooled to −78° C. A solution of Me$_2$Mg (0.499 g, 9.18 mmol) in 50 mL of Et$_2$O was then added via cannula to the cold reaction mixture. After stirring for 10 min at −78° C., the yellow suspension was allowed to warm to room temperature and stirred for an additional hour. A second equivalent of the diimine was then added to the reaction mixture and stirring was continued for ~4 days. The brown Et$_2$O solution was then filtered and the solvent was removed in vacuo to yield a yellow-brown foam. The product was then extracted with 75 mL of hexane, and the resulting solution was filtered twice, concentrated, and cooled to −30° C. overnight to yield 1.43 g (32.0%) of brown powder: $^1$H NMR (C$_6$D$_6$, 400 MHz) δ 7.40 (s, 2, N=C(H)—C(H)=N), 7.12 (s, 6, H$_{aryl}$), 3.39 (septet, 4, J=6.86, CHMe$_2$), 1.30 (d, 12, J=6.81, CHMeMe'), 1.07 (d, 12, J =6.91, CHMeMe'), 0.77 (s, 6, PdMe); $^{13}$C NMR (C$_6$D$_6$, 100 MHz) δ 159.9 (J$_{CH}$=174.5, N=C(H)—C(H)=N), 145.7 (Ar: C$_{ipso}$), 138.9 (Ar: C$_o$), 127.2 (Ar: C$_p$), 123.4 (Ar: C$_m$), 28.5 (CHMe$_2$), 24.4 and 22.8 (CHMeMe'), −5.1 (J$_{CH}$=128.3, PdMe). Anal. Calcd for (C$_{28}$H$_{42}$N$_2$Pd): C, 65.55, H, 8.25; N, 5.46. Found: C, 65.14; H, 8.12; N, 5.14.

Example 12

[(2,6-MePh)$_2$DABH$_2$]PdMe$_2$

This compound was synthesized in a manner similar to the second procedure of Example 11 (stirred for 5 h at rt) using 5.13 mmol of the corresponding diimine and 2.57 mmol of Me$_2$Mg. After the reaction mixture was filtered, removal of Et$_2$O in vacuo yielded 1.29 g (62.2%) of a deep brown microcrystalline solid: $^1$H NMR (C$_6$D$_6$, 100 MHz, 12° C.) δ 6.98 (s, 2, N=C(H)—C(H)=N), 6.95 (s, 6, H$_{aryl}$), 2.13 (s, 12, Ar: Me), 0.77 (s, 6, PdMe); $^{13}$C NMR (C$_6$D$_6$, 400 MHz, 12° C.) δ 160.8 (J$_{CH}$=174.6, N=C(H)—C(H) =N), 147.8 (Ar: C$_{ipso}$) 128.2 (Ar: C$_m$), 128.15 (Ar: C$_o$), 126.3 (Ar: C$_p$), 18.2 (Ar: Me), −5.5 (J$_{CH}$=127.6, Pd-Me).

Example 13

The synthesis of this compound has been reported (Svoboda, M.; tom Dieck, H. *J. Organomet. Chem.* 1980, 191, 321–328) and was modified as follows: A mixture of Ni(acac)$_2$ (1.89 g, 7.35 mmol) and the corresponding diimine (2.83 g, 7.51 mmol) was suspended in 75 mL of Et$_2$O and the suspension was stirred for 1 h at room temperature. After cooling the reaction mixture to −78° C., a solution of Me$_2$Mg (401 mg, 7.37 mmol) in 25 mL of Et$_2$O was added via cannula. The reaction mixture was stirred for 1 h at −78° C. and then for 2 h at 0° C. to give a blue-green solution. After the solution was filtered, the Et$_2$O was removed in vacuo to give a blue-green brittle foam. The product was then dissolved in hexane and the resulting solution was filtered twice, concentrated, and then cooled to −30° C. to give 1.23 g (35.9%, one crop) of small turquoise crystals.

Example 14

[(2,6-i-PrPh)$_2$DABMe$_2$]NiMe$_2$

The synthesis of this compound has been reported (Svoboda, M.; tom Dieck, H. *J. Organomet. Chem.* 1980, 191, 321–328) and was synthesized according to the above modified procedure (Example 13) using Ni(acac)$_2$ (3.02 g, 11.75 mmol), the corresponding diimine (4.80 g, 11.85 mmol) and Me$_2$Mg (640 mg, 11.77 mmol). A turquoise powder was isolated (620 mg, 10.7%).

Example 15

{[(2,6-MePh)$_2$DABMe$_2$]PdMe(MeCN)}BAF$^-$

To a mixture of [(2,6-MePh)$_2$DABMe$_2$]PdMeCl (109.5 mg, 0.244 mmol) and NaBAF (216.0 mg, 0244 mmol) were added 20 mL each of Et$_2$O and CH$_2$Cl$_2$ and 1 mL of CH$_3$CN. The reaction mixture was then stirred for 1.5 h and then the NaCl was removed via filtration. Removal of the solvent in vacuo yielded a yellow powder, which was washed with 50 mL of hexane. The product (269.6 mg, 83.8%) was then dried in vacuo: $^1$H NMR (CD$_2$Cl$_2$, 400 MHz) δ 7.73 (s, 8, BAF: H$_o$), 7.57 (s, 4, BAF: H$_p$), 7.22–7.16 (m, 6, H$_{aryl}$), 2.23 (s, 6, Ar: Me), 2.17 (s, 6, Ar': Me), 2.16, 2.14, and 1.79 (s, 3 each, N═C(Me)—C'(Me)═N, NCMe), 0.38 (s, 3, PdMe); $^{13}$C NMR (CD$_2$Cl$_2$, 100 MHz) δ 180.1 and 172.2 (N═C—C'═N), 162.1 (q, J$_{BC}$=49.9, BAF: C$_{ipso}$), 142.9 (Ar, Ar': C$_o$), 135.2 (BAF: C$_o$), 129.3 (Ar: C$_m$), 129.2 (q, J$_{CF}$=30.6, BAF: C$_m$), 129.0 (Ar': C$_m$), 128.4 (Ar: C$_p$), 128.2 (Ar: C$_o$), 127.7 (Ar': C$_p$), 127.4 (Ar': C$_o$), 125.0 (q, J$_{CF}$=272.4, BAF: CF$_3$), 121.8 (NCMe), 117.9 (BAF: C$_p$), 20.2 and 19.2 (N═C. (Me)—C'(Me)═N), 18.0 (Ar: Me), 17.9 (Ar': Me), 5.1 and 2.3 (NCMe, PdMe). Anal. Calcd for (C$_{55}$H$_{42}$BF$_{24}$N$_3$Pd): C, 50.12; H, 3.21; N, 3.19. Found: C, 50.13; H, 3.13, N, 2.99.

Example 16

{[(4-MePh)$_2$DABMe$_2$]PdMe(MeCN)}BAF$^-$

Following the procedure of Example 15, a yellow powder was isolated in 85% yield: $^1$H NMR (CD$_2$Cl$_2$, 400 MHz) δ 7.81 (s, 8, BAF: H$_o$), 7.73 (s, 4, BAF: H$_p$), 7.30 (d, 4, J=8.41, Ar, Ar': H$_m$), 6.89 (d, 2, J=8.26, Ar: H$_o$), 6.77 (d, 2, J=8.19, Ar': H$_o$), 2.39 (s, 6, Ar, Ar': Me), 2.24, 2.17 and 1.93 (s, 3 each, N═C(Me)—C'(Me)═N, NCMe) Pd-Me; $^{13}$C NMR (CD$_2$Cl$_2$, 100 MHz) δ 180.7 and 171.6 (N═C—C'═N), 162.1 (q, J$_{BC}$=49.8, BAF: C$_{ipso}$), 143.4 and 142.9 (Ar, Ar': C$_{ipso}$), 138.6 and 138.5 (Ar, Ar': C$_p$), 135.2 (BAF: C$_o$), 130.6 and 130.4 (Ar, Ar': C$_m$), 129.3 (q, J$_{CF}$=31.6, BAF: C$_m$), 125.0 (q, J$_{CF}$=272.5, BAF: CF$_3$), 122.1 (NCMe), 121.0 and 120.9 (Ar, Ar': C$_o$), 117.9 (BAF: C$_p$), 21.5 (ArN═C(Me)), 21.1 (Ar, Ar': Me), 19.7 (ArN═C'(Me)), 6.2 and 3.0 (NCMe, PdMe). Anal. Calcd for (C$_{53}$H$_{38}$BF$_{24}$N$_3$Pd): C, 49.34; H. 2.97: N, 3.26. Found: C, 49.55; H, 2.93; N, 3.10.

Example 17

[(2,6-MePh)$_2$DABMe$_2$]PdMe(Et$_2$O)BAF$^-$

A Schlenk flask containing a mixture of [(2,6-i-PrPh)$_2$DABMe$_2$]PdMe$_2$ (501 mg, 0.926 mmol) and H$^+$(OEt$_2$)$_2$ BAF$^-$ (938 mg, 0.926 mmol) was cooled to −78° C. Following the addition of 50 mL of Et$_2$O, the solution was allowed to warm and stirred briefly (~15 min) at room temperature. The solution was then filtered and the solvent was removed in vacuo to give a pale orange powder (1.28 g, 94.5%), which was stored at −30° C. under an inert atmosphere: $^1$H NMR (CD$_2$Cl$_2$, 400 MHz, −60° C.) δ 7.71 (s, 8, BAF: H$_o$), 7.58 (s, 4, BAF: H$_p$), 7.4–7.0 (m, 6, H$_{aryl}$), 3.18 (q, 4, J=7.10, O(CH$_2$CH$_3$)$_2$), 2.86 (septet, 2, J=6.65, CHMe$_2$), 2.80 (septet, 2, J=6.55, C'HMe$_2$), 2.18 and 2.15 (N═C(Me)—C'(Me)═N), 1.34, 1.29, 1.14 and 1.13 (d, 6 each, J=6.4–6.7, CHMeMe', C'HMeMe'), 1.06 (t, J=6.9, O(CH$_2$CH$_3$)$_2$), 0.33 (s, 3, PdMe); $^{13}$C NMR (CD$_2$Cl$_2$, 100 MHz, −60° C.) δ 179.0 and 172.1 (N═C—C'═N), 161.4 (q, J$_{BC}$=49.7, BAF: C$_{ipso}$), 140.21 and 140.15 (Ar, Ar': C$_{ipso}$) 137.7 and 137.4 (Ar, Ar': C$_o$), 134.4 (BAF: C$_p$), 128.3 (q, J$_{CF}$=31.3, BAF: C$_m$), 128.5 and 128.2 (Ar, Ar': C$_p$), 124.2 (q, J$_{CF}$=272.4, BAF: CF$_3$), 117.3 (BAF: C$_p$), 71.5 (O(CH$_2$CH$_3$)$_2$), 28.7 (CHMe$_2$), 28.4 (C'HMe$_2$), 23.7, 23.6, 23.1 and 22.6 (CHMeMe', C'HMeMe'), 21.5 and 20.7 (N═C(Me)—C'(Me)═N), 14.2 (O(CH$_2$CH$_3$)$_2$), 8.6 (PdMe). Anal. Calcd for (C$_{65}$H$_{65}$BF$_{24}$N$_2$OPd): C, 53.35; H, 4.48; N, 1.91. Found: C, 53.01; H, 4.35; N, 1.68.

Example 18

[(2,6-MePh)$_2$DABH$_2$]PdMe(Et$_2$O)BAF$^-$

Following the procedure of Example 17, an orange powder was synthesized in 94.3% yield and stored at −30° C.: $^1$H NMR (CD$_2$Cl$_2$, 400 MHz, −60° C.) δ 8.23 and 8.20 (s, 1 each, N═C(H)—C'(H)═N), 7.72 (s, 8, BAF: H$_o$), 7.54 (s, 4, BAF: H$_p$), 7.40–7.27 (m, 6, H$_{aryl}$), 3.32 (q, 4, J=6.90, O(CH$_2$CH$_3$)$_2$), 3.04 and 3.01. (septets, 2 each, J=6.9–7.1, CHMe$_2$ and C'HMe$_2$), 1.32, 1.318, 1.14 and 1.10 (d, 6 each, J=6.5–6.8, CHMeMe' and C'HMeMe'), 1.21 (t, 6, J=6.93, O(CH$_2$CH$_3$)$_2$), 0.70 (s, 3, PdMe); $^{13}$C NMR (CD$_2$Cl$_2$, 100 MHz, −60° C.) δ 166.9 (J$_{CH}$=182.6, N═C(H)), 161.5 (J$_{BC}$=49.7, BAF: C$_{ipso}$), 161.3 (J$_{CH}$=181.6, N═C'(H)), 143.0 and 141.8 (Ar, Ar': C$_{ipso}$), 138.7 and 137.8 (Ar, Ar': C$_o$), 134.4 (BAF: C$_o$), 129.1 and 128.8 (Ar, Ar': C$_p$), 128.3 (J$_{CF}$=31.3, BAF: C$_m$), 124.0 and 123.9 (Ar, Ar': C$_m$), 117.3 (BAF: C$_p$), 72.0 (O(CH$_2$CH$_3$)$_2$), 28.5 and 28.4 (CHMe$_2$, C'HMe$_2$), 25.2, 24.1, 21.9 and 21.7 (CHMeMe', C'HMeMe'), 15.2 (O(CH$_2$CH$_3$)$_2$), 11.4 (J$_{CH}$=137.8, PdMe). Anal. Calcd for (C$_{63}$H$_{61}$BF$_{24}$N$_2$OPd): C, 52.72; H, 4.28; N, 1.95. Found: C, 52.72; H, 4.26; N, 1.86.

Example 19

[(2,6-MePh)$_2$DABMe$_2$]NiMe(Et$_2$O)BAF$^-$

Following the procedure of Example 17, a magenta powder was isolated and stored at −30° C.: $^1$H NMR (CD$_2$Cl$_2$, 400 MHz, −60° C.; A H$_2$O adduct and free Et$_2$O were observed.) δ 7.73 (s, 8, BAF: H$_o$), 7.55 (s, 4, BAF: H$_p$), 7.4–7.2 (m, 6, H$_{aryl}$), 342 (s, 2, OH$_2$), 3.22 (q, 4, O(CH$_2$CH$_3$)$_2$), 3.14 and 3.11. (septets, 2 each, J=7.1, CHMe$_2$, C'HMe$_2$), 1.95 and 1.78 (s, 3 each, N═C(Me)—C'(Me)═N), 1.42, 1.39, 1.18 and 1.11 (d, 6 each, J=6.6–6.9, CHMeMe' and C'HMeMe'), 0.93 (t, J=7.5, O(CH$_2$CH$_3$)$_2$), −0.26 (s ,3, NiMe); $^{13}$C NMR (CD$_2$Cl$_2$ 100 MHz, −58° C.) δ 175.2 and 170.7 (N═C—C'═N), 161.6 (q, J$_{BC}$=49.7, BAF: C$_{ipso}$), 141.2 (Ar: C$_{ipso}$), 139.16 and 138.68 (Ar, Ar': C$_o$), 136.8 (Ar': C$_{ipso}$), 134.5 (BAF: C$_o$), 129.1 and 128.4 (Ar, Ar': C$_p$), 128.5 (q, J$_{CF}$=32.4, BAF: C$_m$), 125.0 and 124.2 (Ar, Ar': C$_m$), 124.3 (q, J$_{CF}$=272.5, BAF: CF$_3$), 117.4 (BAF: C$_p$), 66.0 (O(CH$_2$CH$_3$)$_2$), 29.1 (CHMe$_2$), 28.9 (C'HMe$_2$), 23.51, 23.45, 23.03, and 22.95 (CHMeMe', C'HMeMe'), 21.0 and 19.2 (N═C(Me)—C'(Me)═N), 14.2 (OCH$_2$CH$_3$)$_2$), −0.86 (J$_{CH}$=131.8, NiMe). Anal. Calcd for (C$_{65}$H$_{65}$BF$_{24}$N$_2$NiO): C, 55.15; H, 4.63; N, 1.98. Found: C, 54.74; H, 4.53; N, 2.05.

Example 20

[(2,6-MePh)$_2$DABH$_2$]NiMe(Et$_2$O)BAF$^-$

Following the procedure of Example 17, a purple powder was obtained and stored at −30° C.: $^1$H NMR (CD$_2$Cl$_2$, 400 MHz, −80° C.; H$_2$O and Et$_2$O adducts were observed in an 80:20 ratio, respectively.) δ 8.31 and 8.13 (s, 0.8 each, N═C(H)—C'(H)═N; H$_2$O Adduct), 8.18 and 8.00 (s, 0.2 each, N═C(H)—C'(H)═N; Et$_2$O Adduct), 7.71 (s, 8 BAF: C$_o$), 7.53 (s, 4, BAF: C$_p$), 7.5–7.0 (m, 6, H$_{aryl}$), 4.21 (s, 1.6, OH$_2$), 3.5–3.1 (m, 8, O(CH$_2$CH$_3$)$_2$, CHMe$_2$, C'HMe$_2$), 1.38, 1.37, 1.16 and 1.08 (d, 4.8 each, CHMeMe', C'HMeMe'; H$_2$O Adduct; These peaks overlap with and obscure the CHMe$_2$ doublets of the Et$_2$O adduct.), 0.27 (s, 2.4, PdMe; H$_2$O Adduct), 0.12 (s, 0.6, PdMe: Et$_2$O Adduct).

Examples 21–23

The rate of exchange of free and bound ethylene was determined by $^1$H NMR line broadening experiments at −85° C. for complex (XI), see the Table below. The NMR instrument was a 400 MHz Varian® NMR spectrometer. Samples were prepared according to the following procedure: The palladium ether adducts {[(2,6-i-PrPh)$_2$DABMe$_2$]PdMe(OEt$_2$)}BAF, {[(2,6-i-PrPh)$_2$An]PdMe(OEt$_2$)}BAF, and {[(2,6-i-PrPh)$_2$DABH$_2$]PdMe(OEt$_2$)}BAF were used as precursors to (XI), and were weighed (~15 mg) in a tared 5 mm dia. NMR tube in a nitrogen-filled drybox. The tube was then capped with a septum and Parafilm® and cooled to −80° C. Dry, degassed CD$_2$Cl$_2$ (700 μL) was then added to the palladium complex via gastight syringe, and the tube was shaken and warmed briefly to give a homogeneous solution. After acquiring a −85° C. NMR spectrum, ethylene was added to the solution via gastight syringe and a second NMR spectrum was acquired at −85° C. The molarity of the BAF counterion was calculated according to the moles of the ether adduct placed in the NMR tube. The molarity of (XI) and free ethylene were calculated using the BAF peaks as an internal standard. Line-widths (W) were measured at half-height in units of Hz for the complexed ethylene signal (usually at 5 to 4 ppm) and were corrected for line widths (W$_o$) in the absence of exchange.

For (XI) the exchange rate was determined from the standard equation for the slow exchange approximation:

where [═] is the molar concentration of ethylene. These experiments were repeated twice and an average value is reported below.

| Rate Constants for Ethylene Exchange[a] | | |
|---|---|---|
| Ex. | (XI) | k (L·M$^{-1}$s$^{-1}$) |
| 21 | {[(2,6-i-PrPh)$_2$DABMe$_2$] PdMe (═) }BAF | 45 |
| 22 | {[(2,6-i-PrPh)$_2$An] PdMe (═) }BAF | 520 |
| 23 | {[(2,6-i-PrPh)$_2$DABH$_2$] PdMe (═) }BAF | 8100 |

[a]The T$_1$ of free ethylene is 15 sec. A pulse delay of 60 sec and a 30° pulse width were used.

Example 24

Anhydrous FeCl$_2$ (228 mg, 1.8 mmol) and (2,6-i-PrPh)$_2$DABAn (1.0 g, 2.0 mmol) were combined as solids and dissolved in 40 ml of CH$_2$Cl$_2$. The mixture was stirred at 25° C. for 4 hr. The resulting green solution was removed from the unreacted FeCl$_2$ via filter cannula. The solvent was removed under reduced pressure resulting in a green solid (0.95 g, 84% yield).

A portion of the green solid (40 mg) was immediately transferred to another Schlenk flask and dissolved in 50 ml of toluene under 1 atm of ethylene. The solution was cooled to 0° C., and 6 ml of a 10% MAO solution in toluene was added. The resulting purple solution was warmed to 25° C. and stirred for 11 hr. The polymerization was quenched and the polymer precipitated by acetone. The resulting polymer was washed with 6M HCl, water and acetone. Subsequent drying of the polymer resulted in 60 mg of white polyethylene. $^1$H NMR (CDCl$_3$, 200 MHz) δ 1.25 (CH$_2$, CH) δ 0.85 (m, CH$_3$).

Example 25

(2-t-BuPh)$_2$DABMe$_2$

A Schlenk tube was charged with 2-t-butylaniline (5.00 mL, 32.1 mmol) and 2,3-butanedione (1.35 mL, 15.4 mmol). Methanol (10 mL) and formic acid (1 mL) were added and a yellow precipitate began to form almost immediately upon stirring. The reaction mixture was allowed to stir overnight. The resulting yellow solid was collected via filtration and dried under vacuum. The solid was dissolved in ether and dried over Na$_2$SO$_4$ for 2–3 h. The ether solution was filtered, condensed and placed into the freezer (−30° C.). Yellow crystals were isolated via filtration and dried under vacuum overnight (4.60 g, 85.7%): $^1$H NMR (CDCl$_3$, 250 MHz) δ 7.41 (dd, 2H, J=7.7, 1.5 Hz, H$_m$), 7.19 (td, 2H, J=7.5, 1.5 Hz, H$_m$ or H$_p$), 7.07 (td, 2H, J=7.6, 1.6 Hz, H$_m$ or H$_p$), 6.50 (dd, 2H, J=7.7, 1.8 Hz, H$_o$), 2.19 (s, 6H, N═C(Me)—C(Me)═N), 1.34 (s, 18H, C(CH$_3$)$_3$).

Examples 26 and 27

General Polymerization Procedure for Examples 26 and 27: In the drybox, a glass insert was loaded with [(η$^3$-C$_3$H$_5$)Pd(μ-Cl)]$_2$ (11 mg, 0.03 mmol), NaBAF (53 mg, 0.06 mmol), and an α-diimine ligand (0.06 mmol). The insert was cooled to −35° C. in the drybox freezer, 5 mL of C$_6$D$_6$ was added to the cold insert, and the insert was then capped and sealed. Outside of the drybox, the cold tube was placed under 6.9 MPa of ethylene and allowed to warm to RT as it was shaken mechanically for 18 h. An aliquot of the solution was used to acquire a $^1$H NMR spectrum. The remaining portion was added to ~20 mL of MeOH in order to precipitate the polymer. The polyethylene was isolated and dried under vacuum.

Example 26

α-Diimine was (2,6-i-PrPh)$_2$DABMe$_2$. Polyethylene (50 mg) was isolated as a solid. $^1$H NMR spectrum (C$_6$D$_6$) is consistent with the production of 1- and 2-butenes and branched polyethylene.

Example 27

α-Diimine was (2,6-i-PrPh)$_2$DABAn. Polyethylene (17 mg) was isolated as a solid. $^1$H NMR spectrum (C$_6$D$_6$) is consistent with the production of branched polyethylene.

Example 28

[(2,6-i-PrPh)$_2$DABH$_2$]NiBr$_2$

The corresponding diimine (980 mg, 2.61 mmol) was dissolved in 10 mL of CH$_2$Cl$_2$ in a Schlenk tube under a N$_2$ atmosphere. This solution was added via cannula to a suspension of (DME)NiBr$_2$ (DME=1,2-dimethoxyethane) (787 mg, 2.55 mmol) in CH$_2$C$_2$ (20 mL). The resulting red/brown mixture was stirred for 20 hours. The solvent was evaporated under reduced pressure resulting in a red/brown solid. The product was washed with 3×10 mL of hexane and dried in vacuo. The product was isolated as a red/brown powder (1.25 g, 82% yield).

Example 29

[(2,6-i-PrPh)$_2$DABMe$_2$]NiBr$_2$

Using a procedure similar to that of Example 28, 500 mg (1.62 mmol) (DME)NiBr$_2$ and 687 mg (1.70 mmol) of the corresponding diimine were combined. The product was isolated as an orange/brown powder (670 mg, 67% yield).

Example 30

[(2,6-MePh)$_2$DABH$_2$]NiBr$_2$

Using a procedure similar to that of Example 28, 500 mg (1.62 mmol) (DME)NiBr$_2$ and 448 mg (1.70 mmol) of the corresponding diimine were combined. The product was isolated as a brown powder (622 mg, 80% yield).

Example 31

[(2,6-i-PrPh)$_2$DABAn]NiBr$_2$

Using a procedure similar to that of Example 28, 500 mg (1.62 mmol) (DME)NiBrg and 850 mg (1.70 mmol) of the corresponding diimine were combined. The product was isolated as a red powder (998 mg, 86% yield). Anal. Calcd. for C$_{36}$H$_{40}$N$_2$Br$_2$Ni: C, 60.12; H, 5.61; N, 3.89. Found C, 59.88; H, 5.20; N, 3.52.

Example 32

[(2,6-MePh)$_2$DABAn]NiBr$_2$

The corresponding diimine (1.92 g, 4.95 mmol) and (DME)NiBr$_2$ (1.5 g, 4.86 mmol) were combined as solids in a flame dried Schlenk under an argon atmosphere. To this mixture 30 mL of CH$_2$Cl$_2$ was added giving an orange solution. The mixture was stirred for 18 hours resulting in a red/brown suspension. The CH$_2$Cl$_2$ was removed via filter cannula leaving a red/brown solid. The product was washed with 2×10 mL of CH$_2$Cl$_2$ and dried under vacuum. The product was obtained as a red/brown powder (2.5 g, 83% yield).

Example 33

[(2,6-MePh)$_2$DABMe$_2$]NiBr$_2$

Using a procedure similar to that of Example 32, the title compound was made from 1.5 g (4.86 mmol) (DME)NiBr$_2$ and 1.45 g (4.95 mmol) of the corresponding diimine. The product was obtained as a brown powder (2.05 g, 81% yield).

Example 34

[(2,6-i-PrPh)$_2$DABMe$_2$]PdMeCl (COD)PdMeCl (9.04 g, 34.1 mmol) was dissolved in 200 ml of methylene chloride. To this solution was added the corresponding diimine (13.79 g, 34.1 mmol). The resulting solution rapidly changed color from yellow to orange-red. After stirring at room temperature for several hours it was concentrated to form a saturated solution of the desired product, and cooled to −40° C. overnight. An orange solid crystallized from the solution, and was isolated by filtration, washed with petroleum ether, and dried to afford 12.54 g of the title compound as an orange powder. Second and third crops of crystals obtained from the mother liquor afforded an additional 3.22 g of product. Total yield=87%.

Examples 35–39

The following compounds were made by a method similar to that used in Example 34.

| Example | Compound |
|---------|----------|
| 35 | [(2,6-i-PrPh)$_2$DABH$_2$] PdMeCl |
| 36 | [(2,6-i-PrPh)$_2$DABAn] PdMeCl |
| 37 | [(Ph)$_2$DABMe$_2$] PdMeCl |
| 38 | [(2,6-EtPh)$_2$DABMe$_2$] PdMeCl |
| 39 | [(2,4,6-MePh)$_2$DABMe$_2$] PdMeCl |

Note: The diethyl ether complexes described in Examples 41–46 are unstable in non-coordinating solvents such as methylene chloride and chloroform. They are characterized by $^1$H NMR spectra recorded in CD$_3$CN; under these conditions the acetonitrile adduct of the Pd methyl cation is formed. Typically, less than a whole equivalent of free diethylether is observed by $^1$H NMR when [(R)$_2$DAB(R')$_2$]PdMe(OEt$_2$)X is dissolved in CD$_3$CN. Therefore, it is believed the complexes designated as "{[(R)$_2$DAB(R')$_2$]PdMe(OEt$_2$)}X" below are likely mixtures of {[(R)$_2$DAB(R')$_2$]PdMe(OEt$_2$)}X and [(R)$_2$DAB(R')$_2$]PdMeX, and in the latter complexes the X ligand (SbF$_6$, BF$_4$, or PF$_6$) is weakly coordinated to palladium. A formula of the type "{[(R)$_2$DAB(R')$_2$]PdMe(OEt$_2$)}X" is a "formal" way of conveying the approximate overall composition of this compound, but may not accurately depict the exact coordination to the metal atom.

Listed below are the $^{13}$C NMR data for Example 36.

| $^{13}$C NMR data TCB, 120 C, 0.05 M CrAcAc | | |
|---|---|---|
| freq ppm | intensity | |
| 46.5568 | 24.6005 | 1 cmp and/or 1,3 ccmcc |
| 44.9321 | 3.42517 | 1,3 cmc |
| 40.8118 | 55.4341 | 2 pmp |
| 40.3658 | 145.916 | 1,3 pmp |
| 39.5693 | 18.458 | methylenes from 2 cmp and/or 2 cmc |
| 38.7782 | 4.16118 | |
| 38.6295 | 5.84037 | |
| 38.2844 | 8.43098 | |

-continued

¹³C NMR data
TCB, 120 C, 0.05 M CrAcAc

| freq ppm | intensity | |
|---|---|---|
| 38.1198 | 8.29802 | |
| 37.8384 | 3.83966 | |
| 37.5198 | 13.4977 | |
| 37.2384 | 23.4819 | |
| 37.1163 | 16.8339 | |
| 36.7446 | 114.983 | |
| 36.0012 | 6.19217 | |
| 35.7198 | 5.17495 | |
| 34.2278 | 4.83958 | |
| 32.9216 | 20.2781 | 3B$_6$⁺, 3EOC |
| 32.619 | 3.6086 | |
| 32.4172 | 2.98497 | |
| 32.1995 | 10.637 | |
| 31.9765 | 42.2547 | |
| 31.8809 | 143.871 | |
| 30.4686 | 27.9974 | |
| 30.3199 | 47.1951 | |
| 30.0225 | 36.1409 | |
| 29.7411 | 102.51 | |
| 29.311 | 4.83244 | |
| 28.7111 | 117.354 | |
| 28.2597 | 9.05515 | |
| 27.1659 | 22.5725 | |
| 27.0067 | 5.81855 | |
| 26.1146 | 13.5772 | |
| 24.5642 | 2.59695 | ββB$^B$ |
| 22.6368 | 12.726 | 2B$_s$⁺, 2EOC |
| 20.1413 | 3.7815 | 2B$_3$ |
| 19.7271 | 20.0959 | 1B$_1$ |
| 17.5236 | 7.01554 | end group |
| 14.2528 | 3.03535 | 1B$_3$ |
| 13.8812 | 12.3635 | 1B$_4$⁺, 1EOC |

Example 40

{[(4-Me$_2$NPh)$_2$DABMe$_2$]PdMe(MeCN)}SbF$_6$·MeCN

A procedure analogous to that used in Example 54, using (4-Me$_2$NPh)$_2$DABMe$_2$ in place of (2-C$_6$H$_4$-$^t$Bu)$_2$DABMe$_2$, afforded {[(4-NMe$_2$Ph)$_2$DABMe$_2$]PdMe(MeCN)}SbF$_6$·MeCN as a purple solid (product was not recrystallized in this instance). ¹H NMR (CD$_2$Cl$_2$) δ 6.96 (d, 2H, H$_{aryl}$), 6.75 (mult, 6H, H$_{aryl}$), 3.01 (s, 6H, NMe$_2$), 2.98 (s, 6H, NMe'$_2$), 2.30, 2.18, 2.03, 1.96 (s's, 3H each, N=CMe, N=CMe', and free and coordinated N≡CMe), 0.49 (s, 3H, Pd-Me).

Example 41

{[(2,6-i-PrPh)$_2$DABMe$_2$]PdMe(Et$_2$O)$_n$}SbF$_6$⁻

[(2,6-i-PrPh)$_2$DABMe$_2$]PdMeCl (0.84 g, 1.49 mmol) was suspended in 50 mL of diethylether and the mixture cooled to −40° C. To this was added AgSbF$_6$ (0.52 g, 1.50 mmol). The reaction mixture was allowed to warm to room temperature, and stirred at room temperature for 90 min. The reaction mixture was then filtered, giving a pale yellow filtrate and a bright yellow precipitate. The yellow precipitate was extracted with 4×20 mL 50/50 methylene chloride/diethyl ether. The filtrate and extracts were then combined with an additional 30 mL diethyl ether. The resulting solution was then concentrated to half its original volume and 100 mL of petroleum ether added. The resulting precipitate was filtered off and dried, affording 1.04 g of the title compound as a yellow-orange powder (83% yield). ¹H NMR (CD$_3$CN) δ 7.30 (mult, 6H, H$_{aryl}$), 3.37 [q, free O(CH$_2$CH$_3$)$_2$], 3.05–2.90 (overlapping sept's, 4H, CHMe$_2$), 2.20 (s, 3H, N=CMe), 2.19 (s, 3H, N=CMe'), 1.35–1.14 (overlapping d's, 24H, CHMe$_2$), 1.08 (t, free O(CH$_2$CH$_3$)$_2$], 0.28 (s, 3H, Pd-Me). This material contained 0.4 equiv of Et$_2$O per Pd, as determined by ¹H NMR integration.

Example 42

{[(2,6-i-PrPh)$_2$DABMe$_2$]PdMe(Et$_2$O)$_n$}BF$_4$⁻

A procedure analogous to that used in Example 41, using AgBF$_4$ in place of AgSbF$_6$, afforded the title compound as a mustard yellow powder in 61% yield. This material contained 0.3 equiv of Et$_2$O per Pd, as determined by ¹H NMR integration. ¹H NMR in CD$_3$CN was otherwise identical to that of the compound made in Example 41.

Example 43

{[(2,6-i-PrPh)$_2$DABMe$_2$]PdMe(Et$_2$O)$_n$}PF$_6$⁻

A procedure analogous to that used in Example 41, using AgPF$_6$ in place of AgSbF$_6$, afforded the title compound as a yellow-orange powder in 72% yield. This material contained 0.4 equiv of Et$_2$O per Pd, as determined by ¹H NMR integration. ¹H NMR in CD$_3$CN was identical to that of the compound of Example 41.

Example 44

{[(2,6-i-PrPh)$_2$DABH$_2$]PdMe(Et$_2$O)$_n$}SbF$_6$⁻

A procedure analogous to that used in Example 41, using [(2,6-i-PrPh)$_2$DABH$_2$]PdMeCl in place of [(2,6-i-PrPh)$_2$DABMe$_2$]PdMeCl, afforded the title compound in 71% yield. ¹H NMR (CD$_3$CN) δ 8.30 (s, 2H, N=CH and N=CH'), 7.30 (s, 6H, H$_{aryl}$), 3.37 [q, free O(CH$_2$CH$_3$)$_2$], 3.15 (br, 4H, CHMe$_2$), 1.40–1.10 (br, 24H, CHMe$_2$), 1.08 (t, free O(CH$_2$CH$_3$)$_2$], 0.55 (s, 3H, Pd-Me). This material contained 0.5 equiv of Et$_2$O per Pd, as determined by ¹H NMR integration.

Example 45

{[(2,4,6-MePh)$_2$DABMe$_2$]PdMe(Et$_2$O)$_n$}SbF$_6$⁻

[(2,4,6-MePh)$_2$DABMe$_2$]PdMeCl (0.50 g, 1.05 mmol) was partially dissolved in 40 mL 50/50 methylene chloride/diethylether. To this mixture at room temperature was added AgSbF$_6$ (0.36 g, 1.05 mmol). The resulting reaction mixture was stirred at room temperature for 45 min. It was then filtered, and the filtrate concentrated in vacuo to afford an oily solid. The latter was washed with diethyl ether and dried to afford the title compound as a beige powder. ¹H NMR (CD$_3$CN) δ 6.99 (s, 4H, H$_{aryl}$), 3.38 [q, free O(CH$_2$CH$_3$)$_2$], 2.30–2.00 (overlapping s's, 24H, N=CMe, N=CMe' and aryl Me's), 1.08 (t, free O(CH$_2$CH$_3$)$_2$], 0.15 (s, 3H, Pd-Me). This material contained 0.7 equiv of Et$_2$O per Pd, as determined by ¹H MR integration.

Example 46

{[(2,6-i-PrPh)$_2$DABAn]PdMe(Et$_2$O)$_n$}SbF$_6$⁻

A procedure analogous to that used in Example 41, using [(2,6-i-PrPh)$_2$DABAn]PdMeCl in place of [(2,6-i-PrPh)$_2$DABMe$_2$]PdMeCl, afforded the title compound in 92% yield. ¹H NMR (CD$_3$CN) δ 8.22 (br t, 2H, H$_{aryl}$), 7.60–7.42 (br mult, 8H, H$_{aryl}$), 6.93 (br d, 1H, H$_{aryl}$), 6.53 (br d, 1H, H$_{aryl}$), 3.38 [q, free O(CH$_2$CH$_3$)$_2$], 3.30 (br mult, 4H, CHMe$_2$), 1.36 (br d, 6H, CHMe$_2$), 1.32 (br d, 6H, CHMe$_2$), 1.08 (t, free O(CH$_2$CH$_3$)$_2$], 1.02 (br d, 6H, CHMe$_2$), 0.92 (br d, 6H, CHMe$_2$), 0.68 (s, 3H, Pd-Me). The amount of ether contained in the product could not be determined precisely by $^1$H NMR integration, due to overlapping resonances.

Example 47

[(2,6-i-PrPh)$_2$DABMe$_2$]PdMe(OSO$_2$CF$_3$)

A procedure analogous to that used in Example 41, using AgOSO$_2$CF$_3$ in place of AgSbF$_6$, afforded the title compound as a yellow-orange powder. $^1$H NMR in CD$_3$CN was identical to that of the title compound of Example 41, but without free ether resonances.

Example 48

{[(2,6-i-PrPh)$_2$DABMe$_2$]PdMe(MeCN)}SbF$_6^-$

[(2,6-i-PrPh)$_2$DABMe$_2$]PdMeCl (0.40 g, 0.71 mmol) was dissolved in 15 mL acetonitrile to give an orange solution. To this was added AgSbF$_6$ (0.25 g, 0.71 mmol) at room temperature. AgCl immediately precipitated from the resulting bright yellow reaction mixture. The mixture was stirred at room temperature for 3 h. It was then filtered and the AgCl precipitate extracted with 5 mL of acetonitrile. The combined filtrate and extract were concentrated to dryness affording a yellow solid. This was recrystallized from methylene chloride/petroleum ether affording 0.43 g of the title compound as a bright yellow powder (Yield=75%). $^1$H NMR (CDCl$_3$) δ 7.35–7.24 (mult, 6H, H$_{aryl}$), 2.91 (mult, 4H, C. HMe$_2$), 2.29 (s, 3H, N=CMe), 2.28 (s, 3H, N=CMe'), 1.81 (s, 3H, N≡CMe), 1.37–1.19 (overlapping d's, 24H, CHMe's), 0.40 (s, 3H, Pd-Me). This compound can also be prepared by addition of acetonitrile to {[(2,6-i-PrPh)$_2$DABMe$_2$]PdMe(Et$_2$O)}SbF$_6^-$.

Example 49

{[(Ph)$_2$DABMe$_2$]PdMe(MeCN)}SbF$_6^-$

A procedure analogous to that used in Example 48, using [(Ph)$_2$DABMe$_2$]PdMeCl in place of [(2,6-i-PrPh)$_2$DABMe$_2$]PdMeCl, afforded the title compound as a yellow microcrystalline solid upon recrystallization from methylene chloride/petroleum ether. This complex crystallizes as the acetonitrile solvate from acetonitrile solution at −40° C. $^1$H NMR of material recrystallized from methylene chloride/petroleum ether: (CDCl$_3$) δ 7.46 (mult, 4H, H$_{aryl}$), 7.30 (t, 2H, H$_{aryl}$), 7.12 (d, 2H, H$_{aryl}$), 7.00 (d, 2H, H$_{aryl}$), 2.31 (s, 3H, N=CMe), 2.25 (s, 3H, N=CMe'), 1.93 (s, 3H, N≡CMe), 0.43 (s, 3H, Pd-Me).

Example 50

{[(2,6-EtPh)$_2$DABMe$_2$]PdMe(MeCN)}BAF$^-$

[(2,6-EtPh)$_2$DABMe$_2$]PdMeCl (0.200 g, 0.396 mmol) was dissolved in 10 mL of acetonitrile to give an orange solution. To this was added NaBAF (0.350 g, 0.396 mmol). The reaction mixture turned bright yellow and NaCl precipitated. The reaction mixture was stirred at room temperature for 30 min and then filtered through a Celite® pad. The Celite® pad was extracted with 5 mL of acetonitrile. The combined filtrate and extract was concentrated in vacuo to afford an orange solid, recrystallization of which from methylene chloride/petroleum ether at −40° C. afforded 0.403 g of the title compound as orange crystals (Yield =74%). $^1$H NMR (CDCl$_3$) δ 7.68 (s, 8H, Hortho of anion), 7.51 (s, 4H, H$_{para}$ of anion), 7.33–7.19 (mult, 6H, H$_{aryl}$ of cation), 2.56–2.33 (mult, 8H, CH$_2$CH$_3$), 2.11 (s, 3H, N=CMe), 2.09 (s, 3H, N=CMe'), 1.71 (s, 3H, N≡CMe), 1.27–1.22 (mult, 12H, CH$_2$CH$_3$), 0.41 (s, 3H, Pd-Me).

Example 51

{[(2,6-EtPh)$_2$DABMe$_2$]PdMe(MeCN)}SbF$_6^-$

A procedure analogous to that used in Example 50, using AgSbF$_6$ in place of NaBAF, afforded the title compound as yellow crystals in 99% yield after recrystallization from methylene chloride/petroleum ether at −40° C.

Example 52

[(COD)PdMe(NCMe)]SbF$_6^-$

To (COD)PdMeCl (1.25 g, 4.70 mmol) was added a solution of acetonitrile (1.93 g, 47.0 mmol) in 20 mL methylene chloride. To this clear solution was added AgSbF$_6$ (1.62 g, 4.70 mmol). A white solid immediately precipitated. The reaction mixture was stirred at room temperature for 45 min, and then filtered. The yellow filtrate was concentrated to dryness, affording a yellow solid. This was washed with ether and dried, affording 2.27 g of [(COD)PdMe(NCMe)]SbF$_6^-$ as a light yellow powder (yield=95%). $^1$H NMR (CD$_2$Cl$_2$) δ 5.84 (mult, 2H, CH=CH), 5.42 (mult, 2H, CH'=CH'), 2.65 (mult, 4H, CHH'), 2.51 (mult, 4H, CHH'), 2.37 (s, 3H, NCMe), 1.18 (s, 3H, Pd-Me).

Example 53

[(COD)PdMe(NCMe)]BAF$^-$

A procedure analogous to that used in Example 52, using NaBAF in place of AgSbF$_6$, afforded the title compound as a light beige powder in 96% yield.

Example 54

{[(2-t-BuPh)$_2$DABMe$_2$]PdMe(MeCN)}SbF$_6^-$

To a suspension of (2-t-BuPh)$_2$DABMe$_2$ (0.138 g, 0.395 mmol) in 10 mL of acetonitrile was added [(COD)PdMe(NCMe)]SbF$_6$ (0.200 g, 0.395 mmol). The resulting yellow solution was stirred at room temperature for 5 min. It was then extracted with 3×10 mL of petroleum ether. The yellow acetonitrile phase was concentrated to dryness, affording a bright yellow powder. Recrystallization from methylene chloride/petroleum ether at −40° C. afforded 180 mg of the title product as a bright yellow powder (yield=61%). $^1$H NMR (CD$_2$Cl$_2$) δ 7.57 (dd, 2H, H$_{aryl}$), 7.32 (mult, 4H, H$_{aryl}$), 6.88 (dd, 2H, H$_{aryl}$), 6.78 (dd, 2H, H$_{aryl}$), 2.28 (s, 3H, N=CMe), 2.22 (s, 3H, N=CMe'), 1.78 (s, 3H, N≡CMe), 1.48 (s, 18H, $^t$Bu), 0.52 (s, 3H, Pd-Me).

Example 55

{[(Np)$_2$DABMe$_2$]PdMe(MeCN)}SbF$_6^-$

A procedure analogous to that used in Example 54, using (Np)$_2$DABMe$_2$ in place of (2-t-BuPh)$_2$DABMe$_2$, afforded the title compound as an orange powder in 52% yield after two recrystallizations from methylene chloride/petroleum ether. $^1$H NMR (CD$_2$Cl$_2$) δ 8.20–7.19 (mult, 14H, H$_{aromatic}$), 2.36 (d, J=4.3 Hz, 3H, N=CMe), 2.22 (d, J=1.4 Hz, 3H, N=CMe'), 1.32 (s, 3H, NCMe), 0.22 (s, 3H, Pd-Me).

Example 56

{[(Ph$_2$CH)$_2$DABH$_2$]PdMe(MeCN)}SbF$_6^-$

A procedure analogous to that used in Example 54, using (Ph$_2$CH)$_2$DABH$_2$ in place of (2-t-BuPh)$_2$DABMe$_2$, afforded the title compound as a yellow microcrystalline solid. $^1$H NMR (CDCl$_3$) δ 7.69 (s, 1H, N=CH), 7.65 (s, 1H, N=CH'), 7.44–7.08 (mult, 20H, H$_{aryl}$), 6.35 (2, 2H, CHPh$_2$), 1.89 (s, 3H, NCMe), 0.78 (s, 3H, Pd-Me).

Example 57

{[(2-PhPh)$_2$DABMe$_2$]PdMe(MeCN)}SbF$_6^-$

A procedure analogous to that used in Example 54, using (2-PhPh)$_2$DABMe$_2$ in place of (2-t-BuPh)$_2$DABMe$_2$, afforded the title compound as a yellow-orange powder in 90% yield. Two isomers, due to cis or trans orientations of the two ortho phenyl groups on either side of the square plane, were observed by $^1$H NMR. $^1$H NMR (CD$_2$Cl$_2$) δ 7.80–6.82 (mult, 18H, H$_{aryl}$), 1.98, 1.96, 1.90, 1.83, 1.77, 1.73 (singlets, 9H, N=CMe, N=CMe', NCMe for cis and trans isomers), 0.63, 0.61 (singlets, 3H, Pd-Me for cis and trans isomers).

Example 58

{[(Ph)$_2$DAB(cyclo-CMe$_2$CH$_2$CMe$_2$—)]PdMe(MeCN)}BAF$^-$

To a solution of [(COD)PdMe(NCMe)]BAF$^-$ (0.305 g, 0.269 mmol) dissolved in 15 mL of acetonitrile was added N,N'-diphenyl-2,2',4,4'-tetramethyl-cyclopentyldiazine (0.082 g, 0.269 mmol). A gold colored solution formed rapidly and was stirred at room temperature for 20 min. The solution was then extracted with 4×5 mL petroleum ether, and the acetonitrile phase concentrated to dryness to afford a yellow powder. This was recrystallized from methylene chloride/petroleum ether at −40° C. to afford 0.323 g (90%) of the title compound as a yellow-orange, crystalline solid. $^1$H NMR (CDCl$_3$) δ 7.71 (s, 8H, H$_{ortho}$ of anion), 7.54 (s, 4H, H$_{para}$ of anion), 7.45–6.95 (mult, 10H, H$_{aryl}$ of cation), 1.99 (s, 2H, CH$_2$), 1.73 (s, 3H, NCMe), 1.15 (s, 6H, Me$_2$), 1.09 (s, 6H, Me'$_2$), 0.48 (s, 3H, Pd-Me).

Example 59

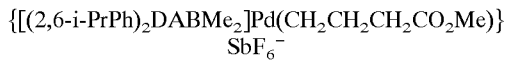
{[(2,6-i-PrPh)$_2$DABMe$_2$]Pd(CH$_2$CH$_2$CH$_2$CO$_2$Me)}SbF$_6^-$ Under a nitrogen atmosphere {[(2,6-i-PrPh)$_2$DABMe$_2$]PdMe(Et$_2$O)}SbF$_6^-$ (3.60 g, 4.30 mmol) was weighed into a round bottom flask containing a magnetic stirbar. To this was added a −40° C. solution of methyl acrylate (1.85 g, 21.5 mmol) dissolved in 100 ml of methylene chloride. The resulting orange solution was stirred for 10 min, while being allowed to warm to room temperature. The reaction mixture was then concentrated to dryness, affording a yellow-brown solid. The crude product was extracted with methylene chloride, and the orange-red extract concentrated, layered with an equal volume of petroleum ether, and cooled to −40° C. This afforded 1.92 g of the title compound as yellow-orange crystals. An additional 1.39 g was obtained as a second crop from the mother liquor; total yield=91%. $^1$H NMR (CD$_2$Cl$_2$) δ 7.39–7.27 (mult, 6H, H$_{aryl}$), 3.02 (s, 3H; OMe), 2.97 (sept, 4H, CBMe$_2$), 2.40 (mult, 2H, CH$_2$), 2.24 (s, 3H, N=CMe), 2.22 (s, 3H, N=CMe'), 1.40–1.20 (mult, 26H, CHMe$_2$ and CH$_2$'), 0.64 (mult, 2H, CH$_2$").

Example 60

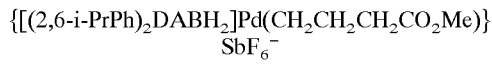
{[(2,6-i-PrPh)$_2$DABH$_2$]Pd(CH$_2$CH$_2$CH$_2$CO$_2$Me)}SbF$_6^-$

AgSbF$_6$ (0.168 g, 0.489 mmol) was added to a −40° C. solution of {[(2,6-i-PrPh)$_2$DABH$_2$]PdMeCl (0.260 g, 0.487 mmol) and methyl acrylate (0.210 g, 2.44 mmol) in 10 mL methylene chloride. The reaction mixture was stirred for 1 h while warming to room temperature, and then filtered. The filtrate was concentrated in vacuo to give a saturated solution of the title compound, which was then layered with an equal volume of petroleum ether and cooled to −40° C. Red-orange crystals precipitated from the solution. These were separated by filtration and dried, affording 0.271 g of the title compound (68% yield). $^1$H NMR (CD$_2$Cl$_2$) δ 8.38 (s, 1H, N=CH), 8.31 (s, 1H, N=CH'), 7.41–7.24 (mult, 6H, H$_{aryl}$), 3.16 (mult, 7H, OMe and ChMe$_2$), 2.48 (mult, 2H, CH$_2$), 1.65 (t, 2H, CH$_2$'), 1.40–1.20 (mult, 24H, CHMe$_2$), 0.72 (mult, 2H, CH$_2$").

Example 61

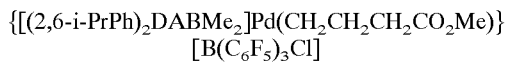
{[(2,6-i-PrPh)$_2$DABMe$_2$]Pd(CH$_2$CH$_2$CH$_2$CO$_2$Me)}[B(C$_6$F$_5$)$_3$Cl]

[(2,6-i-PrPh)$_2$DABMe$_2$]PdMeCl (0.038 g, 0.067 mmol) and methyl acrylate (0.028 g, 0.33 mmol) were dissolved in CD$_2$Cl$_2$. To this solution was added B(C$_6$F$_5$)$_3$ (0.036 g, 0.070 mmol). $^1$H NMR of the resulting reaction mixture showed formation of the title compound.

Example 62

A 100 mL autoclave was charged with chloroform (50 mL), {[(2-t-BuPh)$_2$DABMe$_2$]PdMe(NCMe)}SbF$_6^-$ (0.090 g, 0.12 mmol), and ethylene (2.1 MPa). The reaction mixture was stirred at 25° C. and 2.1 MPa ethylene for 3 h. The ethylene pressure was then vented and volatiles removed from the reaction mixture in vacuo to afford 2.695 g of branched polyethylene. The number average molecular weight (M$_n$), calculated by $^1$H NMR integration of aliphatic vs. olefinic resonances, was 1600. The degree of polymerization, DP, was calculated on the basis of the $^1$H NMR spectrum to be 59; for a linear polymer this would result in 18 methyl-ended branches per 1000 methylenes. However, based on the $^1$H NMR spectrum the number of methyl-ended branches per 1000 methylenes was calculated to be 154. Therefore, it may be concluded that this material was branched polyethylene. $^1$H NMR (CDCl$_3$) δ 5.38 (mult, vinyl H's), 1.95 (mult, allylic methylenes), 1.62 (mult, allylic methyls), 1.24 (mult, non-allylic methylenes and methines), 0.85 (mult, non-allylic methyls).

Example 63

A suspension of {[(2-t-BuPh)$_2$DABMe$_2$]PdMe(NCMe)}SbF$_6^-$ (0.015 g, 0.02 mmol) in 5 mL FC-75 was agitated under 2.8 MPa of ethylene for 30 min. The pressure was then increased to 4.1 MPa and maintained at this pressure for 3 h. During this time the reaction temperature varied between 25 and 40° C. A viscous oil was isolated from the reaction mixture by decanting off the FC-75 and dried in vacuo. The number average molecular weight (M$_n$), calculated by $^1$H NMR integration of aliphatic vs. olefinic resonances, was 2600. DP for this material was calculated on the basis of the $^1$H NMR spectrum to be 95; for a linear polymer this would result in 11 methyl-ended branches per 1000 methylenes. However, based on the $^1$H NMR spectrum the number of methyl-ended branches per 1000 methylenes was calculated to be 177.

Example 64

A 100 mL autoclave was charged with chloroform (55 mL), {[(2-PhPh)$_2$DABMe$_2$]PdMe(NCMe)}SbF$_6^-$ (0.094 g, 0.12 mmol), and ethylene (2.1 MPa). The reaction mixture was stirred at 25° C. and 2.1 MPa ethylene for 3 h. The ethylene pressure was then vented and volatiles removed from the reaction mixture in vacuo to afford 2.27 g of a pale yellow oil. Mn was calculated on the basis of $^1$H NMR integration of aliphatic vs. olefinic resonances to be 200. The degree of polymerization, DP, was calculated on the basis of the $^1$H NMR spectrum to be 7.2; for a linear polymer this would result in 200 methyl-ended branches per 1000 methylenes. However, based on the $^1$H NMR spectrum the number of methyl-ended branches per 1000 methylenes was calculated to be 283.

Example 65

A suspension of [(2-PhPh)$_2$DABMe$_2$]PdMe(NCMe)} SbF$_6^-$ (0.016 g, 0.02 mmol) in 5 mL FC-75 was agitated under 1.4 MPa of ethylene for 3 h 40 min. During this time the reaction temperature varied between 23 and 41° C. A viscous oil (329 mg) was isolated from the reaction mixture by decanting off the FC-75 and dried in vacuo. Mn was calculated on the basis of $^1$H NMR integration of aliphatic vs. olefinic resonances to be 700. The degree of polymerization, DP, was calculated on the basis of the $^1$H NMR spectrum to be 24.1; for a linear polymer this would result in 45 methyl-ended branches per 1000 methylenes. However, based on the $^1$H NMR spectrum the number of methyl-ended branches per 1000 methylenes was calculated to be 173.

Example 66

A 100 mL autoclave was charged with FC-75 (50 mL), {(Ph$_2$DABMe$_2$)PdMe(NCMe)}SbF$_6^-$ (0.076 g, 0.12 mmol) and ethylene (2.1 MPa). The reaction mixture was stirred at 24° C. for 1.5 h. The ethylene pressure was then vented, and the FC-75 mixture removed from the reactor. A small amount of insoluble oil was isolated from the mixture by decanting off the FC-75. The reactor was washed out with 2×50 mL CHCl$_3$, and the washings added to the oil. Volatiles removed from the resulting solution in vacuo to afford 144 mg of an oily solid. Mn was calculated on the basis of $^1$H NMR integration of aliphatic vs. olefinic resonances to be 400. The degree of polymerization, DP, was calculated on the basis of the $^1$H NMR spectrum to be 13.8; for a linear polymer this would result in 83 methyl-ended branches per 1000 methylenes. However, based on the $^1$H NMR spectrum the number of methyl-ended branches per 1000 methylenes was calculated to be 288.

Example 67

A 100 mL autoclave was charged with chloroform (50 mL), {[(2,6-EtPh)$_2$DABMe$_2$]PdMe(NCMe) }BAF$^-$ (0.165 g, 0.12 mmol), and ethylene (2.1 MPa). The reaction mixture was stirred under 2.1 MPa of ethylene for 60 min; during this time the temperature inside the reactor increased from 22 to 48° C. The ethylene pressure was then vented and volatiles removed from the reaction mixture in vacuo to afford 15.95 g of a viscous oil. $^1$H NMR of this material showed it to be branched polyethylene with 135 methyl-ended branches per 1000 methylenes. GPC analysis in trichlorobenzene (vs. a linear polyethylene standard)-gave Mn=10,400, M$_w$=22, 100.

Example 68

This was run identically to Example 67, but with {[(2,6-EtPh)$_2$DABMe$_2$]PdMe(NCMe) }SbF$_6^-$ (0.090 g, 0.12 mmol) in place of the corresponding BAF salt. The temperature of the reaction increased from 23 to 30° C. during the course of the reaction. 5.25 g of a viscous oil was isolated, $^1$H NMR of which showed it to be branched polyethylene with 119 methyl-ended branches per 1000 methylenes.

Example 69

A suspension of {[(Np)$_2$DABMe$_2$]PdMe(NCMe) }SbF$_6^-$ (0.027 g, 0.02 mmol) in 5 mL FC-75 was agitated under 1.4 MPa of ethylene for 3 h; during this time the temperature inside the reactor varied between 25 and 40° C. Two FC-75 insoluble fractions were isolated from the reaction mixture. One fraction, a non-viscous oil floating on top of the FC-75, was removed by pipette and shown by $^1$H NMR to be branched ethylene oligomers for which M$_n$=150 and with 504 methyl-ended branches per 1000 methylenes. The other fraction was a viscous oil isolated by removing FC-75 by pipette; it was shown by $^1$H NMR to be polyethylene for which M$_n$=650 and with 240 methyl-ended branches per 1000 methylenes.

Example 70

A suspension of {[(Ph$_2$CH)$_2$DABH$_2$]PdMe(NCMe)} SbF$_6^-$ (0.016 g, 0.02 mmol) in 5 mL FC-75 was agitated under 1.4 MPa of ethylene for 3 h 40 min. During this time the reaction temperature varied between 23 and 41° C. A viscous oil (43 mg) was isolated from the reaction mixture by decanting off the FC-75 and dried in vacuo. Mn was calculated on the basis of $^1$H NMR integration of aliphatic vs. olefinic resonances to be approximately 2000. The degree of polymerization, DP, was calculated on the basis of the $^1$H NMR spectrum to be 73; for a linear polymer this would result in 14 methyl-ended branches per 1000 methylenes. However, based on the $^1$H NMR spectrum the number of methyl-ended branches per 1000 methylenes was calculated to be 377.

Example 71

A 100 mL autoclave was charged with FC-75 (50 mL), <{Ph$_2$DAB(cyclo-CMe$_2$CH$_2$CMe$_2$—) }PdMe(MeCN)> BAF$^-$ (0.160 g, 0.12 mmol) and ethylene (2.1 MPa). The reaction mixture was stirred at 24–25° C. for 3.5 h. The ethylene pressure was then vented, and the cloudy FC-75 mixture removed from the reactor. The FC-75 mixture was extracted with chloroform, and the chloroform extract concentrated to dryness affording 0.98 g of an oil. Mn was calculated on the basis of $^1$H NMR integration of aliphatic vs. olefinic resonances to be 500. The degree of polymerization, DP, was calculated on the basis of the $^1$H NMR spectrum to be 19.5; for a linear polymer this would result in 57 methyl-ended branches per 1000 methylenes. However, based on the $^1$H NMR spectrum the number of methyl-ended branches per 1000 methylenes was calculated to be 452.

Example 72

A 100 mL autoclave was charged with FC-75 (50 mL), {[(4-NMe$_2$Ph)$_2$DABMe$_2$]PdMe(MeCN)}SbF$_6^-$ (MeCN) (0.091 g, 0.12 mmol) and ethylene (2.1 MPa). The reaction mixture was stirred at 24° C. for 1.5 h. The ethylene pressure was then vented, and the cloudy FC-75 mixture removed from the reactor. The FC-75 was extracted with 3×25 mL of chloroform. The reactor was washed out with 3×40 mL CHCl$_3$, and the washings added to the extracts. Volatiles removed from the resulting solution in vacuo to afford 556 mg of an oil. $M_n$ was calculated on the basis of $^1H$ NMR integration of aliphatic vs. olefinic resonances to be 200. The degree of polymerization, DP, was calculated on the basis of the $^1H$ NMR spectrum to be 8.4; for a linear polymer this would result in 154 methyl-ended branches per 1000 methylenes. However, based on the $^1H$ NMR spectrum the number of methyl-ended branches per 1000 methylenes was calculated to be 261.

Example 73

Under nitrogen, a 250 mL Schlenk flask was charged with 10.0 g of the monomer $CH_2=CHCO_2CH_2CH_2(CF_2)_nCF_3$ (avg n=9), 40 mL of methylene chloride, and a magnetic stirbar. To the rapidly stirred solution was added [(2,6-i-PrPh)$_2$DABMe$_2$]PdMe(OEt$_2$) }SbF$_6^-$ (0.075 g, 0.089 mmol) in small portions. The resulting yellow-orange solution was stirred under 1 atm of ethylene for 18 h. The reaction mixture was then concentrated, and the viscous product extracted with ~300 mL of petroleum ether. The yellow filtrate was concentrated to dryness, and extracted a second time with ~150 mL petroleum ether. ~500 mL of methanol was added to the filtrate; the copolymer precipitated as an oil which adhered to the sides of the flask, and was isolated by decanting off the petroleum ether/methanol mixture. The copolymer was dried, affording 1.33 g of a slightly viscous oil. Upon standing for several hours, an additional 0.70 g of copolymer precipitated from the petroleum ether/methanol mixture. By $^1H$ NMR integration, it was determined that the acrylate content of this material was 4.2 mole %, and that it contained 26 ester and 87 methyl-ended branches per 1000 methylenes. GPC analysis in tetrahydrofuran (vs. a PMMA standard) gave $M_n$=30,400, $M_w$=40,200. $^1H$ NMR (CDCl$_3$) δ 4.36 (t, CH$_2$CH$_2$CO2CH$_2$CH$_2$R$_f$), 2.45 (mult, CH$_2$CH$_2$CO2CH$_2$CH$_2$R$_f$), 2.31 (t, CH$_2$CH$_2$CO2CH$_2$CH$_2$R$_f$), 1.62 (mult, CH$_2$CH$_2$CO2CH$_2$CH$_2$R$_f$), 1.23 (mult, other methylenes and methines), 0.85 (mult, methyls). $^{13}C$ NMR gave branching per 1000 CH$_2$: Total methyls (91.3), Methyl (32.8), Ethyl (20), Propyl (2.2), Butyl (7.7), Amyl (2.2), ≧Hex and end of chains (22.1). GPC analysis in THF gave Mn=30,400, Mw=40,200 vs. PMMA.

Example 74

A 100 mL autoclave was charged with [Pd(CH$_3$CH$_2$CN)$_4$](BF$_4$)$_2$ (0.058 g, 0.12 mmol) and chloroform (40 mL). To this was added a solution of (2,6-i-PrPh)$_2$DABMe$_2$ (0.070 g, 0.17 mmol) dissolved in 10 mL of chloroform under ethylene pressure (2.1 MPa). The pressure was maintained at 2.1 MPa for 1.5 h, during which time the temperature inside the reactor increased from 22 to 35° C. The ethylene pressure was then vented and the reaction mixture removed from the reactor. The reactor was washed with 3×50 mL of chloroform, the washings added to the reaction mixture, and volatiles removed from the resulting solution in vacuo to afford 9.77 g of a viscous oil. $^1H$ NMR of this material showed it to be branched polyethylene with 96 methyl-ended branches per 1000 methylenes.

Example 75

A 100 mL autoclave was charged with [Pd(CH$_3$CN)$_4$](BF$_4$)$_2$ (0.053 g, 0.12 mmol) and chloroform (50 mL). To this was added a solution of (2,6-i-PrPh)$_2$DABMe$_2$ (0.070 g, 0.17 mmol) dissolved in 10 mL of chloroform under ethylene pressure (2.1 MPa). The pressure was maintained at 2.1 MPa for 3.0 h, during which time the temperature inside the reactor increased from 23 to 52° C. The ethylene pressure was then vented and the reaction mixture removed from the reactor. The reactor was washed with 3×50 mL of chloroform, the washings added to the reaction mixture, and volatiles removed from the resulting solution in vacuo to afford 25.98 g of a viscous oil. $^1H$ NMR of this material showed it to be branched polyethylene with 103 methyl-ended branches per 1000 methylenes. GPC analysis in trichlorobenzene gave $M_n$=10,800, $M_w$=21,200 vs. linear polyethylene.

Example 76

A mixture of 20 mg (0.034 mmol) of [(2,6-i-PrPh)DABH$_2$]NiBr$_2$ and 60 mL dry, deaerated toluene was magnetically-stirred under nitrogen in a 200-mL three-necked flask with a gas inlet tube, a thermometer, and a gas exit tube which vented through a mineral oil bubbler. To this mixture, 0.75 mL (65 eq) of 3M poly(methylalumoxane) (PMAO) in toluene was added via syringe. The resulting deep blue-black catalyst solution was stirred as ethylene was bubbled through at about 5 ml and 1 atm for 2 hr. The temperature of the mixture rose to 60° C. in the first 15 min and then dropped to room temperature over the course of the reaction.

The product solution was worked up by blending with methanol; the resulting white polymer was washed with 2N HCl, water, and methanol to yield after drying (50° C./vacuum/nitrogen purge) 5.69 g (6000 catalyst turnovers) of polyethylene which was easily-soluble in hot chlorobenzene. Differential scanning calorimetry exhibited a broad melting point at 107° C. (67 J/g). Gel permeation chromatography (trichlorobenzene, 135° C., polystyrene reference, results calculated as polyethylene using universal calibration theory): $M_n$=22,300; $M_w$=102,000; $M_w/M_n$=456. $^{13}C$ NMR analysis: branching per 1000 CH$_2$: total Methyls (60), Methyl (41), Ethyl (5.8), Propyl (2.5), Butyl (2.4), Amyl (1.2), ≧Hexyl and end of chain (5); chemical shifts were referenced to the solvent: the high field carbon of 1,2,4-trichlorobenzene (127.8 ppm). A film of polymer (pressed at 200° C.) was strong and could be stretched and drawn without elastic recovery.

Example 77

In a Parr® 600-mL stirred autoclave under nitrogen was combined 23 mg (0.039 mmol) of [(2,6-i-PrPh)DABH$_2$]NiBr$_2$, 60 mL of dry toluene, and 0.75 mL of poly (methylalumoxane) at 28° C. The mixture was stirred, flushed with ethylene, and pressurized to 414 kPa with ethylene. The reaction was stirred at 414 kPa for 1 hr; the internal temperature rose to 31° C. over this time. After 1 hr, the ethylene was vented and 200 mL of methanol was added with stirring to the autoclave. The resulting polymer slurry was filtered; the polymer adhering to the autoclave walls and impeller was scraped off and added to the filtered polymer. The product was washed with methanol and acetone and dried (80° C./vacuum/nitrogen purge) to yield 5.10 g (4700 catalyst turnovers) of polyethylene. Differential scanning calorimetry exhibited a melting point at 127° C. (170 J/g). Gel permeation chromatography (trichlorobenzene, 135° C., polystyrene reference, results calculated as polyethylene using universal calibration theory): $M_n$=49,300; $M_w$=123,000; $M_w/M_n$=2.51. Intrinsic viscosity (trichlorobenzene, 135° C.): 1.925 dL/g. Absolute molecular weight averages corrected for branching: $M_n$=47,400; $M_w$=134,000; $M_w/M_n$=2.83. $^{13}C$ NMR analysis; branching per 1000 CH$_2$: total Methyls (10.5), Methyl (8.4), Ethyl (0.9), Propyl (0), Butyl (0), ≧Butyl and end of chain (1.1); chemical shifts were referenced to the solvent: the high field carbon of 1,2,4-trichlorobenzene (127.8 ppm). A film of polymer (pressed at 200° C.) was strong and stiff and could be stretched and drawn without elastic recovery. This polyethylene is much more crystalline and linear than the polymer of Example 76. This example shows that only a modest pressure increase from 1 atm to 414 kPa allows propagation to successfully compete with rearrangement and isomerization of the polymer chain by this catalyst, thus giving a less-branched, more-crystalline polyethylene.

Example 78

A mixture of 12 mg (0.020 mmol) of [(2,6-i-PrPh) DABH$_2$]NiBr$_2$ and 40 mL dry, deaerated toluene was magnetically-stirred under nitrogen at 15° C. in a 100-mL three-necked flask with an addition funnel, a thermometer, and a nitrogen inlet tube which vented through a mineral oil bubbler. To this mixture, 0.5 mL of poly(methylalumoxane) in toluene was added via syringe; the resulting burgundy catalyst solution was stirred for 5 min and allowed to warm to room temperature. Into the addition funnel was condensed (via a Dry Ice condenser on the top of the funnel) 15 mL (about 10 g) of cis-2-butene. The catalyst solution was stirred as the cis-2-butene was added as a liquid all at once, and the mixture was stirred for 16 hr. The product solution was treated with 1 mL of methanol and was filtered through diatomaceous earth; rotary evaporation yielded 0.35 g (300 catalyst turnovers) of a light yellow grease, poly-2-butene. $^{13}$C NMR analysis; branching per 1000 CH$_2$: total Methyls (365), Methyl (285), Ethyl (72), ≧Butyl and end of chain (8); chemical shifts were referenced to the solvent chloroform-d$_1$ (77 ppm).

Listed below are the $^{13}$C NMR data upon which the above analysis is based.

| $^{13}$C NMR Data CDCl$_3$, RT, 0.05M CnAcAc | |
|---|---|
| Freq ppm | Intensity |
| 41.6071 | 11.2954 |
| 41.1471 | 13.7193 |
| 38.6816 | 3.55568 |
| 37.1805 | 7.07882 |
| 36.8657 | 33.8859 |
| 36.7366 | 35.1101 |
| 36.6196 | 33.8905 |
| 36.2645 | 12.1006 |
| 35.9094 | 13.3271 |
| 35.8004 | 11.8845 |
| 35.5785 | 4.20104 |
| 34.7351 | 24.9682 |
| 34.4325 | 39.3436 |
| 34.3114 | 59.2878 |
| 34.1177 | 125.698 |
| 33.9886 | 121.887 |
| 33.8837 | 120.233 |
| 33.5326 | 49.8058 |
| 33.004 | 132.842 |
| 32.7377 | 51.2221 |
| 32.657 | 55.6128 |
| 32.3705 | 18.1589 |
| 31.5876 | 9.27643 |
| 31.3818 | 16.409 |
| 31.0066 | 15.1861 |
| 30.0946 | 41.098 |
| 29.9736 | 42.8009 |
| 29.7072 | 106.314 |
| 29.3602 | 60.0884 |

| $^{13}$C NMR Data CDCl$_3$, RT, 0.05M CnAcAc | | |
|---|---|---|
| Freq ppm | Intensity | |
| 29.2512 | 35.0694 | |
| 29.114 | 26.6437 | |
| 28.9769 | 29.1226 | |
| 27.9358 | 3.57351 | |
| 27.7501 | 3.56527 | |
| 27.0682 | 14.6121 | |
| 26.7333 | 81.0769 | |
| 26.3257 | 14.4591 | |
| 26.015 | 11.8399 | |
| 25.3008 | 8.17451 | |
| 25.0627 | 5.98833 | |
| 22.4801 | 3.60955 | 2B$_4$ |
| 22.3308 | 10.4951 | 2B$_5$+, EOC |
| 19.6192 | 90.3272 | 1B$_1$ |
| 19.4618 | 154.354 | 1B$_1$ |
| 19.3085 | 102.085 | 1B$_1$ |
| 18.9937 | 34.7667 | 1B$_1$ |
| 18.8525 | 38.7651 | 1B$_1$ |
| 13.7721 | 11.2148 | 1B$_4$+, EOC, 1B$_3$ |
| 11.0484 | 54.8771 | 1B$_2$ |
| 10.4552 | 10.8437 | 1B$_2$ |
| 10.1283 | 11.0735 | 1B$_2$ |
| 9.99921 | 9.36226 | 1B$_2$ |

Example 79

A mixture of 10 mg (0.017 mmol) of [(2,6-i-PrPh) DABH$_2$]NiBr$_2$ and 40 mL dry, deaerated toluene was magnetically-stirred under nitrogen at 5° C. in a 100-mL three-necked flask with an addition funnel, a thermometer, and a nitrogen inlet tube which vented through a mineral oil bubbler. To this mixture, 0.5 mL of 3M poly (methylalumoxane) in toluene was added via syringe; the resulting burgundy catalyst solution was stirred at 5° C. for 40 min. Into the addition funnel was condensed (via a Dry Ice condenser on the top of the funnel) 20 mL (about 15 g) of 1-butene. The catalyst solution was stirred as the 1-butene was added as a liquid all at once. The reaction temperature rose to 50° C. over 30 min and then dropped to room temperature as the mixture was stirred for 4 hr. The product solution was treated with 1 mL of methanol and was filtered through diatomaceous earth; rotary evaporation yielded 6.17 g (1640 catalyst turnovers) of clear, tacky poly-1-butene rubber. Gel permeation chromatography (trichlorobenzene, 135° C., polystyrene reference, results calculated as polyethylene using universal calibration theory): $M_n$=64,700; $M_w$=115,000; $M_w/M_n$=1.77. $^{13}$C NMR analysis; branching per 1000 CH$_2$: total Methyls (399), Methyl (86), Ethyl (272), ≧Butyl and end of chain (41); chemical shifts were referenced to the solvent chloroform-d$_1$ (77 ppm). This example demonstrates the polymerization of an: alpha-olefin and shows the differences in branching between a polymer derived from a 1-olefin (this example) and a polymer derived from a 2-olefin (Example 78). This difference shows that the internal olefin of Example 78 is not first isomerized to an alpha-olefin before polymerizing; thus this catalyst is truly able to polymerize internal olefins.

Listed below are the $_{13}$C NMR data upon which the above analysis is based.

| ¹³C NMR Data CDCl₃, RT, 0.05 M CrAcAc | | |
|---|---|---|
| Freq ppm | Intensity | |
| 43.8708 | 6.42901 | |
| 41.5304 | 11.1597 | |
| 41.0825 | 16.1036 | |
| 38.7623 | 103.647 | |
| 38.1247 | 50.3288 | |
| 37.3338 | 24.6017 | |
| 36.8173 | 30.0925 | |
| 35.756 | 55.378 | |
| 35.0337 | 22.3563 | |
| 34.1419 | 64.8431 | |
| 33.8514 | 55.3508 | |
| 33.4116 | 90.2438 | |
| 33.0645 | 154.939 | |
| 32.7094 | 51.3245 | |
| 32.431 | 23.0013 | $3B_5$ |
| 30.946 | 12.8866 | $3B_6+$ |
| 30.1551 | 26.1216 | |
| 29.7516 | 54.6262 | |
| 29.4248 | 40.7879 | |
| 27.6008 | 8.64277 | |
| 27.2417 | 20.1564 | |
| 27.1207 | 21.9735 | |
| 26.7777 | 45.0824 | |
| 26.0755 | 66.0697 | |
| 25.6599 | 77.1097 | |
| 24.3807 | 8.9175 | |
| 23.4809 | 32.0249 | $2B_4, 2B_5+, 2EOC$ |
| 22.8393 | 8.06774 | |
| 22.1372 | 16.4732 | |
| 19.4981 | 57.7003 | $1B_1$ |
| 19.3609 | 70.588 | $1B_1$ |
| 15.132 | 17.2402 | $1B_4+$ |
| 13.8448 | 7.9343 | $1B_4+$ |
| 12.2509 | 27.8653 | |
| 12.037 | 27.0118 | |
| 11.0766 | 6.61931 | $1B_2$ |
| 10.2938 | 98.0101 | $1B_2$ |
| 10.1364 | 104.811 | $1B_2$ |

Example 80

A 22-mg (0.037-mmol) sample of [(2,6-i-PrPh)DABH₂]NiBr₂ was introduced into a 600-mL stirred Parr® autoclave under nitrogen. The autoclave was sealed and 75 mL of dry, deaerated toluene was introduced into the autoclave via gas tight syringe through a port on the autoclave head. Then 0.6 mL of 3M poly(methylalumoxane) was added via syringe and stirring was begun. The autoclave was pressurized with propylene to 414 kPa and stirred with continuous propylene feed. There was no external cooling. The internal temperature quickly rose to 33° C. upon initial propylene addition but gradually dropped back to 24° C. over the course of the polymerization. After about 7 min, the propylene feed was shut off and stirring was continued; over a total polymerization time of 1.1 hr, the pressure dropped from 448 kPa to 358 kPa. The propylene was vented and the product, a thin, honey-colored solution, was rotary evaporated to yield 1.65g of a very thick, brown semi-solid. This was dissolved in chloroform and filtered through diatomaceous earth; concentration yielded 1.3 g (835 catalyst turnovers) of tacky, yellow polypropylene rubber. Gel permeation chromatography (trichlorobenzene, 135° C., polystyrene reference, results calculated as polypropylene using universal calibration theory): $M_n=7,940$; $M_w=93,500$; $M_w/M_n=11.78$.

Example 81

A mixture of 34 mg (0.057 mmol) of [(2,6-i-PrPh)DABH₂]NiBr₂ and 20 mL dry, deaerated toluene was magnetically-stirred under nitrogen at 5° C. in a 100-mL three-necked flask with a thermometer and a nitrogen inlet tube which vented through a mineral oil bubbler. To this mixture, 0.7 mL of 3M poly(methylalumoxane) in toluene was added via syringe and the resulting deep blue-black solution was stirred for 30 min at 5° C. To this catalyst solution was added 35 mL of dry, deaerated cyclopentene, and the mixture was stirred and allowed to warm to room temperature over 23 hr. The blue-black mixture was filtered through alumina to remove dark blue-green solids (oxidized aluminum compounds from PMAO); the filtrate was rotary evaporated to yield 1.2 g (310 catalyst turnovers) of clear liquid cyclopentene oligomers.

Example 82

A 20-mg (0.032 mmol) sample of [(2,6-i-PrPh)DABMe₂]NiBr₂ was placed in Parr® 600-mL stirred autoclave under nitrogen. The autoclave was sealed and 100 mL of dry, deaerated toluene and 0.6 mL of 3M poly(methylalumoxane) were injected into the autoclave through the head port, and mixture was stirred under nitrogen at 20° C. for 50 min. The autoclave body was immersed in a flowing water bath and the autoclave was then pressurized with ethylene to 2.8 MPa with stirring as the internal temperature rose to 53° C. The autoclave was stirred at 2.8 MPa (continuous ethylene feed) for 10 min as the temperature dropped to 29° C., and the ethylene was then vented. The mixture stood at 1 atm for 10 min; vacuum was applied to the autoclave for a few minutes and then the autoclave was opened.

The product was a stiff, swollen polymer mass which was scraped out, cut up, and fed in portions to 500 mL methanol in a blender. The polymer was then boiled with a mixture of methanol (200 mL) and trifluoroacetic acid (10 mL), and finally dried under high vacuum overnight to yield 16.8g (18,700 catalyst turnovers) of polyethylene. The polymer was somewhat heterogeneous with respect to crystallinity, as can be seen from the differential scanning calorimetry data below; amorphous and crystalline pieces of polymer could be picked out of the product. Crystalline polyethylene was found in the interior of the polymer mass; amorphous polyethylene was on the outside. The crystalline polyethylene was formed initially when the ethylene had good access to the catalyst; as the polymer formed limited mass transfer, the catalyst became ethylene-starved and began to make amorphous polymer. Differential scanning calorimetry: (crystalline piece of polymer): mp: 130° C. (150 J/g); (amorphous piece of polymer): −48° C. (Tg); mp: 42° C. (3 J/g), 96° C. (11 J/g). Gel permeation chromatography (trichlorobenzene, 135° C., polystyrene reference, results calculated as polyethylene using universal calibration theory): $M_n=163,000$; $M_w=534,000$; $M_w/M_n=3.27$. This example demonstrates the effect of ethylene mass transfer on the polymerization and shows that the same catalyst can make both amorphous and crystalline polyethylene. The bulk of the polymer was crystalline: a film pressed at 200° C. was tough and stiff.

Example 83

A 29-mg (0.047 mmol) sample of [(2,6-i-PrPh)DABMe₂]NiBr₂ was placed in Parr® 600-mL stirred autoclave under nitrogen. The autoclave was sealed and 100 mL of dry, deaerated toluene and 0.85 mL of 3M poly(methylalumoxane) were injected into the autoclave through the head port. The mixture was stirred under nitrogen at 23° C. for 30 min. The autoclave body was immersed in a flowing water bath and the autoclave was pressurized with ethylene to 620 kPa with stirring. The internal temperature peaked at 38° C. within 2 min. The autoclave was stirred at 620 kPa (continuous ethylene feed) for 5 min as the temperature dropped to 32° C. The ethylene was then vented, the regulator was readjusted, and the autoclave was pressurized to 34.5 kPa (gauge) and stirred for 20 min (continuous ethylene feed) as the internal temperature dropped to 22° C. In the middle of this 20 min period, the ethylene feed was temporarily shut off for 1 min, during which time the autoclave pressure dropped from 34.5 kPa (gauge) to 13.8 kPa; the pressure was then restored to 34.5 kPa. After stirring 20 min at 34.5 kPa, the autoclave was once again pressurized to 620 kPa for 5 min; the internal temperature rose from 22° C. to 34° C. The ethylene feed was shut off for about 30 sec before venting; the autoclave pressure dropped to about 586 kPa.

The ethylene was vented; the product was a dark, thick liquid. Methanol (200 mL) was added to the autoclave and the mixture was stirred for 2 hr. The polymer, swollen with toluene, had balled up on the stirrer, and the walls and bottom of the autoclave were coated with white, fibrous rubbery polymer. The polymer was scraped out, cut up, and blended with methanol in a blender and then stirred with fresh boiling methanol for 1 hr. The white rubber was dried under high vacuum for 3 days to yield 9.6 g (7270 catalyst turnovers) of rubbery polyethylene. $^1$H NMR analysis (CDCl$_3$): 95 methyl carbons per 1000 methylene carbons.

Differential scanning calorimetry: −51° C. (Tg); mp: 39.5° C. (4 J/g); mp: 76.4° C. (7 J/g). Gel permeation chromatography (trichlorobenzene, 135° C., polystyrene reference, results calculated as polyethylene using universal calibration theory): $M_n$=223,000; $M_w$=487,000; $M_w/M_n$=2.19.

The polyethylene of Example 83 could be cast from hot chlorobenzene or pressed at 200° C. to give a strong, stretchy, hazy, transparent film with good recovery. It was not easily chloroform-soluble. This example demonstrates the use of the catalyst's ability (see Example 82) to make both amorphous and crystalline polymer, and to make both types of polymer within the same polymer chain due to the catalyst's low propensity to chain transfer. With crystalline blocks (due to higher ethylene pressure) on both ends and an amorphous region (due to lower-pressure, mass transfer-limited polymerization) in the center of each chain, this polymer is a thermoplastic elastomer.

Example 84

A Schlenk flask containing 147 mg (0.100 mmol) of {[(2,6-i-PrPh)DABMe$_2$]PdMe(OEt$_2$)}BAF$^-$ was cooled to −78° C., evacuated, and placed under an ethylene atmosphere. Methylene chloride (100 ml) was added to the flask and the solution was then allowed to warm to room temperature and stirred. The reaction vessel was warm during the first several hours of mixing and the solution became viscous. After being stirred for 17.4 h, the reaction mixture was added to ~600 mL of MeOH in order to precipitate the polymer. Next, the MeOH was decanted off of the sticky polymer, which was then dissolved in ~600 mL of petroleum ether. After being filtered through plugs of neutral alumina and silica gel, the solution appeared clear and almost colorless. The solvent was then removed and the viscous oil (45.31 g) was dried in vacuo for several days: $_1$H NMR (CDCl$_3$, 400 MHz) δ 1.24 (CH$_2$, CH), 0.82 (m, CH$_3$); Branching: ~128 CH$_3$ per 1000 CH$_2$; DSC: Tg=−67.7° C. GPC: Mn=29,000; Mw=112,000.

Example 85

Following the procedure of Example 84 {[(2,6-i-PrPh) DABMe$_2$]PdMe(OEt$_2$)}BAF$^-$ (164 mg, 0.112 mmol) catalyzed the polymerization of ethylene for 24 h in 50 mL of CH$_2$Cl$_2$ to give 30.16 q of polymer as a viscous oil. $^1$H NMR (C$_6$D$_6$) δ 1.41 (CH$_2$, CH), 0.94 (CH$_3$); Branching: ~115 CH$_3$ per 1000 CH$_2$; GPC Analysis (THF, PMMA standards, RI Detector): $M_w$=262,000; $M_n$=121,000; PDI=2.2; DSC: $T_g$=−66.8° C.

Example 86

The procedure of Example 84 was followed using 144 mg (0.100 mmol) of {[(2,6-i-PrPh)DABH$_2$]PdMe(OEt$_2$)}BAF$^-$ in 50 mL of CH$_2$Cl$_2$ and a 24 h reaction time. Polymer (9.68 g) was obtained as a free-flowing oil. $^1$H NMR (CDCl$_3$, 400 MHz) δ 5.36 (m, RHC=CHR'), 5.08 (br s, RR'C=CHR"), 4.67 (br s, H$_2$C=CRR'), 1.98 (m, allylic H), 1.26 (CH$_2$, CH), 0.83 (m, CH$_3$); Branching: ~149 CH$_3$ per 1000 CH$_2$; DSC: $T_g$=−84.6° C.

Example 87

A 30-mg (0.042-mmol) sample of [(2,6-i-PrPh)DABAn] NiBr$_2$ was placed in Parr® 600-mL stirred autoclave under nitrogen. The autoclave was sealed and 150 mL of dry toluene and 0.6 mL of 3M polymethylalumoxane were injected into the autoclave through the head port. The autoclave body was immersed in a flowing water bath and the mixture was stirred under nitrogen at 20° C. for 1 hr. The autoclave was then pressurized with ethylene to 1.31 MPa with stirring for 5 min as the internal temperature peaked at 30° C. The ethylene was then vented to 41.4 kPa (gauge) and the mixture was stirred and fed ethylene at 41.4 kPa for 1.5 hr as the internal temperature dropped to 19° C. At the end of this time, the autoclave was again pressurized to 1.34 MPa and stirred for 7 min as the internal temperature rose to 35° C.

The ethylene was vented and the autoclave was briefly evacuated; the product was a stiff, solvent-swollen gel. The polymer was cut up, blended with 500 mL methanol in a blender, and then stirred overnight with 500 mL methanol containing 10 mL of 6N HCl. The stirred suspension in methanol/HCl was then boiled for 4 hr, filtered, and dried under high vacuum overnight to yield 26.1 g (22,300 catalyst turnovers) of polyethylene. Differential scanning calorimetry: −49° C. (Tg); mp: 116° C. (42 J/g). The melting transition was very broad and appeared to begin around room temperature. Although the melting point temperature is higher in this Example than in Example 76, the area under the melting endotherm is less in this example, implying that the polymer of this Example is less crystalline overall, but the crystallites that do exist are more ordered. This indicates that the desired block structure was obtained. Gel permeation chromatography (trichlorobenzene, 135° C., polystyrene reference, results calculated as polyethylene using universal calibration theory): $M_n$=123,000; $M_w$=601,000; $M_w/M_n$=4.87. The polyethylene of this example could be pressed at 200° C. to give a strong, tough, stretchy, hazy film with partial elastic recovery. When the stretched film was plunged into boiling water, it completely relaxed to its original dimensions.

Example 88

A 6.7-mg (0.011-mmol) sample of [(2,6-i-PrPh) DABMe$_2$]NiBr$_2$ was magnetically-stirred under nitrogen in a 50-mL Schlenk flask with 25 mL of dry, deaerated toluene as 0.3 mL of 3M poly(methylalumoxane) was injected via syringe. The mixture was stirred at 23° C. for 40 min to give a deep blue-green solution of catalyst. Dry, deaerated cyclopentene (10 mL) was injected and the mixture was stirred for 5 min. The flask was then pressurized with ethylene at 20.7 MPa and stirred for 22 hr. The resulting viscous solution was poured into a stirred mixture of 200 mL methanol and 10 mL 6N HCl. The methanol was decanted off and replaced with fresh methanol, and the polymer was stirred in boiling methanol for 3 hr. The tough, stretchy rubber was pressed between paper towels and dried under vacuum to yield 1.0 g of poly[ethylene/cyclopentene]. By $^1$H NMR analysis (CDCl$_3$): 100 methyl carbons per 1000 methylene carbons. Comparison of the peaks attributable to cyclopentene (0.65 ppm and 1.75 ppm) with the standard polyethylene peaks (0.9 ppm and 1.3 ppm) indicates about a 10 mol % cyclopentene incorporation. This polymer yield and composition represent about 2900 catalyst turnovers. Differential scanning calorimetry: −44° C. (Tg). Gel permeation chromatography (trichlorobenzene, 135° C., polystyrene reference, results calculated as polyethylene using universal calibration theory): M$_n$=122,000; M$_w$=241,000; M$_w$/M$_n$=1.97.

Listed below are the $^{13}$C NMR data upon which the above analysis is based.

| Freq ppm | Intensity | |
|---|---|---|
| \multicolumn{3}{c}{$^{13}$C NMR data} | | |
| \multicolumn{3}{c}{TCB, 120 C, 0.05 M CrAcAc} | | |
| 50.9168 | 5.96663 | |
| 46.3865 | 3.27366 | 1 cme and/or 1,3 ccmcc |
| 40.7527 | 40.5963 | 2 eme |
| 40.567 | 41.9953 | 1,3 eme |
| 40.3336 | 45.8477 | 1,3 eme |
| 37.1985 | 60.1003 | |
| 36.6998 | 41.2041 | |
| 36.0579 | 11.2879 | |
| 35.607 | 25.169 | |
| 34.4771 | 19.0834 | |
| 34.0845 | 22.8886 | |
| 33.1243 | 20.1138 | |
| 32.8962 | 27.6778 | |
| 31.8406 | 75.2391 | |
| 30.0263 | 76.2755 | |
| 29.6921 | 170.41 | |
| 28.9494 | 18.8754 | |
| 28.647 | 25.8032 | |
| 27.4588 | 22.2397 | |
| 27.1086 | 48.0806 | |
| 24.3236 | 3.31441 | 2B$_5$+, 2 EOC |
| 22.5783 | 4.64411 | |
| 19.6712 | 43.1867 | 1B$_1$ |
| 17.5546 | 1.41279 | end group |
| 14.3399 | 1.74854 | 1B$_3$ |
| 13.8518 | 5.88699 | 1B$_4$+, 1EOC |
| 10.9182 | 2.17785 | 2B$_1$ |

Example 89

A 7.5-mg (0.013-mmol) sample of [(2,6-t-BuPh) DABMe$_2$]NiBr$_2$ was magnetically stirred under nitrogen in a 50-mL Schlenk flask with 40 mL of dry, deaerated toluene as 0.5 mL of 3M poly(methylalumoxane) was injected via syringe. The mixture was stirred at 23° C. for 1 hr to give a deep blue-green solution of catalyst. The flask was pressurized with ethylene at 20.7 kPa (gauge) and stirred for 20 hr. The solution, which had become a reddish-brown suspension, was poured into a stirred mixture of 200 mL methanol and 10 mL 6N HCl and was stirred at reflux for 1 hr. The methanol was decanted off and replaced with fresh methanol, and the white polymer was stirred in boiling methanol for 1 hr. The stiff, stretchy rubber was pressed between paper towels and then dried under vacuum to yield 1.25 g (3380 catalyst turnovers) of polyethylene. $^1$H-1 NMR analysis (C$_6$D$_6$): 63 methyl carbons per 1000 methylene carbons. Differential scanning calorimetry: −34° C. (Tg); mp: 44° C. (31 J/g); mp: 101° C. (23 J/g).

Example 90

A 5.5 mg (0.0066 mmol) sample of {[(2,6-i-PrPh)$_2$DABMe$_2$]PdMe(Et$_2$O)}SbF$_6^-$ was allowed to stand at room temperature in air for 24 hr. A 100-mL three-neck flask with a magnetic stirrer and a gas inlet dip tube was charged with 40 mL of reagent methylene chloride and ethylene gas was bubbled through with stirring to saturate the solvent with ethylene. The sample of {[(2,6-i-PrPh)$_2$DABMe$_2$]PdMe(Et$_2$O)}SbF$_6^-$ was then rinsed into the flask with 5 mL of methylene chloride and ethylene was bubbled through with stirring for 5 hr. The clear yellow solution was rotary evaporated to yield 0.20 g (1080 catalyst turnovers) of a thick yellow liquid polyethylene.

Example 91

A 600-mL stirred Parr(®) autoclave was sealed and flushed with nitrogen, and 100 mL of dry, deaerated toluene was introduced into the autoclave via gas tight syringe through a port on the autoclave head. The autoclave was purged with propylene gas to saturate the solvent with propylene. Then 45 mg (0.054 mmol) of {[(2,6-i-PrPh)$_2$DABMe$_2$]PdMe (Et$_2$O)}SbF$_6^-$ was introduced into the autoclave in the following manner: a 2.5-mL gas tight syringe with a syringe valve was loaded with 45 mg of {[(2,6-i-PrPh)$_2$DABMe$_2$] PdMe (Et$_2$O)}SbF$_6^-$ under nitrogen in a glove box; then 1–2 mL of dry, deaerated methylene chloride was drawn up into the syringe and the contents were quickly injected into the autoclave through a head port. This method avoids having the catalyst in solution with no stabilizing ligands.

The autoclave was pressurized with propylene to 414 MPa and stirred for 2.5 hr, starting with continuous propylene feed. The autoclave was cooled in a running tap water bath at 22° C. The internal temperature quickly rose to 30° C. upon initial propylene addition but soon dropped back to 22° C. After 0.5 hr, the propylene feed was shut off and stirring was continued. Over 2 hr, the pressure dropped from 41.4 MPa to 38.6 MPa. The propylene was then vented. The product was a thin, honey-colored solution. Rotary evaporation yielded 2.3 g (1010 catalyst turnovers) of very thick, dark-brown liquid polypropylene which was almost elastomeric when cool. Gel permeation chromatography (trichlorobenzene, 135° C., polystyrene reference, results calculated as polypropylene using universal calibration theory): M$_n$=8,300; M$_w$=15,300; M$_w$/M$_n$=1.84. $^{13}$C NMR analysis; branching per 1000 CH$_2$: total Methyls (545), Propyl (1.3), ≧Butyl and end of chain (9.2); chemical shifts. The polymer exhibited a glass transition temperature of −44° C. by differential scanning calorimetry.

Listed below are the $^{13}$C NMR data upon which the above analysis is based.

13C NMR data
CDCl3, RT, 0.05 M CrAcAc

| Freq ppm | Intensity | |
|---|---|---|
| 46.4978 | 13.2699 | Methylenes |
| 45.8683 | 11.9947 | Methylenes |
| 45.3639 | 10.959 | Methylenes |
| 45.1783 | 11.3339 | Methylenes |
| 44.5568 | 8.41708 | Methylenes |
| 44.4398 | 7.69019 | Methylenes |
| 44.3026 | 6.29108 | Methylenes |
| 44.1372 | 6.73541 | Methylenes |
| 43.5036 | 5.49837 | Methylenes |
| 42.4262 | 5.03113 | Methylenes |
| 41.6918 | 3.72552 | Methylenes |
| 39.1537 | 4.23147 | Methines and Methylenes |
| 38.7179 | 25.2596 | Methines and Methylenes |
| 37.8664 | 10.0979 | Methines and Methylenes |
| 37.6727 | 14.3755 | Methines and Methylenes |
| 37.0755 | 17.623 | Methines and Methylenes |
| 36.781 | 42.0719 | Methines and Methylenes |
| 36.559 | 10.0773 | Methines and Methylenes |
| 34.5495 | 5.34388 | Methines and Methylenes |
| 34.3195 | 7.48969 | Methines and Methylenes |
| 33.5488 | 12.6148 | Methines and Methylenes |
| 33.351 | 20.5271 | Methines and Methylenes |
| 32.7982 | 4.10612 | Methines and Methylenes |
| 32.4108 | 22.781 | Methines and Methylenes |
| 31.8701 | 5.90488 | Methines and Methylenes |
| 31.5957 | 10.6988 | Methines and Methylenes |
| 29.8364 | 44.4935 | Methines and Methylenes |
| 29.7072 | 103.844 | Methines and Methylenes |
| 29.3925 | 152.645 | Methines and Methylenes |
| 29.0293 | 6.71341 | Methines and Methylenes |
| 27.6089 | 38.7993 | Methines and Methylenes |
| 27.4193 | 10.3543 | Methines and Methylenes |
| 27.0763 | 66.8261 | Methines and Methylenes |
| 26.9552 | 92.859 | Methines and Methylenes |
| 26.7615 | 55.7233 | Methines and Methylenes |
| 26.3661 | 20.1674 | Methines and Methylenes |
| 24.8529 | 16.9056 | Methine Carbon of XXVIII |
| 23.1217 | 12.5439 | Methine carbons of XXVIII and XXIX, $2B_4+$, EOC |
| 22.6779 | 13.0147 | Methine carbons of XXVIII and XXIX, $2B_4+$, EOC |
| 22.5245 | 9.16236 | Methine carbons of XXVIII and XXIX, $2B_4+$, EOC |
| 22.3389 | 77.3342 | Methine carbons of XXVIII and XXIX, $2B_4+$, EOC |
| 21.9757 | 9.85242 | Methine carbons of XXVIII and XXIX, $2B_4+$, EOC |
| 21.1405 | 10.0445 | Methyls |
| 20.4182 | 8.49663 | Methyls |
| 19.9743 | 25.8085 | Methyls |
| 19.825 | 31.4787 | Methyls |
| 19.3811 | 44.9986 | Methyls |
| 19.1995 | 31.3058 | Methyls |
| 13.8569 | 6.37761 | Methyls |
| 13.8004 | 7.67242 | Methyls |
| 137.452 | 22.0529 | Methyls |
| 128.675 | 44.6993 | Methyls |
| 127.88 | 43.8939 | Methyls |
| 124.959 | 22.4025 | Methyls |
| 122.989 | 3.3312 | Methyls |

Example 92

A 600-mL stirred Parr® autoclave was sealed, flushed with nitrogen, and heated to 60° C. in a water bath. Fifty mL (48 g; 0.56 mol) of dry, deaerated methyl acrylate was introduced into the autoclave via gas tight syringe through a port on the autoclave head and ethylene gas was passed through the autoclave at a low rate to saturate the solvent with ethylene before catalyst addition. Then 60 mg (0.07 mmol) of $\{[(2,6\text{-i-PrPh})_2\text{DABMe}_2]\text{PdMe}(\text{Et}_2\text{O})\}\text{SbF}_6^-$ was introduced into the autoclave in the following manner: a 2.5-mL gas tight syringe with a syringe valve was loaded with 60 mg of $\{[(2,6\text{-i-PrPh})_2\text{DABMe}_2]\text{PdMe}(\text{Et}_2\text{O})\}\text{SbF}_6^-$ under nitrogen in a glove box; then 1 mL of dry, deaerated methylene chloride was drawn up into the syringe and the contents were quickly injected into the autoclave through a head port. This method avoids having the catalyst in solution with no stabilizing ligands.

The autoclave was pressurized with ethylene to 689 kPa and continuously fed ethylene with stirring for 4.5 hr; the internal temperature was very steady at 60° C. The ethylene was vented and the product, a clear yellow solution, was rinsed out of the autoclave with chloroform, rotary evaporated, and held under high vacuum overnight to yield 1.56 g of thin light-brown liquid ethylene/methyl acrylate copolymer. The infrared spectrum of the product exhibited a strong ester carbonyl stretch at 1740 cm$^{-1}$. $^1$H-1 NMR analysis (CDCl$_3$): 61 methyl carbons per 1000 methylene carbons. Comparison of the integrals of the ester methoxy (3.67 ppm) and ester methylene ($\underline{CH}_2$COOMe; 2.30 ppm) peaks with the integrals of the carbon chain methyls (0.8–0.9 ppm) and methylenes (1.2–1.3 ppm) indicated a methyl acrylate content of 16.6 mol % (37.9 wt %). This product yield and composition represent 480 ethylene turnovers and 96 methyl acrylate turnovers. $^{13}$C NMR analysis; branching per 1000 CH$_2$: total methyls (48.3), Methyl (20.8), Ethyl (10.5), Propyl (1), Butyl (8), ≧Amyl and End of Chain (18.1), methyl acrylate (94.4); ester-bearing —CH(CH$_2$)$_n$CO$_2$CH$_3$ branches as a % of total ester: n≧5 (35.9), n=4 (14.3), n=1,2,3 (29.5), n=0 (20.3); chemical shifts were referenced to the solvent: the high field carbon of 1,2,4-trichlorobenzene (127.8 ppm). Gel permeation chromatography (tetrahydrofuran, 30° C., polymethylmethacrylate reference, results calculated as polymethylmethacrylate using universal calibration theory): M$_n$=3,370; M$_w$=5,450; M$_w$/M$_n$=1.62.

Listed below are the $^{13}$C NMR data upon which the above analysis is based.

13C NMR data
TCB 120 C, 0.05 M CrAcAc

| Freq ppm | Intensity | |
|---|---|---|
| 53.7443 | 2.19635 | CH$_2$Cl$_2$ solvent impurity |
| 50.9115 | 8.84408 | |
| 50.641 | 132.93 | |
| 45.5165 | 7.55996 | MEB$_0$ 43.8 ppm:2 adjacent MEB$_0$ |
| 39.6917 | 2.71676 | |
| 39.2886 | 7.91933 | |
| 38.1639 | 13.843 | |
| 37.7926 | 26.6353 | |
| 37.1666 | 20.6759 | |
| 36.6733 | 8.65855 | |
| 34.6256 | 17.6899 | |
| 34.4612 | 16.7388 | |
| 34.1429 | 85.624 | |
| 33.9095 | 124.997 | 1EB$_4$+ |
| 33.676 | 40.0271 | Contributions from EB |
| 33.2888 | 11.4719 | Contributions from EB |
| 32.8644 | 14.4963 | Contributions from EB |
| 32.3498 | 17.5883 | Contributions from EB |
| 32.0475 | 9.83096 | Contributions from EB |
| 31.8459 | 30.9676 | Contributions from EB |
| 31.7079 | 12.7737 | Contributions from EB |
| 31.5912 | 13.8792 | Contributions from EB |
| 31.0873 | 19.6266 | Contributions from EB |
| 30.6258 | 10.5512 | |
| 30.1324 | 58.6101 | |
| 29.6497 | 169.398 | |
| 29.4322 | 48.5318 | |

-continued $^{13}$C NMR data
TCB 120 C, 0.05 M CrAcAc

| Freq ppm | Intensity | |
|---|---|---|
| 29.1934 | 95.4948 | |
| 27.8619 | 8.70181 | |
| 27.4269 | 32.9529 | |
| 26.9283 | 78.0563 | |
| 26.5145 | 27.0608 | |
| 26.3554 | 14.0683 | |
| 25.4588 | 21.9081 | 2EB$_4$ (tent) |
| 25.3315 | 9.04646 | 2EB$_4$ (tent) |
| 24.9761 | 64.2333 | 2EB$_5$+ |
| 24.2069 | 10.771 | BBB (beta-beta-B) |
| 23.0451 | 9.50073 | 2B$_4$ |
| 22.9337 | 6.90528 | 2B$_4$ |
| 22.5518 | 30.0427 | 2B$_5$+, EOC |
| 19.9842 | 1.87415 | 2B$_3$ |
| 19.6288 | 17.125 | 1B$_1$ |
| 19.1673 | 6.0427 | 1B$_1$ |
| 16.7695 | 2.23642 | |
| 14.3 | — | 1B$_3$ |
| 13.7882 | 34.0749 | 1B$_4$+, EOC |
| 11.0774 | 4.50599 | 1B$_2$ |
| 10.8705 | 10.8817 | 1B$_2$ |
| 189.989 | 1.04646 | EB$_0$ Carbonyl |
| 175.687 | 3.33867 | EB$_0$ Carbonyl |
| 175.406 | 14.4124 | EB$_0$ Carbonyl |
| 175.22 | 5.43832 | EB$_0$ Carbonyl |
| 175.061 | 3.53125 | EB$_0$ Carbonyl |
| 172.859 | 11.2356 | EB$_1$+ Carbonyl |
| 172.605 | 102.342 | EB$_1$+ Carbonyl |
| 172.09 | 7.83303 | EB$_1$+ Carbonyl |
| 170.944 | 3.294 | EB$_1$+ Carbonyl |

Example 93

A 45-mg (0.048-mmol) sample of {[(2,6-i-PrPh)$_2$DABAn]PdMe(Et$_2$O)}SbF$_6^-$ was placed in a 600-mL Parr® stirred autoclave under nitrogen. To this was added 50 mL of dry, deaerated methylene chloride, and the autoclave was pressurized to 414 kPa with ethylene. Ethylene was continuously fed at 4.14 kPa with stirring at 23–25° C. for 3 hr; then the feed was shut off and the reaction was stirred for 12 hr more. At the end of this time, the autoclave was under 89.6 kPa (absolute). The autoclave was repressurized to 345 kPa with ethylene and stirred for 2 hr more as the pressure dropped to 255 kPa, showing that the catalyst was still active; the ethylene was then vented. The brown solution in the autoclave was rotary evaporated, taken up in chloroform, filtered through alumina to remove catalyst, and rotary evaporated and then held under high vacuum to yield 7.35 g of thick, yellow liquid polyethylene. $^1$H NMR analysis (CDCl$_3$): 131 methyl carbons per 1000 methylene carbons. Gel permeation chromatography (trichlorobenzene, 135° C., polystyrene reference, results calculated as polyethylene using universal calibration theory): M$_n$=10,300; M$_w$=18,100; M$_w$/M$_n$=1.176.

Example 94

A 79-mg (0.085-mmol) sample of {[(2,6-i-PrPh)$_2$DABAn]PdMe(Et$_2$O)}SbF$_6^-$ was placed in a 600-mL Parr® stirred autoclave under nitrogen. To this was added 50 mL of dry, deaerated methyl acrylate, and the autoclave was pressurized to 689 kPa with ethylene. The autoclave was warmed to 50° C. and the reaction was stirred at 689 kPa for 70 hr; the ethylene was then vented. The clear yellow solution in the autoclave was filtered through alumina to remove catalyst, rotary evaporated, and held under high vacuum to yield 0.27 g of liquid ethylene/methyl acrylate copolymer. The infrared spectrum of the product exhibited a strong ester carbonyl stretch at 1740cm$^{-1}$. $^1$H NMR analysis (CDCl$_3$): 70 methyl carbons per 1000 methylene carbons; 13.5 mol % (32 wt %) methyl acrylate. This yield and composition represent 12 methyl acrylate turnovers and 75 ethylene turnovers.

Example 95

A 67-mg (0.089-mmol) of {[(2,4,6-MePh)$_2$DABMe$_2$]PdMe(Et$_2$O)}SbF$_6^-$ was placed in a 200-mL glass centrifuge bottle with a magnetic stir bar under nitrogen. To this was added 40 mL of dry, deaerated methylene chloride. The bottle was immediately pressurized to 207 kPa with ethylene. Ethylene was continuously fed at 207 kPa with stirring at 23–25° C. for 4 hr. After 4 hr, the ethylene feed was shut off and the reaction was stirred for 12 hr more. At the end of this time, the bottle was under zero pressure (gauge). The brown solution was rotary evaporated and held under high vacuum to yield 5.15 g of thick, brown liquid polyethylene. $^1$H NMR analysis (CDCl$_3$): 127 methyl carbons per 1000 methylene carbons. Gel permeation chromatography (trichlorobenzene, 135° C., polystyrene reference, results calculated as polyethylene using universal calibration theory): M$_n$=20,200; M$_w$=32,100; M$_w$/M$_n$=1.59.

Example 96

A 56-mg (0.066-mmol) sample of {[(2,6-i-PrPh)$_2$DABMe$_2$]PdCH$_2$CH$_2$C(O)CH$_3$)}SbF$_6^-$ was placed in a 600-mL Parr® stirred autoclave under nitrogen. To this was added 30 mL of dry, deaerated perfluoro(propyltetrahydrofuran). The autoclave was stirred and pressurized to 5.9 MPa with ethylene. The internal temperature peaked at 29° C.; a cool water bath was placed around the autoclave body. The reaction was stirred for 16 hr at 23° C. and 5.9 MPa and the ethylene was then vented. The autoclave contained a light yellow granular rubber; this was scraped out of the autoclave and held under high vacuum to yield 29.0 g (15,700 catalyst turnovers) of spongy, non-tacky, rubbery polyethylene which had good elastic recovery and was very strong; it was soluble in chloroform or chlorobenzene.

The polyethylene was amorphous at room temperature: it exhibited a glass transition temperature of −57° C. and a melting endotherm of −16° C. (35 J/g) by differential scanning calorimetry. On cooling, there was a crystallization exotherm with a maximum at 1° C. (35 J/g). Upon remelting and recooling the melting endotherm and crystallization exotherm persisted, as did the glass transition. Dynamic mechanical analysis at 1Hz showed a tan 6 peak at −51° C. and a peak in the loss modulus E" at −65° C.; dielectric analysis at 1000 Hz showed a tan d peak at −35° C. $^1$H NMR analysis (CDCl$_3$): 86 methyl carbons per 1000 methylene carbons. $^{13}$C NMR analysis: branching per 1000 CH$_2$: total Methyls (89.3), Methyl (37.2), Ethyl (14), Propyl (6.4), Butyl (6.9), ≧Am and End Of Chain (23.8); chemical shifts were referenced to the solvent: the high field carbon of 1,2,4-trichlorobenzene (127.8 ppm). Gel permeation chromatography (trichlorobenzene, 135° C., polystyrene reference, results calculated as polyethylene using universal calibration theory): M$_n$=137,000; M$_w$=289,000; M$_w$/M$_n$=2.10. Intrinsic viscosity (trichlorobenzene, 135° C.): 2.565 dL/g. Absolute molecular weight averages corrected for branching: M$_n$=196,000; M$_w$=425,000; M$_w$/M$_n$=2.17. Density (determined at room temperature with a helium gas displacement pycnometer): 0.8546±0.0007 g/cc.

Example 97

A 49-mg (0.058 mmol) sample of $\{[(2,6\text{-}i\text{-}PrPh)_2DABMe_2]PdCH_2CH_2C(O)CH_3\}SbF_6^-$ was placed in a 600-mL Parr® stirred autoclave under nitrogen. To this was added 30 mL of dry, deaerated hexane. The autoclave was stirred and pressurized to 5.9 MPa with ethylene. The internal temperature peaked briefly at 34° C.; a cool water bath was placed around the autoclave body. The reaction was stirred for 16 hr at 23° C. At 14 hr, the ethylene feed was shut off; the autoclave pressure dropped to 5.8 MPa over 2 hr; the ethylene was then vented. The autoclave contained a light yellow, gooey rubber swollen with hexane, which was scraped out of the autoclave and held under high vacuum to yield 28.2 g (17, 200 catalyst turnovers) of spongy, non-tacky, rubbery polyethylene which had good elastic recovery and which was very strong.

The polyethylene was amorphous at room temperature: it exhibited a glass transition temperature of −61° C. and a melting endotherm of −12° C. (27 J/g) by differential scanning calorimetry. Dynamic mechanical analysis at 1 Hz showed a tan d peak at −52° C. and a peak in the loss modulus E' at −70° C.; dielectric analysis at 1000 Hz showed a tan d peak at −37° C. $^1$H NMR analysis (CDCl$_3$): 93 methyl carbons per 1000 methylene carbons. $^{13}$C NMR analysis: branching per 1000 CH$_2$: total Methyls (95.4), Methyl (33.3), Ethyl (17.2), Propyl (5.2), Butyl (10.8), Amyl (3.7), ≧Hex and End Of Chain (27.4); chemical shifts were referenced to the solvent: the high field carbon of 1,2,4-trichlorobenzene (127.8 ppm). Gel permeation chromatography (trichlorobenzene, 135° C., polystyrene reference, results calculated as polyethylene using universal calibration theory): $M_n$=149,000; $M_w$=347,000; $M_w/M_n$=2.33. Density (determined at room temperature with a helium gas displacement pycnometer): 0.8544±0.0007 g/cc.

Example 98

Approximately 10-mesh silica granules were dried at 200° C. and were impregnated with a methylene chloride solution of $\{[(2,6\text{-}i\text{-}PrPh)_2DABMe_2]PdCH_2CH_2C(O)CH_3\}SbF_6^-$ to give a 10 wt % loading of the catalyst on silica.

A 0.53-g (0.063 mmol) sample of silica gel containing 10 wt % $\{[(2,6\text{-}i\text{-}PrPh)_2DABMe_2]PdCH_2CH_2C(O)CH_3\}SbF_6^-$ was placed in a 600-mL Parr® stirred autoclave under nitrogen. To this was added 40 mL of dry, deaerated hexane. The autoclave was stirred and pressurized to 5.5 MPa with ethylene; the ethylene feed was then turned off. The internal temperature peaked briefly at 31° C. The reaction was stirred for 14 hr at 23° C. as the pressure dropped to 5.3 MPa; the ethylene was then vented. The autoclave contained a clear, yellow, gooey rubber swollen with hexane. The product was dissolved in 200 mL chloroform, filtered through glass wool, rotary evaporated, and held under high vacuum to yield 7.95 g (4500 catalyst turnovers) of gummy, rubbery polyethylene. $^1$H NMR analysis (CDCl$_3$): 96 methyl carbons per 1000 methylene carbons. Gel permeation chromatography (trichlorobenzene, 135° C., polystyrene reference, results calculated as polyethylene using universal calibration theory): $M_n$=6,900; $M_w$=118,000; $M_w/M_n$=17.08.

Example 99

A 108-mg (0.073 mmol) sample of $\{[(2,6\text{-}i\text{-}PrPh)_2DABMe_2]PdCH_2CH_2C(O)CH_3\}BAF^-$ was placed in a 600-mL Parr® stirred autoclave under nitrogen. To this was added via syringe 75 mL of deaerated reagent grade methyl acrylate containing 100 ppm hydroquinone monomethyl ether and 100 ppm of phenothiazine. The autoclave was pressurized to 5.5 MPa with ethylene and was stirred at 35° C. as ethylene was continuously fed for 90 hr; the ethylene was then vented. The product consisted of a swollen clear foam wrapped around the impeller; 40 mL of unreacted methyl acrylate was poured off the polymer. The polymer was stripped off the impeller and was held under high vacuum to yield 38.2 g of clear, grayish, somewhat-tacky rubber. $^1$H NMR analysis (CDCl$_3$): 99 methyl carbons per 1000 methylene carbons. Comparison of the integrals of the ester methoxy (3.67 ppm) and ester methylene ($\underline{CH_2}$COOMe; 2.30 ppm) peaks with the integrals of the carbon chain methyls (0.8–0.9 ppm) and methylenes (1.2–1.3 ppm) indicated a methyl acrylate content of 0.9 mol % (2.6 wt %). This product yield and composition represent 18,400 ethylene turnovers and 158 methyl acrylate turnovers. $^{13}$C NMR analysis: branching per 1000 CH$_2$: total Methyls (105.7), Methyl (36.3), Ethyl (22), Propyl (4.9), Butyl (10.6), Amyl (4), ≧Hex and End Of Chain (27.8), methyl acrylate (3.4); ester-bearing —CH(CH2)$_n$CO2CH3 branches as a % of total ester: n≧5 (40.6), n=1,2,3 (2.7), n=0 (56.7); chemical shifts were referenced to the solvent: the high field carbon of 1,2,4-trichlorobenzene (127.8 ppm). Gel permeation chromatography (tetrahydrofuran, 30° C., poly-methylmethacrylate reference, results calculated as polymethylmethacrylate using universal calibration theory): $M_n$=151,000; $M_w$=272,000; $M_w/M_n$=1.81.

Example 100

A 62-mg (0.074-mmol) sample of $\{[(2,6\text{-}i\text{-}PrPh)_2DABMe_2]PdMe(Et_2O)\}SbF_6^-$ was placed in a 600-mL Parr® stirred autoclave under nitrogen with 200 mL of deaerated aqueous 10% (v/v) n-butanol. The autoclave was pressurized to 2.8 MPa with ethylene and was stirred for 16 hr. The ethylene was vented and the polymer suspension was filtered. The product consisted of a fine gray powdery polymer along with some larger particles of sticky black polymer; the polymer was washed with acetone and dried to yield 0.60 g (290 catalyst turnovers) of polyethylene. The gray polyethylene powder was insoluble in chloroform at RT; it was soluble in hot tetrachloroethane, but formed a gel on cooling to RT. $^1$H NMR analysis (tetrachloroethane-d$_2$; 100° C.): 43 methyl carbons per 1000 methylene carbons. Differential scanning calorimetry exhibited a melting point at 89° C. (78 J/g) with a shoulder at 70° C.; there was no apparent glass transition.

Example 101

A 78-mg (0.053-mmol) sample of $\{[(2,6\text{-}i\text{-}PrPh)_2DABMe_2]PdCH_2CH_2C(O)CH_3\}BAF^-$ was placed in a 600-mL Parr® stirred autoclave under nitrogen. To this was added 40 mL of dry, deaerated t-butyl acrylate containing 100 ppm hydroquinone monomethyl ether. The autoclave was pressurized with ethylene to 2.8 MPa and was stirred and heated at 35° C. as ethylene was continuously fed at 2.8 MPa for 24 hr; the ethylene was then vented. The product consisted of a yellow, gooey polymer which was dried under high vacuum to yield 6.1 g of clear, yellow, rubbery ethylene/t-butyl acrylate copolymer which was quite tacky. $^1$H NMR analysis (CDCl$_3$): 102 methyl carbons per 1000 methylene carbons. Comparison of the integral of the ester t-butoxy (1.44 ppm) peak with the integrals of the carbon chain methyls (0.8–0.9 ppm) and methylenes (1.2–1.3 ppm) indicated a t-butyl acrylate content of 0.7 mol % (3.3 wt %). This yield and composition represent 3960 ethylene turnovers and 30 t-butyl acrylate turnovers. Gel permeation chromatography (tetrahydrofuran, 30° C., polymethylmethacrylate reference, results calculated as polymethylmethacrylate using universal calibration theory): $M_n$=112,000; $M_w$=179,000; $M_w/M_n$=1.60.

Example 102

A 19-mg (0.022-mmol) sample of {[(2,6-i-PrPh)$_2$DABMe$_2$]PdCH$_2$CH$_2$C(O)CH$_3$}SbF$_6$⁻ was placed in a 600-mL Parr® stirred autoclave under nitrogen. The autoclave was pressurized to 5.2 MPa with ethylene and was stirred for 2 hr; the ethylene feed was then shut off. The autoclave was stirred for 16 hr more as the ethylene pressure dropped to 5.0 MPa; the ethylene was then vented. The autoclave contained, a light yellow, granular sponge rubber growing all over the walls and head of the autoclave; this was scraped out to yield 13.4 g (21,800 catalyst turnovers) of spongy, non-tacky, rubbery polyethylene which was very strong and elastic. $^1$H NMR analysis (CDCl$_3$): 90 methyl carbons per 1000 methylene carbons.

Differential scanning calorimetry exhibited a glass transition at −50° C. Gel permeation chromatography (trichlorobenzene, 135° C., polystyrene reference, results calculated as polyethylene using universal calibration theory): $M_n$=175,000; $M_w$=476,000; $M_w/M_n$=2.72.

Example 103

A 70-mg (0.047-mmol) sample of {[(2,6-i-PrPh)$_2$DABMe$_2$]PdCH$_2$CH$_2$C(O)CH$_3$}BAF⁻ was placed in a 600-mL Parr® stirred autoclave under nitrogen. To this was added 70 mL of deaerated reagent grade methyl acrylate containing 100 ppm each hydroquinone monomethyl ether and phenothiazine and 0.7 mL (1 wt %; 4.7 mol %) deaerated, deionized water. The autoclave was stirred at 35° C. as ethylene was continuously fed at 4.8 MPa for 16 hr; the ethylene was then vented. The product consisted of a clear solution. Rotary evaporation yielded 1.46 g of ethylene/methyl acrylate copolymer as a clear oil. The infrared spectrum of the product exhibited a strong ester carbonyl stretch at 1740cm⁻¹. $^1$H NMR analysis (CDCl$_3$): 118 methyl carbons per 1000 methylene carbons. Comparison of the integrals of the ester methoxy (3.67 ppm) and ester methylene (CH$_2$COOMe; 2.30 ppm) peaks with the integrals of the carbon chain methyls (0.8–0.9 ppm) and methylenes (1.2–1.3 ppm) indicated a methyl acrylate content of 0.7 mol % (2.2 wt %). This product yield and composition represent 1090 ethylene turnovers and 8 methyl acrylate turnovers. Gel permeation chromatography (trichlorobenzene, 135° C., polystyrene reference, results calculated as polyethylene using universal calibration theory): $M_n$=362; $M_w$=908; $M_w/M_n$=2.51.

Example 104

A 53-mg (0.036-mmol) sample of {[(2,6-i-PrPh)$_2$DABMe$_2$]PdCH$_2$CH$_2$C(O)CH$_3$}BAF⁻ was placed in a 600-mL Parr® stirred autoclave under nitrogen. To this was added 100 mL of dry, deaerated methylene chloride. The autoclave was immersed in a cool water bath and stirred as it was pressurized to 4.8 MPa with ethylene. Ethylene was continuously fed with stirring at 4.8 MPa and 23° C. for 23 hr; the ethylene then was vented. The product consisted of a clear rubber, slightly swollen with methylene chloride. The polymer was dried under high vacuum at room temperature to yield 34.5 g (34,100 catalyst turnovers) of clear rubbery polyethylene. $^1$H NMR analysis (CDCl$_3$): 110 methyl carbons per 1000 methylene carbons. Gel permeation chromatography (trichlorobenzene, 135° C., polystyrene reference, results calculated as polyethylene using universal calibration theory): $M_n$=243,000; $M_w$=676,000; $M_w/M_n$=2.78.

Example 104

A 83-mg (0.056-mmol) sample of {[(2,6-i-PrPh)$_2$DABMe$_2$]PdCH$_2$CH$_2$C(O)CH$_3$}BAF⁻ was placed in a 600-mL Parr® stirred autoclave under nitrogen. To this was added 70 mL of dry, deaerated, ethanol-free chloroform. The autoclave was immersed in a cool water bath and stirred as it was pressurized to 4.7 MPa with ethylene. Ethylene was continuously fed with stirring at 4.7 MPa and 23° C. for 21 hr; the ethylene then was vented. The product consisted of a pink, rubbery, foamed polyethylene, slightly swollen with chloroform. The polymer was dried under vacuum at 40° C. to yield 70.2 g (44,400 catalyst turnovers) of pink, rubbery polyethylene which was slightly tacky. $^1$H NMR analysis (CDCl$_3$): 111 methyl carbons per 1000 methylene carbons. Gel permeation chromatography (trichlorobenzene, 135° C., polystyrene reference, results calculated as polyethylene using universal calibration theory): $M_n$=213,000; $M_w$=728,000; $M_w/M_n$=3.41.

Example 105

A 44-mg (0.052-mmol) sample of {[(2,6-i-PrPh)$_2$DABMe$_2$]PdCH$_2$CH$_2$C(O)CH$_3$}SbF$_6$⁻ was magnetically stirred under nitrogen in a 50-mL Schlenk flask with 20 mL of dry, deaerated methylene chloride. To this was added 5 mL (5.25 g; 73 mmol) of freshly distilled acrylic acid (contains a few ppm of phenothiazine as a radical polymerization inhibitor) via syringe and the mixture was immediately pressurized with ethylene at 5.52 kPa and stirred for 40 hr. The dark yellow solution was rotary evaporated and the residue was stirred with 50 mL water for 15 min to extract any acrylic acid homopolymer. The water was drawn off with a pipette and rotary evaporated to yield 50 mg of dark residue. The polymer which had been water-extracted was heated under high vacuum to yield 1.30 g of ethylene/acrylic acid copolymer as a dark brown oil. The infrared spectrum showed strong COOH absorbances at 3400–2500 and at 1705 cm⁻¹, as well as strong methylene absorbances at 3000–2900 and 1470 cm⁻¹.

A 0.2-g sample of the ethylene/acrylic acid copolymer was treated with diazomethane in ether to esterify the COOH groups and produce an ethylene/methyl acrylate copolymer. The infrared spectrum of the esterified copolymer showed a strong ester carbonyl absorbance at 1750 cm⁻¹; the COOH absorbances were gone. $^1$H NMR analysis (CDCl$_3$): 87 methyl carbons per 1000 methylene carbons. Comparison of the integrals of the ester methoxy (3.67 ppm) and ester methylene (CH$_2$COOMe; 2.30 ppm) peaks with the integrals of the carbon chain methyls (0.8–0.9 ppm) and methylenes (1.2–1.3 ppm) indicated a methyl acrylate content of 5.3 mol % (14.7 wt % methyl acrylate=>12.3 wt % acrylic acid in the original copolymer). This product yield and composition represent 780 ethylene turnovers and 43 acrylic acid turnovers. Gel permeation chromatography (tetrahydrofuran, 30° C., polymethylmethacrylate reference, results calculated as polymethylmethacrylate using universal calibration theory): $M_n$=25,000; $M_w$=42,800; $M_w/M_n$=1.71.

Listed below are the $^{13}$C NMR data upon which the above analysis is based.

$^{13}$C NMR Data

| Freq ppm | Intensity | |
|---|---|---|
| \multicolumn{3}{l}{CDCl$_3$, 0.05 M CrAcAc, 30 C} |

| Freq ppm | Intensity | |
|---|---|---|
| 51.0145 | 24.9141 | |
| 45.434 | 1.11477 | MEB$_0$ |
| 38.8925 | 2.29147 | |
| 38.5156 | 6.51271 | |
| 37.3899 | 10.7484 | |
| 37.0713 | 17.3903 | |
| 36.7634 | 17.6341 | |
| 36.4182 | 3.57537 | |
| 36.2961 | 6.0822 | |
| 34.459 | 2.158 | |
| 34.0289 | 9.49713 | |
| 33.7369 | 34.4456 | |
| 33.3705 | 49.2646 | |
| 32.8926 | 18.2918 | |
| 32.3935 | 10.5014 | |
| 32.0271 | 3.5697 | 3B$_5$ |
| 31.5705 | 30.6837 | 3B$_6$+, 3EOC |
| 31.1723 | 1.54526 | |
| 29.813 | 46.4503 | |
| 29.3511 | 117.987 | |
| 29.1387 | 21.034 | |
| 28.9953 | 30.603 | |
| 28.613 | 7.18386 | |
| 27.2007 | 8.02265 | |
| 26.744 | 23.8731 | |
| 26.3777 | 46.8498 | |
| 26.006 | 5.42389 | |
| 25.5547 | 8.13592 | |
| 25.0609 | 5.46013 | 2 EB$_4$ (tentative) |
| 24.9175 | 2.30355 | 2 EB$_4$ (tentative) |
| 24.6042 | 15.7434 | 2 EB$_5$+ |
| 23.7547 | 2.78914 | |
| 23.3777 | 5.63727 | |
| 22.7936 | 8.07071 | 2B$_4$ |
| 22.6768 | 3.78032 | 2B$_4$ |
| 22.3211 | 33.1603 | 2B$_5$+, 2EOC |
| 19.3477 | 15.4369 | 1B$_1$ |
| 18.8645 | 5.97477 | 1B$_1$ |
| 14.1814 | 1.99297 | 1B$_3$ |
| 13.7407 | 38.5361 | 1B$_4$+, 1EOC |
| 11.0274 | 6.19758 | 1B$_2$ |
| 10.5124 | 10.4707 | 1B$_2$ |
| 176.567 | 9.61122 | EB$_0$ carbonyl |
| 174.05 | 9.03673 | EB$_1$+ carbonyl |
| 173.779 | 85.021 | EB$_1$+ carbonyl |

Example 106

A 25-mg (0.029-mmol) sample of {[(2,6-i-PrPh)$_2$DABMe$_2$]PdCH$_2$CH$_2$C(O)CH$_3$}SbF$_6$$^-$ was magnetically stirred under 55.2 kPa of ethylene in a 50-mL Schlenk flask with 20 mL of dry methylene chloride and 5 mL (4.5 g; 39 mmol) of methyl 4-pentenoate for 40 hr at room temperature. The yellow solution was rotary evaporated to yield 3.41 g of ethylene/methyl 4-pentenoate copolymer as a yellow oil. The infrared spectrum of the copolymer showed a strong ester carbonyl absorbance at 1750 cm$^{-1}$. $^1$H NMR analysis (CDCl$_3$): 84 methyl carbons per 1000 methylene carbons. Comparison of the integrals of the ester methoxy (3.67 ppm) and ester methylene (CH$_2$COOMe; 2.30 ppm) peaks with the integrals of the carbon chain methyls (0.8–0.9 ppm) and methylenes (1.2–1.3 ppm) indicated a methyl 4-pentenoate content of 6 mol % (20 wt %). This yield and composition represent about 3400 ethylene turnovers and 200 methyl 4-pentenoate turnovers. $^{13}$C NMR quantitative analysis: branching per 1000 CH$_2$: total Methyls (93.3), Methyl (37.7), Ethyl(18.7), Propyl(2), Butyl (8.6), ≧Am and end of chains (26.6), ≧Bu and end of chains (34.8); ester-bearing branches —CH(CH$_2$)$_n$CO$_2$CH$_3$ as a % of total ester: n≧5 (38.9), n=4 (8.3), n=1,2,3 (46.8), n=0 (6); chemical shifts were referenced to the solvent: chloroform-d$_1$ (77 ppm). Gel permeation chromatography (tetrahydrofuran, 30° C., polymethylmethacrylate reference, results calculated as polymethylmethacrylate using universal calibration theory): M$_n$=32,400; M$_w$=52,500; M$_w$/M$_n$=1.62.

Example 107

A 21-mg (0.025-mmol) sample of {[(2,6-i-PrPh)$_2$DABMe$_2$]PdCH$_2$CH$_2$C(O)CH$_3$}SbF$_6$$^-$ was magnetically stirred under nitrogen in a 50-mL Schlenk flask with 5 mL of dry methylene chloride and 5 mL (4.5 g; 39 mmol) of methyl 4-pentenoate for 74 hr. The yellow solution was rotary evaporated to yield 0.09 g of a yellow oil, poly[methyl 4-pentenoate]. The infrared spectrum showed a strong ester carbonyl absorbance at 1750 cm$^{-1}$. The $^1$H NMR (CDCl$_3$) spectrum showed olefinic protons at 5.4–5.5 ppm; comparing the olefin integral with the integral of the ester methoxy at 3.67 ppm indicates an average degree of polymerization of 4 to 5. This example demonstrates the ability of this catalyst to homopolymerize alpha olefins bearing polar functional groups not conjugated to the carbon-carbon double bond.

Example 108

A 53-mg (0.063-mmol) sample of {[(2,6-i-PrPh)$_2$DABMe$_2$]PdCH$_2$CH$_2$C(O)CH$_3$}SbF$_6$$^-$ was placed in a 600-mL Parr® stirred autoclave under nitrogen. To this was added 25 mL of dry, deaerated toluene and 25 mL (26 g; 0.36 mol) of freshly distilled acrylic acid containing about 100 ppm phenothiazine. The autoclave was pressurized to 2.1 MPa with ethylene and was stirred for 68 hr at 23° C.; the ethylene was then vented. The autoclave contained a colorless, hazy solution. The solution was rotary evaporated and the concentrate was taken up in 50 mL of chloroform, filtered through diatomaceous earth, rotary evaporated, and then held under high vacuum to yield 2.23 g of light brown, very viscous liquid ethylene/acrylic acid copolymer. The infrared spectrum showed strong COOH absorbances at 3400–2500 and at 1705cm$^{-1}$, as well as strong methylene absorbances at 3000–2900 and 1470 cm$^{-1}$.

A 0.3-g sample of the ethylene/acrylic acid copolymer was treated with diazomethane in ether to esterify the COOH groups and produce an ethylene/methyl acrylate copolymer. The infrared spectrum showed a strong ester carbonyl absorbance at 1750 cm$^{-1}$; the COOH absorbances were gone. $^1$H NMR analysis (CDCl$_3$): 96 methyl carbons per 1000 methylene carbons. Comparison of the integrals of the ester methoxy (3.67 ppm) and ester methylene (CH$_2$COOMe; 2.30 ppm) peaks with the integrals of the carbon chain methyls (0.8–0.9 ppm) and methylenes (1.2–1.3 ppm) indicated a methyl acrylate content of 1.8 mol % (5.4 wt % methyl acrylate=>4.5 wt % acrylic acid in the original copolymer). This product yield and composition represent 1200 ethylene turnovers and 22 acrylic acid turnovers. Gel permeation chromatography (trichlorobenzene, 135° C., polystyrene reference, results calculated as polyethylene using universal calibration theory): M$_n$=5,330; M$_w$=15,000; M$_w$/M$_n$=2.82.

Example 109

A 600-mL stirred Parr® autoclave was sealed and flushed with nitrogen. Fifty mL (48 g; 0.56 mol) of dry, deaerated methyl acrylate was introduced into the autoclave via gas tight syringe through a port on the autoclave head. Then 60 mg (0.07 mmol) of {[(2,6-i-PrPh)$_2$DABMe$_2$]PdMe(Et$_2$O)}

BAF⁻ was introduced into the autoclave in the following manner: a 2.5-mL gas tight syringe with a syringe valve was loaded with 60 mg of {[(2,6-i-PrPh)$_2$DABMe$_2$]PdMe (Et$_2$O)}BAF⁻ under nitrogen in a glove box; then 1 mL of dry, deaerated methylene chloride was drawn up into the syringe and the contents were quickly injected into the autoclave through a head port. This method avoids having the catalyst in solution with no stabilizing ligands.

The autoclave body was immersed in a running tap water bath; the internal temperature was very steady at 22° C. The autoclave was pressurized with ethylene to 2.8 MPa and continuously fed ethylene with stirring for 4.5 hr. The ethylene was then vented and the product, a mixture of methyl acrylate and yellow gooey polymer, was rinsed out of the autoclave with chloroform, rotary evaporated, and held under high vacuum overnight to yield 4.2 g of thick, light-brown liquid ethylene/methyl acrylate copolymer. The infrared spectrum of the product exhibited a strong ester carbonyl stretch at 1740 cm⁻¹. $^1$H NMR analysis (CDCl$_3$): 82 methyl carbons per 1000 methylene carbons. Comparison of the integrals of the ester methoxy (3.67 ppm) and ester methylene ($\underline{CH}_2$COOMe; 2.30 ppm) peaks with the integrals of the carbon chain methyls (0.8–0.9 ppm) and methylenes (1.2–1.3 ppm) indicated a methyl acrylate content of 1.5 mol % (4.4 wt %) This product yield and composition represent 2000 ethylene turnovers and 31 methyl acrylate turnovers. $^{13}$C NMR analysis: branching per 1000 CH$_2$: total Methyls (84.6), Methyl (28.7), Ethyl (15.5), Propyl (3.3), Butyl (8.2), ≧Hex and End Of Chain (23.9), methyl acrylate (13.9). Ester-bearing —CH(CH$_2$)$_n$CO2CH3 branches as a % of total ester: n≧5 (34.4), n=4 (6.2), n=1,2,3 (13), n=0 (46.4). Mole %: ethylene (97.6), methyl acrylate (2.4); chemical shifts were referenced to the solvent: the high field carbon of 1,2,4-trichlorobenzene (127.8 ppm). Gel permeation chromatography (tetrahydrofuran, 30° C., polymethylmethacrylate reference, results calculated as polymethylmethacrylate using universal calibration theory): $M_n$=22,000; $M_w$=45,500; $M_w/M_n$=2.07.

A mixture of 1.45 g of this ethylene/methyl acrylate copolymer, 20 mL dioxane, 2 mL water, and 1 mL of 50% aqueous NaOH was magnetically stirred at reflux under nitrogen for 4.5 hr. The liquid was then decanted away from the swollen polymer and the polymer was stirred several hours with three changes of boiling water. The polymer was filtered, washed with water and methanol, and dried under vacuum (80° C./nitrogen purge) to yield 1.2 g soft of ionomer rubber, insoluble in hot chloroform. The FTIR-ATR spectrum of a pressed film (pressed at 125° C./6.9 MPa) showed a strong ionomer peak at 1570 cm⁻¹ and virtually no ester carbonyl at 1750 cm⁻¹. The pressed film was a soft, slightly tacky rubber with about a 50% elongation to break. This example demonstrates the preparation of an ionomer from this ethylene/methyl acrylate polymer.

Example 110

The complex [(2,6-i-PrPh)$_2$DABMe$_2$]PdMeCl (0.020 g, 0.036 mmol) was weighed into a vial and dissolved in 6 ml CH$_2$Cl$_2$. NaBAF (0.032 g, 0.036 mmol) was rinsed into the stirring mixture with 4 ml of CH$_2$Cl$_2$. There was an immediate color change from orange to yellow. The solution was stirred under 6.2 MPa ethylene in a Fisher Porter tube with temperature control at 19° C. The internal temperature rose to 22° C. during the first 15 minutes. The temperature controller was raised to 30° C. After 35 minutes, the reaction was consuming ethylene slowly. After a total reaction time of about 20 h, there was no longer detectable ethylene consumption, but the liquid level in the tube was noticeably higher. Workup by addition to excess MeOH gave a viscous liquid precipitate. The precipitate was redissolved in CH$_2$Cl$_2$, filtered through a 0.5 micron PTFE filter and reprecipitated by addition to excess MeOH to give 7.208 g dark brown viscous oil (7180 equivalents of ethylene per Pd). $^1$H NMR (CDCl$_3$) 0.8–1.0 (m, CH$_3$); 1.0–1.5 (m, CH and CH$_2$). Integration allows calculation of branching: 118 methyl carbons per 1000 methylene carbons. GPC in THF vs. PMMA standard: $M_n$=12,700, $M_w$=28,800, $M_w/M_n$=2.26.

Example 111

The solid complex {[(2,6-i-PrPh)$_2$DABMe$_2$]PdMe (Et$_2$O)}SbF$_6$⁻ (0.080 g, 0.096 mmol) was placed in a Schlenk flask which was evacuated and refilled with ethylene twice. Under one atm of ethylene, black spots formed in the center of the solid complex and grew outward as ethylene was polymerized in the solid state and the resulting exotherm destroyed the complex. Solid continued to form on the solid catalyst that had not been destroyed by the exotherm, and the next day the flask contained considerable solid and the reaction was still slowly consuming ethylene. The ethylene was disconnected and 1.808 g of light gray elastic solid was removed from the flask (644 equivalents ethylene per Pd). The $^1$H NMR in CDCl$_3$ was similar to example 110 with 101 methyl carbons per 1000 methylene carbons. Differential Scanning Calorimetry (DSC): first heat 25 to 150° C., 15° C./min, no events; second heat −150 to 150° C., Tg=−53° C. with an endothermic peak centered at −20° C.; third heat −150 to 275° C., Tg=−51° C. with an endothermic peak centered at −20° C. GPC (trichlorobenzene, 135° C., polystyrene reference, results calculated as linear polyethylene using universal calibration theory): $M_n$=13,000 $M_w$=313,000 $M_w/M_n$=24.

Example 112

The complex {[(2,6-i-PrPh)$_2$DABMe$_2$]PdMe(Et$_2$O)}SbF$_6$⁻ (0.084 g, 0.100 mmol) was loaded into a Schlenk flask in the drybox followed by 40 ml of dry dioxane. The septum-capped flask was connected to a Schlenk line and the flask was then briefly evacuated and refilled with ethylene. The light orange mixture was stirred under an ethylene atmosphere at slightly above 1 atm by using a mercury bubbler. There was rapid uptake of ethylene. A room temperature water bath was used to control the temperature of the reaction. After 20 h, the reaction was worked up by removing the solvent in vacuo to give 10.9 g of a highly viscous fluid (3870 equivalents of ethylene per Pd). Dioxane is a solvent for the Pd complex and a non-solvent for the polymer product. $^1$H NMR (CDCl$_3$) 0.8–1.0 (m, CH$_3$); 1.0–1.5 (m, CH and CH$_2$). Integration allows calculation of branching: 100 methyl carbons per 1000 methylene carbons. GPC (trichlorobenzene, 135° C., polystyrene reference, results calculated as linear polyethylene using universal calibration theory): Partially resolved trimodal distribution with $M_n$=16300, $M_w$=151000 $M_w/M_n$=9.25. DSC (second heat, −150° C. to 150° C., 15° C./min) Tg=−63° C., endothermic peak centered at −30° C.

Example 113

Polymerization of ethylene was carried out according to example 112, using pentane as solvent. Pentane is a non-solvent for the Pd complex and a solvent for the polymer product. The reaction gave 7.47 g of dark highly viscous fluid (2664 equivalents of ethylene per Pd). $^1$H NMR analysis (CDCl$_3$): 126 methyl carbons per 1000 methylene carbons. $^{13}$C NMR analysis, branching per 1000 CH$_2$: Total methyls (128.8), Methyl (37.8), Ethyl (27.2), Propyl (3.5), Butyl (14.5), Amyl (2.5), $\geq$Hexyl and end of chain (44.7), average number of carbon atoms for $\geq$Hexyl branches=16.6 (calculated from intrinsic viscosity and GPC molecular weight data). Quantitation of the —CH$_2$CH(CH$_3$)CH$_2$CH$_3$ structure per 1000 CH$_2$'s: 8.3. These side chains are counted as a Methyl branch and an Ethyl branch in the quantitative branching analysis. GPC (trichlorobenzene, 135° C., polystyrene reference, results calculated as linear polyethylene using universal calibration theory): $M_n$=9,800, $M_w$=16,100, $M_w/M_n$=1.64. Intrinsic viscosity (trichlorobenzene, 135° C.)=0.125 g/dL. Absolute molecular weights calculated by GPC (trichlorobenzene, 135° C., polystyrene reference, corrected for branching using measured intrinsic viscosity): $M_n$=34,900, $M_w$=58,800, $M_w/M_n$=1.68. DSC (second heat, −150° C. to 150° C., 15° C./min) Tg=−71° C., endothermic peak centered at −43° C.

Example 114

Polymerization of ethylene was carried out according to example 112, using distilled degassed water as the medium. Water is a non-solvent for both the Pd complex and the polymer product. The mixture was worked up by decanting the water from the product which was then dried in vacuo to give 0.427 g of dark sticky solid (152 equivalents of ethylene per Pd). $^1$H NMR analysis (CDCl$_3$): 97 methyl carbons per 1000 methylene carbons. GPC (trichlorobenzene, 135° C., polystyrene reference, results calculated as linear polyethylene using universal calibration theory): $M_n$=25,100, $M_w$=208,000, $M_w/M_n$=8.31.

Example 115

Polymerization of ethylene was carried out according to example 112, using 2-ethylhexanol as the solvent. The Pd complex is sparingly soluble in this solvent and the polymer product is insoluble. The polymer product formed small dark particles of high viscosity liquid suspended in the 2-ethylhexanol. The solvent was decanted and the polymer was dissolved in CHCl$_3$ and reprecipitated by addition of excess MeOH. The solvent was decanted and the reprecipitated polymer was dried in vacuo to give 1.66 g of a dark highly viscous fluid (591 equivalents of ethylene per Pd). $^1$H NMR analysis (CDCl$_3$): 122 methyl carbons per 1000 methylene carbons. GPC (trichlorobenzene, 135° C., polystyrene reference, results calculated as linear polyethylene using universal calibration theory): $M_n$=7,890, $M_w$=21,600, $M_w/M_n$=2.74.

Example 116

The solid complex $\{[(2,6\text{-}i\text{-}PrPh)_2DABMe_2]PdMe(Et_2O)\}SbF_6^-$ (0.084 g, 0.100 mmol) was loaded into a Schlenk flask in the drybox. The flask was connected to a Schlenk line under 1 atm of ethylene, and cooled to −78° C. Solvent, (CH$_2$Cl$_2$, 40 ml) was added by syringe and after equilibrating at −78° C. under ethylene, the mixture was warmed to room temperature under ethylene. The mixture was stirred under an ethylene atmosphere at slightly above 1 atm by using a mercury bubbler. There was rapid uptake of ethylene. A room temperature water bath was used to control the temperature of the reaction. After 24 h, the reaction was worked up by removing the solvent in vacuo to give 24.5 g of a highly viscous fluid (8730 equivalents of ethylene per Pd). CH$_2$Cl$_2$ is a good solvent for both the Pd complex and the polymer product. The polymer was dissolved in CH$_2$Cl$_2$, and reprecipitated by addition to excess MeOH in a tared flask. The solvent was decanted, and the reprecipitated polymer was dried in vacuo to give 21.3 g of a dark highly viscous fluid. $^1$H NMR analysis (CDCl$_3$): 105 methyl carbons per 1000 methylene carbons. C-13 NMR analysis, branching per 1000 CH$_2$: Total methyls (118.6), Methyl (36.2), Ethyl (25.9), Propyl (2.9), Butyl (11.9), Amyl (1.7), $\geq$Hexyl and end of chains (34.4), average number of carbon atoms for $\geq$Hexyl branches=22.5 (calculated from intrinsic viscosity and GPC molecular weight data). Quantitation of the —CH$_2$CH(CH$_3$)CH$_2$CH$_3$ structure per 1000 CH$_2$'s: 8.1. These side chains also counted as a Methyl branch and an Ethyl branch in the quantitative branching analysis. GPC (trichlorobenzene, 135° C., polystyrene reference, results calculated as linear polyethylene using universal calibration theory): $M_n$=25,800, $M_w$=45,900, $M_w/M_n$=1.78. Intrinsic viscosity (trichlorobenzene, 135° C.)=0.24 g/dL. Absolute molecular weights calculated by GPC (trichlorobenzene, 135° C., polystyrene reference, corrected for branching using measured intrinsic viscosity): $M_n$=104,000, $M_w$=188,000, $M_w/M_n$=1.81.

Listed below are the $^{13}$C NMR data upon which the above analysis is based.

| $^{13}$C NMR Data TCB, 120 C, 0.06 M CrAcAc | | |
|---|---|---|
| Freq ppm | Intensity | |
| 39.7233 | 5.12305 | |
| 39.318 | 17.6892 | MB$_2$ |
| 38.2022 | 17.9361 | MB$_3$+ |
| 37.8369 | 32.3419 | MB$_3$+ |
| 37.2469 | 43.1136 | $\alpha$B$_1$, 3B$_3$ |
| 36.8335 | 10.1653 | $\alpha$B$_1$, 3B$_3$ |
| 36.7452 | 14.674 | $\alpha$B$_1$, 3B$_3$ |
| 34.9592 | 10.3554 | $\alpha\gamma$+B, (4B$_4$, 5B$_5$, etc.) |
| 34.6702 | 24.015 | $\alpha\gamma$+B, (4B$_4$, 5B$_5$, etc.) |
| 34.5257 | 39.9342 | $\alpha$###+B, (4B$_4$, 5B$_5$, etc.) |
| 34.2006 | 109.158 | $\alpha$###+B, (4B$_4$, 5B$_5$, etc.) |
| 33.723 | 36.1658 | $\alpha$###+B, (4B$_4$, 5B$_5$, etc.) |
| 33.3136 | 12.0398 | MB$_1$ |
| 32.9323 | 20.7242 | MB$_1$ |
| 32.4266 | 6.47794 | 3B$_5$ |
| 31.9409 | 96.9874 | 3B$_6$+, 3EOC |
| 31.359 | 15.2429 | ###+###+B, 3B$_4$ |
| 31.0981 | 19.2981 | ###+$\gamma$+B, 3B$_4$ |
| 30.6606 | 15.8689 | ###+###+B, 3B$_4$ |
| 30.2271 | 96.7986 | ###+###+B, 3B$_4$ |
| 30.1188 | 54.949 | ###+###+B, 3B$_4$ |
| 29.7455 | 307.576 | ###+###+B, 3B$_4$ |
| 29.5809 | 36.2391 | ###+###+B, 3B$_4$ |
| 29.3361 | 79.3542 | ###+###+B, 3B$_4$ |
| 29.2157 | 23.0783 | ###+###+B, 3B$_4$ |
| 27.6424 | 24.2024 | $\beta$###+B, 2B$_2$, (4B$_5$, etc.) |
| 27.526 | 29.8995 | $\beta$###+B, 2B$_2$, (4B$_5$, etc.) |
| 27.3534 | 23.1626 | $\beta$###+B, 2B$_2$, (4B$_5$, etc.) |
| 27.1607 | 70.8066 | $\beta$###+B, 2B$_2$, (4B$_5$, etc.) |
| 27.0042 | 109.892 | $\beta$###+B, 2B$_2$, (4B$_5$, etc.) |
| 26.5908 | 7.13232 | $\beta$###+B, 2B$_2$, (4B$_5$, etc.) |
| 26.3941 | 23.945 | $\beta$###+B, 2B$_2$, (4B$_5$, etc.) |
| 25.9446 | 4.45077 | $\beta$###+B, 2B$_2$, (4B$_5$, etc.) |
| 24.4034 | 9.52585 | $\beta\beta$B |
| 24.2428 | 11.1161 | $\beta\beta$B |
| 23.1391 | 21.2608 | 2B$_4$ |
| 23.0227 | 11.2909 | 2B$_4$ |
| 22.6494 | 103.069 | 2B$_5$+, 2EOC |
| 20.0526 | 5.13224 | 2B$_3$ |
| 19.7355 | 37.8832 | 1B$_1$ |
| 19.2017 | 14.8043 | 1B$_1$, Structure XXVII |
| 14.4175 | 4.50604 | 1B$_3$ |
| 13.9118 | 116.163 | 1B$_4$+, 1EOC |
| 11.1986 | 18.5867 | 1B$_2$, Structure XXVII |
| 10.9617 | 32.3855 | 1B$_2$ |

Example 117

Polymerization of ethylene was carried out according to example 116, at a reaction temperature of 0° C. and reaction time of several hours. The polymer product formed a separate fluid phase on the top of the mixture. The reaction was quenched by adding 2 ml acrylonitrile. The product was moderately viscous fluid, 4.5 g (1600 equivalents of ethylene per Pd). $^1$H NMR analysis (CDCl$_3$): 108 methyl carbons per 1000 methylene carbons. $^{13}$C NMR analysis, branching per 1000 CH$_2$: Total methyls (115.7), Methyl (35.7), Ethyl (24.7), Propyl (2.6), Butyl (11.2), Amyl (3.2), ≧Hexyl and end of chain (37.1). Quantitation of the —CH$_2$CH(CH$_3$)CH$_2$CH$_3$ structure per 1000 CH$_2$'s: 7.0. These side chains are counted as a Methyl branch and an Ethyl branch in the quantitative branching analysis. GPC (trichlorobenzene, 135° C., polystyrene reference, results calculated as linear polyethylene using universal calibration theory: $M_n$=15,200, $M_w$=23,700, $M_w/M_n$=1.56.

Example 118

The Pd complex {[(2,6-i-PrPh)$_2$DABMe$_2$]PdCH$_2$CH$_2$CH$_2$C(O)OCH$_3$}SbF$_6^-$ (0.084 g, 0.100 mmol) was loaded into a Schlenk flask in the drybox, and 40 ml of FC-75 was added. The septum-capped flask was connected to a Schlenk line and the flask was then briefly evacuated and refilled with ethylene from the Schlenk line. The mixture was stirred under an ethylene atmosphere at slightly above 1 atm by using a mercury bubbler. Both the Pd initiator and the polymer are insoluble in FC-75. After 15 days, the reaction flask contained a large amount of gray elastic solid. The FC-75 was decanted, and the solid polymer was then dissolved in CHCl$_3$ and precipitated by addition of the solution to excess MeOH. The polymer was dried in vacuo, and then dissolved in o-dichlorobenzene at 100° C. The hot solution was filtered through a 10 μm PTFE filter. The filtered polymer solution was shaken in a separatory funnel with concentrated sulfuric acid, followed by distilled water, followed by 5% NaHCO$_3$ solution, followed by two water washes. The polymer appeared to be a milky suspension in the organic layer during this treatment. After washing, the polymer was precipitated by addition to excess MeOH in a blender and dried at room temperature in vacuo to give 19.6 g light gray elastic polymer fluff (6980 equivalents of ethylene per Pd). $^1$H NMR analysis (CDCl$_3$): 112 methyl carbons per 1000 methylene carbons. $^{13}$C NMR analysis, branching per 1000 CH$_2$: Total methyls (114.2), Methyl (42.1), Ethyl (24.8), Propyl (5.1), Butyl (10.2), Amyl (4), ≧Hexyl and end of chain (30.3), average number of carbon atoms for ≧Hexyl branches=14.4 (calculated from intrinsic viscosity and GPC molecular weight data). GPC (trichlorobenzene, 135° C., polystyrene reference, results calculated as linear polyethylene using universal calibration theory: $M_n$=110,000, $M_w$=265,000, $M_w/M_n$=2.40. Intrinsic viscosity (trichlorobenzene, 135° C.)=1.75 g/dL. Absolute molecular weights calculated by GPC (trichlorobenzene, 135° C., polystyrene reference, corrected for branching using measured intrinsic viscosity): $M_n$=214,000, $M_w$=535,000, $M_w/M_n$=2.51.

Example 119

Polymerization of ethylene was carried out according to example 112, using the complex {[(2,6-i-PrPh)$_2$DABMe$_2$]PdCH$_2$CH$_2$CH$_2$C(O)OCH$_3$}SbF$_6^-$ (0.084 g, 0.100 mmol) as the initiator and CHCl$_3$ as the solvent. The reaction gave 28.4 g of dark viscous fluid (10,140 equivalents of ethylene per Pd). $^1$H NMR analysis (CDCl$_3$): 108 methyl carbons per 1000 methylene carbons. $^{13}$C NMR analysis, branching per 1000 CH$_2$: Total methyls (119.5), Methyl (36.9), Ethyl (25.9), Propyl (2.1), Butyl (11), Amyl (1.9), ≧Hexyl and end of chain (38.9). GPC (trichlorobenzene, 135° C., polystyrene reference, results calculated as linear polyethylene using universal calibration theory): $M_n$=10,800, $M_w$=26,800, $M_w/M_n$=2.47.

Example 120

Polymerization of ethylene was carried out according to example 112, using the complex [(2,6-i-PrPh)$_2$DABMe$_2$]PdMe(OSO$_2$CF$_3$) (0.068 g, 0.10 mmol) as the initiator and CHCl$_3$ as the solvent. The reaction gave 5.98 g of low viscosity fluid (2130 equivalents of ethylene per Pd). $^1$H NMR (CDCl$_3$) 0.8–1.0 (m, CH$_3$); 1.0–1.5 (m, CH and CH$_2$); 1.5–1.7 (m, C$\underline{H}_3$CH=CH—); 1.9–2.1 (broad, —C$\underline{H}_2$CH=CHC$\underline{H}_2$—); 5.3–5.5 (m, —CH=CH—). Integration of the olefin end groups assuming one olefin per chain gives $M_n$=630 (DP=24). A linear polymer with this molecular weight and methyl groups at both ends should have 46 methyl carbons per 1000 methylene carbons. The value measured by integration is 161, thus this polymer is highly branched.

Example 121

Polymerization of ethylene was carried out according to example 112, using the complex {[(2,6-i-PrPh)$_2$DABH$_2$]PdCH$_2$CH$_2$CH$_2$C(O)OCH$_3$}SbF$_6^-$ (0.082 g, 0.10 mmol) as the initiator and CHCl$_3$ as the solvent. The reaction gave 4.47 g of low viscosity fluid (1600 equivalents of ethylene per Pd). $^1$H NMR (CDCl$_3$) is similar to example 120. Integration of the olefin end groups assuming one olefin per chain gives $M_n$=880 (DP=31). A linear polymer with this molecular weight and methyl groups at both ends should have 34 methyl carbons per 1000 methylene carbons. The value measured by integration is 156, thus this polymer is highly branched.

Example 122

Polymerization of ethylene was carried out according to example 112, using the complex {[(2,6-i-PrPh)$_2$DABMe$_2$]PdCH$_2$CH$_2$CH$_2$C(O)OCH$_3$}BCl(C$_6$F$_5$)$_3^-$ (0.116 g, 0.10 mmol) as the initiator and CHCl$_3$ as the solvent. The reaction gave 0.278 g of low viscosity fluid, after correcting for the catalyst residue this is 0.160 g (57 equivalents of ethylene per Pd). $M_n$ estimated by integration of olefin end groups is 300.

Example 123

The complex [(2,6-i-PrPh)$_2$DABMe$_2$]PdMeCl (0.056 g, 0.10 mmol) was loaded into a Schlenk flask in the drybox followed by 40 ml of dry toluene. A solution of ethyl aluminum dichloride (1.37 ml of 0.08 M solution in o-dichlorobenzene) was added while stirring. Polymerization of ethylene was carried out using this solution according to example 112. The reaction gave 0.255 g of low viscosity fluid, after correcting for the catalyst residue this is 0.200 g (71 equivalents of ethylene per Pd). $M_n$ estimated by integration of olefin end groups is 1300.

Example 124

Methyl acrylate was sparged with argon, dried over activated 4A sieves, passed through activity 1 alumina B in the drybox, and inhibited by addition of 20 ppm phenothiazine. The solid complex {[(2,6-i-PrPh)$_2$DABMe$_2$]PdMe ($Et_2O$)}$SbF_6^-$ (0.084 g, 0.100 mmol) was loaded into a Schlenk flask in the drybox. The flask was connected to a Schlenk line under 1 atm of ethylene, and cooled to −78° C. Forty ml of $CH_2Cl_2$ was added by syringe and after equilibrating at −78° C. under ethylene, 5 ml of methyl acrylate was added by syringe and the mixture was warmed to room temperature under ethylene. After 40 h, the reaction was worked up by removing the solvent in vacuo to give 3.90 g of moderately viscous fluid. Integration of the $^1H$ NMR spectrum showed that this copolymer contained 6.9 mole % methyl acrylate. No poly(methyl acrylate) homopolymer could be detected in this sample by $^1H$ NMR. $^1H$ NMR shows that a significant fraction of the ester groups are located at the ends of hydrocarbon branches: 3.65 (s, —$CO_2CH_3$, area=4.5), 2.3 (t, —$C\underline{H}_2CO_2CH_3$, ester ended branches, area=3), 1.6 (m, —$C\underline{H}_2CH_2CO_2CH_3$, ester ended branches, area=3), 0.95–1.55 (m, CH and other $CH_2$, area=73), 0.8–0.95 (m, $CH_3$, ends of branches or ends of chains, area=9.5) This is confirmed by the $^{13}C$ NMR quantitative analysis: Mole %: ethylene (93.1), methyl acrylate (6.9), Branching per 1000 $CH_2$: Total methyls (80.2), Methyl (30.1), Ethyl (16.8), Propyl (1.6), Butyl (6.8), Amyl (1.3), $\geq$Hexyl and end of chain (20.1), methyl acrylate (41.3), Ester branches $CH(CH_2)_nCO_2CH_3$ as a % of total ester: n$\geq$5 (47.8), n=4 (17.4), n=1,2,3 (26.8), n=0 (8).

GPC of this sample was done in THF vs. PMMA standards using a dual UV/RI detector. The outputs of the two detectors were very similar. Since the UV detector is only sensitive to the ester functionality, and the RI detector is a relatively nonselective mass detector, the matching of the two detector outputs shows that the ester functionality of the methyl acrylate is distributed throughout the entire molecular weight range of the polymer, consistent with a true copolymer of methyl acrylate and ethylene.

A 0.503 g sample of the copolymer was fractionated by dissolving in benzene and precipitating partially by slow addition of MeOH. This type of fractionation experiment is a particularly sensitive method for detecting a low molecular weight methyl acrylate rich component since it should be the most soluble material under the precipitation conditions.

The precipitate 0.349 g, (69%) contained 6.9 mole % methyl acrylate by $^1H$ NMR integration, GPC (THF, PMMA standard, RI detector): $M_n$=19,600, $M_w$=29,500, $M_w/M_n$=1.51. The soluble fraction 0.180 g (36%) contained 8.3 mole % methyl acrylate by $^1H$ NMR integration, GPC (THF, PMMA standard, RI detector): $M_n$=11,700, $M_w$=19,800, $M_w/M_n$=1.70. The characterization of the two fractions shows that the acrylate content is only slightly higher at lower molecular weights. These results are also consistent with a true copolymer of the methyl acrylate with ethylene.

Example 125

Methyl acrylate was sparged with argon, dried over activated 4A sieves, passed through activity 1 alumina B in the drybox, and inhibited by addition of 20 ppm phenothiazine. The complex [(2,6-i-PrPh)$_2$DABMe$_2$]PdMe($OSO_2CF_3$) (0.068 g, 0.10 mmol) was loaded into a Schlenk flask in the drybox, and 40 ml of $CHCl_3$ was added followed by 5 ml of methyl acrylate. The septum capped flask was connected to a Schlenk line and the flask was then briefly evacuated and refilled with ethylene from the Schlenk line. The light orange mixture was stirred under an ethylene atmosphere at slightly above 1 atm by using a mercury bubbler. After 20 h, the reaction was worked up by removing the solvent and unreacted methyl acrylate in vacuo to give 1.75 g of a low viscosity copolymer.

$^{13}C$ NMR quantitative analysis: Mole %: ethylene (93), methyl acrylate (7), Branching per 1000 $CH_2$: Total methyls (100.9), Methyl (33.8), Ethyl (19.8), Propyl (1.9), Butyl (10.1), Amyl (7.3), $\geq$Hexyl and end of chains (28.4), methyl acrylate (41.8). This sample is low molecular weight—total methyls does not include end of chain methyls. Ester branches —$CH(CH_2)_nCO_2CH_3$ as a % of total ester: n$\geq$5 (51.3), n=4 (18.4), n=1,2,3 (24), n=0 (6.3).

Example 126

Ethylene and methyl acrylate were copolymerized according to example 125 with catalyst {[(2,6-i-PrPh)$_2$DABMe$_2$]PdCH$_2$CH$_2$CH$_2$C(O)OCH$_3$}BAF$^-$ (0.136 g, 0.10 mmol) in $CH_2Cl_2$ solvent with a reaction time of 72 hours to give 4.93 g of copolymer.

Example 127

Ethylene and methyl acrylate were copolymerized according to example 125 with catalyst {[(2,6-i-PrPh)$_2$DABMe$_2$]PdCHCH$_2$CH$_2$C(O)OCH$_3$}SbF$_6^-$ (0.084 g, 0.10 mmol) with a reaction time of 72 hours to give 8.19 g of copolymer.

Example 128

Ethylene and methyl acrylate were copolymerized according to example 125 with catalyst {[(2,6-i-PrPh)$_2$DABH$_2$]PdCH$_2$CH$_2$CH$_2$C(O)OCH$_3$}SbF$_6^-$ (0.082 g, 0.10 mmol) to give 1.97 g of copolymer.

Example 129

Ethylene and methyl acrylate were copolymerized according to example 125 with catalyst {[(2,6-i-PrPh)$_2$DABMe$_2$]PdMe(CH$_3$CN)}SbF$_6^-$ (0.080 g, 0.10 mmol) to give 3.42 g of copolymer. The $^1H$ NMR shows primarily copolymer, but there is also a small amount of poly(methyl acrylate) homopolymer.

Example 130

Ethylene and methyl acrylate (20 ml) were copolymerized in 20 ml of $CHCl_3$ according to example 125 using catalyst {[(2,6-i-PrPh)$_2$DABMe$_2$]PdCH$_2$CH$_2$CH$_2$C(O)OCH$_3$}SbF$_6^-$ (0.339 g, 0.40 mmol) to give 2.17 g of copolymer after a reaction time of 72 hours. $^{13}C$ NMR quantitative analysis: Mole %: ethylene (76.3), methyl acrylate (23.7). Branching per 1000 $CH_2$: Total methyls (28.7), Methyl:(20.5), Ethyl (3.8), Propyl (0), Butyl (11), $\geq$Amyl and end of chains (13.6), methyl acrylate (138.1). Ester branches —$CH(CH_2)_nCO_2CH_3$ as a % of total ester: n$\geq$5 (38.8), n=4 (20), n=1,2,3 (15.7), n=0 (25.4).

Example 131

Ethylene and methyl acrylate (20 ml) were copolymerized in 20 ml of $CHCl_3$ at 50° C. for 20 hours according to example 125 using catalyst {[(2,6-i-PrPh)$_2$DABMe$_2$]PdCH$_2$CH$_2$CH$_2$C(O)OCH$_3$}SbF$_6^-$ (0.339 g, 0.40 mmol) to give 0.795 g of copolymer. DSC (two heats, −150 to +150° C., 15° C./min) shows Tg=−48° C.

Example 132

A solution of the ligand (2,6-i-PrPh)$_2$DAB(Me$_2$) (0.045 g, 0.11 mmol) dissolved in 2 ml of $CHCl_3$ was added to a solution of the complex [PdMe(CH$_3$CN)(1,5-cyclooctadiene)]$^+$SbF$_6^-$ (0.051 g, 0.10 mmol) in 2 ml of $CHCl_3$. This mixture was combined with 35 ml of additional CHCl$_3$ and 5 ml of methyl acrylate in a Schlenk flask in a drybox, and then a copolymerization with ethylene was carried out according to example 125 to give 1.94 g of copolymer.

Example 133

Methyl acrylate (5 ml) was added to the solid catalyst {[(2,6-i-PrPh)$_2$DABMe$_2$]PdMe(Et$_2$O)}BF$_4^-$ (0.069 g, 0.10 mol) followed by 40 ml of CHCl$_3$. The addition of methyl acrylate before the CHCl$_3$ is often important to avoid deactivation of the catalyst. A copolymerization with ethylene was carried out according to example 125 to give 2.87 g of copolymer.

Characterization of Poly(ethylene-co-methyl Acrylate) by $^1$H NMR

NMR spectra in CDCl$_3$ were integrated and the polymer compositions and branching ratios were calculated. See example 124 for chemical shifts and assignments.

| Example | Yield(g) | methyl acrylate (mole %) | CH$_3$ per 1000 CH$_2$ | CO$_2$CH$_3$ per 1000 CH$_2$ |
|---|---|---|---|---|
| 124 | 3.9 | 6.9 | 80 | 42 |
| 125 | 1.75 | 7.1 | 104 | 45 |
| 126 | 4.93 | 5.6 | 87 | 34 |
| 127 | 8.19 | 6.1 | 87 | 37 |
| 128 | 1.97 | 7.3 | 159 | 50 |
| 129 | 3.42 | 9.5 | 86 | 59 |
| 130 | 2.17 | 22.8 | 29 | 137 |
| 131 | 0.795 | 41 | 14 | 262 |
| 132 | 1.94 | 6.1 | 80 | 36 |
| 133 | 2.87 | 8.2 | 70 | 49 |

Molecular Weight Characterization

GPC was done in THF using PMMA standards and an RI detector except for example 133 which was done in trichlorobenzene at 135° C. vs. polystyrene reference with results calculated as linear polyethylene using universal calibration theory. When polymer end groups could be detected by $^1$H NMR (5.4 ppm, multiplet, —CH=CH—, internal double bond), M$_n$ was calculated assuming two olefinic protons per chain.

| Example | M$_n$ | M$_w$ | M$_w$/M$_n$ | M$_n$ ($^1$H NMR) |
|---|---|---|---|---|
| 124 | 15,500 | 26,400 | 1.70 | |
| 125 | 1,540 | 2,190 | 1.42 | 850 |
| 126 | 32,500 | 49,900 | 1.54 | |
| 127 | 12,300 | 22,500 | 1.83 | |
| 128 | 555 | 595 | 1.07 | 360 |
| 129 | 16,100 | 24,900 | 1.55 | |
| 130 | 800 | 3,180 | 3.98 | 1,800 |
| 131 | | | | 1,100 |
| 132 | 15,200 | 26,000 | 1.71 | |
| 133 | 5,010 | 8,740 | 1.75 | |

Example 134

Ethylene and t-butyl acrylate (20 ml) were copolymerized according to example 130 to give 2.039 g of viscous fluid. $^1$H NMR of the crude product showed the desired copolymer along with residual unreacted t-butyl acrylate. The weight of polymer corrected for monomer was 1.84 g. The sample was reprecipitated to remove residual monomer by slow addition of excess MeOH to a CHCl$_3$ solution. The reprecipitated polymer was dried in vacuo. $^1$H NMR (CDCl$_3$): 2.2 (t, —C$\underline{H}_2$CO$_2$C(CH$_3$)$_3$, ester ended branches), 1.6 (m, —C$\underline{H}_2$CH$_2$CO$_2$C(CH$_3$)$_3$, ester ended branches), 1.45 (s, —C(CH$_3$)$_3$), 0.95–1.45 (m, CH and other CH$_2$), 0.75–0.95 (m, CH$_3$, ends of hydrocarbon branches or ends of chains). This spectrum shows that the esters are primarily located at the ends of hydrocarbon branches; integration gave 6.7 mole % t-butyl acrylate. $^{13}$C NMR quantitative analysis, branching per 1000 CH$_2$: Total methyls (74.8), Methyl (27.7), Ethyl (15.3), Propyl (1.5), Butyl (8.6), ≧Amyl and the end of chains (30.8), —CO$_2$C(CH$_3$)$_3$ ester (43.2). Ester branches —CH(CH$_2$)$_n$CO$_2$C(CH$_3$)$_3$ as a % of total ester: n≧5 (44.3), n=1,2,3,4 (37.2), n=0 (18.5). GPC (THF, PMMA standard): M$_n$=6000 M$_w$=8310 M$_w$/M$_n$=1.39.

Example 135

Glycidyl acrylate was vacuum distilled and inhibited with 50 ppm phenothiazine. Ethylene and glycidyl acrylate (5 ml) were copolymerized according to Example 125 using catalyst {[(2,6-i-PrPh)$_2$DABMe$_2$]PdCH$_2$CH$_2$CH$_2$C(O)OCH$_3$}SbF$_6^-$ (0.084 g, 0.10 mmol). The reaction mixture was filtered through a fritted glass filter to remove chloroform insolubles, and the chloroform was removed in vacuo to give 14.1 g viscous yellow oil which still contained residual unreacted glycidyl acrylate. The sample was reprecipitated to remove residual monomer by slow addition of excess acetone to a CHCl$_3$ solution. The reprecipitated polymer was dried in vacuo to give 9.92 g of copolymer containing 1.8 mole % glycidyl acrylate. $^1$H NMR (CDCl$_3$): 4.4, 3.9, 3.2, 2.85,

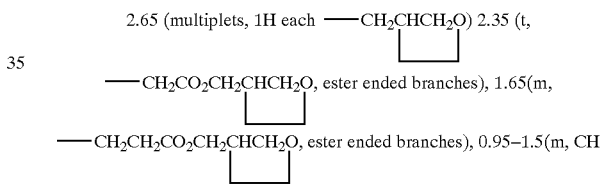

and other CH$_2$), 0.75–0.95 (m, CH$_3$, ends of hydrocarbon branches or ends of chains). This spectrum shows that the epoxide ring is intact, and that the glycidyl ester groups are primarily located at the ends of hydrocarbon branches. GPC (THF, PMMA standard): M$_n$=63,100 M$_w$=179,000 M$_w$/M$_n$=2.85.

$^{13}$C NMR quantitative analysis, branching per 1000 CH$_2$: Total methyls (101.7), Methyl (32.5), Ethyl (21.3), Propyl (2.4), Butyl (9.5), Amyl (1.4), ≧Hexyl and end of chains (29.3), Ester branches —CH(CH$_2$)$_n$CO$_2$R as a % of total ester: n≧5 (39.7), n=4 (small amount), n=1,2,3 (50.7), n=0 (9.6).

A 3.24-g sample of the copolymer was dissolved in 50 mL of refluxing methylene chloride. A solution of 0.18 g oxalic acid dihydrate in 5 mL of 1:1 chloroform-acetone was added to the solution of copolymer and the solvent was evaporated off on a hot plate. The thick liquid was allowed to stand in an aluminum pan at room temperature overnight; the pan was then placed in an oven at 70° C. for 1.5 hr followed by 110° C./vacuum for 5 hr. The cured polymer was a dark, non-tacky soft rubber which tore easily (it had a very short elongation to break despite its rubberiness).

Example 136

1-Pentene (20 ml) and methyl acrylate (5 ml) were copolymerized in 20 ml chloroform for 96 hours using catalyst $\{[(2,6\text{-i-PrPh})_2\text{DABMe}_2]\text{PdCH}_2\text{CH}_2\text{CH}_2\text{C(O)}\text{OCH}_3\}\text{SbF}_6^-$ (0.084 g, 0.10 mmol). The solvent and unreacted monomers were removed in vacuo to give 0.303 g copolymer (0.219 g after correcting for catalyst residue). The $^1$H NMR spectrum was similar to the ethylene/methyl acrylate copolymer of example 124 suggesting that many of the ester groups are located at the ends of hydrocarbon branches. Integration shows that the product contains 21 mole % methyl acrylate. There are 65 acrylates and 96 methyls per 1000 methylene carbons. GPC (THF, PMMA standard): $M_n=6400$ $M_w=11200$ $M_w/M_n=1.76$.

Example 137

Benzyl acrylate was passed through activity 1 alumina B, inhibited with 50 ppm phenothiazine, and stored over activated 4A molecular sieves. Ethylene and benzyl acrylate (5 ml) were copolymerized according to example 135 to give 11.32 g of viscous fluid. $^1$H NMR of the crude product showed a mixture of copolymer and unreacted benzyl acrylate (35 wt %) The residual benzyl acrylate was removed by two reprecitations, the first by addition of excess MeOH to a chloroform solution, and the second by addition of excess acetone to a chloroform solution. $^1$H NMR (CDCl$_3$): 7.35 (broad s, —CH$_2$C$_6$H$_5$), 5.1 (s, —CH$_2$C$_6$H$_5$), 2.35 (t, —CH$_2$CO$_2$CH$_2$C$_6$H$_5$, ester ended branches), 1.6 (m, —CH$_2$CH$_2$CO$_2$CH$_2$C$_6$H$_5$, ester ended branches), 0.95–1.5 (m, CH and other CH$_2$), 0.75–0.95 (m, CH$_3$, ends of hydrocarbon branches or ends of chains). Integration shows that the product contains 3.7 mole % benzyl acrylate. There are 21 acrylates and 93 methyls per 1000 methylene carbons. GPC (THF, PMMA standard): $M_n=46,200$ $M_w=73,600$ $M_w/M_n=1.59$.

$^{13}$C NMR quantitative analysis, Branching per 1000 CH$_2$: Total methyls (97.2), Methyl (32.9), Ethyl (20.3), Propyl (2.4), Butyl (9.7), Amyl (2.9), ≧Hexyl and end of chains (35.2), benzyl acrylate (17.9), Ester branches —CH(CH$_2$)$_n$CO$_2$R as a % of total ester: n≧5 (44.5), n=4 (7.2), n=1,2,3 (42.3), n=0 (6).

Example 138

1-Pentene (10 ml) and ethylene (1 atm) were copolymerized in 30 ml chloroform according to example 125 using catalyst $\{[(2,6\text{-i-PrPh})_2\text{DABMe}_2]\text{PdCH}_2\text{CH}_2\text{CH}_2\text{C(O)}\text{OCH}_3\}\text{SbF}_6^-$ (0.084 g, 0.10 mmol) to give 9.11 g highly viscous yellow oil The $^1$H NMR spectrum was similar to the poly(ethylene) of example 110 with 113 methyl carbons per 100 methylene carbons. $^{13}$C NMR quantitative analysis, branching per 1000 CH$_2$: Total methyls (119.5), Methyl (54.7), Ethyl (16.9), Propyl (8.4), Butyl (7.7), Amyl (7.2), ≧Hexyl and end of chains (30.9). GPC (trichlorobenzene, 135° C., polystyrene reference, results calculated as linear polyethylene using universal calibration theory): $M_n=25,000$, $M_w=44,900$, $M_w/M_n=1.79$.

Listed below are the $^{13}$C NMR data upon which the above analysis is based.

| $^{13}$C NMR Data TCB, 120 C, 0.05 M CrAcAc | | |
|---|---|---|
| Freq ppm | Intensity | |
| 39.6012 | 5.53532 | |
| 39.4313 | 6.33425 | MB$_2$ |
| 38.3004 | 8.71403 | MB$_3$+ |
| 37.9446 | 17.7325 | MB$_3$+ |
| 37.2809 | 36.416 | αB$_1$, 3B$_3$ |
| 36.7659 | 5.10586 | αB$_1$, 3B$_3$ |
| 34.3181 | 56.1758 | αγ+B |
| 33.8243 | 15.6271 | αγ+B |
| 33.3942 | 8.09189 | MB$_1$ |
| 32.9854 | 20.3523 | MB$_1$ |
| 32.6721 | 4.35239 | MB$_1$ |
| 32.327 | 4.06305 | 3B$_5$ |
| 31.9394 | 27.137 | 3B$_6$+, 3 EOC |
| 31.4031 | 9.62823 | γ+γ+B, 3B$_4$ |
| 30.235 | 52.8404 | γ+γ+B, 3B$_4$ |
| 29.7518 | 162.791 | γ+γ+B, 3B$_4$ |
| 29.3164 | 26.506 | γ+γ+B, 3B$_4$ |
| 27.5695 | 15.4471 | Bγ+B, 2B$_2$ |
| 27.1341 | 59.1216 | Bγ+B, 2B$_2$ |
| 26.4811 | 8.58222 | Bγ+B, 2B$_2$ |
| 24.4475 | 5.93996 | βββ |
| 23.12 | 5.05181 | 2B$_4$ |
| 22.6369 | 29.7047 | 2B$_5$+, 2 EOC |
| 20.1626 | 6.29481 | 2B$_3$ |
| 19.7378 | 31.9342 | 1B$_1$ |
| 19.2068 | 3.93019 | 1B$_1$ |
| 14.2582 | 5.59441 | 1B$_3$ |
| 13.8706 | 36.3938 | 1B$_4$+, 1 EOC |
| 10.9768 | 9.89028 | 1B$_2$ |

Example 139

1-Pentene (20 ml) was polymerized in 20 ml chloroform according to example 138 to give 2.59 g of viscous fluid (369 equivalents 1-pentene per Pd). Integration of the $^1$H NMR spectrum showed 118 methyl carbons per 1000 methylene carbons. DSC (two heats, −150 to +150° C., 15° C./min) shows Tg=−58° C. and a low temperature melting endotherm from −50° C. to 30° C. (32 J/g).

$^{13}$C NMR quantitative analysis, branching per 1000 CH$_2$: Total methyls (118), Methyl (85.3), Ethyl (none detected), Propyl (15.6), Butyl (non detected), ≧Amyl and end of chains (17.1). GPC (trichlorobenzene, 135° C., polystyrene reference, results calculated as linear polyethylene using universal calibration theory): $M_n=22,500$, $M_w=43,800$, $M_w/M_n=1.94$.

Listed below are the $^{13}$C NMR data upon which the above analysis is based.

| $^{13}$C NMR data TCB, 120 C, 0.05M CrAcAc | | |
|---|---|---|
| Freq ppm | Intensity | |
| 42.6277 | 4.69744 | αα for Me & Et$^+$ |
| 39.5428 | 9.5323 | 3rd carbon of a 6$^+$ carbon side chain that has a methyl branch at the 4 position |
| 38.1357 | 3.59535 | |
| 37.8384 | 13.9563 | MB$_3^+$ |
| 37.5888 | 28.4579 | |
| 37.2224 | 54.6811 | αB$_1$, 3B$_3$ |
| 35.5287 | 6.51708 | |
| 35.2419 | 3.55603 | |
| 34.6366 | 7.35366 | |
| 34.2437 | 22.3787 | |

-continued

13C NMR data
TCB, 120 C, 0.05M CrAcAc

| Freq ppm | Intensity | |
|---|---|---|
| 32.911 | 45.2064 | $MB_1$ |
| 32.5977 | 10.5375 | |
| 32.38 | 4.02878 | |
| 31.8809 | 14.1607 | $3B_6+$, 3EOC |
| 30.6916 | 8.44427 | $\gamma^+\gamma^+B$ |
| 30.0703 | 63.1613 | $\gamma^+\gamma^+B$ |
| 29.6987 | 248 | $\gamma^+\gamma^+B$ |
| 29.2633 | 17.9013 | $\gamma^+\gamma^+B$ |
| 28.8916 | 3.60422 | |
| 27.1182 | 66.2971 | $\beta\gamma^+B$, $(4B_5$, etc.) |
| 24.5324 | 16.8854 | |
| 22.5784 | 16.0395 | $2B_5+$, 2EOC |
| 20.1041 | 13.2742 | |
| 19.6952 | 54.3903 | $1B_1$, $2B_3$ |
| 14.2104 | 12.2831 | |
| 13.8281 | 16.8199 | $1B_4+$, EOC,$1B_3$ |

Integration of the $CH_2$ peaks due to the structure —CH(R)$CH_2$CH(R')—, where R is an alkyl group, and R' is an alkyl group with two or more carbons showed that in 69% of these structures, R=Me. The region integrated for the structure where both R and R' are ≧Ethyl was 39.7 ppm to 41.9 ppm to avoid including an interference from another type of methylene carbon on a side chain.

Example 140

[(2,6-i-PrPh)$_2$DABMe$_2$]PdMeCl (0.020 g, 0.036 mmol) was dissolved in 4 ml $CH_2Cl_2$ and methyl acrylate (0.162 g, 0.38 mmol, inhibited with 50 ppm phenothiazine) was added while stirring. This solution was added to a stirred suspension of NaBAF (0.033 g, 0.038 mmol) in 4 ml of $CH_2Cl_2$. After stirring for 1 hour, the mixture was filtered through a 0.5 μm PTFE membrane filter to remove a flocculant gray precipitate. The solvent was removed from the filtrate in vacuo to give a solid which was recrystallized from a $CH_2Cl_2$/pentane mixture at −40° C. to give 0.39 g (75% yield) of orange crystalline {[(2,6-i-PrPh)$_2$DABMe$_2$]PdCH$_2$CH$_2$CH$_2$C(O)OCH$_3$}BAF$^-$. $^1$H NMR (CDCl$_3$): 0.65 (m, CH$_2$, 2H); 1.15–1.45 (four sets of doublets for —CH(C$\underline{H}_3$)$_2$ and multiplet at 1.4 for a CH$_2$, total area=26H); 2.19,2.21 (s,s, CH$_3$ of ligand backbone, 6H); 2.40 (m, CH$_2$, 2H); 2.90 (m, —C$\underline{H}$(CH$_3$)$_2$, 4H); 3.05 (s, —CO$_2$CH$_3$, 3H); 7.25–7.75 (m, aromatic H of ligand and counterion, 19H).

All GPC data reported for examples 141–170, 177, and 204–212 were run in trichlorobenzene vs. polyethylene standards unless otherwise indicated. All DSC data reported for examples 141–170, 177, and 204–212 (second heat, −150° C. to 150°, 10 or 15° C./min)

Example 141

A Schlenk flask containing {[(2,6-i-PrPh)$_2$DABH$_2$]NiMe(Et$_2$O)}BAF$^-$ (1.3 mg, 8.3×10$^{-7}$ mol) under an argon atmosphere was cooled to −78° C. Upon cooling, the argon was evacuated and the flask backfilled with ethylene (1 atm). Toluene (75 mL) was added via syringe. The polymerization mixture was then warmed to 0° C. The solution was stirred for 30 minutes. Polymer began to precipitate from the solution within minutes. After 30 minutes, the polymerization was terminated upon exposing the catalyst to air. The polymer was precipitated from acetone, collected by filtration and washed with 6 M HCl, water, and acetone. The polymer was dried in vacuo. The polymerization yielded 1.53 g of polyethylene (1.3×10$^5$ TO). $M_n$=91,900; $M_w$=279,000; $M_w/M_n$=3.03; $T_m$=129° C. $^1$H NMR (C$_6$D$_5$Cl, 142° C.) 0.6 methyls per 100 carbons.

Example 142

The reaction was done in the same way as in Example 141 using 1.3 mg of {[(2,6-i-PrPh)$_2$DABMe$_2$]NiMe(Et$_2$O)}BAF$^-$ (8.3×10$^{-7}$ mol). The polymer was isolated as a white solid (0.1 g).

Examples 143–148

General procedure for the polymerization of ethylene by the methylaluminoxane (MAO) activation of nickel complexes containing bidentate diimine ligands: Polymerization at 0° C.: The bisimine nickel dihalide complex (1.7×10$^{-5}$ mol) was combined with toluene (100 mL) in a flame dried Schlenk flask under 1 atmosphere ethylene pressure. The polymerization was cooled to 0° C. in an ice-water bath. The mixture was stirred at 0° C. for 15 minutes prior to activation with MAO. Subsequently, 1.5 mL of a 10% MAO (100 eq) solution in toluene was added onto the nickel dihalide suspension. The solution was stirred at 0° C. for 10, 30, or 60 minutes. Within minutes increased viscosity and/or precipitation of polyethylene was observed. The polymerization was quenched and the polymer precipitated from acetone. The polymer was collected by suction filtration and dried under vacuum for 24 hours. See Table I for a detailed description of molecular weight and catalyst activity data.

| Example No. | Catalyst |
|---|---|
| 143 | [(2,6-i-PrPh)$_2$DABH$_2$]NiBr$_2$ |
| 144 | [(2,6-i-PrPh)$_2$DABMe$_2$]NiBr$_2$ |
| 145 | [(2,6-MePh)$_2$DABH$_2$]NiBr$_2$ |
| 146 | [(2,6-i-PrPh)$_2$DABAn]NiBr$_2$ |
| 147 | [(2,6-MePh)$_2$DABAn]NiBr$_2$ |
| 148 | [(2,6-MePh)$_2$DABMe$_2$]NiBr$_2$ |

| Exam. | Conditions[1] | Yield (g) | TO/ hr · mol catalyst | $M_n$ | $M_w$ | $M_w/M_n$ | Thermal Analysis (° C.) |
|---|---|---|---|---|---|---|---|
| 143 | 0° C., 30 m | 5.3 | 22,700 | 80,900 | 231,000 | 2.85 | 119 ($T_m$) |
| 144[2] | 0° C., 30 m | 3.8 | 16,300 | 403,000 | 795,000 | 1.97 | 115 ($T_m$) |
| 145[3] | 0° C., 30 m | 3.4 | 14,300 | 42,900 | 107,000 | 2.49 | 131 ($T_m$) |

-continued

| | | | | | | | |
|---|---|---|---|---|---|---|---|
| 146[2] | 0° C., 30 m | 7.0 | 29,900 | 168,000 | 389,000 | 2.31 | 107 ($T_m$) |
| 147 | 0° C., 10 m | 3.7 | 47,500 | 125,000 | 362,000 | 2.89 | 122 ($T_m$) |
| 148 | 0° C., 10 m | 5.1 | 65,400 | 171,000 | 440,000 | 2.58 | 115 ($T_m$) |

[1]Polymerization reactions run at 1 atmosphere ethylene pressure.
[2]Branching Analysis by $^{13}$C NMR per 1000 $CH_2$:
Ex. 144: Total methyls (54.3), Methyl (43.4), Ethyl (3.3), Propyl (2), Butyl (1.3), ≧Butyl and end of chains (5.7).
Ex. 146: Total methyls (90.9), Methyl (65.3), Ethyl (7.2), Propyl (4.5), Butyl (3.5), Amyl (4.5), ≧Hexyl and end of chains (10.2).
[3]Ex. 145: $^1$H NMR ($C_6D_5Cl$, 142° C.) 0.1 methyl per 100 carbon atoms.

Examples 149–154

Polymerization at Ambient Temperature

The general procedure described for the MAO activation of the diimine nickel dihalides was followed in the polymerizations detailed below, except all polymerizations were run between 25–30° C.

| Example No. | Catalyst |
|---|---|
| 149 | [(2,6-i-PrPh)$_2$DABH$_2$]NiBr$_2$ |
| 150 | [(2,6-i-PrPh)$_2$DABMe$_2$]NiBr$_2$ |
| 151 | [(2,6-MePh)$_2$DABH$_2$]NiBr$_2$ |
| 152 | [(2,6-i-PrPh)$_2$DABAn]NiBr$_2$ |
| 153 | [(2,6-MePh)$_2$DABAn]NiBr$_2$ |
| 154 | [(2,6-MePh)$_2$DABMe$_2$]NiBr$_2$ |

| Exam. | Conditions[1] | Yield (g) | TO/ hr · mol catalyst | $M_n$ | $M_w$ | $M_w/M_n$ | Thermal Analysis (° C.) |
|---|---|---|---|---|---|---|---|
| 149 | 30° C., 30 m | 2.5 | 12,200 | 15,500 | 34,900 | 2.25 | — |
| 150[2] | 25° C., 30 m | 3.4 | 14,500 | 173,000 | 248,000 | 1.44 | −51 ($T_g$) |
| 151[3] | 25° C., 30 m | 7.2 | 30,800 | 13,900 | 39,900 | 2.88 | 90,112 ($T_m$) |
| 152[2] | 25° C., 30 m | 4.2 | 18,000 | 82,300 | 175,000 | 2.80 | 39 ($T_m$) |
| 153 | 25° C., 10 m | 4.9 | 62,900 | 14,000 | 25,800 | 1.85 | — |
| 154 | 25° C., 10 m | 3.7 | 47,500 | 20,000 | 36,000 | 1.83 | — |

[1]Polymerization reactions run at 1 atmosphere ethylene pressure.
[2]Branching Analysis by $^{13}$C NMR per 1000 $CH_2$:
Ex. 150: Total methyls (116.3), Methyl (93.5), Ethyl (6.2), Propyl (3.2), Butyl (2.9), Am (6.6), ≧Hex and end of chains (11.2).
Ex. 152: Total methyls (141.9), Methyl (98.1), Ethyl (15.9), Propyl (5.6), Butyl (6.8), Amyl (4.1), ≧Hex and end of chains (10.7). Quantitation of the —CH$_2$CH(CH$_3$)CH$_2$CH$_3$ structure per 1000 CH$_2$'s: 8.
[3]Ex. 151: $^1$H NMR ($C_6D_5Cl$), 142° C.) 3 methyl per 100 carbon atoms.

Example 155

A standard solution of [(2,6-i-PrPh)$_2$DABAn]NiBr$_2$ was prepared as follows: 1,2-difluorobenzene (10 mL) was added to 6.0 mg of [(2,6-i-PrPh)$_2$DABAn]NiBr$_2$ (8.4×10$^{-6}$ mol) in a 10 mL volumetric flask. The standard solution was transferred to a Kontes flask and stored under an argon atmosphere.

The standard catalyst solution (1.0 mL, 8.4×10$^{-7}$ mol catalyst) was added to a Schlenk flask which contained 100 mL toluene, and was under 1 atmosphere ethylene pressure. The solution was cooled to 0° C., and 1.5 mL of a 10% solution of MAO (≧1000 eq) was added. The solution was stirred for 30 minutes. Polymer began to precipitate within minutes. The polymerization was quenched and the polymer precipitated from acetone. The resulting polymer was dried in vacuo (2.15 g, 1.84×10$^5$ TO). $M_n$=489,000; $M_w$=1,200,000; $M_w/M_n$=2.47.

Example 156

The polymerization of ethylene at 25° C. was accomplished in an identical manner to that described in Example 155. The polymerization yielded 1.8 g of polyethylene (1.53×10$^5$ TO). $M_n$=190,000; $M_w$=410,000; $M_w/M_n$=2.16; $^1$H NMR ($C_6D_5Cl$, 142° C.) 7 methyls per 100 carbons.

Example 157

A standard solution of [(2,6-MePh)$_2$DABAn]NiBr$_2$ was prepared in the same way as described for the complex in Example 155 using 5.0 mg of [(2,6-MePh)$_2$DABAn]NiBr$_2$ (8.4×10$^{-6}$ mol).

Toluene (100 mL) and 1.0 mL of the standard solution of complex 5 (8.3×10$^{-7}$ mol catalyst) were combined in a Schlenk flask under 1 atmosphere ethylene pressure. The solution was cooled to 0° C., and 1.5 mL of a 10% solution of MAO (≧1000 eq) was added. The polymerization mixture was stirred for 30 minutes. The polymerization was terminated and the polymer precipitated from acetone. The reaction yielded 1.60 g of polyethylene (1.4×10$^5$ TO). $M_n$=590,000; $M_w$=1,350,000; $M_w/M_n$=2.29.

Example 158

Toluene (200 mL) and 1.0 mL of a standard solution of [(2,6-i-PrPh)$_2$DABAn]NiBr$_2$ (8.3×10$^{-7}$ mol catalyst) were combined in a Fisher-Porter pressure vessel. The resulting solution was cooled to 0° C., and 1.0 mL of a 10% MAO ($\geq$1000 eq) solution in toluene was added to activate the polymerization. Subsequent to the MAO addition, the reactor was rapidly pressurized to 276 kPa. The solution was stirred for 30 minutes at 0° C. After 30 minutes, the reaction was quenched and polymer precipitated from acetone. The resulting polymer was dried under reduced pressure. The polymerization yielded 2.13 g of white polyethylene (1.82× $10^5$ TO). $M_n$=611,000; $M_w$=1,400,000; $M_w/M_n$=2.29; $T_m$=123° C.; $^1$H NMR ($C_6D_5Cl$, 142° C.) 0.5 methyls per 100 carbons.

Examples 159–160

Polymerization of Propylene

The diimine nickel dihalide complex (1.7×$10^{-5}$ mol) was combined with toluene (100 mL) in a Schlenk flask under 1 atmosphere propylene pressure. The polymerization was cooled to 0° C., and 1.5 mL of a 10% MAO (100 eq) solution in toluene was added. The solution was stirred for 2 hours. The polymerization was quenched and the polymer precipitated from acetone. The polymer was dried under vacuum.

| | $^{13}$C NMR Data | |
| | TCB, 140 C, 0.05M CrAcAc | |
| Freq ppm | Intensity | |
|---|---|---|
| 27.1235 | 29.7384 | |
| 24.5324 | 9.45408 | |
| 21.1554 | 20.0541 | |
| 20.6244 | 110.077 | |
| 19.9926 | 135.356 | |
| 16.9342 | 8.67216 | |
| 16.4829 | 8.81404 | |
| 14.9962 | 8.38097 | |

Example 161

[(2,6-i-PrPh)$_2$DABH$_2$]NiBr$_2$ (10 mg, 1.7×$10^{-5}$ mol) was combined with toluene (40 mL) under a N$_2$ atmosphere. A 10% solution of MAO (1.5 mL, 100 eq) was added to the solution. After 30 minutes, the Schlenk flask was backfilled with propylene. The reaction was stirred at room temperature for 5.5 hours. The polymerization was quenched, and

| Example No. | Catalyst |
|---|---|
| 159 | [(2,6-i-PrPh)$_2$DABH$_2$]NiBr$_2$ |
| 160 | [(2,6-i-PrPh)$_2$DABAn]NiBr$_2$ |

| Exam. | Conditions[1] | Yield (g) | TO/ hr · mol catalyst | $M_n$ | $M_w$ | $M_w/M_n$ | Thermal Analysis (° C.) |
|---|---|---|---|---|---|---|---|
| 159 | 0° C., 2 h | 1.3 | 900 | 131,000[a] | 226,000 | 1.72 | −20 ($T_g$) |
| 160 | 0° C., 2 h | 4.3 | 2,900 | 147,000 | 235,000 | 1.60 | −78, −20 ($T_g$) |

[a]GPC (toluene, polystyrene standard)
Ex. 159: $^1$H NMR ($C_6D_5Cl$), 142° C.) 30 methyls per 100 carbon atoms.
Ex. 160: $^1$H NMR ($C_6D_5Cl$), 142° C.) 29 methyls per 100 carbon atoms. Quantitative $^{13}$C NMR analysis, branching per 1000 CH$_2$: Total methyls (699). Based on the total methyls, the fraction of 1,3-enchainment is 13%. Analysis of backbone carbons (per 1000 CH$_2$): δ$^+$ (53), δ$^+$/γ (0.98).

Listed below are the $^{13}$C NMR data upon which the above analysis is based.

| $^{13}$C NMR Data | | |
|---|---|---|
| TCB, 140 C, 0.05M CrAcAc | | |
| Freq ppm | Intensity | |
| 47.3161 | 53.1767 | |
| 46.9816 | 89.3849 | |
| 46.4188 | 82.4488 | |
| 45.84 | 23.1784 | |
| 38.4702 | 12.8395 | |
| 38.0985 | 29.2643 | |
| 37.472 | 18.6544 | |
| 37.2915 | 24.8559 | |
| 35.3747 | 15.6971 | |
| 34.5623 | 14.6353 | |
| 33.3145 | 14.2876 | |
| 32.996 | 12.2454 | |
| 30.9464 | 24.2132 | |
| 30.6703 | 57.4826 | |
| 30.081 | 30.122 | γ to single branch |
| 29.6987 | 29.2186 | δ$^+$ to branch |
| 28.3659 | 298.691 | |
| 27.4792 | 33.2539 | | the resulting polymer dried under vacuum (670 mg, 213 TO/h). $M_n$=176,000; $M_w$=299,000; $M_w/M_n$=1.70. Quantitative $^{13}$C NMR analysis, branching per 1000 CH$_2$: Total methyls (626), Methyl (501), Ethyl (1), ≧Butyl and end of chain (7). Based on the total methyls, the fraction of 1,3-enchainment is 22%. Analysis of backbone carbons (per 1000 CH$_2$): δ$^+$ (31), δ$^+$/γ (0.76).

Examples 162–165

The diimine nickel dihalide catalyst precursor (1.7×$10^{-5}$ mol) was combined with toluene (40 mL) and 1-hexene (10 mL) under a N$_2$ atmosphere. Polymerization reactions of 1-hexene were run at both 0° C. and room temperature. A 10% solution of MAO (1.5 mL, 100 eq) in toluene was added. Typically the polymerization reactions were stirred for 1–2 hours. The polymer was precipitated from acetone and collected by suction filtration. The resulting polymer was dried under vacuum.

| Example No. | Catalyst |
|---|---|
| 162 | [(2,6-i-PrPh)$_2$DABH$_2$]NiBr$_2$ |
| 163 | [(2,6-i-PrPh)$_2$DABAn]NiBr$_2$ |
| 164 | [(2,6-i-PrPh)$_2$DABH$_2$]NiBr$_2$ |
| 165 | [(2,6-i-PrPh)$_2$DABAn]NiBr$_2$ |

| Exam. | Conditions[1] | Yield (g) | TO/ hr · mol catalyst | $M_n$ | $M_w$ | $M_w/M_n$ | Thermal Analysis (° C.) |
|---|---|---|---|---|---|---|---|
| 162 | 25° C., 1 h | 3.0 | 2100 | 173,000 | 318,000 | 1.84 | −48 ($T_g$) |
| 163 | 25° C., 1 h | 1.2 | 860 | 314,000 | 642,000 | 2.05 | −54 ($T_g$) −19 ($T_m$) |
| 164 | 0° C., 2 h | 3.0 | 1100 | 70,800 | 128,000 | 1.80 | −45 ($T_g$) |
| 165 | 0° C., 2 h | 1.5 | 540 | 91,700 | 142,000 | 1.55 | −49 ($T_g$) |

[a]GPC (toluene, polystyrene standards).

Branching Analysis Ex. 162: by $^{13}$C NMR per 1000 CH$_2$: Total methyls (157.2), Methyl (47), Ethyl (1.9), Propyl (4.5), Butyl (101.7), ≧Am and end of chain (4.3).

$^{13}$C NMR data (Example 162)
TCB, 120 C, 0.05M CrAcAc

| Freq ppm | Intensity | |
|---|---|---|
| 42.8364 | 7.99519 | Methine |
| 41.3129 | 27.5914 | αα to two Eth$^+$ branches |
| 40.5759 | 19.6201 | αα to two Eth$^+$ branches |
| 37.8831 | 14.7864 | Methines and Methylenes |
| 37.2984 | 93.6984 | Methines and Methylenes |
| 36.6684 | 6.99225 | Methines and Methylenes |
| 35.5773 | 36.067 | Methines and Methylenes |
| 34.655 | 55.825 | Methines and Methylenes |
| 34.3091 | 63.3862 | Methines and Methylenes |
| 33.8356 | 24.1992 | Methines and Methylenes |
| 33.428 | 53.7439 | Methines and Methylenes |
| 32.9957 | 51.1648 | Methines and Methylenes |
| 31.9169 | 17.4373 | Methines and Methylenes |
| 31.5546 | 14.008 | Methines and Methylenes |
| 31.1552 | 10.6667 | Methines and Methylenes |
| 30.5993 | 34.6931 | Methines and Methylenes |
| 30.274 | 56.8489 | Methines and Methylenes |
| 30.1258 | 42.1332 | Methines and Methylenes |
| 29.747 | 97.9715 | Methines and Methylenes |
| 29.1047 | 47.1924 | Methines and Methylenes |
| 28.8823 | 64.5807 | Methines and Methylenes |
| 28.1289 | 13.6645 | Methines and Methylenes |
| 27.5648 | 61.3977 | Methines and Methylenes |
| 27.1777 | 50.9087 | Methines and Methylenes |
| 27.0213 | 31.6159 | Methines and Methylenes |
| 26.9142 | 31.9306 | Methines and Methylenes |
| 26.4572 | 4.715666 | Methines and Methylenes |
| 23.2085 | 154.844 | 2B$_4$ |
| 22.6074 | 12.0719 | 2B$_5$+, EOC |
| 20.0669 | 8.41495 | 1B$_1$ |
| 19.6963 | 57.6935 | 1B$_1$ |
| 15.9494 | 17.7108 | |
| 14.3477 | 8.98123 | |
| 13.8742 | 248 | 1B$_4$+, EOC |

Example 166

[(2,6-i-PrPh)$_2$DABMe$_2$]NiBr$_2$ (10.4 mg, 1.7×10$^{-5}$ mol) was combined with toluene (15 mL) and 1-hexene (40 mL) under 1 atmosphere ethylene pressure. The solution was cooled to 0° C., and 1.5 mL of a 10% MAO (100 eq) solution in toluene was added. The reaction was stirred at 0° C. for 2.5 hours. The polymerization was quenched and the polymer precipitated from acetone. The resulting polymer was dried under reduced pressure (1.4 g). Mn=299,000; Mw=632,000; Mw/Mn=2.12.

Branching Analysis by $^{13}$C NMR per 1000 CH$_2$: Total methyls (101.3), Methyl (36.3), Ethyl (1.3), Propyl (6.8), Butyl (47.7), ≧Amyl and end of chains (11.5).

Example 167

[(2,6-i-PrPh)$_2$DABH$_2$]NiBr$_2$ (10 mg, 1.7×10$^{-5}$ mol) was added to a solution which contained toluene (30 mL) and 1-octene (20 mL) under 1 atm ethylene. A 10% solution of MAO (1.5 mL, 100 eq) in toluene was added. The resulting purple solution was allowed to stir for 4 hours at room temperature. Solution viscosity increased over the duration of the polymerization. The polymer was precipitated from acetone and dried under vacuum resulting in 5.3 g of copolymer. $M_n$=15,200, $M_w$=29,100, $M_n/M_w$=1.92.

Example 168

[(2,6-i-PrPh)$_2$DABAn]NiBr$_2$ (12 mg, 1.7×10$^{-5}$ mol) was combined with toluene (75 mL) in a Schlenk flask under 1 atmosphere ethylene pressure. The mixture was cooled to 0° C., and 0.09 mL of a 1.8 M solution in toluene of Et$_2$AlCl (10 eq) was added. The resulting purple solution was stirred for 30 minutes at 0° C. The polymerization was quenched and the polymer precipitated from acetone. The resulting polymer was dried under reduced pressure (6.6 g, 2.8×10$^4$ TO). $M_n$=105,000; $M_w$=232,000; $M_w/M_n$=2.21.

Example 169

[(2,6-i-PrPh)$_2$DABAn]NiBr$_2$ (12 mg, 1.7×10$^{-5}$ mol) was combined with toluene (75 mL) under 1 atmosphere propylene pressure. The solution was cooled to 0° C. and 0.1 mL of Et$_2$AlCl (≧10 eq) was added. The reaction was stirred at 0° C. for 2 hours. The polymerization was quenched and the polymer precipitated from acetone. The resulting polymer was dried under reduced pressure (3.97 g, 2800 TO)

Example 170

[(2,6-i-PrPh)$_2$DABAn]NiBr$_2$ (12 mg, 1.7×10$^{-5}$ mol) was combined with toluene (50 mL) and 1-hexene (25 mL) under a N$_2$ atmosphere. Et$_2$AlCl (0.01 mL, 10 eq) was added to the polymerization mixture. The resulting purple solution was allowed to stir for 4 hours. After 4 hours the polymerization was quenched and the polymer precipitated from acetone. The polymerization yielded 1.95 g poly(1-hexene) (348 TO/h). $M_n$=373,000; $M_w$=680,000; $M_w/M_n$=1.81.

Example 171

1-Tetradecene (20 ml) was polymerized in methylene chloride (10 ml) for 20 hr using catalyst {[(2,6-i-PrPh)$_2$ DABMe$_2$]PdCH$_2$CH$_2$CH$_2$C(O)OCH$_3$}SbF$_6^-$ (0.04 g, 0.05 mmol). The solvent and reacted monomer were removed in vacuo. The polymer was precipitated to remove unreacted monomer, by the addition of acetone to a chloroform solution. The precipitated polymer was dried in vacuo to give a 10.2 g yield. $^{13}$C NMR (trichlorobenzene, 120° C.) integrated to give the following branching analysis per 1000 methylene carbons: Total methyls (69.9), methyl (24.5), ethyl (11.4), propyl (3.7), butyl (2.3) amyl (0.3), ≧Hexyl and end of chain (24.2). Thermal analysis showed Tg=−42.7° C., and Tm=33.7° C. (15.2 J/g).

Listed below are the $^{13}$C NMR data upon which the above analysis is based.

$^{13}$C NMR Data
TCB, 120 C, 0.05M CrAcAc

| Freq ppm | Intensity | |
|---|---|---|
| 39.3416 | 7.78511 | MB$_2$ |
| 38.2329 | 5.03571 | MB$_3$+ |
| 37.8616 | 9.01667 | MB$_3$+ |
| 37.5857 | 3.33517 | MB$_3$+ |
| 37.2462 | 31.8174 | αB$_1$, 3B$_3$ |
| 36.6415 | 2.92585 | αB$_1$, 3B$_3$ |
| 34.668 | 5.10337 | αγ+B |
| 34.2384 | 38.7927 | αγ+B |
| 33.7397 | 16.9614 | 3B$_5$ |
| 33.3471 | 3.23743 | 3B$_6$+, 3EOC |
| 32.9387 | 16.0951 | γ$^+$γ$^+$B, 3B$_4$ |
| 31.9148 | 27.6457 | γ$^+$γ$^+$B, 3B$_4$ |
| 31.1297 | 6.03301 | γ$^+$γ$^+$B, 3B$_4$ |
| 30.212 | 59.4286 | γ$^+$γ$^+$B, 3B$_4$ |
| 29.7398 | 317.201 | γ$^+$γ$^+$B, 3B$_4$ |
| 29.3101 | 32.1392 | γγ$^+$γ$^+$B, 3B$_4$ |
| 27.1511 | 46.0554 | βγ$^+$B, 2B$_2$ |
| 27.0185 | 53.103 | βγ$^+$B, 2B$_2$ |
| 26.419 | 9.8189 | βγ$^+$B, 2B$_2$ |
| 24.244 | 2.46963 | ββB |
| 22.6207 | 28.924 | 2B$_5$+, 2EOC |
| 20.0479 | 3.22712 | 2B$_3$ |
| 19.7084 | 18.5679 | 1B$_1$ |
| 14.3929 | 3.44368 | 1B$_3$ |
| 13.8677 | 30.6056 | 1B$_4$+, 1EOC |
| 10.9448 | 9.43801 | 1B$_2$ |

Example 172

4-Methyl-1-pentene (20 ml) was polymerized in methylene chloride (10 ml) for 19 hr using catalyst {[(2,6-i-PrPh)$_2$DABMe$_2$]PdCH$_2$CH$_2$CH$_2$C(O)OCH$_3$}SbF$_6^-$ (0.04 g, 0.05 mmol). The solvent and unreacted monomer were removed in vacuo. The polymer was precipitated to remove residual monomer by addition of excess acetone to a chloroform solution. The precipitated polymer was dried in vacuo to give a 5.7 g yield. $^{13}$C NMR (trichlorobenzene, 120° C.) integrated to give 518 methyls per 1000 methylene carbon atoms. Thermal analysis showed Tg −30.3° C.

Listed below are the $^{13}$C NMR data upon which the above analysis is based.

$^{13}$C NMR Data
TCB, 120 C, 0.05 M CrAcAc

| Freq ppm | Intensity |
|---|---|
| 47.8896 | 13.3323 |
| 47.4011 | 8.54293 |

-continued $^{13}$C NMR Data
TCB, 120 C, 0.05 M CrAcAc

| Freq ppm | Intensity |
|---|---|
| 45.7127 | 26.142 |
| 45.1392 | 17.4909 |
| 43.9658 | 13.9892 |
| 43.1375 | 12.7089 |
| 42.6171 | 11.5396 |
| 41.8207 | 9.00437 |
| 39.203 | 64.937 |
| 37.9712 | 24.4318 |
| 37.3075 | 87.438 |
| 35.4862 | 16.3581 |
| 34.9553 | 24.5286 |
| 34.35 | 31.8827 |
| 33.3624 | 25.7696 |
| 33.0226 | 42.2982 |
| 31.4403 | 25.3221 |
| 30.6226 | 38.7083 |
| 28.504 | 26.8149 |
| 27.989 | 81.8147 |
| 27.7341 | 78.3801 |
| 27.5802 | 94.6195 |
| 27.458 | 75.8356 |
| 27.0864 | 35.5524 |
| 25.6103 | 97.0113 |
| 23.4333 | 59.6829 |
| 23.0563 | 41.5712 |
| 22.536 | 154.144 |
| 21.9944 | 5.33517 |
| 20.7307 | 16.294 |
| 20.4971 | 34.7892 |
| 20.2953 | 29.9359 |
| 19.7378 | 62.0082 |

Example 173

1-Eicosene (19.0 g) was polymerized in methylene chloride (15 ml) for 24 hr using catalyst {[(2,6-i-PrPh)$_2$DABMe$_2$]PdCH$_2$CH$_2$CH$_2$C(O)OCH$_3$}SbF$_6^-$ (0.047 g, 0.05 mmol). The solvent and unreacted monomer were removed in vacuo. The polymer was precipitated to remove residual monomer by addition of excess acetone to a chloroform solution of the polymer. The solution was filtered to collect the polymer. The precipitated polymer was dried in vacuo to give a 5.0 g yield. $^{13}$C NMR quantitative analysis, branching per 1000 CH2: Total methyls (27), Methyl (14.3), Ethyl (0), Propyl (0.2), Butyl (0.6), Amyl (0.4), ≧Hexyl and end of chains (12.4).

Integration of the CH$_2$ peaks due to the structure —CH(R)CH$_2$CH(R')—, where R is an alkyl group, and R' is an alkyl group with two or more carbons showed that in 82% of these structures, R=Me.

Listed below are the $^{13}$C NMR data upon which the above analysis is based.

$^{13}$C NMR data
TCB, 120 C, 0.05 M CrAcAc

| Freq ppm | Intensity | |
|---|---|---|
| 37.7853 | 13.978 | MB$_2^+$ |
| 37.1428 | 52.1332 | αB |
| 34.1588 | 41.067 | αB$_4^+$ |
| 32.826 | 26.6707 | MB$_1$ |
| 31.8066 | 24.9262 | 3B$_6^+$, 3EOC |
| 30.0703 | 96.4154 | γ$^+$γ$^+$B, 3B$_4$ |

-continued

| | $^{13}$C NMR data<br>TCB, 120 C, 0.05 M CrAcAc | |
|---|---|---|
| Freq ppm | Intensity | |
| 29.6243 | 1239.8 | $\gamma^+\gamma^+$B, 3B$_4$ |
| 27.0013 | 78.7094 | B$\gamma^+$B, (4B$_5$, etc.) |
| 22.5041 | 23.2209 | 2B$_5^+$, 2EOC |
| 19.605 | 30.1221 | 1B$_1$ |
| 13.759 | 23.5115 | 1B$_4^+$, EOC |

Example 174

The complex [(2,6-i-PrPh)$_2$DABH$_2$]PdMeCl (0.010 g, 0.019 mmol) and norbornene (0.882 g, 9.37 mmol) were weighed into a vial and dissolved in 2 ml CH$_2$Cl$_2$. NaBAF (0.032 g, 0.036 mmol) was rinsed into the stirring mixture with 2 ml of CH$_2$Cl$_2$ After stirring about 5 minutes, there was sudden formation of a solid precipitate. Four ml of o-dichlorobenzene was added and the solution became homogenous and slightly viscous. After stirring for 3 days, the homogeneous orange solution was moderately viscous. The polymer was precipitated by addition of the solution to excess MeOH, isolated by filtration, and dried in vacuo to give 0.285 g (160 equivalents norbornene per Pd) bright orange glassy solid. DSC (two heats, 15° C./min) showed no thermal events from −50 to 300° C. This is consistent with addition type poly(norbornene). Ring-opening polymerization of norbornene is known to produce an amorphous polymer with a glass transition temperature of about 30–55° C.

Example 175

The solid complex {[(2,6-i-PrPh)$_2$DABH$_2$]PdMe(Et$_2$O)} SbF$_6^-$ (0.080 g, 0.10 mmol) was added as a solid to a stirring solution of norbornene (1.865 g) in 20 ml of o-dichlorobenzene in the drybox. About 30 min after the start of the reaction, there was slight viscosity (foam on shaking) and the homogeneous mixture was dark orange/red. After stirring for 20 h, the solvent and unreacted norbornene were removed in vacuo to give 0.508 g orange-red glassy solid (54 equivalents norbornene/Pd). $^1$H NMR (CDCl$_3$): broad featureless peaks from 0.8–2.4 ppm, no peaks in the olefinic region. This spectrum is consistent with addition type poly(norbornene). GPC (trichlorobenzene, 135° C., polystyrene reference, results calculated as linear polyethylene using universal calibration theory): Mn=566 Mw=1640 Mw/Mn=2.90.

Example 176

4-Methyl-1-pentene (10 ml) and ethylene (1 atm) were copolymerized in 30 ml of chloroform according to example 125 using catalyst {[(2,6-i-PrPh)$_2$DABMe$_2$]PdCH$_2$CH$_2$CH$_2$C(O)OCH$_3$}SbF$_6^-$ (0.084 g, 0.10 mmol) to give 23.29 g highly viscous yellow oil. The $^1$H NMR spectrum was similar to the poly(ethylene) of example 110 with 117 methyl carbons per 1000 methylene carbons. $^{13}$C NMR quantitative analysis, branching per 1000 CH$_2$: Total methyls (117.1), Methyl (41.5), Ethyl (22.7), Propyl (3.3), Butyl (13), Amyl (1.2), ≧Hexyl and end of chains (33.1), ≧Amyl and end of chains (42.3), By $^{13}$C NMR this sample contains two identifiable branches at low levels attributable to 4-methyl-1-pentene. The Bu and ≧Amyl peaks contain small contributions from isopropyl ended branch structures.

Example 177

CoCl$_2$ (500 mg, 3.85 mmol) and (2,6-i-Ph)$_2$DABAn (2.0 g, 4.0 mmol) were combined as solids and dissolved in 50 mL of THF. The brown solution was stirred for 4 hours at 25° C. The solvent was removed under reduced pressure resulting in a brown solid (1.97 g, 82% yield).

A portion of the brown solid (12 mg) was immediately transferred to another Schlenk flask and dissolved in 50 mL of toluene under 1 atmosphere of ethylene. The solution was cooled to 0° C., and 1.5 mL of a 10% MAO solution in toluene was added. The resulting purple solution was warmed to 25° C. and stirred for 12 hours. The polymerization was quenched and the polymer precipitated from acetone. The white polymer (200 mg) was collected by filtration and dried under reduced pressure. M$_n$=225,000, M$_w$=519,000, M$_w$/M$_n$=2.31, T$_g$=−42°, T$_m$=52° C. and 99.7° C.

Example 178

Ethyl 10-undecenoate (10 ml) and ethylene (1 atm) were copolymerized in 30 ml of CH$_2$Cl$_2$ according to example 125 using catalyst {[(2,6-i-PrPh)$_2$DABMe$_2$]PdCH$_2$CH$_2$CH$_2$C(O)OCH$_3$}SbF$_6^-$ (0.084 g, 0.10 mmol). The copolymer was precipitated by removing most of the CH$_2$Cl$_2$ in vacuo, followed by addition of excess acetone. The solution was decanted and the copolymer was dried in vacuo to give 1.35 g viscous fluid. $^1$H NMR (CDCl$_3$): 0.75–0.95 (m, CH$_3$); 0.95–1.5 (m, —C(O)OCH$_2$C$\underline{H}$$_3$, CH$_2$, CH); 1.5–1.7 (m, —C$\underline{H}$$_2$CH$_2$C(O)OCH$_2$CH$_3$); 1.9–2.0 (m, —C$\underline{H}$$_2$CH=CH—); 2.3 (t, —CH$_2$C$\underline{H}$$_2$C(O)OCH$_2$CH$_3$); 4.15 (q, —CH$_2$CH$_2$C(O)OC$\underline{H}$$_2$CH$_3$); 5.40 (m, —CH=CH—). The olefinic and allylic peaks are due to isomerized ethyl 10-undecenoate which has coprecipitated with the copolymer. Adjusting for this, the actual weight of copolymer in this sample is 1.18 g. The copolymer was reprecipitated by addition of excess acetone to a chloroform solution. $^1$H NMR of the reprecipitated polymer is similar except there are no peaks due to isomerized ethyl 10-undecenoate at 1.9–2.0 and 5.40 ppm. Based on integration, the reprecipitated copolymer contains 7.4 mole % ethyl 10-undecenoate, and 83 methyl carbons per 1000 methylene carbons. $^{13}$C NMR quantitative analysis, branching per 1000 CH$^2$: Total methyls (84.5), Methyl (31.7), Ethyl(16.9), Propyl (1.5), Butyl (7.8), Amyl (4.4), ≧Hexyl and end of chains (22.3). GPC (THF, PMMA standard): Mn=20,300 Mw=26,300 Mw/Mn=1.30. $^{13}$C NMR quantitative analysis, branching per 1000 CH2: ethyl ester (37.8), Ester branches —CH(CH$_2$)nCO$_2$CH$_2$CH$_3$ as a % of total ester: n≧5 (65.8), n=4 (6.5), n=1,2,3 (26.5), n=0 (1.2).

Listed below are the $^{13}$C NMR data upon which the above analysis is based.

| $^{13}$C NMR Data | |
|---|---|
| Freq ppm | Intensity |
| 59.5337 | 53.217 |
| 39.7234 | 2.57361 |
| 39.3145 | 7.80953 |
| 38.2207 | 11.9395 |
| 37.8437 | 20.3066 |
| 37.2225 | 29.7808 |
| 36.7181 | 5.22075 |
| 34.6792 | 17.6322 |
| 34.265 | 107.55 |
| 33.7181 | 21.9369 |
| 33.3093 | 8.22574 |
| 32.9164 | 15.0995 |
| 32.396 | 8.52655 |

-continued

13C NMR Data

| Freq ppm | Intensity |
|---|---|
| 32.0828 | 5.79098 |
| 31.9075 | 37.468 |
| 31.127 | 13.8003 |
| 30.6757 | 8.38026 |
| 30.2084 | 52.5908 |
| 29.9961 | 27.3761 |
| 29.72 | 151.164 |
| 29.5076 | 39.2815 |
| 29.2899 | 69.7714 |
| 28.727 | 6.50082 |
| 27.5164 | 20.4174 |
| 26.9908 | 64.4298 |
| 26.5713 | 9.18236 |
| 26.3749 | 11.8136 |
| 25.5519 | 4.52152 |
| 25.0528 | 43.7554 |
| 24.2457 | 7.9589 |
| 23.1094 | 10.0537 |
| 22.9926 | 4.71618 |
| 22.6156 | 37.2966 |
| 20.0245 | 2.4263 |
| 19.6847 | 25.9312 |
| 19.1643 | 5.33693 |
| 17.5183 | 2.20778 |
| 14.2954 | 66.1759 |
| 13.8653 | 43.8215 |
| 13.414 | 2.52882 |
| 11.1521 | 5.9183 |
| 10.9237 | 14.9294 |
| 174.945 | 3.27848 |
| 172.184 | 125.486 |
| 171.695 | 4.57235 |

Example 179

The solid complex $\{[(2,6\text{-}i\text{-}PrPh)_2DABH_2]PdMe(Et_2O)\}SbF_6^-$ (0.080 g, 0.10 mmol) was added as a solid to a stirring solution of cyclopentene (1.35 g, 20 mmol) in 20 ml of dichlorobenzene in the drybox. After stirring 20 h, the slightly viscous solution was worked up by removing the solvent in vacuo to give 1.05 g sticky solid (156 equivalents of cyclopentene per Pd). $^1$H NMR (CDCl$_3$): complex spectrum from 0.6–2.6 ppm with maxima at 0.75, 1.05, 1.20, 1.55, 1.65, 1.85, 2.10, 2.25, and 2.50. There is also a multiplet for internal olefin at 5.25–5.35. This is consistent with a trisubstituted cyclopentenyl end group with a single proton (W. M. Kelly et. al., Macromolecules 1994, 27, 4477–4485.) Integration assuming one olefinic proton per polymer chain gives DP=8.0 and Mn=540. IR (Thin film between NaCl plates, cm$^{-1}$): 3048 (vw, olefinic end group, CH stretch), 1646 (vw, olefinic end group, R$_2$C=CHR trisubstituted double bond stretch), 1464 (vs), 1447 (vs), 1364 (m), 1332 (m), 1257 (w), 1035 (w), 946 (m), 895 (w), 882 (w), 803 (m, cyclopentenyl end group, R$_2$C=CHR trisubstituted double bond, CH bend), 721 (vw, cyclopentenyl end group, RHC=CHR disubstituted double bond, CH bend). GPC (trichlorobenzene, 135° C., polystyrene reference, results calculated as linear polyethylene using universal calibration theory): $M_n$=138 $M_w$=246 $M_w/M_n$=1.79.

Example 180

The solid complex $\{[(2,6\text{-}i\text{-}PrPh)_2DABMe_2]PdCH_2CH_2CH_2C(O)OCH_3\}SbF_6^-$ (0.084 g, 0.10 mmol) was added to a stirring solution of 10.0 ml cyclopentene in 10 ml CHCl$_3$ in the drybox. After stirring for 20 h, the mixture appeared to be separated into two phases. The solvent and unreacted monomer were removed in vacuo leaving 2.20 g off-white solid (323 equivalents cyclopentene per Pd). DSC (25 to 300° C., 15° C./min, first heat): Tg=107° C., Tm (onset)=165° C., Tm (end)=260° C., Heat of fusion=29 J/g.

Similar results were obtained on the second heat. GPC (trichlorobenzene, 135° C., polystyrene reference, results calculated as linear polyethylene using universal calibration theory): $M_n$=28,700 $M_w$=33,300 $M_w/M_n$=1.16.

Listed below are the $^{13}$C NMR analysis for this polymer.

13C NMR Data
TCB, 120 C, 0.05M CrAcAc

| Freq ppm | Intensity |
|---|---|
| 46.4873 | 142.424 |
| 38.339 | 59.7617 |
| 30.5886 | 137.551 |

Example 181

The solid complex $\{[(2,6\text{-}i\text{-}PrPh)_2DABMe_2]PdCH_2CH_2CH_2C(O)OCH_3\}SbF_6^-$ (0.084 g, 0.10 mmol) was added to a stirring solution of 10.0 ml cyclopentene in 10 ml CHCl$_3$ in a Schlenk flask. The flask was evacuated briefly and refilled with ethylene. It was maintained under slightly above 1 atm ethylene pressure using a mercury bubbler. After 20 h, the solvent and unreacted monomers were removed in vacuo from the homogeneous solution to give 12.89 g of highly viscous fluid. $^1$H-NMR (CDCl$_3$): cyclopentene peaks: 0.65 (m, 1H); 1.15(broad s, 2H); 1.5–2.0 (m, 5H); ethylene peaks: 0.75–0.95 (m, CH$_3$); 0.95–1.5 (m, CH and CH$_2$). Integration shows 24 mole % cyclopentene in this copolymer. Analysis of the polyethylene part of the spectrum (omitting peaks due to cyclopentyl units) shows 75 total methyl carbons per 1000 methylene carbons. Based on quantitative $^{13}$C analysis, the distribution of branches per 1000 methylene carbons is Methyl (21), Ethyl (13), Propyl (~0), Butyl (20) and ≧Amyl (20). DSC (first heat: 25 to 150° C., 10° C./min; first cool: 150 to −150° C., 10° C./min; second heat: −150 to 150° C., 10° C./min,; values of second heat reported): Tg=−33° C., Tm=19° C. (11 J/g). GPC (trichlorobenzene, 135° C., polystyrene reference, results calculated as linear polyethylene using universal calibration theory): $M_n$=3,960 $M_w$=10,800 $M_w/M_n$=2.73.

Listed below are the $^{13}$C NMR data upon which the above analysis is based.

13C NMR Data
TCB, 120 C, 0.05 M CrAcAc

| Freq ppm | Intensity | |
|---|---|---|
| 48.344 | 1.85262 | |
| 46.5562 | 22.8938 | 1 cme and/or 1,3 ccmcc |
| 44.9064 | 10.8003 | 1,3 cme |
| 42.0842 | 16.824 | |
| 40.7845 | 117.364 | 2 eme |
| 40.5777 | 113.702 | 1,3 eme |
| 40.3336 | 136.742 | 1,3 eme |
| 39.5591 | 15.0962 | methylene from 2 cmc or/and 2 cme |

-continued

$^{13}$C NMR Data
TCB, 120 C, 0.05 M CrAcAc

| Freq ppm | Intensity | |
|---|---|---|
| 38.7634 | 18.636 | |
| 38.4716 | 12.3847 | |
| 38.2488 | 17.3939 | |
| 37.2144 | 17.5837 | |
| 36.721 | 111.057 | |
| 36.2913 | 11.0136 | |
| 35.8776 | 22.0367 | |
| 35.6176 | 90.3685 | |
| 34.5248 | 15.734 | |
| 34.1959 | 24.7661 | |
| 33.0182 | 14.0261 | |
| 31.8671 | 238.301 | |
| 31.4056 | 20.6401 | |
| 30.8433 | 11.2412 | |
| 30.4613 | 20.2901 | |
| 30.0104 | 62.2997 | |
| 29.7133 | 78.3272 | |
| 29.2359 | 31.6111 | |
| 28.9653 | 53.5526 | |
| 28.6577 | 64.0528 | |
| 26.9813 | 17.6335 | |
| 26.3925 | 4.51208 | |
| 25.9363 | 5.6969 | |
| 24.2971 | 1.70709 | |
| 22.9019 | 9.13305 | $2B_4$ |
| 22.6048 | 14.3641 | $2B_5+$, 2EOC |
| 19.7349 | 10.124 | $1B_1$ |
| 19.1991 | 2.00384 | $1B_1$ |
| 17.5811 | 2.28331 | end group |
| 13.8783 | 26.3448 | $1B_4+$, 1EOC |
| 12.6264 | 19.6468 | end group |
| 10.9501 | 4.96188 | $1B_2$ |

Example 182

1-Pentene (10 ml) and cyclopentene (10 ml) were copolymerized in 20 ml of o-dichlorobenzene solvent according to example 180. After 72 h, the unreacted monomers and part of the solvent were removed in vacuo to give 3.75 g highly viscous fluid. Analysis by $^1$H NMR showed that this material contained 1.81 g of copolymer; the remainder was o-dichlorobenzene. The $^1$H NMR spectrum was very similar to poly(ethylene-co-cyclopentene) in Example 181. Integration shows 35 mole % cyclopentene in this copolymer. Analysis of the poly(1-pentene) part of the spectrum (omitting peaks due to cyclopentyl units) shows 62 methyl carbons per 1000 methylene carbons. The fraction of ω,1-enchainment (chain straightening) in this section is 72%. Based on quantitative $^{13}$C analysis, the distribution of branches per 1000 methylene carbons is Methyl (36), Propyl (7), and ≧Amyl (20). DSC (first heat: −150 to 150° C., 15° C./min; first cool: 150 to 150° C., 15° C./min; second heat: −150 to −150° C., 15° C./min,; values of second heat reported): Tg=−19° C., Tm=50° C. (24 J/g). GPC (trichlorobenzene, 135° C., polystyrene reference, results calculated as linear polyethylene using universal calibration theory): Mn=14,900 Mw=27,300 Mw/Mn=1.82.

Example 183

A 100 mL autoclave was charged with chloroform (40 mL), methyl acrylate (10 mL), {[(2,6-EtPh)$_2$DABMe$_2$]PdMe(NCMe)}BAF$^-$ (0.100 g, 0.073 mmol), and ethylene (2.1 MPa). The reaction mixture was stirred under 1.4 MPa of ethylene for 180 min; during this time the temperature inside the reactor remained between 25 and 26° C. The ethylene pressure was then vented, and the crude reaction mixture discharged from the reactor. The reactor was washed with 2×50 mL of chloroform. The washings were added to the crude reaction mixture; 250 mL of methanol was added to the resulting solution. After standing overnight, the polymer product had precipitated from solution; it was isolated by decanting off the chloroform/methanol solution, and dried giving 3.91 g of an extremely viscous oil. $^1$H NMR of this material showed it to be ethylene/methyl acrylate copolymer, containing 1.1 mole % methyl acrylate. The polymer contained 128 methyl-ended hydrocarbon branches per 1000 methylenes, and 7 methyl ester ended branches per 1000 methylenes.

Example 184

A solution of {[(Np)$_2$DABMe$_2$]PdMe(NCMe)}SbF$_6^-$ (0.027 g, 0.02 mmol) in 5 mL CDCl$_3$ was agitated under 1.4 MPa of ethylene for 3 h; during this time the temperature inside the reactor varied between 25 and 40° C. $^1$H NMR of the solution indicated the presence of ethylene oligomers. Mn was calculated on the basis of $^1$H NMR integration of aliphatic vs. olefinic resonances to be 100. The degree of polymerization, DP, was calculated on the basis of the $^1$H NMR spectrum to be 3.8; for a linear polymer this would result in 500 methyl-ended branches per 1000 methylenes. However, based on the $^1$H NMR spectrum the number of methyl-ended branches per 1000 methylenes was calculated to be 787.

Example 185

[(2-t-BuPh)$_2$DABMe$_2$]NiBr$_2$

A Schlenk tube was charged with 0.288 g (0.826 mmol) of (2-t-BuPh)$_2$DABMe$_2$, which was then dissolved in 15 mL of CH$_2$Cl$_2$. This solution was cannulated onto a suspension of (DME)NiBr$_2$ (0.251 g, 0.813 mmol) in 15 mL of CH$_2$Cl$_2$. The reaction mixture was allowed to stir overnight, resulting in a deep red solution. The solution was filtered and the solvent evaporated under vacuum. The remaining orange, oily residue was washed with ether (2×10 mL) and dried under vacuum to give an orange/rust powder (0.36 g, 78%).

Example 186

[(2-t-BuPh)$_2$DABAn]NiBr$_2$ (2-t-BuPh)$_2$DABAn (0.202 g, 0.454 mmol) and (DME)NiBr$_2$ (0.135 g, 0.437 mmol) were combined and stirred in 25 mL of CH$_2$Cl$_2$, as in Example 185. An orange/rust solid was isolated (0.18 g, 62%).

Example 187

[(2,5-t-BuPh)$_2$DABAn]NiBr$_2$

The corresponding diimine (0.559 g, 1.00 mmol) and (DME)NiBr$_2$ (0.310 g, 1.00 mmol) were combined and stirred in 35 mL of CH$_2$Cl$_2$, as was done in Example 185. An orange solid was isolated (0.64 g, 83%).

Examples 188–190

Polymerizations were carried out at 0° C. and under 1 atmosphere of ethylene pressure. The (diimine)NiBr$_2$ complex (1.4–1.7×10$^{-5}$ mol) was placed into a flame-dried Schlenk flask and dissolved in 100 mL of toluene. The flask was placed under ethylene and cooled in an ice bath. Polymerization was initiated by addition of 100 equivalents (1.5 mL 10% soln in toluene) of methylaluminoxane (MAO). The reaction mixture was stirred for 30 or 120 minutes at constant temperature followed by quenching with 6M HCl. Polymer was precipitated from the resulting viscous solution with acetone, collected via filtration, and dried under vacuum for 24 h. A summary of results is shown below.

| Ex No. | Catalyst |
|---|---|
| 188 | [(2-t-BuPh)$_2$DABMe$_2$]NiBr$_2$ |
| 189 | [(2-t-BuPh)$_2$DABAn]NiBr$_2$ |
| 190 | [(2,5-t-BuPh)$_2$DABAn]NiBr$_2$ |

| Exam. | Catalyst ($10^{-5}$ mol) | Conditions | Yield (g) | TO/hr · mol catalyst |
|---|---|---|---|---|
| 188 | (1.7) | 0° C., 120 m | 9.88 | 10,500 |
| 189 | (1.4) | 0° C., 30 m | 8.13 | 40,500 |
| 190 | (1.5) | 0° C., 30 m | 6.60 | 31,000 |

Examples 191–196

General Procedure. The procedure of Example 84 for the homopolymerization of ethylene) was followed with the exception that the acrylate was added to the reaction mixture at −78° C. immediately following the addition of 50 mL of CH$_2$Cl$_2$. Polymerizations are at room temperature (rt) and 1 atm ethylene unless stated otherwise. The copolymers were generally purified by filtering an Et$_2$O or petroleum ether solution of the polymer through Celite and/or neutral alumina. $^1$H and $^{13}$C NMR spectroscopic data and GPC analysis are consistent with the formation of random copolymers. In addition to the polyethylene resonances, the following resonances diagnostic of acrylate incorporation were observed:

Methyl Acrylate: $^1$H NMR (CDCl$_3$, 400 MHz) δ 3.64 (s, OMe), 2.28 (t, J=7.48, OCH$_2$), 1.58 (m, OCH$_2$CH$_2$); $^{13}$C NMR (C$_6$D$_6$, 100 MHz) δ 176 (C(O)), 50.9 (C(O)OMe). Fluorinated Octyl Acrylate (FOA, 3M Co. Minneapolis, Minn.): $^1$H NMR (CDCl$_3$, 400 MHz) δ 4.58 (t, J=13.51, OCH$_2$(CF$_2$)$_6$CF$_3$), 2.40 (t, J=7.32, C(O)CH$_2$), 1.64 (m, C(O)CH$_2$CH$_2$); $^{13}$C NMR (CDCl$_3$, 100 MHz) δ 172.1 (C(O)), 59.3 (t, J$_{CF}$=27.0, OCH$_2$(CF$_2$)$_6$CF$_3$).

Examples 197–203

In Examples 197–203, structures of the type represented by (VI) and (IX) are described.

Example 197

{[(2,6-i-PrPh)$_2$DABMe$_2$]PdMe(H$_2$C═CH$_2$)}BAF$^-$ and {[(2,6-i-PrPh)$_2$DABMe$_2$]Pd(P)H$_2$C═CH$_2$)} BAF$^-$ In a drybox under an argon atmosphere, an NMR tube was charged with ~0.01 mmol of <{[(2,6-i-PrPh)$_2$DABMe$_2$] PdMe}$_2$(μ-Cl)>BAF$^-$/[(Na(OEt$_2$)$_2$BAF or NaBAF] or {[(2, 6-i-PrPh)$_2$DABMe$_2$]PdMe(OEt$_2$)}BAF$^-$. The tube was then capped with a septum, removed from the drybox, and cooled to −78° C. Via gastight syringe, 700 μL of CD$_2$Cl$_2$ was then added to the NMR tube and the septum was wrapped with Parafilm. The tube was shaken very briefly in order to dissolve the palladium complex. After acquiring a spectrum at −80° C., 1–10 equiv of olefin was added to the −78° C. solution via gastight syringe, ant the olefin was dissolved in the solution by briefly shaking the NMR tube. The tube was then transferred to the cold NMR probe and spectra were acquired. This olefin complex was prepared from both precursors using one equiv of ethylene: $^1$H NMR (CD$_2$Cl$_2$, 400 MHz, −60° C.) δ 7.72 (s, 8, BAF: C$_o$), 7.54 (s, 4, BAF: C$_p$), 7.4–7.0 (m, 6, H$_{aryl}$), 4.40 (s, 4, H$_2$C═CH$_2$), 3.38 (br m, 4, O(CH$_2$CH$_3$)$_2$), 2.69 (septet, 2, J=6.73, CHMe$_2$), 2.63 (septet, 2, J=6.80, C'HMe$_2$), 2.34 and 2.23 (s, 3 each, N═C(Me)—C'(Me)═N), 1.33 (d, 6, J=6.80, C'HMeMe'), 1.25 (d, 6, J=6.50, CHMeMe'), 1.14 (d, 6, J=7.00, CHMeMe'), 1.10 (br m, 6, O(CH$_2$CH$_3$)$_2$), 1.07 (d, 6, J=6.80, C'HMeMe'), 0.18 (PdMe); $^{13}$C NMR (CD$_2$Cl$_2$, 100 MHz, −60° C.) 180.3 and 174.7 (N═C—C'═N), 161.5 (q, J$_{BC}$= 49.6, BAF: C$_{ipso}$) 143.3 and 141.7 (Ar, Ar': C$_{ipso}$), 134.4 (BAF: C$_o$), 128.6 (Ar: C$_p$), 128.4 (q, J$_{BC}$=32.3, BAF: C$_m$), 127.7 (Ar': C$_p$), 124.7 and 124.4 (Ar, Ar': C$_o$), 117.3 (BAF: C$_p$), 91.7 (J$_{CH}$=160.7, H$_2$C═CH$_2$), 65.8 (O(CH$_2$CH$_3$)$_2$), 28.9 (CHMe$_2$), 28.8 (C'HMe$_2$), 24.1, 23.4, 22.9 and 22.7 (CHMeMe', C'HMeMe'), 21.7 and 21.5 (N═C(Me)═C' (Me)═N), 15.0 (OCH$_2$CH$_3$)$_2$), 4.3 (PdMe).

In the presence of 5 equiv of ethylene, chain growth was observed at −35° C. Spectral data for {[(2,6-i-PrPh)$_2$ DABMe$_2$]Pd(P)(CH$_2$═CH$_2$)}BAF$^-$ [wherein P is as

| Ex. | Catalyst (R), conc. ($10^{-3}$ Molar) | Acrylate, conc. (Molar) | Rxn Time (h) | Yield (g) | % Acrylate Inc. mol %/wt % | # CH$_3$/ 1000 CH$_2$ | M$_w$ | M$_n$ | PDI |
|---|---|---|---|---|---|---|---|---|---|
| 191 | Me, 2.3 | 0 Me, 6.7 | 24$^a$ | ≈0.5 | 10.9/ 27.3 | 134 | | | |
| 192 | Me, 1.4 | 0 Me, 1.1 | 48 | 3.94 | 2.7/ 7.84 | 114 | 77000 | 56400 | 1.4$^b$ |
| 193 | Me, 2.0 | FOA, .74 | 24 | 27.5 | 0.80/ 11.58 | 110 | | | |
| 194 | Me, 2.0 | FOA, 1.3 | 24 | 20.7 | 0.80/ 11.58 | 126 | | | |
| 195 | H, 2.0 | FOA, .74 | 24 | 1.49 | 0.31/ 4.85 | 144 | | | |
| 196 | 2.0$^c$ | FOA, .74 | 24 | 2.00 | 0.71/ 10.73 | 135 | | | |

$^a$Final 3 h at 50° C.
$^b$THF, PMMA standards.
$^c$Catalyst is {[(2,6-i-PrPh)DABAn]PdCH$_2$CH$_2$CH$_2$C(O)OCH$_2$(CF$_2$)$_6$CF$_3$}BAF$^-$ defined for (VI)] intermediates ($CD_2Cl_2$, 400 MHz, −35° C.) are reported in the following table:

| {[(2,6-i-PrPh)$_2$DABMe$_2$]Pd[(CH$_2$)$_n$CH$_3$](H$_2$C=CH$_2$)}$^+$BAF$^−$ | | | | | | | | |
|---|---|---|---|---|---|---|---|---|
| | H$_2$C=CH$_2$ | | N=C(Me)—C'(Me)=N | | | Pd(CH$_2$)$_n$Me | | |
| n | mult. | δ | mult. | δ | mult. | δ | mult. | J | δ |
| 0 | s | 4.42 | s | 2.35 | s | 2.24 | s | | 0.22 |
| 2 | s | 4.36 | s | 2.37 | s | 2.22 | t | 7.00 | 0.39 |
| 4 | s | 4.36 | s | 2.37 | s | 2.22 | t | 7.20 | 0.62 |

Addition of 15 more equiv of ethylene and warming to room temperature leads to complete consumption of ethylene and the observance of a single organometallic species: $^1$H NMR ($CD_2Cl_2$, 400 MHz, 24.0° C.) δ 7.74 (s, 8, BAF: $C_o$), 7.19 (s, 4, BAF: $H_p$), 2.85 (br m, 4, CHMe$_2$, C'HMe$_2$), 2.36 and 2.23 (s, 3 each, N=C(Me)—C'(Me)=N), 1.5–1.0 (CHMeMe', C'HMeMe'), 1.29 (Pd(CH$_2$)$_n$CH$_3$), 0.89 (Pd(CH$_2$)$_n$CH$_3$).

Example 198

{[(2,6-i-PrPh)$_2$DABH$_2$]PdMe(H$_2$C=CH$_2$)}BAF$^−$ and {[(2,6-i-PrPh)$_2$DABH$_2$]Pd(P)(H$_2$C=CH$_2$)}BAF$^−$ This olefin complex, {[(2,6-i-PrPh)$_2$DABH$_2$]PdMe(H$_2$C=CH$_2$))}BAF$^−$, was prepared following the procedure of example 197 by both of the analogous synthetic routes used in example 197, using one equiv of ethylene: $^1$H NMR ($CD_2Cl_2$, 400 MHz, −60° C.) δ 8.42 and 8.26 (s, 1 each, N=C(H)—C'(H)=N), 7.72 (s, 8, BAF: $H_o$), 7.54 (s, 4, BAF: $H_p$), 7.42–7.29 (m, 6, $H_{aryl}$), 4.60 (s, H$_2$C=CH$_2$), 3.37 (q, 4, J=7.03, (O(CH$_2$CH$_3$)$_2$), 2.89 (septet, 2, J=6.71, CHMe$_2$), 2.76 (septet, 2, J=6.68, C'HMe$_2$), 1.35 (d, 6, J=6.72, C'HMeMe'), 1.29 (d, 6, J=6.79, CHMeMe'), 1.15 (d, 6, J=6.72, CHMeMe'), 1.09 (d, 6, J=6.54, C'HMeMe'), 1.15 (t, 6, J=7.34, O(CH$_2$CH$_3$)$_2$), 0.46 (s, 3, PdMe); $^{13}$C NMR ($CD_2Cl_2$, 400 MHz, −60° C.) δ 167.7 ($J_{CH}$=182, N=C(H)), 162.8 ($J_{CH}$=182, N=C'(H)), 161.4 (q, J=49.8, BAF: $C_{ipso}$), 140.2 and 139.8 (Ar, Ar': $C_{ipso}$), 138.6 and 137.3 (Ar, Ar': $C_o$), 134.4 (BAF: $C_o$), 129.2 and 129.1 (Ar, Ar': $C_p$), 128.3 (q, $J_{CF}$=32.2, BAF: $C_m$), 124.3 and 124.0 (Ar, Ar': $C_m$), 124.2 (q, $J_{CF}$=272.5; BAF: $CF_3$), 117.3 (BAF: $C_p$), 92.7 ($J_{CH}$=162.5, H$_2$C=CH$_2$), 65.8 (O(CH$_2$CH$_3$)$_2$), 28.9 and 28.7 (CHMe$_2$ and C'HMe$_2$), 25.1, 24.0, 22.0 and 21.9 (CHMeMe', C'HMeMe'), 15.12 ($J_{CH}$=139.2, PdMe), 15.09 (O(CH$_2$CH$_3$)$_2$).

In the presence of 10 equiv of ethylene, chain growth was monitored at −35° C. Diagnostic $^1$H NMR spectral data ($CD_2Cl_2$, 400 MHz, −35° C.) for the second title compound are reported in the following table:

| {[(2,6-i-PrPh)$_2$DABH$_2$]Pd[(CH$_2$)$_n$CH$_3$](H$_2$C=CH$_2$)}$^+$BAF$^−$ | | | | | | | | |
|---|---|---|---|---|---|---|---|---|
| | N=C(H)—C'(H)=N | | H$_2$C=CH$_2$ | | | Pd(CH$_2$)$_n$Me | | |
| n | mult. | δ | mult. | δ | mult. | δ | mult. | J | δ |
| 0$^a$ | s | 8.42 | s | 8.27 | br s | 4.6 | s | | 0.50 |
| 2$^b$ | s | 8.41 | s | 8.24 | br s | 4.6 | t | 7.85 | 0.36 |
| 4 | s | 8.41 | s | 8.24 | br s | 4.6 | t | 7.15 | 0.62 |

-continued

| {[(2,6-i-PrPh)$_2$DABH$_2$]Pd[(CH$_2$)$_n$CH$_3$](H$_2$C=CH$_2$)}$^+$BAF$^−$ | | | | | | | | |
|---|---|---|---|---|---|---|---|---|
| | N=C(H)—C'(H)=N | | H$_2$C=CH$_2$ | | | Pd(CH$_2$)$_n$Me | | |
| n | mult. | δ | mult. | δ | mult. | δ | mult. | J | δ |
| 6 | s | 8.41 | s | 8.24 | br s | 4.6 | t | 7.25 | 0.76 |
| >6 | s | 8.41 | s | 8.24 | br s$^c$ | 4.6 | m | | 0.85$^d$ |

$^a$For n = 0: δ 2.91 and 2.71 (septet, 2 each, CHMe$_2$, C'HMe$_2$), 1.38, 1.32, 1.18 and 1.12 (d, 6 each, CHMeMe', C'HMeMe').
$^b$For n > 0: δ 2.91 and 2.71 (septet, 2 each, CHMe$_2$, C'HMe$_2$), 1.37, 1.35, 1.16 and 1.11 (d, 6 each, CHMeMe', C'HMeMe').
$^c$In the absence of free ethylene, bound ethylene appears as a sharp singlet at 4.56 ppm.
$^d$δ 1.27 (Pd(CH$_2$)$_n$CH$_3$).

After the ethylene was consumed at −35° C., the sample was cooled to −95° C. Broad upfield multiplets were observed at −7.2 to −7.5 ppm and −8.0 to −8.5 ppm. The sample was then warmed to room temperature and a spectrum was acquired. No olefins were detected, the upfield multiplets were no longer observable, and a single organometallic species was present: $^1$H NMR ($CD_2Cl_2$, 400 MHz, 19.8° C.) δ 8.41 and 8.28 (s, 1 each, N=C(H)—C'(H)=N), 7.72 (s, 8, BAF: $H_o$), 7.56 (s, 4, BAF: $H_p$), 3.09 (m, 4, CHMe$_2$, C'HMe$_2$), 1.35, 1.32, 1.26 and 1.22 (d, 6 each, J=6.5–6.8, CHMeMe', C'HMeMe'), 1.27 (Pd(CH$_2$)$_n$CH$_3$), 0.88 (Pd(CH$_2$)$_n$CH$_3$).

A second spectrum was acquired 12 minutes later at room temperature. Substantial decomposition of the organometallic species was observed.

Example 199

{[(2,6-i-PrPh)$_2$DABH$_2$]PdMe(H$_2$C=CH$_2$))}BAF$^−$

This olefin complex, {[(2,6-MePh)$_2$DABH$_2$]PdMe(H$_2$C=CH$_2$))}BAF$^−$, was prepared following the procedure in example 197, using {[(2,6-MePh)$_2$DABH$_2$]PdMe(OEt$_2$)}BAF$^−$ and one equiv of ethylene: $^1$H NMR ($CD_2Cl_2$, 300 MHz, −70° C.) δ 8.46 and 8.31 (s, 1 each, N=C(H)—C'(H)=N), 7.72 (s, 8, BAF: $H_o$), 7.52 (s, 4, BAF: $H_p$), 7.4–6.4 (m, 6, $H_{aryl}$), 4.56 (s, 4, H$_2$C=CH$_2$), 2.19 and 2.16 (s, 6 each, Ar, Ar': Me), 0.31 (s, 3, PdMe).

In the presence of 10 equiv of ethylene (eq 3), olefin insertion was monitored at −30° C. and the production of cis- and trans-2-butenes was observed.

Example 200

{[(2,6-i-PrPh)$_2$DABMe$_2$]PdMe(H$_2$C=CHMe)}BAF$^−$

This olefin complex, {[(2,6-i-PrPh)$_2$DABMe$_2$]PdMe(H$_2$C=CHMe)}BAF$^−$, was prepared following the procedure of Example 197, using {[(2,6-i-PrPh)$_2$DABMe$_2$]PdMe(OEt$_2$)}BAF$^−$ and one equiv of propylene: $^1$H NMR ($CD_2Cl_2$, 400 MHz, −61° C.) δ 7.73 (s, 8, BAF: $H_o$), 7.55 (s, 4, BAF: $H_p$), 7.4–7.0 (m, 6, $H_{aryl}$), 5.00 (m, 1H$_2$C=CHMe), 4.24 (d, 1, J=9.1, HH'C=CHMe), 4.23 (d, 1, J=14.8, HH'C=CHMe), 3.38 (br q, 4, J=6.50, O(CH$_2$CH$_3$)$_2$), 2.84 (septet, 1, J=6.5, Ar: CHMe$_2$), 2.68 (m, 3, Ar: C'HMe$_2$; Ar': CHMe$_2$, C'HMe$_2$), 2.32 and 2.22 (s, 3 each, N=C(Me)—C(Me)=N), 1.63 (d, 3, J=6.40, H$_2$C=CHMe), 1.35, 1.30, 1.25, 1.1, 1.1, 1.04 (d, 3 each, J=6.4–6.7, Ar: C'HMeMe'; Ar': CHMeMe', C'HMeMe'), 1.24 and 1.1 (d, 3 each, J=6.4, Ar: CHMeMe'), 1.1 (m, 6, O(CH$_2$CH$_3$)$_2$), 0.28 (PdMe); $^{13}$C NMR ($CD_2Cl_2$, 100 MHz, −61° C.) δ 179.9 and 174.7

(N=C—C'=N), 161.5 (q, $J_{BC}$=49.7, BAF: $C_{ipso}$), 138.8, 137.9, 137.8, 137.7, 137.0 and 136.9 (Ar: $C_{ipso}$, $C_o$, $C_o$'; Ar': $C_{ipso}$, $C_o$, $C_o$'); 134.4 (BAF: $C_o$), 128.6 and 128.5 (Ar: $C_p$, $C_p$'), 128.4 (q, $J_{CF}$=31.6, BAF: $C_m$), 124.8, 124.7, 124.4 and 124.4 (Ar: $C_m$, $C_m$'; Ar': $C_m$, $C_m$'), 124.2 (q, $J_{CF}$=272.5, BAF: CF$_3$), 117.3 (BAF: $C_p$), 116.1 ($J_{CH}$=155.8, H$_2$C=CHMe), 85.6 ($J_{CH}$=161.4, H$_2$C=CHMe), 65.8 (O(CH$_2$CH$_3$)$_2$), 28.9, 28.7, 28.7, 28.7 (Ar: CHMe$_2$, C'HMe$_2$; Ar': CHMe$_2$, C'HMe$_2$), 24.5, 23.9, 23.5, 23.4, 22.9, 22.9, 22.8, 22.2, 21.71, 21.65, 20.9 (H$_2$C=CHMe; Ar: CHMeMe', C'HMeMe'; Ar': CHMeMe', C'HMeMe', N=C(Me)—C' (Me)=N), 16.9 ($J_{CH}$=137.5, PdMe), 15.0 (O(CH$_2$CH$_3$)$_2$).

Example 201

{[(2,6-i-PrPh)$_2$DABH$_2$]PdMe(H$_2$C=CHMe)}BAF$^-$ and {[(2,6-i-PrPh)$_2$DABH$_2$]Pd(P)(H$_2$C=CHMe)} BAF$^-$ This olefin complex, {[(2,6-i-PrPh)$_2$DABH$_2$]PdMe (H$_2$C=CHMe)}BAF$^-$, was prepared following using both of the synthetic routes used in Example 197, using one equiv of propylene: $^1$H NMR (CD$_2$Cl$_2$, 400 MHz, −80° C.) δ 8.40 and 8.24 (s, 1 each, N=C(H)—C'(H)=N), 7.72 (s, 8, BAF: H$_o$), 7.53 (s, 4, BAF: H$_p$), 7.40–7.27 (m, 6, H$_{aryl}$), 5.41 (br m, H$_2$C=CHMe), 4.39 (d, 1, J=8.09, HH'C=CHMe), 4.14 (br d, 1, J=15.29, HH'C=CHMe), 3.10 (br m, 1, CHMe$_2$), 2.87 (overlapping septets, 2, C'HMe$_2$, C"HMe$_2$), 2.59 (br septet, 1, C'''HMe$_2$), 1.64 (d, J=6.07, H$_2$C=CHMe), 1.39 and 1.03 (d, 3 each, J=6.4, CHMeMe'), 1.27, 1.27, 1.14 and 1.1 (d, 3 each, J=5.9–6.7, C'HMeMe', C''HMeMe'), 1.23 and 1.1 (d, 3 each, J=6.8, C'''HMeMe'), 0.47 (PdMe); $^{13}$C NMR (CD$_2$Cl$_2$, 100 MHz, −80° C.) δ 167.1 ($J_{CH}$=181.6, N=C (H)), 163.0 ($J_{CH}$=182.1, N=C'(H)), 161.3 (q, $J_{BC}$=50.0, BAF: $C_{ipso}$), 140.5 and 140.0 (Ar, Ar': $C_{ipso}$), 138.5, 138.3, 137.7 and 137.2 (Ar: $C_o$, $C_o$'; Ar': $C_o$, $C_o$'), 134.2 (BAF: $C_o$), 128.9 and 128.8 (Ar, Ar': $C_p$), 128.1 (q, $J_{CF}$=31.1, BAF: $C_m$), 124.0 (q, $J_{CF}$=272.5, BAF: CF$_3$), 124.6, 123.8, 123.8 and 123.6 (Ar: $C_m$, $C_m$'; Ar': $C_m$, $C_m$'), 117.1 (BAF: $C_p$), 116.4 ($J_{CH}$=160.3, H$_2$C=CHMe), 85.4 ($J_{CH}$=159.9, H$_2$C=CHMe), 65.7 (O(CH$_2$CH$_3$)$_2$), 29.2, 28.7, 28.5 and 28.0 (Ar: CHMe$_2$, C'HMe$_2$; Ar': CHMe$_2$, C'HMe$_2$), 26.0, 24.4, 24.03, 23.97, 23.7, 21.9, 21.8, 21.7 and 21.6 (H$_2$C=CHMe; Ar: CHMeMe', C'HMeMe'; Ar': CHMeMe', C'HMeMe'), 16.6 ($J_{CH}$=142.1, PdMe), 15.0 (O(CH$_2$CH$_3$)$_2$).

In the presence of 10 equiv of propylene, chain growth was monitored at −20° C., thus enabling {[(2,6-i-PrPh)$_2$DABH$_2$]Pd[(CHMeCH$_2$)Me](H$_2$C=CHMe)}BAF$^-$, intermediates to be observed (CD$_2$Cl$_2$, 400 MHz, −20° C.):

| {[(2,6-i-PrPh)$_2$DABMe$_2$]Pd((CHMeCH$_2$)$_n$Me)(H$_2$C=CHMe)}$^+$BAF$^-$ | | | | | | | | | | | |
|---|---|---|---|---|---|---|---|---|---|---|---|
| | N=CHC'H=N | | HH'C=CHMe | | | HH'C=CHMe | | | C=CHMe | (CHMeCH$_2$)$_n$Me | |
| n | δ | δ | mult | J | δ | mult | J | δ | mult | δ | mult | J | δ |
| 0 | 8.40 | 8.26 | d | 14.4 | 4.25 | d | 8.6 | 4.47 | m | 5.45 | s | | 0.59 |
| 1 | 8.38 | 8.24 | d | 14.4 | 3.98 | d | 7.4 | 4.25 | m | 5.55 | t | 7.1 | 0.51 |
| >1 | 8.39 | 8.23 | d | 13.7 | 4.07 | d | 8.0 | 4.41 | m | 5.42 | | | |

Example 202

The compound {[(2,6-i-PrPh)$_2$DABH$_2$]PdMe (H$_2$C=CHCH$_2$Me)}BAF$^-$ was made using both the synthetic methods described in Example 197, except 1-butene was used. $^1$H NMR (CD$_2$Cl$_2$, 400 MHz, −75° C.) δ 8.44 and 8.28 (s, 1 each, N=C(H)—C'(H)=N), 7.74 (s, 8, BAF: $C_o$), 7.56 (s, 4, BAF: $C_p$), 7.5–7.2 (m, 6, H$_{aryl}$), 5.4 (m, 1, H$_2$C=CHCH$_2$CH$_3$), 4.36 (d, 1, J=8.2, HH'C=CHCH$_2$CH$_3$), 4.13 (br m, 1, HH'C=CHCH$_2$CH$_3$), 3.14, 2.92, 2.92 and 2.62 (m, 1 each, Ar, Ar': CHMe$_2$, C'HMe$_2$), 1.95 and 1.65 (m, 1 each, H$_2$C=CHCHH'CH$_3$), 1.5–1.0 (d, 3 each, Ar, Ar': CHMeMe', C'HMeMe'), 0.60 (s, 3, PdMe).

Isomerization to cis- and trans-2-butene began at −78° C. and was monitored at −15° C. along with chain growth. For Pd[P] species, formation of the 1-butene complex occurred selectively in the presence of cis- and trans-2-butene. Consumption of all olefins was observed at 20° C.

Examples 203

{[(2,6-i-PrPh)$_2$DABH$_2$]PdMe(CH$_3$CH=CHCH$_3$)} BAF$^-$

Experiments involving the reaction of the bispalladium ($\mu$-Cl) compound/NaBAF (as in Example 197) with trans-2-butene and the bispalladium($\mu$-Cl) compound alone with cis-2-butene led to partial formation of the corresponding olefin complexes. An equilibrium was observed between the ether adduct and the olefin adduct when a compound of the type {[(2,6-i-PrPh)$_2$DABH$_2$]PdMe(OEt$_2$)}BAF$^-$ was reacted with one equiv of cis- or trans-2-butene. Addition of excess 2-butene led to complete formation of the olefin adduct. Chain growth, which was monitored at 0° C. to room temperature, led to complete consumption of butenes. Some butene isomerization occurred during the course of the oligomerization and small amounts of β-hydride elimination products (disubstituted internal olefins and trisubstituted olefins) were observed. Oligomer methylene and methyl groups were observed at 1.3 and 0.8 ppm, respectively. Diagnostic $^1$H NMR spectral data for the butene complexes follows:

{[(2,6-i-PrPh)$_2$DABH$_2$]PdMe(trans-CH$_3$CH=CHCH$_3$)} BAF$^-$. $^1$H NMR (CD$_2$Cl$_2$, 400 MHz, −39° C.) δ 8.43 and 8.29 (s, 1 each, N=C(H)—C'(H)=N), 5.27 and 4.72 (m, 1 each, CH$_3$CH=C'HCH$_3$), 0.73 (PdMe); $^{13}$C NMR (CD$_2$Cl$_2$, 100 MHz, −95° C.) δ 166.8 ($J_{CH}$=181.5, N=C(H)), 163.2 ($J_{CH}$=179.8, N=C'(H)), 161.2 (q, $J_{BC}$=49.5, BAF: $C_{ipso}$), 141.3 and 139.9 (Ar, Ar': $C_{ipso}$), 138.4, 138.2, 138.0 and 137.0 (Ar, Ar': $C_o$, $C_o$'), 134.0 (BAF: $C_o$), 128.74 and 128.71 (Ar, Ar': $C_p$), 128.0 (q, $J_{CF}$=31.9, BAF: $C_m$), 125.4 ($J_{CH}$=150.0, free MeCH=CHMe), 123.8 (q, $J_{CF}$=272.5, BAF: CF$_3$), 124.8, 123.7, 123.5 and 123.4 (Ar, Ar': $C_o$, $C_o$'), 117.0 (BAF: $C_p$), 107.0 and 106.8 ($J_{CH}$~152, MeCH=C'HMe), 65.6 (free O(CH$_2$CH$_3$)$_2$), 29.5, 28.3, 27.6, 26.5, 24.1, 23.8, 23.6, 21.5, 21.3, 21.2, 20.4, 19.9, 19.6, 17.9, 17.5 (Ar, Ar': CHMeMe', C'HMeMe'; MeCH=C'HMe), 17.7 (free MeCH=CHMe), 15.0 (PdMe), 14.7 (O(CH$_2$CH$_3$)$_2$).

{[(2,6-i-PrPh)$_2$DABH$_2$]PdMe(cis-CH$_3$CH=CHCH$_3$)} BAF$^-$. $^1$H NMR (CD$_2$Cl$_2$, 400 MHz, −75° C.) δ 8.37 and 8.25 (s, 1 each, N=C(H)—C'(H)=N), 5.18 (q, 2, CH$_3$CH=CHCH$_3$), 1.63 (d, 6, J=4.9, CH$_3$CH=CHCH$_3$), 0.47 (PdMe).

References for the synthesis of bis(oxazoline) ligands and their transition metal complexes: Corey, E. J.; Imai, N.; Zang, H. Y. *J. Am. Chem. Soc.* 1991, 113, 728–729. Pfaltz, A. *Acc. Chem. Res.* 1993, 26, 339–345, and references within.

Example 204

2,2-bis{2-[4(S)-methyl-1,3-oxazolinyl]}propane (500 mg, 2.38 mmol) was dissolved in 10 mL CH$_2$Cl$_2$ in a Schlenk tube under a N$_2$ atmosphere. This solution was added via cannula to a suspension of (1,2-dimethoxyethane)NiBr$_2$ (647 mg, 2.10 mmol) in 30 mL of CH$_2$Cl$_2$. The solution was stirred for 18 hours. The solvent was evaporated under reduced pressure. The product, 2,2-bis{2-[4(S)-methyl-1,3-oxazolinyl]}propaneNi(Br$_2$), was washed with 3×15 mL of hexane. The product was isolated as a purple powder (0.85 g, 84% yield).

Example 205

The product of Example 204 (14.2 mg, 3.3×10$^{-5}$ mol) and toluene (75 mL) were combined in a Schlenk flask under 1 atmosphere ethylene pressure. The solution was cooled to 0° C., and 3.0 mL of a 10% MAO (100 eq) solution in toluene was added. The resulting yellow solution was stirred for 40 hours. The oligomerization was quenched by the addition of H$_2$O and a small amount of 6 M HCl. The organic fraction was separated from the aqueous fraction, and the toluene was removed under reduced pressure. A colorless oil resulted (0.95 g of oligomer). This illustrates that polymerization may be effected by such Pd, Ni and/or Co bisoxazoline complexes which are substituted in both 4 positions of the oxazoline ring by hydrocarbyl and substituted hydrocarbyl groups.

Example 206

[(COD)PdMe(NCMe)]$^+$BAF$^-$

To CODPdMeCl (100 mg, 0.37 mmol) was added a solution of acetonitrile (0.08 mL, 1.6 mmol) in 25 mL CH$_2$Cl$_2$. To this colorless solution was added Na$^+$BAF$^-$ (370 mg, 0.4 mmol). A white solid immediately precipitated. The mixture was stirred at −20° C. for 2 hours. The solution was concentrated and filtered. Removal of solvent under reduced pressure resulted in a glassy solid. $^1$H NMR (CD$_2$Cl$_2$) δ 5.78 (mult, 2H), δ 5.42 (mult, 2H), δ 2.65 (mult, 4H), δ 2.51 (9 mult, 4H), δ 2.37 (s, 3H, NCMe), δ 1.19 (s, 3H, Pd-Me), δ 7.72 (s, 8, BAF$^-$, H$_o$), δ 7.56 (s, 4, BAF$^-$, H$_p$).

Example 207

[2,6-(i-Pr)$_2$PhDABH$_2$]NiBr$_2$ (10 mg, 1.7×10$^{-5}$ mol), toluene (13 mL), and 1-hexene (38 mL) were combined in a Schlenk flask under an argon atmosphere. A 10% MAO solution (1.5 mL, 100 eq) in toluene was added to a suspension of the diimine nickel dihalide. The resulting purple solution was stirred at room temperature for 1 hour. The polymerization was quenched and the polymer precipitated from acetone. The resulting colorless polymer was dried in vacuo (2.5 g). GPC (toluene, polystyrene standards) M$_n$=330,000; M$_w$=590,000; M$_n$/M$_w$=1.8.

Example 208

[(2,6-i-PrPh)$_2$DABH$_2$]NiBr$_2$ (10 mg, 1.7×10$^{-5}$ mol) was added to a solution which contained toluene (30 mL) and 1-octene (20 mL). A 10% solution of MAO (1.5 mL, 100 eq) in toluene was added. The resulting purple solution was allowed to stir for 4 hours at room temperature. Solution viscosity increased over the duration of the polymerization. The polymer was precipitated from acetone and dried in vacuo resulting in 5.3 g of copolymer. M$_n$=15,200; M$_w$=29,100; M$_w$/M$_n$=1.92.

Example 209

[(2,6-i-PrPh)$_2$DABMe$_2$]Ni(CH$_3$)$_2$ (20 mg, 4.1×10$^{-5}$ mol) and MAO (35.7 mg, 15 eq) were combined as solids in an NMR tube. The solid mixture was cooled to −78° C. and dissolved in 700 μL of CD$_2$Cl$_2$. While cold, 10 μL of ether d$^{10}$ was added to stabilize the incipient cation. $^1$H NMR spectrum were recorded at 253, 273, and 293° K. It was apparent that the starting nickel dimethyl complex was disappearing and a new nickel complex(es) was being formed. Activation of the dimethyl complex was occurring through methane loss (s, δ 0.22). After 2 hours at 293° K all of the starting species had disappeared. To test for ethylene polymerization activity, 5000 μL (10 eq) of ethylene was added via gas tight syringe to the solution at −78° C. The consumption of ethylene was monitored by $^1$H NMR spectroscopy. The onset of ethylene uptake was observed at 223° K and all of the ethylene was consumed upon warming the probe to 293° K. The persistence of the Ni—Me signal during the experiment suggests that under these conditions propagation is faster than initiation. Solid polyethylene was observed upon removing the NMR tube from the probe.

Example 210

[(2,6-i-PrPh)$_2$DABAn]NiBr$_2$ (12 mg, 1.7×10$^{-5}$ mol) was combined with toluene (50 mL) and 1-hexene (25 mL) under a N$_2$ atmosphere. Et$_2$AlCl (0.01 mL, 10 eq) was added to the polymerization mixture. The resulting purple solution was allowed to stir for 4 hours. After 4 hours the polymerization was quenched and the polymer precipitated from acetone. The polymerization yielded 2.05 g poly(1-hexene)(731 TO). (GPC, toluene, polystyrene standards) M$_n$=305,000; M$_w$=629,000; M$_w$/M$_n$=2.05. T$_g$=−57° C., T$_m$=52° C. T$_m$=−57° C., T$_g$=−20° C. $^1$H NMR (C$_6$D$_5$Cl, 142° C.) 10 methyls per 100 carbons. This number is significantly less than would be expected for strictly atactic 1-hexene.

Example 211

Concentration dependence on catalyst activity in nickel catalyzed polymerization of α-olefins. A series of homopolymerizations of 1-hexene were run at 10%, 15%, 20%, 30%, 40%, and 75% 1-hexene by volume. In each of the above cases 10 mg of [(2,6-i-PrPh)$_2$DABH$_2$]NiBr$_2$ was taken up in toluene and 1-hexene (50 mL total volume 1-hexene+toluene). All of the polymerizations were run at 25° C. and activated by the addition of 1.5 mL of a 10% MAO solution in toluene. The polymerizations were stirred for 1 hour and quenched upon the addition of acetone. The polymer was precipitated from acetone and dried in vacuo. 10% by volume 1-hexene yielded 2.5 g poly(1-hexene), 15% by volume 1-hexene yielded 2.6 g poly(1-hexene), 20% by volume 1-hexene yielded 3.0 g poly(1-hexene), 30% by volume 1-hexene yielded 2.6 g poly(1-hexene), 40% by volume 1-hexene yielded 2.6 g poly(1-hexene), 75% by volume 1-hexene yielded 2.5 g poly(1-hexene).

Example 212

FeCl$_2$ (200 mg, 1.6 mmol) and 20 ml of CH$_2$Cl$_2$ were combined in a Schlenk flask under an argon atmosphere. In a separate flask, 550 mg (2,6-i-PrPh)$_2$DABMe$_2$ and 20 ml CH$_2$Cl$_2$ were combined, resulting in a yellow solution. The ligand solution was slowly (2 hr) transferred via cannula into the suspension of FeCl$_2$. The resulting solution was stirred at 25° C. After 4 hr. the solution was separated from the unreacted FeCl$_2$ by filter cannula (some purple solid was also left behind). The solvent was removed in vacuo to give a purple solid (0.53 g, 71% yield). A portion of the purple solid was combined with 50 ml of toluene under 1 atm of ethylene. The solution was cooled to 0° C., and 6 ml of a 10% MAO solution in toluene was added. The mixture was warmed to 25° C. and stirred for 18 hr. The polymer was precipitated by acetone, collected by suction filtration, and washed with 6M HCl, water and acetone. The white polymer was dried under reduced pressure. Yield 13 mg.

Example 213

A 58-mg (0.039-mmol) sample of {[(2,6-i-PrPh)$_2$DABMe$_2$]PdCH$_2$CH$_2$CH$_2$C(O)OCH$_3$}BAF$^-$ was placed in a 600-mL stirred autoclave under nitrogen with 150 mL of deaerated water. This mixture was pressurized to 5.5 MPa with ethylene and was stirred at 23° C. for 68 hr. When the ethylene was vented, the autoclave was found to be full of rubbery polymer: on top was a layer of white, fluffy elastomeric polyethylene, while beneath was gray, dense elastomeric polyethylene. The water was poured out of the autoclave; it was a hazy light blue, containing a tiny amount of emulsified polyethylene; evaporation of the whole aqueous sample yielded a few mg of material. The product was dried under high vacuum to yield 85.5 g of amorphous elastomeric polyethylene, which exhibited a glass transition temperature of −61° C. and a melting endotherm of −31° C. (16 J/g) by differential scanning calorimetry. H-1 NMR analysis (CDCl$_3$): 105 methyl carbons per 1000 methylene carbons. Gel permeation chromatography (trichlorobenzene, 135° C., polystyrene reference, results calculated as polyethylene using universal calibration theory): $M_n$=42,500; $M_w$=529,000; $M_w/M_n$=12.4. This example demonstrates the use of pure water as a polymerization medium.

Example 214

A 73-mg (0.049 mmol) sample of {[(2,6-i-PrPh)$_2$DABMe$_2$]PdCH$_2$CH$_2$CH$_2$C(O)OCH$_3$}BAF$^-$ was placed in a 600-mL stirred autoclave under nitrogen with 150 mL of deaerated water; to this was added 3.1 mL (3.3 g) of Triton® X-100 nonionic surfactant. This mixture was pressurized to 5.8 MPa with ethylene and was stirred at 23° C. for 17 hr. When the ethylene was vented, most of the emulsion came out the valve due to foaming; it was caught in a flask. There was polymer suspended in the emulsion; this was filtered to give, after MeOH and acetone washing and air-drying, 2.9 g of amorphous polyethylene as a fine, gray rubber powder. The filtrate from the suspended polymer was a clear gray solution; this was concentrated on a hot plate to yield recovered Triton® X-100 and palladium black. There was no polymer in the aqueous phase. The elastomeric polyethylene product exhibited a glass transition temperature of −50° C. and a melting endotherm of 48° C. (5 J/g) by differential scanning calorimetry. H-1 NMR analysis (CDCl$_3$): 90 methyl carbons per 1000 methylene carbons. Gel permeation chromatography (trichlorobenzene, 135° C., polystyrene reference, results calculated as polyethylene using universal calibration theory): $M_n$=31,000; $M_w$=311,000; $M_w/M_n$=10.0. This example demonstrates the aqueous emulsion polymerization of ethylene in the presence of a non-ionic surfactant.

Example 215

A 93-mg (0.110-mmol) sample of {[(2,6-i-PrPh)$_2$DABMe$_2$]PdCH$_2$CH$_2$CH$_2$C(O)OCH$_3$}$^+$SbF$_6^-$ was placed in a 600-mL stirred autoclave under nitrogen with 150 mL of deaerated water; to this was added 0.75 g (1.4 mmol) of FC-95® anionic fluorosurfactant (potassium perfluorooctansulfonate). This mixture was pressurized to 5.1 MPa with ethylene and was stirred at 23° C. for 15 hr. The ethylene was vented; the product consisted of polymer suspended in emulsion as well as some polymer granules on the wall of the autoclave; the emulsion was filtered to give, after MeOH and acetone washing and air-drying, 2.4 g of amorphous polyethylene as a fine, gray rubber powder. The hazy blue-gray aqueous filtrate was evaporated to yield 0.76 g of residue; hot water washing removed the surfactant to leave 0.43 g of dark brown sticky polyethylene rubber. H-1 NMR (CDCl$_3$) analysis: 98 CH$_3$'s per 1000 CH$_2$'s. Differential scanning calorimetry: melting point: 117° C. (111 J/g); glass transition: −31° C. (second heat; no apparent Tg on first heat). This example demonstrates the aqueous emulsion polymerization of ethylene in the presence of a anionic surfactant. This example also demonstrates that a true aqueous emulsion of polyethylene can be obtained by emulsion polymerization of ethylene with these catalysts in the presence of an appropriate surfactant.

Example 216

A 90-mg (0.106-mmol) sample of {[(2,6-i-PrPh)$_2$DABMe$_2$]PdCH$_2$CH$_2$CH$_2$C(O)OCH$_3$}$^+$SbF$_6^-$ was placed in a 600-mL stirred autoclave under nitrogen with 150 mL of deaerated water; to this was added 0.75 g (2.1 mmol) of cetyltrimethylammonium bromide cationic surfactant. This mixture was pressurized to 5.2 MPa with ethylene and was stirred for 66 hr at 23° C. The ethylene was vented; the product consisted of polymer suspended in a dark solution; this was filtered to give, after MeOH and acetone washing and air-drying, 0.13 g of amorphous polyethylene as a tacky, gray rubber powder. There was no polymer in the aqueous phase. H-1 NMR (CDCl$_3$) analysis: 96 CH$_3$'s per 1000 CH$_2$'s. Differential scanning calorimetry: glass transition: −58° C.; melting endotherms: 40°, 86°, 120° C. (total: 20 J/g). This example demonstrates the aqueous emulsion polymerization of ethylene in the presence of a cationic surfactant.

Example 217

An 87-mg (0.103-mmol) sample of {[(2,6-i-PrPh)$_2$DABMe$_2$]PdCH$_2$CH$_2$CH$_2$C(O)OCH$_3$}$^+$SbF$_6$− was placed in a 600-mL stirred autoclave under nitrogen. To this was added 100 mL of dry, deaerated methyl acrylate containing 100 ppm of phenothiazine as a free-radical polymerization inhibitor. The autoclave was stirred and pressurized to 300 psig with ethylene over 5 min. The autoclave was then pressurized to 600 psig with an additional 300 psig of carbon monoxide (300 psig E+300 psig CO=600 psig). The reaction was stirred for 20 hr at 23° C. as the autoclave pressure dropped to 270 psig. The ethylene was then vented; the autoclave contained a yellow solution which was concentrated by rotary evaporation, taken up in methylene chloride, filtered, and again concentrated to yield 0.18 g of dark brown viscous oil. The product was washed with hot acetone to remove the brown catalyst residues and was held under high vacuum to yield 55 mg of a colorless, viscous liquid terpolymer. The infrared spectrum exhibited carbonyl absorbances at 1743 (ester), 1712 (ketone), and 1691 cm$^{-1}$. H-1 NMR (CDCl$_3$) analysis: 76CH$_3$'s per 1000 CH$_2$; there were peaks at 2.3 (t, C$\underline{\text{H}}_2$COOR), 2.7 (m, C$\underline{\text{H}}_2$CO), and 3.66 ppm (COOC$\underline{\text{H}}_3$). The polymer contained 3.3 mol % MA (9.4 wt % MA). The carbon monoxide content was not quantified, but the absorbance in the infrared spectrum of the polymer due to ketone was about ½ to ⅔ the absorbance due to acrylate ester. This example demonstrates the use of carbon monoxide as a monomer.

Example 218

A 20-mg (0.035-mmol) sample of NiBr$_2$[2-NpCH=N(CH$_2$)$_3$N=CH-2-Np], where Np=naphthyl, (see structure below) was magnetically stirred under nitrogen in a 50-mL Schlenk flask with 25 mL of dry deaerated, toluene. Then 0.6 mL of polymethylalumoxane (3.3M) was injected; the light pink suspension became a dark gray-green solution, eventually with black precipitate. The mixture was immediately pressurized with ethylene to 7 psig and was stirred at 23° C. for 18 hr, during which time the mixture became a clear yellow solution with black, sticky precipitate. The ethylene was vented; the offgas contained about 3% butenes (90:10 1-butene: trans-2-butene) by gas chromatography (30-m Quadrex GSQ® Megabore column; 50–250° C. at 10°/min). The toluene solution was stirred with 6N HCl and methanol and was separated; concentration of the toluene solution followed by acetone rinsing the residue yielded 85 mg of liquid polyethylene. H-1 NMR (CDCl$_3$) analysis: 209 CH$_3$'s per 1000 CH$_2$'s. This example demonstrates the efficacy of a catalyst with a bis-imine ligand in which the imine groups are not alpha to one another.

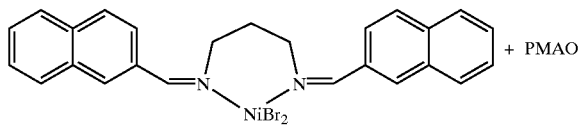

Example 219

A 17-mg (0.027-mmol) sample of [(2,6-i-PrPh)$_2$DABMe$_2$]ZrCl$_4$ was magnetically stirred under nitrogen in a 50-mL Schlenk flask with 25 mL of dry, deaerated toluene. Then 0.6 mL of polymethylalumoxane (3.3M) was injected; the yellow suspension became an orange-yellow solution. The mixture was pressurized with ethylene to 7 psig and was stirred at 23° C. for 20 hr, during which time polymer slowly accumulated on the stir bar and eventually rendered the solution unstirrable. The toluene solution was stirred with 6N HCl and methanol and was filtered to yield (after MeOH and acetone washing and air-drying) 1.01 g of white, fluffy polyethylene. Differential scanning calorimetry exhibited a melting point of 131° C. (124 J/g). This example demonstrates the efficacy of a Zr(IV) catalyst bearing a diimine ligand.

Example 220

A 14-mg (0.024-mmol) sample of [(2,6-i-PrPh)$_2$DABMe$_2$]TiCl$_4$ was magnetically stirred under nitrogen in a 50-mL Schlenk flask with 25 mL of dry, deaerated toluene (distilled from Na under N$_2$). Then 0.6 mL of polymethylalumoxane (3.3M) was injected; the yellow suspension became a dark brown suspension with some precipitate. The mixture was pressurized with ethylene to 7 psig and was stirred at 23° C. for 3 hr, during which time polymer accumulated and rendered the solution unstirrable. The toluene solution was stirred with 6N HCl and methanol and was filtered to yield, after MeOH and acetone washing and air-drying, 1.09 g of white, fluffy polyethylene. Differential scanning calorimetry exhibited a melting point of 131° C. (161 J/g). This example demonstrates the efficacy of a Ti(IV) catalyst bearing a diimine ligand.

Example 221

A 28-mg (0.046-mmol) sample of [(2,6-i-PrPh)$_2$DABMe$_2$]CoBr$_2$ was magnetically stirred under nitrogen in a 50-mL Schlenk flask with 25 mL of dry, deaerated toluene. Then 0.5 mL of polymethylalumoxane (3.3M) was injected, resulting in a deep purple solution, and the mixture was pressurized immediately with ethylene to 7 psig and stirred at 23° C. for 17 hr. The solution remained deep purple but developed some viscosity due to polymer. The ethylene was vented; the offgas contained 1.5% 1-butene by gas chromatography (30-m Quadrex GSQ® Megabore column; 50–250° C. at 100/min). The toluene solution was stirred with 6N HCl/methanol and was separated; concentration of the toluene solution yielded, after drying under high vacuum, 0.18 g of elastomeric polyethylene. A film of polymer cast from chlorobenzene was stretchy with good elastic recovery. Differential scanning calorimetry: glass transition: −41° C.; melting endotherm: 43° C. (15 J/g). This example demonstrates the efficacy of a cobalt (II) catalyst bearing a diimine ligand.

Example 222

A 35-mg (0.066-mmol) sample of [(2,6-i-PrPh)$_2$DABMe$_2$]FeCl$_2$ was magnetically stirred under nitrogen in a 50-mL Schlenk flask with 25 mL of dry, deaerated toluene. Then 0.6 mL of polymethylalumoxane (3.3M) was injected; the deep purple-blue solution became a royal purple solution, which evolved to deep green-black over time. The mixture was immediately pressurized with ethylene to 7 psig and was stirred at 23° C. for 70 hr, during which time the mixture became a pale green solution with black, sticky precipitate. The ethylene was vented; the toluene solution was stirred with 6N HCl and methanol and was filtered to yield 90 mg of polyethylene.

Differential scanning calorimetry: melting endotherm: 128° C. (84 J/g). This example demonstrates the efficacy of a iron (II) catalyst bearing a diimine ligand.

Example 223

A mixture of 3.2 g of the polyethylene product of Example 96, 60 mg (1.9 wt %) of dicumyl peroxide, and 50 g (1.6 wt %) of triallylisocyanurate (TAIC) was dissolved in 100 mL of THF. The polymer was precipitated by stirring the solution in a blender with water; the peroxide and TAIC are presumed to have stayed in the polymer. The polymer was. pressed into a clear, rubbery, stretchy film at 125° C. Strips of this film were subsequently pressed at various temperatures (100° C., 150° C., 175° C., 200° C.) for various times (1 min, 5 min, 10 min) to effect peroxide-induced free-radical crosslinking. The cured sheets were all clear and stretchy and shorter-breaking: 100° C. for 10 min gave no apparent cure, while 150° C./5 min seemed optimal. The cured films came closer to recovering their original dimensions than the uncured films. This example demonstrates peroxide curing of the amorphous elastomeric polyethylene.

Example 224

A 28-mg (0.050-mmol) sample of TiCl$_4$[2-NpCH=N(CH$_2$)$_2$N=CH-2-Np], where Np=naphthyl, (see structure below) was magnetically stirred under nitrogen in a 50-mL Schlenk flask with 25 mL of dry, deaerated toluene. Then 0.6 mL of polymethylalumoxane (3.3M) was injected; the orange suspension became reddish-brown. The mixture was immediately pressurized with ethylene to 7 psig and was stirred at 23° C. for 66 hr. The toluene solution was stirred with 6N HCl and methanol and was filtered to yield, after methanol washing and air-drying, 1.30 g of white, fluffy polyethylene.

Differential scanning calorimetry: melting endotherm: 135° C. (242 J/g).

This example demonstrates the efficacy of a catalyst with a bis-imine ligand in which the imine groups are not alpha to one another.

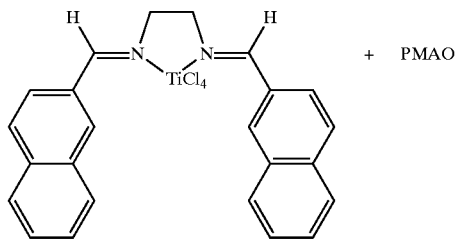

Example 225

A 33-mg (0.053-mmol) sample of [(2,6-i-PrPh)$_2$DABMe$_2$]ScCl$_3$·THF was magnetically stirred under nitrogen in a 50-mL Schlenk flask with 25 mL of dry, deaerated toluene. Then 0.6 mL of polymethylalumoxane (3.3M) was injected; the pale orange solution became bright yellow. The mixture was immediately pressurized with ethylene to 7 psig and was stirred at 23° C. for 17 hr, during which time the mixture remained yellow and granular suspended polymer appeared. The ethylene was vented; the toluene solution was stirred with 6N HCl and methanol and was filtered to yield 2.77 g of white, granular polyethylene. This example demonstrates the efficacy of a scandium (III) catalyst bearing a diimine ligand.

Example 226

(2-t-BuPh)2DABAN

This compound was made by a procedure similar to that of Example 25. Three mL (19.2 mmol) of 2-t-butylaniline and 1.71 g (9.39 mmol) of acenaphthenequinone were partially dissolved in 50 mL of methanol (acenaphthenequinone was not completely soluble). An orange product was crystallized from CH2Cl2 (3.51 g, 84.1%). 1H NMR (CDCl3, 250 MHz) d 7.85 (d, 2H, J=8.0 Hz, BIAN: Hp), 7.52 (m, 2H, Ar: Hm), 7.35 (dd, 2H, J=8.0, 7.3 Hz, BIAN: Hm), 7.21 (m, 4H, Ar: Hm and Hp), 6.92 (m, 2H, Ar: Ho), 6.81 (d, 2H, J=6.9 Hz, BIAN: Ho), 1.38 (s, 18H, C(CH3)3).

Example 227

Methyl vinyl ketone was stirred over anhydrous K$_2$CO$_3$ and vacuum transferred on a high vacuum line to a dry flask containing phenothiazine (50 ppm). Ethylene and methyl vinyl ketone (5 ml) were copolymerized according to Example 16 using catalyst {[(2,6-i-PrPh)$_2$DABMe$_2$]PdCH$_2$CH$_2$CH$_2$C(O)OCH$_3$}$^+$SbF$_6^-$ (0.084 g, 0.10 mmol) to give 0.46 g copolymer (0.38 g after correcting for catalyst residue). $^1$H-NMR (CDCl$_3$): 0.75–0.95 (m, CH$_3$); 0.95–1.45 (m, CH and CH$_2$); 1.55 (m, —CH$_2$CH$_2$C(O)CH$_3$); 2.15 (s, —CH$_2$CH$_2$C(O)CH$_3$); 2.4 (t, —CH$_2$CH$_2$C(O)CH$_3$). Based on the triplet at 2.15, it appears that much of the ketone functionality is located on the ends of hydrocarbon branches. Integration shows that the copolymer contains 2.1 mole % methyl vinyl ketone, and 94 methyl carbons (exclusive of methyl ketones) per 1000 methylene carbons. The turnover numbers are 128 equivalents of ethylene and 3 equivalents of methyl vinyl ketone per Pd. GPC (THF, PMMA standard): Mn=5360 Mw=7470 Mw/Mn=1.39.

Example 228

A Schlenk flask containing 122 mg (0.0946 mmol) of {[(4-MePh)$_2$DABMe$_2$]PdMe(N###CMe)}$^+$BAF$^-$ was placed under a CO atmosphere. The yellow powder turned orange upon addition of CO, and subsequent addition of 20 mL of CH$_2$Cl$_2$ resulted in the formation of a clear red solution. t-Butylstyrene (10 mL) was added next and the resulting orange solution was stirred for 25.7 h at room temperature. The solution was then added to methanol in order to precipitate the polymer, which was collected by filtration and dried in a vacuum oven at 50° C. overnight (yield=4.03 g): GPC Analysis (THF, polystyrene standards): M$_w$=8,212; M$_n$=4,603; PDI=1.78. The $^1$H NMR spectrum (CDCl$_3$, 400 MHz) of the isolated polymer was consistent with a mixture of copolymer and poly(t-butylstyrene).

Mixtures of alternating copolymer and poly(t-butylstyrene) were obtained from this and the following polymerizations and were separated by extraction of the homopolymer with petroleum ether. When R$^2$ and R$^5$ were 4-MePh (this example) atactic alternating copolymer was isolated. When R$^2$ and R$^5$ were 2,6-i-PrPh (Example 229) predominantly syndiotactic alternating copolymer was isolated. (Spectroscopic data for atactic, syndiotactic, and isotactic t-butylstyrene/CO alternating copolymers has been reported: M. Brookhart, et al., *J. Am. Chem. Soc.* 1992, 114, 5894–5895; M. Brookhart, et al., *J. Am. Chem. Soc.* 1994, 116, 3641–3642.)

Petroleum ether (~200 mL) was added to the polymer mixture in order to extract the homopolymer, and the resulting suspension was stirred vigorously for several h. The suspension was allowed to settle, and the petroleum ether solution was decanted off of the gray powder. The powder was dissolved in CH$_2$Cl$_2$ and the resulting solution was filtered through Celite. The CH$_2$Cl$_2$ was then removed and the light gray powder (0.61 g) was dried in vacuo. $^1$H and $^{13}$C NMR spectroscopic data are consistent with the isolation of atactic alternating copolymer: $^1$H NMR (CDCl$_3$, 300 MHz) δ 7.6–6.2 (br envelope, 4, H$_{aryl}$), 4.05 and 3.91 (br, 1, CHAr'), 3.12 and 2.62 (br, 2, CH$_2$), 1.26–1.22 (br envelope, 9, CMe$_3$); $^{13}$C NMR (CDCl$_3$, 75 MHz) δ 207.5–206.0 (br envelope, —C(O)—), 150.0–149.0 (br, Ar': C$_p$), 135.0–133.8 (br envelope, Ar': C$_{ipso}$) 127.9 (Ar': C$_m$), 126.0–125.0 (br, Ar': C$_o$), 53.0–51.0 (br envelope, CHAr'), 46.0–42.0 (br envelope, CH$_2$), 34.3 (CMe$_3$), 31.3 (CMe$_3$).

Example 229

The procedure of Example 228 was followed using 134 mg (0.102 mmol) {[(2,6-i-PrPh)$_2$DABMe$_2$]PdMe(N###CMe)}$^+$BAF$^-$. A mixture (2.47 g) of copolymer and poly(t-butylstyrene) was isolated. GPC Analysis (THF, polystyrene standards): M$_w$=10,135; M$_n$=4,922; PDI=2.06. Following the extraction of the homopolymer with petroleum ether, 0.49 g of off-white powder was isolated. $^1$H and $^{13}$C NMR spectroscopic data are consistent with the isolation of predominantly syndiotactic copolymer, although minor resonances are present: $^1$H NMR (CDCl$_3$, 300 MHz) δ 7.20

(d, 2, J=8.14, Ar': $H_o$ or $H_m$), 6.87 (d, 2, J=7.94, Ar': $H_o$ or $H_m$), 3.91 (dd, 1, J=9.06, 3.16, CHAr'), 3.15 (dd, 1, J=18.02, 9.96, CHH'), 2.65 (dd, 1, J=17.90, CHH'), 1.25 (s, 9, $CMe_3$); $^{13}C$ NMR ($CDCl_3$, 75 MHz) δ 207.0 (—C(O)—), 149.8 (Ar': $C_p$), 134.5 (Ar': $C_{ipso}$) 127.8 (Ar': $C_m$), 125.6 (Ar': $C_o$), 51.7 (CHAr'), 45.6 ($CH_2$), 34.3 ($CMe_3$), 31.3 ($CMe_3$).

Example 230

A Schlenk flask containing 74.3 mg (0.0508 mmol) of {[(2,6-i-PrPh)$_2$DABMe$_2$]PdMe(OEt$_2$)}$^+$BAF$^-$ was evacuated, cooled to -78° C. and then placed under an atmosphere of ethylene/CO (1:1 mixture). Following the addition of 50 mL of chlorobenzene, the reaction mixture was allowed to warm to room temperature and stirred. A small amount of white precipitate appeared on the sides of the flask after 0.5 h and more precipitate formed during the next two days. After stirring for 47.2 h, the reaction mixture was added to methanol and the resulting suspension was stirred. The precipitate was then allowed to settle, and the methanol was decanted, leaving behind a cream powder (0.68 g), which was dried in a vacuum oven at 70° C. for one day. $^1H$ and $^{13}C$ NMR spectroscopic data are consistent with the isolation of an alternating copolymer of ethylene and carbon monoxide: $^1H$ NMR ($CDCl_3$/pentafluorophenol, 400 MHz) δ 2.89 (—C(O)—$CH_2CH_2$–C(O)—); $^{13}C$ NMR ($CDCl_3$/pentafluorophenol, 100 MHz) δ 212.1 (—C(O)—), 35.94 ($CH_2$).

For comparisons of the spectroscopic data of alternating E/CO copolymers herein with literature values, see for example: E. Drent, et al., *J. Organomet. Chem.* 1991, 417, 235–251.

Example 231

A Schlenk flask containing 73.2 mg (0.0500 mmol) of {[(2,6-i-PrPh)$_2$DABMe$_2$]PdMe(OEt$_2$)}$^+$BAF$^-$ was evacuated, cooled to -78° C., and then back-filled with ethylene (1 atm). Chlorobenzene (50 mL) was added via syringe and the solution was allowed to warm to room temperature. After 0.5 h, the reaction vessel was very warm and ethylene was being rapidly consumed. The reaction flask was then placed in a room-temperature water bath and stirring was continued for a total of 3 h. A very viscous solution formed. The atmosphere was then switched to ethylene/carbon monoxide (1:1 mixture, 1 atm) and the reaction mixture was stirred for 47.7 more hours. During this time, the solution became slightly more viscous. The polymer was then precipitated by adding the chlorobenzene solution to methanol. The methanol was decanted off of the polymer, which was then partially dissolved in a mixture of $Et_2O$, $CH_2Cl_2$ and THF. The insoluble polymer fraction (2.71 g) was collected on a sintered glass frit, washed with chloroform, and then dried in a vacuum oven at 70° C. for 12 h. The NMR spectroscopic data of the gray rubbery material are consistent with the formation of a diblock of branched polyethylene and linear poly(ethylene-carbon monoxide): $^1H$ NMR ($CDCl_3$/pentafluorophenol, 400 MHz) δ 2.85 (—C(O)$CH_2CH_2$C(O)—), 2.77 (—C(O)$CH_2$, minor), 1.24 ($CH_2$), 0.83 ($CH_3$); Polyethylene Block Branching: ~103 $CH_3$ per 1000 $CH_2$; Relative Block Length [($CH_2$ $CH_2$)$_n$—(C(O)$CH_2CH_2$)$_m$]: n/m=2.0. $^{13}C$ NMR ($CDCl_3$/pentafluorophenol, 100 MHz; data for ethylene-CO block) δ 211.6 (—C(O)—), 211.5 (—C(O)—, minor), 35.9 (C(O)—$CH_2CH_2$—C(O)), 35.8 (C(O)$CH_2$, minor).

Example 232

A Schlenk flask containing 75.7 mg (0.0527 mmol) of {[(2,6-i-PrPh)$_2$DABH$_2$]PdMe(OEt$_2$)}$^+$BAF$^-$ was evacuated, cooled to -78° C., and then back-filled with ethylene (1 atm). Chlorobenzene (50 mL) was added via syringe, the solution was allowed to warm to room temperature and stirred for 3 h. The solution did not become warm or viscous during this time. The atmosphere was changed to ethylene/carbon monoxide (1:1 mixture, 1 atm) and the solution was stirred for 47.7 more hours. During this time, the reaction mixture became quite viscous and solvent-swollen polymer precipitated on the sides of the flask. The polymer was precipitated by addition of the reaction mixture to methanol. The methanol was decanted off of the rubbery polymer (4.17 g), which was then dried in a vacuum oven for one day at 70° C. Chloroform was then added to the polymer and the rubbery insoluble fraction (0.80 g) was collected on a sintered glass frit. A $^1H$ NMR spectrum ($CDCl_3$, 400 MHz) of the chloroform-soluble polymer showed no carbon monoxide incorporation; only branched polyethylene was observed. NMR spectroscopic data for the chloroform-insoluble fraction was consistent with the formation of a diblock of branched polyethylene and linear poly(ethylene-carbon monoxide): $^1H$ NMR ($CDCl_3$/pentafluorophenol, 400 MHz) δ 2.88 (C(O)$CH_2CH_2$C(O)), 1.23 ($CH_2$), 0.83 ($CH_3$); Polyethylene Block Branching: 132 $CH_3$ per 1000 $CH_2$; Relative Block Length[($CH_2CH_2$)$_n$—(C(O)$CH_2$ $CH_2$)$_m$]: n/m=0.30; $^{13}C$ NMR ($CD_2Cl_2$/pentafluorophenol, 100 MHz; data for ethylene-CO block) δ 211.3 (—C(O)—), 211.3 (—C(O)—, minor), 36.5 (—C(O)$CH_2CH_2$C(O)—), 36.4 (C(O)$CH_2$, minor).

Example 233

A 34-mg (0.053-mmol) sample of the crude product of Example 235, was magnetically stirred under nitrogen in a 50-mL Schlenk flask with 25 mL of dry, deaerated toluene. Then 0.6 mL of polymethylalumoxane (3.3M) was injected; the purple-pink suspension became a gold-green solution with black precipitate. The mixture was pressurized with ethylene to 152 kPa (absolute) and was stirred for 20 hr. Within the first hour, polymer was observed to be accumulating on the stir bar and the walls of the flask. The ethylene was vented and the toluene solution was stirred with 6N HCl and methanol and was filtered to yield (after MeOH and acetone washing and air-drying) 1.37 g of white, granular polyethylene. This example demonstrates the efficacy of a catalyst with a 1,3-diimine ligand.

Example 234

Synthesis of MeC(=N-2,6-$C_6H_3$-iPr$_2$)CH=C(NH-2,6-$C_6H_3$-iPr$_2$)Me

Concentrated HCl (0.3 ml, 3.6 mmol) was added to a solution of 2,4-pentanedione (1.2 g, 12 mmol) and 2,6-diisopropylaniline (5.0 ml, 26.6 mmol) in 15 ml ethanol. The reaction mixture was refluxed for 21 h during which time a white solid precipitated. This was separated by filtration, dried under vacuum and treated with saturated aqueous sodium bicarbonate. The product was extracted with methylene chloride, and the organic layer dried over anhydrous sodium sulfate. Removal of the solvent afforded 1.43 g (28%) of the title compound as a white crystalline product; mp: 140–142° C.; $^1H$ NMR: ($CDCl_3$) δ 12.12 (bs, 1H, NH), 7.12 (m, 6H, aromatic), 4.84 (s, 1H, C=CH—C), 3.10 (m, 4H, isopropyl CH, J=7 Hz), 1.72 (s, 6H, $CH_3$), 1.22 (d, 12H, isopropyl $CH_3$, J=7 Hz), 1.12 (d, 12H, isopropyl $CH_3$, J=7 Hz). $^{13}C$ NMR: ($CDCl_3$) δ 161.36 (C=N), 142.63 (aromatic C-1), 140.89 (aromatic C-2), 125.27 (aromatic C-4), 123.21 (aromatic C-3), 93.41 (—CH=), 28.43 (isopropyl CH), 24.49 (isopropyl $CH_3$), 23.44 (isopropyl $CH_3$), 21.02 ($CH_3$). MS: m/z=418.333 (calc. 418.335).

Example 235

Synthesis of an Ethylene Polymerization Catalyst From Ni(MeOCH$_2$CH$_2$OMe)Br$_2$ and MeC(=N-2,6-C$_6$H$_3$-iPr$_2$)CH=C(NH-2,6-C$_6$H$_3$-iPr$_2$)Me Ni(MeOCH$_2$CH$_2$OMe)Br$_2$ (0.110 g, 0.356 mmol) and MeC(=N-2,6-C$_6$H$_3$-iPr$_2$)CH=C(NH—C$_6$H$_3$-iPr$_2$)Me (0.150 g, 0.359 mmol) were combined in 10 mL of methylene chloride to give a peach-colored suspension. The reaction mixture was stirred at room temperature overnight, during which time a lavender-colored powder precipitated. This was isolated by filtration, washed with petroleum ether and dried affording 0.173 g of material. This compound was used as the catalyst in Example 233.

Example 236

{[(2,6-i-PrPh)$_2$DABMe$_2$]Pd(MeCN)$_2$}(BF$_4$)$_2$

[Pd(MeCN)$_4$](BF$_4$)$_2$ (0.423 g, 0.952 mmol) and (2,6-i-PrPh)$_2$DABMe$_2$ (0.385 g, 0.951 mmol) were dissolved in 30 mL acetonitrile under nitrogen to give an orange solution. The reaction mixture was stirred at room temperature overnight; it was then concentrated in vacuo to afford a yellow powder. Recrystallization from methylene chloride/petroleum ether at −40° C. afforded 0.63 g of the title compound as a yellow crystalline solid. 1H NMR (CD$_2$Cl$_2$) δ 7.51 (t, 2H, H$_{para}$), 7.34 (d, 4H, H$_{meta}$), 3.22 (sept, 4H, CHMe$_2$), 2.52 (s, 6H, N=CMe), 1.95 (s, 6H, NC≡Me), 1.49 (d, 12H, CHMe$_2$), 1.31 (d, 12H, CHMe$_2$).

Example 237

Ethylene Polymerization Catalyzed by {[(2,6-i-PrPh)$_2$DABMe$_2$]Pd(MeCN)$_2$}(BF$_4$)$_2$ A 100 mL autoclave was charged with a solution of {[(2,6-i-PrPh)$_2$DABMe$_2$]Pd(MeCN)$_2$}(BF$_4$)$_2$ (0.043 g, 0.056 mmol) dissolved in 50 mL chloroform and ethylene (2.8 MPa). The reaction mixture was stirred under 2.8 MPa ethylene for 9 h 15 min. During this time, the temperature inside the reactor increased from 23 to 27° C. The ethylene pressure was then vented and volatiles removed from the reaction mixture to afford 1.65 g of a viscous yellow oil. This was shown by $^1$H NMR to be branched polyethylene containing 94 methyl-ended branches per 1000 methylenes.

Example 238

Ethylene Polymerization by Ni(COD)$_2$/(2,6-i-PrPh)$_2$DABMe$_2$.HBAF(Et$_2$O)$_2$ Ni(COD)$_2$ (0.017 g, 0.06 mmol) and (2,6-i-PrPh)$_2$DABMe$_2$.HBAF(Et$_2$O)$_2$ (0.085 g, 0.06 mmol) were dissolved in 5 mL of benzene under nitrogen at room temperature. The resulting solution was quickly frozen, and then allowed to thaw under 6.9 MPa of ethylene at 50° C. The reaction mixture was agitated under these conditions for 18 h affording a solvent swelled polymer. Drying afforded 5.8 g of a polyethylene as a tough, rubbery material.

Example 239

Ethylene Polymerization by Pd$_2$(dba)$_3$ (dba=dibenzylideneacetone)/(2,6-i-PrPh)$_2$DABMe$_2$.HBAF(Et$_2$O)$_2$ A sample of (Et$_2$O).HBAF (200 mg, 0.20 mmol) was dissolved in 10 mL of Et$_2$O. To this solution was added 1 equivalent of DABMe$_2$ (or other α-diimine). The solution became red. Removal of the volatiles in vacuo gave a red solid of the acid-α-diimine complex.

Pd$_2$(dba)$_3$ (0.054 g, 0.06 mmol) and (2,6-i-PrPh)$_2$DABMe$_2$.HBAF(Et$_2$O)$_2$ (0.076 g, 0.05 mmol) were dissolved in 5 mL of benzene under nitrogen at room temperature. The resulting solution was agitated under 6.9 MPa of ethylene at 50° C. for 18 h. The product mixture was concentrated to dryness in vacuo, affording an extremely viscous oil. $^1$H NMR showed the product to be branched polyethylene containing 105 methyl ended branches per 1000 methylenes.

Example 240

Toluene (30 mL), 4-vinylcyclohexene (15 mL), and 20 mg of [(2,6-i-PrPh)$_2$DABH$_2$]NiBr$_2$ (0.03 mmol) were combined in a Schlenk flask under an atmosphere of ethylene. A 10% MAO solution (3 mL) in toluene was added. The resulting purple solution was stirred for 16 h. After only a few hours, polymer began to precipitate and adhere to the walls of the flask. The polymerization was quenched and the polymer precipitated from acetone. The polymer was dried in vacuo overnight resulting in 100 mg of a white solid. Characterization by proton NMR suggests in corporation of 4-vinylcyclohexene as a comonomer. $^1$H NMR (CDCl$_3$) δ 5.64 (m, vinyl, cyclohexene), 2.0–0.9 (overlapping m including cyclohexyl methylene, methylene (PE), methine), 0.78 (methyl, PE). There are also some minor signals in the base line that suggests incorporation of the internal olefin (cyclohexene) and free α-olefin (4-vinyl).

Example 241

The catalyst {[(2,6-i-PrPh)$_2$DABMe$_2$]PdCH$_2$CH$_2$CH$_2$C(O)OCH$_3$}SbF$^−$ (1.703 g, 2 mmol) was added to a 1 gal Hastalloy® autoclave. The autoclave was sealed, flushed with nitrogen and then charged with 1500 g of SO$_2$. An over pressure of 3.5 MPa of ethylene was maintained for 24 hr at 25° C. The autoclave was vented to relieve the pressure and the contents of the autoclave were transferred to a jar. The polymer was taken up in methylene chloride and purified by precipitation into excess acetone. The precipitated polymer was dried in vacuo to give 2.77 g of polymer. The polymer displayed strong bands attributable to sulfonyl group in the infrared (film on KBr plate) at 1160 and 1330 cm$^{−1}$.

Example 242

Copolymerizaton of Ethylene and Methyl Vinyl Ketone

Methyl vinyl ketone (MVK) was stirred over anhydrous K$_2$CO$_3$ and vacuum transferred using a high vacuum line to a dry flask containing phenothiazine (50 ppm). Ethylene and MVK (5 ml) were copolymerized using the procedure of Example 125 using as catalyst {[(2,6-i-PrPh)$_2$DABMe$_2$]PdCH$_2$CH$_2$CH$_2$C(O)OCH$_3$}SbF$_6^−$ (0.084 g, 0.10 mmol) to give 0.46 g of copolymer (0.38 g after correcting for catalyst residue). $^1$H NMR (CDCl$_3$): 0.75–0.95 (m, CH$_3$); 0.95–1.45 (m, CH and CH$_2$); 1.55 (m, —CH$_2$CH$_2$C(O)CH$_3$); 2.15 (s, —CH$_2$CH$_2$C(O)CH$_3$); 2.4 (t, —CH$_2$CH$_2$C(O)CH$_3$). Based on the triplet at 2.15, it appeared that much of the ketone functionality was located on the ends of the hydrocarbon branches. Integration showed that the copolymer contained 2.1 mole % MVK, and has 94 methyl carbon (exclusive of methyl ketones) per 1000 methyl carbon atoms. The turnover was 128 equivalents of ethylene and 3 equivalents of MVK per Pd. GPC (THF, PMMA standard): Mn=5360, Mw=7470, Mw/Mn=1.39.

Example 243

1-Hexene (20 ml) was polymerized in methylene chloride (10 ml) according to example 173 to give 4.22 g of viscous gel (1002 equivalents 1-hexene per Pd). Integration of the $^1$H NMR spectrum showed 95 methyl carbons per 1000 methylene carbons. $^{13}$C NMR quantitative analysis, branching per 1000 $CH_2$: Total methyls (103), Methyl (74.9), Ethyl(none detected), Propyl (none detected), Butyl (12.4), Amyl (none detected), ≧Hexyl and end of chains (18.1). Integration of the $CH_2$ peaks due to the structure —CH(R)$CH_2$CH(R')—, where R is an alkyl group, and R' is an alkyl group with two or more carbons showed that in 74% of these structures, R=Me.

Listed below are the $^{13}$C NMR data upon which the above analysis is based.

| $^{13}$C NMR data TCB, 140 C, 0.05M CrAcAc | | |
| --- | --- | --- |
| Freq ppm | Intensity | |
| 42.6359 | 4.05957 | αα for Me & Et$^+$ branches |
| 37.8987 | 9.10141 | $MB_3^+$ |
| 37.2833 | 64.4719 | $αB_1$ |
| 36.8537 | 8.67514 | |
| 35.5381 | 4.48108 | |
| 34.8803 | 4.30359 | |
| 34.5514 | 5.20522 | |
| 34.2755 | 21.6482 | |
| 33.2411 | 4.13499 | $MB_1$ |
| 32.9811 | 32.0944 | $MB_1$ |
| 31.9467 | 14.0714 | $3B_6+$, 3EOC |
| 30.7212 | 5.48503 | γ+γ+B, $3B_4$ |
| 30.2597 | 28.5961 | γ+γ+B, $3B_4$ |
| 30.143 | 50.4726 | γ+γ+B, $3B_4$ |
| 29.7717 | 248 | γ+γ+B, $3B_4$ |
| 29.342 | 17.4732 | γ+γ+B, $3B_4$ |
| 27.5702 | 27.2867 | βγ for 2 Me branches |
| 27.1935 | 49.5612 | βγ+B, ($4B_5$, etc.) |
| 27.045 | 23.1776 | |
| 23.0292 | 9.56673 | $2B_4$ |
| 22.6526 | 14.1631 | $2B_5^+$, 2EOC |
| 20.2495 | 5.72164 | $1B_1$ |
| 19.7455 | 48.8451 | $1B_1$ |
| 13.9049 | 21.5008 | $1B_4+$, 1EOC |

Example 244

1-Heptene (20 ml) was polymerized in methylene chloride (10 ml) according to example 173 to give 1.29 g of viscous gel (263 equivalents 1-heptene per Pd). Integration of the $^1$H NMR spectrum showed 82 methyl carbons per 1000 methylene carbons. $^{13}$C NMR quantitative analysis, branching per 1000 CH2: Total methyls (85), Methyl (58.5), Ethyl(none detected), Propyl (none detected), Butyl (none detected), Amyl (14.1), ≧Hexyl and end of chains (11.1). Integration of the $CH_2$ peaks due to the structure —CH(R)$CH_2$CH(R')—, where R is an alkyl group, and R' is an alkyl group with two or more carbons showed that in 71% of these structures, R=Me. DSC (two heats, -15→150° C., 15° C./min) shows Tg=-42° C. and a Tm=28° C. (45 J/g).

Listed below are the $^{13}$C NMR data upon which the above analysis is based.

| $^{13}$C NMR data TCB, 120 C, 0.05M CrAcAc | | |
| --- | --- | --- |
| Freq ppm | Intensity | |
| 42.6041 | 5.16375 | αα for Me & Et$^+$ |
| 37.851 | 15.9779 | $MB_3^+$ |
| 37.5963 | 7.67322 | |
| 37.2356 | 99.6734 | $αB_1$ |
| 35.4956 | 7.58713 | |
| 34.8219 | 6.32649 | |
| 34.6097 | 6.37695 | |
| 34.2278 | 37.6181 | |
| 33.3418 | 3.78275 | $MB_1$ |
| 32.9228 | 60.7999 | $MB_1$ |
| 32.2809 | 13.6249 | |
| 31.9148 | 21.2367 | $3B_6^+$, 3EOC |
| 30.5886 | 13.8482 | γ+γ+B, $3B_4$ |
| 30.4613 | 22.1996 | γ+γ+B, $3B_4$ |
| 30.2173 | 48.8725 | γ+γ+B, $3B_4$ |
| 30.1059 | 80.2189 | γ+γ+B, $3B_4$ |
| 29.7292 | 496 | γ+γ+B, $3B_4$ |
| 29.3049 | 26.4277 | γ+γ+B, $3B_4$ |
| 27.1511 | 114.228 | $βγ^+B_1$ ($4B_5$, etc.) |
| 27.0025 | 47.5199 | |
| 26.7267 | 20.4817 | |
| 24.5623 | 3.32234 | |
| 22.6207 | 36.4547 | $2B_5^+$, 2EOC |
| 20.2176 | 7.99554 | $1B_1$ |
| 19.7084 | 70.3654 | $1B_1$ |
| 13.8677 | 36.1098 | $1B_4^+$, EOC |

Example 245

1-Tetradecene (20 ml) was polymerized in methylene chloride (10 ml) according to example 173 to give 6.11 g of sticky solid (622 equivalents 1-tetradecene per Pd). Integration of the $^1$H NMR spectrum showed 64 methyl carbons per 1000 methylene carbons. $^{13}$C NMR quantitative analysis, branching per 1000 $CH_2$: Total methyls (66), Methyl (35.2), Ethyl(5.6), Propyl (1.2), Butyl (none detected), Amyl (2.1), ≧Hexyl and end of chains (22.8). Integration of the $CH_2$ peaks due to the structure —CH(R)$CH_2$CH(R')—, where R is an alkyl group, and R' is an alkyl group with two or more carbons showed that in 91% of these structures, R=Me. The region integrated for the structure where both R and R' are ≧Ethyl was 40.0 ppm to 41.9 ppm to avoid including a methine carbon interference.

Listed below are the $^{13}$C NMR data upon which the above analysis is based.

| $^{13}$C NMR data TCB, 120 C, 0.05M CrAcAc | | |
| --- | --- | --- |
| Freq ppm | Intensity | |
| 39.2826 | 6.684 | $MB_2$ |
| 37.8012 | 8.13042 | $MB_3^+$ |
| 37.2171 | 24.8352 | $αB_1$, $3B_3$ |
| 34.1694 | 31.5295 | $αγ^+B$, ($4B_4$, $5B_5$, etc.) $MB_1$ |
| 33.6809 | 13.0926 | $αγ^+B$, ($4B_4$, $5B_5$, etc.) $MB_1$ |
| 32.9004 | 13.0253 | $MB_1$ |
| 31.9022 | 25.0187 | $3B_6+$, 3EOC |
| 30.1978 | 42.5593 | γ+γ+B, $3B_4$ |
| 30.0969 | 34.1982 | γ+γ+B, $3B_4$ |
| 29.7252 | 248 | γ+γ+B, $3B_4$ |
| 29.3004 | 26.4627 | γ+γ+B, $3B_4$ |
| 27.1394 | 31.8895 | βγ+B, $2B_2$, ($4B_5$, etc.) |
| 26.9748 | 40.5922 | βγ+B, $2B_2$, ($4B_5$, etc.) |
| 26.3642 | 7.06865 | βγ+B, $2B_2$, ($4B_5$, etc.) |

-continued

| 13$_C$NMR data TCB, 120 C, 0.05M CrAcAc | | |
|---|---|---|
| Freq ppm | Intensity | |
| 22.6209 | 25.5043 | 2B$_5^+$, 2EOC |
| 19.6952 | 15.0868 | 1B$_1$ |
| 13.8759 | 24.9075 | 1B$_4$+, 1EOC |
| 10.929 | 7.63831 | 1B$_2$ |

Example 246

This example demonstrates copolymerization of ethylene and 1-octene to give polymer with mostly C6+ branches. Under nitrogen, [(2,6-i-PrPh)$_2$DABH$_2$]NiBr$_2$ (0.005 g, 0.0084 mmol) and 9.6 wt. % MAO in toluene (0.50 mL) were dissolved in 10 mL of toluene at room temperature. The resulting solution was immediately transferred to a 100 mL autoclave that had previously been flushed with nitrogen and evacuated. 1-Octene (40 mL, 255 mmol) was then added to the reactor, which was subsequently charged with ethylene (320 kPa). The reaction mixture was stirred for 60 min, during which time the temperature inside the reactor varied between 24 and 28° C. Ethylene was then vented, and the product polymer was precipitated by addition of the crude reaction mixture to 50 mL of methanol containing 5 mL of concentrated aqueous HCl. The polymer precipitated as a slightly viscous oil; this was removed by pipette and dried affording 3.03 g of amorphous ethylene/1-octene copolymer. Branching per 1000 CH$_2$ was quantified by $^{13}$C NMR (C$_6$D$_3$Cl$_3$, 25° C.): total Methyls (83.6), Methyl (4), Ethyl (1.6), Propyl (4.4), Butyl (5.6), Amyl (10.1), ≧Hex and end of chains (65.8), ≧Am and end of chains (69.3), ≧Bu and end of chains (73.7). GPC (trichlorobenzene vs. linear polyethylene): M$_w$=48,200, M$_n$=17,000. DSC: Tg=−63° C.

Example 247

This example demonstrates copolymerization of ethylene and 1-octene to give polymer with mostly methyl and C6+ branches. Under nitrogen, [(2,6-i-PrPh)$_2$DABH$_2$]NiBr$_2$ (0.005 g, 0.0084 mmol) and 9.6 wt. % MAO in toluene (0.50 mL) were dissolved in 40 mL of toluene at −40° C. The resulting solution was immediately transferred to a 100 mL autoclave that had previously been flushed with nitrogen and evacuated. 1-Octene (10 mL, 64 mmol) was then added to the reactor under 324 kPa of ethylene. The resulting reaction mixture was stirred under-324 kPa of ethylene for 1 h 10 min. During this time the temperature inside the reactor varied between 29 and 40° C. Ethylene was then vented, and the product polymer was precipitated by addition of the crude reaction mixture to methanol. The polymer was dried affording 6.45 g of ethylene/1-octene copolymer. Branching per 1000 CH$_2$ was quantified by $^{13}$C NMR (C$_6$D$_3$Cl$_3$, 25° C.): Total methyls (50.7), Methyl (13.7), Ethyl(2.4), Propyl (3.5), Butyl (4.1), Amyl (1), ≧Hex and end of chains (26), ≧Am and end of chains (30.4), ≧Bu and end of chains (31). GPC (trichlorobenzene vs. linear polyethylene): M$_w$=116,000, M$_n$=9,570.

Example 248

Under a nitrogen atmosphere, Ni(COD)$_2$ (0.017 g, 0.06 mmol) and (2,6-i-PrPh)$_2$DABMe$_2$ (0.024 g, 0.06 mmol) were dissolved in benzene (5.0 mL). To the resulting solution was added HBAF$^-$ (Et$_2$O)$_2$ (0.060 g, 0.06 mmol). The resulting solution was immediately frozen inside a 40 mL shaker tube glass insert. The glass insert was transferred to a shaker tube, and its contents allowed to thaw under an ethylene atmosphere. The reaction mixture was agitated under 6.9 MPa C$_2$H$_4$ for 17.5 h at ambient temperature. The final reaction mixture contained polyethylene, which was washed with methanol and dried; yield of polymer=9.2 g. $^1$H NMR (CDCl$_2$CDCl$_2$, 120° C.) showed that this sample contained 49 methyl-ended branches per 1000 methylenes. DSC: Tm=118.8° C., ΔH$_f$=87.0 J/g.

Example 249

Under a nitrogen atmosphere, Ni[P(O-2-C$_6$H$_4$—Me)$_3$]$_2$ (C$_2$H$_4$) (0.047 g, 0.06 mmol) and (2,6-i-PrPh)$_2$DABMe$_2$ (0.024 g, 0.06 mmol) were dissolved in benzene (5.0 mL). To the resulting solution was added HBAF.(Et$_2$O)$_2$ (0.060 g, 0.06 mmol). The resulting solution was immediately frozen inside a 40 mL shaker tube glass insert. The glass insert was transferred to a shaker tube, and its contents allowed to thaw under an ethylene atmosphere. The reaction mixture was agitated under 6.9 MPa C$_2$H$_4$ for 18 h at ambient temperature. The final reaction mixture contained polyethylene, which was washed with methanol and dried; yield of polymer=8.9 g. $^1$H NMR (CDCl$_2$CDCl$_2$, 120° C.) showed that this sample contained 47 methyl-ended branches per 1000 methylenes. DSC: Tm=112.1° C., ΔH$_f$=57.5 J/g.

Example 250

A 100 mL autoclave was charged with a solution of Pd$_2$(dba)$_3$ (dba=dibenzylideneacetone) (0.054 g, 0.059 mmol) in 40 mL of chloroform. A solution of (2,6-i-PrPh)$_2$DABMe$_2$·HBAF.(Et$_2$O)$_2$ (0.085 g, 0.059 mmol) (see Example 256) in 10 mL of chloroform was then added under 2.1 MPa of ethylene. The reaction mixture was stirred for 3 h. During this time the temperature inside the reactor varied between 24 and 40° C. Ethylene was then vented, and the product polymer was precipitated by addition of the crude reaction mixture to methanol. The polymer was dried affording 14.7 g of viscous polyethylene. $^1$H NMR (CDCl$_3$, 25° C.) of this material showed it to be branched polyethylene with 115 methyl-ended branches per 1000 methylenes. GPC analysis in trichlorobenzene gave M$_n$=97,300, M$_w$=225,000 vs. linear polyethylene.

Example 251

A 100 mL autoclave was charged with solid Pd(OAc)$_2$ (OAc=acetate) (0.027 g, 0.12 mmol) and (2,6-i-PrPh)$_2$DABMe$_2$ (0.049 g, 0.12 mmol). The reactor was flushed with nitrogen and evacuated. A solution of 54 wt. % HBF$_4$·Et$_2$O (0.098 g, 0.60 mmol) in 10 mL of chloroform was then added under 2.1 MPa of ethylene. The reaction mixture was stirred for 1.5 h. During this time, the temperature inside the reactor varied between 24 and 37° C. Ethylene was then vented, and the product polymer was precipitated by addition of the crude reaction mixture to methanol. The polymer was dried affording 4.00 g of viscous polyethylene. $^1$H NMR (CDCl$_3$, 25° C.) of this material showed it to be branched polyethylene with 100 methyl-ended branches per 1000 methylenes. GPC analysis in trichlorobenzene gave M$_n$=30,500, M$_w$=43,300 vs. linear polyethylene.

Example 252

(Note: It is believed that in the following experiment, adventitious oxygen was present and acted as a cocatalyst.) Under nitrogen, [(2.6-i-PrPh)$_2$ DAB An]Ni(COD) (0.006 g, 0.009 mmol) and 9.6 wt. % MAO in toluene (0.54 mL, 1.66 mmol) were dissolved in 50 mL of toluene. This mixture was then transferred to a 100 mL autoclave. The autoclave was then charged with 2.1 MPa of ethylene. The reaction mixture was stirred for 8 min. During this time, the temperature inside the reactor varied between 23 and 51° C. Ethylene pressure was then vented. The product polymer was washed with methanol and dried, affording 8.44 g of polyethylene. $^1$H NMR (CDCl$_2$, 120° C.) showed that this sample contained 77 methyl-ended branches per 1000 methylenes.

Example 253

Under nitrogen, [(2,4,6-MePh)DABAn]NiBr$_2$ (0.041 g, 0.065 mmol) was suspended in cyclopentene (43.95 g, 645 mmol). To this was added a 1 M solution of EtAlCl$_2$ in toluene (3.2 mL, 3.2 mmol). The resulting reaction mixture was transferred to an autoclave, and under 700 kPa of nitrogen heated to 60° C. The reaction mixture was stirred at 60° C. for 18 h; heating was then discontinued. When the reactor temperature had dropped to ~30° C., the reaction was quenched by addition of isopropanol. The resulting mixture was stirred under nitrogen for several minutes. The mixture was then added under air to a 5% aqueous HCl solution (200 mL). The precipitated product was filtered off, washed with acetone, and dried to afford 6.2 g of polycyclopentene as a white powder. DSC of this material showed a broad melting transition centered at approximately 190° C. and ending at approximately 250° C.; $\Delta H_f$=18 J/g. Thermal gravimetric analysis of this sample showed a weight loss starting at 184° C.: the sample lost 25% of its weight between 184 and 470° C., and the remaining material decomposed between 470 and 500° C.

Example 254

Under nitrogen, [(2,6-Me-4-BrPh)$_2$DABMe$_2$]NiBr$_2$ (0.010 g, 0.015 mmol) was suspended in cyclopentene (5.0 g, 73.4 mmol). To this was added a 1 M solution of EtAlCl$_2$ in toluene (0.75 mL, 0.75 mmol). The resulting reaction mixture was stirred at room temperature for 92 h, during which time polycyclopentene precipitated. The reaction was then quenched by addition of ~5 mL of methanol under nitrogen. Several drops of concentrated HCl was then added under air. The product was then filtered off, washed with more methanol followed by acetone, and dried to afford 1.31 g of polycyclopentene as a white powder. DSC of this material showed a broad melting transition centered at approximately 200° C. and ending at approximately 250° C.; $\Delta H_f$=49 J/g. Thermal gravimetric analysis of this sample showed a weight loss starting at ~477° C.; the sample completely decomposed between 477 and 507° C.

Example 255

Under nitrogen, [(2,6-i-PrPh)$_2$DABMe$_2$]NiBr$_2$ (0.008 g, 0.015 mmol) was suspended in cyclopentene (5.00 g, 73.4 mmol). To this was added a 1 M solution of EtAlCl$_2$ in toluene (0.75 mL, 0.75 mmol). A magnetic stirbar was added to the reaction mixture and it was stirred at room temperature; after 92 h at room temperature the reaction mixture could no longer be stirred due to precipitation of polycyclopentene solids. At this point the reaction was then quenched by addition of ~5 mL of methanol under nitrogen. Several drops of concentrated HCl was then added under air. The product was then filtered off, washed with more methanol followed by acetone, and dried to afford 2.75 g of polycyclopentene as a white powder. DSC of this material showed a broad melting transition centered at approximately 190° C. and ending at approximately 250° C.; $\Delta H_f$=34 J/g. Thermal gravimetric analysis of this sample showed a weight loss starting at ~480° C.; the sample completely decomposed between 480 and 508° C.

Example 256

HBAF (0.776 mmol) was dissolved in 5 ml of Et$_2$O. A second solution of 0.776 mmol of (2,6-i-PrPh)$_2$DABMe$_2$ in 3 ml of Et$_2$O was added. The reaction turned deep red-brown immediately. After stirring for 2 h the volatiles were removed in vacuo to give the protonated α-diimine salt which was a red crystalline solid.

Example 257

HBF$_4$ (0.5 mmol) was dissolved in 4 ml of Et$_2$O. A second solution of 0.5 mmol of (2,6-i-PrPh)$_2$DABMe$_2$ in ml of Et$_2$O was added. A color change to deep red occurred upon mixing. The reaction was stirred overnight. The volatiles were removed in vacuo to give to give the protonated α-diimine salt: which was an orange solid.

Example 258

HO$_3$SCF$_3$ (0.5 mmol) was dissolved in 4 ml of Et$_2$O. A second solution of 0.5 mmol of (2,6-i-PrPh)$_2$DABMe$_2$ in 3 ml of Et$_2$O was added. A color change to deep red occurred upon mixing after a few minutes an yellow-orange precipitate began to form. The reaction was stirred overnight. The product, believed to be the protonated α-diimine salt, was isolated by filtration rinsed with Et$_2$O and dried in vacuo.

Example 259

HBAF (0.478 mmol) was dissolved in 5 ml of Et$_2$O. A second solution of 0.776 mmol of [(2,6-i-PrPh)N=C(CH$_3$)]$_2$CH$_2$ in 3 ml of Et$_2$O was added. The reaction was stirred overnight. Removal of the volatiles in vacuo gave an off white solid, believed to be the protonated 1,3-diimine salt.

Example 260

HBF$_4$ (0.478 mmol) was dissolved in 5 ml of Et$_2$O. A second solution of 0.478 mmol of [(2,6-i-PrPh)N=C(CH$_3$)]$_2$CH$_2$ in 3 ml of Et$_2$O was added, the reaction turned cloudy with a white precipitate. The reaction was stirred overnight. The white solid, believed to be the protonated 1,3-diimine salt, was isolated by filtration rinsed with Et$_2$O and dried in vacuo.

Example 261

The product of Example 256 (78 mg) was dissolved in 20 ml of toluene. The reaction vessel was charged with 140 kPa (absolute) of ethylene. A solution of 10 mg Ni(COD)$_2$ in 3 ml of toluene was added. Ethylene was added (138 kPa pressure, absolute) and the polymerization was run for 24 h at ambient temperature. Precipitation with MeOH gave 157 mg of white spongy polyethylene.

Example 262

The product of Example 257 (27 mg) was dissolved in 20 ml of toluene. The reaction vessel was charged with 35 kPa of ethylene. A solution of 10 mg Ni(COD)$_2$ in 3 ml of toluene was added. Ethylene was added (138 kPa pressure, absolute) and the polymerization was run for 24 h at ambient temperature. Precipitation with MeOH gave 378 mg of sticky white polyethylene.

Example 263

The product of Example 258 (30 mg) was dissolved in 20 ml of toluene. The reaction vessel was charged with 140 kPa (absolute) of ethylene. A solution of 10 mg Ni(COD)$_2$ in 3 ml of toluene was added. Ethylene was added (138 kPa pressure, absolute) and the polymerization was run for 24 h at ambient temperature. Precipitation with MeOH gave 950 mg of amorphous polyethylene.

Example 264

To a burgundy slurry of 1 mmol of VCl$_3$.(THF)$_3$ in 10 ml of THF was added a yellow solution of 1 mmol of (2,6-i-PrPh)$_2$DABMe$_2$ in 4 ml of THF. After 10 minutes of stirring the reaction was a homogenous red solution. The solution was filtered to remove a few solids, concentrated and then cooled to −30° C. The red crystals that formed were isolated by filtration, rinsed with pentane and dried in vacuo. The yield was 185 mg.

Example 265

The product of Example 264 (6 mg) was dissolved in 20 ml of toluene. The resulting solution was placed under 140 kPa (absolute) of ethylene. PMAO solution (0.8 mL, 9.6 wt % Al in toluene) was added and the polymerization was stirred for 3 h. The reaction was halted by the addition of 10% HCl/MeOH. The precipitated polymer was isolated by filtration, washed with MeOH and dried in vacuo. The yield was 1.58 g of white polyethylene.

Example 266

Lanthanide metal tris-triflates (wherein the lanthanide metals were Y, La, Sm, Er, and Yb), 1 mmol, was slurried in 10 ml of CH$_2$Cl$_2$. A solution of 1 mmol of (2,6-i-PrPh)$_2$DABMe$_2$ in 3 ml of CH$_2$Cl$_2$ was added and the reaction stirred for 16 h at ambient temperature. The solution was filtered to give a clear filtrate. Removal of the solvent in vacuo gave light yellow to orange powders.

Example 267

Each of the various materials (0.02 mmol) prepared in Example 266 were dissolved in 20 ml of toluene. The resulting solutions were placed under 140 kPa (absolute) of ethylene. MMAO-3A solution (1.0 mL, 6.4 wt % Al in toluene) was added and the polymerizations were stirred for 3 h. The reactions were halted by the addition of 10% HCl/MeOH. The precipitated polymers were isolated by filtration washed with MeOH and dried in vacuo. Polymer yields are shown the following table,

| Lanthanide Metal | Yield (g) |
| --- | --- |
| Yb | 0.117 |
| La | 0.139 |
| Sm | 0.137 |
| Y | 0.139 |
| Er | 0.167 |

Example 268

[(2,6-i-PrPh)$_2$DABMe$_2$]Ni—O$_2$ (68 mg) was dissolved in 20 ml of toluene. The reaction vessel was placed under 138 kPa (absolute) of ethylene. PMAO (0.7 mL, 9.6 wt. % Al in toluene) was added and the polymerization was conducted for 16 h. The reaction was halted by the addition of 15 ml of 10% HCl/MeOH solution. The precipitated polymer was isolated by filtration and dried under vacuum to yield 1.67 g of rubbery polyethylene.

Example 269

[(2,6-i-PrPh)$_2$DABMe$_2$]Ni—O$_2$ (65 mg) was dissolved in 20 ml of toluene. The reaction vessel was placed under 138 kPa (absolute) of ethylene. PMAO (0.7 mL, 9.6 wt. % Al in toluene) was added and the polymerization was conducted for 16 h. The reaction was halted by the addition of 15 ml of 10% HCl/MeOH solution. The precipitated polymer was isolated by filtration and dried under vacuum to yield 1.9 g of rubbery polyethylene.

Example 270

[(2,6-i-PrPh)$_2$DABMe$_2$]CrCl$_2$.(THF) (15 mg) was dissolved in 20 ml of toluene. The reaction vessel was placed under 138 kPa (absolute) of ethylene. MMAO-3A (1 mL, 6.4 wt. % Al in toluene) was added and the polymerization was conducted for 3 h. The reaction was halted by the addition of 15 ml of 10% HCl/MeOH solution. The precipitated polymer was isolated by filtration and dried under vacuum to yield 694 mg of polyethylene. DSC (−150 to 250° C. at 10° C./min) results from the second heating were T$_m$ 129° C., ΔH$_f$ 204 J/g.

Example 271

[(2,6-i-PrPh)$_2$DABMe$_2$]CrCl$_3$ (14 mg), was dissolved in 20 ml of toluene. The reaction vessel was placed under 138 kPa (absolute) of ethylene. MMAO-3A (1 mL, 6.4 wt. % Al in toluene) was added and the polymerization was conducted for 3 h. The reaction was halted by the addition of 15 ml of 10% HCl/MeOH solution. The precipitated polymer was isolated by filtration and dried under vacuum to yield 833 mg of polyethylene. DSC (−150 to 250° C. at 10° C./min) results from the second heating were T$_m$ 133° C., ΔH$_f$ 211 J/g.

Example 272

[(2,6-i-PrPh)$_2$DABMe$_2$]CrCl$_2$.(THF) (14 mg) was dissolved in 20 ml of toluene. The reaction vessel was placed under 138 kPa (absolute) of ethylene. MMAO-3A (1 mL, 6.4 wt. % Al in toluene) was added and the polymerization was conducted for 3 h. The reaction was halted by the addition of 15 ml of 10% HCl/MeOH solution. The precipitated polymer was isolated by filtration and dried under vacuum to yield 316 mg of polyethylene. DSC results from the second heating were (−150 to 250° C. at 10° C./min) T$_m$ 133° C., ΔH$_f$ 107 J/g.

Example 273

[(2,6-i-PrPh)$_2$DABMe$_2$]CrCl$_3$ (15 mg) was dissolved in 20 ml of toluene. The reaction vessel was placed under 138 kPa (absolute) of ethylene. MMAO-3A (1 mL, 6.4 wt. % Al in toluene) was added and the polymerization was conducted for 3 h. The reaction was halted by the addition of 15 ml of 10% HCl/MeOH solution. The precipitated polymer was isolated by filtration and dried under vacuum to yield 605 mg of polyethylene. DSC (−150 to 250° C. at 10° C./min) results from the second heating were T$_m$ 134° C., ΔH$_f$ 157 J/g.

Example 274

A 61 mg sample of {[(2,6-i-PrPh)$_2$DABAn]Ni($\eta^3$-H$_2$CCHCHCl)]BAF was dissolved in 20 ml of toluene. The reaction vessel was placed under 138 kPa (absolute) of ethylene. PMAO (0.7 mL) was added and the reaction stirred for 16 h. The polymerization was quenched by the addition of 15 ml of 10% HCl/MeOH. The polymer was isolated by filtration, washed with acetone and dried. The yield was 2.24 g of rubbery polyethylene.

Example 275

A 65 mg sample of {[(2,4,6-MePh)$_2$DABAn]Ni($\eta^3$-H$_2$CCHCHCl)]}BAF was dissolved in 20 ml of toluene. The reaction vessel was placed under 138 kPa (absolute) of ethylene. PMAO (0.7 mL) was added and the reaction stirred for 16 h. The polymerization was quenched by the addition of 15 ml of 10% HCl/MeOH. The polymer was isolated by filtration, washed with. acetone and dried. The yield was 2.0 g of rubbery polyethylene.

Example 276

A 61 mg sample of {[(2,6-iPrPh)$_2$DABAn]Ni($\eta^3$-H$_2$CCHCH$_2$)}Cl was dissolved in 20 ml of toluene. The reaction vessel was placed under 138 kPa (absolute) of ethylene. PMAO (0.7 mL) was added and the reaction stirred for 16 h. The polymerization was quenched by the addition of 15 ml of 10% HCl/MeOH. The polymer was isolated by filtration, washed with acetone and dried. The yield was 1.83 g of rubbery polyethylene.

Example 277

A 60 mg sample of {[(2,6-iPrPh)$_2$DABMe$_2$]Ni($\eta^3$-H$_2$CCHCH$_2$)}Cl was dissolved in 20 ml of toluene. The reaction vessel was placed under 138 kPa (absolute) of ethylene. PMAO (0.7 mL) was added and the reaction stirred for 16 h. The polymerization was quenched by the addition of 15 ml of 10% HCl/MeOH. The polymer was isolated by filtration, washed with acetone and dried. The yield was 1.14 g of rubbery polyethylene.

Example 278

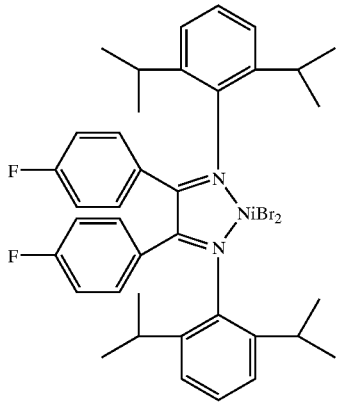

[(2,6-i-PrPh)$_2$DAB(4-F-Ph)$_2$]NiBr$_2$

In a 250-mL RB flask fitted with pressure equalizing addition funnel, thermometer, magnetic stirrer, and N$_2$ inlet was placed 0.75 g (3.0 mmol) of 4,4'-difluorobenzil, 13.8 mL (80 mmol) of 2,6-diisopropylaniline (DIPA), and 100 mL dry benzene. In the addition funnel was placed 50 mL of dry benzene and 2.0 mL (3.5 g; 18 mmol) of titanium tetrachloride. The reaction flask was cooled to 2° C. with ice and the TiCl$_4$ solution was added dropwise over 45 min, keeping the reaction temperature below 5° C. The ice bath was removed after addition was complete and the mixture was stirred at RT for 72 h. The reaction mixture was partitioned between water and ethyl ether, and the ether phase was rotovapped and the concentrated oil was washed with 800 mL 1N HCl to remove the excess diisopropylaniline. The mixture was extracted with 100 mL of ether, and the ether layer was washed with water and rotovapped. Addition of 15 mL hexane plus 30 mL of methanol to the concentrate resulted in the formation of fine yellow crystals which were filtered, methanol-washed, and dried under suction to yield 0.4 g of (2,6-i-PrPh)$_2$DAB(4-F-Ph)$_2$, mp: 155–158° C.

A 60-mg (0.092-mmol) sample of (2,6-i-PrPh)$_2$DAB(4-F-Ph)$_2$ was stirred under nitrogen with 32 mg (0.103 mmol) of nickel(II) dibromide-dimethoxyethane complex in 20 mL of methylene chloride for 66 h. The orange-brown solution was rotovapped and held under high vacuum for 2 h to yield 86 mg of red-brown solids. The solid product was scraped from the sides of the flask, stirred with 20 mL hexane, and allowed to settle. The yellow-orange hexane solution was pipetted off and the remaining solid was held under high vacuum to yield 48 mg of the orange-brown complex [(2,6-i-PrPh)$_2$DAB(4-F-Ph)$_2$]NiBr$_2$.

Example 279
Ethylene Polymerization With [(2,6-i-PrPh)$_2$DAB (4-F-Ph)$_2$]NiBr$_2$ A 26-mg (0.033-mmol) sample of [(2,6-i-PrPh)$_2$DAB(4-F-Ph)$_2$]NiBr$_2$ was magnetically stirred under nitrogen in a 50-mL Schlenk flask with 25 mL of dry toluene. Then 0.6 mL of polymethylalumoxane was injected, turning the orange-brown solution to a deep green-black solution. The mixture was pressurized immediately with ethylene to 152 kPa (absolute) and stirred at RT for 17 h. The reaction soon became warm to the touch; this heat evolution persisted for over an hour and the liquid volume in the Schlenk flask was observed to be slowly increasing. After 17 h, the reaction was still dark green-brown, but thicker and significantly (20%) increased in volume. The ethylene was vented; the offgas contained about 3% butenes (1-butene, 1.9%; t-2-butene, 0.6%; c-2-butene, 0.9%) by GC (30-m Quadrex GSQ Megabore column; 50–250° C. at 10°/min). The toluene solution was stirred with 6N HCl/methanol and was separated; the toluene was rotovapped and held under high vacuum to yield 9.53 g of low-melting polyethylene wax. There seemed to be significant low-boiling species present, probably low-mw ethylene oligomers, which continued to boil off under high vacuum. $^1$H NMR (CDCl$_3$; 60° C.) of the product showed a CH$_2$:CH$_3$ ratio of 206:17, which is 57 CH$_3$'s per 1000 CH$_2$'s. There were vinyl peaks at 5–5.8 ppm; if the end groups are considered to be vinyls rather than internal olefins, the degree of polymerization was about 34.

Example 280
Synthesis of [(2-CF$_3$Ph)$_2$DABMe$_2$]NiBr$_2$

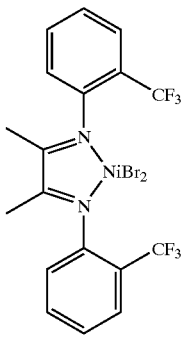

[(2-CF$_3$Ph)$_2$DABMe$_2$]NiBr$_2$

A mixture of 10.2 mL (13.1 g; 81.2 mmol) 2-aminobenzotrifluoride and 3.6 mL (3.5 g; 41 mmol) freshly-distilled 2,3-butanedione in 15 mL methanol containing 6 drops of 98% formic acid was stirred at 35° C. under nitrogen for 8 days. The reaction mixture was rotovapped and the resultant crystalline solids (1.3 g) were washed with carbon tetrachloride. The crystals were dissolved in chloroform; the solution was passed through a short alumina column and evaporated to yield 1.0 g of yellow crystals of the diimine (2-CF$_3$Ph)$_2$DABMe$_2$. $^1$H NMR analysis (CDCl$_3$): 2.12 ppm (s, 6H, CH$_3$); 6.77 (d, 2H, ArH, J=9 Hz); 7.20 (t, 2H, ArH, J=7 Hz); 7.53 (t, 2H, ArH, J=7 Hz); 7.68 (t, 2H, ArH, J=8 Hz). Infrared spectrum: 1706, 1651, 1603, 1579, 1319, 1110 cm$^{-1}$. Mp: 154–156° C.

A mixture of 0.207 g (0.56 mmol) of (2-CF$_3$Ph)$_2$DABMe$_2$ and 0.202 g (0.65 mmol) of nickel(II) dibromide-dimethoxyethane complex in 13 mL of methylene chloride was stirred at RT under nitrogen for 3 hr. The red-brown suspension was rotovapped and held under high vacuum to yield 0.3 g of [(2-CF$_3$Ph)$_2$DABMe$_2$]NiBr$_2$ complex.

Example 281

Ethylene Polymerization With [(2-CF$_3$Ph)$_2$DABMe$_2$]NiBr$_2$

A 13-mg (0.022-mmol) sample of [(2-CF$_3$Ph)$_2$DABMe$_2$]NiBr$_2$ was placed in a Parr® 600-mL stirred autoclave; 200 mL of dry, deaerated hexane (dried over molecular sieves) was added and the hexane was saturated with ethylene by pressurizing to 450 kPa (absolute) ethylene and venting. Then 1.0 mL of modified methylalumoxane (1.7M in heptane; contains about 30% isobutyl groups) was injected into the autoclave with stirring, and the autoclave was stirred for 1 hr under 690 kPa (absolute) ethylene as the temperature rose from 20° C. to 61° C. over the first 20 min and then slowly declined to 48° C. by the end of the run. The ethylene was vented and 3 mL of methanol was injected to stop polymerization; the autoclave contained a white suspension of fine particles of polyethylene; the appearance was like latex paint. The polymer suspension was added to methanol, and the polymer was stirred with MeOH/HCl to remove catalyst. The suspension was filtered and dried in a vacuum oven (75° C.) to yield 26.8 g of fine, white powdery polyethylene Differential scanning calorimetry (15° C./min): Tg −45° C.; mp 117° C. (75 J/g). GPC (trichlorobenzene, 135° C., polystyrene reference, results calculated as polyethylene using universal calibration theory): Mn=2,350; Mw=8,640; Mz=24,400; Mw/Mn=3.67. A solution of the polymer in chlorobenzene could be cast into a waxy film with little strength.

Example 282

Under nitrogen, Ni(COD)$_2$ (0.017 g, 0.062 mmol) and (2,4,6-MePh)$_2$DABAn (0.026 g, 0.062 mmol) were dissolved in 2.00 g of cyclopentene to give a purple solution. The solution was then exposed to air (oxygen) for several seconds. The resulting dark red-brown solution was then put back under nitrogen, and EtAlCl$_2$ (1 M solution in toluene, 3.0 mL, 3.0 mmol) added. A cranberry-red solution formed instantly. The reaction mixture was stirred at room temperature for 3 days, during which time polycyclopentene precipitated. The reaction was then quenched by the addition of methanol followed by several drops of concentrated HCl. The reaction mixture was filtered, and the product polymer washed with methanol and dried to afford 0.92 g of polycyclopentene as an off-white powder. Thermal gravimetric analysis of this sample showed a weight loss starting at 141° C.: the sample lost 18% of its weight between 141 and 470° C., and the remaining material decomposed between 470 and 496° C.

Example 283

Under a nitrogen atmosphere, Ni(COD)$_2$ (0.017 g, 0.06 mmol) and the ligand shown below (0.025 g, 0.06 mmol) were dissolved in benzene (5.0 mL). To the resulting solution was added HBAF.(Et$_2$O)$_2$ (0.060 g, 0.06 mmol). The resulting solution was immediately frozen inside a 40 mL shaker tube glass insert. The glass insert was transferred to a shaker tube, and its contents allowed to thaw under an ethylene atmosphere. The reaction mixture was agitated under 6.9 MPa C$_2$H$_4$ for 18 h at ambient temperature. The final reaction mixture contained polyethylene, which was washed with methanol and dried; yield of polymer=11.0 g.

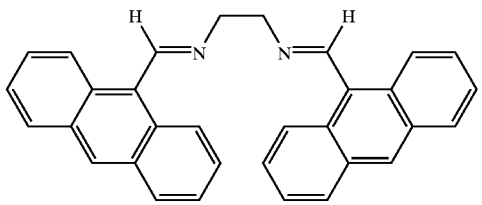

Example 284

The catalyst {[(2,6-i-PrPh)$_2$DABMe$_2$]PdCH$_2$CH$_2$CH$_2$C(O)OCH$_3$}$^+$SbF$_6^-$ (0.025 g, 0.03 mmol) and CH$_2$=CH(CH$_2$)$_6$C$_{10}$F$_{21}$ (4.74 g, 7.52 mmol) were dissolved in 20 mL CH$_2$Cl$_2$ in a Schlenk flask in a drybox. The flask was connected to a Schlenk line and the flask was then briefly evacuated and refilled with ethylene from the Schlenk line. This was stirred at RT under 1 atm of ethylene for 72 hr. Solvent was evaporated to almost dryness. Acetone (70 mL) was added and the mixture was stirred vigorously overnight. The upper layer was decanted. The resulting yellow solid was washed with 3×15 mL acetone, vacuum dried, and 1.15 g of product was obtained. $^1$H NMR analysis (CD$_2$Cl$_2$): 105 methyls per 1000 methylene carbons. Comparison of the integral of the CH$_2$R$_f$ (2.10 ppm) with the integrals of methyls (0.8–1.0 ppm) and methylenes (1.2–1.4 ppm) indicated a comonomer content of 6.9 mol %. The polymer exhibited a glass transition temperature of −55° C. (13 J/g) and a melting point of 57° C. by differential scanning calorimetry. Gel permeation chromatography (THF, polystyrene standard): Mw=39,500, Mn=34,400, P/D=1.15.

Example 285

In a 100 mL Schlenk flask, [(2,6-i-PrPh)$_2$DABAn]NiBr$_2$ (0.012 g, 0.017 mmol) and CH$_2$=CH(CH$_2$)$_6$C$_{10}$F$_{21}$ (4.62 g, 7.33 mmol) were dissolved in 32 mL of toluene under stirring. This was pressured with 1 atm ethylene and was allowed to stir at 0° C. for 15 minutes. MAO (1.7 mL, 8.9 wt % in toluene) was added. This was allowed to vigorously stir at RT for 30 min. Sixty mL methanol was then added. The white solid was filtered, followed by 3×30 ml 3:1 methanol/toluene wash, vacuum dried, and 3.24 g of white polymer was obtained. $^1$H NMR analysis (o-dichlorobenzene-d$_4$, 135° C.): 64 methyls, per 1000 methylene carbons. Comparison of the integral of the CH$_2$R$_f$ (2.37 ppm) with the integrals of methyls (1.1–1.2 ppm) and methylenes (1.4–1.8 ppm) indicated a comonomer content of 8.7 mol %. Mw=281,157, Mn=68,525, P/D=4.1.

Example 286

In a 100 mL Schlenk flask, [(2,6-i-PrPh)$_2$DABAn]NiBr$_2$ (0.012 g, 0.017 mmol) and CH$_2$=CH(CH$_2$)$_6$C$_{10}$F$_{21}$ (4.62 g, 7.33 mmol) were dissolved in 32 mL of toluene under stirring. This was allowed to stir at 0° C. for 15 minutes. MAO (1.7 mL, 8.9 wt % in toluene) was added. This was allowed to stir at 0° C. for 2.5 h and then RT for 3 h. Methanol (200 mL) was then added, followed by 1 mL conc. HCl. The white solid was filtered and washed with methanol, vacuum dried, and 0.79 g of white solid polymer was obtained. By differential scanning calorimetry, Tm 85° C. (22 J/g)

Example 287

{[(2,6-i-PrPh)$_2$DABMe$_2$]PdCH$_2$CH$_2$CH$_2$C(O)OCH$_3$}$^+$ SbF$^-$ (0.0205 g, 0.024 mmol) and CH$_2$=CH(CH$_2$)$_4$(CF$_2$)$_4$O(CF$_2$)$_2$SO$_2$F (3.5 g, 7.26 mmol) were dissolved in 18 mL CH$_2$Cl$_2$ in a Schlenk flask in a drybox. The flask was connected to a Schlenk line and the flask was then briefly evacuated and refilled with ethylene from the Schlenk line. This was stirred at RT under 1 atm of ethylene for 72 hr. Solvent was evaporated after filtration. The viscous oil was dissolved in 10 mL CH$_2$Cl$_2$, followed by addition of 100 mL methanol. The upper layer was decanted. The reverse precipitation was repeated two more time, followed by vacuum drying to yield 3.68 g of a light yellow viscous oil. $^1$H NMR analysis (CDCl$_3$): 89 methyls per 1000 methylene carbons. Comparison of the integral of the CH$_2$CF$_2$— (2.02 ppm) with the integrals of methyls (0.8–1.0 ppm) and methylenes (1.1–1.4 ppm) indicated a comonomer content of 8.5 mol %. $^{19}$F NMR (CDCl$_3$): 45.27 ppm, —SO$_2$F; –82.56 ppm, –83.66 ppm, –112.82 ppm, –115.34 ppm, –124.45 ppm, –125.85 ppm, CF$_2$ peaks. The polymer exhibited a glass transition temperature of –57° C. by differential scanning calorimetry. Gel permeation chromatography (THF, polystyrene standard): Mw=120,000, Mn=78,900, P/D=1.54. The turnover numbers for ethylene and the comonomer are 2098 and 195, respectively.

Example 288

In a 100 mL Schlenk flask, [(2,6-i-PrPh)$_2$DABAn]NiBr$_2$ (0.017 g, 0.024 mmol) and CH$_2$=CH(CH$_2$)$_4$(CF$_2$)$_4$O(CF$_2$)$_2$SO$_2$F (5.0 g, 10 mmol) were dissolved in 25 mL of toluene under stirring. MAO (2.3 mL, 8.9 wt % in toluene) was added. This was allowed to stir at RT for 15 hr. Sixty mL methanol was then added, followed by 1 mL conc. HCl. The upper layer was decanted, residue washed with methanol (5×5 mL), vacuum dried, and 1.20 g of a white viscous oil was obtained. $^{19}$F NMR (Hexafluorobenzene, 80° C.): 45.20 ppm, —SO$_2$F; –81.99 ppm, –82.97 ppm, –112.00 ppm, –114.36 ppm, –123.60 ppm, –124.88 ppm, CF$_2$ peaks.

Example 289

In a Schlenk flask, [(2,6-i-PrPh)$_2$DABAn]NiBr$_2$ (0.012 g, 0.017 mmol) and CH$_2$=CH(CH$_2$)$_4$(CF$_2$)$_4$O(CF$_2$)$_2$SO$_2$F (3.26 g, 6.77 mmol) were dissolved in 35 mL of toluene under stirring. This was pressured with 1 atm ethylene and was allowed to stir at 0° C. for 15 minutes. MAO (1.7 mL, 8.9 wt % in toluene) was added. This was allowed to vigorously stir at RT for 45 minutes. Methanol (140 mL) was then added, followed by addition of 1 mL of conc. HCl. The white solid was filtered, followed by methanol wash, vacuum dried to obtain 2.76 g of a white rubbery polymer. $^1$H NMR analysis (o-dichlorobenzene-d$_4$, 100° C.): 98 methyls per 1000 methylene carbons. Comparison of the integral of the —CH$_2$CF$_2$— (2.02 ppm) with the integrals of methyls (0.8–1.0 ppm) and methylenes (1.1–1.4 ppm) indicated a comonomer content of 3.5 mol %. $^{19}$F NMR ((O-dichlorobenzene-d$_4$): 45.19 ppm, —SO$_2$F; –82.70 ppm, –83.72 ppm, –112.96 ppm, –115.09 ppm, –124.37 ppm, –125.83 ppm, CF$_2$ peaks. The polymer exhibited Tm of 97° C. by differential scanning calorimetry. Mw=156,000, Mn=90,000, P/D=1.73.

Example 290

{[(2,6-i-PrPh)$_2$DABMe$_2$]PdCH$_2$CH$_2$CH$_2$C(O)OCH$_3$}$^+$ SbF$_6^-$ (0.030 g, 0.035 mmol) and CH$_2$=CH(CH$_2$)$_4$(CF$_2$)$_2$CO$_2$Et (3.0 g, 11.7 mmol) were dissolved in 20 mL CH$_2$Cl$_2$ in a Schlenk flask in a drybox. The flask was connected to a Schlenk line and the flask was then briefly evacuated and refilled with ethylene from the Schlenk line. This was stirred at RT under 1 atm of ethylene for 72 h. Solvent was evaporated. The viscous oil was dissolved in 10 mL acetone, followed by addition of 60 mL methanol. The mixture was centrifuged. The upper layer was decanted. The oil was dissolved in 10 mL acetone followed by addition of 60 mL methanol. The mixture was centrifuged again. The viscous oil was collected, and vacuum dried to obtain 1.50 g of a light yellow viscous oil. $^1$H NMR analysis (CDCl$_3$): 67 methyls per 1000 methylene carbons. Comparison of the integral of the CH$_2$CF$_2$— (2.02 ppm) with the integrals of methyls (0.8–1.0 ppm) and methylenes (1.1–1.4 ppm) indicated a comonomer content of 11 mol %. The polymer exhibited a Tg of –61° C. by DSC. GPC (THF, polystyrene standard): Mw=73,800, Mn=50,500, P/D=1.46.

Example 291

In a Schlenk flask, [(2,6-i-PrPh)$_2$DABAn]NiBr$_2$ (0.019 g, 0.026 mmol) and CH$_2$=CH(CH$_2$)$_4$(CF$_2$)$_2$CO$_2$Et (3.0 g, 11.7 mmol) were dissolved in 35 mL of toluene. This was placed under 1 atm of ethylene at 0° C. for 15 minutes. MAO (2.6 mL, 8.9 wt % in toluene) was added. This was allowed to vigorously stir at 0° C. for 30 minutes. Methanol (120 mL) was then added, followed by 1 mL conc. HCl. The solid was filtered, washed with methanol and hexane, and vacuum dried to yield 1.21 g of a white rubbery solid. $^1$H NMR analysis (TCE-d$_2$, 110° C.): Comparison of the integral of the CH$_2$CF$_2$— (2.06 ppm) with the integrals of methyls (0.8–1.0 ppm) and methylenes (1.1–1.4 ppm) indicated a comonomer content of 6.0 mol %. The polymer exhibited a Tg of –46° C. and Tm's at 40° C. and 82° C. by DSC.

Example 292

In a Schlenk flask, [(2,6-i-PrPh)$_2$DABAn]NiBr$_2$ (0.022 g, 0.030 mmol) and CH$_2$=CH(CH$_2$)$_4$(CF$_2$)$_2$CO$_2$Et (3.5 g, 13.7 mmol) were dissolved in 30 mL of toluene. This was placed under nitrogen at 0° C. for 15 minutes. MAO (3.0 mL, 8.9 wt % in toluene) was added. This was allowed to stir at 0° C. for 2.5 h and then RT for 6. h. Fifty mL methanol was then added, followed by 1 mL conc. HCl. The mixture was washed with 3×60 mL water. The organic layer was isolated and dried by using Na$_2$SO$_4$. Evaporation of toluene and addition of hexane resulted in precipitation of an oil. The oil was washed with hexane another two times, and vacuum dried to yield 0.16 g of a yellow oil. Mw=35,600, Mn=14,400, P/D=2.47.

Example 293

{[(2,6-i-PrPh)$_2$DABMe$_2$]PdCH$_2$CH$_2$CH$_2$C(O)OCH$_3$}$^+$ SbF$_6^-$ (0.0848 g, 0.1 mmol) and CH$_2$=CH(CH$_2$)$_4$(CF$_2$)$_2$O(CF$_2$)$_2$SO$_2$F (11.5 g, 0.03 mol) were dissolved in 72 mL CH$_2$Cl$_2$ in a Schlenk flask in a drybox. The flask was connected to a Schlenk line and the flask was then briefly evacuated and refilled with ethylene from the Schlenk line.

This was stirred at RT under 1 atm of ethylene for 72 hr. The solution was filtered through Celite and then concentrated to 70 mL. Methanol (400 mL) was added under stirring. The upper layer was decanted. The oil was redissolved in 70 mL $CH_2Cl_2$ followed by addition of 350 mL methanol. The viscous oil was collected, vacuum dried and 24.1 g of a light yellow viscous oil was obtained. $^1$H NMR analysis ($CDCl_3$): 113 methyls per 1000 methylene carbons. Comparison of the integral of the $CH_2CF_2$— (2.0 ppm) with the integrals of methyls (0.8–1.0 ppm) and methylenes (1.1–1.4 ppm) indicated a comonomer content of 2.9 mol %. The polymer exhibited a Tg of –66° C. by DSC. GPC (THF, polystyrene standard): Mw=186,000, Mn=90,500, P/D=2.06. The turnover numbers for ethylene and the comonomer are 6,122 and 183, respectively.

Examples 294–300

All of these Examples were done under 1 atm ethylene with a MA concentration of 1.2M and {[(diimine)PdMe($Et_2O$)]$^+$SbF$_6^-$) concentration of 0.0022M at RT for 72 hr. Results are shown in the Table below.

| Ex. No. | Diimine | MA (mol %)* | Mn | P/D |
|---|---|---|---|---|
| 294 | (2,6-i-PrPh)$_2$DABMe$_2$ | 6 | 12,300 | 1.8 |
| 295 | (2,6-EtPh)$_2$DABMe$_2$ | 16 | 7,430 | 1.9 |
| 296 | (2,4,6-MePh)$_2$DABMe$_2$ | 23 | 2,840 | 2.1 |
| 297 | (2,4,6-MePh)$_2$DABAn | 37 | 1,390 | 1.4 |
| 298 | (2,4,6-MePh)$_2$DABH$_2$ | 46 | 1,090 | 3.1 |
| 299 | (2-i-PrPh)$_2$DABMe$_2$ | 17 | 410 | ** |
| 300 | (2-MePh)$_2$DABMe$_2$ | 29 | 320 | ** |

*In the polymer
**Mn characterized by $^1$H NMR.

Example 301

{[(2,6-EtPh)$_2$DABMe$_2$]PdCH$_3$(Et$_2$O)}$^+$SbF$_6^-$ (0.0778 g, 0.10 mmol) and methyl acrylate (4.78 g, 0.056 mol) were dissolved in 40 mL $CH_2Cl_2$ in a Schlenk flask in a drybox. The flask was connected to a Schlenk line and the flask was then briefly evacuated and refilled with ethylene from the Schlenk line. This was stirred at RT under 1 atm of ethylene for 72 h. The mixture was filtered through silica gel, solvent was evaporated and then vacuum dried, and 1.92 g light of a yellow viscous oil was obtained. $^1$H NMR analysis ($CDCl_3$): 69 methyls per 1000 methylene carbons. Comparison of the integral of the methyl on the ester groups (2.3 ppm) with the integrals of carbon chain methyls (0.8–1.0 ppm) and methylenes (1.1–1.4 ppm) indicated a comonomer content of 16 mol %. The polymer exhibited a Tg of –68° C. by DSC. GPC (THF, polystyrene standard): Mw=14,300, Mn=7,430, P/D=1.93.

Example 302

{[(2,6-i-PrPh)$_2$DABMe$_2$]PdCH$_2$CH$_2$CH$_2$C(O)OCH$_3$}$^+$ SbF$_6^-$ (0.254 g, 0.30 mmol) and CH$_2$=CHCO$_2$CH$_2$(CF$_2$)$_6$CF$_3$ (90.2 g, 0.20 mol) were dissolved in 150 mL $CH_2Cl_2$ in a flask in the drybox. The flask was connected to a Schlenk line and the flask was then briefly evacuated and refilled with ethylene from the Schlenk line. This was stirred at RT under 1 atm of ethylene for 24 h. The solution was decanted to 1200 mL methanol, resulted formation of oil at the bottom of the flask. The upper layer was decanted, oil dissolved in 150 mL $CH_2Cl_2$, followed by addition of 1200 mL of methanol. The upper layer was decanted, oil dissolved in 600 mL hexane and filtered through Celite®. Solvent was evaporated, and then vacuum dried, yielding 54.7 g of a viscous oil. $^1$H NMR analysis ($CDCl_3$): 99 methyls per 1000 methylene carbons. Comparison of the integral of the $CH_2CF_2$— (4.56 ppm) with the integrals of methyls (0.8–1.0 ppm) and methylenes (1.1–1.4 ppm) indicated a comonomer content of 5.5 mol %. The polymer exhibited a Tg of –49° C. by DSC. Mw=131,000, Mn=81,800.

Example 303

{[(2,6-i-PrPh)$_2$DABMe$_2$]PdCH$_2$CH$_2$CH$_2$C(O)OCH$_3$}$^+$ SbF$_6^-$ (0.169 g, 0.20 mmol) and β-hydroxyethyl acrylate (6.67 g, 0.057 mol) were dissolved in 40 mL $CH_2Cl_2$ in a flask in the drybox. The flask was connected to a Schlenk line and the flask was then briefly evacuated and refilled with ethylene from the Schlenk line. This was stirred at RT under 1 atm of ethylene for 45 h. Solvent was evaporated. The residue was dissolved in 100 mL hexane, followed by addition of 400 mL methanol. Upon standing overnight, a second upper layer formed and was decanted. The oil was dissolved in 60 mL THF, followed by addition of 300 mL water. The upper layer was decanted. The residue was dissolved in 100 mL 1:1 $CH_2Cl_2$/hexane. This was filtered through Celite®. The solvent was evaporated, vacuum dried and 16.13 g of a light yellow oil was obtained. $^1$H NMR analysis ($CD_2Cl_2$): 142 methyls per 1000 methylene carbons. Comparison of the integral of the $CH_2CO_2$— (2.30 ppm) with the integrals of methyls (0.8–1.0 ppm) and methylenes (1.1–1.4 ppm) indicated a comonomer content of 2.6 mol %. Mw=53,100, Mn=37,900, P/D=1.40.

Example 304

{[(2,6-i-PrPh)$_2$DABMe]PdCH$_2$CH$_2$CH$_2$C(O)OCH$_3$}$^+$ SbF$_6^-$ (0.169 g, 0.20 mmol) and hydroxypropyl acrylate (7.52 g, 0.058 mol) were dissolved in 40 mL $CH_2Cl_2$ in a flask in the drybox. The flask was connected to a Schlenk line and the flask was then briefly evacuated and refilled with ethylene from the Schlenk line. This was stirred at RT under 1 atm of ethylene for 72 h. Solvent was evaporated. Eighty mL methanol was added to dissolve the residue, followed by 250 mL water. The upper layer was decanted. The reverse precipitation was repeated one more time. The oil was isolated, vacuum dried, and 1.1 g of a light yellow oil was obtained. $^1$H NMR analysis ($CD_2Cl_2$): 94 methyls per 100.0 methylene carbons. Comparison of the integral of the $CH_2CO_2$— (2.30 ppm) with the integrals of methyls (0.8–1.0 ppm) and methylenes (1.1–1.4 ppm) indicated a comonomer content of 6.5 mol %. Mw=39,200, Mn=28,400, P/D=1.38.

Example 305

The complex [(2,4,6-MePh)$_2$DABAn]NiBr$_2$ was weighed into a glass vial in the dry box (0.0141 g, 0.025 mmol). Cyclopentene was added (3.41 g, 2,000 equivalents/Ni). A solution of MMAO (Akzo Nobel MMAO-3A, modified methylaluminoxane, 25% isobutyl groups in place of methyl groups) was added while stirring (0.75 ml, 1.7 M Al in heptane, 50 equivalents/Ni). Following addition of the MMAO, the solution was homogeneous. After stirring for several hours, solid polymer started to precipitate. After stirring for 46 hours, the solution was filtered and the solids were washed several times on the filter with pentane. The polymer was dried in vacuo for 12 hours at room temperature to yield 0.66 g polymer (388 turnovers/Ni). The polymer was pressed at 292° C. to give a transparent, light gray, tough film. DSC (25 to 300° C., 15° C./min, second heat): Tg=104° C., Tm (onset)=210° C., Tm (end)=285° C., Heat of fusion=14 J/g. X-ray powder diffraction shows peaks at d-spacings 5.12, 4.60, 4.20, 3.67, and 2.22. Error! Reference source not found. $^1$H NMR (500 MHz, 155° C., d$_4$-o-dichlorobenzene, referenced to downfield peak of solvent= 7.280 ppm): 0.923 (bs, 1.0H, —CHC$\underline{H}_2$CH—); 1.332 (bs, 2.0H, —CHC$\underline{H}_2$C$\underline{H}_2$CH—); 1.759 (bs, 4.0H, —CHC$\underline{H}_2$C$\underline{H}_2$CH— and —C$\underline{H}$CH$_2$CH$_2$C$\underline{H}$—); 1.947 (bs, 1.0H, —CHC$\underline{H}_2$CH—). The assignments are based upon relative integrals and $^1$H-$^{13}$C correlations determined by 2D NMR. This spectrum is consistent with an addition polymer with cis-1,3 enchainment of the cyclopentene.

Example 306

Cyclopentene was polymerized by [(2,4,6-MePh)$_2$DABMe$_2$]PdMeCl and MMAO according to Example 305 to give 0.37 g polymer (217 turnovers/Pd). The polymer was pressed at 250° C. to give a transparent, light brown, tough film. DSC (25 to 300° C., 15° C./min, second heat): Tg=84° C., Tm(onset)=175° C., Tm (end) =255° C., Heat of fusion= 14 J/g. $^1$H NMR (400 MHz, 120° C, d$_4$-o-dichlorobenzene, referenced to downfield peak of solvent=7.280 ppm): 0.90 (bs, 1H, —CHC$\underline{H}_2$CH—); 1.32 (bs, 2H, —CHC$\underline{H}_2$C$\underline{H}_2$CH—); 1.72, 1.76 (bs, bs 4H, —CHC$\underline{H}_2$C$\underline{H}_2$CH— and —C$\underline{H}$CH$_2$CH$_2$C$\underline{H}$—); 1.94 (bs, 1H, —CHC$\underline{H}_2$CH—). The assignments are based upon relative integrals and $^1$H-$^{13}$C correlations determined by 2D NMR. This spectrum is consistent with an addition polymer with cis-1,3 enchainment of the cyclopentene.

Example 307

Cyclopentene was polymerized by [(2,6-EtPh)$_2$DABMe$_2$] PdMeCl and MMAO according to Example 305 to give 0.39 g polymer (229 turnovers/Pd). The polymer was pressed at 250° C. to give a transparent, light brown, tough film. DSC (25 to 300° C., 15° C./min, second heat): Tg=88° C., Tm(onset)=175° C., Tm (end)=255° C., Heat of fusion=16 J/g. $^1$H NMR (300 MHz, 120° C., d$_4$-o-dichlorobenzene) is very similar to the spectrum of Example 306.

Example 308

Cyclopentene was polymerized by [(2,4,6-MePh)$_2$DABMe$_2$]NiBr$_2$ and MMAO according to Example 305 to give 0.36 g polymer (211 turnovers/Ni). The polymer was pressed at 250° C. to give a transparent, colorless, tough film. DSC (25 to 300° C., 15° C./min, second heat) Tg=98° C., Tm(onset)=160° C., Tm (end)=260° C., Heat of fusion= 22 J/g. $^1$H NMR (500 MHz, 120° C., d$_4$-o-dichlorobenzene) is very similar to the spectrum of Example 306. X-ray powder diffraction shows the same crystalline phase as observed in Example 305.

Example 309

Cyclopentene was polymerized by [(2,6-i-PrPh)$_2$DABMe$_2$]PdMeCl and MMAO according to Example 305 to give 0.73 g of fine powder (429 turnovers/Pd). The polymer was pressed at 250° C. to give a transparent, light brown tough film. DSC (25 to 300° C., 15° C./min, second heat): Tg=96° C., Tm(onset)=175° C., Tm (end)=250° C., Heat of fusion=14 J/g. $^1$H NMR (400 MHz, 120° C., d$_4$-o-dichlorobenzene) is very similar to the spectrum of Example 306. X-ray powder diffraction shows the same crystalline phase as observed in Example 305.

Example 310

Cyclopentene was polymerized by [(2,6-i-PrPh)$_2$DABMe$_2$]PdCl$_2$ and MMAO according to Example 305 to give 0.856 g polymer (503 turnovers/Pd). The polymer was pressed at 250° C. to give a transparent, light brown, tough film. DSC (25 to 300° C., 15° C./min, second heat): Tg=104° C., Tm(onset)=140° C., Tm (end)=245° C., heat of fusion= 19 J/g. $^1$H NMR (400 MHz, 120° C., d$_4$-o-dichlorobenzene) is very similar to the spectrum of Example 306.

Example 311

Cyclopentene was polymerized by [(2,6-EtPh)$_2$DABMe$_2$] NiBr$_2$ and MMAO according to Example 305 to give 0.076 g polymer (45 turnovers/Ni). $^1$H NMR (400 MHz, 120° C., d$_4$-o-dichlorobenzene) is very similar to the spectrum of Example 306.

Example 312

Cyclopentene was polymerized by [(2,4,6-MePh)$_2$DABH$_2$]NiBr$_2$ and MMAO according to Example 305 to give 0.66 g polymer (388 turnovers/Ni). The polymer was pressed at 292° C. to give a tough film. $^1$H NMR (400 MHz, 120° C., d$_4$-o-dichlorobenzene) is very similar to the spectrum of Example 306. A DSC thermal fractionation experiment was done in which a sample was heated to 330° C. at 20° C./minute followed by stepwise isothermal equilibration at the followed temperatures (times): 280° C. (6 hours), 270° C. (6 hours), 260° C. (6 hours), 250° C. (6 hours), 240° C. (4 hours), 230° C. (4 hours), 220° C. (4 hours), 210° C. (4 hours), 200° C. (3 hours), 190° C. (3 hours), 180° C. (3 hours), 170° C. (3 hours), 160° C. (3 hours), 150° C. (3 hours). The DSC of this sample was then recorded from 0° C. –330° C. at 10° C./min. Tg=98° C., Tm (onset)=185° C., Tm (end)=310° C., Heat of fusion=35 J/g.

Example 313

Cyclopentene was polymerized by [(2-PhPh)$_2$DABMe$_2$] NiBr$_2$ and MMAO according to Example 305 to give 1.24 g polymer (728 turnovers/Ni). The polymer was pressed at 292° C. to give a transparent, light gray, brittle film. DSC (25 to 320° C., 10° C./min, second heat): Tm(onset)=160° C., Tm (end)=285° C., Heat of fusion=33 J/g. $^1$H NMR (400 MHz, 120° C., d$_4$-o-dichlorobenzene) is very similar to the spectrum of Example 306. Several peaks attributed to cyclopentenyl end groups were observed in the range 5.2–5.7 ppm. Integration of these peaks was used to calculate M$_n$=2130. IR (pressed film, cm$^{-1}$): 3050 (vw, olefinic end group, CH stretch), 1615(vw, olefinic end group, cis-CH=CH— double bond stretch), 1463(vs), 1445(vs), 1362 (s), 1332(s), 1306(s), 1253(m), 1128(w), 1041(w), 935(m), 895(w), 882(w), 792(w), 721(w, olefinic end group, cis—CH=CH—, CH bend). GPC (Dissolved in 1,2,4-trichlorobenzene at 150° C., run at 100° C. in tetrachloroethylene, polystyrene calibration): Peak MW=13,900; M$_n$=10,300; M$_w$=17,600; M$_w$/M$_n$=1.70.

Example 314

The complex [(2,4,6-MePh)$_2$DABAn]NiBr$_2$ was weighed into a glass vial in the dry box (0.032 g, 0.050 mmol). Toluene (2.35 ml ) and cyclopentene (6.81 g, 2,000 equivalents/Ni) were added, followed by C$_6$H$_5$NHMe$_2$$^+$B (C$_6$F$_5$)$_4$$^-$ (0.04 g, 50 equivalents/Ni). A solution of Et$_3$Al was added while stirring (2.5 ml, 1 M in heptane, 50 equivalents/Ni). After stirring for 46 hours, the solution was filtered and the solids were washed several times on the filter with pentane. The polymer was dried in vacuo for 12 hours at room temperature to yield 0.16 g of fine powder (47 turnovers/Ni). A control experiment with no C$_6$H$_5$NHMe$_2$$^+$ B(C$_6$F$_5$)$_4$$^-$ gave no polymer.

Example 315

The complex [(2,4,6-MePh)$_2$DABAn]NiBr$_2$ was weighed into a glass vial in the dry box (0.032 g, 0.050 mmol). Toluene (3.46 ml) and cyclopentene (6.81 g, 2,000 equivalents/Ni) were added. A solution of Et$_2$AlCl was added while stirring (1.39 ml, 1.8 M in toluene, 50 equivalents/Ni). After stirring for 46 hours, the solution was filtered and the solids were washed several times on the filter with pentane. The polymer was dried in vacuo for 12 hours at room temperature to yield 0.53 g of fine powder (156 turnovers/Ni).

Example 316

The complex [(2,4,6-MePh)$_2$DABMe$_2$]NiBr$_2$ was weighed into a glass vial in the dry box (0.0070 g, 0.0130 mmol). Pentane (2.2 ml) and cyclopentene (10.0 g, 11,300 equivalents/Ni) were added. A solution of EtAlCl$_2$ was added while stirring (0.73 ml, 1.0 M in hexanes, 56 equivalents/Ni). After stirring for 192 hours, the solution was filtered and the solids were washed several times on the filter with pentane. The polymer was dried in vacuo for 12 hours at room temperature to yield 2.66 g of fine powder (3010 turnovers/Ni). The polymer was mixed with 200 ml of MeOH in a blender at high speed to produce a fine powder. The solid was collected by filtration and then mixed for 1 hour with 39 ml of a 1:1 mixture of MeOH/concentrated aqueous HCl. The solid was collected by filtration, washed with distilled water, and then washed on the filter 3× with 20 ml of a 2 wt. % solution of Irganox® 1010 in acetone. The polymer was dried in vacuo for 12 hours at room temperature. DSC (25 to 300° C., 10° C./min, controlled cool at 10° C./min, second heat): Tg=98° C., Tm(onset)=160° C., Tm (end)=240° C., Heat of fusion=17 J/g. TGA(air, 10° C./min) T(onset of loss)=330° C. T(10% loss)=450° C. $^{13}$C NMR (500 MHz $^1$H frequency, 3.1 ml of 1,2,4-trichlorobenzene, 0.060 g Cr(acac)$_3$, 120° C.): 30.640 (s, 2C), 38.364 (s, 1C), 46.528 (s, 2C). This spectrum is consistent with an addition polymer of cyclopentene with cis-1,3-enchainment. A sample of the polymer was melted in a Schlenk tube under a nitrogen atmosphere. Fibers were drawn from the molten polymer using a stainless steel cannula with a bent tip. A nitrogen purge was maintained during the fiber drawing. The fibers were tough and could be drawn about 2× by pulling against a metal surface heated to 125° C.

Example 317

The complex [(2,4,6-MePh)$_2$DABAn]NiBr$_2$ was weighed into a glass vial in the dry box (0.0093 g, 0.0146 mmol). Cyclopentene (10.0 g, 10,000 equivalents/Ni) was added. A solution of EtAlCl$_2$ was added while stirring (0.73 ml, 1.0 M in hexanes, 50 equivalents/Ni). After stirring for 168 hours, the solution was filtered and the solids were washed several times on the filter with pentane. The polymer was dried in vacuo for 12 hours at room temperature to yield 4.66 g of fine powder (4660 turnovers/Ni). The polymer was mixed with 200 ml of MeOH in a blender at high speed to produce a fine powder. The solid was collected by filtration and then mixed for 1 hour with 39 ml of a 1:1 mixture of MeOH/ concentrated aqueous HCl. The solid was collected by filtration, washed with distilled water, and then washed on the filter 3× with 20 ml of a 2 wt. % solution of Irganox 1010 in acetone. The polymer was dried in vacuo for 12 hours at room temperature. DSC (25 to 350° C., 15° C./min, second heat): Tg=97° C., Tm(onset)=160° C., Tm (end)=285° C., Heat of fusion=25 J/g. $^{13}$C NMR (500 MHz $^1$H frequency, 3.1 ml of 1,2,4-trichlorobenzene, 0.060 g Cr(acac)$_3$, 120° C.): 30.604 (s, 2C), 38.333 (s, 1C), 46.492 (s, 2C). This spectrum is consistent with an addition polymer of cyclopentene with cis-1,3-enchainment. A sample of the polymer was melted in a Schlenk tube under a nitrogen atmosphere. Fibers were drawn from the molten polymer using a stainless steel cannula with a bent tip. A nitrogen purge was maintained during the fiber drawing. The fibers were tough and could be drawn about 2× by pulling against a metal surface heated to 125° C. GPC (Dissolved in 1,2,4-trichlorobenzene at 150° C., run at 100° C. in tetrachloroethylene, polystyrene calibration): Peak MW=137,000; $M_n$=73,000; $M_w$=298,000; $M_w/M_n$=4.08.

Example 318

The complex {[(2,6-i-PrPh)$_2$DABMe$_2$]PdMe(Et$_2$O)}$^+$SbF$_6^-$ (0.05 g, 0.060 mmol) was added to 10.0 g of stirring cyclopentene. Solid polymer formed rapidly and precipitated. The polymer was isolated by filtration, washed on the filter 3× with pentane, and dried in vacuo at room temperature to give 1.148 g finely divided powder (282 turnovers/Pd). DSC (25 to 350° C., 15° C./min, first heat): Tm(onset)= 175° C., Tm (end)=245° C., Heat of fusion=16 J/g.

Example 319

The complex {[(2,6-i-PrPh)$_2$DABMe$_2$]PdCH$_2$CH$_2$CH$_2$C(O)OCH$_3$}$^+$SbF$_6^-$ (0.05 g, 0.059 mmol) was added to 10.0 g of stirring cyclopentene. The complex is not very soluble in cyclopentene. The amount of solids increased slowly. After 27 days, the solid polymer was isolated by filtration, washed on the filter 3× with pentane, and dried in vacuo at room temperature to give 1.171 g finely divided powder (292 turnovers/Pd). DSC (25 to 350° C., 15° C./min, first heat): Tm(onset)=170° C., Tm (end)=255° C., Heat of fusion=24 J/g.

Example 320

The complex [(2,6-i-PrPh)$_2$DABMe$_2$]NiBr$_2$ was weighed into a glass vial in the dry box (0.025 g, 0.040 mmol). Cyclopentene (10.0 g, 1,000 equivalents/Ni) was added. A solution of MMAO was added while stirring (0.802 ml, 2.5 M in heptane, 50 equivalents/Ni). After stirring for 5 minutes, the mixture was rusty brown and still contained some solids. An additional 50 equivalents of MMAO were added and the solution became homogeneous. After 12 hours, the mixture was filtered and the solids were washed several times on the filter with pentane. The polymer was dried in vacuo for 12 hours at room temperature to yield 0.238 g of fine powder (87 turnovers/Ni). DSC (25 to 350° C., 15° C./min, second heat): Tm(onset)=170° C., Tm (end)=265° C., Heat of fusion=18 J/g.

Example 321

The complex [(2,4,6-MePh)$_2$DABAn]NiBr$_2$ was weighed into a glass vial in the dry box (0.0093 g, 0.0146 mmol). Cyclopentene (10.0 g, 10,000 equivalents/Ni) and anhydrous methylene chloride (48.5 ml) were added. A solution of EtAlCl$_2$ was added while stirring (2.92 ml, 1.0 M in toluene, 200 equivalents/Ni). After stirring for 163 hours, the solution was filtered and the solids were washed several times on the filter with pentane. The polymer was dried in vacuo for 12 hours at room temperature to yield 1.64 g of fine powder (1640 turnovers/Ni). A DSC thermal fractionation experiment was done according to the procedure of Example 312. A DSC was then recorded from 0° C. to 330° C. at 10° C./min. Tg=92° C., Tm (onset)=150° C., Tm (end)=250° C., Heat of fusion=11.4 J/g.

Example 322

The complex [(2,4,6-MePh)$_2$DABAn]NiBr$_2$ was weighed into a glass vial in the dry box (0.0093 g, 0.0146 mmol). Cyclopentene (10.0 g, 10,000 equivalents/Ni) was added. A solution of i-BuAlCl$_2$ was added while stirring (2.92 ml, 1.0 M in toluene, 200 equivalents/Ni). After stirring for 163 hours, the solution was filtered and the solids were washed several times on the filter with pentane. The polymer was dried in vacuo for 12 hours at room temperature to yield 1.99 g of fine powder (1990 turnovers/Ni). The polymer was pressed at 292° C. to give a transparent, light gray, tough film. A DSC thermal fractionation experiment was done according to the procedure of Example 312. A DSC was then recorded from 0° C. to 330° C. at 10° C./min. Tg=103° C., Tm (onset)=150° C., Tm (end)=290° C., Heat of fusion=27 J/g.

Example 323

The complex [(2,4,6-MePh)$_2$DABAn]NiBr$_2$ was weighed into a glass vial in the dry box (0.0932 g, 0.146 mmol). Cyclopentene (5.0 g, 500 equivalents/Ni) and toluene (6.54 ml) were added. A solution of PMAO (Akzo Nobel Polymethylaluminoxane) was added while stirring (3.16 ml, 2.32 M Al in toluene, 50 equivalents/Ni). After stirring for 163 hours, the solution was filtered and the solids were washed several times on the filter with pentane. The polymer was dried in vacuo for 12 hours at room temperature to yield 3.64 g of fine powder (364 turnovers/Ni). The polymer was pressed at 292° C. to give a brown film that seemed tough, but failed along a straight line when it broke. A DSC thermal fractionation experiment was done according to the procedure of Example 312 was then recorded from 0° C. to 330° C. at 10° C./min. Tg=100° C., Tm (onset)=150° C., Tm (end)=270° C., Heat of fusion=21 J/g.

Example 324

A mixture of 20 mg (0.032 mmol) of NiBr$_2$[(2,6-i-PrPh)$_2$DABMe$_2$] was magnetically-stirred under nitrogen in a 50-mL Schlenk flask with 15 mL of dry, deaerated toluene as 0.6 mL of 3M poly(methylaluminoxane) was injected via syringe. The mixture became deep blue-black. Then 2.5 mL (14 mmol) of beta-citronellene, (CH$_3$)$_2$C=CHCH$_2$CH$_2$CH(CH$_3$)CH=CH$_2$, was injected and the mixture was immediately pressurized with ethylene at 190 kPa (absolute) and was stirred at 23° C. for 17 h; by the end of 17 h, the solution was too thick to stir. The ethylene was vented and the toluene solution was stirred with 6N HCl and methanol and was decanted. The polymer was stirred with refluxing methanol for an hour to extract solvent; oven-drying yielded 0.90 g of rubbery polyethylene. $^1$H NMR (CDCl$_3$) showed a CH$_2$:CH$_3$ ratio of 83:12, which is 101 CH$_3$'s per 1000 CH$_2$'s; there were small peaks for the beta-citronellene isopropylidene dimethyls (1.60 and 1.68 ppm), as well as a tiny peak for vinyl H (5.0 ppm); diene incorporation was estimated at 0.7 mol %. Differential scanning calorimetry: −51° C. (Tg). GPC data (trichlorobenzene, 135° C.; PE standard): Mn=23,200; Mw=79,200; Mz=154,000; Mw/Mn=3.42.

Example 325

A 15-mg (0.024-mmol) sample of NiBr$_2$[(2,6-i-PrPh)$_2$DABMe$_2$] was magnetically stirred under nitrogen in a 50-mL Schlenk flask with 25 mL of dry, deaerated toluene and 5 mL (27 mmol) of dry, deaerated 1,9-decadiene. Then 0.6 mL of polymethylalumoxane (1.7M MAO in heptane; contains about 30% isobutyl groups) was injected; the tan suspension did not change color. The mixture was pressurized with ethylene to 190 kPa (absolute) and was stirred for 1 hr; it began to grow green-gray and darker in color, so 0.6 mL more MAO was added, after which the mixture soon turned deep green-black. The reaction was stirred for 16 hr and the ethylene was then vented; by this time the solution had become thick and unstirrable. The mixture was stirred with refluxing 6N HCl and methanol, and the polymer was washed with methanol, pressed free of solvent, and dried under high vacuum to yield 1.0 g of rubbery polyethylene. The polymer was insoluble in hot dichlorobenzene, demonstrating incorporation of the diene.

Example 326

A 21-mg (0.034-mmol) sample of NiBr$_2$[(2,6-i-PrPh)$_2$DABMe$_2$] was magnetically stirred under nitrogen in a 50-mL Schlenk flask with 25 mL of dry, deaerated toluene. Then 0.6 mL of 2.9M polymethylalumoxane was injected; the red-brown suspension became deep green. The mixture was purged with ethylene and then 2.0 mL (1.4 g; 15 mmol) of 2-methyl-1,5-hexadiene was added; the mixture was pressurized with ethylene to 190 kPa and was stirred for 18 h; the solution became brown. The ethylene was vented and the toluene solution was stirred with 6N HCl and methanol and was separated; rotary evaporation of the toluene layer yielded, after acetone washing to remove catalyst, 47 mg of viscous liquid polymer. $^1$H NMR (CDCl$_3$) showed a CH$_2$:CH$_3$ ratio of 82:15, which is 130 CH$_3$'s per 1000 CH$_2$'s. There were also peaks for the incorporated diene at 1.72 ppm (0.5H; C$\underline{H}_3$—C=CH$_2$)) and 4.68 ppm (0.3H; CH$_3$—C=C$\underline{H}_2$)) and no evidence of terminal vinyl (—CH=CH$_2$; 4.95 and 5.80 ppm) from unincorporated diene. The level of diene incorporation was about 0.7 mol %.

Example 327

A 30-mg (0.049-mmol) sample of NiBr$_2$[(2,6-i-PrPh)$_2$DABMe$_2$] was magnetically stirred under nitrogen in a 50-mL Schlenk flask with 25 mL of dry, deaerated toluene. Then 1.0 mL of methylalumoxane (1.7M in heptane; contains about 30% isobutyl groups) was injected; the red-brown suspension became deep green. The mixture was saturated with ethylene and then 0.5 mL (0.38 g; 3.0 mmol) of 2-methyl-2,7-octadiene was added; the mixture was pressurized with ethylene to 190 kPa (absolute) and was stirred for 18 h; the solution became brown. The ethylene was vented and the toluene solution was stirred with 6N HCl and methanol and was separated; rotary evaporation of the toluene yielded, after acetone washing to remove catalyst, 0.15 g of viscous liquid polymer. $^1$H NMR (CDCl$_3$) showed a CH$_2$:CH$_3$ ratio of 81.5:13.5, which is 117 CH$_3$'s per 1000 CH$_2$'s. The level of diene incorporation was about 0.5–0.1 mol %, judging from the diene isopropylidene methyls at 1.60 and 1.69 ppm.

Examples 328–335

Acrylate Chelate Complexes. The chelate complexes for these examples were generated in situ for NMR studies by the reaction of [(ArN=C(R)—C(R)=NAr)PdMe(OEt$_2$)] BAF with H$_2$C=CHC(O)OR' and on a preparative scale by the reaction of NaBAF with (ArN=C(R)—C(R)=NAr)PdMeCl and H$_2$C=CHC(O)OR' (vide infra). In these examples, the following labeling scheme is used to identify the different chelate complexes that were observed and/or isolated. Assignments of all $^1$H NMR chelate resonances were confirmed by homonuclear decoupling experiments.

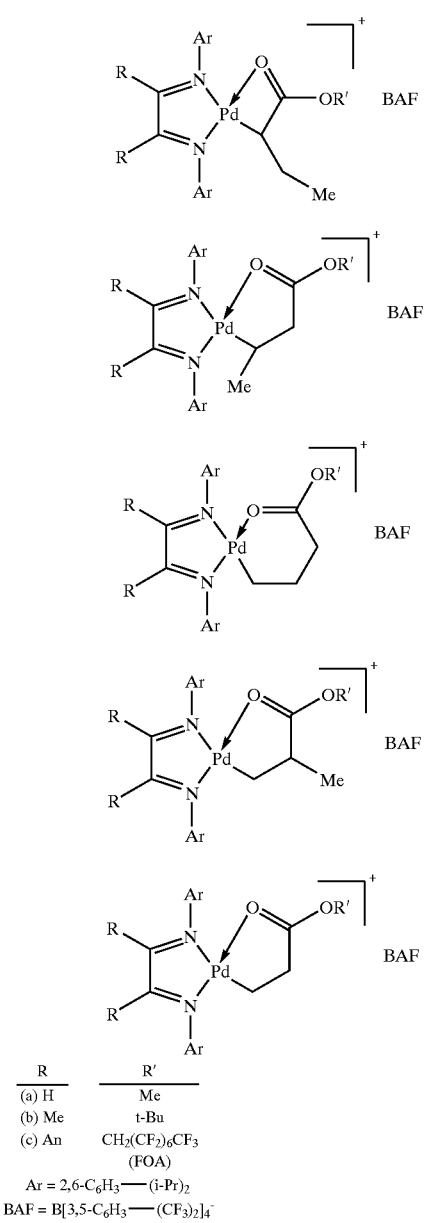

General Procedure for the Synthesis of Chelate Complexes

A gastight microliter syringe was used to add 1.1 equiv of $H_2C=CHC(O)OR'$ to a mixture of 1 equiv of NaBAF and 1 equiv of [(2,6-i-PrPh)$_2$DABR$_2$)PdMeCl suspended in 25 mL of Et$_2$O. The sides of the Schlenk flask were rinsed with an additional 25 mL of Et$_2$O and the reaction mixture was stirred for 1–2 days at RT. Sodium chloride was removed from the reaction mixture via filtration, yielding a clear orange solution. The Et$_2$O was removed in vacuo and the product was washed with hexane and dried in vacuo. For R'=Me or t-Bu, no further purification was necessary (yields>87%). Recrystallization lowered the yield of product and did not result in separation of the isomeric mixtures.

For R'=—CH$_2$(CF$_2$)$_6$CF$_3$, contamination of the product with unreacted NaBAF was sometimes observed. Filtration of a CH$_2$Cl$_2$ solution of the product removed the NaBAF. The CH$_2$Cl$_2$ was then removed in vacuo to yield a partially oily product. A brittle foam was obtained by dissolving the product in Et$_2$O and removing the Et$_2$O in vacuo (yields>59%). Although isolable, chelate complexes derived from FOA tended to be less stable than those derived from MA or t-BuA and decomposed with time or additional handling.

Spectral Data for the BAF Counterion The following $^1$H and $^{13}$C spectroscopic assignments of the BAF counterion in CD$_2$Cl$_2$ were invariant for different complexes and temperatures and are not repeated in the spectroscopic data for each of the cationic complexes: (BAF). $^1$H NMR (CD$_2$Cl$_2$) δ 7.74 (s, 8, H$_o$), 7.57 (s, 4, H$_p$); $^{13}$C NMR (CD$_2$Cl$_2$) δ 162.2 (q, J$_{CB}$=37.4, C$_{ipso}$), 135.2 (C$_o$), 129.3 (q, J$_{CF}$=31.3, C$_m$), 125.0 (q, J$_{CF}$=272.5, CF$_3$), 117.9 (C$_p$).

Example 328

The above synthesis using [(2,6-i-PrPh)$_2$DABH$_2$]PdMeCl (937 mg, 1.76 mmol), NaBAF (1.56 g, 1.75 mmol), and MA (175 μL, 1.1 equiv) was followed and the reaction mixture was stirred for 12 h. The resulting orange powder (2.44 g, 96.0%) consisted of a mixture of 6a(Me) (91%), 5'a(Me) (5%), and 5a(Me) (4%), according to $^1$H NMR spectroscopy. 6a(Me): $^1$H NMR (CD$_2$Cl$_2$, 400 MHz, rt) δ 8.31 and 8.26 (s, 1 each, N=C(H)—C'(H)=N), 7.5–7.2 (m, 6, H$_{aryl}$), 3.17 (s, 3, OMe), 3.14 and 3.11 (septet, 2 each, CHMe$_2$ and C'EMe$_2$), 2.48 (t, 2, J=5.8, CH$_2$C(O)), 1.75 (t, 2, J=5.8, PdCH$_2$), 1.38, 1.32, 1.25 and 1.22 (d, 6 each, J=6.8, CHMeMe' and C'HMeMe'), 0.73 (pentet, 2, J=5.8, PdCH$_2$CH$_2$CH$_2$C(O)); $^{13}$C NMR (CD$_2$Cl$_2$, 100 MHz, rt) δ 183.9 (C(O)), 167.1 (J$_{CH}$=181.4, N=C(H)), 160.7 (J$_{CH}$=181.3, N=C'(H)), 142.9 and 142.4 (Ar, Ar': C$_{ipso}$), 139.7 and 138.7 (Ar, Ar': C$_{ipso}$), 129.8 and 129.0 (Ar, Ar': C$_p$), 124.6 and 124.1 (Ar, Ar': C$_m$), 55.2 (OMe), 35.9 and 32.3 (PdCH$_2$CH$_2$CH$_2$C(O)), 29.3 and 29.1 (CHMe$_2$, C'HMe$_2$), 23.8 (PdCH$_2$CH$_2$CH$_2$C(O)), 24.5, 23.9, 23.2 and 22.5 (CHMeMe', C'HMeMe'); IR (CH$_2$Cl$_2$) 1640 cm$^{-1}$ [ν(C(O))]. 5'(H,Me): $^{13}$C NMR (CD$_2$Cl$_2$, 100 MHz, rt) δ 193.2 (C(O)). Anal. Calcd for (C$_{63}$H$_{57}$BF$_{24}$N$_2$O$_2$Pd): C, 52.28; H, 3.97; N, 1.94. Found: C, 52.08; H, 3.75; N, 1.61.

Example 329

The above synthesis using [(2,6-i-PrPh)$_2$DABMe$_2$] PdMeCl (634 mg, 1.13 mmol), NaBAF (1.00 g, 1.13 mmol), and MA (112 μL, 1.1 equiv) was followed. The reaction mixture was stirred for 2 days and the product was recrystallized from CH$_2$Cl$_2$ at −30° C. to give 956 mg of orange crystals (57.3%, 2 crops). The crystals consisted of a mixture of 6b(Me) (87%), 5'b(Me) (11.5%), and 5b(Me) (1.5%), according to $^1$H NMR spectroscopy. 6b(Me): $^1$H NMR (CD$_2$Cl$_2$, 400 MHz, rt) δ 7.43–7.26 (m, 6, H$_{aryl}$), 3.03 (s, 3, OMe), 2.95 (septet, 2, J=6.79, CHMe$_2$), 2.93 (septet, 2, J=6.83, C"HMe$_2$), 2.39 (t, 2, J=5.86, CH$_2$C(O)), 2.22 and 2.20 (N=C(Me)—C(Me)=N), 1.41 (t, 2, J=5.74, PdCH$_2$), 1.37, 1.30, 1.25 and 1.21 (s, 6 each, J=6.80–6.94, CHMeMe', C'HMeMe'), 0.66 (pentet, 2, J=5.76, PdCH$_2$CH$_2$CH$_2$C(O)); $^{13}$C NMR (CD$_2$Cl$_2$, 100 MHz, rt) δ 183.4 (C(O)), 178.7 and 171.6 (N=C—C'=N), 140.8 and 140.5 (Ar, Ar': C$_{ipso}$), 138.6 and 138.0 (Ar, Ar': C$_o$), 129.3 and 128.3 (Ar, Ar': C$_p$), 124.9 and 124.4 (Ar, Ar': C$_m$), 54.9 (OMe), 35.8 and 30.3 (PdCH$_2$CH$_2$CH$_2$C(O)), 29.5 and 29.2 (CHMe$_2$, C'HMe$_2$), 23.7 (PdCH$_2$CH$_2$CH$_2$C(O)), 23.91, 23.86, 23.20 and 23.14 (CHMeMe', C'HMeMe'), 21.6 and 19.9 (N=C(Me)—C(Me)=N); IR (CH$_2$Cl$_2$) 1643 cm$^{-1}$ [ν(C(O))]. 5'b(Me): $^1$H NMR (CD$_2$Cl$_2$, 400 MHz, rt) δ 3.47 (s, 3, OMe), 2.54 (m, 1, CHMeC(O)), 2.19 and 2.18 (s, 3 each, N=C(Me)—C'

(Me)=N), 1.02 (d, 3, J=7.23, CHMeC(O)); $^{13}$C NMR (CD$_2$Cl$_2$, 100 MHz, rt) δ 194.5 (C(O)), 179.2 and 172.2 (N=C—C'=N), 55.6 (OMe), 44.3 (CHMeC(O)), 28.4 (PdCH$_2$), 21.2 and 19.6 (N=C(Me)—C'(Me)=N), 18.1 (CHMeC(O)). 5b(Me): $^1$H NMR (CD$_2$Cl$_2$, 400 MHz, rt) δ 0.26 (d, 3, PdCHMe). Anal. Calcd for (C$_{65}$H$_{61}$BF$_{24}$N$_2$O$_2$Pd): C, 52.92; H, 4.17; N, 1.90. Found: C, 52.91; H, 4.09; N, 1.68.

Example 330

The above synthesis was followed using [(2,6-i-PrPh)$_2$DABAn]PdMeCl (744 mg, 1.13 mmol), NaBAF (1.00 g, 1.13 mmol), and MA (112 μL, 1.1 equiv). The reaction mixture was stirred for 2 days and the product was recrystallized from CH$_2$Cl$_2$ at −30° C. to give 600 mg (33.8%, 2 crops) of a mixture of 6c(Me) (85%), 5'c(Me) (8%), 5"c(Me) (6%), and 5c(Me) (1%), according to $^1$H NMR spectroscopy. 6c(Me): $^1$H NMR (CD$_2$Cl$_2$) 400 MHz, rt) δ 8.17 (d, 1, J=8.37, An: H$_p$), 8.15 (d, 1, J=3.49, An': H'$_p$), 7.62–7.40 (m, 8, An, An': H$_m$, H'$_m$; Ar: H$_m$, H$_p$; Ar': H'$_m$, H'$_p$), 7.08 (d, 1, J=7.19, An: H$_o$), 6.60 (d, 1, J=7.44, An': H'$_o$), 3.37 (septet, 2, J=6.79, CHMe$_2$), 3.33 (septet, 2, J=6.86, C'HMe$_2$), 2.55 (t, 2, J=5.93, CH$_2$C(O)), 1.79 (t, 2, J=5.66, PdCH$_2$), 1.45, 1.42, 1.13 and 1.02 (d, 6 each, J=6.79–6.90, CHMeMe', C'HMeMe'), 0.80 (pentet, 2, J=5.82, PdCH$_2$CH$_2$CH$_2$C(O)); $^{13}$C NMR (CD$_2$Cl$_2$, 100 MHz, rt) δ 183.5 (C(O)), 175.3 and 168.7 (N=C—C'=N), 145.9 (An: quaternary C), 141.3 and 140.5 (Ar, Ar': C$_{ipso}$), 139.7 and 138.4 (Ar, Ar': C$_o$), 133.3 and 132.6 (An: CH), 131.9 (An: quaternary C), 129.8, 129.7, 129.6 and 128.5 (Ar, Ar': C$_p$; An: CH), 126.44 and 125.8 (An: quaternary C), 126.4 and 125.6 (An: CH), 125.5 and 124.6 (Ar, Ar': C$_m$), 55.0 (OMe), 35.9 and 31.3 (PdCH$_2$CH$_2$CH$_2$C(O)), 29.7 and 29.4 (CHMe$_2$, C'HMe$_2$), 24.1 (PdCH$_2$CH$_2$CH$_2$C(O)), 24.1, 23.8, 23.32 and 23.27 (CHMeMe', C'HMeMe'); IR (CH$_2$Cl$_2$) 1644 cm$^{-1}$ [ν(C(O))]. 5'c(Me): $^1$H NMR (CD$_2$Cl$_2$, 400 MHz, rt) δ 3.64 (s, 3, OMe), 2.70 (m, 1, CHMeC(O)); $^{13}$C NMR (CD$_2$Cl$_2$, 100 MHz, rt) δ 192.8 (C(O)). 5"c(Me): $^1$H NMR (CD$_2$Cl$_2$, 400 MHz, rt) δ 3.67 (s, 3, OMe), 2.46 (t, 2, J=6.99, CH$_2$C(O)), 1.72 (t, 2, J=7.04, PdCH$_2$). 5c(Me): $^1$H NMR (CD$_2$Cl$_2$, 400 MHz, rt) δ 0.44 (d, 3, PdCHMe). Anal. Calcd for (C$_{73}$H$_{61}$BF$_{24}$N$_2$O$_2$Pd): C, 55.80; H, 3.91; N, 1.78. Found: C, 55.76; H, 3.82; N, 1.62.

Example 331

The above synthesis was followed using [(2,6-i-PrPh)$_2$DABH$_2$]PdMeCl (509 mg, 0.954 mmol), NaBAF (845 mg, 0.953 mmol), and t-BuA (154 μL, 1.1 equiv). The reaction mixture was stirred for 1 day and yielded an orange powder (1.24 g, 87.3%) that was composed of a mixture of 6a(t-Bu) (50%), 5'a(t-Bu) (42%), and 5a(t-Bu) (8%), according to $^1$H NMR spectroscopy. 6a(t-Bu): $^1$H NMR (CD$_2$Cl$_2$, 400 MHz, rt) δ 8.27 and 8.25 (N=C(H)—C'(H)=N), 7.45–7.20 (m, 6, H$_{aryl}$), 3.20 and 3.11 (septet, 2 each, J=6.9, CHMe$_2$ and C'HMe$_2$), 2.42 (t, 2, J=5.9, CH$_2$C(O)), 1.77 (t, 2, J=5.3, PdCH$_2$), 1.39, 1.36, 1.22 and 1.21 (d, 6 each, J=6.7, CHMeMe' and C'HMeMe'), 1.01 (s, 9, OMe$_3$), 0.68 (pentet, 2, J=6.1, PdCH$_2$CH$_2$CH$_2$C(O)); $^{13}$C NMR (CD$_2$Cl$_2$, 100 MHz, rt, excluding Ar resonances) δ 182.6 (C(O)), 88.8 (OCMe$_3$), 37.8, 33.6 and 23.9 (PdCH$_2$CH$_2$CH$_2$C(O)), 29.3 and 29.0 (CHMe$_2$, C'HMe$_2$), 27.8 (OCMe$_3$), 24.8, 24.5, 22.7 and 22.6 (CHMeMe', C'HMeMe'); IR (CH$_2$Cl$_2$) 1615 cm$^{-1}$ [ν(C(O))]; 5'a(t-Bu): $^1$H NMR (CD$_2$Cl$_2$, 400 MHz, rt; excluding Ar and i-Pr resonances) δ 8.29 and 8.22 (s, 1 each, N=C(H)—C'(H)=N), 2.53 (q, J=7.3, C(H)(Me)C(O)), 1.75 (d, 1, J=8.9, PdCHH'), 1.53 (dd, 1, J=9.0, 7.0, PdCHH'), 1.16 (OCMe$_3$); 13C NMR (CD$_2$Cl$_2$, 100 MHz, rt; excluding Ar resonances) δ 194.0 (C(O)), 90.6 (OCMe$_3$), 45.9 (CHMeC(O)), 30.0 (PdCH$_2$), 29.4, 29.3, 29.1 and 29.1 (CHMe$_2$, C'HMe$_2$, C"HMe$_2$, C'''HMe$_2$), 27.7 (OCMe$_3$), 24.6, 24.4, 23.81, 23.79, 23.3, 23.3, 22.62 and 22.58 (CHMeMe', C'HMeMe', C"HMeMe', C'''HMeMe'), 18.7 (CHMeC(O)); IR (CH$_2$Cl$_2$) 1577 cm$^{-1}$ [ν(C(O))]. 5a(t-Bu): $^1$H NMR (vide infra); $^{13}$C NMR (CD$_2$Cl$_2$, 100 MHz, rt) δ 190.4 (C(O)), 166.7 and 160.7 (N=C—C'=N), 48.1 (CH$_2$C(O)), 35.3 (PdCHMe). Anal. Calcd for (C$_{66}$H$_{63}$BF$_{24}$N$_2$O$_2$Pd): C, 53.22; H, 4.26; N, 1.88. Found: C, 53.55; H, 4.20; N, 1.59.

Example 332

The above synthesis using [(2,6-i-PrPh)$_2$DABMe$_2$]PdMeCl (499 mg, 0.889 mmol), NaBAF (786 mg, 0.887 mmol), and t-BuA (145 μL, 1.1 equiv) was followed. The reaction mixture was stirred for 1 day to yield an orange powder (1.24 g, 91.8%) that consisted of a mixture of 6b(t-Bu) (26%), 5'b(t-Bu) (63%), and 5b(t-Bu) (11%), according to $^1$H NMR spectroscopy. $^1$H NMR (CD$_2$Cl$_2$, 300 MHz, rt; diagnostic resonances only) 6b(t-Bu): δ 2.35 (t, 2, J=6.1, CH$_2$C(O)), 0.97 (s, 9, OCMe$_3$), 0.60 (pentet, 2, J=5.7, PdCH$_2$CH$_2$CH$_2$C(O)); 5'b(t-Bu): δ 2.43 (q, 1, J=7.2, CHMeC(O)), 1.08 (s, 9, OCMe$_3$); 5b(t-Bu): δ 0.99 (s, 9, OCMe$_3$), 0.29 (d, 3, J=6.74, PdCHMe); $^{13}$C NMR (CD$_2$Cl$_2$, 75 MHz, rt; diagnostic resonances only) 6b(t-Bu): δ 182.3 (C(O)), 88.3 (OCMe$_3$), 37.9 and 31.9 (PdCH$_2$CH$_2$CH$_2$C(O)), 27.9 (OCMe$_3$), 22.0 and 20.1 (N=C(Me)—C'(Me)=N); 5'b(t-Bu): δ 193.8 (C(O)), 178.8 and 171.8 (N=C—C'=N), 90.0 (OCMe$_3$), 45.8 (CHMeC(O)), 28.7 (PdCH$_2$), 21.1 and 19.6 (N=C(Me)—C'(Me)=N), 18.6 (CHMeC(O)); 5b(t-Bu) δ 190.7 (C(O)), 48.4 (CH$_2$C(O)), 33.9 (PdCHMe). Anal. Calcd for (C$_{68}$H$_{67}$BF$_{24}$N$_2$O$_2$Pd): C, 53.82; H, 4.45; N, 1.85. Found: C, 53.62; H, 4.32; N, 1.55.

Example 333

The above synthesis was followed using [(2,6-i-Pr-Ph)$_2$DABAn]PdMeCl (503 mg, 0.765 mmol), NaBAF (687 mg, 0.765 mmol), and t-BuA (125 μL, 1.1 equiv). The reaction mixture was stirred for 1 day to yield an orange powder (1.08 g, 87.8%) that consisted of a mixture of 6c(t-Bu) (47%), 5'c(t-Bu) (50%), and 5c(t-Bu) (3%), according to $^1$H NMR spectroscopy. $^1$H NMR (CD$_2$Cl$_2$, 300 MHz, rt; diagnostic chelate resonances only) 6c(t-Bu): δ 2.48 (t, 2, J=6.05, CH$_2$C(O)), 1.80 (t, 2, PdCH$_2$), 1.07 (s, 9, OCMe$_3$), 0.73 (pentet, 2, J=5.87, PdCH$_2$CH$_2$CH$_2$C(O)); 5'c(t-Bu): δ 2.57 (q, 1, J=6.96, CHMeC(O)), 1.58 (dd, 1, J=8.80, 6.96, PdCHH'), 1.21 (s, 9, OCMe$_3$); 5c(t-Bu): δ 0.73 (d, 3, PdCHMe); $^{13}$C NMR (CD$_2$Cl$_2$, 75 MHz, rt; diagnostic chelate resonances only) 6c(t-Bu): δ 181.8 (C(O)), 87.9 (OCMe$_3$), 37.4 and 32.2 (PdCH$_2$CH$_2$CH$_2$C(O)), 27.4 (OCMe$_3$); 5'c(t-Bu): δ 193.0 (C(O)), 89.5 (OCMe$_3$), 45.5 (CHMeC(O)), 28.5 (PdCH$_2$), 27.2 (OCMe$_3$), 18.1 (CHMeC(O)). Anal. Calcd for (C$_{76}$H$_{67}$BF$_{24}$N$_2$O$_2$Pd): C, 56.57; H, 4.19; N, 1.74. Found: C, 56.63; H, 4.06; N, 1.52.

Example 334

The above synthesis using [(2,6-i-PrPh)$_2$DABH$_2$]PdMeCl (601 mg, 1.13 mmol), NaBAF (998 mg, 1.13 mmol), and FOA (337 μL, 1.1 equiv) yielded after 1 day of stirring 1.21 g (59.2%) of 6a(FOA) as a red foam: $^1$H NMR (CD$_2$Cl$_2$, 300 MHz, 0° C.) δ 8.33 and 8.27 (s, 1 each, N=C(H)—C'(H)=N), 7.4–7.2 (m, 6, H$_{aryl}$), 3.85 (t, 2, J$_{HF}$=13.05, OCH$_2$(CF$_2$)$_6$CF$_3$), 3.13 and 3.08 (septet, 2 each, J=6.9, CHMe$_2$ and C'HMe$_2$), 2.65 (t, 2, J=5.62, CH$_2$C(O)), 1.74 (t, 2, J=5.59, PdCH$_2$), 1.36, 1.29, 1.15 and 1.13 (d, 6 each, J=6.73–6.82, CHMeMe', C'HMeMe'), 0.76 (pentet, 2, J=5.44, PdCH$_2$CH$_2$CH$_2$C(O)).

Example 335

The above synthesis using [(2,6-i-PrPh)$_2$DABMe$_2$]PdMeCl (637 mg, 1.13 mmol), NaBAF (1.00 g, 1.13 mmol), and FOA (339 μL, 1.1 equiv) yielded after 1 day of stirring 1.36 g (65.2%) of 6b(FOA) as a yellow foam: $^1$H NMR (CD$_2$Cl$_2$, 300 MHz, 0° C.) δ 7.5–7.0 (m, 6, H$_{aryl}$), 3.64 (t, 2, J$_{HF}$=12.72, OCH$_2$(CF$_2$)$_6$CF$_3$), 2.90 and 2.88 (septet, 2, J=6.74, CHMe$_2$ and C'HMe$_2$), 2.56 (t, 2, J=5.82, CH$_2$C(O)), 2.32 and 2.22 (N=C(Me)—C'(Me)=N), 1.34, 1.27, 1.23 and 1.19 (d, 6 each, J=6.75–6.82, CHMeMe', C'HMeMe'), 0.68 (pentet, 2, J=5.83, PdCH$_2$CH$_2$CH$_2$C(O)).

Examples 336–338

The labeling scheme given in Examples 328–335 is also used here. Spectral data for the BAF counterion is the same as given in Examples 328–335.

Low-Temperature NMR Observation of Methyl Acrylate Olefin Complex Formation and Chelate Formation and Rearrangement. One equivalent of MA was added to an NMR tube containing a 0.0198 M solution of {[(2,6-iPrPh)$_2$DABH$_2$]PdMe(OEt$_2$)]}BAF in CD$_2$Cl$_2$ (700 μL) at −78° C., and the tube was transferred to the precooled NMR probe. After 14.25 min at −80° C., approximately 80% of the ether adduct had been converted to the olefin complex. Two sets of bound olefin resonances were observed in a 86:14 ratio. This observation is consistent with the existence of two different rotamers of the olefin complex. Insertion of MA into the Pd-Me bond occurred with predominantly 2,1 regiochemistry to give the 4-membered chelate 4a(Me) at −80° C. (t$_{1/2}$~2.0 h). The resonances for the major rotamer of the olefin complex disappeared before those of the minor rotamer. Much slower conversion of 4a(Me) to the 5-membered chelate 5a(Me) also began at −80° C. Upon warming to −60° C., complete and selective formation of 5a(Me) occurred in less than 4 h. The 5-membered chelate was relatively stable at temperatures below −50° C., however, upon warming to −20° C., rearrangement to the 6-membered chelate 6a(Me) was observed. NMR spectral data for the olefin complex, 4a(Me), and 5a(Me) follow. Spectral data for 6a(Me) is identical to that of the isolated chelate complex (see Examples 328–335).

Example 336

{[(2,6-i-PrPh)$_2$DABH$_2$]Pd(Me)[H$_2$C=CHC(O)OMe]}BAF. $^1$H NMR (CD$_2$Cl$_2$, −80° C., 400 MHz) Major Rotamer: δ 8.45 and 8.32 (s, 1 each, N=C(H)—C'(H)=N), 7.5–7.1 (m, 6, H$_{aryl}$), 5.14 (d, J=15.2, HH'C=), 4.96 (dd, J=14.9, 8.6, =CHC(O)), 4.63 (d, J=8.5, HH'C=), 3.68 (s, 3, OMe), 3.03, 2.90, 2.80 and 2.67 (septet, 1 each, CHMe$_2$, C'BMe$_2$, C"HMe$_2$, C'"HMe$_2$), 1.5–1.0 (doublets, 24, CHMe$_2$), 0.61 (s, 3, PdMe); Minor Rotamer: δ 8.25 and 8.18 (s, 1 each, N=C(H)—C'(H)=N), 5.25 (d, 1, HH'C=), 4.78 (dd, 1, =CHC(O)), 4.58 (d, 1, HH'C=), 3.63 (OMe).

Example 337

{[(2,6-i-PrPh)$_2$DABH$_2$]Pd[CHEtC(O)OMe]}BAF 4a(Me). $^1$H NMR (CD$_2$Cl$_2$, 400 MHz, −60° C.) δ 8.25 and 8.22 (N=C(H)—C'(H)=N), 7.5–7.2 (m, 6, H$_{aryl}$), 3.74 (s, 3, OMe), 3.55, 3.27, 3.08 and 2.76 (m, 1 each, CHMe$_2$, C'HMe$_2$, C"HMe$_2$, C'"HMe$_2$), 2.62 (dd, J=10.8, 2.9, CHEt), 1.4–1.0 (doublets, 24, CHMe$_2$), 0.79 and −0.49 (m, 1 each, CH(CHH'Me)), 0.71 (t, 3, J=6.6, CH(CHH'Me)).

Example 338

{[(2,6-i-PrPh)$_2$DABH$_2$]Pd[CHMeCH$_2$C(O)OMe]}BAF 5a(Me). $^1$H NMR (CD$_2$Cl$_2$, 400 MHz, −60° C.) δ 8.24 and 8.21 (N=C(H)—C'(H)=N), 7.4–7.2 (m, 6, H$_{aryl}$), 3.59 (s, 3, OMe), 3.47, 3.32, 2.98 and 2.81 (septet, 1 each, CHMe$_2$, C'HMe$_2$, C"HMe$_2$, C'"HMe$_2$), 3.08 (dd, 1, J=18.4, 7.3, CHH'C(O)), 1.74 (pentet, 1, J=6.9, PdCHMe), 1.60 (d, 1, J=18.6, CHH'C(O)), 1.34 (d, 6, J=5.6, C'HMeMe' and C'"HMeMe'), 1.32 (d, 3, J=6.2, CHMeMe'), 1.24 (d, 3, J=6.8, C"HMeMe'), 1.18 (d, 6, J=6.8, C'HMeMe' and C"'HMeMe'), 1.15 (d, 3, J=6.8, C'"HMeMe'), 1.08 (d, 3, CHMeMe'), 0.35 (d, 3, J=6.9, PdCHMe); $^{13}$C NMR (CD$_2$Cl$_2$, 100 MHz, −80° C.) δ 190.5 (C(O)), 166.1 (J$_{CH}$=181, N=C(H)), 160.7 (J$_{CH}$=181, N=C'(H)), 142.8 and 141.6 (Ar, Ar': C$_{ipso}$), 139.0, 138.6, 138.2 and 137.7 (Ar: C$_o$, C$_o$' and Ar': C$_o$, C$_o$'), 128.8 and 128.2 (Ar, Ar': C$_p$), 124.1, 123.54, 123.48, 123.4 (Ar: C$_m$, C$_m$' and Ar': C$_m$, C$_m$'), 55.5 (OMe), 45.1 (CH$_2$C(O)), 35.6 (PdCHMe), 28.8, 28.5, 28.1 and 27.8 (CHMe$_2$, C'HMe$_2$, C"HMe$_2$, C'"HMe$_2$), 25.6, 24.2, 23.1, 23.0, 22.7, 22.3, 21.9, 21.3, and 21.3 (CHMeMe', C'HMeMe', C"HMeMe', C'"HMeMe' and PdCHMe).

Example 339–342

The labeling scheme given in Examples 328–335 is also used for Examples 339–342. Spectral data for the BAF counterion is the same as given in Examples 328–335.

Low-Temperature NMR Observation of t-Butyl Acrylate Olefin Complex Formation and Chelate Formation and Rearrangement. One equiv of t-BuA was added to an NMR tube containing a 0.0323 M solution of {[(2,6-i-PrPh)$_2$DABH$_2$]PdMe(OEt$_2$)}BAF in CD$_2$Cl$_2$ (700 μL) at −78° C., and the tube was transferred to the precooled NMR probe. The olefin complex was observed at −80° C., and the probe was then warmed to −70° C. After 1 h at −70° C., conversion to 5a(t-Bu) and 5'a(t-Bu) was almost complete, with small amounts (<10%) of the olefin complex and 4a(t-Bu) still present. Conversion of 5a(t-Bu) to 6a(t-Bu) was followed at −10° C. (t$_{1/2}$~1 h). When this experiment was repeated using 5 equiv of t-BuA, conversion to 5a, 5'a and 6a was observed at −80° C. After allowing the solution to stand at rt for 5 days, partial conversion to the unsubstituted 5-membered chelate 5"a(t-Bu) was observed. Spectral data for the olefin complex, 4a(t-Bu), 5a(t-Bu) and 5'"a(t-Bu) follow. Spectral data for 5'a(t-Bu) and 6a(t-Bu) are identical to that of the isolated chelate complexes (see Examples 328–335).

Example 339

{[(2,6-i-PrPh)$_2$DABH$_2$]PdMe[H$_2$C=CHC(O)O-t-Bu]}BAF. $^1$H NMR (CD$_2$Cl$_2$, 400 MHz, −80° C.) δ 8.45 and 8.30 (s, 1 each N=C(H)—C'(H)=N), 7.4–7.2 (m, 6, H$_{aryl}$), 5.15 (d, 1, J=15.3, HH'C=), 4.89 (dd, 1, J=14.7, 8.4, =CHC(O)), 4.61 (d, 1, J=7.7, HH'C=), 2.92, 2.90, 2.80 and 2.64 (septets, 1 each, CHMe$_2$, C'HMe$_2$), C"HMe$_2$ and C'"HMe$_2$), 1.31 (s, 9, OCMe$_3$), 1.5–0.8 (doublets, 24, CHMe$_2$), 0.60 (s, 3, PdMe).

Example 340

{[(2,6-i-PrPh)$_2$DABH$_2$]Pd[CHEtC(O)O-t-Bu]}BAF 4a(t-Bu). $^1$H NMR (CD$_2$Cl$_2$, 400 MHz, −70° C.) δ 8.22 and 8.21 (s, 1 each, N=C(H)—C'(H)=N), 2.21 (d, 1, J=9.2, PdCHEt), 0.71 (t, 3, J=7.9, PdCH(CH$_2$Me)), 0.5 and −0.4 (br m, 1 each, PdCH(CHH'Me)).

Example 341

{[(2,6-i-PrPh)$_2$DABH$_2$]Pd[CHMeCH$_2$C(O)O-t-Bu]}BAF 5a(t-Bu). $^1$H NMR (CD$_2$Cl$_2$, 400 MHz, −40° C.) δ

8.28 and 8.24 (s, 1 each, N=C(H)—C'(H)=N), 7.4–7.2 (m, 6, H$_{aryl}$), 3.44, 3.32, 2.96 and 2.86 (septet, 1 each, CHMe$_2$, C'HMe$_2$, C"HMe$_2$, C'"HMe$_2$), 2.94 (dd, 1, J=18.6, 7.1, CHH'C(O)), 1.79 (pentet, 1, J=6.7, PdCHMe), 1.62 (d, 1, J=18.5, CHH'C(O)), 1.4–1.0 (doublets, 24, CHMe$_2$), 1.10 (s, 9, OCMe$_3$), 0.22 (d, 3, J=6.9, PdCHMe).

Example 342

{[(2,6-i-PrPh)$_2$DABH$_2$]Pd[CH$_2$CH$_2$C(O)O-t-Bu]}BAF 5"a(t-Bu). $^1$H NMR (CD$_2$Cl$_2$, 400 MHz, rt) δ 2.40 (t, 2, J=7.0, CH$_2$C(O)), 1.65 (t, 2, J=7.0, PdCH$_2$).

Example 343

The labeling scheme given in Examples 328–335 is also used for Example 343. Spectral data for the BAF counterion is the same as given in Examples 328–335.

Low-Temperature NMR Observation of FOA Chelate Formation and Rearrangement. One equiv of FOA was added to an NMR tube containing a 0.0285 M solution of {[(2,6-i-PrPh)$_2$DABH$_2$]PdMe(OEt$_2$)}BAF (1a) at −78° C. in CD$_2$Cl$_2$ (700 μL), and the tube was briefly shaken at this temperature. A $^1$H NMR spectrum at −80° C. showed that FOA was not dissolved. The sample was allowed to warm slightly as it was shaken again and another spectrum was then acquired at −80° C. Approximately equal amounts of 5a(FOA) and 6a(FOA) were observed along with small amounts of the ether adduct 1a and FOA (an olefin complex was not observed). Rearrangement of 5a(FOA) to 6a(FOA) was observed at −40° C. and was complete upon warming to −30° C. NMR spectral data for 5a(FOA) follow. Spectral data for 6a(FOA) are identical with that of the isolated complex (vide supra).

{[(2,6-i-PrPh)$_2$DABH$_2$]Pd[CHMeCH$_2$C(O)OCH$_2$(CF$_2$)$_6$CF$_3$]}BAF 5a(FOA). $^1$H NMR (CD$_2$Cl$_2$, 300 MHz, −40° C.) δ 8.23 and 8.22 (s, 1 each, N=C(H)—C'(H)=N), 3.47 (t, 2, J$_{HF}$=13.38, OCH$_2$(CF$_2$)$_6$CF$_3$), 3.20 (dd, 1, J=19.25, 7.28, CHH'C(O)), 2.58 (pentet, 1, J=6.99, PdCHMe), 1.77 (d, 1, J=19.81, CHH'C(O)), 0.33 (d, 3, J=6.88, PdCHMe). Spectral data for the BAF counterion is the same as given in Examples 328–335.

Example 344

NMR Observation of {[(2,6-i-PrPh)$_2$DABH$_2$]Pd [CHR"CH$_2$CH$_2$C(O)OMe]}BAF and {[(2,6-i-PrPh)$_2$ DABH$_2$]Pd[CH$_2$CH$_2$C(O)OMe]}BAF. A solution of {[(2,6-i-PrPh)$_2$DABH$_2$]PdMe(OEt$_2$)}BAF (21.5 mg, 0.0150 mmol) in 700 μL of CD$_2$Cl$_2$ was prepared at −78° C. Ethylene (5 equiv) was added via gastight syringe and the tube was shaken briefly to dissolve the ethylene. Methyl acrylate (5 equiv) was then added to the solution, also via gastight microliter syringe, and the tube was shaken briefly again. The tube was transferred to the NMR probe, which was precooled to −80° C. Resonances consistent with the formation of the ethylene adduct {[(2,6-i-PrPh)$_2$DABH$_2$] PdMe(H$_2$C=CH$_2$))}BAF were observed. The solution was warmed and ethylene insertion was monitored at −40 to −20° C. The consumption of one equiv of methyl acrylate occurred as the last equiv of ethylene disappeared, and resonances consistent with the formation of a substituted 6-membered chelate complex {[(2,6-i-PrPh)$_2$DABH$_2$]Pd [CHR"CH$_2$CH$_2$C(O)OMe]}BAF were observed [8.30 and 8.29 (N=C(H)—C'(H)=N), 3.17 (OMe)]. The large upfield shift of the methoxy resonance is particularly diagnostic for formation of the 6-membered chelate complex in these systems. The substituted 6-membered chelate complex was observed at −20° C. and initially upon warming to RT. After 2 h at RT, decomposition of the substituted 6-membered chelate complex had begun. After 24 h at RT, an additional 0.5 equiv of MA had been consumed and triplets at 2.42 and 1.66 ppm, consistent with the formation of the unsubstituted 5-membered chelate complex {[(2,6-i-PrPh)$_2$DABH$_2$]Pd [CH$_2$CH$_2$C(O)OMe]}BAF, were observed. Spectral data for the BAF counterion is the same as given in Examples 328–335.

Example 345

NMR Observation of {[(2,6-i-PrPh)$_2$DABMe$_2$]Pd (CHR"CH$_2$CH$_2$C(O)OMe]}BAF. The procedure of Example 344 was followed with analogous results, e.g., resonances for the formation of a substituted 6-membered chelate complex {[(2,6-i-PrPh)$_2$DABMe$_2$]Pd [CHR"CH$_2$CH$_2$C(O)OMe]}BAF were observed following complete. ethylene consumption [3.03 (s, OMe), 3.12, 2.96, 2.89, 2.83 (septets, CHMe$_2$, C'HMe$_2$, C"HMe$_2$ and C'"HMe$_2$), 2.23 and 2.19 (s, N=C(Me)—C'(Me)=N)]. Again, the large upfield shift of the methoxy resonance is diagnostic for the formation of the six-membered chelate complex. The observation of four i-propyl methine resonances (vs. two i-propyl methine resonances in the unsubstituted six-membered chelate complex) reflects the asymmetry introduced in the molecule due to the introduction of the R" substituent on C$_\alpha$ of the chelate ring and further supports the proposed structure. Spectral data for the BAF counterion is the same as given in Examples 328–335.

Example 346

{[(2,6-i-PrPh)$_2$DABH$_2$]Pd(H$_2$C=CH$_2$))[CH$_2$CH$_2$CH$_2$C (O)OMe]}BAF. Ethylene was transferred at −78° C. via gastight microliter syringe to an NMR tube containing a CD$_2$Cl$_2$ solution of the chelate complex {[(2,6-i-PrPh)$_2$ DABH$_2$]Pd[CH$_2$CH$_2$CH$_2$C(O)OMe]}BAF. NMR data for the ethylene complex follow; it was observed in equilibrium with the starting chelate complex: $^1$HÊNMR (CD$_2$Cl$_2$, 300 MHz, 182° K) δ 8.30 and 8.29 (s, 1 each, N=C(H)—C' (H)=N), 7.38–7.24 (m, 6, H$_{aryl}$), 3.72 (s, 3, OMe), 3.43 (br s, 4, H$_2$C=CH$_2$)), 3.10 (m, 2, CHMe$_2$), 2.70 (m, 2, C"HMe$_2$), 2.20 (m, 2, CH$_2$C(O)), 1.25, 1.16, 1.09 and 1.07 (d, 6 each, J=7, CHMeMe', C'HMeMe'), 1.20 (PdCH$_2$ (obscured by CHMeMe' peaks, observed by H,H-COSY)), 0.56 (m, 2, PdCH$_2$CH$_2$CH$_2$C(O)); $^{13}$C NMR (CD$_2$Cl$_2$, 400 MHz, −80° C.) δ 178.9 (C(O)), 162.7 (J$_{CH}$=179, N=C), 162.5 (J$_{CH}$=179, N=C'), 141.3 and 140.5 (Ar, Ar': C$_{ipso}$), 138.5 and 138.1 (Ar, Ar': C$_o$), 128.5 and 128.3 (Ar, Ar': C$_p$), 124.1 and 124.0 (Ar, Ar': C$_o$), 122.9 (J$_{CH}$=159.3, free H$_2$C=CH$_2$), 70.2 (J$_{CH}$=158.6, bound H$_2$C=CH$_2$), 53.0 (OMe), 36.5, 33.0 and 22.6 (PdCH$_2$CH$_2$CH$_2$C(O)), 27.8 (CHMe$_2$, C'HMe$_2$), 25.6, 25.3, 22.1 and 21.4 (CHMeMe', C'HMeMe'). Spectral data for the BAF counterion is the same as given in Examples 328–335.

Example 347

{[(2,6-i-PrPh)$_2$DABMe$_2$]Pd(H$_2$C=CH$_2$)) [(CH$_2$CH$_2$CH$_2$C(O)OMe]}BAF. Ethylene was transferred at −78° C. via gastight microliter syringe to an NMR tube containing a CD$_2$Cl$_2$ solution of the chelate complex {[(2,6-i-PrPh)$_2$DABMe$_2$]Pd[CH$_2$CH$_2$CH$_2$C(O)OMe]}BAF. NMR data for the ethylene complex follow; even at low temperature and in the presence of a large excess of ethylene, this complex could only be observed in the presence of at least an equimolar amount of the corresponding six-membered chelate: $^1$HÊNMR (CD$_2$Cl$_2$, 300 MHz, 172° K): δ 7.35–7.19 (m, 6, H$_{aryl}$), 4.31 (br s, 4, H$_2$C=CH$_2$)), 3.45 (s, 3, OMe), 2.73–2.54 (m, 4, CHMe$_2$), 2.38 and 2.22 (s, 3 each, N=C(Me)—C(Me)=N), 1.64 (m, 2, CH$_2$C(O)), 1.02 (d, 6, J=6, CHMeMe"). From the available H,H-COSY data, the remaining PdCH$_2$CH$_2$CH$_2$C(O)— and CHMe-signals could not be unambiguously assigned, due to the presence of the six-membered chelate. Spectral data for the BAF counterion is the same as given in Examples 328–335.

Example 348

{[(2,6-i-PrPh)$_2$DABAn]Pd(H$_2$C=CH$_2$)[CH$_2$CH$_2$CH$_2$C(O)OMe]}BAF. Ethylene was transferred at −78° C. via gastight microliter syringe to an NMR tube containing a CD$_2$Cl$_2$ solution of the chelate complex {[(2,6-i-PrPh)$_2$DABAn]Pd(CH$_2$CH$_2$CH$_2$C(O)OMe)]BAF. NMR data for the ethylene complex follow; it was observed in equilibrium with the starting chelate complex: $^1$H NMR (CD$_2$Cl$_2$, 300 MHz, 178° K): δ 8.06 and 8.02 (d, J=8, 1 each, An and An': H$_p$ and H'$_p$), 7.50–7.38 (m, 8, An and An': H'$_m$ and H$_m$, Ar: H$_m$ and H$_p$), 6.48 (d, J=7, 2, An and An': H$_o$ and H'$_o$), 4.56 (br s, 4, H$_2$C=CH$_2$), 3.45 (s, 3, OMe), 2.99 and 2.91 (m, 2 each, CHMe$_2$ and C'HMe$_2$), 1.77 (m, 2, CH$_2$C(O)), 1.29, 1.27, 0.82 and 0.77 (d, J=6–7, 6 each, CHMeMe', C'HMeMe'). H,H-COSY reveals that the remaining PdCH$_2$CH$_2$CH$_2$C(O)-signals are obscured by the CHMe-signals at 1.2 ppm. Spectral data for the BAF counterion is the same as given in Examples 328–335.

Example 349

{[(2,6-i-PrPh)$_2$DABH$_2$]Pd[CH$_2$CH$_2$CH$_2$C(O)OCH$_2$(CF$_2$)$_6$CF$_3$](H$_2$C=CH$_2$))}BAF. Ethylene (0.78 equiv) was added via gastight microliter syringe to a 0.0105 M solution of the chelate complex {[(2,6-i-PrPh)$_2$DABH$_2$]Pd[CH$_2$CH$_2$CH$_2$C(O)OCH$_2$(CF$_2$)$_6$CF$_3$]}BAF in CD$_2$Cl$_2$ (700 μL). NMR data for the ethylene complex follow; it was observed in equilibrium with the starting chelate complex: $^1$H NMR (CD$_2$Cl$_2$, 300 MHz, 213.0° K) δ 8.40 and 8.25 (N=C(H)—C'(H)=N), 7.5–7.1 (m, 6, H$_{aryl}$), 4.50 (t, 2, J$_{HF}$=13.39, OCH$_2$(CF$_2$)$_6$CF$_3$), 4.41 (s, 4, H$_2$C=CH$_2$)), 2.94 and 2.70 (septet, 2 each, CHMe$_2$, C'HMe$_2$), 1.80 (t, 3, CH$_2$C(O)), 1.4–1.0 (CHMeMe', C'HMeMe', PdCH$_2$CH$_2$CH$_2$C(O)). Spectral data for the BAF counterion is the same as given in Examples 328–335.

Example 350

A 12 mg (0.02 mmol) sample of [(2,6-i-PrPh)$_2$DABAn]NiBr$_2$ was placed in a 25 mL high pressure cell. The reactor was purged with argon. The reactor was cooled to 0° C. before 2 mL of a 10% MAO solution in toluene was added under a positive argon purge. The reactor was filled (¾ full) with liquid CO$_2$ (4.5 MPa) and a 689 kPa head pressure of ethylene was added by continuous flow. A 6 degree exotherm was observed. A layer of polyethylene formed immediately at the ethylene CO$_2$ interface. After 20 minutes, the cell was vented and the polyethylene removed from the reactor. The polymer was dried in vacuo for several hours. Polyethylene (2.05 g) was isolated; M$_n$=597,000, M$_w$/M$_n$=2.29, T$_m$=128° C. This example demonstrates the applicability of liquid CO$_2$ as a solvent for polymerization in these catalyst systems.

Example 351

A 12 mg (0.02 mmol) sample of [(2,6-i-PrPh)$_2$DABAn]NiBr$_2$ was placed in a 25 mL high pressure cell and the reactor was purged with argon. The reactor was heated to 40° C. and 2 mL of a 10% MAO solution in toluene was added. CO$_2$ (20.7 MPa) and ethylene (3.5 MPa, continuous flow) was then added to the reactor. Polyethylene began adhering to the sapphire window within minutes. After 20 minutes, the cell was vented and the polyethylene removed from the reactor. The polymer was dried in vacuo for several hours. Polyethylene (0.95 g) was isolated; M$_n$=249,000, M$_w$/M$_n$=2.69, T$_m$=113° C. This example demonstrates the applicability of supercritical CO$_2$ as a solvent for polymerization in these catalyst systems.

Example 352

A standard solution of [(2,6-i-PrPh)$_2$DABAn]NiBr$_2$ was prepared as follows: 1,2-difluorobenzene (10 mL) was added to 6.0 mg of [(2,6-i-PrPh)$_2$DABAn]NiBr$_2$ (8.4×10$^{-6}$ mol) in a 10 mL volumetric flask. The standard solution was transferred to a Kontes flask and stored under an argon atmosphere.

A 1000 mL Parr® stirred autoclave under an argon atmosphere, was charged with 1 mL of a standard solution of [(2,6-i-PrPh)$_2$DABAn]NiBr$_2$ (8.3×10$^{-7}$ mol), and 200 mL of dry, deaerated toluene. The reactor was purged with ethylene before addition of 2 mL of a 10% MAO solution in toluene. The autoclave was rapidly pressurized with ethylene to 1.4 MPa as the internal temperature increased from 25° C. to 45° C. within seconds. Activation of the internal cooling system returned the reactor temperature to 30° C. After 10 minutes, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 7.0 g (1.8×10$^6$ TO/h) of polyethylene. Differential scanning calorimetry: T$_m$=118° C. (133 J/g). Gel permeation chromatography (trichlorobenzene, 135° C., polystyrene reference, results calculated as polyethylene using universal calibration theory): M$_n$=470,000; M$_w$=1,008,000; M$_w$/M$_n$=2.14. $^{13}$C-NMR analysis: total methyls/1000 CH$_2$ (27.6), methyl (21.7), ethyl (2.6), propyl (0.7), butyl (1), amyl (0.4).

Example 353

A 1000 mL Parr® stirred autoclave under an argon atmosphere, was charged with 1 mL of a standard solution of [(2,6-i-PrPh)$_2$DABAn]NiBr$_2$ (8.3×10$^{-7}$ mol), and 200 mL of dry, deaerated toluene. The reactor was purged with ethylene before addition of 2 mL of a 10% MAO solution in toluene. The autoclave was rapidly pressurized with ethylene to 2.8 MPa as the internal temperature increased from 25° C. to 48° C. within seconds. Activation of the internal cooling system returned the reactor temperature to ~30° C. After 10 minutes, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 8.85 g (2.3×10$^6$ TO/h) of polyethylene. DSC: T$_m$=122° C. GPC (trichlorobenzene, 135° C., polystyrene reference, results calculated as polyethylene using universal calibration theory): M$_n$=485,000; M$_w$=1,042,000; M$_w$/M$_n$=2.15. $^{13}$C-NMR analysis: total methyls/1000 CH$_2$ (21.3), methyl (16.3), ethyl (2.1), propyl (0.7), butyl (0.9), amyl (0.2).

Example 354

A 1000 mL Parr® stirred autoclave under an argon atmosphere, was charged with 1 mL of a standard solution of [(2,6-i-PrPh)$_2$DABAn]NiBr$_2$ (8.3×10$^{-7}$ mol), and 200 mL of dry, deaerated toluene. The reactor was purged with ethylene before addition of 2 mL of a 10% MAO solution in toluene. The autoclave was rapidly pressurized with ethylene to 4.1 MPa as the internal temperature increased from 25° C. to 45° C. within seconds. Activation of the internal cooling system returned the reactor temperature to ~30° C. After 10 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 7.45 g (1.9×10$^6$ TO/h) of polyethylene. DSC: T$_m$=126° C. GPC (trichlorobenzene, 135° C., polystyrene reference, results calculated as polyethylene using universal calibration theory): M$_n$=510,000; M$_w$=1,109,000; M$_w$/M$_n$=2.17. $^{13}$C-NMR analysis: total methyls/1000 CH$_2$ (5.1), methyl (5.1), ethyl (0), propyl (0), butyl (0), amyl (0).

Example 355

A 1 mg (1.7×10$^{-6}$ mol) sample of [(2,6-i-PrPh)$_2$DABH$_2$]NiBr$_2$ was placed in a Parr® 1000 mL stirred autoclave under argon. The autoclave was sealed and 200 mL of dry toluene was added. The reactor was purged with ethylene before addition of 1.5 mL of a 10% MAO solution in toluene. The autoclave was rapidly pressurized with ethylene to 1.4 MPa as the internal temperature increased from 25° C. to 45° C. within seconds. Activation of the internal cooling system returned the reactor temperature to ~30° C. After 10 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 14.1 g (1.8×10$^6$ TO/h) of polyethylene. DSC: T$_m$=126° C. (151 J/g). GPC (trichlorobenzene, 135° C., polystyrene reference, results calculated as polyethylene using universal calibration theory): M$_n$=32,000; M$_w$=89,000; M$_w$/M$_n$=2.75.

Example 356

A 1 mg (1.7×10$^{-6}$ mol) sample of [(2,6-i-PrPh)$_2$DABH$_2$]NiBr$_2$ was placed in a Parr® 1000 mL stirred autoclave under argon. The autoclave was sealed and 200 mL of dry toluene was added. The reactor was purged with ethylene before addition of 1.5 mL of a 10% MAO solution in toluene. The autoclave was rapidly pressurized with ethylene to 2.1 MPa as the internal temperature increased from 25° C. to 50° C. within seconds. Activation of the internal cooling system returned the reactor temperature to ~30° C. After 10 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 16.1 g (2×10$^6$ TO/h) of polyethylene. DSC: T$_m$=129° C. (175 J/g). GPC (trichlorobenzene, 135° C., polystyrene reference, results calculated as polyethylene using universal calibration theory): M$_n$=40,000; M$_w$=89,000; M$_w$/M$_n$=2.22.

Example 357

A 1.2 mg (1.9×10$^{-6}$ mol) sample of [(2,6-i-PrPh)$_2$DABMe$_2$]NiBr$_2$ was placed in a Parr® 1000 mL stirred autoclave under argon. The autoclave was sealed and 200 mL of dry toluene was added. The reactor was purged with ethylene before addition of 2.0 mL of a 10% MAO solution in toluene. The autoclave was rapidly pressurized with ethylene to 1.4 MPa as the internal temperature increased from 24° C. to 31° C. within seconds. Activation of the internal cooling system returned the reactor temperature to ~25° C. After 12 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 8 g (9×10$^5$ TO/h) of polyethylene. DSC: Broad melt beginning approximately 0° C. with a maximum at 81° C. (25 J/g). GPC (trichlorobenzene, 135° C., polystyrene reference, results calculated as polyethylene using universal calibration theory): M$_n$=468,000; M$_w$=1,300,000; M$_w$/M$_n$=2.81. $^{13}$C-NMR analysis: total methyls/1000 CH$_2$ (46.6), methyl (37.0), ethyl (2.4), propyl (1.6), butyl (1.3), amyl (1.4).

Example 358

A 1.2 mg (1.9×10$^{-6}$ mol) sample of [(2,6-i-PrPh)$_2$DABMe$_2$]NiBr$_2$ was placed in a Parr® 1000 mL stirred autoclave under argon. The autoclave was sealed and 200 mL of dry toluene was added. The reactor was purged with ethylene before addition of 2.0 mL of a 10% MAO solution in toluene. The autoclave was rapidly pressurized with ethylene to 2.8 MPa as the internal temperature increased from 24° C. to 34° C. within seconds. After 12 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 6.5 g (6×10$^5$ To/h) of polyethylene. DSC: Broad melt beginning approximately 60° C. with a maximum at 109° C. (80 J/g). GPC (trichlorobenzene, 135° C., polystyrene reference, results calculated as polyethylene using universal calibration theory): M$_n$=616,000; M$_w$=1,500,000; M$_w$/M$_n$=2.52. $^{13}$C-NMR analysis: total methyls/1000 CH$_2$ (32.0), methyl (24.6), ethyl (2.6), propyl (1.3), butyl (0.6), amyl. (1.3).

Example 359

A 1.2 mg (1.9×10$^{-6}$ mol) sample of [(2,6-i-PrPh)$_2$DABMe$_2$]NiBr$_2$ was placed in a Parr® 1000 mL stirred autoclave under argon. The autoclave was sealed and 200 mL of dry toluene was added. The reactor was purged with ethylene before addition of 2.0 mL of a 10% MAO solution in toluene. The autoclave was rapidly pressurized with ethylene to 4.1 MPa. After 12 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 7.2 g (7×10$^5$ TO/h) of polyethylene. GPC (trichlorobenzene, 135° C., polystyrene reference, results calculated as polyethylene using universal calibration theory): M$_n$=800,000; M$_w$=1,900,000; M$_w$/M$_n$=2.43. $^{13}$C-NMR analysis: total methyls/1000 CH$_2$ (18.7), methyl (14.9), ethyl (1.7), propyl (1.1), butyl (0.3), amyl (0.4).

Example 360

A 1.5 mg (2.4×10$^{-6}$ mol) sample of [(2,6-i-PrPh)$_2$DABMe$_2$]NiBr$_2$ and 200 mL of dry toluene was added to a Parr® 1000 mL stirred autoclave under an argon atmosphere. The reactor was heated to 50° C. and purged with ethylene before addition of 3.0 mL of a 7% MMAO solution in heptane. The autoclave was rapidly pressurized with ethylene to 690 kPa. After 10 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 6.25 g ($6 \times 10^5$ TO/h) of polyethylene. DSC: Broad melt beginning approximately −25° C. with a maximum at 50° C.; Tg=−36° C. GPC (trichlorobenzene, 135° C., polystyrene reference, results calculated as polyethylene using universal calibration theory): $M_n$=260,000; $M_w$=736,000; $M_w/M_n$=2.83.

Example 361

A 1.5 mg ($2.4 \times 10^{-6}$ mol) sample of [(2,6-i-PrPh)$_2$DABMe$_2$]NiBr$_2$ and 200 mL of dry toluene was added to a Parr® 1000 mL stirred autoclave under an argon atmosphere. The reactor was heated to 65° C. and purged with ethylene before addition of 3.0 mL of a 7% MMAO solution in heptane. The autoclave was rapidly pressurized with ethylene to 690 kPa. After 10 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 7.6 g ($7 \times 10^5$ TO/h) of polyethylene. DSC: Broad melt beginning approximately −50° C. with a maximum at 24° C. GPC (trichlorobenzene, 135° C., polystyrene reference, results calculated as polyethylene using universal calibration theory): $M_n$=176,000; $M_w$=438,000; $M_w/M_n$=2.49.

Example 362

A 1.5 mg ($2.4 \times 10^{-6}$ mol) sample of [(2,6-i-PrPh)$_2$DABMe$_2$]NiBr$_2$ and 200 mL of dry toluene was added to a Parr® 1000 mL stirred autoclave under an argon atmosphere. The reactor was heated to 80° C. and purged with ethylene before addition of 3.0 mL of a 7% MMAO solution in heptane. The autoclave was rapidly pressurized with ethylene to 690 kPa. After 10 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 1.0 g ($0.9 \times 10^5$ TO/h) of polyethylene. DSC: Broad melt beginning approximately −50° C. with a maximum at −12° C. GPC (trichlorobenzene, 135° C., polystyrene reference, results calculated as polyethylene using universal calibration theory): $M_n$=153,000; $M_w$=273,000; $M_w/M_n$=1.79.

Example 363

A 1.5 mg ($2.4 \times 10^{-6}$ mol) sample of [(2,6-i-PrPh)$_2$DABMe$_2$]NiBr$_2$ and 200 mL of dry toluene was added to a Parr® 1000 mL stirred autoclave under an argon atmosphere. The reactor was heated to 80° C. and purged with ethylene before addition of 3.0 mL of a 7% MMAO solution in heptane. The autoclave was rapidly pressurized with ethylene to 2.1 MPa. After 10 min, the ethylene was vented and acetone and water were added to quench the reaction. Solid polyethylene was recovered from the reactor collected and washed with 6 M HCl, H$_2$O, and acetone. The resulting polymer was dried under high vacuum overnight to yield 1.05 g ($0.9 \times 10^5$ TO/h) of polyethylene. DSC: Broad melt beginning approximately −25° C. with a maximum at 36° C.

Example 364

A standard solution of [(2,6-i-PrPh)$_2$DABAn]NiBr$_2$ was prepared as follows: 1,2-difluorobenzene (10 mL) was added to 6.0 mg of [(2,6-i-PrPh)$_2$DABAn]NiBr$_2$ ($8.4 \times 10^{-6}$ mol) in a 10 mL volumetric flask. The standard solution was transferred to a Kontes flask and stored under an argon atmosphere.

A 250 mL Schlenk flask was charged with 1 mL of a standard solution of [(2,6-i-PrPh)$_2$DABAn]NiBr$_2$ ($8.3 \times 10^{-7}$ mol), and 100 mL of dry, deaerated toluene. The flask was cooled to −20° C. in a dry ice isopropanol bath and filled with ethylene (100 kPa, absolute) before addition of 1.5 mL of a 10% MAO solution in toluene. After 30 min, acetone and water were added to quench the reaction. Solid polyethylene was recovered from the flask collected and washed with 6 M HCl, H$_2$O, and acetone. The resulting polymer was dried under high vacuum overnight to yield 0.8 g ($7 \times 10^4$ To/h) of polyethylene. GPC (trichlorobenzene, 135° C., polystyrene reference, results calculated as polyethylene using universal calibration theory): $M_n$=519,000; $M_w$=768,000; $M_w/M_n$=1.48.

Example 365

A 250 mL Schlenk flask was charged with 20 mg of [(2,6-i-PrPh)$_2$DABMe$_2$]NiBr$_2$ ($3.2 \times 10^{-5}$ mol), and 75 mL of dry, deaerated toluene. The flask was cooled to 0° C. filled with propylene (100 kPa absolute) before addition of 1.5 mL of a 10% MAO solution in toluene. After 30 min, acetone and water were added to quench the reaction. Solid polypropylene was recovered from the flask and washed with 6 M HCl, H$_2$O, and acetone. The resulting polymer was dried under high vacuum overnight to yield 0.15 g polypropylene. DSC: $T_g$=−31° C. GPC (trichlorobenzene, 135° C., polystyrene reference): $M_n$=25,000; $M_w$=37,000; $M_w/M_n$=1.47.

Example 366

Cyclopentene (16 μL, 10 eq) was added to a suspension of [(2,6-i-PrPh)$_2$DABAn]NiBr$_2$ (12 mg, $1.6 \times 10^{-5}$ mol) in 50 mL of dry toluene. A 10% MAO solution (1.5 mL) in toluene was added and the homogenous mixture stirred for 2 h at 25° C. After 2 h, the flask was filled with ethylene (100 kPa, absolute) and the reaction stirred for 15 min. Acetone and water were added to quench the polymerization and precipitate the polymer. Solid polyethylene was recovered from the flask collected and washed with 6 M HCl, H$_2$O, and acetone. The resulting polymer was dried under high vacuum overnight to yield 3.6 g (32,000 TO/h) polyethylene. GPC: (trichlorobenzene, 135° C., polystyrene reference, results calculated as polyethylene using universal calibration theory): $M_n$=87,000; $M_w$=189,000; $M_w/M_n$=2.16. A control experiment was run under identical conditions to that described above except no cyclopentene was added to stabilize the activated nickel complex. Polyethylene (380 mg, 3500 TO/h) was isolated. This example demonstrates the applicability of the Ni agostic cation as a potential soluble stable initiator for the polymerization of ethylene and other olefin monomers.

Example 367

1-Hexene (3 mL, 6 vol %) was added to a suspension of [(2,6-i-PrPh)$_2$DABAn]NiBr$_2$ (12 mg, $1.6 \times 10^{-5}$ mol) in 50 mL of dry toluene. The flask was cooled to −20° C. in a dry ice isopropanol bath and 1.5 mL of a 10% MAO solution in toluene was added. After stirring the reaction for 1.5 h, acetone and water were added to quench the polymerization and precipitate the polymer. Solid poly(1-hexene) was recovered from the flask collected and washed with 6 M HCl, H$_2$O, and acetone. The resulting polymer was dried under high vacuum overnight to yield 200 mg poly(1-hexene). GPC (trichlorobenzene, 135° C., polystyrene reference): $M_n$=44,000; $M_w$=48,000; $M_w/M_n$=1.09.

Example 368

1-Hexene (2.5 mL, 6 vol %) was added to a suspension of [(2,6-i-PrPh)$_2$DABAn]NiBr$_2$ (6 mg, $8.3 \times 10^{-6}$ mol) in 50 mL of dry toluene. The flask was cooled to −10° C. in a dry ice isopropanol bath and 1.5 mL of a 7% MMAO solution in heptane was added. After stirring the reaction for 1 h, acetone and water were added to quench the polymerization and precipitate the polymer. Solid poly(1-hexene) was recovered from the flask and washed with 6 M HCl, $H_2O$, and acetone. The resulting polymer was dried under high vacuum overnight to yield 250 mg poly(1-hexene). GPC (dichloromethane, polystyrene reference): $M_n$=51,000; $M_w$=54,000; $M_w/M_n$=1.06.

Example 369

Propylene (1 atm) was added to a Schlenk flask charged with a suspension of [(2,6-i-PrPh)$_2$DABAn]NiBr$_2$ (12 mg, 1.7×10$^{-5}$ mol) in 50 mL of dry toluene after cooling the mixture to −15° C. in a dry ice isopropanol bath. A 7% MMAO solution in heptane was added. After stirring the reaction for 30 min, acetone and water were added to quench the polymerization and precipitate the polymer. Solid polypropylene was recovered from the flask and washed with 6 M HCl, $H_2O$, and acetone. The resulting polymer was dried under high vacuum overnight to yield 800 mg polypropylene. GPC (dichloromethane, polystyrene reference): $M_n$=84,000; $M_w$=96,000; $M_w/M_n$=1.14.

Example 370

Propylene (100 kPa, absolute) was added to a Schlenk flask charged with a suspension of [(2,6-i-PrPh)$_2$DABAn]NiBr$_2$ (12 mg, 1.7×10$^{-5}$ mol) in 50 mL of dry toluene. After cooling the mixture to −15° C. in a dry ice isopropanol bath, a 7% MMAO solution in heptane was added. After stirring the reaction for 30 min, 5 mL of dry 1-hexene was added and the propylene removed in vacuo. The polymerization was allowed to stir for an additional 30 min before acetone and water were added to quench the polymerization and precipitate the polymer. Solid polypropylene-b-poly(1-hexene) was recovered from the flask and washed with 6 M HCl, $H_2O$, and acetone. The resulting polymer was dried under high vacuum overnight to yield 1.8 g polypropylene-b-poly(1-hexene). GPC (dichloromethane, polystyrene reference): $M_n$=142,000; $M_w$=165,000; $M_w/M_n$=1.16. $^1$H-NMR analysis: indicates the presence of both a polypropylene and poly(1-hexene) block. $^1$H-NMR also suggests that the DP of the propylene block is substantially higher than the DP of the 1-hexene block. DSC analysis: $T_g$=−18° C. corresponding to the polypropylene block. No other transitions were observed.

Example 371

1-Octadecene (4 mL, 8 vol %) was added to a suspension of [(2,6-i-PrPh)$_2$DABAn]NiBr$_2$ (12 mg, 1.6×10$^{-5}$ mol) in 50 mL of dry toluene. The flask was cooled to −10° C. in a dry ice isopropanol bath. and 2 mL of a 7% MMAO solution in heptane was added. After stirring the reaction for 1 h, acetone and water were added to quench the polymerization and precipitate the polymer. Solid poly(1-octadecene) was recovered from the flask collected and washed with 6 M HCl, $H_2O$, and acetone. The resulting polymer was dried under high vacuum overnight to yield 200 mg poly(1-octadecene). GPC (trichlorobenzene, 135° C., polystyrene reference): $M_n$=19,300; $M_w$=22,700; $M_w/M_n$=1.16. DSC: $T_m$=37° C. $^1$H-NMR (CDCl$_3$) analysis 47 branches/1000 C (theoretical 56 branches/1000 C).

Example 372

A 12-mg (0.022 mmol) sample of [(para-Me-Ph)$_2$DABMe$_2$]NiBr$_2$ was placed in a Parr® 1000 mL stirred autoclave under an argon atmosphere with 200 mL of dry toluene (reactor temperature was 65° C.). The reactor was purged with ethylene and 1.5 mL (100 eq) of a 10% MAO solution in toluene was added to the suspension. The autoclave was rapidly pressurized to 5.5 MPa and the reaction was stirred for 60 min. A 15° C. exotherm was observed. The oligomerization was quenched upon addition of acetone and water. The solvent was removed in vacuo resulting in 20 g of ethylene oligomers. $^1$H-NMR (CDCl$_3$) analysis 83% α-olefin.

Example 373

A 12-mg (.022 mmol) sample of [Ph$_2$DABAn]NiBr$_2$ was placed in a Parr® 1000 mL stirred autoclave under an argon atmosphere with 200 mL of dry toluene (reactor temperature was 55° C.). The reactor was purged with ethylene and 2 mL (100 eq) of a 7% MMAO solution in heptane was added to the suspension. The autoclave was rapidly pressurized to 5.5 MPa and the reaction was stirred for 60 minutes. A 18° C. exotherm was observed. The oligomerization was quenched upon addition of acetone and water. The solvent was removed in vacuo resulting in 26 g (corrected for loss of $C_4$, $C_6$, and $C_8$ during work-up) of ethylene oligomers. $^1$H-NMR (CDCl$_3$) and GC analysis: Distribution: $C_4$–$C_{18}$, $C_4$=6.0%, $C_6$=21%, $C_8$=22%, $C_{10}$=17%, $C_{12}$=16%, $C_{14}$=13%, $C_{16}$=5%, $C_{18}$=trace; 90% α-olefin.

Example 374

A 12-mg (0.022 mmol) sample of [Ph$_2$DABAn]NiBr$_2$ was placed in a Parr® 1000 mL stirred autoclave under an argon atmosphere with 200 mL of dry toluene (reactor temperature was 45° C.). The reactor was purged with ethylene and 2 mL (100 eq) of a 7% MMAO solution in heptane was added to the suspension. The autoclave was rapidly pressurized to 5.5 MPa and the reaction was stirred for 60 min. The oligomerization was quenched upon addition of acetone and water. The solvent was removed in vacuo resulting in 32 g (corrected for loss of $C_4$, $C_6$, and $C_8$ during work-up) of ethylene oligomers. $^1$H-NMR (CDCl$_3$) and GC analysis: Distribution: $C_4$–$C_{20}$, $C_4$=9.0%, $C_6$=19%, $C_8$=19%, $C_{10}$=15%, $C_{12}$=14%, $C_{14}$=11%, $C_{16}$=5%, $C_{18}$=4%, $C_{20}$=2%; 92% α-olefin.

Example 375

A 12-mg (0.022 mmol) sample of [(Ph)DABAn]NiBr$_2$ was placed in a 1000 mL stirred autoclave under an argon atmosphere with 200 mL of deaerated toluene (reactor temperature was 25° C.). The reactor was purged with ethylene and 2 mL (100 eq) of a 10% MAO solution in toluene was added to the suspension. The autoclave was rapidly pressurized to 2.1 MPa and the reaction was stirred for 30 min. A 20° C. exotherm was observed. The oligomerization was quenched upon addition of acetone and water. The solvent was removed in vacuo resulting in 16.1 g of a fluid/waxy mixture (50,000 TO/h based on isolated oligomer). $^1$H-NMR (CDCl$_3$) analysis 80% α-olefin. Distribution of isolated oligomers by GC analysis: $C_{10}$=20%, $C_{12}$=28%, $C_{14}$=23%, $C_{16}$=15%, $C_{18}$=10%, $C_{20}$=4%. All $C_4$, $C_6$, $C_8$ and some $C_{10}$ was lost during work-up.

Example 376

A 12-mg (0.022 mmol) sample of [(Ph)DABAn]NiBr$_2$ was placed in a 1000 mL stirred autoclave under an argon atmosphere with 200 mL of deaerated toluene (reactor temperature was 25° C.). The reactor was purged with ethylene and 2 mL (100 eq) of a 10% MAO solution in toluene was added to the suspension. The autoclave was rapidly pressurized to 4.1 MPa and the reaction was stirred for 60 minutes. A 20° C. exotherm was observed. The oligomerization was quenched upon addition of acetone and water. The solvent was removed in vacuo resulting in 28.3 g of crude product (50,000 TO/h based on isolated oligomer). Trace Al was removed by an aqueous/organic work-up of the crude mixture. $^1$N-NMR (CDCl$_3$) analysis 85% α-olefin. Distribution of isolated oligomers by GC analysis: C$_{10}$=13%, C$_{12}$=30%, C$_{14}$=26%, C$_{16}$=18%, C$_{18}$=10%, C$_{20}$=3%. All C$_4$, C$_6$, C$_8$ and some C$_{10}$ was lost during work-up.

Example 377

A 12-mg (0.022 mmol) sample of [(Ph)DABAn]NiBr$_2$ was placed in a 1000 mL stirred autoclave under an argon atmosphere with 200 mL of deaerated toluene (reactor temperature was 25° C.). The reactor was purged with ethylene and 2 mL (100 eq) of a 10% MAO solution in toluene was added to the suspension. The autoclave was rapidly pressurized to 6.7 MPa and the reaction was stirred for 60 min. A 15° C. exotherm was observed. The oligomerization was quenched upon addition of acetone and water. The solvent was removed in vacuo resulting in 21.6 g of crude product (40,000 TO/h based on isolated oligomer). $^1$H-NMR (CDCl$_3$) analysis 93% α-olefin. Distribution of isolated oligomers by GC analysis: C$_{10}$=13%, C$_{12}$=27%, C$_{14}$=26%, C$_{16}$=18%, C$_{18}$=12%, C$_{20}$=5%. All C$_4$, C$_6$, C$_8$ and some C$_{10}$ was lost during work-up.

Example 378

A 12-mg (0.022 mmol) sample of [Ph$_2$DABAn]NiBr$_2$ was placed in a 1000 mL stirred autoclave under an argon atmosphere with 200 mL of dry toluene (reactor temperature was 50° C.). The reactor was purged with ethylene and 2 mL (100 eq) of a 10% MAO solution in toluene was added to the suspension. The autoclave was rapidly pressurized to 5.5 MPa and the reaction was stirred for 60 minutes. A 15° C. exotherm was observed. The oligomerization was quenched upon addition of acetone and water. The solvent was removed in vacuo resulting in 22.3 g of crude product (40,000 TO/h based on isolated oligomer). $^1$N-NMR (CDCl$_3$) analysis 92% α-olefin. Distribution of isolated oligomers by GC analysis: C$_{10}$=10%, C$_{12}$=28%, C$_{14}$=25%, C$_{16}$=19%, C$_{18}$=12%, C$_{20}$=6%. All C$_4$, C$_6$, C$_8$ and some C$_{10}$ was lost during work-up.

Examples 379–393

General Procedure for Copolymerizations (a) Experiments at Ambient Pressure: A Schlenk flask containing the catalyst precursor was cooled to −78° C., evacuated, and placed under an ethylene atmosphere. In subsequent additions, methylene chloride and the acrylate were added to the cold flask via syringe. The solution was allowed to warm to room temperature and stirred with a magnetic stir bar. After the specified reaction time, the reaction mixture was added to ~600 mL of methanol in order to precipitate the polymer. Next, the methanol was decanted off of the polymer, which was then dissolved in ~600 mL of Et$_2$O or petroleum ether. (For copolymerizations with FOA, a second precipitation of the polymer solution into methanol was often necessary in order to remove all of the acrylate from the polymer.) The solution was filtered though a plug of Celite® and/or neutral alumina, the solvent was removed, and the polymer was dried in vacuo for several days. The copolymers were isolated as clear, free-flowing or viscous oils. The copolymers were often darkened by traces of palladium black, which proved difficult to remove in some cases. Polymers with high FOA incorporation were white, presumably due to phase separation of the fluorinated and hydrocarbon segments.

(b) Experiments at Elevated Pressure: Reactions were carried out in a mechanically stirred 300 mL Parr® reactor, equipped with an electric heating mantle controlled by a thermocouple dipping into the reaction mixture. A solution of 0.1 mmol of catalyst precursor in methylene chloride, containing the functionalized comonomer (5–50 mL, total volume of the liquid phase: 100 mL), was transferred via cannula to the reactor under a nitrogen atmosphere. After repeatedly flushing with ethylene or propylene, constant pressure was applied by continuously feeding the gaseous olefin and the contents of the reactor were vigorously stirred. After the specified reaction time, the gas was vented. Volatiles were removed from the reaction mixture in vacuo, and the polymer was dried under vacuum overnight. In representative runs, the volatile fraction was analyzed by GC for low-molecular-weight products. Residual monomers (tBuA, FOA) or homooligomers of the functionalized comonomer (MVK) were removed by precipitating the polymer from methylene chloride solution with methanol. This procedure did not significantly alter the polymer composition.

Copolymer Spectral Data. In addition to the signals of the methyl, methylene and methine groups originating from ethylene or propylene, the $^1$H and $^{13}$C NMR spectra of the copolymers exhibit characteristic resonances due to the functionalized comonomer. The IR-spectra display the carbonyl band of the functional groups originating from the comonomer.

Ethylene-MA Copolymer:. $^1$H NMR (CDCl$_3$, 400 MHz) δ 3.64 (s, OCH$_3$), 2.28 (t, J=7, CH$_2$C(O)), 1.58 (m, CH$_2$CH$_2$C(O)); $^{13}$C NMR (C$_6$D$_6$, 100 MHz) δ 176 (C(O)), 50.9 (OCH$_3$); IR (film): 1744 cm$^{-1}$ [v(C(O))]. Ethylene-FOA Copolymer: $^1$H NMR (CDCl$_3$, 400 MHz) δ 4.58 (t, J$_{HF}$=14, OCH$_2$(CF$_2$)$_6$CF$_3$), 2.40 (t, J=7, CH$_2$C(O)), 1.64 (m, CH$_2$CH$_2$C(O)); $^{13}$C NMR (CDCl$_3$, 100 MHz) δ 172.1 (C(O)), 59.3 (t, J$_{CF}$=27, OCH$_2$(CF$_2$)$_6$CF$_3$); IR (film): 1767 cm$^{-1}$ [v(C(O))]. Ethylene-tBuA Copolymer: $^1$H NMR (CDCl$_3$, 300 MHz) δ 2.18 (t, J=7, CH$_2$C(O)), 1.55 (m, CH$_2$CH$_2$C(O)), 1.42 (s, OCMe$_3$); $^{13}$C NMR (CDCl$_3$, 62 MHz) δ 173.4 (C(O)); IR (film): 1734 cm$^{-1}$ (CO). Ethylene-MVK Copolymer: $^1$H NMR (CDCl$_3$, 250 MHz) δ 2.39 (t, J=7, CH$_2$C(O)), 2.11 (s, C(O)CH$_3$), 1.5 (m, CH$_2$CH$_2$C(O)); $^{13}$C NMR (CDCl$_3$, 62 MHz) δ 209 (C(O)); IR (film): 1722 cm$^{-1}$ [v(C(O))]. Propylene-MA Copolymer: $^1$H NMR (CDCl$_3$, 250 MHz) δ 3.64 (s, OCH$_3$), 2.3 (m, CH$_2$C(O)); $^{13}$C NMR (CDCl$_3$, 62 MHz) δ 174.5 (C(O)), 51.4 (OCH$_3$); IR (film): 1747 cm$^{-1}$ [v(C(O))]. Propylene-FOA Copolymer: $^1$H NMR (CDCl$_3$, 250 MHz) δ 4.57 (t, J$_{HF}$=14, OCH$_2$(CF$_2$)$_6$CF$_3$), 2.39 (m, CH$_2$C(O)); $^{13}$C NMR (CDCl$_3$, 62 MHz) δ 172.2 (C(O)), 59.3 (t, J$_{CF}$=27, OCH$_2$(CF$_2$)$_6$CF$_3$); IR (film): 1767 cm$^{-1}$ [v(C(O))].

Results of the various polymerization are given in the Table below.

| | | | Ex. | | | | | | |
|---|---|---|---|---|---|---|---|---|---|
| | | | react. | | results | | | polymer | |
| | | monomers | conc. | | mass | comon.- | TON[e] | $M_n^f$ | |
| Ex. | cat.[b] | [c] | comon. | p(atm) | polymer | incorp.[d] | E. re. p   Comon. | $(\times 10^{-3})$ | M/M |
| 379 | 6b | E/MA | 0.6M | 2 | 22.2 | 1.0% | 7710   78 | 88 | 1.8 |
| 380 | 6b | E/MA | 2.9M | 2 | 4.3 | 6.1% | 1296   84 | 26 | 1.6 |
| 381 | 6b | E/MA | 5.8M | 2 | 1.8 | 12.1% | 455   63 | 11 | 1.6 |
| 382 | 6b | E/MA | 5.8M | 6 | 11.2 | 4.0% | 3560   148 | 42 | 1.8 |
| 383 | 6a | E/MA | 5.8M | 6 | 1.2 | 5.0% | 355   19 | 0.3[g] | — |
| 384 | 6b | E/MA | 5.8M | 6 | 1.2 | 4.7% | 364   18 | 10 | 1.8 |
| 385 | 6b | E/tBuA | 3.4M | 6 | 2.8 | 0.7% | 956   7 | 25 | 1.6 |
| 386 | 6b | E/tBuA | 0.4M | 1 | 1.9 | 0.4% | 665   3 | 6 | 1.8 |
| 387 | 1a | E/FOA | 0.6M | 1 | 1.5 | 0.3% | 506   2 | 3 | 1.6 |
| 388 | 1b | E/FOA | 0.6M | 1 | 27.5 | 0.6% | 8928   55 | 106 | 3.1 |
| 389 | 6b | E/FOA | 1.8 | 1 | 9.5 | 0.9% | 2962   27 | 95 | 2.7 |
| 390 | 6b | E/MVK | 3.0M | 6 | 1.8 | 1.3% | 626   8 | 7 | 1.5 |
| 391 | 6b | E | — | 6 | 10.3 | — | 37127 | 384 | 3.1 |
| 392 | 6b | P/MA | 0.6M | 6 | 5.0 | 1.1% | 1179   13 | 37 | 1.8 |
| 393 | 6b | P/FOA | 1.8M | 2 | 1.0 | 5.6% | 145   9 | 18 | 1.8 |

[a]0.1 mmol catalyst (Ex. 391: 0.01 mmol); solvent: $CH_2Cl_2$ (total volume $CH_2Cl_2$ and comonomer: 100 mL; Ex. 387 & 388: 60 mL) temperature: 35° C. (Ex. 386–389 & 391° C.); reaction time: 18.5 h (Ex. 386–388: 24 h; Ex. 389, 37 h);
[b]Complexes 6: {[(2,6-i-PrPh)$_2$DABR$_2$]Pd[CH$_2$CH$_2$CH$_2$C(O)OMe]}BAF (6a); R = Me (6b)); Complexes 1:{[(2,6-i-PrPh)$_2$DABR$_2$] Pd(Me)(OEt$_2$)}BAF; R = H (1a); R = Me (1b));
[c]Ethylene (E), propylene (P), methyl acrylate (MA), tert-butyl acrylate (tBuA), $H_2C$=CHC(O)OCH$_2$(CF$_2$)$_6$CF$_3$ (FOA), methyl vinyl ketone (MVK).
[d]In mol %.
[e]Turnover number = moles of substrate converted per mole of catalyst.
[f]Determined by GPC vs. polystyrene standards;
[g]determined by $^1$H NMR spectroscopy of the non-volatile product fraction; ~0.5 g of volatile products formed additionally;
[h]Branching: Ethylene Copolymers: ~100 methyl groups/1000 carbon atoms (Tg's: ~–77—67° C.); Propylene Copolymers: ~210 methyl groups/1000 carbon atoms.

Example 394

Et$_2$O (30 mL) was added to a round bottom flask containing 445 mg (1.10 mmol) of (2,6-i-PrPh)$_2$DABMe$_2$ and 316 mg (1.15 mmol) of Ni(COD)$_2$. Methyl acrylate (100 µL) was then added to the flask via microliter syringe. The resulting blue solution was stirred for several hours before the Et$_2$O was removed in vacuo. The compound was then dissolved in petroleum ether and the resulting solution was filtered and then cooled to –35° C. in the drybox freezer. Purple single crystals of [(2,6-i-PrPh)$_2$DABMe$_2$]Ni[H$_2$C=CHCO(OMe)] were isolated: $^1$H NMR (CD$_2$Cl$_2$, 300 MHz, –40° C.) δ 7.4–7.2 (m, 6, H$_{aryl}$), 3.74 (br septet, 1, CHMe$_2$), 3.09 (septet, 1, J=6.75, CHMe$_2$), 2.93 (septet, 1, J=6.75, C"HMe$_2$), 2.85 (s, 3, OMe), 2.37 (br septet, 1, C'''HMe$_2$), 2.10 (dd, 1, J=13.49, 8.10, H$_2$C=CHC(O)OMe), 1.66 (dd, 1, J=13.49, 4.05, HH'C=CHC(O)OMe), 1.41 (d, 3, J=6.75, CHMeMe'), 1.35 (dd, 1, J=8.10, 4.05, HH'C=CHC(O)OMe), 1.26 (d, 3, J=8.10, C"HMeMe'), 1.24 (d, 3, J=8.09, C'HMeMe'), 1.13 (d, 3, J=6.75, C'HMeMe'), 1.09–1.03 (doublets, 12, CHMeMe', C"HMeMe', C'''HMeMe'), 0.79 and 0.62 (s, 3 each, N=C(Me)—C'(Me)=N); $^{13}$C NMR (CD$_2$Cl$_2$, 300 MHz, –20° C.) δ 174.2 (C(O)OMe), 166.6 and 165.5 (N=C—C'=N), 147.9 and 146.8 (Ar, Ar': C$_{ipso}$), 139.5, 139.0, 138.2 and 137.7 (Ar: C$_o$, C'$_o$ and Ar': C$_o$, C'$_o$), 125.6 and 125.4 (Ar, Ar': C$_p$), 123.5, 123.4, 123.3 and 123.0 (Ar: C$_m$, C'$_m$ and Ar': C$_m$, C'$_m$), 49.9 and 39.8 (H$_2$C=CHC(O)OMe), 28.8, 28.5, 28.4 and 28.3 (CHMe$_2$, C'HMe$_2$, C"HMe$_2$, C'''HMe$_2$), 26.1 (H$_2$C=CHC(O)OMe), 24.3, 23.8, 23.6, 23.4, 23.0, 22.9, 22.7 and 22.7 (CHMeMe', C'HMeMe', C"HMeMe', C'''HMeMe'), 20.21 and 20.16 (N=C(Me)—C(Me)=N).

Example 395

In a nitrogen-filled drybox, 289 mg (0.525 mmol) of [(2,6-i-PrPh)$_2$DABMe$_2$Ni(H$_2$C=CHCO(OMe))] and 532 mg (0.525 mmol) of H(OEt$_2$)$_2$BAF were placed together in a round bottom flask. The flask was cooled in the –35° C freezer before adding 20 mL of cold (–35° C.) Et$_2$O to it. The reaction mixture was then allowed to warm to room temperature as it was stirred for 2 h. The solution was then filtered and the solvent was removed in vacuo to yield 594 mg (80.1%) of the 4-membered chelate, {[(2,6-i-PrPh)$_2$DABMe$_2$]Ni[CHMeC(O)OMe]}BAF, as a burnt orange powder: $^1$H NMR (CD$_2$Cl$_2$, 300 MHz, rt) δ 7.72 (s, 8, BAF: H$_o$), 7.56 (s, 4, BAF: H$_p$), 7.5–7.2 (m, 6, H$_{aryl}$), 3.52 (s, 3, OMe), 3.21 (q, 1, J=6.75, CHMeC(O)OMe), 3.45, 3.24, 3.02 and 3.02 (septet, 1 each, CHMe$_2$, C'HMe$_2$, C"HMe$_2$ and C'''Me$_2$), 2.11 and 2.00 (s, 3 each, N=C(Me)—C(Me)=N), 1.55, 1.50, 1.47, 1.33, 1.28, 1.24, 1.23 and 1.17 (d, 3 each, CHMeMe', C'HMeMe', C"HMeMe' and C'''HMeMe'), –0.63 (d, 3, J=6.75, CHMeC(O)OMe); $^{13}$C NMR (CD$_2$Cl$_2$, 300 MHz, rt) δ 178.2, 177.0 and 174.1 (C(O)OMe, N=C—C'=N), 162.2 (q, J$_{CB}$=49.7, BAF: C$_{ipso}$), 141.2 and 139.8 (Ar, Ar': C$_{ipso}$), 139.4, 138.89, 138.79 and 138.40 (Ar, Ar': C$_o$, C$_o$'), 135.2 (BAF: C$_o$), 130.0 and 129.6 (Ar, Ar': C$_p$, C$_p$'), 129.3 (q, BAF: C$_m$), 125.6, 125.2, 125.0 and 124.7 (Ar, Ar': C$_m$, C'$_m$), 125.0 (q, J$_{CF}$=272.5, BAF: CF$_3$), 117.9 (BAF: C$_p$), 53.6 (OMe), 30.3, 30.0, 29.9 and 29.8 (CHMe$_2$, C'HMe$_2$, C"HMe$_2$, C'''HMe$_2$), 24.5, 24.1, 24.0, 23.7, 23.33, 23.26, 23.1 and 23.1 (CHMeMe', C'HMeMe', C"HMeMe', C""HMeMe'), 20.6 and 19.5 (N=C—C'=N), 6.9 (CHMeC(O)OMe).

Examples 396–400

Polymerization of ethylene by {[(2,6-i-PrPh)$_2$DABMe$_2$]Ni[CHMeC(O)OMe]}BAF. This compound was used to catalyze the polymerization of polyethylene at temperatures between RT to 80° C. Addition of a Lewis acid often resulted in improved yields of polymer.

General Polymerization Procedure for Examples 396–400. In the drybox, a glass insert was loaded with {[(2,6-i-PrPh)$_2$DABMe$_2$]Ni[CHMeC(O)OMe]}BAF. In addition, 2 equiv of a Lewis acid (when used) was added to the insert. The insert was cooled to −35° C. in a drybox freezer, 5 mL of deuterated solvent was added to the cold insert, and the insert was then capped and sealed. Outside of the drybox, the cold tube was placed under 6.9 MPa of ethylene and allowed to warm to RT or 80° C. as it was shaken mechanically for 18 h. An aliquot of the solution was used to acquire a $^1$H NMR spectrum. The remaining portion was added to ~20 mL of MeOH in order to precipitate the polymer. The polyethylene was isolated and dried under vacuum.

Example 396

Polymerization Conditions: {[(2,6-i-PrPh)$_2$DABMe$_2$]Ni[CHMeC(O)OMe]}BAF (84.8 mg, 0.06 mmol); No Lewis Acid; C$_6$D$_6$; RT. No polymer was isolated and polymer formation was not observed in the $^1$H NMR spectrum.

Example 397

Polymerization Conditions: {[(2,6-i-PrPh)$_2$DABMe$_2$]Ni[CHMeC(O)OMe]}BAF (84.8 mg, 0.06 mmol); 2 Equiv BPh$_3$; C$_6$D$_6$, RT. Solid white polyethylene (0.91 g) was isolated.

Example 398

Polymerization Conditions: {[(2,6-i-PrPh)$_2$DABMe$_2$]Ni[CHMeC(O)OMe]}BAF (84.8 mg, 0.06 mmol); 2 Equiv B[3,5-trifluoromethylphenyl]$_3$; C$_6$D$_6$, RT. Solid white polyethylene (0.89 g) was isolated.

Example 399

Polymerization Conditions: {[(2,6-i-PrPh)$_2$DABMe$_2$]Ni[CHMeC(O)OMe]}BAF; 2 Equiv BPh$_3$; C$_6$D$_6$, 80° C. Polyethylene (4.3 g) was isolated as a spongy solid.

Example 400

Polymerization Conditions: {[(2,6-i-PrPh)$_2$DABMe$_2$]Ni[CHMeC(O)OMe]}BAF (84.8 mg, 0.06 mmol); No Lewis Acid; CDCl$_3$, 80° C. Polyethylene (2.7 g) was isolated as a spongy solid.

Example 401

An NMR tube was loaded with {[(2,6-i-PrPh)$_2$DABH$_2$]NiMe(OEt$_2$)}BAF. The tube was capped with a septum, the septum was wrapped with Parafilm®, and the tube was cooled to −78° C. CD$_2$Cl$_2$ (700 μL) and one equiv of methyl acrylate were added to the cold tube in subsequent additions via gastight microliter syringe. The tube was transferred to the cold NMR probe. Insertion of methyl acrylate and formation of the 4-membered chelate complex, {[(2,6-i-PrPh)$_2$DABH$_2$]Ni[CHEtC(O)OMe]}BAF, was complete at −10° C.: $^1$H NMR (CD$_2$Cl$_2$, 400 MHz, −10° C.) δ 8.23 and 8.03 (s, 1 each, N═C(H)—C'(H)═N), 7.72 (s, 8, BAF: H$_o$), 7.55 (s, 4, BAF: H$_p$), 7.5–7.2 (m, 6, H$_{aryl}$), 3.69, 3.51, 3.34 and 3.04 (septet, 1 each, CHMe$_2$, C'HMe$_2$, C''HMe$_2$ and C'''HMe$_2$), 3.58 (s, 3, OMe), 1.48, 1.46, 1.46, 1.45, 1.30, 1.27, 1.193 and 1.189 (d, 3 each, J=6.5–7.3, CHMeMe', C'HMeMe', C''HMeMe' and C'''HMeMe'), 0.79 and −0.52 (m, 1 each, CH(CHH'CH$_3$), 0.68 (t, 3, J=6.9, CH(CH$_2$CH$_3$), (CHEt signal was not assigned due to overlap with other protons).

Example 402

A solution of the 4-membered chelate complex {[(2,6-i-PrPh)$_2$DABH$_2$]Ni[CHEtC(O)OMe]}BAF was allowed to stand at RT for 1 day. During this time, conversion to the 6-membered chelate complex, {[(2,6-i-PrPh)$_2$DABH$_2$]Ni[CH$_2$CH$_2$CH$_2$C(O)OMe]}BAF, was complete: $^1$H NMR (CD$_2$Cl$_2$, 400 MHz, rt) δ 8.47 and 8.01 (s, 1 each, N═C(H)—C'(H)═N), 7.72 (s, 8, BAF: H$_o$), 7.56 (s, 4, BAF: H$_p$), 7.5–7.0 (m, 6, H$_{aryl}$), 3.61 (s, 3, OMe), 3.45 and 3.09 (septet, 2 each, CHMe$_2$ and C'HMe$_2$), 2.25 (t, 2, J 7.3, CH$_2$C(O)), 1.61 (pentet, 2, J=7.3, NiCH$_2$CH$_2$CH$_2$), 1.50, 1.50, 1.46, and 1.30 (d, 6 each, J=6.8–6.9, CHMeMe', C'HMeMe'), 0.92 (t, 2, J=7.4, NiCH$_2$).

Examples 403–407

These Examples illustrate the formation of metallacycles of the formula shown on the right side of the equation, and the use of these metallacycles as polymerization catalysts.

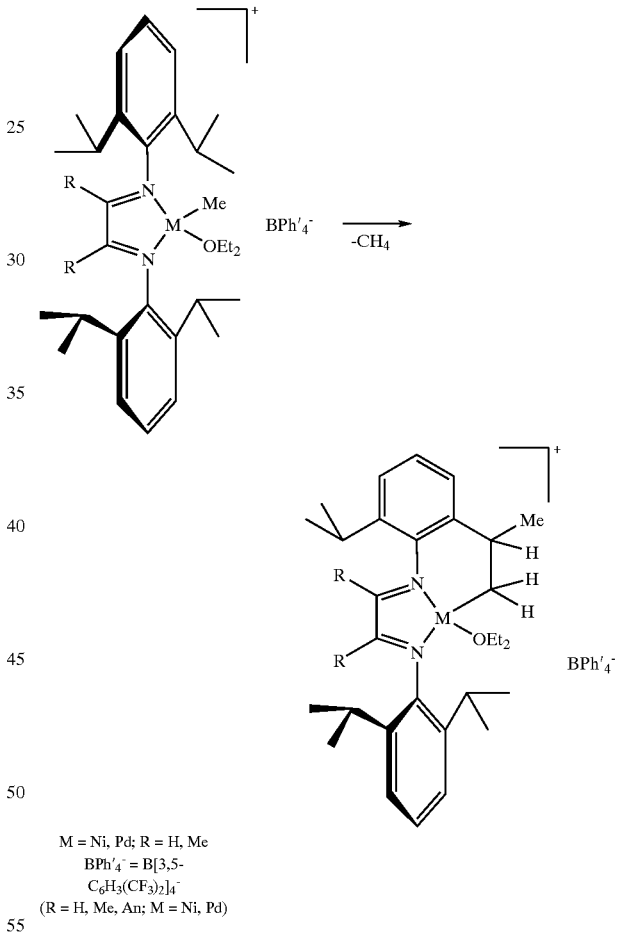

M = Ni, Pd; R = H, Me
BPh'$_4^-$ = B[3,5-C$_6$H$_3$(CF$_3$)$_2$]$_4^-$
(R = H, Me, An; M = Ni, Pd)

In the absence of olefin, the ether-stabilized catalyst derivatives were observed to decompose in CD$_2$Cl$_2$ solution with loss of methane. For the catalyst derivative where M=Pd and R=H, methane loss was accompanied by clean and selective formation of the metallacycle resulting from C—H activation of one of the aryl i-propyl substituents. This metallacycle could be isolated, although not cleanly, as its instability and high solubility prevented recrystallization. Also it could be converted to another metallacycle in which the diethyl ether ligand is replaced by an olefin ligand, especially ethylene.

Example 403

A 700 µL $CD_2Cl_2$ solution of {[(2,6-i-PrPh)$_2$DABH$_2$]PdMe(OEt$_2$)}BAF (68.4 mg) was allowed to stand at room temperature for several hours and then at −30° C. overnight. Such highly concentrated solutions of the resulting metallacycle wherein R is H and M is Pd were stable for hours at room temperature, enabling $^1$H and $^{13}$C NMR spectra to be acquired: $^1$H NMR ($CD_2Cl_2$, 400 MHz, 41° C.) δ 8.17 (s, 2, N═C(H)—C'(H)═N), 7.75 (s, 8, BAF: H$_o$), 7.58 (s, 4, BAF: H$_p$), 7.5–7.0 (m, 6, H$_{aryl}$), 3.48 (q, 4, J=6.88, O(CH$_2$CH$_3$)$_2$), 3.26 (septet, 1, J=6.49, CHMe$_2$), 3.08 (septet, 1, J=6.86, C'HMe$_2$), 2.94 (septet, 1, J=6.65, C''HMe$_2$), 2.70 (dd, 1, J=6.67, 0.90, CHMeCHH'Pd), 2.43 (dd, 1, J=7.12, 4.28, CHMeCHH'Pd), 2.23 (br m, 1, CHMeCH$_2$Pd), 1.54 (d, 3, J=6.86, CHMeCH$_2$Pd), 1.43 (d, 3, J=6.79, C''HMeMe'), 1.40 (d, 3, J=7.12, CHMeMe'), 1.37 (d, 3, J=6.95, C'HMeMe'), 1.27 (d, 6, J=6.79, C'HMeMe', C''HMeMe'), 1.12 (d, 3, J=6.54, CHMeMe'), 1.23 (br m, 6, O(CH$_2$CH$_3$)$_2$), 0.21 (CH$_4$); $^{13}$C NMR ($CD_2Cl_2$, 400 MHz, 41° C.) δ 162.5 ($J_{CH}$=181.5, N═C(H)), 162.3 (q, $J_{BC}$=49.8, BAF: $C_{ipso}$), 161.2 ($J_{CH}$=178.4, N═C'(H)), 145.8 and 144.5 (Ar, Ar': $C_{ipso}$), 141.6, 140.7, 140.3 and 138.8 (Ar, Ar': $C_{ipso}$), 135.3 (BAF: $C_o$), 131.6 and 129.8 (Ar, Ar': $C_p$), 129.4 (q, $J_{CF}$=29.9, BAF: CF$_3$), 128.1, 127.6, 125.2 and 124.5 (Ar, Ar': $C_o$, $C_o$'), 125.1 (BAF: CF$_3$), 118.0 (BAF: $C_p$), 72 (br, O(CH$_2$CH$_3$)$_2$), 43.2 (CHMeCH$_2$Pd), 40.5 (CHMeCH$_2$Pd), 29.5, 29.1 and 28.8 (CHMe$_2$, C'HMe$_2$, C''HMe$_2$), 26.2 (br), 25.3, 25.2, 25.1, 24.5 (br), 23.3 and 22.1 (CHMeMe', C'HMeMe', C''HMeMe', CHMeCH$_2$Pd), 15.5 (br, O(CH$_2$CH$_3$)$_2$), −14.8 (CH$_4$).

Example 404

Addition of ethylene to a $CD_2Cl_2$ solution of the compound prepared in Example 403 resulted in loss of ether and formation of the corresponding ethylene adduct (spectral data: see Example 405.) Warming of the ethylene adduct in the presence of excess ethylene resulted in branched polymer formation: 1.3 ppm (CH$_2$)$_n$, 0.9 ppm (CH$_3$). For the ethylene polymerization initiated by this metallacycle, rates of initiation were significantly slower than rates of propagation.

Example 405

The metallacycle of Example 403 wherein the diethyl ether ligand was replaced by an ethylene ligand was stable enough so that NMR spectra could be obtained. $^1$H NMR ($CD_2Cl_2$, 400 MHz, −61° C.) δ 8.25 and 8.23 (N═C(H)—C'(H)═N), 7.74 (s, 8, BAF: H$_o$), 7.55 (s, 4, BAF: H$_p$), 7.55–7.16 (m, 6, H$_{aryl}$), 4.67 (m, 2, HH'C═CHH'), 4.40 (m, 2, HH'C═CHH'), 2.95 (septet, 1, J=6.30, CHMe$_2$), 2.80 (septet, 2, J=6.36, C'HMe$_2$ and C''HMe$_2$), 2.53 (br m, 1, CHMeCH$_2$Pd), 2.43 (d, 1, J=8.16, CHMeCHH'Pd), 1.73 (dd, 1, J=8.16, 2.84, CHMeCHH'Pd), 1.45 and 1.19 (d, 3 each, J=6.79–6.40, CHMeMe'), 1.42 (d, 3, J=7.05, CHMeCH$_2$Pd), 1.30, 1.30, 1.19 and 0.99 (d, 3 each, J=6.40–6.65, C'HMeMe' and C''HMeMe'); $^{13}$C NMR ($CD_2Cl_2$, 400 MHz, −61° C.) δ 162.7 ($J_{CH}$=179.7, N═CH), 162.1 ($J_{CH}$=180.9, N═C'H), 161.6 (q, $J_{CB}$=49.7, BAF: $C_{ipso}$), 144.7, 141.7, 141.2, 139.2, 137.5 and 137.1 (Ar, Ar': $C_{ipso}$, $C_o$, C'$_o$), 134.6 (BAF: $C_o$), 131.0 and 129.0 (Ar, Ar': $C_p$), 128.6 (q, BAF: $C_m$), 124.4 (q, $J_{CF}$=272.5, BAF: CF$_3$), 124.6 and 124.0 (Ar, Ar': $C_m$), 117.4 (BAF: $C_p$), 92.3 ($J_{CH}$=162.4, H$_2$C═CH$_2$)), 45.1 (CH$_2$Pd), 41.1 (CHMeCH$_2$Pd), 28.9, 28.5 and 28.2 (CHMe$_2$, C'HMe$_2$, C''HMe$_2$), 26.1, 25.6, 25.1, 24.9, 24.6, 22.9 and 21.4 (CHMeMe', C'HMeMe', C''HMeMe', CHMeCH$_2$Pd).

Example 406

In a nitrogen-filled drybox, 30 mL of THF was added to a flask containing (2,6-i-PrPh)$_2$DABAn (1.87 g, 3.72 mmol) and Ni(COD)$_2$ (1.02 g, 3.72 mmol). The resulting purple solution was stirred for several hours before removing the solvent in vacuo. The product was dissolved in a minimum amount of pentane and the resulting solution was filtered and then placed in the drybox freezer (−35° C.) to recrystallize. Purple crystals of [(2,6-i-PrPh)$_2$DABAn]Ni(COD) were isolated (1.33 g, 53.5%, first crop). $^1$H NMR ($CD_2Cl_2$, 300 MHz, rt) δ 7.77 (d, 2, J=8.06, H$_{aryl}$), 7.44 (t, 2, J=7.52, H$_{aryl}$), 7.33 (d, 2, J=7.70, H$_{aryl}$), 6.89 (t, 2, J=7.70, H$_{aryl}$), 6.13 (d, 2, J=6.13, H$_{aryl}$), 3.93 (br s, 4, COD: —HC═CH—), 3.48 (septet, 4, J=6.87, CHMe$_2$), 2.54 (br m, 4, COD: —CHH'—), 1.51 (m, 4, COD: —CHH'—), 1.37 (d, 12, J=6.60, CHMeMe'), 0.77 (d, 12, J=6.60, CHMeMe'); $^{13}$C NMR ($CD_2Cl_2$, 75.5 MHz, rt) δ 151.7, 151.6, 138.5, 137.1, 133.0, 132.1, 128.8, 125.6, 123.8, 123.7, 119.0 ($C_{aryl}$), 88.7 (COD: —HC═CH—), 29.9 (COD: —CH$_2$—), 28.0, 25.1 and 23.8 (CHMeMe').

Example 407

In the drybox, a glass insert was loaded with 35.2 mg (0.0527 mmol) of [(2,6-i-PrPh)$_2$DABAn]Ni(COD) and 55.2 mg (0.0545 mmol) of H(OEt$_2$)$_2$BAF. The insert was cooled to −35° C. in the drybox freezer, 5 mL of CDCl$_3$ was added to the cold insert, and the insert was then capped and sealed. Outside of the drybox, the cold tube was placed under 6.9 MPa of ethylene and allowed to warm to rt as it was shaken mechanically for 18 h. An aliquot of the solution was used to acquire a $^1$H NMR spectrum. The remaining portion was added to ~20 mL of MeOH in order to precipitate the polymer. The polyethylene (6.1 g) was isolated and dried under vacuum.

Examples 408–412

(acac)NiEt(PPh$_3$) was synthesized according to published procedures (Cotton, F. A.; Frenz, B. A.; Hunter, D. L. J. Am. Chem. Soc. 1974, 96, 4820–4825).

General Polymerization Procedure for Examples 408–412. In the drybox, a glass insert was loaded with 26.9 mg (0.06 mmol) of (acac)NiEt(PPh$_3$), 53.2 mg (0.06 mmol) of NaBAF, and 0.06 mmol of an α-diimine ligand. In addition, 2 equiv of a phosphine scavenger such as BPh$_3$ or CuCl was sometimes added. The insert was cooled to −35° C. in the drybox freezer, 5 mL of $C_6D_6$ was added to the cold insert, and the insert was then capped and sealed. Outside of the drybox, the cold tube was placed under 6.9 MPa of ethylene and allowed to warm to RT as it was shaken mechanically for 18 h. An aliquot of the solution was used to acquire a $^1$H NMR spectrum. The remaining portion was added to ~20 mL of MeOH in order to precipitate the polymer. The polyethylene was isolated and dried under vacuum.

Example 408

The α-diimine was (2,6-i-PrPh)$_2$DABMe$_2$. Solid white polyethylene (1.6 g) was isolated.

Example 409

The α-diimine was (2,6-i-PrPh)$_2$DABMe$_2$, and 29.1 mg of BPh$_3$ was also added. Solid white polyethylene (7.5 g) was isolated.

Example 410

The α-diimine was (2,6-i-PrPh)$_2$DABMe$_2$, and 11.9 of CuCl was also added. Solid white polyethylene (0.8 g) was isolated.

Example 411

The α-diimine was (2,6-i-PrPh)$_2$DABAn. Solid white polyethylene (0.2 g) was isolated.

Example 412

The α-diimine was (2,6-i-PrPh)$_2$DABAn, and 29.1 mg of BPh$_3$ was also added. Solid white polyethylene (14.7 g) was isolated.

Examples 413–420

The following synthetic methods and polymerization procedures were used to synthesize and test the polymerization activity of the functionalized α-diimine ligands of these Examples.

Synthetic Method A. One equiv of glyoxal or the diketone was dissolved in methanol. Two equiv of the functionalized aniline was added to the solution along with ~1 mL of formic acid. The solution was stirred until a precipitate formed. The precipitate was collected on a frit and washed with methanol. The product was then dissolved in dichloromethane and the resulting solution was stirred overnight over sodium sulfate. The solution was filtered and the solvent was removed in vacuo to yield the functionalized α-diimine.

Synthetic Method B. One equiv of glyoxal or the diketone was dissolved in dichloromethane and two equiv of the functionalized aniline was added to the solution. The reaction mixture was stirred over sodium sulfate (~1 week). The solution was filtered and the solvent was removed in vacuo. The product was washed or recrystallized from petroleum ether and then dried in vacuo.

Nickel Polymerization Procedure. In the drybox, a glass insert was loaded with one equiv each of Ni(COD)$_2$, H(OEt$_2$)$_2$BAF, and the α-diimine ligand. The insert was cooled to −35° C. in the drybox freezer, 5 mL of C$_6$D$_6$ was added to the cold insert, and the insert was then capped and sealed. Outside of the drybox, the cold tube was placed under 6.9 MPa of ethylene and allowed to warm to RT as it was shaken mechanically for 18 h. An aliquot of the solution was used to acquire a $^1$H NMR spectrum. The remaining portion was added to ~20 mL of MeOH in order to precipitate the polymer. The polyethylene was isolated and dried under vacuum.

Palladium Polymerization Procedure. In the drybox, a glass insert was loaded with one equiv each of [CODPdMe(NCMe)]BAF and the α-diimine ligand. The insert was cooled to −35° C. in the drybox freezer, 5 mL of C$_6$D$_6$ was added to the cold insert, and the insert was then capped and sealed. Outside of the drybox, the cold tube was placed under 6.9 MPa of ethylene and allowed to warm to RT as it was shaken mechanically for 18 h. An aliquot of the solution was used to acquire a $^1$H NMR spectrum. The remaining portion was added to ~20 mL of MeOH in order to precipitate the polymer. The polyethylene was isolated and dried under vacuum.

Example 413

α-Diimine was (2-hydroxyethylPh)$_2$DABMe$_2$. Synthetic Method B: $^1$H NMR (CDCl$_3$, 300 MHz, rt) δ 7.28–7.20 (m, 4, H$_{aryl}$), 7.12 (t, 2, J=7.52, H$_{aryl}$), 6.67 (d, 2, J=7.67, H$_{aryl}$), 3.74 (t, 4, J=6.79, CH$_2$OH), 3.11 (br s, 2, OH), 2.76 (t, 4, J=6.79, CH$_2$CH$_2$OH), 2.16 (s, 6, N=C(Me)—C(Me)=N); $^{13}$C NMR (CDCl$_3$, 75 MHz, rt) δ 168.2 (N=C—C=N), 149.0 (Ar: C$_{ipso}$), 128.4 (Ar: C$_o$), 130.4, 127.1, 124.6 and 118.2 (Ar: C$_m$, C$_p$, C$_m'$, C$_o'$), 62.9 (CH$_2$OH), 35.3 (CH$_2$CH$_2$OH), 15.8 (N=C(Me)—C(Me)=N).

Nickel Polymerization Procedure: (0.02 mmol scale) Seventy mg of polyethylene was isolated. $^1$H NMR spectrum (C$_6$D$_6$) shows the production of 1- and 2-butenes along with smaller amounts of higher olefins.

Palladium Polymerization Procedure: (0.06 mmol scale) No polymer was isolated, however, the $^1$H NMR spectrum shows peaks consistent with the formation of branched polyethylene: 1.3 ppm (CH$_2$)$_n$, 0.9 ppm (CH$_3$ of branches). Broad α-olefinic resonances are observed in the baseline.

Example 414

α-Diimine is (2,6-Et-3,5-chloroPh)$_2$DABMe$_2$. Synthetic Method A: $^1$H NMR (CDCl$_3$, 300 MHz, rt) δ 7.19 (s, 1, H$_{aryl}$), 2.64 (sextet, 4, J=7.19, CHH'CH$_3$), 2.36 (sextet, 4, J=7.11, CHH'CH$_3$), 2.10 (s, 6, N=C(Me)—C(Me)=N), 1.05 (t, 12, J=7.52, CH$_2$CH$_3$); $^{13}$C NMR (CDCl$_3$, 75 MHz, rt) δ 168.8 (N=C—C=N), 149.3 (Ar: C$_{ipso}$), 132.3 and 127.4 (Ar: C$_o$ and C$_m$), 124.7 (Ar: C$_p$), 22.5 (CH$_2$CH$_3$), 16.8 (N=C(Me)—C(Me)=N), 12.1 (CH$_2$CH$_3$).

Nickel Polymerization Procedure: (0.06 mmol scale) Solid white polyethylene (14.6 g) was isolated.

Palladium Polymerization Procedure: (0.06 mmol scale) Polyethylene (0.06 g) was isolated as an oil. $^1$H NMR spectrum (C$_6$D$_6$) shows branched polyethylene along with some internal olefinic end groups.

Palladium Polymerization Procedure: {0.03 mmol scale; Isolated [(2,6-Et-3,5-chloroPh)$_2$DABMe$_2$)]PdMe(NCMe)] BAF was used.} Polyethylene (2.42 g) was isolated as an oil.

Example 415

α-Diimine is (2,6-Et-3-chloroPh)$_2$DABMe$_2$. Synthetic Method A: $^1$H NMR (CDCl$_3$, 300 MHz, rt) δ 7.10 (d, 2, J=8.43, H$_{aryl}$), 7.04 (d, 2, J=8.07, H$_{aryl}$), 2.65 (m, 2, CHH'CH$_3$), 2.49 (m, 2, CHH'CH$_3$), 2.30 (m, 4, C'HH'C'H$_3$), 2.08 (s, 6, N=C(Me)—C(Me)=N), 1.15 and 1.07 (t, 6 each, J=7.52, CH$_2$CH$_3$ and C'H$_2$C'H$_3$); $^{13}$C NMR (CDCl$_3$, 75 MHz, rt) δ 168.4 (N=C—C=N), 148.5 (Ar: C$_{ipso}$), 132.0, 129.1 and 128.6 (Ar: C$_o$, C$_o'$, C$_m$), 126.9 and 124.3 (Ar: C$_m'$ and C$_p$), 24.4 and 22.6 (CH$_2$CH$_3$ and C'H$_2$C'H$_3$), 16.5 (N=C(Me)—C(Me)=N), 13.4 and 12.4 (CH$_2$CH$_3$ and C'H$_2$C'H$_3$).

Palladium Polymerization Procedure: {0.03 mmol scale; Isolated [(2,6-Et-3-chloroPh)$_2$DAHMe$_2$)PdMe(NCMe)] BAF was used.} Polyethylene (~1 g) was isolated as an amorphous solid.

Example 416

α-Diimine is (2,6-bromo-4-MePh)$_2$DABMe$_2$. Synthetic Method A: $^1$H NMR (CDCl$_3$, 300 MHz, rt) δ 7.40 (m, 4, H$_{aryl}$), 2.32 (s, 6, Ar: Me), 2.14 (s, 6, N=C(Me)—C(Me)=N); $^{13}$C NMR (CDCl$_3$, 75 MHz, rt) δ 171.5 (N=C—C=N), 144.9 (Ar: C$_{ipso}$), 135.7 (Ar: C$_p$), 132.4 (Ar: C$_m$), 112.3 (Ar: C$_o$), 20.2 and 16.9 (N=C(Me)—C(Me)=N and Ar: Me).

Nickel Polymerization Procedure: (0.02 mmol scale) Solid white polyethylene (5.9 g) was isolated. $^1$H NMR spectrum (C$_6$D$_6$) shows a significant amount of branched polymer along with internal olefinic end groups.

Palladium Polymerization Procedure: (0.06 mmol scale) Polyethylene (0.38 g) was isolated as an oil. $^1$H NMR spectrum (C$_6$D$_6$) shows a significant amount of branched polymer along with internal olefinic end groups.

Example 417

α-Diimine is (2,6-Me-4-bromoPh)$_2$DABH$_2$. Synthetic Method A: $^1$H NMR (CDCl$_3$, 300 MHz, rt) δ 8.07 (s, 2, N=CH—CH=N), 7.24 (s, 4, H$_{aryl}$), 2.15 (s, 12, Ar: Me); $^{13}$C NMR (CDCl$_3$, 300 MHz, rt) δ 163.6 (N=C—C=N), 148.7 (Ar: C$_{ipso}$), 131.0 and 128.7 (Ar: C$_o$ and C$_m$), 117.7 (Ar: C$_p$), 18.1 (Ar: Me).

Nickel Polymerization Procedure: (0.06 mmol scale) Solid white polyethylene (9.5 g) was isolated.

Palladium Polymerization Procedure: (0.06 mmol scale) No polymer was isolated, however, the $^1$H NMR spectrum (C$_6$D$_6$) shows the production of α- and internal olefins (butenes and higher olefins). A small resonance exists at 1.3 ppm and is consistent with the resonance for (CH$_2$)$_n$.

Example 418

α-Diimine is (2,6-Me-4-bromoPh)$_2$DABMe$_2$. Synthetic Method A: $^1$H NMR (CDCl$_3$, 300 MHz, rt) δ 7.22 (s, 4, H$_{aryl}$), 2.02 (s, 6, N=C(Me)—C(Me)=N), 2.00 (s, 12, Ar: Me); $^{13}$C NMR (CDCl$_3$, 75 MHz, rt) δ 168.5 (N=C—C=N), 147.3 (Ar: C$_{ipso}$), 130.6 (Ar: C$_m$), 126.9 (Ar: C$_o$), 115.9 (Ar: C$_p$), 17.6 (Ar: Me), 15.9 (N=C(Me)—C(Me)=N).

Nickel Polymerization Procedure: (0.06 mmol scale) Solid white polyethylene (14.9 g) was isolated.

Palladium Polymerization Procedure: (0.06 mmol scale) Polyethylene (1.3 g) was isolated as an oil. The $^1$H NMR spectrum (C$_6$D$_6$) shows resonances consistent with the formation of branched polymer. Resonances consistent with olefinic end groups are observed in the baseline.

Palladium Polymerization Procedure: {0.03 mmol scale; Isolated[(2,6-Me-4-bromoph)$_2$DAHMe$_2$)PdMe(NCMe)] BAF was used.} Polyethylene (3.97 g) was isolated as a mixture of a soft white solid and an amorphous oil. $^1$H NMR spectrum (C$_6$D$_6$) shows branched polyethylene.

Example 419

α-Diimine is (2-Me-6-chloroPh)$_2$DABMe$_2$

Nickel Polymerization Procedure: (0.02 mmol scale) Solid white polyethylene (220 mg) was isolated. In addition, the $^1$H NMR spectrum (C$_6$D$_6$) shows the production of 1- and 2-butenes.

Palladium Polymerization Procedure: (0.03 mmol scale; Isolated [(2-Me-6-chloroPh)$_2$DABMe$_2$]PdMe(NCMe)]SbF$_6$ was used.) Polyethylene (3.39 g) was isolated as an oil. The $^1$H NMR spectrum (C$_6$D$_6$) shows the production of branched polyethylene; internal olefin end groups are also present.

Example 420

(2,6-t-BuPh)$_2$DABAN

This compound was made by a procedure similar to that of Example 25. Two g (9.74 mmol) of 2,5-di-t-butylaniline and 0.88 g (4.8 mmol) of acenaphthenequinone were partially dissolved in 50 mL of methanol. Attempted crystallization from ether and from CH$_2$Cl$_2$ yielded an orange/yellow powder (1.75 g, 66%—not optimized). $^1$H NMR (CDCl$_3$, 250 MHz) δ 7.85 (d, 2H, J=8.1 Hz, BIAN: H$_p$), 7.44 (d, 2H, J=8.4 Hz, Ar: H$_m$), 7.33 (dd, 2H, J=8.4, 7.3 Hz, BIAN: Hm), 7.20 (dd, 2H, J=8.1, 2.2 Hz, Ar: H$_p$), 6.99 (d, 2H, J=2.2 Hz, Ar: H$_o$), 6.86 (d, 2H, J=7.0 Hz, BIAN: H$_o$), 1.37, 1.27 (s, 18H each, C(CH$_3$)$_3$).

Example 421

A 100 mg sample of {[(2,6-i-PrPh)$_2$DABMe$_2$] PdCH$_2$CH$_2$CH$_2$C(O)OCH$_3$}$^+$BAF$^-$ in a Schlenk flask was dissolved in CH$_2$Cl$_2$ (4 ml) and cyclopentene (8 ml) added. The flask was flushed well with a 10% ethylene in N$_2$ mix and the solution stirred with a slow flow of the gas mixture passing through the flask. After 15 hours the product had solidified into a single mass of yellow/brown polymer. The reaction was quenched with MeOH and the polymer broken into pieces and washed with MeOH. Yield=2.0 g. DSC: Tm=165° C. (32 J/g). Integration of the $^1$H-NMR spectrum indicated 83 mole % cyclopentene.

Example 422

A 37 mg sample of [(2,4,6-MePh)$_2$DABAn]NiBr$_2$ in cyclopentene (5 ml) was placed in a Schlenk flask under an atmosphere of ethylene. Modified MAO (1.1 ml, 7.2 wt % Al) was added and the reaction allowed to run for 16 hours after which time the product had solidified into a mass of green polymer. The reaction was quenched by addition of MeOH/10% HCl and the polymer was crushed and washed well with MeOH and finally a 2% Irganox/acetone solution. Yield=3.6 g.

Example 423

A 30 mg sample of [(2,6-i-PrPh)$_2$DABMe$_2$]NiBr$_2$ was slurried in toluene (2 ml) and norbornene (2 g). PMAO (1 ml, 9.6 wt % Al) was added. The solution immediately turned deep blue/black and in less than a minute became extremely viscous. The reaction was quenched after 15 hours by addition of MeOH/10% HCl causing the polymer to precipitate. The solid was filtered, washed well with MeOH and finally with a 2% Irganox® 1010 in acetone solution. The polymer was cut into pieces and dried. Yield= 0.8 g (40%). $^1$H-NMR (ODCB, 120° C.): 1.0–2.5 ppm complex multiplet confirms that the product is an addition polymer. The absence of olefinic peaks precludes the existence of ROMP product and indicates that the polymer is not of extremely low molecular weight.

Example 424

A 32 mg sample of [(2,6-i-PrPh)$_2$DABMe$_2$]COCl$_2$ was slurried in toluene (2 ml) and norbornene (4 g). PMAO (1.5 ml, 9.6 wt % Al) was added. The solution immediately turned deep purple and within a few minutes became extremely viscous and difficult to stir. The reaction was quenched after 4 hours by addition of MeOH/10% HCl causing the polymer to precipitate. The solid was filtered, washed well with MeOH and finally with a 2% Irganox in acetone solution. The polymer was dried overnight at 110° C. under vacuum. Yield=2.1 g (53%). It was possible to further purify the product by dissolving in cyclohexane and reprecipitating with MeOH. $^1$H-NMR (TCE, 120° C.): 1.0–2.5 ppm complex multiplet.

Example 425

A 33 mg sample of ((2,4,6-MePh)$_2$DABAn)COCl$_2$ was slurried in toluene (2 ml) and norbornene (4 g). PMAO (2.0 ml, 9.6 wt % Al) was added. The solution immediately turned deep blue and within a few minutes the viscosity began to increase. The reaction was quenched after 4 hours by addition of MeOH/10% HCl causing the polymer to precipitate. The solid was filtered, washed well with MeOH and finally with a 2% Irganox® 1010 in acetone solution. The polymer was dried overnight at 110° C. under vacuum. Yield=0.8 g (13%). It was possible to further purify the product by dissolving in cyclohexane and reprecipitating with MeOH. $^1$H-NMR (TCE, 120° C.): 1.0–2.5 ppm complex multiplet.

Example 426

A 23 mg sample of [(2,4,6-MePh)$_2$DABH$_2$]PdMeCl was slurried in toluene (2 ml) and norbornene (2.7 g). PMAO (1.0 mL, 9.6 wt % Al) was added. Solids immediately formed and after a few seconds stirring stopped. The reaction was quenched after 2 hours by addition of MeOH/10% HCl. The solid was filtered, crushed and washed well with MeOH and finally with a 2% Irganox® 1010 in acetone solution. Yield=2.5 g (92%).

Example 427

A 16 mg sample of [(2,4,6-MePh)$_2$DABH$_2$]NiBr$_2$ was slurried in dicyclopentadiene (~3 g). MMAO (1.2 ml, 7.2 wt % Al) was added. Solution immediately turned deep red/purple and started to foam. The reaction was quenched after 16 hours by addition of MeOH/10% HCl which precipitated the polymer. The solid was filtered and washed well with MeOH and finally with a 2% Irganox® 1010 in acetone solution. Yield=0.25 g.

Example 428

A 20 mg sample of [(2,4,6-MePh)$_2$DABH$_2$]PdMeCl was slurried in toluene (2 ml) and ethylidene norbornene (2 ml). PMAO (1.0 mL, 9.6 wt % Al) was added. The solution turned a pale orange and after an hour the viscosity had increased. After 14 hours the mixture had solidified into a gel and stirring had stopped. The reaction was quenched by addition of MeOH/10% HCl. The solid was filtered, crushed and washed well with MeOH and finally with a 2% Irganox® 1010 in acetone solution. Yield=0.7 g (39%).

Example 429

NiI$_2$ (0.26 g) was placed in THF (10 ml) and (2,6-i-PrPh)$_2$DABMe$_2$ (340 mg) was added. The resulting mixture was stirred for 2 days after which the THF was removed and pentane added. The red/brown solid was isolated by filtration and washed several times with pentane. Yield=0.53 g (89%).

A portion of the product (9 mg) in toluene (25 mL) in a Schlenk flask was placed under an atmosphere of ethylene (140 kPa [absolute]) and 0.25 ml PMAO solution (9.6% Al) was added. The solution turned dark green and, after several hours at room temperature, became viscous. After 16 hours the reaction was quenched with MeOH/10% HCl which precipitated the polymer. The polymer (1.25 g) was collected by filtration, washed well with MeOH and dried under reduced pressure. $^1$H NMR indicated ~133 methyl per 1000 methylene.

Example 430

CoI$_2$ (286 mg) was dissolved in THF (10 ml) and (2,6-iPrPh)$_2$DABMe$_2$ (370 mg) was added. The resulting mixture was stirred for 3 days after which the THF was removed and pentane added. The brown solid was isolated by filtration and washed several times with pentane. Yield=0.29 g (44%). $^1$H NMR (THF-d$_8$) 1.0–1.4 (m, 24H, CH—CH$_3$), 2.06 (s, 6H, N=C—CH$_3$), 2.6–2.8 (m, 4H, C—CH—(CH$_3$)$_2$), 7.0–7.3 (m, 6H, aromatic). This data is consistent with the formula: [(2,6-iPrPh)$_2$DABMe$_2$]CoI$_2$.

A portion of the above product (14 mg, 0.02 mmol) in toluene (25 mL) in a Schlenk flask was placed under an atmosphere of ethylene (140 kPa [absolute]) and 0.4 ml PMAO solution (9.6% Al) was added. The solution turned purple and, after several hours at room temperature, became viscous. After 18 hours the reaction was quenched with MeOH/10% HCl which precipitated the polymer. The polymer (634 mg) was collected by filtration, washed well with MeOH and dried under reduced pressure. $^1$H NMR indicated ~100 methyl per 1000 methylene. DSC: Tg=−45° C.

Example 431

Solid π-cyclooctenyl-1,5-cyclooctadienecobalt (I) (17 mg, 0.06 mmol) (prepared according to: Gosser L., Inorg. Synth., 17, 112–15, 1977) and solid (2,6-iPrPh)$_2$DABMe$_2$ (24 mg, 0.06 mmol) were placed in a Schlenk flask and toluene (25 mL) added. An ethylene atmosphere was admitted (34 kPa gauge) and the solution stirred for 5 minutes. The final color was brown/green. 0.8 ml PMAO solution (9.6% Al) was added. After 18 hours the reaction was quenched with MeOH/10% HCl which precipitated the polymer. The polymer (190 mg) was collected by filtration, washed well with MeOH and dried under reduced pressure. $^1$H NMR indicated 90 methyl per 1000 methylene. DSC: Tg=−45° C.

Example 432

[(2,6-iPrPh)$_2$DABMe$_2$]COCl$_2$ (619 mg) was slurried in Et$_2$O (5 ml) and cooled to −25° C. Me$_2$Mg (63 mg in 5 ml Et$_2$O) was added and the solution stirred for 15 minutes. Et$_2$O was removed under reduced pressure and the resulting bright purple solid was dissolved in pentane, filtered to remove MgCl$_2$ and the volume reduced to 5 ml. The solution was cooled to −25° C. for 2 days and the resulting purple crystals isolated by filtration. Yield=420 mg (73%). Crystal structure determination confirmed that the product was [(2,6-iPrPh)$_2$DABMe$_2$]COMe$_2$.

[(2,6-iPrPh)$_2$DABMe$_2$]CoMe$_2$ (34 mg) in toluene (25 mL) in a Schlenk flask was placed under an atmosphere of ethylene (140 kPa [absolute]) and after stirring for 2 hours, 0.6 ml PMAO solution (9.6% Al) was added. The solution remained dark purple and, after several hours at room temperature, became viscous. After 48 hours the reaction was quenched with MeOH/10% HCl which precipitated the polymer. The polymer (0.838 g) was collected by filtration, washed well with MeOH and dried under reduced pressure. Branching ($^1$H-NMR): 115 methyl per 1000 methylene. DSC: Tg=−45° C.

Example 433

[(2,6-iPrPh)$_2$DABMe$_2$]CoMe$_2$ (30 mg) was dissolved in benzene (10 ml in a shaker tube) and the solution frozen. Montmorillionite K-10 (Aldrich Chemical Co., Milwaukee, Wis., U.S.A.) (200 mg, conditioned at 140° C. for 48 hrs under vacuum) suspended in benzene (10 ml) was added on top of the frozen layer and frozen as well. The solution was thawed under an ethylene atmosphere (6.9 MPa) and shaken at that pressure for 18 hours. MeOH was added to the resulting polymer which was then isolated by filtration, washed well with MeOH and dried under reduced pressure. Yield=7.5 g crystalline polyethylene. Branching ($^1$H-NMR): 18 Methyl per 1000 methylene.

Example 434

[(2,6-iPrPh)$_2$DABMe$_2$]CoMe$_2$ (15 mg) was dissolved in benzene (10 ml in a shaker tube) and the solution frozen. Montmorillionite K-10 (100 mg, conditioned at 600° C. for 48 hrs under vacuum) suspended in benzene (10 ml) was added on top of the frozen layer and frozen as well. The solution was thawed under an ethylene atmosphere (6.9

MPa) and shaken at that pressure for 18 hours. MeOH was added to the resulting polymer which was then isolated by filtration, washed well with MeOH and dried under reduced pressure. Yield=3 g polyethylene. Branching ($^1$H NMR): 11 Methyl per 1000 methylene.

Example 435

[(2,6-iPrPh)$_2$DABMe$_2$]CoMe$_2$ (15 mg) was dissolved in benzene (10 ml in a shaker tube) and the solution frozen. Tris(pentaflorophenyl)boron (25 mg) dissolved in benzene (10 ml) was added on top of the frozen layer and frozen as well. The solution was thawed under an ethylene atmosphere (6.9 MPa) and shaken at that pressure for 18 hours. MeOH was added to the resulting polymer which was then isolated by filtration, washed well with MeOH and dried under reduced pressure. Yield=105 mg polyethylene. Branching ($^1$H NMR): 60 Methyl per 1000 methylene.

Example 436

[(2,6-iPrPh)$_2$DABMe$_2$]CoMe$_2$ (15 mg) was dissolved in benzene (10 ml in a shaker tube) and the solution frozen. HBAF.2Et$_2$O (30 mg) slurried in benzene (10 ml) was added on top of the frozen layer and frozen as well. The solution was thawed under an ethylene atmosphere (6.9 MPa) and shaken at that pressure for 18 hours. MeOH was added to the resulting polymer which was then isolated by filtration, washed well with MeOH and dried under reduced pressure. Yield=3.8 g polyethylene. Branching ($^1$H NMR): 21 Methyl per 1000 methylene.

Example 437

COCl$_2$ (102 mg) was placed in acetonitrile and AgBF$_4$ (306 mg) added. The solution was stirred for 30 minutes after which the white AgCl was filtered off. (2,6-i-PrPh)$_2$DABMe$_2$ (318 mg) was added and the solution stirred overnight. The acetonitrile was removed under reduced pressure and pentane added. The orange product was isolated by filtration and washed and dried. $^1$H-NMR (THF-d$_8$): 1.1–1.4 (m, C—CH—CH$_3$, 24H), 1.8 (CH$_3$CN, 6H), 2.2 (N=C—CH$_3$, 6H), 2.7 (m, C—CH—CH$_3$, 4H), 7.0–7.2 (m, C=CH, 6H). The spectrum is consistent with the molecular formula: [((2,6-iPrPh)$_2$DAHMe$_2$)CO(CH$_3$CN)$_2$](BF$_4$)$_2$.

A portion of the product (43 mg) in toluene (25 mL) in a Schlenk flask was placed under an atmosphere of ethylene (35 kPa gauge) and 0.8 ml PMAO solution (9.6% Al) was added. The solution turned dark purple After 18 hours the reaction was quenched with MeOH/10% HCl which precipitated the polymer. The polymer (0.310 g) was collected by filtration, washed well with MeOH and dried under reduced pressure. Branching ($^1$H NMR): 72 Methyl per 1000 methylene.

Example 438

Solid Co(II)[(CH$_3$)$_2$CHC(O)O$^-$]$_2$ (17 mg, 0.073 mmol) and solid (2,6-iPrPh)$_2$DABMe$_2$ (32 mg, 0.079 mmol) were placed in a Schlenk flask and toluene (25 mL) added. An ethylene atmosphere was admitted (140 kPa [absolute]) and 3.0 ml PMAO solution (9.6% Al) was added. After 18 hours the reaction was quenched with MeOH/10% HCl which precipitated the polymer. The polymer (57 mg) was collected by filtration, washed well with MeOH and dried under reduced pressure. $^1$H NMR indicated 32 methyl per 1000 methylene.

Example 439

The complex {[(2,6-EtPh)$_2$DABMe$_2$]PdMe(NCMe)}$^+$ SbF$_6^D$ was weighed (50 mg, 0.067 mmol) into a 100 mL round-bottom flask inside a dry box. Cyclopentene (20 mL, 3400 equivalents per Pd; unpurified) and dichloromethane (20 mL) were added to the flask, and stirred under a nitrogen atmosphere to give a homogeneous solution. A precipitate had formed after 2 days. After 7 days, the solvent was evaporated and the solids were dried in a vacuum oven to give 0.39 g polymer (86 turnovers/Pd). A sample of the polymer was washed several times with petroleum ether and ether, then dried in a vacuum oven. The polymer was pressed at 290° C. into a transparent, gray-brown, tough film. DSC (0 to 300° C., 10° C./min, first heat): T$_g$=120° C., T$_m$ (onset to end)=179 to 232° C., heat of fusion=18 J/g. $^1$H NMR (400 MHz, 120° C., ortho-dichlorobenzene-d$_4$, referenced to solvent peak at 7.280 ppm): 0.905 (bs, 1H, cis —CH—CH$_2$—CH—), 1.321 (bs, 2H, cis —CH—CH$_2$—CH$_2$—CH—), 1.724 and 1.764 (overlapping bs, 4H, trans —CH—CH$_2$—CH$_2$—CH— and —CH—CH$_2$—CH$_2$—CH—), 1.941 (bs, 1H, trans —CH—CH$_2$—CH—). The $^1$H NMR assignments are based upon 2D NMR correlation of the $^1$H and $^{13}$C NMR chemical shifts, and are consistent with a poly(cis-1,3-cyclopentylene) repeat unit.

Example 440

The complex {[(2,6-iPrPh)$_2$DABAn]PdMe(OEt$_2$)}$^+$ SbF$_6^D$ was weighed (50 mg, 0.054 mmol) into a 100 mL round-bottom flask inside a dry box. Cyclopentene (20 mL, 4200 equivalents per Pd; unpurified) and dichloromethane (20 mL) were added to the flask, and stirred under a nitrogen atmosphere to give a homogeneous solution. A precipitate had formed after 3 days. After 6 days, the solvents were evaporated and the solids were dried in a vacuum oven to give 0.20 g polymer (55 turnovers/Pd). A sample of the polymer was washed several times with petroleum ether and ether, then dried in a vacuum oven. DSC (0 to 300° C., 10° C./min, first heat): T$_g$=42° C., T$_m$ (onset to end)=183 to 242° C., heat of fusion=18 J/g. $^1$H NMR (400 MHz, 70° C., CDCl$_3$, referenced to solvent peak at 7.240 ppm): 0.75 (bm, 1H, cis —CH—CH$_2$—CH—), 1.20 (bs, 2H, cis —CH—CH$_2$—CH$_2$—CH—), 1.59 and 1.68 (overlapping bs, 4H, trans —CH—CH$_2$—CH$_2$—CH— and —CH—CH$_2$—CH$_2$—CH—), 1.83 (bs, 1H, trans —CH—CH$_2$—CH—). The $^1$H NMR assignments are based upon 2D NMR correlation of the $^1$H and $^{13}$C NMR chemical shifts, and are consistent with a poly(cis-1,3-cyclopentylene) repeat unit.

Example 441

The complex [(2,6-iPrPh)$_2$DABMe$_2$]PdMeCl was added (28 mg, 0.050 mmol) to a glass vial containing cyclopentene (3.40 g, 1000 equivalents per Pd; distilled twice from Na) inside a dry box. A solution of MMAO in heptane (1.47 mL, 1.7 M Al, 50 equivalents per Pd) was added with stirring to give a homogeneous solution. A precipitate began to form immediately. After 2 days, the solids were collected by vacuum filtration, washed several times on the filter with petroleum ether and ether, then dried in a vacuum oven to give 0.254 g polymer (75 turnovers/Pd). The polymer was pressed at 250° C. into a transparent, gray-brown, tough film. DSC (0 to 300° C., 10° C./min, first heat) T$_g$=114° C., T$_m$ (onset to end)=193 to 240° C., heat of fusion=14 J/g. GPC (Dissolved in 1,2,4-trichlorobenzene at 150° C., run in tetrachloroethylene at 100° C., polystyrene calibration): peak MW=154,000, M$_n$=70,200, M$_w$=171,000, M$_w$/M$_n$=2.43.

Example 442

The complex {[(2,6-iPrPh)$_2$DABMe$_2$]PdCH$_2$CH$_2$CH$_2$C(O)OCH$_3$}$^+$SbF$_6^D$ was weighed (42 mg, 0.050 mmol) into a glass vial inside a dry box. Cyclopentene (3.40 g, 1000 equivalents per Pd; distilled twice from Na) and dichloromethane (4.4 mL) were added with stirring to give a homogeneous solution. After 1 day, the solids were collected by vacuum filtration, washed several times on the filter with petroleum ether and ether, then dried in a vacuum oven to give 1.605 g polymer (471 turnovers/Pd). The polymer was pressed at 250° C. into a transparent, gray-brown, tough film. TGA (25 to 600° C., 10° C./min, nitrogen): $T_d$ (onset to end)=473 to 499, 97.06% weight loss. TGA (25 to 600° C., 10° C./min, air) $T_d$=350° C., 5% weight loss. DSC (0 to 300° C., 10° C./min, second heat): $T_g$=94° C., $T_m$ (onset to end)=191 to 242° C., heat of fusion=14 J/g. GPC (Dissolved in 1,2,4-trichlorobenzene at 150° C., run in tetrachloroethylene at 100° C., polystyrene calibration): peak MW=152,000, $M_n$=76,000, $M_w$=136,000, $M_w/M_n$=1.79.

Example 443

The complex [(2,6-iPrPh)$_2$DABMe$_2$]PdCl$_2$ was weighed (29 mg, 0.050 mmol) into a glass vial inside a dry box. Cyclopentene was added (6.81 g, 2000 equivalents per Pd; distilled from polyphosphoric acid), and the vial was cooled to <0° C. A solution of MMAO in heptane (1.00 mL, 1.7 M Al, 34 equivalents per Pd) was added with stirring to give a homogeneous solution. After 1 day, a copious precipitate had formed. After 2 days, the solids were collected by vacuum filtration, washed several times on the filter with ether and cyclohexane, then dried in a vacuum oven to give 1.774 g polymer (520 turnovers/Pd). The polymer was coated with 5000 ppm Irganox® 1010 by evaporating an acetone slurry and drying in a vacuum oven. The polymer was pressed at 290° C. into a transparent, gray-brown, tough film. DSC (25 to 330° C., 10° C./min, second heat): $T_g$=105° C., $T_m$ (onset to end)=163 to 244° C., heat of fusion=21 J/g.

Example 444

The complex [(2,6-iPrPh)$_2$DABMe$_2$]PdCl$_2$ was weighed (29 mg, 0.050 mmol) into a glass vial inside a dry box. Cyclopentene was added (6.81 g, 2000 equivalents per Pd; distilled from polyphosphoric acid), and the vial was cooled to <0° C. A solution of EtAlCl$_2$ in hexane (1.7 mL, 1.0 M, 34 equivalents per Pd) was added with stirring to give a homogeneous solution. After 4 days, the solids were collected by vacuum filtration, washed several times on the filter with ether and cyclohexane, then dried in a vacuum oven to give 1.427 g polymer (419 turnovers/Pd). The polymer was coated with 5000 ppm Irganox® 1010 by evaporating an acetone slurry and drying in a vacuum oven. The polymer was pressed at 290° C. into a transparent, gray-brown, tough film. DSC (25 to 330° C., 10° C./min, second heat): $T_g$=103° C., $T_m$ (onset to end)=153 to 256° C., heat of fusion=23 J/g.

Example 445

The complex [(2,6-iPrPh)$_2$DABMe$_2$]PdCl$_2$ was weighed (29 mg, 0.050 mmol) into a glass vial inside a dry box. Cyclopentene was added (6.81 g, 2000 equivalents per Pd; distilled from polyphosphoric acid), and the vial was cooled to <0° C. A solution of EtAlCl$_2$·áEt$_2$AlCl in toluene (1.9 mL, 0.91 M, 68 equivalents Al per Pd) was added with stirring to give a homogeneous solution. After 4 days, the solids were collected by vacuum filtration, washed several times on the filter with ether and cyclohexane, then dried in a vacuum oven to give 1.460 g polymer (429 turnovers/Pd). The polymer was coated with 5000 ppm Irganox® 1010 by evaporating an acetone slurry and drying in a vacuum oven. The polymer was pressed at 290° C. into a transparent, gray-brown, tough film. DSC (25 to 330° C., 10° C./min, second heat): $T_g$=101° C., $T_m$ (onset to end)=161 to 258° C., heat of fusion=22 J/g.

Example 446

The complex [(2,4,6-MePh)$_2$DABAn]NiBr$_2$ was weighed (32 mg, 0.050 mmol) into a glass vial inside a dry box. Cyclopentene was added (6.81 g, 2000 equivalents per Ni; treated with 5 A molecular sieves, and distilled from Na and Ph$_3$CH), and the vial was cooled to <0° C. A solution of EtAlCl$_2$·áEt$_2$AlCl in toluene (1.9 mL, 0.91 M, 68 equivalents Al per Ni) was added with stirring to give a homogeneous solution. After 5 days, the solids were collected by vacuum filtration, washed several times on the filter with ether and cyclohexane, and dried in a vacuum oven to give 2.421 g polymer (711 turnovers/Ni). The polymer was coated with 5000 ppm Irganox® 1010 by evaporating an acetone slurry and drying in a vacuum oven. The polymer was pressed at 290° C. into a transparent, brown, tough film. DSC (25 to 330° C., 10° C./min, second heat): $T_g$=103° C., $T_m$ (onset to end)=178 to 272° C., heat of fusion=22 J/g.

Example 447

The complex [(2,4,6-MePh)$_2$DABAn]NiBr$_2$ was weighed (128 mg, 0.202 mmol) into a glass bottle inside a dry box. Cyclopentene was added (27.1 g, 2000 equivalents per Ni; treated with polyphosphoric acid, and distilled from Na). A solution of EtAlCl$_2$ in hexane (6.8 mL, 1.0 M, 34 equivalents Al per Ni) was added with stirring to give a homogeneous solution. After 1 day, additional cyclopentene was added (58 g, 6200 total equivalents per Ni) to the bottle containing a heavy slurry. After 5 days, the solids were slurried with ether, collected by vacuum filtration, washed several times with ether and cyclohexane on the filter, and dried in a vacuum oven to give 36.584 g polymer (2660 turnovers/Ni). The polymer was washed with 50:50 aqueous HCl/MeOH, followed by several washings with 50:50 H$_2$O/MeOH, and dried in a vacuum oven. A fine powder sample was obtained using a 60 mesh screen, and coated with 5000 ppm Irganox® 1010 by evaporating an acetone slurry and drying in a vacuum oven. The fine powder was pressed at 290° C. into a transparent, pale brown, tough film. TGA (25 to 700° C., 10° C./min, nitrogen): $T_d$ (onset to end)=478 to 510° C., 99.28% weight loss. DSC (25 to 330° C., 10° C./min, second heat): $T_g$=101° C., $T_m$ (onset to end)=174 to 279° C., heat of fusion=25 J/g. DSC (330 to 25° C., 10° C./min, first cool): $T_c$ (onset to end)=247 to 142° C., heat of fusion=28 J/g; $T_c$ (peak)=223° C. DSC isothermal crystallizations were performed by heating samples to 330° C. followed by rapid cooling to the specified temperatures, ° C., and measuring the exotherm half-times (min): 200 (1.55), 210 (1.57), 220 (1.43), 225 (<1.4), 230 (1.45), 240 (1.88), 245 (1.62). DSC thermal fractionation was performed by heating a sample to 330° C. followed by stepwise isothermal equilibration at the specified temperatures, ° C., and times (hr): 290 (10), 280 (10), 270 (10), 260 (10), 250 (10), 240 (8), 230 (8), 220 (8), 210 (8), 200 (6), 190 (6), 180 (6), 170 (6), 160 (4), 150 (4), 140 (4), 130 (3), 120 (3), 110 (3). DSC (25 to 330° C., 10° C./min, thermal fractionation sample): $T_g$=100° C.; $T_m$, ° C. (heat of fusion, J/g)=128 (0.4), 139 (0.8), 146 (1.1), 156 (1.5), 166 (1.9), 176 (2.1), 187 (2.6), 197 (3.0), 207 (3.2), 216 (3.2), 226 (3.4), 237 (3.6), 248 (3.7), 258 (2.3), 269 (1.2), 279 (0.5), 283 (0.1); total heat of fusion=34.6 J/g. DMA (−100 to 200° C., 1, 2, 3, 5, 10 Hz; pressed film): modulus (−100° C.)=2500 MPa, γ relaxation=−67 to −70° C. (activation energy=11 kcal/mol), modulus (25° C.)=1600 MPa, α relaxation ($T_g$)=109 to 110° C. (activation energy=139 kcal/mol).

Example 448

The complex [(2,4,6-MePh)$_2$DABAn]NiBr$_2$ was weighed (32 mg, 0.050 mmol) into a glass bottle inside a dry box. Cyclopentene was added (34.1 g, 10,000 equivalents per Ni; high-purity synthetic material distilled from Na), and the vial was cooled to <0° C. A solution of MMAO in heptane (2.7 mL, 1.95 M Al, 100 equivalents Al per Ni) was added with stirring to give a homogeneous solution. After 3 days, a copious precipitate had formed. After 7 days, the reaction was quenched with 20 mL MeOH and 2 mL acetylacetone. The solids were washed several times with 3 mL aqueous HCl in 30 mL MeOH by decanting the free liquids. The solids were collected by vacuum filtration, washed several times on the filter with methanol, and dried in a vacuum oven to give 14.365 g polymer (4200 turnovers/Ni). The polymer was coated with 5000 ppm Irganox® 1010 by evaporating an acetone slurry and drying in a vacuum oven. The polymer was pressed at 290° C. into a transparent, colorless, tough film. DSC (0 to 320° C., 20° C./min, second heat): $T_g$=95° C., $T_m$ (onset to end)=175 to 287° C., heat of fusion=20 J/g.

Example 449

The complex [(2,4,6-MePh)$_2$DABAn]NiBr$_2$ was weighed (32 mg, 0.050 mmol) into a glass bottle inside a dry box. Cyclopentene was added (34.1 g, 10,000 equivalents per Ni; high-purity synthetic material distilled from Na), and the vial was cooled to <0° C. A solution of EtAlCl$_2$/Et$_2$AlCl in toluene (2.8 mL, 0.91 M, 100 equivalents Al per Ni) was added with stirring to give a homogeneous solution. After 3 days, a precipitate had formed. After 7 days, the reaction was quenched with 20 mL MeOH and 2 mL acetylacetone. The solids were washed several times with 3 mL aqueous HCl in 30 mL MeOH by decanting the free liquids. The solids were collected by vacuum filtration, washed several times on the filter with methanol, and dried in a vacuum oven to give 7.254 g polymer (2113 turnovers/Ni). The polymer was coated with 5000 ppm Irganox 1010 by evaporating an acetone slurry and drying in a vacuum oven. The polymer was pressed at 290° C. into a transparent, colorless, tough film. DSC (0 to 320° C., 20° C./min, second heat): $T_g$=94° C., $T_m$ (onset to end)=189 to 274° C., heat of fusion=18 J/g.

Example 450

Bis(benzonitrile)palladium dichloride (0.385 g, 1.00 mmol) and (2,6-iPrPh)$_2$DABMe$_2$ (0.405 g, 1.00 mmol) were weighed into a glass vial inside a dry box. Dichloromethane (8 mL) was added to give a dark orange solution. Upon standing, the solution gradually lightened in color. Cyclohexane was added to precipitate an orange solid. The solids were collected by vacuum filtration, washed several times with cyclohexane, and dried under vacuum to give 0.463 g (80%) of the complex [(2,6-iPrPh)$_2$DABMe$_2$]PdCl$_2$. $^1$H NMR (300 MHz, CD$_2$Cl$_2$, referenced to solvent peak at 5.32 ppm): 1.19 (d, 12H, C$\underline{H}_3$—CHAr—CH$_3$), 1.45 (d, 12H, CH$_3$—CHAr—C$\underline{H}_3$), 2.07 (s, 6H, (C$\underline{H}_3$—C=N—Ar), 3.07 (m, 4H, (CH$_3$)$_2$—C$\underline{H}$—Ar), 7.27 (d, 4H, meta ArH), 7.38 (t, 2H, para ArH).

Example 451

A sample of polycyclopentene prepared in a similar fashion to Example 317 gave a transparent, brown, tough film when pressed at 290° C. DSC (25 to 330° C., 10° C./min, second heat): $T_g$=98° C., $T_m$ (onset to end)=174 to 284° C., heat of fusion=26 J/g. A 5 g sample that was molded at 280° C. into a test specimen suitable for an apparatus that measures the response to changes in pressure, volume and temperature, and the data output was used to calculate the following physical properties. Specific gravity, g/cm$^3$, at temperature (° C.) 1.033 (30), 1.010 (110° C.), 0.887 (280), 0.853 (350). Bulk compression modulus, MPa, at temperature (° C.): 3500 (30), 2300 (110), 1500 (170). The coefficient of linear thermal expansion was 0.00009 ° C.$^{D1}$ between 30 and 110° C.

Example 452

A solution of {[(2,6-i-PrPh)$_2$DABMe$_2$]PdCH$_2$CH$_2$CH$_2$C(O)OCH$_3$}$^+$SbF$_6^-$ (1.703 g) in 1.5 L CH$_2$Cl$_2$ was transferred under nitrogen to a nitrogen purged 1 gallon Hastalloy® autoclave. The autoclave was charged with 300 g of propylene and stirred for 24 h while maintaining the temperature at 25° C. The pressure was then vented. The polymer product was floating on the solvent. Most of the solvent was removed in vacuo, and the polymer was dissolved in minimal CHCl$_3$ and then reprecipitated by addition of excess acetone. The polymer was dried in vacuo at 60° C. for three days to give 271 g of green rubber. Quantitative $^{13}$C NMR analysis, branching per 1000 CH$_2$: Total methyls (365), ≧Butyl and end of chains (8), CHCH$_2$CH(CH$_3$)$_2$ (31), —(CH$_2$)$_n$CH(CH$_3$)$_2$ n≧2 (25). Based on the total methyls, the fraction of 1,3-enchainment is 38%. Analysis of backbone carbons (per 1000 CH$_2$): δ$^+$ (138), δ$^+$/γ (1.36).

Listed below are the $^{13}$C NMR data upon which the above analysis is based.

| $^{13}$C NMR data TCB, 120 C, 0.05 M CrAcAc | | |
|---|---|---|
| Freq ppm | Intensity | |
| 47.1728 | 14.6401 | |
| 46.7692 | 9.89618 | |
| 46.3285 | 13.3791 | |
| 45.8719 | 7.94399 | |
| 45.4684 | 11.1421 | |
| 45.2719 | 7.80142 | |
| 44.4754 | 7.11855 | |
| 39.1923 | 29.1488 | |
| 38.2791 | 14.2142 | |
| 38.1304 | 18.7602 | |
| 37.9074 | 14.9366 | |
| 37.6631 | 15.0761 | |
| 37.2809 | 39.5816 | |
| 35.5074 | 8.29039 | |
| 34.865 | 9.75536 | |
| 34.5889 | 14.9541 | |
| 34.2915 | 24.0579 | |
| 33.2455 | 9.86797 | |
| 32.9747 | 19.2516 | |
| 30.6013 | 52.6926 | |
| 30.134 | 55.0735 | γ |
| 30.0066 | 25.1831 | γ |
| 29.7518 | 144.066 | δ$^+$ |
| 29.3217 | 12.2121 | 3B$_4$ |
| 28.2013 | 51.5842 | |
| 27.9783 | 39.5566 | |
| 27.5376 | 33.189 | |
| 27.373 | 35.5457 | |
| 27.1659 | 47.0796 | |
| 27.0438 | 42.1247 | |

| $^{13}$C NMR data TCB, 120 C, 0.05 M CrAcAc | | |
|---|---|---|
| Freq ppm | Intensity | |
| 25.6315 | 21.6632 | terminal methine of XXVIII |
| 23.3589 | 15.3063 | Methyl of XXVIII and XXIX, $2B_4$, $2B_S+$, 2EOC |
| 23.0722 | 18.4837 | Methyl of XXVIII and XXIX, $2B_4$, $2B_S+$, 2EOC |
| 22.5306 | 77.0243 | Methyl of XXVIII and XXIX, $2B_4$, $2B_S+$, 2EOC |
| 21.1129 | 7.78367 | |
| 20.5554 | 26.9634 | $1B_1$ |
| 20.4386 | 30.3105 | $1B_1$ |
| 20.0085 | 22.478 | $1B_1$ |
| 19.743 | 46.6467 | $1B_1$ |
| 13.8812 | 9.03898 | $1B_4+$, 1EOC |

Example 453

A 250 mL Schlenk flask was charged with 10 mg of [(2,6-i-PrPh)2DABH$_2$]NiBr$_2$ (1.7×10$^{-5}$ mol), and 75 mL of dry toluene. The flask was cooled to 0° C. and filled with propylene (1 atm) before addition of 1.5 mL of a 10% MAO solution in toluene. After 45 min, acetone and water were added to quench the reaction. Solid polypropylene was recovered from the flask and washed with 6 M HCl, H$_2$O, and acetone. The resulting polymer was dried under high vacuum overnight to yield 1.2 g (2300 TO/h) polypropylene. Differential scanning calorimetry: Tg=−19° C. GPC (trichlorobenzene, 135° C., polystyrene reference): Mn=32,500; Mw=60,600; Mw/Mn=1.86. Quantitative $^{13}$C NMR analysis, branching per 1000 CH$_2$: Total methyls (813), Based on the total methyls, the fraction of 1,3-enchainment is 7%. Analysis of backbone carbons (per 1000 CH$_2$): δ$^+$ (3), δ$^+$/γ (0.4).

Listed below are the $^{13}$C NMR data upon which the above analysis is based.

| $^{13}$C NMR data TCB, 120 C, 0.05 M CrAcAc | |
|---|---|
| Freq ppm | Intensity |
| 47.194 | 18.27 |
| 46.9922 | 21.3352 |
| 46.8276 | 35.7365 |
| 46.2011 | 27.2778 |
| 45.4153 | 8.55108 |
| 43.5356 | 2.71929 |
| 42.925 | 3.37998 |
| 41.5551 | 2.63256 |
| 38.826 | 3.03899 |
| 38.4012 | 10.2858 |
| 38.0561 | 8.50185 |
| 37.626 | 7.10732 |
| 37.4879 | 6.55335 |
| 37.2755 | 9.25058 |
| 36.1021 | 4.48005 |
| 35.3057 | 1.5319 |
| 34.4986 | 11.1193 |
| 33.219 | 9.43548 |
| 32.9375 | 4.94953 |
| 32.242 | 3.16177 |
| 30.8349 | 24.1766 |
| 30.5217 | 19.8151 |
| 30.0916 | 3.70031 |
| 28.1111 | 14 |
| 27.5217 | 13.9133 |
| 27.1394 | 3.83857 |
| 24.5005 | 6.94946 |
| 21.0439 | 5.25857 |
| 20.5342 | 40.8641 |
| 20.0191 | 60.4325 |
| 19.8758 | 63.0429 |
| 16.9236 | 6.47935 |
| 16.3926 | 5.92056 |
| 14.9006 | 10.6275 |
| 14.513 | 3.39891 |

Example 454

Preparation of (2-t-BuPh)$_2$DABAn. A Schlenk tube was charged with 2-t-butylaniline (3.00 mL, 19.2 mmol) and acenaphthenequinone (1.71 g, 9.39 mmol). The reagents were partially dissolved in 50 mL of methanol (acenaphthenequinone was not completely soluble) and 1–2 mL of formic acid was added. An orange solid formed and was collected via filtration after stirring overnight. The solid was crystallized from CH$_2$Cl$_2$ (3.51 g, 84.1%). $^1$H NMR (CDCl$_3$, 250 MHz) δ 7.85 (d, 2H, J=8.0 Hz, BIAn: H$_p$), 7.52 (m, 2H, Ar: H$_m$), 7.35 (dd, 2H, J=8.0, 7.3 Hz, BIAn: H$_m$), 7.21 (m, 4H, Ar: H$_m$ and H$_p$), 6.92 (m, 2H, Ar: H$_o$), 6.81 (d, 2H, J=6.9 Hz, BIAn: H$_o$), 1.38 (s, 18H, C(CH$_3$)$_3$).

Example 455

Preparation of (2,5-t-BuPh)$_2$DABAn. A Schlenk tube was charged with 2,5-di-t-butylaniline (2.00 g, 9.74 mmol) and acenaphthenequinone (0.88 g, 4.8 mmol). The reagents were partially dissolved in 50 mL of methanol (acenaphthenequinone was not completely soluble) and 1–2 mL of formic acid was added. A solid was collected via filtration after stirring overnight. Attempted crystallization from ether and from CH$_2$Cl$_2$ yielded an orange/yellow powder (1.75 g, 66%). $^1$H NMR (CDCl$_3$, 250 MHz) δ 7.85 (d, 2H, J=8.1 Hz, BIAn: H$_p$), 7.44 (d, 2H, J=8.4 Hz, Ar: H$_m$), 7.33 (dd, 2H, J=8.4, 7.3 Hz, BIAn: H$_m$), 7.20 (dd, 2H, J=8.1, 2.2 Hz, Ar: H$_p$), 6.99 (d, 2H, J=2.2 Hz, Ar: H$_o$), 6.86 (d, 2H, J=7.0 Hz, BIAn: H$_o$), 1.37, 1.27 (s, 18H each, C(CH$_3$)$_3$).

Example 456

Preparation of [(2-t-BuPh)$_2$DABAn]NiBr$_2$. A Schlenk tube was charged with 0.202 g (0.454 mmol) of (2-t-BuPh)$_2$DABAn, which was then dissolved in 15 mL of CH$_2$Cl$_2$. This solution was cannulated onto a suspension of (DME)NiBr$_2$ (0.135 g, 0.437 mmol) in 10 mL of CH$_2$Cl$_2$. The reaction mixture was allowed to stir overnight resulting in a deep red solution. The solution was filtered and the solvent evaporated under vacuum. The residue was washed with ether (2×10 mL) and an orange/rust solid was isolated and dried under vacuum (0.18 g, 62%).

Example 457

Preparation of [(2,5-t-BuPh)$_2$DABAn]NiBr$_2$. A Schlenk tube was charged with 0.559 g (1.00 mmol) of (2,5-t-BuPh)$_2$DABAn, 0.310 g (1.00 mmol) of (DME)NiBr$_2$ and 35 mL of CH$_2$Cl$_2$. The reaction mixture was allowed to stir overnight. The solution was filtered and the solvent evaporated under vacuum. The residue was washed with ether and resulted in an orange solid which was dried under vacuum (0.64 g, 83%).

Example 458

Preparation of highly chain-straightened polypropylene with a low $T_g$. The complex [(2-t-BuPh)$_2$DABAn]NiBr$_2$ (0.0133 g, 2.0×10$^{-5}$ mol) was placed into a flame-dried 250 mL Schlenk flask which was then evacuated and back-filled with propylene. Freshly distilled toluene (100 mL) was added via syringe and the resulting solution was stirred in a water bath at room temperature. Polymerization was initiated by addition of methylaluminoxane (MAO; 1.5 mL 10% soln in toluene) and a propylene atmosphere was maintained throughout the course of the reaction. The reaction mixture was stirred for two hours at constant temperature followed by quenching with 6M HCl. Polymer was precipitated from the resulting solution with acetone, collected, washed with water and acetone, and dried under vacuum. Yield=1.41 g. DSC: $T_g$–53.6° C., $T_m$–20.4° C. (apparent Tm is a small shoulder on the Tg). Quantitative $^{13}$C NMR analysis, branching per 1000 CH$_2$: Total methyls (226), ≧Butyl and end of chains (8.5), CHCH$_2$CH(CH$_3$)$_2$ (2.3), —(CH$_2$)$_n$CH(CH$_3$)$_2$ n≧2 (12.1). Based on the total methyls, the fraction of 1,3-enchainment is 53%. Analysis of backbone carbons (per 1000 CH$_2$): δ$^+$ (254), δ$^+$/γ (1.96).

Example 459

Preparation of highly chain-straightened polypropylene with a low $T_g$. The complex [(2,5-t-BuPh)$_2$DABAn]NiBr$_2$ (0.0155 g, 2.0×10$^{-5}$ mol) was placed into a flame-dried 250 mL Schlenk flask which was then evacuated and back-filled with propylene. Freshly distilled toluene (100 mL) was added via syringe and the resulting solution was stirred in a water bath at room temperature. Polymerization was initiated by addition of 1.5 mL of a 10% MAO solution in toluene, and a propylene atmosphere was maintained throughout the course of the reaction. The reaction mixture was stirred for two hours at constant temperature followed by quenching with 6M HCl. Polymer was precipitated from the resulting solution with acetone, collected, washed with water and acetone, and dried under vacuum. Yield=0.75 g. DSC: $T_g$–53.0° C., $T_m$ none observed. Quantitative $^{13}$C NMR analysis, branching per 1000 CH$_2$: Total methyls (307), ≧Butyl and end of chains (11.2), —CHCH$_2$CH(CH$_3$)$_2$ (11.5), —(CH$_2$)$_n$CH(CH$_3$)$_2$, n≧2 (5. 9). Based on the total methyls, the fraction of 1,3-enchainment is 43%.

Listed below are the $^{13}$C NMR data upon which the above analysis is based.

| $^{13}$C NMR data TCB, 120 C, 0.05 M CrAcAc | |
|---|---|
| Freq ppm | Intensity |
| 46.3126 | 6.77995 |
| 46.079 | 6.56802 |
| 45.463 | 7.82411 |
| 45.2453 | 6.98049 |
| 39.1764 | 8.95757 |
| 38.4384 | 5.42739 |
| 38.1145 | 20.5702 |
| 37.8755 | 18.8654 |
| 37.626 | 19.2917 |
| 37.2702 | 128.202 |
| 35.0773 | 6.30042 |

-continued

| $^{13}$C NMR data TCB, 120 C, 0.05 M CrAcAc | | |
|---|---|---|
| Freq ppm | Intensity | |
| 34.5304 | 19.5098 | |
| 34.2543 | 38.6071 | |
| 33.7818 | 4.3205 | |
| 33.2986 | 16.3395 | |
| 32.9588 | 72.1002 | |
| 31.934 | 10.626 | |
| 31.419 | 5.57124 | |
| 30.5907 | 41.727 | |
| 30.1287 | 134.312 | γ |
| 29.7518 | 351.463 | δ$^+$ |
| 29.3217 | 9.58971 | |
| 28.1589 | 21.1043 | |
| 27.9677 | 17.7659 | |
| 27.5589 | 44.1485 | |
| 27.3783 | 25.0491 | |
| 27.1766 | 119.562 | |
| 27.0226 | 52.4586 | |
| ~25.6 | | terminal methine of XXVIII |
| 24.5908 | 8.69462 | |
| 24.4315 | 9.27804 | |
| 22.5253 | 30.7474 | region of methyls of XXVIII and XXIX, 2B$_4$+, 2EOC |
| 20.4333 | 20.0121 | 1B$_1$ |
| 19.7271 | 103.079 | 1B$_1$ |
| 14.7679 | 5.0022 | |
| 14.4068 | 4.56246 | |
| 13.8812 | 12.3077 | 1B$_4$+, 1EOC |

Example 460

Preparation of highly chain-straightened poly-1-hexene with a high $T_m$. A flame-dried 250 mL Schlenk flask under a nitrogen atmosphere was charged with 40 mL of freshly distilled toluene, 0.0133 g of [(2-t-BuPh)$_2$DABAn]NiBr$_2$ (2.0×10$^{-5}$ mol), 5.0 mL of 1-hexene, and 55 mL more toluene (100 mL total volume of liquid). Polymerization was initiated by addition of 2.0 mL of MAO (10% solution in toluene). The reaction mixture was stirred for 11.5 hours at room temperature followed by quenching with 6M HCl. Polymer was precipitated from the resulting solution with acetone, collected via filtration, washed with water and acetone, and dried under vacuum. Yield=1.84 g. DSC: $T_g$ –44.8° C., $T_m$ 46.0° C.

Example 461

Preparation of highly chain-straightened poly-1-hexene with a high $T_m$. A flame-dried 250 mL Schlenk flask under a nitrogen atmosphere was charged with 40 mL of freshly distilled toluene, 0.0155 g of [(2,5-t-BuPh)$_2$DABAn]NiBr$_2$ (2.0×10$^{-5}$ mol), 5.0 mL of 1-hexene, and 55 mL more toluene (100 mL total volume of liquid). Polymerization was initiated by addition of 2.0 mL of MAO (10% solution in toluene). The reaction mixture was stirred for 11.5 hours at room temperature followed by quenching with 6M HCl. Polymer was precipitated from the resulting solution with acetone, collected via filtration, washed with water and acetone, and dried under vacuum. Yield=1.07 g. DSC: $T_g$ –54.7° C., $T_m$ 12.5° C.

Example 462

Preparation of [(2-t-BuPh)$_2$DABAn]PdMe$_2$ from (1,5-cyclooctadiene)PdMe$_2$. The Pd(II) precursor (1,5-cyclooctadiene)PdMe$_2$ ((COD)PdMe$_2$) was prepared according reported procedures (Rudler-Chauvin, M.;

Rudler, H. *J. Organomet. Chem.*, 1977, 134, 115.) and was handled using Schlenk techniques at temperatures of −10° C. or below. A flame-dried Schlenk tube was charged with 0.056 g (0.229 mmol) of (COD)PdMe$_2$ and cooled to −40° C. in a dry ice/isopropanol bath. The solid was dissolved in 10 mL of ether, and the diimine (2-t-BuPh)$_2$DABAn (0.106 g, 0.238 mmol) was cannulated onto the stirring solution as a slurry in 15 mL of ether. The reaction was warmed to 0° C. and stirring was continued for two hours. The reaction flask was stored at −30° C. for several days and resulted in the formation of a green precipitate which was isolated via filtration. The supernatant was pumped dry under high vacuum and also resulted in a green solid. Both solids were determined to be [(2-t-BuPh)$_2$DABAn]PdMe$_2$ by $^1$H NMR spectroscopy. Isolated yield=0.083 g (0.143 mmol, 62.4%).

Example 463

Preparation of [(2,5-t-BuPh)$_2$DABAn]PdMe$_2$ from (1,5-cyclooctadiene)PdMe$_2$. The Pd(II) precursor (1,5-cyclooctadiene)PdMe$_2$ ((COD)PdMe$_2$) was prepared according reported procedures (Rudler-Chauvin, M.; Rudler, H. *J. Organomet. Chem.*, 1977, 134, 115.) and was handled using Schlenk techniques at temperatures of −10° C. or below. A flame-dried Schlenk tube was charged with 0.102 g (0.417 mmol) of (COD)PdMe$_2$ and cooled to −30° C. in a dry ice/isopropanol bath. The solid was dissolved in 10 mL of ether, and the diimine (2,5-t-BuPh)$_2$DABAn (0.234 g, 0.420 mmol) was cannulated onto the stirring solution as a slurry in 40 mL of ether. The reaction was warmed to 0° C. and stirring was continued for four hours. The reaction flask was stored at −30° C. overnight. The resulting dark green solution was filtered and the solvent was pulled off under high vacuum to give a dark green powder. Analysis by $^1$H NMR spectroscopy showed the solid to be consistent with the desired product, [(2,5-t-BuPh)$_2$DABAn]PdMe$_2$. Yield=0.256 g (0.370 mmol, 88.7%).

Example 464

In a dry box, polymer from Example 469 (0.57 g), THF (10.10 g) and acetic anhydride (0.65 g) were placed in a 20 mL vial equipped with a stirring bar. After one hour at room temperature, the vial was removed from the dry box and the polymerization terminated by the addition of THF, water and ether. The organic phase was separated, washed with water (2×), dried over anhydrous sodium sulfate, concentrated at reduced pressure and then dried under vacuum, affording 4.44 g of polymer. GPC analysis (PS STD.): Mn=17600, Mw=26000, PD=1.48.

Example 465

Preparation of CH$_2$=CH(CH$_2$)$_2$CHICH$_2$(CF$_2$)$_2$OCF$_2$CF$_2$SO$_2$F

A mixture of 72 g of hexadiene, 127.8 g of ICF$_2$CF$_2$OCF$_2$CF$_2$SO$_2$F, 7.0 g of Cu powder and 180 mL of hexane was stirred at 90° C. overnight. Solids were removed by filtration and washed with hexane. After removal of volatiles, residue was distilled to give 115.3 g of product, bp 80° C./210 Pa. $^{19}$F NMR: +45 (t, J=6.0 Hz, 1F), −82.7 (m, 2F), −88.1 (dt, J=42.5 Hz, J=12.6 Hz, 1F), −88.7 (dt, J=45.5 Hz, J=12.6 Hz, 1F), −112.7 (m, 2F), −115.9 (ddd, J=2662.2 Hz, J=30.0 Hz, J=8.2 Hz, 1F), −118.9 (ddd, J=262.2 Hz, J=26.8 Hz, J=7.4 Hz, 1F).

Example 466

Preparation of CH$_2$=CH(CH$_2$)$_4$(CF$_2$)$_2$OCF$_2$CF$_2$SO$_2$F

To a stirred solution of 100 g of CH$_2$=CH(CH$_2$)$_2$CHICH$_2$(CF$_2$)$_2$OCF$_2$CF$_2$SO$_2$F and 200 mL of ether was added 63 g of Bu$_3$SnH at room temperature. After the addition was complete, the reaction mixture was refluxed for 4 hours and then cooled with ice water. Excess of Bu$_3$SnH was destroyed by addition of iodine. After being diluted with 200 mL of ether, the reaction mixture was treated with a solution of 25 g of KF in 200 mL of water for 30 min. The solids were removed by filtration through a funnel with silica gel and washed with ether. The ether layer was separated and washed with water, aqueous NaCl solution and dried over MgSO$_4$. After removal of the ether, residue was distilled to give 54.7 g of product, bp 72° C./1.3 kPa, and 12.2 g of starting material.

$^{19}$F NMR: +45 (m, 1F), −82.7 (m, 2F), −88.0 (m, 2F), −112.6 (m, 2F), −118.6 (t, J=18.4 Hz, 2F).

Example 467

Preparation of CH$_2$=CH(CH$_2$)$_4$(CF$_2$)$_4$OCF$_2$CF$_2$SO$_2$F

A mixture of 24 g of hexadiene, 53 g of I(CF$_2$)$_4$OCF$_2$CF$_2$SO$_2$F, 3.0 g of Cu powder and 60 mL of hexane was stirred at 70° C. overnight. Solids were removed by filtration and washed with hexane. After removal of volatiles, residue was distilled to give 115.3 g of adduct, CH$_2$=CH(CH$_2$)$_2$CHICH$_2$(CF$_2$)$_4$OCF$_2$CF$_2$SO$_2$F, bp 74° C./9 Pa. $^{19}$F NMR: +45.5 (m, 1F), −82.4 (m, 2F), −83.5 (m, 2F), −112.2 (dm, J=270 Hz, 1F), −112.6 (m, 2F), −115.2 (dm, J=270 Hz, 1F), −124.3 (s, 2F), −125.5 (m, 2F).

To stirred solution of 47 g of CH$_2$=CH(CH$_2$)$_2$CHICH$_2$(CF$_2$)$_4$OCF$_2$CF$_2$SO$_2$F and 150 mL of ether was added 27 g of Bu$_3$SnH at room temperature. After the addition was complete, the reaction mixture was stirred overnight. Excess of Bu$_3$SnH was destroyed by addition of iodine. After being diluted with 150 mL of ether, the reaction mixture was treated with a solution of 20 g of KF in 100 mL of water for 30 min. The solids were removed by filtration through a funnel with silica gel and washed with ether. The ether layer was separated and washed with water, aqueous NaCl solution and dried over MgSO$_4$. After removal of the ether, residue was distilled to give 24.7 g of product, bp 103° C./1.3 kPa. $^{19}$F NMR: +45.4 (m, 1F), −82.4 (m, 2F), −83.5 (m, 2F), −112.6 (t, J=2.6 Hz, 2F), −115.1 (t, J=15 Hz, 2F), −124.3 (s, 2F), −125.7 (t, J=14 Hz, 2F). HRMS: calcd for C$_{12}$H$_{11}$F$_{13}$SO$_3$: 482.0221. Found: 482.0266.

Example 468

Hydrolysis of Copolymer

Copolymer containing 8.5 mol % of comonomer (1.5 g) was dissolved in 30 mL of THF at room temperature. KOH (0.5 g) in 5 mL of ethanol and 3 mL of water was added and the resulting mixture was stirred at room temperature for six hours. After removal of the solvent, residue was treated with diluted HCl for 70 hours and then filtered to give solids which were washed with water, HCl and dried under full vacuum at 70° C. for two days to give 1.4 g solid.

Example 469

Hydrolysis of Copolymer

A mixture of 10.6 g of copolymer 5.0 g of KOH, 2 mL of water, 30 mL of ethanol and 30 mL of THF was stirred at room temperature overnight and at 60 to 70° C. for 5 hours. After removal of a half of solvents, residue was treated with Conc. HCl to give rubbery material, which was poured into a blender and blended with water for 30 min. Filtration gave solids, which were washed with conc. HCl, and water and dried under vacuum at 60° C. overnight to give 8.7 g of dark rubbery material. $^{19}$F NMR(THF): −82.8 (br, 2F); −88.5 (br, 2F), −118.3 (br, 2F), −118.5 (br, 2F).

Example 470

Hydrolysis of Homopolymer

A solution of 2.0 g of KOH in 25 mL of ethanol and 2 mL of waster was added to a flask with 3.0 g of homopolymer. The resulting heterogeneous mixture was stirred at room temperature overnight and heated to 60° C. for 2 hours. After removal of one-half of liquid, the reaction mixture treated with 40 mL of conc. HCl for 30 min. Filtration gave white solids which were washed with conc. HCl, and distilled water and dried under vacuum at 60–70° C. for 24 hours to give 2.9 g of white powder.

Example 471

1-Octadecene (8 mL, 8 vol %) was added to a suspension of [(2,6-i-PrPh)$_2$DABAn]NiBr$_2$ (12 mg, 1.7×10$^{-5}$ mol) in 100 mL of dry toluene. The flask was cooled to −1° C. using an Endocal® refrigerated circulating bath and 2.5 mL of a 7% MMAO solution in heptane was added. After stirring the reaction for 40 min, the flask was filled with propylene (1 atm) and stirred for 20 minutes. The propylene was removed in vacuo and the reaction allowed to continue for an additional 40 min. Acetone and water were added to quench the polymerization and precipitate the polymer. The resulting triblock polymer was dried under high vacuum overnight to yield 650 mg of a rubbery solid. GPC (trichlorobenzene, 135° C., polystyrene reference): $M_n$=60,100; $M_w$=65,500; $M_w/M_n$=1.09. DSC analysis: Two melt transitions were observed. $T_m$=8° C. (32 J/g), $T_m$=37° C. (6.5 J/g). $^1$H-NMR analysis (CDCl$_3$): signals attributable to repeat units of propylene and 1-octadecene were observed.

Example 472

Preparation of (2-i-Pr-6-MePh)$_2$DABAn

A Schlenk tube was charged with 2-isopropyl-6-methylaniline (5.00 mL, 30.5 mmol) and acenaphthenequinone (2.64 g, 14.5 mmol). The reagents were partially dissolved in 50 mL of methanol (acenaphthenequinone was not completely soluble) and 1–2 mL of formic acid was added. An orange/yellow solid was collected via filtration after stirring overnight, and was washed with methanol and dried under vacuum.

Example 473

Preparation of (2-i-Pr-6-MePh)$_2$DABMe$_2$

A Schlenk tube was charged with 2-isopropyl-6-methylaniline (5.00 mL, 30.5 mmol) and 2,3-butanedione (1.31 mL, 14.9 mmol). Methanol (5 mL) and one drop of concentrated HCl were added and the mixture was heated to reflux with stirring for 30 minutes. The methanol and remaining dione were removed under vacuum to give a dark, oily residue. The oil was chromatographed on a silica gel column using 10% ethyl acetate: 90% hexane as the eluent. The fractions containing the pure diimine were combined and concentrated. The remaining solvents were removed under vacuum to give a pale yellow powder (0.9217 g, 17.75%).

Example 474

Preparation of [(2-i-Pr-6-MePh)$_2$DABAn]NiBr$_2$

Under inert conditions, a flame-dried Schlenk tube was charged with 0.50 g (1.13 mmol) of (2-i-Pr-6-MePh)$_2$DABAn, 0.34 g (1.10 mmol) of (DME)NiBr$_2$ and 25 mL of CH$_2$Cl$_2$. The reaction mixture was allowed to stir overnight. The solution was filtered and the solvent removed under vacuum. The residue was washed with ether (4×10 mL) to give an orange/yellow powder which was dried under vacuum overnight (0.68 g, 94%).

Example 475

Preparation of [(2-i-Pr-6-MePh)$_2$DABMe$_2$]NiBr$_2$

Under inert conditions, a flame-dried Schlenk tube was charged with 0.3040 g (0.8722 mmol) of (2-i-Pr-6-MePh)$_2$DABMe$_2$, 0.2640 g (0.8533 mmol) of (DME)NiBr$_2$ and 25 mL of CH$_2$Cl$_2$. The reaction mixture was allowed to stir overnight. A solid was collected via filtration and washed with ether (2×10 mL). Upon sitting, more solid precipitated from the supernatant. This precipitate was isolated via filtration, washed with ether, and combined with the originally isolated product. The combined yellow/orange solids were dried under vacuum overnight (0.68 g, 94%).

Example 476

Under a nitrogen atmosphere, the complex [(2-i-Pr-6-MePh)$_2$DABAn]NiBr$_2$ (0.0099 g, 1.5×10$^{-5}$ mol) was placed into a flame-dried 250 mL Schlenk flask which was then evacuated and back-filled with propylene. Freshly distilled toluene (100 mL) was added via syringe and the resulting solution was stirred for five minutes at room temperature. Polymerization was initiated with addition of methylaluminoxane (MAO; 1.5 mL 10% solution in toluene) and a propylene atmosphere was maintained throughout the course of the reaction. The reaction was stirred for two hours at constant temperature, at which point the polymerization was by quenched with 6M HCl. Polymer was precipitated from the resulting solution with acetone, washed with water and acetone, and dried under vacuum. Yield=3.09 g. DSC: $T_g$ −31.2° C. GPC: $M_n$=142,000; $M_w$=260,000; $M_w/M_n$=1.83.

Example 477

Under a nitrogen atmosphere, the complex [(2-i-Pr-6-MePh)$_2$DABMe$_2$]NiBr$_2$ (0.0094 g, 1.5×10$^{-5}$ mol) was placed into a flame-dried 250 mL Schlenk flask which was then evacuated and back-filled with propylene. Freshly distilled toluene (100 mL) was, added via syringe and the resulting solution was stirred for five min at room temperature. Polymerization was initiated with addition of methylaluminoxane (MAO; 1.5 mL 10% solution in toluene) and a propylene atmosphere was maintained throughout the course of the reaction. The reaction was stirred for two hours at constant temperature, at which point the polymerization was by quenched with 6M HCl. Polymer was precipitated from the resulting solution with acetone, washed with water and acetone, and dried under vacuum. Yield=1.09 g. DSC: $T_g$ −36.1° C. GPC: $M_n$=95,300; $M_w$=141,000; $M_w/M_n$=1.48.

Example 478

Under a nitrogen atmosphere, a flame-dried 250 mL Schlenk flask was charged with 40 mL of freshly distilled toluene, 0.0133 g (2.0×10$^{-5}$ mol) of [(2-i-Pr-6-MePh)$_2$DABAn]NiBr$_2$, 10.0 mL of 1-hexene, and 50 mL more toluene (100 mL total volume of liquid). The mixture was stirred in a room temperature water bath for 10 minutes and polymerization was initiated with addition of 2.0 mL of MAO (10% solution in toluene). The reaction mixture was stirred for one hour at room temperature and was quenched with 6M HCl. Polymer was precipitated from the resulting solution with acetone, collected via filtration, washed with water and acetone, and dried under vacuum. Yield=3.23 g. DSC: $T_g$ −58.0° C., $T_m$ −16.5° C.

Example 479

Under a nitrogen atmosphere, a flame-dried 250 mL Schlenk flask was charged with 40 mL of freshly distilled toluene, 0.0125 g ($2.0 \times 10^{-5}$ mol) of [(2-i-Pr-6-MePh)$_2$DABMe$_2$]NiBr$_2$, 10.0 mL of 1-hexene, and 50 mL more toluene (100 mL total volume of liquid). The mixture was stirred in a room temperature water bath for 10 min and polymerization was initiated with addition of 2.0 mL of MAO (10% solution in toluene). The reaction mixture was stirred for 22 h at room temperature and was quenched with 6M HCl. Polymer was precipitated from the resulting solution with acetone, collected via filtration, washed with water and acetone, and dried under vacuum. Yield=2.10 g. DSC: $T_g$ −56.4° C., $T_m$ 0.2° C.

Example 480

Under a nitrogen atmosphere, a flame-dried 250 mL Schlenk flask was charged with 40 mL of freshly distilled toluene., 0.0133 g ($2.0 \times 10^{-5}$ mol) of [(2-t-BuPh)$_2$DABAn]NiBr$_2$, 10.0 mL of 1-hexene, and 50 mL more toluene (100 mL total volume of liquid). The mixture was stirred in an isopropanol bath maintained at approximately −10 to −12° C., and polymerization was initiated with addition of 2.5 mL of MMAO (7.2% solution in heptane). The reaction mixture was stirred for two hours at constant temperature and was quenched with acetone/water/6M HCl. The mixture was added to acetone to precipitate the polymer. After settling overnight the polymer was collected via filtration, washed with water and acetone, and dried under vacuum. Yield=0.35 g. DSC: (two broad melt transitions observed) $T_m(1)$ 34.3° C., $T_m(2)$ 66.4° C. Based on the $^1$H NMR spectrum, the polymer contains 41 methyl branches/1000 carbons (theoretical=55.5 Me/1000 C), indicating a high degree of chain straightening.

Example 481

Under a nitrogen atmosphere, a flame-dried 250 mL Schlenk flask was charged with 25 mL of freshly distilled toluene, 0.0133 g ($2.0 \times 10^{-5}$ mol) of [(2-t-BuPh)$_2$DABAn]NiBr$_2$, 63 mL more toluene, and 12.0 mL of 1-octadecene (100 mL total volume of liquid). The flask was cooled to −10° C. in a CO$_2$/isopropanol bath and stirred at this temperature for several minutes. The temperature was maintained at approximately −10° C. throughout the reaction by continually adding dry ice as needed. Polymerization of 1-octadecene was initiated with addition of 2.5 mL of MMAO (7.2% solution in heptane). At 2 h, 10 min the reaction flask was twice evacuated and back-filled with propylene. The polymerization was stirred under one atmosphere of propylene for 20 min. The propylene was removed by repeatedly evacuating the flask and back-filling with argon until propylene evolution from the solution was no longer apparent. The polymerization was allowed to continue stirring in the presence of the remaining 1-octadecene until a total elapsed time of five hours was reached. The reaction was quenched with acetone/water/6M HCl. Polymer was precipitated in methanol/acetone, collected via filtration, washed with water and acetone, and dried under vacuum. Yield 1.03 g. DSC: $T_g$ 8.0° C., $T_m$ 53.3° C. GPC: $M_n$=55,500; $M_w$=68,600; $M_w/M_n$=1.24. It is believed a block copolymer was formed.

Example 482

Preparation of [(2-t-BuPh)$_2$DABAn]PdMe(Et$_2$O) BAF$^-$

Under inert conditions, a flame-dried Schlenk tube was charged with 0.1978 g ($3.404 \times 10^{-4}$ mol) of [(2-t-BuPh)$_2$DABAn]PdMe$_2$ and 0.3451 g ($3.408 \times 10^{-4}$ mol) of H$^+$(Et$_2$O)$_2$BAF$^-$. The Schlenk tube was cooled to −78° C. and 10 mL of ether was added. The Schlenk tube was transferred to an ice water bath and the reaction was stirred until the solids were dissolved and the color of the solution became deep red. The ether was then removed under vacuum to give a red, glassy solid that was crushed into a powder (yield was quantitative).

Example 483

Preparation of [(2,5-t-BuPh)$_2$DABAn]PdMe(Et$_2$O) BAF$^-$

Following the procedure of Example 482, a red solid with the structure [(2,5-t-BuPh)$_2$DABAn]PdMe(Et$_2$O)BAF$^-$ was obtained (quantitative yield).

Example 484

Preparation of [(2-t-BuPh)$_2$DABMe$_2$]PdMe(NCMe) BAF$^-$

Under inert conditions, a flame-dried Schlenk tube was charged with 0.1002 g (0.378 mmol) of (COD)PdMeCl and 0.3348 g (0.378 mmol) of NaBAF. The Schlenk tube was cooled. to −30° C. and 25 mL of CH$_2$Cl$_2$ and 0.10 mL of NCMe were added via syringe. The reaction was stirred for two h at −20 to −30° C. The resulting colorless solution was filtered into another cooled Schlenk tube, 20 mL of hexane was added, and the solvents were removed under vacuum to give a white powder [isolated (COD)PdMe(NCMe)BAF$^-$]. This cationic precursor was combined with 0.138 g (0.396 mmol) of (2-t-BuPh)$_2$DABMe$_2$ in 50 mL of NCMe. The reaction mixture was stirred overnight at room temperature. The solution was filtered and extracted with hexane (3×10 mL), and the solvents were removed under vacuum. The resulting yellow oil was dissolved in CH$_2$Cl$_2$/hexane and the solvents were removed under vacuum to give a glassy solid that was crushed into a powder. Two isomers were observed in solution by $^1$H NMR spectroscopy. These two isomers arise from the coordination of the unsymmetrically substituted ligand in either the cis or trans fashion in regard to the t-butyl groups relative to the square plane of the complex.

Example 485

Polymerization of Ethylene With [(2-t-BuPh)$_2$DABAn]PdMe(Et$_2$O)BAF$^-$

A flame-dried 250 mL Schlenk flask was charged with 0.1505 g ($1.001 \times 10^{-4}$ mol) of [(2-t-BuPh)$_2$DABAn]PdMe(Et$_2$O)BAF$^-$ in the glove box. The flask was twice evacuated and back-filled with ethylene and then cooled to −60° C. The solid was dissolved in 100 mL of CH$_2$Cl$_2$ and the flask was allowed to warm to room temperature with stirring under an atmosphere of ethylene. After stirring for 23 h the polymerization was quenched with methanol. The solvent was removed under reduced pressure and the polymer was dissolved in petroleum ether and filtered through silica gel. The filtrate was concentrated and the remaining solvent was removed under vacuum to give a clear, colorless, viscous liquid. Yield=0.2824 g. $^1$H NMR analysis: 125 Me/1000 CH$_2$.

Example 486

A flame-dried 250 mL Schlenk flask was charged with 0.1621 g (1.003×10$^{-4}$ mol) of [(2,5-t-BuPh)$_2$DABAn]PdMe(Et$_2$O)BAF$^-$ in the glove box. The flask was twice evacuated and back-filled with ethylene and then cooled to −60° C. The solid was dissolved in 100 mL of CH$_2$Cl$_2$ and the flask was allowed to warm to room temperature with stirring under an atmosphere of ethylene. After stirring for 23 h the polymerization was quenched with methanol. The solvent was removed under reduced pressure and the polymer was dissolved in petroleum ether and filtered through silica gel. The filtrate was concentrated and the remaining solvent was removed under vacuum to give a clear, colorless, viscous liquid. Yield=0.2809 g. $^1$H NMR analysis: 136 Me/1000 CH$_2$.

Example 487

A flame-dried 250 mL Schlenk flask was charged with 0.1384 g (1.007×10$^{-4}$ mol) of [(2-t-BuPh)$_2$DABMe$_2$]PdMe(NCMe)BAF$^-$ in the glove box. The flask was twice evacuated and back-filled with ethylene and then cooled to −60° C. The solid was dissolved in 100 mL of CH$_2$Cl$_2$ and the flask was allowed to warm to room temperature with stirring under an atmosphere of ethylene. After stirring for 23 h the polymerization was quenched with methanol. The solvent was removed under reduced pressure and the polymer was dissolved in petroleum ether and filtered through silica gel. The filtrate was concentrated and the remaining solvent was removed under vacuum to give a clear, colorless, viscous liquid. Yield=2.40 g. $^1$H NMR analysis: 123 Me/1000 CH$_2$.

Example 488

Under inert conditions, a Schlenk tube was charged with 0.0142 g (1.02×10$^{-5}$ mol) of [(2-t-BuPh)$_2$DABAn]PdMe(Et$_2$O)BAF$^-$. The Schlenk tube was cooled to −78° C. and the solid was dissolved in 30 mL of CH$_2$Cl$_2$. A 300 mL autoclave was charged with 70 mL of CH$_2$Cl$_2$ under an ethylene atmosphere. The cold catalyst solution was quickly transferred via cannula into the Parr® reactor and the reactor was pressurized to 172 kPa (absolute). The polymerization was stirred for 20 h and the ethylene pressure was released. The red/orange solution was transferred and the solvent was removed under vacuum. A small amount of polyethylene remained after drying under vacuum overnight. Yield=0.17 g. $^1$H NMR analysis: 120 Me/1000 CH$_2$.

Example 489

Following the procedure described in Example 488, 1.68 g of polyethylene was produced using 0.0140 g (1.02×10$^{-5}$ mol) of [(2-t-BuPh)$_2$DABMe$_2$]PdMe(NCMe)BAF$^-$. Yield=1.68 g. $^1$H NMR analysis: 114 Me/1000 CH$_2$.

Example 490

Under nitrogen, Ni(COD)$_2$ (0.017 g, 0.062 mmol) and (2,4,6-MePh)$_2$DABAn (0.026 g, 0.062 mmol) were dissolved in 2.00 g of cyclopentene to give a purple solution. The solution was then exposed to air for several seconds. The resulting dark red-brown solution was then put back under nitrogen, and EtAlCl$_2$ (1 M solution in toluene, 3.0 mL, 3.0 mmol) was added. A cranberry-red solution formed instantly. The reaction mixture was stirred at room temperature for 3 days, during which time polycyclopentene precipitated. The reaction was then quenched by the addition of methanol followed by several drops of concentrated HCl. The reaction mixture was filtered, and the product polymer washed with methanol and dried to afford 0.92 g of polycyclopentene as an off-white powder. Thermal gravimetric analysis of this sample showed a weight loss starting at 141° C.: the sample lost 18% of its weight between 141 and 470° C., and the remaining material decomposed between 470 and 496° C.

Example 491

Under a nitrogen atmosphere, Ni(COD)$_2$ (0.017 g, 0.06 mmol) and MeC(=N-2,6-C$_6$H$_3$-iPr$_2$)CH=C(NH—C$_6$H$_3$-iPr$_2$)Me (0.025 g, 0.06 mmol) were dissolved in benzene (5.0 mL). To the resulting solution was added HBAF.(Et$_2$O)$_2$ (0.060 g, 0.06 mmol). The resulting solution was immediately frozen inside a 40 mL shaker tube glass insert. The glass insert was transferred to a shaker tube, and its contents allowed to thaw under an ethylene atmosphere. The reaction mixture was agitated under 6.9 MPa C$_2$H$_4$ for 40 h at ambient temperature. The final reaction mixture contained polyethylene, which was washed with methanol and dried; yield of polymer=1.37 g. Branching per 1000 CH$_2$'s was determined by $^{13}$C NMR (C$_6$D$_3$Cl$_3$): Total methyls (10.2), Methyl (8.8), Ethyl (1.1), Propyl (0), Butyl (0), ≧Am and end of chains (3.2), ≧Bu and end of chains (0.3).

Example 492

Under a nitrogen atmosphere, Ni(COD)$_2$ (0.017 g, 0.06 mmol) and the ligand shown below (0.025 g, 0.06 mmol) were dissolved in benzene (5.0 mL). To the resulting solution was added HBAF.(Et$_2$O)$_2$ (0.060 g, 0.06 mmol). The resulting solution was immediately frozen inside a 40 mL shaker tube glass insert. The glass insert was transferred to a shaker tube, and its contents allowed to thaw under an ethylene atmosphere. The reaction mixture was agitated under 6.9 MPa C$_2$H$_4$ for 18 h at ambient temperature. The final reaction mixture contained polyethylene, which was washed with methanol and dried; yield of polymer=11.0 g.

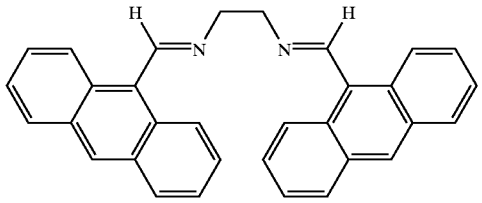

Example 493

{[(2,6-i-PrPh)$_2$DABMe$_2$]Pd(η$^3$-CHEtPh)]}BAF

In a nitrogen-filled drybox, 25 mL of Et$_2$O was added to a flask containing [(2,6-i-PrPh)$_2$DABMe$_2$]PdMeCl (402 mg, 0.716 mmol) and NaBAF (633 mg, 0.714 mmol) to yield an orange solution. Styrene (110 µL, 0.960 mmol, 1.35 equiv) was dissolved in ~10 mL of Et$_2$O and the resulting solution was added to the reaction mixture, which was then stirred for 3 h. Next, the solution was filtered and the solvent was removed in vacuo: The resulting orange powder (0.93 g, 87%) was washed with hexane and dried in vacuo. $^1$H NMR (CD$_2$Cl$_2$, 300 MHz, rt) δ 7.76 (s, 8, BAF: H$_o$), 7.59 (s, 4, BAF: H$_p$), 7.46–7.17 (m, 9, H$_{aryl}$), 6.29 (d, 1, J=7.33, H$_{aryl}$), 5.65 (d, 1, J=6.59, H$_{aryl}$), 3.33, 3.13, 2.37 and 1.93 (septet, 1 each, J=6.97–6.72, C'HMe$_2$, C'HMe$_2$, C'''Me$_2$, C'''HMe$_2$), 3.17 (dd, 1, J=11.36, 3.66, CHEtPh), 2.22 and 2.17 (s, 3 each, N=C(Me)—C(Me)=N), 1.52, 1.45, 1.26, 1.26, 1.19, 1.15, 0.94 and 0.73 (d, 3 each, J=6.97–6.59, CHMeMe', C'HMeMe', C''HMeMe', C'''HMeMe'), 0.88 (t, 3, J=0.88, CH(CH$_2$CH$_3$)Ph), 1.13 and −0.06 (m, 1 each, CH(CHH'CH$_3$)Ph); $^{13}$C NMR (CD$_2$Cl$_2$, 75 MHz, rt) δ 176.6 and 174.0 (N=C—C'=N), 162.2 (q, J$_{CB}$=49.3, BAF: C$_{ipso}$), 142.8 and 142.4 (Ar, Ar': C$_{ipso}$), 138.2, 137.3, 137.1, and 136.9 (Ar, Ar': C$_o$), 135.2 (BAF: C$_o$,C$_o$'), 134.6 and 132.2 (Ph: C$_o$, C$_m$, or C$_p$)), 129.4 (BAF: C$_m$), 129.0 and 128.5 (Ar, Ar': C$_p$), 125.1, 125.1, 124.9 and 124.7 (Ar, Ar': C$_m$), 125.1 (q, J$_{CF}$=272.5, BAF: CF$_3$), 120.2 (Ph: C$_{ipso}$) and 120.0 (Ph: C$_o$, C$_m$, or C$_p$), 117.9 (BAF: C$_p$), 103.0 and 88.6 (Ph: C$_o$' and C$_m$'), 69.1 (CHEtPh), 29.9, 29.7, 29.12 and 29.09 (CHMe$_2$, C'HMe$_2$, C''HMe$_2$, C'''HMe$_2$), 24.4, 24.3, 23.5, 23.4, 23.1, 23.0, 22.9, and 22.7 (CHMeMe', C'HMeMe', C''HMeMe', C'''HMeMe'), 20.8, 20.65, and 20.61 (N=C(Me)—C'(Me)=N, CH(CH$_2$CH$_3$)Ph)), 13.1 (CH(CH$_2$CH$_3$)Ph).

Example 494

{[(2,6-i-PrPh)$_2$DABH$_2$]Pd($\eta^3$-CHEt(4-C$_6$H$_4$-t-Bu)]}BAF t-Butylstyrene (230 μL, 1.26 mmol, 1.10 equiv) was added via microliter syringe to a mixture of [(2,6-i-PrPh)$_2$DABH$_2$]PdMeCl (611 mg, 1.15 mmol) and NaBAF (1.01 g, 1.14 mmol) dissolved in 25 mL of Et$_2$O. An additional 25 mL of Et$_2$O was added to the reaction mixture, which was then stirred for ~12 h. The resulting deep red solution was filtered, and the solvent was removed in vacuo to yield a sticky red solid. The solid was washed with 150 mL of hexane and the product was dried in vacuo. A dull orange powder (1.59 g, 91.7%) was obtained: $^1$H NMR (CD$_2$Cl$_2$, 400 MHz, rt) δ 8.34 and 8.16 (s, 1 each, N=C(H)—C'(H)=N), 7.72 (s, 8, BAF: H$_o$), 7.56 (s, 4, BAF: H$_p$), 7.5–7.1 (m, 8, H$_{aryl}$) 6.88 (dd, 1, J=7.1, 1.9, H$_{aryl}$), 6.11 (dd, 1, J=7.3, 2.0, H$_{aryl}$) 3.49, 3.37, 2.64 and 2.44 (septet, 1 each, J=6.6–6.9, CHMe$_2$, C'HMe$_2$, C"HMe$_2$ and C"'HMe$_2$), 3.24 (dd, 1, J=11.3, 4.1, CHEt(4-C$_6$H$_4$-t-Bu)), 1.52, 1.48, 1.24, 1.24, 1.19, 1.18, 1.0 and 0.70 (d, 3 each, J=6.8–6.9, CHMeMe', C'HMeMe', C"HMeMe', and C"'HMeMe'), 1.42 and 0.25 (m, 1 each, CH(CHH'CH$_3$)(4-C$_6$H$_4$-t-Bu)), 0.98 (s, 9, t-Bu), 0.87 (t, 3, J=7.4, CH(CH$_2$CH$_3$)(4-C$_6$H$_4$-t-Bu)); $^{13}$C NMR (CD$_2$Cl$_2$, 100 MHz, rt) δ 165.0 (J$_{CH}$=165, N=C(H)), 163.3 (J$_{CH}$=165, N=C'(H)), 162.2 (q, J$_{CB}$=49.9, BAF: C$_{ipso}$) 157.0 (C$_6$H$_4$-t-Bu: C$_p$), 144.9 and 144.6 (Ar, Ar': C$_{ipso}$) 139.0, 138.4, 138.2 and 137.4 (Ar, Ar': C$_o$, C$_o$'), 135.2 (BAF: C$_o$), 133.3, 129.8, 129.6 and 129.2 (Ar, Ar': C$_p$; C$_6$H$_4$-t-Bu: C$_o$, C$_m$), 129.3 (q, BAF: C$_m$), 125.0 (q, J$_{CF}$=272, BAF: CF$_3$), 124.7, 124.64, 124.55, and 124.3 (Ar, Ar': C$_m$, C$_m$'), 117.9 (BAF: C$_p$), 119.1, 116.4 and 94.9 (C$_6$H$_4$-t-Bu: C$_m$', C$_{ipso}$, C$_o$'), 68.5 (CHEt), 36.2 (CMe$_3$), 30.2 (CMe$_3$), 30.1, 29.9, 28.80 and 28.77 (CHMe$_2$, C'HMe$_2$, C"HMe$_2$ and C"'HMe$_2$), 25.0, 24.8, 24.1, 22.8, 22.7, 22.45, 22.36, and 22.1 (CHMeMe', C'HMeMe', C"HMeMe' and C"'HMeMe'), 21.7 (CH(CH$_2$CH$_3$)), 13.2 (CH(CH$_2$CH$_3$)). Anal. Calcd for (C$_{71}$H$_{67}$BF$_{24}$N$_2$Pd): C, 56.05; H, 4.44; N, 1.84. Found: C, 56.24; H, 4.22; N, 1.59.

Example 495

{[(2,6-i-PrPh)$_2$DABMe$_2$]Pd($\eta^3$-CHEtC$_6$F$_5$)}BAF

A solution of H$_2$C=CHC$_6$F$_5$ (138 mg, 0.712 mmol) in 10 mL of Et$_2$O was added to a mixture of [(2,6-i-PrPh)$_2$DABMe$_2$]PdMeCl (401 mg, 0.713 mmol) and NaBAF (635 mg, 0.716 mmol) dissolved in 25 mL of Et$_2$O. After being stirred for 2 h, the reaction mixture was filtered and the solvent was removed in vacuo. An orange powder (937 mg, 83.0%) was obtained.

Example 496

{[(2,6-i-PrPh)$_2$DABH$_2$]Ni[$\eta^3$-CHEt(4-C$_6$H$_4$-t-Bu)]}BAF

In the drybox, {[(2,6-i-PrPh)$_2$DABMe$_2$]NiMe(OEt$_2$)}BAF (22.4 mg, 0.0161 mmol) was placed in an NMR tube. The tube was sealed with a septum and Parafilm®, removed from the drybox, and cooled to –78° C. CD$_2$Cl$_2$ (700 μL) and H$_2$C=CH(4-C$_6$H$_4$-t-Bu) (15 μL, 5.10 equiv) were then added via gastight microliter syringe to the cold tube in sequential additions. The septum was sealed with a small amount of grease and more Parafilm, the tube was shaken briefly and then transferred to the cold (–78° C.) NMR probe. Insertion of t-butylstyrene was observed at –78° C. and was complete upon warming to –50° C. to yield the π-benzyl complex: $^1$H NMR (CD$_2$Cl$_2$, 400 MHz, –5° C.) δ 8.43 and 8.18 (s, 1 each, N=C(H)—C'(H)=N), 7.76 (s, 8, BAF: H$_o$), 7.58 (s, 4, BAF: H$_p$), 7.5–7.1 (m, 8, H$_{aryl}$), 6.80 (d, 1, J=7.3, H$_{aryl}$), 6.15 (d, 1, J=7.7, H$_{aryl}$), 3.72, 3.18, 2.68 and 2.50 (septet, 1 each, J=6.5–6.7, CHMe$_2$, C'HMe$_2$, C"HMe$_2$ and C"'HMe$_2$), 2.56 (dd, 1, J=11.5, 3.9, CHEt), 1.6–0.8 (CHMeMe', C'HMeMe', C"HMeMe', C"'HMeMe', and CH(CHH'CH$_3$)), 0.94 (s, 9, CMe$_3$), 0.72 (t, 3, J=7.3, CH(CH$_2$CH$_3$)), –0.04 (m, 1, CH(CHH'CH$_3$)).

Examples 497–515

General Procedure for the Synthesis of π-Allyl Type Nickel Compounds

A mixture of one equiv. of the appropriate α-diimine, one equiv of NaBAF, and 0.5 equiv of [(allyl)Ni($\mu$-X)]$_2$ (X=Cl or Br) was dissolved in Et$_2$O. The reaction mixture was stirred for ~2 h before being filtered. The solvent was removed in vacuo to yield the desired product, generally as a red or purple powder. (The [(allyl)Ni($\mu$-X)]$_2$ precursors were synthesized according to the procedures published in the following reference: Wilke, G.; Bogdanovic, B.; Hardt, P.; Heimbach, P.; Keim, W.; Kroner, M.; Oberkirch, W.; Tanaka, K.; Steinrucke, E.; Walter, D.; Zimmermann, H. *Angew. Chem. Int. Ed. Engl.* 1966, 5, 151–164.) The following compounds were synthesized according to the above general procedure.

Example 497
{[(2,4,6-MePh)$_2$DABMe$_2$]Ni($\eta^3$-C$_3$H$_5$)}BAF

Example 498
{[(2,6-i-PrPh)$_2$DABMe$_2$]Ni($\eta^3$-C$_3$H$_5$)}BAF

Example 499
{[(2,6-i-PrPh)$_2$DABMe$_2$]Ni($\eta^3$-H$_2$CCHCHMe)}BAF

Example 500
{[(2,6-i-PrPh)$_2$DABMe$_2$]Ni($\eta^3$-H$_2$CCHCHPh)}BAF

Example 501
{[(2,6-i-PrPh)$_2$DABMe$_2$]Ni($\eta^3$-H$_2$CCHCMe$_2$)}BAF

Example 502
{[(2,6-i-PrPh)$_2$DABAn]Ni($\eta^3$-C$_3$H$_5$)}BAF

Example 503
{[(2,6-i-PrPh)$_2$DABAn]Ni($\eta^3$-H$_2$CCHCHMe)}BAF

Example 504
{[(2,6-i-PrPh)$_2$DABAn]Ni($\eta^3$-H$_2$CCHCHPh)}BAF

Example 505
{[(2,6-i-PrPh)$_2$DABAn]Ni($\eta^3$-H$_2$CCHCMe$_2$)}BAF

Example 506
{[(2,4,6-MePh)$_2$DABAn]Ni($\eta^3$-H$_2$CCHCHMe)}BAF

Example 507
{[(2,4,6-MePh)$_2$DABAn]Ni($\eta^3$-H$_2$CCHCHPh)}BAF

Example 508
{[(2,4,6-MePh)$_2$DABAn]Ni($\eta^3$-C$_3$H$_5$)}BAF

Example 509
{[(2,4,6-MePh)$_2$DABAn]Ni($\eta^3$-H$_2$CCHCMe$_2$)}BAF

Example 510
{[(2,6-i-PrPh)$_2$DABAn]Ni($\eta^3$-H$_2$CC(COOMe)CH$_2$)}BAF

Example 511
{[(2,4,6-MePh)$_2$DABAn]Ni($\eta^3$-H$_2$CC(COOMe)CH$_2$)}BAF

Example 512
{[(2,6-i-PrPh)$_2$DABAn]Ni($\eta^3$-H$_2$CCHCH(COOEt)]}BAF

Example 513
{[(2,4,6-MePh)$_2$DABAn]Ni($\eta^3$-H$_2$CCHCH(COOEt)}BAF

Example 514
{[(2,6-i-PrPh)$_2$DABAn]Ni($\eta^3$-H$_2$CCHCHCl)}BAF

Example 515
{[(2,4,6-MePh)$_2$DABAn]Ni($\eta^3$-H$_2$CCHCHCl)}BAF

Examples 516–537

Polymerizations catalyzed by nickel and palladium π-benzyl initiators and by nickel allyl initiators are illustrated in the following Table containing Examples 516–537. The initiation of polymerizations catalyzed by nickel allyl initiators where the allyl ligand was substituted with functional groups, such as chloro or ester groups, was often aided by the addition of a Lewis acid.

| Example | Compound | Conditions | Results |
|---|---|---|---|
| 516 | {[(2,6-i-PrPh)$_2$DABMe$_2$]Pd($\eta^3$-CHEtph)}BAF | 0.067 mmol Cmpd; 25° C.; 1 atm E; 2 days; CH$_2$Cl$_2$ | <0.5 g PE (270 TO) |
| 517 | {[(2,6-i-PrPh)$_2$DABMe$_2$]Pd($\eta^3$-CHEtph)}BAF | 0.027 mmol Cmpd; 25° C.; 6.9 MPaE; 18 h; C$_6$D$_6$ | 8.2 g PE (11,000 TO) |
| 518 | {[(2,6-i-PrPh)$_2$DABH$_2$]Pd($\eta^3$-3CHEt(4-C$_6$H$_4$-t-Bu))}BAF | 0.016 mmol Cmpd; 25° C.; 6.9 MPa E; 18 h; C$_6$D$_6$ | 1.5 g PE (3,300 TO) |
| 519 | {[(2,6-i-PrPh)$_2$DABMe$_2$]Pd($\eta^3$-CHEtC$_6$F$_5$)}BAF | 0.063 mmol Cmpd; 25° C.; 1 atm E; 5 days; CH$_2$Cl$_2$ | 4.6 g PE (2,600 TO) |
| 520 | {[(2,6-i-PrPh)$_2$DABMe$_2$]Pd($\eta^3$-CHEtC$_6$F$_5$)}BAF | 0.044 mmol Cmpd; 25° C.; 6.9 MPa E; 18 h; C$_6$D$_6$ | 6.4 g PE (5,200 TO) |
| 521 | {[(2,4,6-MePh)$_2$DABAn]Ni($\eta^3$-H$_2$CCHCMe$_2$)}BAF | 0.049 mmol Cmpd; 25° C.; 6.9 MPa E; 18 h; C$_6$D$_6$ | 1.5 g PE (1,100 TO) |
| 522 | {[(2,6-i-PrPh)$_2$DABMe$_2$]Ni($\eta^3$-H$_2$CCHCMe$_2$)}BAF | 0.034 mmol Cmpd; 25° C.; 6.9 MPa E; 18 h; C$_6$D$_6$ | 35 mg PE (37 TO) |
| 523 | {[(2,4,6-MePh)$_2$DABMe$_2$]Ni($\eta^3$-C$_3$H$_5$)}BAF | 0.047 mmol Cmpd; 80° C.; 6.9 MPa E; 18 h; C$_6$D$_6$ | 20 mg PE (15 TO) |
| 524 | {[(2,4,6-Meph)$_2$DABAn]Ni($\eta^3$-C$_3$H$_5$)}BAF | 0.034 mmol Cmpd; 80° C.; 6.9 MPa E; 18 h; C$_6$D$_6$ | 260 mg PE (270 TO) |
| 525 | {[(2,4,6-MePh)$_2$DABAn]Ni($\eta^3$-H$_2$CCHCHPh)}BAF | 0.026 mmol Cmpd; 80° C.; 6.9 MPa E; 18 h; C$_6$D$_6$ | 141 mg PE (190 TO) |
| 526 | {[(2,6-i-PrPh)$_2$DABAn]Ni($\eta^3$-H$_2$CCHCHPh)}BAF | 0.040 mmol Cmpd; 80° C.; 6.9 MPa E; 18 h; C$_6$D$_6$ | 992 mg PE (880 TO) |
| 527 | {[(2,6-i-PrPh)$_2$DABAn]Ni($\eta^3$-H$_2$CCHCHMe)}BAF | 0.043 mmol Cmpd; 80° C.; 6.9 MPa E; 18 h; C$_6$D$_6$ | 23 mg PE (19 TO) |
| 528 | {[(2,6-i-PrPh)$_2$DABMe$_2$]Ni($\eta^3$-H$_2$CCHCMe$_2$)}BAF | 0.044 mmol Cmpd; 80° C.; 6.9 MPa E; 18 h; C$_6$D$_6$ | 54 mg PE (44 TO) |
| 529 | {[(2,6-i-PrPh)$_2$DABAn]Ni($\eta^3$-C$_3$H$^5$)}BAF | 0.042 mmol Cmpd; 80° C.; 6.9 MPa E; 18 h; C$_6$D$_6$ | 15 mg PE (13 TO) |
| 530 | {[(2,4,6-MePh)$_2$DABAn]Ni($\eta^3$-H$_2$CCHCHCl)}BAF | 0.043 mmol Cmpd; 25° C.; 6.9 MPa E; 18 h; C$_6$D$_6$ | 94 mg PE (78 TO) |
| 531 | {[(2,6-i-PrPh)$_2$DABAn]Ni($\eta^3$-H$_2$CCHCHCl)}BAF | 0.042 mmol Cmpd; 25° C.; 6.9 MPa E; 18 h; C$_6$D$_6$ | 8 mg PE (7 TO) |
| 532 | {[(2,4,6-MePh)$_2$DABAn]Ni($\eta^3$-H$_2$CCHCHCl)}BAF | 0.020 mmol Cmpd; 0.04 mmol B(C$_6$F$_5$)$_3$; 25° C.; 6.9 MPa E; 18 h; CDCl$_3$ | 7.8 g PE (14,000 TO) |
| 533 | {[(2,4,6-MePh)$_2$DABAn]Ni($\eta^3$-H$_2$CCHCHCl)}BAF | 0.020 mmol Cmpd; 0.04 mmol BPh$_3$; 25° C.; 6.9 MPa E; 18 h; CDCl$_3$ | 8.4 g PE (15,000 TO) |
| 534 | {[(2,6-i-PrPh)$_2$DABAn]Ni($\eta^3$-H$_2$CCHCH(COOEt))}BAF | 0.020 mmol Cmpd; 0.04 mmol BPh$_3$; 25° C.; 6.9 MPa E; 18 h; CDCl$_3$ | 4.7 g PE (8,400 TO) |
| 535 | {[(2,6-i-PrPh)$_2$DABAn]Ni($\eta^3$-H$_2$CCHCHCl)}BAF | 0.020 mmol Cmpd; 0.04 mmol BPh$_3$; 80° C.; 6.9 MPa E; 18 h; C$_6$D$_6$ | 6.8 g PE (12,000 TO) |
| 536 | {[(2,6-i-PrPh)$_2$DABAn]Ni($\eta^3$-H$_2$CCHCHCl)}BAF | 0.020 mmol Cmpd; 10 mg montmorillonite; 80° C.; 6.9 MPa E; 18 h; C$_6$D$_6$ | 326 mg PE (580 TO) |
| 537 | {[(2,6-i-PrPh)$_2$DABAn]Ni($\eta^3$-H$_2$CCHCH(COOEt)}BAF | 0.020 mmol Cmpd; 0.04 mmol BPh$_3$; 80° C.; 6.9 MPa E; 18 h; C$_6$D$_6$ | 10.3 g PE (18,000 TO) |

What is claimed is:

1. A catalyst composition for the polymerization of one or more olefins comprising a transition metal atom, a bidentate diimine ligand and two monodentate ligands, said bidentate ligand and monodentate ligands being coordinate to the transition metal atom in square planar configuration, wherein the bidentate ligand has sufficient steric bulk on both sides of the coordination plane to permit formation of a polymer of said one or more olefins with a degree of polymerization of at least about 10 or more, provided that said transition metal atom is selected from the group consisting of Fe, Co, Ni and Pd and said monodentate ligands comprise at least one of a group Q and group S', in an amount equal to the oxidation state of the transition metal, wherein Q and S' are independently an alkyl, hydride, chloride, iodide, or bromide, said catalyst composition further comprising a compound W', wherein W' is a neutral Lewis acid capable of abstracting either Q$^-$ or S'$^-$ to form W'Q$^-$ or W'S'$^-$, provided that the anion formed is a weakly coordinating anion; or W' is a cationic Lewis or Bronsted acid whose counterion is a weakly coordinating anion.

2. The catalyst composition of claim 1, wherein the transition metal is in a positive oxidation state.

3. The catalyst composition of claim 1, wherein the transition metal is nickel or palladium.

4. The catalyst composition of claim 3, wherein the transition metal is nickel.

5. The catalyst composition claim 1, wherein the transition metal is in an oxidation state of 2+.

6. The catalyst composition of claim 1, further comprising an alkyl aluminum compound.

7. The catalyst composition of claim 1, wherein the transition metal has bonded to it another ligand that may be displaced by said olefin or add to said olefin.

8. The catalyst composition of claim 1, wherein the bidentate diimine ligand is an α-diimine.

9. The catalyst composition of claim 1, supported on a solid support.

* * * * *